US010190009B2

(12) United States Patent
Ono et al.

(10) Patent No.: US 10,190,009 B2
(45) Date of Patent: Jan. 29, 2019

(54) INK COMPOSITION, INK JET RECORDING METHOD USING SAME, AND COLORED MATERIAL

(71) Applicant: Nippon Kayaku Kabushiki Kaisha, Tokyo (JP)

(72) Inventors: Daisuke Ono, Tokyo (JP); Yumi Shiratori, Tokyo (JP); Yasuaki Ishiguro, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/907,239

(22) PCT Filed: Aug. 8, 2014

(86) PCT No.: PCT/JP2014/071125

§ 371 (c)(1), (2) Date: Jan. 22, 2016

(87) PCT Pub. No.: WO2015/020222

PCT Pub. Date: Feb. 12, 2015

(65) Prior Publication Data

US 2016/0160065 A1 Jun. 9, 2016

(30) Foreign Application Priority Data

| | | |
|---|---|---|
| Aug. 8, 2013 | (JP) | 2013-164935 |
| Aug. 8, 2013 | (JP) | 2013-164936 |
| Aug. 8, 2013 | (JP) | 2013-164937 |
| Aug. 8, 2013 | (JP) | 2013-164938 |
| Aug. 8, 2013 | (JP) | 2013-164939 |
| Aug. 8, 2013 | (JP) | 2013-164940 |
| Oct. 15, 2013 | (JP) | 2013-214690 |
| Dec. 27, 2013 | (JP) | 2013-270774 |
| Dec. 27, 2013 | (JP) | 2013-270775 |
| Dec. 27, 2013 | (JP) | 2013-270776 |
| Dec. 27, 2013 | (JP) | 2013-270777 |
| Dec. 27, 2013 | (JP) | 2013-270778 |
| Jan. 23, 2014 | (JP) | 2014-010179 |
| Jan. 23, 2014 | (JP) | 2014-010180 |
| Mar. 24, 2014 | (JP) | 2014-060119 |
| Mar. 24, 2014 | (JP) | 2014-060120 |

(51) Int. Cl.
*C09D 11/328* (2014.01)
*C09B 67/22* (2006.01)

(52) U.S. Cl.
CPC ........ *C09D 11/328* (2013.01); *C09B 67/0046* (2013.01)

(58) Field of Classification Search
CPC .............................. C09D 11/30; C09D 11/328
See application file for complete search history.

(56) References Cited

U.S. PATENT DOCUMENTS

| | | | |
|---|---|---|---|
| 5,560,771 | A | 10/1996 | Takemoto et al. |
| 5,721,344 | A | 2/1998 | Baettig |
| 6,152,969 | A | 11/2000 | Matsumoto et al. |
| 6,648,952 | B1 | 11/2003 | Matsumoto et al. |
| 6,929,361 | B2 | 8/2005 | Matsumoto et al. |
| 7,056,374 | B2 | 6/2006 | Kitayama et al. |
| 7,195,664 | B2 | 3/2007 | Mafune et al. |
| 7,297,196 | B2 | 11/2007 | Matsumoto et al. |
| 7,387,668 | B2 | 6/2008 | Kitayama et al. |
| 7,419,537 | B2 | 9/2008 | Fujii et al. |
| 7,427,319 | B2 | 9/2008 | Yoneda et al. |
| 7,503,965 | B2 | 3/2009 | Matsui et al. |
| 7,503,967 | B2 | 3/2009 | Matsui et al. |
| 7,585,361 | B2 | 9/2009 | Yoneda et al. |

(Continued)

FOREIGN PATENT DOCUMENTS

| | | | |
|---|---|---|---|
| CN | 1973001 | A | 5/2007 |
| CN | 101056950 | A | 10/2007 |

(Continued)

OTHER PUBLICATIONS

Office Action in Chinese Patent Application No. 201480044340.2, dated Dec. 5, 2016.

(Continued)

*Primary Examiner* — Coris Fung
*Assistant Examiner* — Sathavaram I Reddy
(74) *Attorney, Agent, or Firm* — Knobbe Martens Olson & Bear LLP

(57) ABSTRACT

An aqueous black ink composition that contains a colorant represented by formula (1) and one or more colorants (B-a) to (B-t). The ink composition is stable even when stored for a long period of time, has a low chroma and tint-free neutral black-to-gray color even when printing a deep color or light color, has a high printed image density, exhibits no change in hue when printed on different media, and produces a black recorded image having particularly excellent recorded image color development properties, light resistance, ozone gas resistance and moisture resistance.

(1)

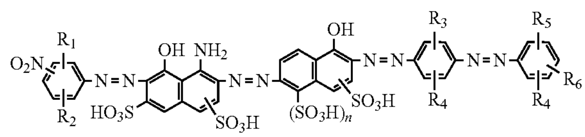

8 Claims, No Drawings

(56) References Cited

U.S. PATENT DOCUMENTS

| | | | |
|---|---|---|---|
| 7,591,888 B2 | 9/2009 | Fujii et al. | |
| 7,678,185 B2 | 3/2010 | Matsumoto et al. | |
| 7,727,320 B2 | 6/2010 | Matsumoto et al. | |
| 7,854,797 B2 | 12/2010 | Fujii et al. | |
| 7,871,464 B2 | 1/2011 | Ono et al. | |
| 7,909,926 B2 | 3/2011 | Matsumoto et al. | |
| 7,985,287 B2 | 7/2011 | Murakami et al. | |
| 8,167,991 B2 | 5/2012 | Matsui et al. | |
| 8,425,676 B2 | 4/2013 | Morita et al. | |
| 8,506,697 B2 | 8/2013 | Morita et al. | |
| 8,512,462 B2 | 8/2013 | Matsui et al. | |
| 8,657,433 B2 | 2/2014 | Ooshima et al. | |
| 8,741,046 B2 | 6/2014 | Kawaguchi et al. | |
| 8,932,393 B2 | 1/2015 | Yoshimoto et al. | |
| 2004/0239739 A1 | 12/2004 | Matsumoto et al. | |
| 2006/0144288 A1 | 7/2006 | Ohno et al. | |
| 2007/0257975 A1 | 11/2007 | Yoneda et al. | |
| 2008/0193660 A1 | 8/2008 | Matsui et al. | |
| 2009/0062545 A1 | 3/2009 | Matsui et al. | |
| 2009/0285988 A1* | 11/2009 | Matsumoto .......... | C07D 401/14<br>427/256 |
| 2012/0202019 A1 | 8/2012 | Matsui et al. | |
| 2013/0011637 A1 | 1/2013 | Morita et al. | |
| 2014/0299020 A1 | 10/2014 | Shimizu et al. | |

FOREIGN PATENT DOCUMENTS

| | | |
|---|---|---|
| CN | 101346437 A | 1/2009 |
| CN | 102575109 A | 7/2012 |
| CN | 102858885 A | 1/2013 |
| EP | 1810999 A1 | 7/2007 |
| EP | 2554606 A1 | 2/2013 |
| EP | 2754702 A1 | 7/2014 |
| EP | 2977414 A1 | 1/2016 |
| JP | H09-217018 | 8/1997 |
| JP | H10-306221 | 11/1998 |
| JP | H11-070729 | 3/1999 |
| JP | 2001-139836 | 5/2001 |
| JP | 3346755 | 11/2002 |
| JP | 2003-192930 | 7/2003 |
| JP | 2003-321627 | 11/2003 |
| JP | 2004-285351 | 10/2004 |
| JP | 4420267 | 11/2004 |
| JP | 2005-036222 | 2/2005 |
| JP | 4100880 | 6/2008 |
| JP | 2009-084346 | 4/2009 |
| JP | 2010-006969 | 1/2010 |
| JP | 2013-032469 | 2/2013 |
| JP | 5260493 | 8/2013 |
| JP | 5328354 | 10/2013 |
| JP | 5337716 | 11/2013 |
| JP | 2013-256548 | 12/2013 |
| JP | 2013-256598 | 12/2013 |
| JP | 2014-156559 | 8/2014 |
| RU | 2281944 C2 | 8/2006 |
| WO | WO2004/087815 | 10/2004 |
| WO | WO2004/104108 | 12/2004 |
| WO | WO2005/033211 | 4/2005 |
| WO | WO2005/097912 | 10/2005 |
| WO | WO2006/001274 | 1/2006 |
| WO | WO2006/051850 | 5/2006 |
| WO | WO2006/075706 | 7/2006 |
| WO | WO2007/077931 | 7/2007 |
| WO | WO2007/091631 | 8/2007 |
| WO | WO2007/116933 | 10/2007 |
| WO | WO2008/018495 | 2/2008 |
| WO | WO2008/066062 | 6/2008 |
| WO | WO2008/111635 | 9/2008 |
| WO | WO2009/060654 | 5/2009 |
| WO | WO2009/093433 | 7/2009 |
| WO | WO2010/125903 | 11/2010 |
| WO | WO2010/143619 | 12/2010 |
| WO | WO2011/043184 | 4/2011 |
| WO | WO2011/122426 | 10/2011 |
| WO | WO2012/002317 | 1/2012 |
| WO | WO2012/050061 | 4/2012 |
| WO | WO2012/081640 | 6/2012 |
| WO | WO2013/035560 | 3/2013 |

OTHER PUBLICATIONS

Partial Supplementary European Search Report in European Patent Application No. 14835289.1, dated Jun. 8, 2016.

Office Action issued in Russian Patent Application No. 2016105711, dated Feb. 16, 2018.

* cited by examiner

INK COMPOSITION, INK JET RECORDING METHOD USING SAME, AND COLORED MATERIAL

CROSS-REFERENCE TO RELATED APPLICATIONS

This application is the U.S. National Phase under 35 U.S.C. § 371 of International Application PCT/JP2014/071125, filed Aug. 8, 2014, which was published in Japanese as WO2015/020222 on Feb. 12, 2015, which claims priority to Japanese Patent Application Nos. 2013-164935, 2013-164936, 2013-164937, 2013-164938, 2013-164939, 2013-164940, all of which were filed Aug. 8, 2013; Japanese Patent Application No. 2013-214690, filed Oct. 15, 2013; Japanese Patent Application Nos. 2013-270774, 2013-270775, 2013-270776, 2013-270777 and 2013-270778, all of which were filed Dec. 27, 2013; Japanese Patent Application Nos. 2014-010179 and 2014-010180, both of which were filed Jan. 23, 2014; and Japanese Patent Application Nos. 2014-060119 and 2014-060120, both of which were filed Mar. 24, 2014. The entire contents of all of these Japanese applications are incorporated herein by reference.

TECHNICAL FIELD

The present invention relates to an ink composition, an inkjet-recording method using the same, and a colored material.

BACKGROUND ART

Among various color-recording methods, use of an ink-jet printer is a typical one, in which ink droplets are produced to be deposited onto various record-receiving objects (paper, a film, and fabric, for example) to achieve recording. The ink-jet printer does not involve direct contact between a recording head and the record-receiving object, and therefore operates quietly without making much noise. In addition, having such features that size reduction and speed enhancement are easily accomplished, the ink-jet printer is rapidly achieving widespread use in recent years and is expected to be used even more widely in the future.

As an ink for fountain pens, felt-tipped pens, and the like and as an ink for ink-jet printing, an aqueous ink containing a water-soluble coloring matter dissolved in an aqueous medium is conventionally used. The aqueous ink generally contains a water-soluble organic solvent to prevent ink clogging from occurring at the tip of a pen or in an ink-discharging nozzle. This ink is required, for example, to give a recorded image with adequate density, to cause no clogging at the tip of a pen or in a nozzle, to dry well on a record-receiving material, bleed little, and to have excellent storage stability. In addition, the water-soluble coloring matter contained therein is required to have excellent solubility particularly in water and excellent solubility in the water-soluble organic solvent contained in the ink. Furthermore, an image to be obtained is required to have image-fastness such as water resistance and light resistance, well-reproduced colors, and well-rendered colors. It is also crucial for the image to have not only excellent image-fastness but also well-balanced colors.

Due to advancement in ink-jet printing technology in recent years, printing speed in ink-jet printing is being dramatically enhanced. This trend is causing movement toward use of ink-jet printers instead of laser printers, which operate on electronic toner, for printing documents on plain paper, which is a major application of printing for commercial purposes and in office environment. With their advantages of operability on any kinds of recording paper and low prices of the devices, ink-jet printers are achieving widespread use in small- to medium-sized office environment, particularly in SOHO. When ink-jet printers are used for printing on plain paper, focus tends to be put on color development properties and water resistance, among other properties required of printed articles. To satisfy such requirement for performance, use of a pigment ink has been suggested. The pigment ink, however, is not in the state of solution but in the state of dispersion containing solid pigments dispersed therein, and therefore tends to cause problems such as poor storage stability of the pigment ink and clogging in a print-head nozzle, compared to a dye ink. In addition, when the pigment ink is used, the printed image often has a problem of poor resistance to scuffing. In contrast, the dye ink contains dyes as coloring matter components dissolved in the ink, and therefore the above-mentioned problems unique to the pigment ink are less likely to occur compared to the pigment ink. However, the dye ink is generally and significantly inferior to the pigment ink particularly in color development properties, light resistance, and water resistance, and the improvement is strongly desired.

By the way, when an image or text information on a color monitor of a computer is recorded in color using an ink-jet printer, subtractive color mixture with inks of four colors, namely, yellow (Y), magenta (M), cyan (C), and black (K), is generally employed to produce a recorded image in color. In order for subtractive color mixture to faithfully reproduce the image that has been yielded by additive color mixture with red (R), green (G), and blue (B) on a CRT (cathode-ray tube) display or the like, each of the coloring matters, particularly Y, M, and C, contained in the ink is desired to have a hue similar to the hue of the corresponding standard color and to be vivid. To be vivid here generally refers to have high chroma. When three primary colors of Y, M, and C have low chroma, the color range produced with a single color or color mixture is small, which may not satisfy the intended color range. Because of this reason, development of coloring matters with high chroma as well as inks containing such coloring matters is desired.

As for the properties of the ink, not only long-term storage stability and high density in a recorded image but also excellent fastness of the printed image, such as water resistance, moisture resistance, light resistance, and gas resistance, are required.

The light resistance here refers to fastness of the recorded image to light such as sunlight and indoor light.

The moisture resistance here refers to resistance of a coloring matter in a recorded image to phenomena such as discoloration due to excess moisture present primarily in the atmosphere in the surrounding environments and bleeding and escaping of the coloring matter from the printed image. The lack of moisture resistance is regarded as a critical problem left to be solved for ink-jet recorded articles, which are exhibited in various environments in recent years. However, an ink that adequately satisfies the requirement from the market has not yet been developed.

The gas resistance refers to resistance to phenomena where a coloring matter (dye) in a recorded image on or within a record-receiving material reacts with a gas that is present in the air and has oxidizing action (also called an oxidizing gas) to cause discoloration and color fading of the recorded image. Ozone gas, among other oxidizing gases, is regarded as a major factor that facilitates the phenomena of discoloration and color fading of the ink-jet recorded image. Because the phenomena of discoloration and color fading are characteristic to the ink-jet recorded image, improvement in ozone-gas resistance is a serious technical objective to achieve in the field.

As a method of obtaining a photograph-quality printed image by ink-jet recording, an ink-receiving layer is provided on the surface of a record-receiving material. The ink-receiving layer provided for this purpose often contains a white porous inorganic substance for facilitating ink drying and reducing bleeding of a coloring matter to obtain a high-quality image. However, the record-receiving material thus treated, in particular, often receives discoloration and color fading due to ozone gas described above. Along with the recent widespread use of digital cameras and color printers, images captured with digital cameras and the like are increasingly and more often printed at home with photograph quality. Due to this trend, discoloration and color fading of a recorded image due to an oxidizing gas described above are regarded as problematic.

A black ink, among other ink compositions, is a key ink used in both monochrome and full-color printed images. It is difficult from technical viewpoints, however, to develop a coloring matter capable of producing an excellent black color with neutral hues in the deep-color gamut and the light-color gamut, high print density, and low light-source dependency of hues. Much effort that has been made on research and development has only achieved a few coloring matters that have adequate performance. Because of this reason, a black ink is generally formulated by adding a plurality of different coloring matters. An ink as a mixture of a plurality of coloring matters, however, has disadvantages such as 1) variation in hues depending on a medium (a record-receiving material) and 2) serious discoloration, among others, caused by degradation of the coloring matters due to light and ozone gas, compared to an ink only containing a single coloring matter.

A black ink composition for ink-jet printing that is excellent in a wide range of durability of a printed article is suggested, for example, in Patent Document 1. This ink composition is extremely excellent in the black hue and is greatly improved in fastness of an image on a printed article, but it needs further improvement particularly in ozone resistance. So far, no product that adequately fulfills the requirement from the market has been developed.

Patent Document 1: Japanese Unexamined Patent Application, Publication No. H09-217018
Patent Document 2: Japanese Unexamined Patent Application, Publication No. H10-306221
Patent Document 3: Japanese Unexamined Patent Application, Publication No. H11-70729
Patent Document 4: Japanese Unexamined Patent Application, Publication No. 2001-139836
Patent Document 5: Japanese Unexamined Patent Application, Publication No. 2003-192930
Patent Document 6: Japanese Unexamined Patent Application, Publication No. 2003-321627
Patent Document 7: Japanese Unexamined Patent Application, Publication No. 2004-285351
Patent Document 8: PCT International Publication No. WO2004/087815
Patent Document 9: PCT International Publication No. WO2004/104108
Patent Document 10: Japanese Unexamined Patent Application, Publication No. 2005-036222
Patent Document 11: PCT International Publication No. WO2005/033211
Patent Document 12: PCT International Publication No. WO2005/097912
Patent Document 13: PCT International Publication No. WO2006/001274
Patent Document 14: PCT International Publication No. WO2006/051850
Patent Document 15: PCT International Publication No. WO2006/075706
Patent Document 16: PCT International Publication No. WO2007/077931
Patent Document 17: PCT International Publication No. WO2007/091631
Patent Document 18: PCT International Publication No. WO2007/116933
Patent Document 19: PCT International Publication No. WO2008/018495
Patent Document 20: PCT International Publication No. WO2008/066062
Patent Document 21: PCT International Publication No. WO2008/111635
Patent Document 22: Japanese Unexamined Patent Application, Publication No. 2009-084346
Patent Document 23: PCT International Publication No. WO2009/060654
Patent Document 24: Japanese Unexamined Patent Application, Publication No. 2010-006969
Patent Document 25: PCT International Publication No. WO2010/125903
Patent Document 26: PCT International Publication No. WO2010/143619
Patent Document 27: PCT International Publication No. WO2011/122426
Patent Document 28: PCT International Publication No. WO2012/002317
Patent Document 29: PCT International Publication No. WO2012/050061
Patent Document 30: PCT International Publication No. WO2012/081640
Patent Document 31: Japanese Patent No. 3346755 Patent Document 32: Japanese Patent No. 4100880
Patent Document 33: Japanese Patent No. 4420267
Patent Document 34: Japanese Patent No. 5337716
Non-Patent Document 1: Yutaka Hosoda, "Theory manufacturing dye chemistry", Gihodo, pp. 190-193

DISCLOSURE OF THE INVENTION

Problems to be Solved by the Invention

An object of the present invention is to provide an aqueous black ink composition capable of producing a black recorded image that is stable during long-term storage, has a tint-free neutral black-to-gray color with low chroma when printed in either deep black or light black, high density, and no hue variation depending on a medium, and is extremely excellent in color development properties, light resistance, ozone-gas resistance, and moisture resistance.

Means for Solving the Problems

The inventors of the present invention have conducted intensive research to solve the problems and, as a result, found that an ink composition containing a combination of a coloring matter represented by a certain formula (1) (component (A)) with a coloring matter having a certain structure solves the problems. Thus, the present invention has now been completed.

Accordingly, a first aspect of the present invention provides:

1)

an ink composition, containing: (A) a coloring matter represented by a formula (1) below; and (B) one, two, or more coloring matters selected from the group consisting of (B-a) to (B-t) below:

(1)

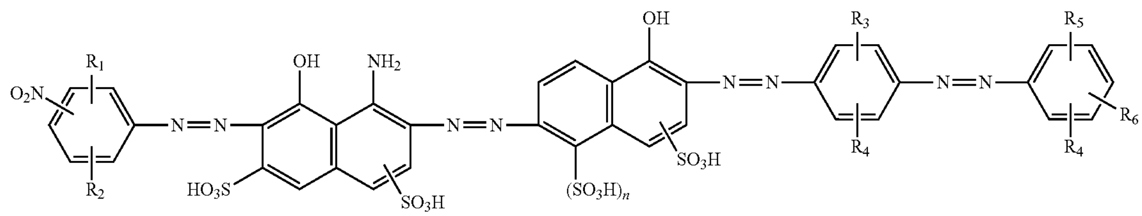

[in the formula (1), $R^1$, $R^2$, $R^5$, $R^6$, and $R^7$ are independently a hydrogen atom; a halogen atom; a cyano group; a hydroxy group; a sulfo group; a carboxy group; a sulfamoyl group; a phospho group; a nitro group; a ureido group; a (C1-C4) alkyl group; a (C1-C4) alkoxy group; a (C1-C4) alkyl group substituted with a hydroxy group or a (C1-C4) alkoxy group; a (C1-C4) alkoxy group substituted with at least one group selected from the group consisting of a hydroxy group, a (C1-C4) alkoxy group, a sulfo group, and a carboxy group; an acyl group; an N-alkylaminosulfonyl group; an N-phenylaminosulfonyl group; an N-alkylaminosulfonyl group substituted with at least one or more groups selected from the group consisting of a sulfo group, a carboxy group, and a hydroxy group; an alkylsulfonyl group; an alkylsulfonyl group substituted with at least one or more groups selected from the group consisting of a sulfo group, a carboxy group, and a hydroxy group; an acylamino group; an alkylsulfonylamino group; a phenylsulfonylamino group; or a phenylsulfonylamino group substituted with at least one or more groups selected from the group consisting of a halogen atom, a (C1-C4) alkyl group, and a nitro group, $R^3$ and $R^4$ are independently a hydrogen atom; a halogen atom; a cyano group; a carboxy group; a sulfo group; a nitro group; a (C1-C4) alkyl group; a (C1-C4) alkyl group substituted with a hydroxy group or a (C1-C4) alkoxy group; a (C1-C4) alkoxy group; a (C1-C4) alkoxy group substituted with at least one group selected from the group consisting of a hydroxy group, a (C1-C4) alkoxy group, a sulfo group, and a carboxy group; a (C1-C4) alkylthio group; a (C1-C4) alkylthio group substituted with a sulfo group or a carboxy group; an acylamino group; an alkylsulfonylamino group; a phenylsulfonylamino group; or a phenylsulfonylamino group substituted with at least one group selected from the group consisting of a halogen atom, a (C1-C4) alkyl group, and a nitro group; and n denotes 0 or 1]

the component (B)

(a1)

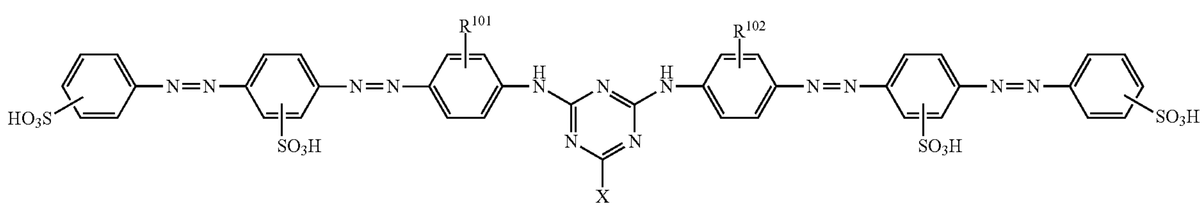

[in the formula (a1), $R^{101}$ and $R^{102}$ are independently a hydrogen atom; a hydroxy group; a carboxy group; a (C1-C4) alkyl group; a (C1-C4) alkyl group substituted with a hydroxy group or a (C1-C4) alkoxy group; a (C1-C4) alkoxy group; a (C1-C4) alkoxy group substituted with at least one group selected from the group consisting of a hydroxy group, a (C1-C4) alkoxy group, a sulfo group, and a carboxy group; a (C1-C4) alkylamino group; a (C1-C4) alkylamino group substituted with a hydroxy group or a (C1-C4) alkoxy group; a carboxy (C1-C5) alkylamino group; a bis(carboxy (C1-C5) alkyl) amino group; a (C1-C4) alkylcarbonylamino group; a (C1-C4) alkylcarbonylamino group substituted with a hydroxy group or a (C1-C4) alkoxy group; a phenylamino group; a phenylamino group that has a benzene ring substituted with at least one group selected from the group consisting of a carboxy group, a sulfo group, and an amino group; a sulfo group; a halogen atom; an acyl group; or a ureido group, and X is a substituted amino group having a sulfo group or a carboxy group]

(B-b)

(b1)

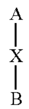

(b2)

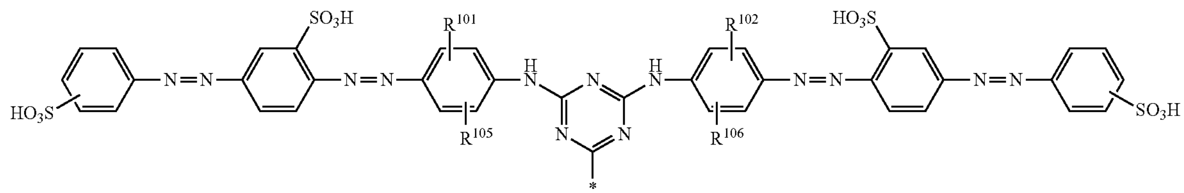

(b3)

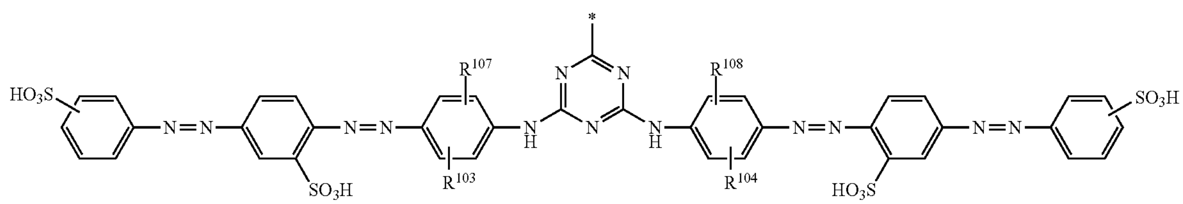

[in the formula (b1),
A is a structure represented by the formula (4),
B is a structure represented by the formula (5),
X is a divalent crosslinking group (containing at least two or more nitrogen atoms, and each of A and B as a substituent being attached to a different nitrogen atom),
in the formulae (b2) and (b3),
$R^{101}$ to $R^{108}$ are independently a hydrogen atom; a halogen atom; a sulfo group; a carboxy group; a sulfamoyl group; a carbamoyl group; a (C1-C4) alkyl group; a (C1-C4) alkoxy group; a (C1-C4) alkoxy group substituted with at least one group selected from the group consisting of a hydroxy group, a (C1-C4) alkoxy group, a hydroxy (C1-C4) alkoxy group, a sulfo group, and a carboxy group; a (C1-C4) alkylcarbonylamino group; a (C1-C4) alkylcarbonylamino group substituted with a carboxy group; a ureido group; a mono (C1-C4) alkylureido group; a di(C1-C4) alkylureido group; a mono (C1-C4) alkylureido group substituted with at least one group selected from the group consisting of a hydroxy group, a sulfo group, and a carboxy group; a di(C1-C4) alkylureido group substituted with at least one group selected from the group consisting of a hydroxy group, a sulfo group, and a carboxy group; a benzoylamino group; a benzoylamino group that has a benzene ring substituted with at least one group selected from the group consisting of a halogen atom, a (C1-C4) alkyl group, a nitro group, a sulfo group, and a carboxy group; a benzenesulfonylamino group; or a phenylsulfonylamino group that has a benzene ring substituted with at least one group selected from the group consisting of a halogen atom, a (C1-C4) alkyl group, a nitro group, a sulfo group, and a carboxy group, and
* indicates the position of substitution attached to X]

(B-c)

(c1)

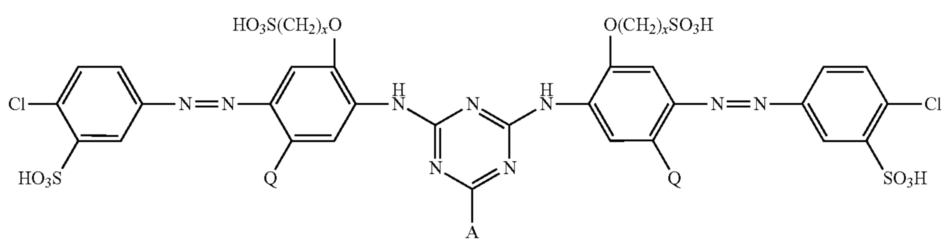

[in the formula (c1),
Q is a halogen atom,
x denotes an integer of 2 to 4, and
the group A is an amino group represented by a formula (c2) below]

(c2)

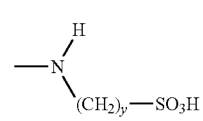

[in the formula (c2),
y denotes an integer of 1 to 3]

(B-d)

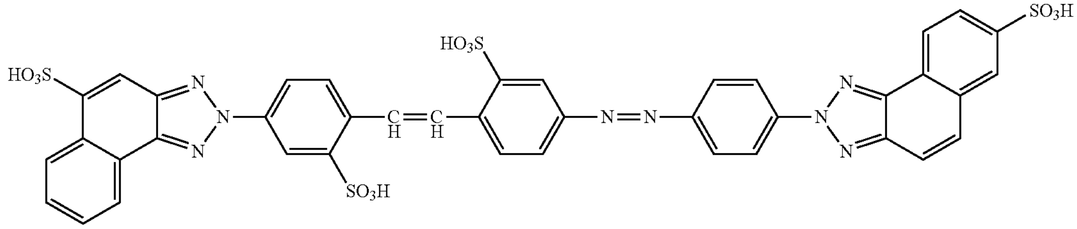

(d1)

(B-e)

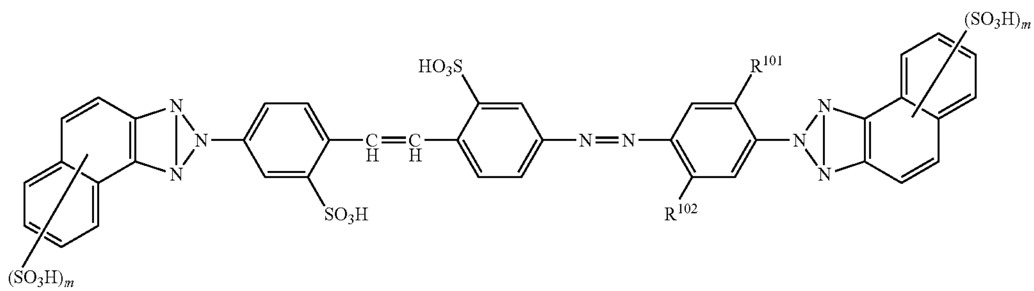

(e1)

[in the formula (e1), $R^{101}$ and $R^{102}$ are independently a hydrogen atom; a (C1-C4) alkyl group; a (C1-C4) alkoxy group; a (C1-C4) alkylcarbonyl group; a phenylcarbonyl group; a (C1-C4) alkoxy group substituted with a (C1-C4) alkoxy group; a sulfo group; a carboxy group; or a ureido group; (except for the case where both $R^{101}$ and $R^{102}$ are independently a hydrogen atom), and m and n independently denote 1 or 2]

(B-f)

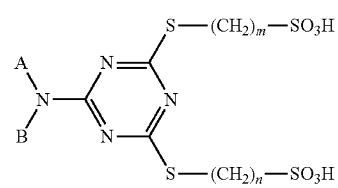

(f1)

[in the formula (f1),
A is a monoazo or polyazo dye residue,
B is hydrogen or a (C1-C6) alkyl group, and
m and n independently denote an integer of 2 to 6]

(B-g)

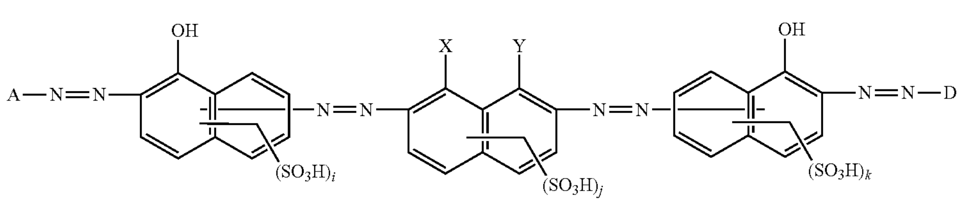

(g1)

[in the formula (g1),

A and D are independently a phenyl group or a naphthyl group each having at least a carboxy group and/or a sulfo group as a substituent, or a 5- or 6-membered aromatic heterocyclic group being bonded to the corresponding azo group at one of the carbon atoms, one of X and Y is a hydroxy group and the other is an amino group, and i, j, and k denote 1 or 2]

(B-h)

(h1)

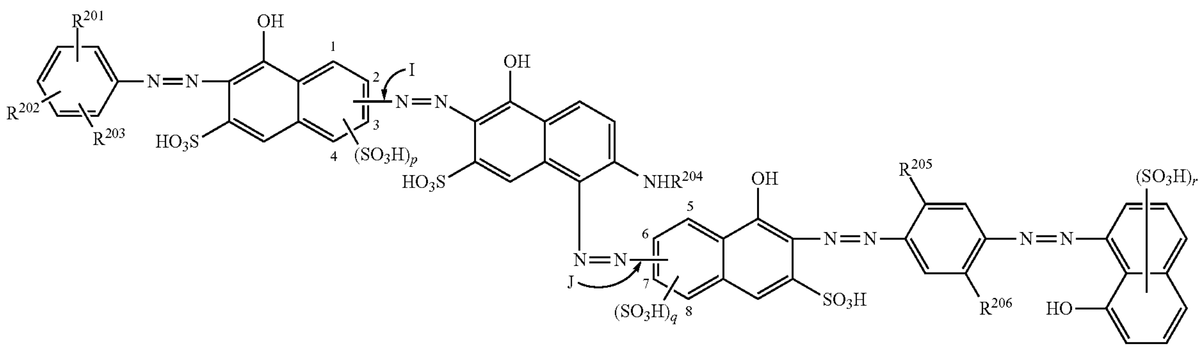

[in the formula (h1), $R^{201}$ to $R^{203}$ are independently a hydrogen atom; a halogen atom; a cyano group; a hydroxy group; an amino group; a sulfo group; a carboxy group; an N-alkylaminosulfonyl group; a phenylaminosulfonyl group; a phosphate group; a nitro group; an acyl group; a phenyl group; a ureido group; a (C1-C4) alkyl group that is optionally substituted with a hydroxy group or a (C1-C4) alkoxy group; a (C1-C4) alkoxy group that is optionally substituted with at least one or more groups selected from the group consisting of a hydroxy group, a (C1-C4) alkoxy group, a sulfo group, and a carboxy group; an amino group substituted with a phenyl group that is further and optionally substituted with a carboxy group or a sulfo group; a (C1-C4) alkylamino group; or an acylamino group, $R^{204}$ is a hydrogen atom; a (C1-C4) alkyl group that is optionally substituted with a hydroxy group, a (C1-C4) alkoxy group, a sulfo group, or a carboxy group; or a phenyl group that is optionally substituted with at least one or more groups selected from the group consisting of an amino group, a (C1-C4) alkyl group, a (C1-C4) alkoxy group, a carboxy group, and a sulfo group, each of $R^{205}$ and $R^{206}$ is a hydrogen atom; a sulfo group; an acetylamino group; a (C1-C4) alkyl group that is optionally substituted with a hydroxy group or a (C1-C4) alkoxy group; or a (C1-C4) alkoxy group that is optionally substituted with a hydroxy group, a (C1-C4) alkoxy group, a sulfo group, or a carboxy group, each of I and J is a single bond, I is attached to the 2-position or the 3-position, J is attached to the 6-position or the 7-position, each of p and q denotes 0 or 1, r denotes 1 or 2, the $(SO_3H)_p$ group is attached to the 3-position or the 4-position, and the $(SO_3H)_q$ group is attached to the 7-position or the 8-position]

(B-i)

(i1)

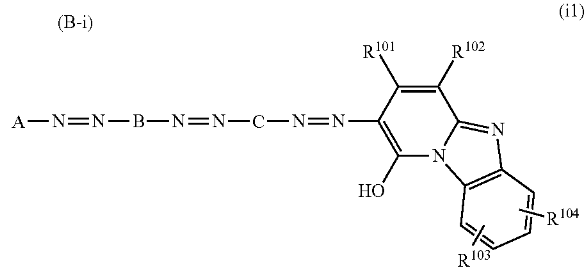

[in the formula (i1),

A is a substituted phenyl group, and has at least one substituent selected from the group consisting of a carboxy group; a sulfo group; a halogen atom; a cyano group; a nitro group; a sulfamoyl group; a (C1-C4) alkyl group; a (C1-C4) alkoxy group; a (C1-C4) alkoxy group substituted with at least one group selected from the group consisting of a hydroxy group, a (C1-C4) alkoxy group, a sulfo group, and a carboxy group; and an alkylsulfonyl group substituted with at least one group selected from the group consisting of a hydroxy group, a sulfo group, and a carboxy group, each of B and C is a substituted p-phenylene group, and independently has at least one substituent selected from the group consisting of a carboxy group; a sulfo group; a (C1-C4) alkyl group; a (C1-C4) alkoxy group; and a (C1-C4) alkoxy group substituted with at least one group selected from the group consisting of a hydroxy group, a (C1-C4) alkoxy group, a sulfo group, and a carboxy group, $R^{101}$ is a (C1-C4) alkyl group that is optionally substituted with a carboxy group; a phenyl group that is optionally substituted with a sulfo group; or a carboxy group, $R^{102}$ is a cyano group, a carbamoyl group, or a carboxy group, and $R^{103}$ and $R^{104}$ are independently a hydrogen atom; a (C1-C4) alkyl group; a (C1-C4) alkoxy group; a halogen atom; or a sulfo group]

(B-j)

(j1)

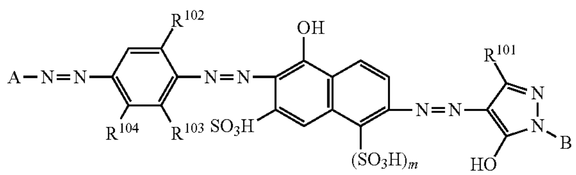

[in the formula (j1), m denotes 0 or 1, $R^{101}$ is a carboxy group; a (C1-C8) alkoxycarbonyl group; or a (C1-C4) alkyl group that is optionally substituted with a (C1-C8) alkoxycarbonyl group or a carboxy group, or a phenyl group that is optionally substituted with a hydroxy group, a sulfo group, or a carboxy group, $R^{102}$ to $R^{104}$ are independently a hydrogen atom; a halogen atom; a hydroxy group; a sulfo group; a carboxy group; a sulfamoyl group; a carbamoyl group; a (C1-C4) alkyl group; a (C1-C4) alkoxy group substituted with at least one group selected from the group consisting of a hydroxy group, a (C1-C4) alkoxy group, a hydroxy (C1-C4) alkoxy group, a sulfo group, and a carboxy group; a mono- or di(C1-C4) alkylamino group; a mono- or di(C1-C4) alkylamino group substituted with at least one group selected from the group A is a substituted heterocyclic group represented by a formula (j2) below:

(j2)

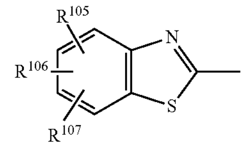

[in the formula (j2), $R^{105}$ to $R^{107}$ are independently a hydrogen atom; a halogen atom; a carboxy group; a sulfo group; a nitro group; a hydroxy group; a carbamoyl group; a sulfamoyl group; a (C1-C4) alkyl group; a (C1-C4) alkoxy group; a (C1-C4) alkoxy group substituted with at least one group selected from the group consisting of a hydroxy group, a (C1-C4) alkoxy group, a sulfo group, and a carboxy group; an alkylsulfonyl group substituted with at least one group selected from the group consisting of a sulfo group, a carboxy group, and a hydroxy group; or a phenylsulfonyl group that has a benzene ring optionally substituted with a chlorine atom, a (C1-C4) alkyl group, a nitro group, a sulfo group, or a carboxy group]

B is a phenyl group that is optionally substituted, and a substituent that is optionally attached to B is selected from the group consisting of a hydroxy group; a sulfo group; a carboxy group; a (C1-C4) alkyl group; a (C1-C4) alkoxy group; an amino group; a mono- or di(C1-C4) alkylamino group; an acetylamino group; a benzoylamino group; and a benzoylamino group that has a benzene ring substituted with at least one group selected from the group consisting of a chlorine atom, a (C1-C4) alkyl group, a nitro group, a sulfo group, and a carboxy group]

(B-k)

(k1)

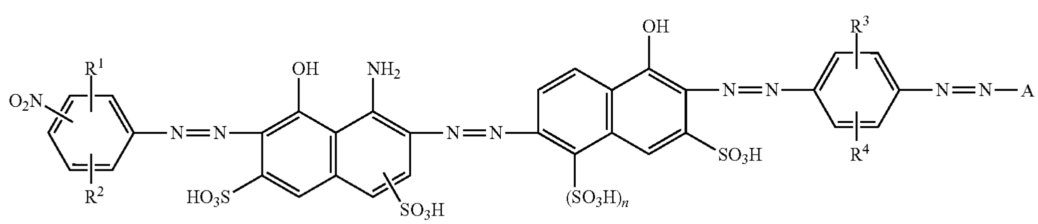

consisting of a hydroxy group, a sulfo group, and a carboxy group; a (C1-C4) alkylcarbonylamino group; a (C1-C4) alkylcarbonylamino group substituted with a hydroxy group or a carboxy group; an N'—(C1-C4) alkylureido group; an N'—(C1-C4) alkylureido group substituted with a hydroxy group, a sulfo group, or a carboxy group; a phenylamino group; a phenylamino group that has a benzene ring substituted with at least one group selected from the group consisting of a chlorine atom, a (C1-C4) alkyl group, a nitro group, a sulfo group, and a carboxy group; a benzoylamino group; a benzoylamino group that has a benzene ring substituted with at least one group selected from the group consisting of a chlorine atom, a (C1-C4) alkyl group, a nitro group, a sulfo group, and a carboxy group; a phenylsulfonylamino group; or a phenylsulfonylamino group that has a benzene ring substituted with at least one group selected from the group consisting of a chlorine atom, a (C1-C4) alkyl group, a nitro group, a sulfo group, and a carboxy group,

[in the formula (k1), $R^1$ and $R^2$ are independently a hydrogen atom; a halogen atom; a cyano group; a hydroxy group; a sulfo group; a carboxy group; a sulfamoyl group; a phospho group; a nitro group; a ureido group; a (C1-C4) alkyl group; a (C1-C4) alkoxy group; a (C1-C4) alkyl group substituted with a hydroxy group or a (C1-C4) alkoxy group; a (C1-C4) alkoxy group substituted with at least one group selected from the group consisting of a hydroxy group, a (C1-C4) alkoxy group, a sulfo group, and a carboxy group; an acyl group; an N-alkylaminosulfonyl group; an N-phenylaminosulfonyl group; an N-alkylaminosulfonyl group substituted with at least one or more groups selected from the group consisting of a sulfo group, a carboxy group, and a hydroxy group; an alkylsulfonyl group; an alkylsulfonyl group substituted with at least one or more groups selected from the group consisting of a sulfo group, a carboxy group, and a hydroxy group; an acylamino group; an alkylsulfonylamino group; a phenylsulfonylamino group; or a phenylsulfonylamino group substituted with at least one or more groups selected from the group consisting of a halogen atom, a (C1-C4) alkyl group, and a nitro group, $R^3$ and $R^4$ are independently a hydrogen atom; a halogen atom; a cyano group; a carboxy group; a sulfo group; a nitro group; a (C1-C4) alkyl group; a (C1-C4) alkyl group substituted with a hydroxy group or a (C1-C4) alkoxy group; a (C1-C4) alkoxy group; a (C1-C4) alkoxy group substituted with at least one group selected from the group consisting of a hydroxy group, a (C1-C4) alkoxy group, a sulfo group, and a carboxy group; a (C1-C4) alkylthio group; a (C1-C4) alkylthio group substituted with a sulfo group or a carboxy group; an acylamino group; an alkylsulfonylamino group; a phenylsulfonylamino group; or a phenylsulfonylamino group substituted with at least one group selected from the group consisting of a halogen atom, a (C1-C4) alkyl group, and a nitro group, A is a heterocyclic group represented by a formula (k2) below:

(k2)

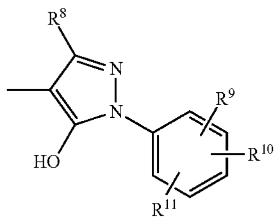

[in the formula (k2), $R^8$ is a carboxy group, and $R^9$, $R^{10}$, and $R^{11}$ are independently a hydrogen atom; a halogen atom; a cyano group; a carboxy group; a sulfo group; a nitro group; a (C1-C4) alkyl group; a (C1-C4) alkoxy group that is optionally substituted with a hydroxy group, a (C1-C4) alkoxy group, or a sulfo group; or an acylamino group that is optionally substituted with a hydroxy group, a (C1-C4) alkoxy group, or a sulfo group; provided that one of $R^9$, $R^{10}$, and $R^{11}$ is a sulfo group or a carboxy group], and n denotes 0 or 1]

(B-1)

(l1)

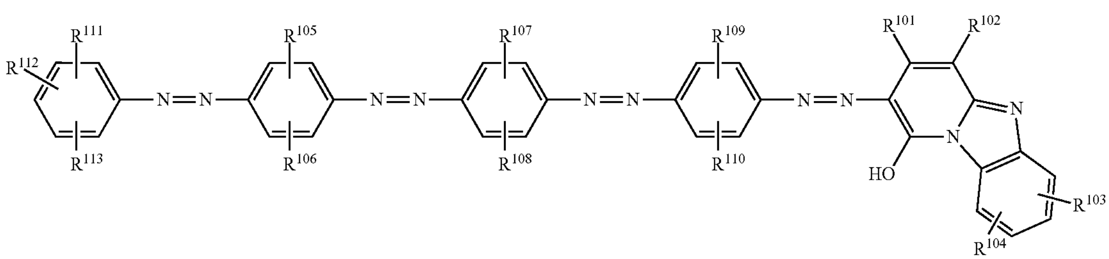

[in the formula (l1), $R^{101}$ is a (C1-C4) alkyl group; a (C1-C4) alkyl group substituted with a carboxy group; a phenyl group; a phenyl group substituted with a sulfo group; or a carboxy group, $R^{102}$ is a cyano group; a carbamoyl group; or a carboxy group, $R^{103}$ and $R^{104}$ are independently a hydrogen atom; a (C1-C4) alkyl group; a halogen atom; a (C1-C4) alkoxy group; or a sulfo group, each of $R^{105}$ and $R^{107}$ is a (C1-C4) alkylthio group; or a (C1-C4) alkylthio group substituted with at least one group selected from the group consisting of a hydroxy group, a sulfo group, and a carboxy group, each of $R^{106}$ and $R^{108}$ is an acylamino group, $R^{109}$ and $R^{110}$ are independently a hydrogen atom; a carboxy group; a sulfo group; a (C1-C4) alkylcarbonylamino group; an amino group; a halogen atom; a (C1-C4) alkyl group; a (C1-C4) alkoxy group; or a (C1-C4) alkoxy group substituted with at least one group selected from the group consisting of a hydroxy group, a (C1-C4) alkoxy group, a sulfo group, and a carboxy group, and $R^{111}$ to $R^{113}$ are independently a hydrogen atom; a carboxy group; a sulfo group; a hydroxy group; an acetylamino group; a halogen atom; a cyano group; a nitro group; a sulfamoyl group; a (C1-C4) alkyl group; a (C1-C4) alkoxy group; a (C1-C4) alkoxy group substituted with at least one group selected from the group consisting of a hydroxy group, a (C1-C4) alkoxy group, a sulfo group, and a carboxy group; an alkylsulfonyl group; or a (C1-C4) alkylsulfonyl group substituted with at least one group selected from the group consisting of a sulfo group, a carboxy group, and a hydroxy group]

(B-m)

(m1)

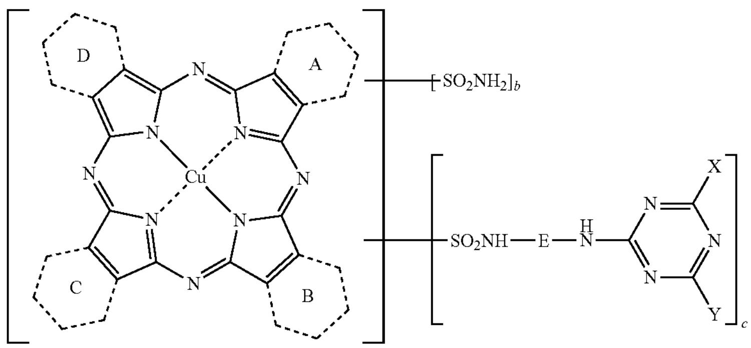

[in the formula (m1), the rings A to D are independently a benzene ring, or a 6-membered nitrogen-containing aromatic heterocycle that contains one or two nitrogen atoms, with the total number of the nitrogen-containing aromatic heterocycle being greater than 0 and not greater than 3.00 on average and the reminder being a benzene ring, E is an alkylene group, X is an anilino group or a naphthylamino group each having at least one substituent selected from the group consisting of a sulfo group, a carboxy group, and a phosphate group, the anilino group or the naphthylamino group being further and optionally substituted with one, two, or more substituents selected from the group consisting of a sulfo group, a carboxy group, a phosphate group, a sulfamoyl group, a carbamoyl group, a hydroxy group, an alkoxy group, an amino group, a mono- or dialkylamino group, a mono- or diarylamino group, an acetylamino group, a ureido group, an alkyl group, a nitro group, a cyano group, a halogen atom, an alkylsulfonyl group, and an alkylthio group, and Y is represented by a formula (m2), (m3), or (m4) below.

(m2)

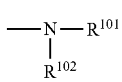

[in the formula (m2), $R^{101}$ and $R^{102}$ are independently a hydrogen atom; an alkyl group that is optionally substituted with a hydroxy group, a sulfo group, a carboxy group, or a phosphate group; a phenyl group that is optionally substituted with a hydroxy group, a sulfo group, a carboxy group, or a phosphate group; or a nitrogen-containing aromatic heterocyclic group that is optionally substituted with a hydroxy group, a sulfo group, a carboxy group, or a phosphate group;

provided that $R^{101}$—N—$R^{102}$ is optionally a cyclic alkyl group or an aromatic ring group, in which the cyclic alkyl group or the aromatic ring group optionally contains a nitrogen atom and/or an oxygen atom]

(m3)

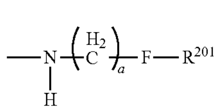

[in the formula (m3), $R^{201}$ is a hydrogen atom; a sulfo group; a carboxy group; a (C1-C6) alkoxy group; a (C1-C6) alkyl group; or a halogen atom, the group F is a phenylene group; or a pyridylene group (in this case, $R^{201}$ is a hydrogen atom), and a denotes an integer of 1 to 3]

$$—O—R^{301} \quad (m4)$$

[in the formula (m4), $R^{301}$ is a hydrogen atom or a (C1-C4) alkyl group]

b is not smaller than 0 and smaller than 3.90 on average, c is not smaller than 0.10 and smaller than 4.00 on average, and the sum of b and c is not smaller than 1.00 and smaller than 4.00 on average]

(B-n)

(n-1)

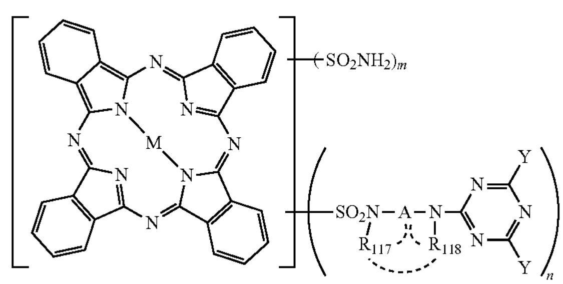

[in the formula (n1), M is a hydrogen atom, a metal atom, a metal oxide, a metal hydroxide, or a metal halide, $R^{117}$ and $R^{118}$ are independently a hydrogen atom, a substituted or unsubstituted alkyl group, a substituted or unsubstituted cycloalkyl group, a substituted or unsubstituted aralkyl group, a substituted or unsubstituted aryl group, a substituted or unsubstituted heterocyclic group, or a substituted or unsubstituted alkenyl group, A is a crosslinking group, adjacent $R^{117}$s, adjacent $R^{118}$s, and/or adjacent As are optionally linked to each other to form a ring, Y and Z are independently a halogen atom, a hydroxy group, a sulfo group, a carboxy group, an amino group, a substituted or unsubstituted alkoxy group, a substituted or unsubstituted cycloalkoxy group, a substituted or unsubstituted allyloxy group, a substituted or unsubstituted heterocyclic oxy group, a substituted or unsubstituted aralkyloxy group, a substituted or unsubstituted alkenyloxy group, a substituted or unsubstituted alkylamino group, a substituted or unsubstituted cycloalkylamino group, a substituted or unsubstituted arylamino group, a substituted or unsubstituted heterocyclic amino group, a substituted or unsubstituted aralkylamino group, a substituted or unsubstituted alkenylamino group, a substituted or unsubstituted dialkylamino group, a substituted or unsubstituted alkylthio group, a substituted or unsubstituted cycloalkylthio group, a substituted or unsubstituted arylthio group, a substituted or unsubstituted heterocyclic thio group, a substituted or unsubstituted aralkylthio group, or a substituted or unsubstituted alkenylthio group, provided that at least one of Y and Z has a sulfo group, a carboxy group, or an ionic hydrophilic group as a substituent, and each of m and n denotes 1 to 3, with the sum of m and n being 2 to 4]

(B-o)

(o1)

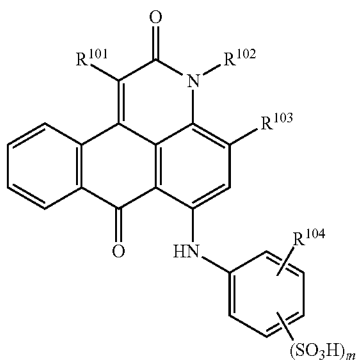

[in the formula (o1), m denotes 1 or 2, $R^{101}$ is a hydrogen atom; a benzoyl group; a benzoyl group substituted with at least one group selected from the group consisting of a halogen atom, a (C1-C4) alkyl group, a (C1-C4) alkoxy group, a sulfo group, and a carboxy group; a (C1-C4) alkoxycarbonyl group; a (C6-C10) aryloxycarbonyl group; or a (C6-C10) aryl (C1-C4) alkoxycarbonyl group, $R^{102}$ is a hydrogen atom; or a (C1-C4) alkyl group, $R^{103}$ is a hydrogen atom; or a group represented by a formula (o2) below:

(o2)

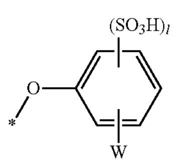

[in the formula (o2), l denotes an integer of 0 to 2,

W is a hydrogen atom; or a (C1-C12) alkyl group, and

* indicates the position of substitution],

[in the formula (o2), $R^{104}$ is a hydrogen atom; a (C1-C4) alkyl group; a halogen atom; a (C1-C4) alkoxy group; or a group represented by one of formulae (o3) to (o5) below:

(o3)

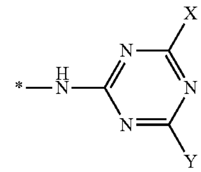

[in the formula (o3),

X and Y are independently a hydroxy group; an amino group; a halogen atom; a (C1-C4) alkylamino group; an alkylamino group substituted with at least one or more groups selected from the group consisting of a sulfo group, a carboxy group, and an amino group; a (C1-C4) alkoxy group; a (C1-C4) alkoxy group substituted with at least one group selected from the group consisting of a hydroxy group, a (C1-C4) alkoxy group, a sulfo group, and a carboxy group; an anilino group; an anilino group that is optionally substituted with at least one or more groups selected from the group consisting of a sulfo group, a carboxy group, a hydroxy group, a halogen atom, a (C1-C4) alkyl group, and a (C1-C4) alkoxy group; a phenoxy group; or a phenoxy group substituted with at least one or more groups selected from the group consisting of a sulfo group, a carboxy group, a hydroxy group, a halogen atom, a (C1-C4) alkyl group, and a (C1-C4) alkoxy group, and

* indicates the position of substitution]

(o4)

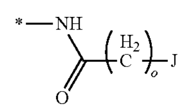

[in the formula (o4), o denotes an integer of 1 to 3,

J is an alkylamino group; an alkylamino group substituted with at least one group selected from the group consisting of a sulfo group, a carboxy group, a (C1-C4) alkoxy group, a carbamoyl group, a cyano group, an anilino group, an amino group, a phenoxy group, a hydroxy group, a phenyl group, and a mercapto group; an anilino group; an anilino group substituted with at least one group selected from the group consisting of a sulfo group, a carboxy group, a (C1-C4) alkyl group, a (C1-C4) alkoxy group, a carbamoyl group, a cyano group, an anilino group, an amino group, a phenoxy group, a hydroxy group, a phenyl group, and a mercapto group; an alkylthio group; an alkylthio group substituted with at least one group selected from the group consisting of a sulfo group, a carboxy group, a (C1-C4) alkoxy group, a carbamoyl group, a cyano group, an anilino group, an amino group, a phenoxy group, a hydroxy group, a phenyl group, and a mercapto group; a phenylthio group; a phenylthio group substituted with at least one group selected from the group consisting of a sulfo group, a carboxy group, a (C1-C4) alkyl group, a (C1-C4) alkoxy group, a carbamoyl group, a cyano group, an anilino group, an amino group, a phenoxy group, a hydroxy group, a phenyl group, and a mercapto group; a phenoxy group; a phenoxy group substituted with at least one group selected from the group consisting of a sulfo group, a carboxy group, a (C1-C4) alkyl group, a (C1-C4) alkoxy group, a carbamoyl group, a cyano group, an anilino group, an amino group, a phenoxy group, a hydroxy group, a phenyl group, and a mercapto group; or a mono- or dialkylaminoalkylamino group, and
* indicates the position of substitution]

(o5)

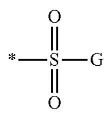

[in the formula (o5),
G is a (C1-C12) alkyl group; a (C1-C12) alkyl group substituted with at least one group selected from the group consisting of an aryl group, a heterocyclic group, a sulfo group, a carboxy group, a (C1-C4) alkoxycarbonyl group, an acyl group, a carbamoyl group, a cyano group, a (C1-C4) alkoxy group, a phenyl (C1-C4) alkoxy group, a phenoxy group, a hydroxy group, and a nitro group; an aryl group; an aryl group substituted with at least one group selected from the group consisting of a halogen atom, a cyano group, a hydroxy group, a sulfo group, a (C1-C4) alkyl group, a carboxy group, a (C1-C4) alkoxycarbonyl group, a carbamoyl group, a (C1-C4) alkoxy group, a phenoxy group, and a nitro group; a heterocyclic group; or a heterocyclic group substituted with at least one group selected from the group consisting of a halogen atom, a cyano group, a hydroxy group, a sulfo group, a (C1-C4) alkyl group, a carboxy group, a (C1-C4) alkoxycarbonyl group, a carbamoyl group, a (C1-C4) alkoxy group, a phenoxy group, and a nitro group, and
* indicates the position of substitution]]

$R^{101}$ is a hydrogen atom; a benzoyl group; a benzoyl group substituted with at least one group selected from the group consisting of a halogen atom, a (C1-C4) alkyl group, a (C1-C4) alkoxy group, a sulfo group, and a carboxy group; a (C1-C4) alkoxycarbonyl group; a (C6-C10) aryloxycarbonyl group; or a (C6-C10) aryl (C1-C4) alkoxycarbonyl group,
$R^{102}$ is a hydrogen atom; or a (C1-C4) alkyl group,
X is a divalent crosslinking group containing a nitrogen atom, and
Y is a halogen atom; a hydroxy group; an amino group; a mono- or dialkylamino group; a sulfo group, a carboxy group, a mono- or dialkylamino group; an aralkylamino group; a cycloalkylamino group; a (C1-C4) alkoxy group; a phenoxy group; a phenoxy group substituted with at least one group selected from the group consisting of a sulfo group, a carboxy group, an acetylamino group, an amino group, and a hydroxy group; an anilino group; an anilino group substituted with a sulfo group and/or a carboxy group; a naphthylamino group; a naphthylamino group substituted with a sulfo group and/or a carboxy group; a naphthyloxy group; a naphthyloxy group substituted with a sulfo group and/or a carboxy group; a (C1-C4) alkylthio group; a (C1-C4) alkylthio group substituted with a sulfo group or a carboxy group; a phenylthio group; a phenylthio group substituted with at least one group selected from the group consisting of a sulfo group, a carboxy group, a (C1-C4) alkyl group, a (C1-C4) alkoxy group, a carbamoyl group, a cyano group, an anilino group, an amino group, a phenoxy group, (B-p)

(p1)

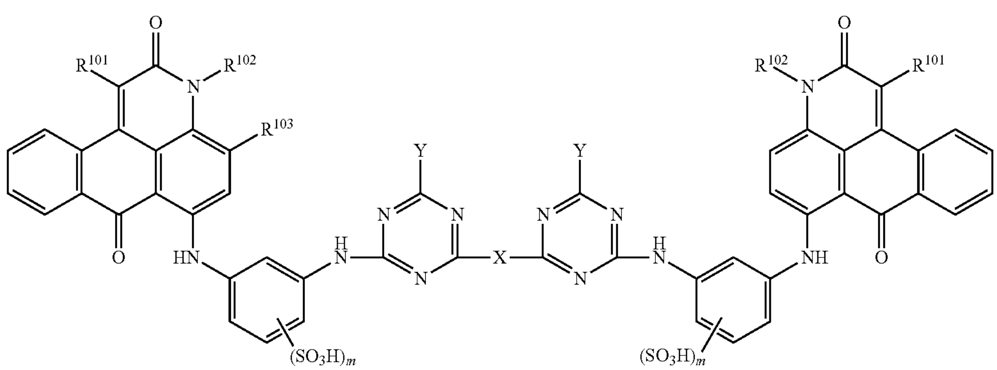

[in the formula (p1),
m denotes 1 or 2, a hydroxy group, a phenyl group, and a mercapto group; or a mono- or dialkylaminoalkylamino group]

(B-q)

(q1)

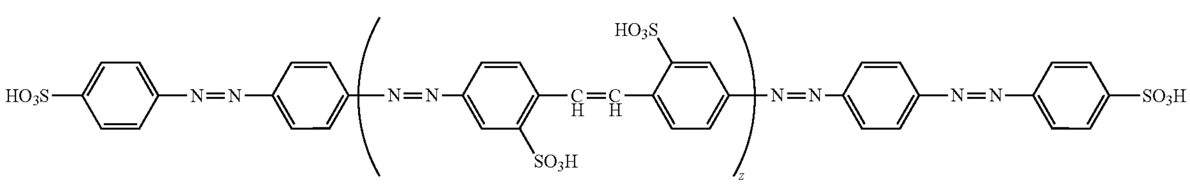

[in the formula (q1), z denotes an integer of 1 to 3]

(B-r)

C. I. Direct Yellow 86

(B-s)

C. I. Direct Yellow 132

(B-t)

C. I. Direct Yellow 142.

[Component (A)]

A second aspect of the present invention provides:

the ink composition as described in the first aspect, in which, in the formula (1), five or more among $R^1$ to $R^7$ are water-soluble substituents.

A third aspect of the present invention provides:

the ink composition as described in the first aspect or the second aspect, in which, in the formula (1), at least three or more among $R^1$ to $R^7$ are each a sulfo group or a carboxy group. A forth aspect of the present invention provides:

the ink composition as described in any one of the first aspect to the third aspect, in which, in the formula (1), $R^1$ and $R^2$ are independently a hydrogen atom; a sulfo group; a carboxy group; or a hydroxy group, $R^3$ and $R^4$ are independently a hydrogen atom; a halogen atom; a carboxy group; a sulfo group; a (C1-C4) alkoxy group substituted with a sulfo group or a carboxy group; or a (C1-C4) alkylthio group substituted with a sulfo group or a carboxy group, $R^5$ to $R^7$ are independently a hydrogen atom; a halogen atom; a sulfo group; a carboxy group; a hydroxy group; or a (C1-C4) alkoxy group, and n denotes 1.

A fifth aspect of the present invention provides:

the ink composition as described in any one of the first aspect to the fourth aspect, in which in the (1), $R^1$ is a carboxy group or a sulfo group, $R^2$ is a hydrogen atom, $R^3$ is a sulfo group, $R^4$ is a hydrogen atom, $R^5$ is a hydrogen atom, a carboxy group, or a sulfo group, $R^6$ is a carboxy group or a sulfo group, $R^7$ is a hydrogen atom, and n denotes 1.

a) [Component (B-a)]

a1)

Provided is the ink composition as described in any one of the first aspect to the fifth aspect, in which, in the formula (a1), X is an aliphatic amino group substituted with a sulfo group or a carboxy group.

a2)

Provided is the ink composition as described in any one of the first aspect to the fifth aspect and a1), in which, in the formula (a1), each of $R^{101}$ and $R^{102}$ is a methyl group, and X is a sulfoethylamino group.

b) [Component (B-b)]

b1)

Provided is the ink composition as described in any one of the first aspect to the fifth aspect, in which, in the formula (b1), X is an aliphatic diamine (each of A and B as a substituent is attached to a different nitrogen atom of the aliphatic diamine).

b2)

Provided is the ink composition as described in any one of the first aspect to the fifth aspect, in which, in the formula (b1), X is a (C1-C8) alkylenediamino group; a (C1-C8) alkylenediamino group substituted with a hydroxy group or a carboxy group; an N—(C1-C4) alkyl-(C1-C6) alkylenediamino group; an N—(C1-C4) alkyl-(C1-C6) alkylenediamino group with the alkyl moiety substituted with a hydroxy group or a carboxy group; an amino (C1-C6) alkoxy (C1-C6) alkylamino group; an amino (C1-C4) alkoxy (C1-C4) alkoxy (C1-C4) alkylamino group; a xylylenediamine group; a piperazine-1,4-diyl group; a piperazine-1,4-diyl group substituted with a (C1-C4) alkyl group or a (C1-C4) alkoxy group; or a phenylenediamino group.

b3)

Provided is the ink composition as described in any one of the first aspect to the fifth aspect, b1), and b2), in which, in the formulae (b2) and (b3), $R^{101}$ to $R^{108}$ are independently a hydrogen atom; a halogen atom; a (C1-C4) alkyl group; a (C1-C4) alkoxy group; a (C1-C4) alkoxy group substituted with a sulfo group or a carboxy group; or a (C1-C4) alkylcarbonylamino group.

c) [Component (B-c)]

c1)

Provided is the ink composition as described in any one of the first aspect to the fifth aspect, in which, in the formula (c1), Q is a chlorine atom, and x denotes 3.

c2)

Provided is the ink composition as described in any one of the first aspect to the fifth aspect and c1), in which, in the formula (c2), y denotes 2.

e) [Component (B-e)]

e1)

Provided is the ink composition as described in any one of the first aspect to the fifth aspect, in which, in the formula (e1), $R^{101}$ and $R^{102}$ are independently a hydrogen atom; a (C1-C4) alkyl group; (except for the case where both $R^{101}$ and $R^{102}$ are independently a hydrogen atom), and each of m and n denotes 1.

e2)

Provided is the ink composition as described in any one of the first aspect to the fifth aspect and e1), in which, in the formula (e1), $R^{101}$ is a (C1-C4) alkyl group, $R^{102}$ is a hydrogen atom, and each of m and n denotes 1.

e3)

Provided is the ink composition as described in any one of the first aspect to the fifth aspect and e1), in which, in the formula (e1), $R^{101}$ is a hydrogen atom, $R^{102}$ is a (C1-C4) alkyl group, and each of m and n denotes 1.

f) [Component (B-f)]

f1)

Provided is the ink composition as described in any one of the first aspect to the fifth aspect, in which the compound represented by the formula (f1) is a compound represented by a formula (f2) below:

(f2)

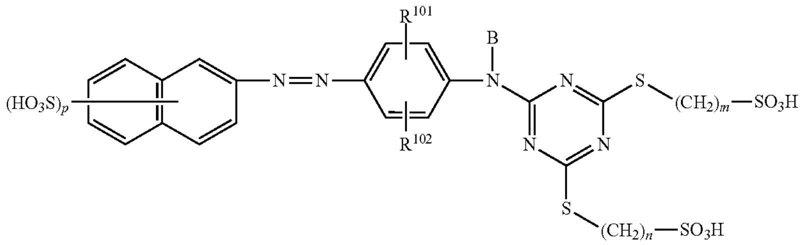

[in the formula (f2), $R^{101}$ and $R^{102}$ are independently a hydrogen atom; a (C1-C4) alkyl group; a (C1-C4) alkoxy group; or a ureido group, m and n independently denote an integer of 2 to 6, and p denotes an integer of 1 to 3].

f2)

Provided is the ink composition as described in f1), in which, in the formula (f2), B is a hydrogen atom, and as for the position on the naphthalene ring, when the azo group is attached to the 2-position, the sulfo group or groups as a substituent is attached to the 1-position; the 4-position; the 5-position; the 6-position; the 7-position; the 8-position; the 4-position and the 8-position; the 5-position and the 7-position; the 6-position and the 8-position; the 1-position and the 5-position; the 3-position, the 6-position, and the 8-position; or the 4-position, the 6-position, and the 8-position.

g) [Component (B-g)]

g1)

Provided is the ink composition as described in any one of the first aspect to the fifth aspect, in which the compound represented by the formula (g1) is a coloring matter represented by a formula (g2) below:

g3)

Provided is the ink composition as described in g1) or g2), in which, in the formula (g2), each substituent on A and D is a halogen atom; a hydroxy group; an amino group; a nitro group; a (C1-C4) alkyl group; a (C1-C4) alkoxy group; an acyl group; a phenyl group; a ureido group; a (C1-C4) alkyl group substituted with at least one or more groups selected from the group consisting of a hydroxy group, a (C1-C4) alkoxy group, a sulfo group, and a carboxy group; a (C1-C4) alkoxy group substituted with at least one or more groups selected from the group consisting of a hydroxy group, a (C1-C4) alkoxy group, a sulfo group, and a carboxy group; or an amino group that is substituted with a phenyl group optionally substituted with a carboxy group or a sulfo group, a (C1-C4) alkyl group, or an acyl group.

g4)

Provided is the ink composition as described in g1) to g3), in which, in the formula (g2), A and D are independently a phenyl group that has a sulfo group on an o-position relative to the azo group and is further and optionally substituted with a nitro group, a (C1-C4) alkoxy group, or a sulfo group.

(g2)

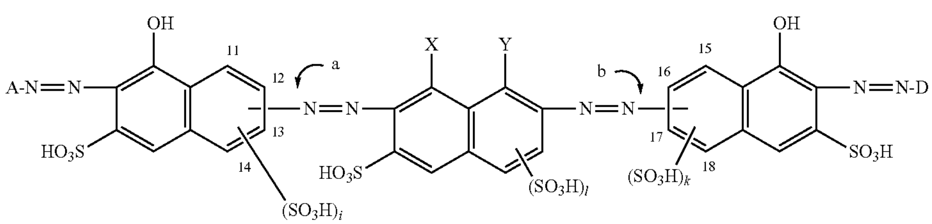

[in the formula (g2),

A and D are the same as defined in the formula (g1), the numbers 12, 13, 16, and 17 indicate positions of substitution to which the azo groups attach, each of a and b is a single bond, the bond a being bonded to the 12-position or the 13-position and the bond b being bonded to the 16-position or the 17-position, one of X and Y is a hydroxy group and the other is an amino group, and i, l, and k are independently 0 or 1].

g2)

Provided is the ink composition as described in g1), in which in formula (g2),

A and D are independently a phenyl group or a naphthyl group each substituted with a carboxy group and/or a sulfo group.

g5)

Provided is the ink composition as described in any one of the first aspect to the fifth aspect and g1) to g4), further containing (C) at least one or more coloring matters each of which has the maximum absorbance at a wavelength within the range from 350 nm to 550 nm.

g6)

Provided is the ink composition as described in any one of the first aspect to the fifth aspect and g1) to g4), further containing the component (B-a) and/or the component (B-q) as the component (C).

g7)

Provided is the ink composition as described in any one of the first aspect to the fifth aspect and g1) to g4), further containing the component (B-a), the component (B-b), and/or the component (B-q) as the component (C).

g8)

Provided is the ink composition as described in g6) or g7), in which the component (B-a) is the compound of a1).

g9)

Provided is the ink composition as described in g6) or g7), in which the component (B-a) is the compound of a2).

g10)

Provided is the ink composition as described in g7) to g9), in which the component (B-b) is the compound of b1).

g11)

Provided is the ink composition as described in g7) to g9), in which the component (B-b) is the compound of b2).

g12)

Provided is the ink composition as described in any one of g7) to g11), in which the component (B-b) is the compound of b4).

h) [Component (B-h)]

h1)

Provided is the ink composition as described in any one of the first aspect to the fifth aspect and g1) to g4), in which, in the formula (h1), one of $R^{201}$ to $R^{203}$ is a carboxy group or a sulfo group, and the other two are independently a hydrogen atom, $R^{204}$ is a phenyl group, $R^{205}$ is a (C1-C4) alkoxy group substituted with a sulfo group, and $R^{206}$ is a (C1-C4) alkyl group.

h2)

Provided is the ink composition as described in any one of the first aspect to the fifth aspect, g1) to g4), and h1), in which, in the formula (h1), I is attached to the 3-position, J is attached to the 7-position, p denotes 0, q denotes 1, and the $(SO_3H)_q$ group is attached to the 8-position.

h3)

Provided is the ink composition as described in the first aspect to the fifth aspect, h1), and h2), further containing (C) at least one or more coloring matters each of which has the maximum absorbance at a wavelength within the range from 350 nm to 550 nm.

h4)

Provided is the ink composition as described in the first aspect to the fifth aspect, h1), and h2), further containing the component (B-a) and/or the component (B-q) as the component (C).

h5)

Provided is the ink composition as described in any one of the first aspect to the fifth aspect, h1), and h2), further containing the component (B-a), the component (B-b), and/or the component (B-q) as the component (C).

h6)

Provided is the ink composition as described in h4) or h5), in which the component (B-a) is the compound of a1).

h7)

Provided is the ink composition as described in h4) or h5), in which the component (B-a) is the compound of a2).

h8)

Provided is the ink composition as described in h5) to h7), in which the component (B-b) is the compound of b1).

h9)

Provided is the ink composition as described in h5) to h7), in which the component (B-b) is the compound of b2).

h10)

Provided is the ink composition as described in any one of h5) or h9), in which the component (B-b) is the compound of b4).

i) [Component (B-i)]

i1)

Provided is the ink composition as described in any one of the first aspect to the fifth aspect, in which, in the formula (i1), a substituent on A is a sulfo group; or a carboxy group, and at least one substituent on B and C is a sulfo group; or a sulfopropoxy group.

i2)

Provided is the ink composition as described in any one of the first aspect to the fifth aspect and i1), in which, in the formula (i1), B and C is a group represented by a formula (i2) below:

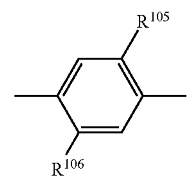

(i2)

[in the formula (i2), $R^{105}$ is a sulfo group; or a sulfopropoxy group, and $R^{106}$ is a hydrogen atom; a methyl group; an ethyl group; a methoxy group; or an ethoxy group].

i3)

Provided is the ink composition as described in any one of the first aspect to the fifth aspect, i1), and i2), in which, in the formula (i1), a substituent on A is a sulfo group; or a carboxy group, $R^{101}$ is a methyl group, $R^{102}$ is a cyano group; or a carbamoyl group, $R^{103}$ is a hydrogen atom, $R^{104}$ is a sulfo group, each of B and C is represented by the formula (i2), $R^{105}$ is a sulfo group; or a sulfopropoxy group, and $R^{106}$ is a hydrogen atom; or a methyl group.

i4)

Provided is the ink composition as described in any one of the first aspect to the fifth aspect and i1) to i3), in which, in the formula (i1), a substituent on A is a sulfo group and is attached to the p-position relative to the azo group, $R^{101}$ is a methyl group, $R^{102}$ is a cyano group; or a carbamoyl group, $R^{103}$ is a hydrogen atom, $R^{104}$ is a sulfo group, each of B and C is represented by the formula (i2), $R^{105}$ in B is a sulfopropoxy group; $R^{106}$ is a hydrogen atom; or a methyl group, and $R^{105}$ in is C is a sulfopropoxy group; $R^{106}$ is a methyl group.

i5)

Provided is the ink composition as described in the first aspect to the fifth aspect and i1) to i4), further containing (C) at least one coloring matter that has the maximum absorbance at a wavelength within the range from 350 nm to 550 nm.

i6)

Provided is the ink composition as described in any one of the first aspect to the fifth aspect and i1) to i4), further containing the component (B-a) and/or the component (B-q) as the component (C).

i7)

Provided is the ink composition as described in any one of the first aspect to the fifth aspect and i1) to i4), further containing the component (B-a), the component (B-b), and/or the component (B-q) as the component (C).

i8)

Provided is the ink composition as described in i6) or i7), in which the component (B-a) is the compound of a1).

i9)

Provided is the ink composition as described in i6) or i7), in which the component (B-a) is the compound of a2).

i10)

Provided is the ink composition as described in i7) to i9), in which the component (B-b) is the compound of b1).

i11)

Provided is the ink composition as described in i7) to i9), in which the component (B-b) is the compound of b2).

i12)

Provided is the ink composition as described in any one of i7) or i11), in which the component (B-b) is the compound of b4).

j) [Component (B-j)]

j1)

Provided is the ink composition as described in any one of the first aspect to the fifth aspect, in which, in the formula (j1)

B is a phenyl group that is optionally substituted, with a hydroxy group, a sulfo group, or a carboxy group.

j2)

Provided is the ink composition as described in any one of the first aspect to the fifth aspect and j1), in which, in the formula (j1), $R^{101}$ is an unsubstituted (C1-C4) alkyl group; or a carboxy group, $R^{102}$ is a sulfo (C1-C4) alkoxy group, $R^{103}$ is a hydrogen atom, and $R^{104}$ is a hydrogen atom; a methyl group; or an ethyl group.

j3)

Provided is the ink composition as described in any one of the first aspect to the fifth aspect, j1), and j2), in which, in the formula (j1), $R^{101}$ is a methyl group; or a carboxy group, and $R^{105}$ to $R^{107}$ are independently a hydrogen atom; a chlorine atom; a carboxy group; a sulfo group; a nitro group; a (C1-C4) alkyl group; a (C1-C4) alkoxy group; or a (C1-C4) alkylsulfonyl group.

j4)

Provided is the ink composition as described in any one of the first aspect to the fifth aspect and j1) to j3), in which, in the formula (j1), m denotes 1, $R^{101}$ is a carboxy group, $R^{102}$ is a sulfopropoxy group, $R^{103}$ is a hydrogen atom, $R^{104}$ is a methyl group, $R^{105}$ to $R^{107}$ are independently a hydrogen atom; a chlorine atom; a carboxy group; a sulfo group; a nitro group; a methyl group; a methoxy group; or a methylsulfonyl group, and the group B is a phenyl group that is optionally substituted with a sulfo group or a carboxy group.

j5)

Provided is the ink composition as described in any one of the first aspect to the fifth aspect and j1) to j4), further containing (C) at least one or more coloring matters each of which has the maximum absorbance at a wavelength within the range from 350 nm to 550 nm.

j6)

Provided is the ink composition as described in any one of the first aspect to the fifth aspect and j1) to j4), further containing the component (B-a), the component (B-b), and/or the component (B-q) as the component (C).

j7)

Provided is the ink composition as described in j6), in which the component (B-a) is the compound of a1).

j8)

Provided is the ink composition as described in j6), in which the component (B-a) is the compound of a2).

j9)

Provided is the ink composition as described in j6) to j8), in which the component (B-b) is the compound of b1).

j10)

Provided is the ink composition as described in j6) to j8), in which the component (B-b) is the compound of b2).

j11)

Provided is the ink composition as described in any one of j6) to j10), in which the component (B-b) is the compound of b4).

k) [Component (B-k)]

k1)

Provided is the ink composition as described in any one of the first aspect to the fifth aspect, in which, in the formula (k1), $R^1$ and $R^2$ are independently a hydrogen atom; a sulfo group; a carboxy group; or a hydroxy group, $R^3$ and $R^4$ are independently a hydrogen atom; a halogen atom; a carboxy group; a sulfo group; a (C1-C4) alkoxy group substituted with a sulfo group or a carboxy group; or a (C1-C4) alkylthio group substituted with a sulfo group or a carboxy group, $R^9$ is a hydrogen atom; a halogen atom; or a (C1-C4) alkyl group, $R^{10}$ is a carboxy group; or a sulfo group, $R^{11}$ is a hydrogen atom; a halogen atom; a carboxy group; or a sulfo group, and n denotes 1.

k2)

Provided is the ink composition as described in any one of the first aspect to the fifth aspect and k1), in which, in the formula (k1), $R^1$ is a carboxy group; or a sulfo group, $R^2$ is a hydrogen atom, $R^3$ is a sulfo group, $R^4$ is a hydrogen atom, $R^8$ is a carboxy group, $R^9$ is a carboxy group; or a sulfo group, $R^{10}$ is a hydrogen atom; a carboxy group; or a sulfo group, $R^{11}$ is a hydrogen atom, and k3)

Provided is, the ink composition as described in any one of the first aspect to the fifth aspect, k1), and k2), further containing the component (B-j) as the component (C).

k4)

Provided is the ink composition as described in k3), in which the component (B-j) is the compound of j1).

k5)

Provided is the ink composition as described in k3) or k4), in which the component (B-j) is the compound of j2).

k6)

Provided is the ink composition as described in any one of k4) to k5), in which the component (B-j) is the compound of j3).

k7)

Provided is the ink composition as described in k3), in which the component (B-j) is the compound of j4).

k8)
Provided is the ink composition as described in any one of the first aspect to the fifth aspect and k1) to k7), further containing (C) at least one coloring matter that has the maximum absorbance at a wavelength within the range from 350 nm to 550 nm.
k9)
Provided is the ink composition as described in any one of the first aspect to the fifth aspect and k1) to k8), further containing the component (B-b) and/or the component (B-q) as the component (C).
k10)
Provided is the ink composition as described in k9), in which the component (B-b) is the compound of b1).
k11)
Provided is the ink composition as described in k9), in which the component (B-b) is the compound of b2).
k12)
Provided is the ink composition as described in any one of k9) to k11), in which the component (B-b) is the compound of b4).
l) [Component (B-l)]
l1)
Provided is the ink composition as described in any one of the first aspect to the fifth aspect, in which the compound represented by the formula (l1) is an azo compound represented by a formula (l2) below or a tautomer thereof, or a salt of any of these:

$R^{101}$ is a methyl group or a phenyl group,
$R^{102}$ is a cyano group or a carbamoyl group,
$R^{103}$ is a hydrogen atom, a methyl group, or a methoxy group,
$R^{104}$ is a sulfo group,
$R^{105}$ is a (C1-C4) alkylthio group substituted with a sulfo group or a carboxy group,
$R^{106}$ is a (C1-C4) alkylcarbonylamino group,
$R^{107}$ is a (C1-C4) alkylthio group substituted with a sulfo group or a carboxy group,
$R^{108}$ is a (C1-C4) alkylcarbonylamino group,
$R^{109}$ is a sulfo (C1-C4) alkoxy group,
$R^{110}$ is a (C1-C4) alkyl group or an acetylamino group, and
$R^{111}$ to $R^{113}$ are independently a hydrogen atom; a carboxy group; a sulfo group; a chlorine atom; a nitro group; a methyl group; a methoxy group; a sulfamoyl group; or a (C1-C4) alkylsulfonyl group substituted with a sulfo group or a carboxy group.
l6)
Provided is the ink composition as described in any one of the first aspect to the fifth aspect and l1), in which, in the formula (l1) or (l2),
$R^{101}$ is a methyl group or a phenyl group,
$R^{102}$ is a cyano group or a carbamoyl group,
$R^{103}$ is a hydrogen atom, a methyl group, or a methoxy group,
$R^{104}$ is a sulfo group, (l2)

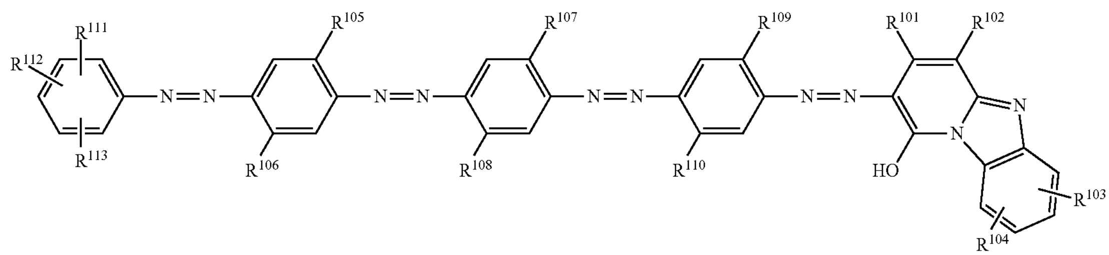

[in the formula (l2),
$R^{101}$ to $R^{113}$ are the same as defined in the formula (l1)].
l2)
Provided is the ink composition as described in any one of the first aspect to the fifth aspect and l1), in which, in the formula (l1) or (l2), at least one of $R^{111}$ to $R^{113}$ is a sulfo group; a (C1-C4) alkylthio group substituted with a sulfo group or a carboxy group; or a sulfo (C1-C4) alkoxy group.
l3)
Provided is the ink composition as described in any one of the first aspect to the fifth aspect, l1), and l2), in which, in the formula (l1) or (l2), each of $R^{105}$ and $R^{107}$ is a (C1-C4) alkylthio group substituted with a sulfo group or a carboxy group, and $R^{109}$ is a sulfo (C1-C4) alkoxy group.
l4)
Provided is the ink composition as described in any one of the first aspect to the fifth aspect and l1) to l3), in which, in the formula (l1) or (l2),
$R^{101}$ is a methyl group or a phenyl group,
$R^{102}$ is a cyano group or a carbamoyl group,
$R^{103}$ is a hydrogen atom, a methyl group, or a methoxy group, and
$R^{104}$ is a sulfo group.
l5)
Provided is the ink composition as described in any one of the first aspect to the fifth aspect and l1), in which, in the formula (l1) or (l2), $R^{105}$ is a sulfo (C1-C4) alkylthio group,
$R^{106}$ is a (C1-C4) alkylcarbonylamino group,
$R^{107}$ is a sulfo (C1-C4) alkylthio group,
$R^{108}$ is a (C1-C4) alkylcarbonylamino group,
$R^{109}$ is a sulfo (C1-C4) alkoxy group,
$R^{110}$ is a (C1-C4) alkyl group or an acetylamino group, and
$R^{111}$ to $R^{113}$ are independently a hydrogen atom; a carboxy group; a sulfo group; a chlorine atom; a nitro group; a methyl group; a methoxy group; or a sulfamoyl group.
l7)
Provided is the ink composition as described in any one of the first aspect to the fifth aspect and l1), in which, in the formula (l1) or (l2),
$R^{101}$ is a methyl group or a phenyl group,
$R^{102}$ is a cyano group or a carbamoyl group,
$R^{103}$ is a hydrogen atom, a methyl group, or a methoxy group,
$R^{104}$ is a sulfo group,
$R^{105}$ is a sulfo (C1-C4) alkylthio group,
$R^{106}$ is a (C1-C4) alkylcarbonylamino group,
$R^{107}$ is a sulfo (C1-C4) alkylthio group,
$R^{108}$ is a (C1-C4) alkylcarbonylamino group,
$R^{109}$ is a sulfopropoxy group or a sulfobutoxy group,
$R^{110}$ is a (C1-C4) alkyl group,
$R^{111}$ is a hydrogen atom or a sulfo group, $R^{112}$ is a sulfo group or a chlorine atom, and $R^{113}$ is a hydrogen atom or a sulfo group.

l8)

Provided is the ink composition as described in any one of the first aspect to the fifth aspect and l1) to l7), further containing (C) at least one coloring matter that has the maximum absorbance at a wavelength within the range from 350 nm to 550 nm.

l9)

Provided is the ink composition as described in any one of the first aspect to the fifth aspect and l1) to l8), further containing the component (B-a) and/or the component (B-q) as the component (C).

l10)

Provided is the ink composition as described in any one of the first aspect to the fifth aspect and l1) to l8), further containing the component (B-a), the component (B-b), and/or the component (B-q) as the component (C).

l11)

Provided is the ink composition as described in l9) or l10), in which the component (B-a) is the compound of a1).

l12)

Provided is the ink composition as described in l9) or l10), in which the component (B-a) is the compound of a2).

l13)

Provided is the ink composition as described in l9) to l12), in which the component (B-b) is the compound of b1).

l14)

Provided is the ink composition as described in l9) to l12), in which the component (B-b) is the compound of b2).

l15)

Provided is the ink composition as described in any one of l9) to l14), in which the component (B-b) is the compound of b4).

m) [Component (B-m)]

m1)

Provided is the ink composition as described in any one of the first aspect to the fifth aspect, in which, in the formula (m1), each of the nitrogen-containing aromatic heterocycles shown as the rings A to D is a pyridine ring or a pyrazine ring.

m2)

Provided is the ink composition as described in any one of the first aspect to the fifth aspect and m1), in which the formula (m1) represents a coloring matter obtained from a reaction of a porphyrazine compound represented by a formula (m5) below and an organic amine represented by a formula (m6) below in the presence of ammonia:

(m5)

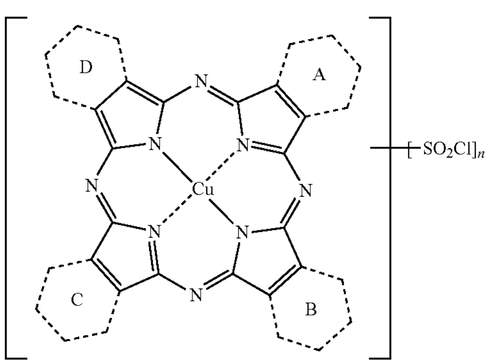

[in the formula (m5), the rings A to D are the same as defined in the first aspect, and n denotes 1 to 4]

(m6)

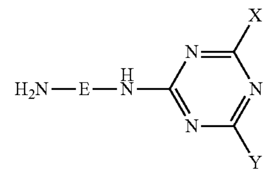

[in the formula (m6),

E, X, and Y are the same as defined in the first aspect].

m3)

Provided is the ink composition as described in any one of the first aspect to the fifth aspect, m1), and m2), in which one to three of the rings A to D is (are) a pyridine ring or a pyrazine ring, E is a (C2-C4) alkylene group, X is an anilino group or a naphthylamino group each having, as a substituent, at least one group selected from the group consisting of a sulfo group and a carboxy group, the substituted anilino group and the substituted naphthylamino group further and optionally having zero to three substituents of one, two, or more kinds selected from the group consisting of a sulfo group, a carboxy group, a phosphate group, a hydroxy group, an alkoxy group, a ureido group, an acetylamino group, a nitro group, and a chlorine atom, when Y is represented by the formula (m2), $R^{101}$ is a hydrogen atom, and $R^{102}$ is an alkyl group or a phenyl group each of which is optionally substituted with a hydroxy group, a sulfo group, a carboxy group or a phosphate group, when Y is represented by the formula (m3), $R^{201}$ is a hydrogen atom; a sulfo group; a carboxy group; a (C1-C6) alkoxy group; a (C1-C6) alkyl group; or a chlorine atom, the group F is a phenyl group, and a denotes 1 or 2, and when Y is represented by the formula (m4), $R^{301}$ is a hydrogen atom; or an alkyl group, and b denotes 0 to 3.9, c denotes 0.1 to smaller than 4.0, and the sum of b and c is 1.0 to 4.0.

m4)

Provided is the ink composition as described in any one of the first aspect to the fifth aspect and m1) to m3), in which E is ethylene or propylene, X is a sulfo-substituted anilino group; a carboxy-substituted anilino group; or a sulfo-substituted naphthylamino group, when Y is represented by the formula (m2), $R^{101}$ is a hydrogen atom, and $R^{102}$ is an alkyl group or a phenyl group each optionally substituted with a sulfo group or a carboxy group, or is a hydrogen atom, when Y is represented by the formula (m3), $R^{201}$ is a hydrogen atom; a sulfo group; or a carboxy group, the group F is a phenyl group, and a denotes 1 or 2, and when Y is represented by the formula (m4), $R^{301}$ is a hydrogen atom, a methyl group, or an ethyl group.

m5)

Provided is the ink composition as described in any one of the first aspect to the fifth aspect and m1) to m4), in which the ring A is a pyridine ring formed by condensation at the 2-position and the 3-position or at the 3-position and the 4-position, or a pyrazine ring formed by condensation at the 2-position and the 3-position, the ring B is a pyridine ring formed by condensation at the 2-position and the 3-position or at the 3-position and the 4-position, a pyrazine ring formed by condensation at the 2-position and the 3-position, or a benzene ring, the ring C is a pyridine ring formed by condensation at the 2-position and the 3-position or at the 3-position and the 4-position, a pyrazine ring formed by condensation at the 2-position and the 3-position, or a benzene ring, the ring D is a benzene ring, E is a (C2-C4) alkylene, and X is an anilino group or a naphthylamino group each of which has one to three substituents selected from the group consisting of a sulfo group, a carboxy group, a methoxy group, a nitro group, a chlorine atom, and a hydroxy group.

m6)

Provided is the ink composition as described in any one of the first aspect to the fifth aspect and m1) to m5), further containing (C) at least one or more coloring matters each of which has the maximum absorbance at a wavelength within the range from 350 nm to 550 nm.

m7)

Provided is the ink composition as described in any one of the first aspect to the fifth aspect and m1) to m5), further containing, as the component (C), a coloring matter that contains one or more kinds of the component (B-a), the component (B-b), and the component (B-q).

m8)

Provided is the ink composition as described in m7), in which the component (B-a) is the compound of a1).

m9)

Provided is the ink composition as described in m7), in which the component (B-a) is the compound of a2).

m10)

Provided is the ink composition as described in m7) to m9), in which the component (B-b) is the compound of b1).

m11)

Provided is the ink composition as described in m7) to m9), in which the component (B-b) is the compound of b2).

m12)

Provided is the ink composition as described in m7) to m11), in which the component (B-b) is the compound of b4).

n) [Component (B-n)]

n1)

Provided is the ink composition as described in any one of the first aspect to the fifth aspect, in which, in the formula (n1), A is an alkylene group, an arylene group, or a xylylene group, Y and Z are independently a chlorine atom, a hydroxy group, a sulfo group, a carboxy group, an amino group, an alkoxy group (that is optionally substituted with a substituent selected from the group consisting of a sulfo group, a carboxy group, a hydroxy group, a dialkylamino group, an arylamino group, an acetylamino group, an alkoxy group, an aryl group, a cyano group, and a halogen atom), a phenoxy group (that is optionally substituted with one, two, or more substituents selected from the group consisting of a sulfo group, a carboxy group, a ureido group, an alkyl group, and an alkoxy group), a naphthoxy group (that is optionally substituted with one, two, or more substituents selected from the group consisting of a sulfo group and an acetylamino group), a benzyloxy group (that is optionally substituted with a sulfo group), a phenethyloxy group (that is optionally substituted with a sulfo group), an alkylamino group (that is optionally substituted with one, two, or more substituents selected from the group consisting of a sulfo group, a carboxy group, a hydroxy group, an alkoxy group, a dialkylamino group, an arylamino group, an aryl group, a halogen atom, and a cyano group), an anilino group (that is optionally substituted with one, two, or more substituents selected from the group consisting of a sulfo group, a carboxy group, a hydroxy group, a dialkylamino group, an arylamino group, an acetylamino group, a ureido group, an alkyl group, an alkoxy group, a nitro group, a cyano group, a heterocyclic group, and a halogen atom), a naphthylamino group (that is optionally substituted with a sulfo group or a hydroxy group), a benzylamino group (that is optionally substituted with a sulfo group), a phenethylamino group (that is optionally substituted with a sulfo group), an alkylthio group (that is optionally substituted with a sulfo group, a carboxy group, and/or a hydroxy group), or an arylthio group (that is optionally substituted with one, two, or more substituents selected from the group consisting of a sulfo group, a carboxy group, a hydroxy group, and/or an alkyl group), and at least one of Y and Z has a sulfo group, a carboxy group, or an ionic hydrophilic group as a substituent.

n2)

Provided is the ink composition as described in any one of the first aspect to the fifth aspect and n1), in which M in the formula (n1) is Cu.

n3)

Provided is the ink composition as described in any one of the first aspect to the fifth aspect, n1), and n2), in which the substituted sulfamoyl group represented by the formula (n1) is a group represented by a formula (n2) below:

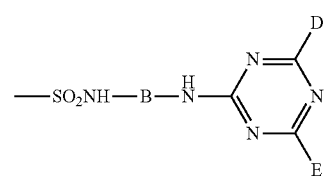

(n2)

[in the formula (n2), B is an alkylene group, an arylene group, or a xylylene group, D and E are independently a chlorine atom, a hydroxy group, a sulfo group, a carboxy group, an amino group, an alkoxy group (that is optionally substituted with a substituent selected from the group consisting of a sulfo group, a carboxy group, a hydroxy group, a dialkylamino group, an arylamino group, an acetylamino group, an alkoxy group, an aryl group, a cyano group, and a halogen atom), a phenoxy group (that is optionally substituted with one, two, or more substituents selected from the group consisting of a sulfo group, a carboxy group, a ureido group, an alkyl group, and an alkoxy group), a naphthoxy group (that is optionally substituted with one, two, or more substituents selected from the group consisting of a sulfo group and an acetylamino group), a benzyloxy group (that is optionally substituted with a sulfo group), a phenethyloxy group (that is optionally substituted with a sulfo group), an alkylamino group (that is optionally substituted with a substituent selected from the group consisting of a sulfo group, a carboxy group, a hydroxy group, an alkoxy group, a dialkylamino group, an arylamino group, an aryl group, a halogen atom, and a cyano group), an anilino group (that is optionally substituted with one, two, or more substituents selected from the group consisting of a sulfo group, a carboxy group, a hydroxy group, a dialkylamino group, an arylamino group, an acetylamino group, a ureido group, an alkyl group, an alkoxy group, a nitro group, a cyano group, a heterocyclic group, and a halogen atom), a naphthylamino group (that is optionally substituted with a sulfo group or a hydroxy group), a benzylamino group (that is optionally substituted with a sulfo group), a phenethylamino group (that is optionally substituted with a sulfo group), an alkylthio group (that is optionally substituted with a sulfo group, a carboxy group, and/or a hydroxy group), or an arylthio group (that is optionally substituted with one, two, or more substituents selected from the group consisting of a sulfo group, a carboxy group, a hydroxy group, and/or an alkyl group), and at least one of D and E is a group that has, as a substituent, an ionic hydrophilic group selected from the group consisting of a sulfo group and a carboxy group].

n4)

Provided is the ink composition as described in any one of the first aspect to the fifth aspect and n1) to n3), in which one of Y (D in the formula (n2)) and Z (E in the formula (n2)) in the formula (n1) is an amino group or a substituted or unsubstituted alkylamino group, and the other is a group that is not a halogen atom or a hydroxy group.

n5)

Provided is the ink composition as described in any one of the first aspect to the fifth aspect and n1) to n4), in which one of Y (D in the formula (n2)) and Z (E in the formula (n2)) in the formula (n1) is an amino group or a substituted or unsubstituted alkylamino group, and the other is an arylamino group substituted with a sulfo group.

n6)

Provided is the ink composition as described in any one of the first aspect to the fifth aspect and n1) to n5), in which the formula (n1) represents a phthalocyanine coloring matter obtained by subjecting a 4-sulfophthalic acid derivative to a reaction with another 4-sulfophthalic acid derivative or with an (anhydrous) phthalic acid derivative in the presence of a metal compound, subjecting the resulting sulfo metal phthalocyanine compound to a reaction with a chlorinating agent to convert a sulfo group into a chlorosulfo group, and then subjecting the resultant to a reaction with an amidating agent and an organic amine represented by a formula (n3) below:

(n3)

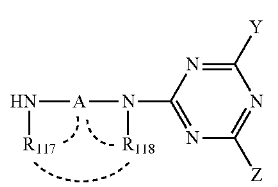

[in the formula (n3), A, Y, Z, $R^{117}$, and $R^{118}$ are the same as defined in the formula (n1)].

n7)

Provided is the ink composition as described in any one of the first aspect to the fifth aspect and n1) to n5), in which the formula (n1) represents a phthalocyanine coloring matter obtained by subjecting phthalocyanine to chlorosulfonation or subjecting phthalocyanine having a sulfo group or a salt thereof to chlorination to obtain phthalocyanine sulfonic acid chloride, and then subjecting the resultant to a reaction with the organic amine represented by the formula (4) and an aminating agent.

n8)

Provided is the ink composition as described in n6) or n7), in which the crosslinking group A is an alkylene group, a cycloalkylene group, or an arylene group.

n9)

Provided is the ink composition as described in any one of the first aspect to the fifth aspect and n1) to n4), in which the coloring matter represented by the formula (n1) is a coloring matter obtained by subjecting unsubstituted phthalocyanine and/or phthalocyanine represented by a formula (n4) below to a reaction with chlorosulfonic acid and/or a chlorinating agent to perform chlorosulfonation and/or convert a sulfo group into a chlorosulfone group, and then subjecting the resultant to a reaction with an organic amine represented by a formula (n5) below and an amidating agent:

(n4)

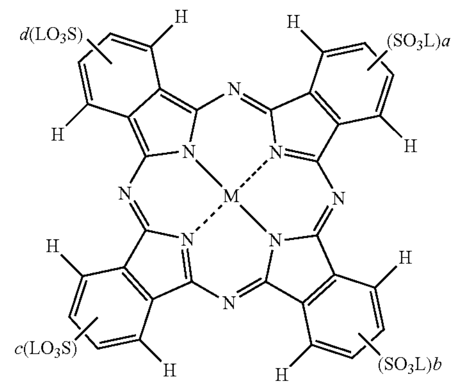

[in the formula (n4), L is a proton, an alkali metal ion, an alkaline-earth metal ion, an onium ion derived from an organic amine, or an ammonium ion, a, b, c, and d independently denote 0 or 1, the sum of a, b, c, and d being an integer of 2 to 4, and M is the same as defined in the formula (n1)]

(n5)

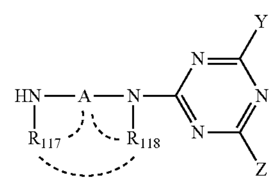

[in the formula (n5), A, Y, Z, $R^{117}$, and $R^{118}$ are the same as defined in the formula (n1)].

n10)

Provided is the ink composition as described in n6), in which the metal compound is a copper compound.

n11)

Provided is the ink composition as described in any one of the first aspect to the fifth aspect or n1) to n10), further containing (C) at least one or more coloring matters each of which has the maximum absorbance at a wavelength within the range from 350 nm to 550 nm.

n12)

Provided is the ink composition as described in n11), further containing, as the component (C), a coloring matter containing one or more kinds of the component (B-a), the component (B-b), and the component (B-q).

n13)

Provided is the ink composition as described in n12), in which the component (B-a) is the compound of a1).

n14)

Provided is the ink composition as described in n12), in which the component (B-a) is the compound of a2).

n15)

Provided is the ink composition as described in n12) to n14), in which the component (B-b) is the compound of b1).

n16)

Provided is the ink composition as described in n12) to n14), in which the component (B-b) is the compound of b2).

n17)

Provided is the ink composition as described in n112) to n16), in which the component (B-b) is the compound of b4).

o) [Component (B-o)]

o1)

Provided is the ink composition as described in any one of the first aspect to the fifth aspect, in which, in the formula (o1), $R^{101}$ is a hydrogen atom; a benzoyl group; a benzoyl group substituted with at least one group selected from the group consisting of a halogen atom, a (C1-C4) alkoxy group, and a sulfo group; or a (C1-C4) alkoxycarbonyl group, $R^{102}$ is a hydrogen atom; or a (C1-C4) alkyl group, and $R^{103}$ is a hydrogen atom; or the group represented by the formula (o2), in the group represented by the formula (o2), l is 0 or 1, W is a hydrogen atom; or a (C1-C8) alkyl group, and $R^{104}$ is a hydrogen atom; a (C1-C4) alkyl group; a (C1-C4) alkoxy group; or a group represented by the formulae (o3) to (o5), in the group represented by the formula (o3), at least one of X and Y is a group containing a sulfo group or a carboxy group, and X and Y are independently a hydroxy group; an amino group; a chlorine atom; a (C1-C4) alkylamino group; a (C1-C4) alkoxy group; an alkylamino group substituted with at least one or more groups selected from the group consisting of a sulfo group, a carboxy group, and an amino group; an anilino group substituted with a sulfo group and/or a carboxy group; or a phenoxy group substituted with a sulfo group and/or a carboxy group, in the group represented by the formula (o4), o denotes an integer of 1 to 3, and J is an alkylamino group; an alkylamino group substituted with at least one group selected from the group consisting of a sulfo group, a carboxy group, and a hydroxy group; an anilino group; an anilino group substituted with a sulfo group and/or a carboxy group; an alkylthio group; an alkylthio group substituted with a sulfo group or a carboxy group; a phenylthio group substituted with a sulfo group and/or a carboxy group; or a phenoxy group substituted with a sulfo group and/or a carboxy group, and in the group represented by the formula (o5), G is a (C1-C8) alkyl group; or a (C1-C8) alkyl group substituted with a sulfo group, a carboxy group, or a hydroxy group.

o2)

Provided is the ink composition as described in any one of the first aspect to the fifth aspect or o1), in which $R^{101}$ is a hydrogen atom; a benzoyl group; a benzoyl group substituted with at least one group selected from the group consisting of a methoxy group and a sulfo group; or an ethoxycarbonyl group, $R^{102}$ is a hydrogen atom; or a methyl group, $R^{103}$ is a hydrogen atom; or the group represented by the formula (o2), in the group represented by the formula (o2), l is 0 or 1, W is a (C1-C8) alkyl group, and $R^{104}$ is a hydrogen atom; a (C1-C4) alkyl group; a (C1-C4) alkoxy group; or a group represented by the formulae (o3) to (o5), in the group represented by the formula (o3), at least one of X and Y is a group containing a sulfo group or a carboxy group, and X and Y are independently a hydroxy group; an amino group; a (C1-C4) alkoxy group; a (C1-C4) alkylamino group substituted with at least one or more groups selected from the group consisting of a sulfo group, a carboxy group, and an amino group; an anilino group substituted with a sulfo group and/or a carboxy group; or a phenoxy group substituted with a sulfo group and/or a carboxy group, in the group represented by the formula (o4), o denotes an integer of 1 to 2, and J is an alkylamino group; an alkylamino group substituted with at least one group selected from the group consisting of a sulfo group, a carboxy group, and a hydroxy group; or an alkylthio group substituted with a sulfo group or a carboxy group, and in the group represented by the formula (o5), G is a (C1-C8) alkyl group.

o3)

Provided is the ink composition as described in any one of the first aspect to the fifth aspect, o1), and o2), in which $R^{101}$ is a hydrogen atom; a benzoyl group; a sulfobenzoyl group; or an ethoxycarbonyl group, $R^{102}$ is a hydrogen atom; or a methyl group, $R^{103}$ is a hydrogen atom; or the group represented by the formula (o2), in the group represented by the formula (o2), l is 0 or 1, W is a tert-amyl group; or a 2,4,4-trimethylpentan-2-yl group, and $R^{104}$ is a hydrogen atom; a (C1-C4) alkyl group; a (C1-C4) alkoxy group; or a group represented by the formulae (o3) to (o5), in the group represented by the formula (o3), at least one of X and Y is a group containing a sulfo group or a carboxy group, and X and Y are independently a hydroxy group; an amino group; a (C1-C4) alkoxy group; a (C1-C4) alkylamino group substituted with at least one or more groups selected from the group consisting of a sulfo group, a carboxy group, and an amino group; an anilino group substituted with a sulfo group and/or a carboxy group; or a phenoxy group substituted with a sulfo group and/or a carboxy group, in the group represented by the formula (o4), o denotes an integer of 1 to 2, and J is a (C1-C6) alkylamino group; or a (C1-C6) alkylamino group substituted with a sulfo group or a carboxy group, and in the group represented by the formula (o5), G is a (C1-C8) alkyl group.

o4)

Provided is the ink composition as described in any one of the first aspect to the fifth aspect, o1), and o2), in which $R^{101}$ is a benzoyl group; a sulfobenzoyl group; or an ethoxycarbonyl group, $R^{102}$ is a hydrogen atom; or a methyl group, $R^{103}$ is a hydrogen atom; or the group represented by the formula (o2), in the group represented by the formula (o2), l is 0 or 1, W is a tert-amyl group; or a 2,2,4,4-tetramethylbutyl group, and $R^{104}$ is a hydrogen atom; or a group represented by the formulae (o3) to (o5), in the group represented by the formula (o3), at least one of X and Y is a group containing a sulfo group or a carboxy group, and X and Y are independently a hydroxy group; a (C1-C4) alkylamino group substituted with a sulfo group or a carboxy group; or an anilino group substituted with a sulfo group and/or a carboxy group, in the group represented by the formula (o4), o denotes 1 or 2, and J is a carboxy (C1-C6) alkylamino group, and in the group represented by the formula (o4), G is a (C1-C8) alkyl group.

o5)

Provided is the ink composition as described in the first aspect to the fifth aspect or o1) to o4), further containing (C) at least one coloring matter that has the maximum absorbance at a wavelength within the range from 350 nm to 550 nm.

o6)

Provided is the ink composition as described in any one of the first aspect to the fifth aspect or o1) to o5), further containing, as the component (C), a coloring matter containing one or more kinds of the component (B-a), the component (B-b), and the component (B-q).

o7)

Provided is the ink composition as described in o6), in which the component (B-a) is the compound of a1).

o8)

Provided is the ink composition as described in o6), in which the component (B-a) is the compound of a2).

o9)

Provided is the ink composition as described in o6) to o8), in which the component (B-b) is the compound of b1).

o10)

Provided is the ink composition as described in o6) to o8), in which the component (B-b) is the compound of b2).

o11)

Provided is the ink composition as described in o6) or o10), in which the component (B-b) is the compound of b4).

p) [Component (B-p)]

p1)

Provided is the ink composition as described in any one of the first aspect to the fifth aspect, in which, in the formula (p1), $R^{101}$ is a hydrogen atom; a benzoyl group; a benzoyl group substituted with at least one group selected from the group consisting of a halogen atom, a (C1-C4) alkoxy group, and a sulfo group; or a (C1-C4) alkoxycarbonyl group, $R^{102}$ is a hydrogen atom; or a (C1-C4) alkyl group, X is a diamino (C1-C6) alkylene group; a diamino phenylene group that is optionally substituted with a sulfo group; a bis(aminomethyl)phenylene group that is optionally substituted with a sulfo group; a diaminodicyclohexylmethylene group that is optionally substituted with a sulfo group; or a piperazine group, and Y is a halogen atom; a hydroxy group; an amino group; a (C1-C4) alkoxy group; a phenoxy group; a phenoxy group substituted with at least one group selected from the group consisting of a sulfo group, a carboxy group, an acetylamino group, an amino group, and a hydroxy group; an anilino group; an anilino group substituted with a sulfo group and/or a carboxy group; a naphthylamino group; a naphthylamino group substituted with a sulfo group and/or a carboxy group; a naphthyloxy group; a naphthyloxy group substituted with a sulfo group and/or a carboxy group; a (C1-C4) alkylthio group; a (C1-C4) alkylthio group substituted with a sulfo group or a carboxy group; a phenylthio group; or a phenylthio group substituted with at least one group selected from the group consisting of a sulfo group, a carboxy group, a (C1-C4) alkyl group, a (C1-C4) alkoxy group, a carbamoyl group, a cyano group, an anilino group, an amino group, a phenoxy group, a hydroxy group, a phenyl group, and a mercapto group.

p2)

Provided is the ink composition as described in any one of the first aspect to the fifth aspect or p1), in which, in the formula (p1), $R^{101}$ is a hydrogen atom; a benzoyl group; a benzoyl group substituted with at least one group selected from the group consisting of a methoxy group and a sulfo group; or an ethoxycarbonyl group, $R^{102}$ is a hydrogen atom; or a methyl group, X is a diamino (C1-C6) alkylene group; or a diaminodicyclohexylmethylene group that is optionally substituted with a sulfo group, and Y is a halogen atom; a hydroxy group; an amino group; a phenoxy group substituted with a sulfo group and/or a carboxy group; an anilino group substituted with a sulfo group and/or a carboxy group; a naphthylamino group substituted with a sulfo group and/or a carboxy group; a naphthyloxy group substituted with a sulfo group and/or a carboxy group; or a phenylthio group substituted with a sulfo group and/or a carboxy group.

p3)

Provided is the ink composition as described in any one of the first aspect to the fifth aspect, p1), and p2), in which, in the formula (p1), $R^{101}$ is a hydrogen atom; a benzoyl group; a sulfobenzoyl group; or an ethoxycarbonyl group, $R^{102}$ is a hydrogen atom; or a methyl group, X is a diamino (C1-C6) alkylene group; or a diaminodicyclohexylmethylene group that is optionally substituted with a sulfo group, and Y is a halogen atom; a hydroxy group; an amino group; a phenoxy group substituted with a sulfo group and/or a carboxy group; an anilino group substituted with a sulfo group and/or a carboxy group; a naphthylamino group substituted with a sulfo group and/or a carboxy group; a naphthyloxy group substituted with a sulfo group and/or a carboxy group; or a phenylthio group substituted with a sulfo group and/or a carboxy group.

p4)

Provided is the ink composition as described in any one of the first aspect to the fifth aspect, p1), and p2), in which, in the formula (p1), $R^{101}$ is a benzoyl group; a sulfobenzoyl group; or an ethoxycarbonyl group, $R^{102}$ is a hydrogen atom; or a methyl group, X is a diamino (C1-C6) alkylene group; or a diaminodicyclohexylmethylene group, and Y is a hydroxy group; an amino group; a phenoxy group substituted with a sulfo group and/or a carboxy group; or a naphthyloxy group substituted with a sulfo group and/or a carboxy group.

p5)

Provided is the ink composition as described in the first aspect to the fifth aspect or p1) to p4), further containing (C) at least one coloring matter that has the maximum absorbance at a wavelength within the range from 350 nm to 550 nm.

p6)

Provided is the ink composition as described in any one of the first aspect to the fifth aspect or p1) to p4), further containing, as the component (C), a coloring matter containing one or more kinds of the component (B-a), the component (B-b), and the component (B-q).

p37)

Provided is the ink composition as described in p6), in which the component (B-a) is the compound of a1).

p8)

Provided is the ink composition as described in p6), in which the component (B-a) is the compound of a2).

p9)

Provided is the ink composition as described in p6) to p8), in which the component (B-b) is the compound of b1).

p10)

Provided is the ink composition as described in p6) to p8), in which the component (B-b) is the compound of b2).

p11)

Provided is the ink composition as described in p6) to p10), in which the component (B-b) is the compound of b4).

q) [Component (B-q)]

q1)

Provided is the ink composition as described in any one of the first aspect to the fifth aspect, in which z in the formula (q1) denotes 1 or 2.

q2)

Provided is the ink composition as described in any one of the first aspect to the fifth aspect or q1), further containing (C) at least one coloring matter that has the maximum absorbance at a wavelength within the range from 350 nm to 550 nm.

q3)

Provided is the ink composition as described in any one of the first aspect to the fifth aspect or q1), further containing, as the component (C), one or more coloring matters selected from the group consisting of the component (B-g), the component (B-h), the component (B-i), the component (B-j), the component (B-k), the component (B-l), the component (B-m), the component (B-n), the component (B-o), and the component (B-p).

q4)

Provided is the ink composition as described in any one of the first aspect to the fifth aspect or q1), further containing, as the component (C), one or more coloring matters selected from the group consisting of the component (B-g), the component (B-h), and the component (B-i).

[Ink Composition and the Like]

A sixth aspect of the present invention provides:

the ink composition as described in any one of the first aspect to the fifth aspect or a) to q), further containing (S), which is a water-soluble organic solvent. A seventh aspect of the present invention provides:

the ink composition as described in any one of the first aspect to the sixth aspect or a) to q), in which the component (S) contains one, two, or more water-soluble organic solvents selected from the group consisting of 2-pyrrolidone, a glycerol-based solvent, and a glycol-based solvent. An eighth aspect of the present invention provides:

the ink composition as described in any one of the first aspect to the seventh aspect or a) to q), in which the content of the component (A) is not lower than 40% by mass relative to the total amount of the coloring matters in the ink composition. A ninth aspect of the present invention provides: the ink composition as described in any one of the first aspect to the eighth aspect or a) to q), for use in ink-jet recording. A tenth aspect of the present invention provides:

an inkjet-recording method, including using the ink composition as described in any one of the first aspect to the ninth aspect or a) to q) as ink and performing recording by discharging, in response to a recording signal, a droplet of the ink and making the droplet deposited to a record-receiving material. An eleventh aspect of the present invention provides:

the inkjet-recording method as described in the tenth aspect, in which the record-receiving material is a communication sheet. A twelfth aspect of the present invention provides: the inkjet-recording method as described in the eleventh aspect, in which the communication sheet is plain paper or a sheet having an ink-receiving layer containing a white porous inorganic substance. A thirteenth aspect of the present invention provides:

a colored material colored by the inkjet-recording method as described in any one of the tenth aspect to the twelfth aspect. A fourteenth aspect of the present invention provides:

an ink-jet printer, having a vessel containing the ink composition as described in any one of the first aspect to the ninth aspect or a) to q).

Effects of the Invention

The ink composition of the present invention has excellent storage stability without causing crystal deposition, changes in physical properties, discoloration, and the like after long-term storage. In addition, when the ink composition of the present invention is used in ink-jet recording or writing instruments, for example, images thus recorded on plain paper and paper exclusively for ink-jet printing have neutral hues. Even when the concentration of coloring matters in the ink is low, the printed article has a black hue. The ink composition of the present invention also has high print density and is excellent in moisture resistance, ozone-gas resistance, light resistance, water resistance, and sensor detectability in the near-infrared region.

Furthermore, when used in combination with a magenta dye, a cyan dye, and a yellow dye, the ink composition of the present invention can achieve ink-jet recording in full color with excellently-developed colors, excellent moisture resistance, excellent light resistance, excellent ozone-gas resistance, and excellent water resistance. Thus, the ink composition of the present invention is extremely useful as a black ink for ink-jet recording.

PREFERRED MODE FOR CARRYING OUT THE INVENTION

The present invention will be described in detail.

The ink composition of the present invention contains a coloring matter represented by a formula (1) as a component (A). Containing this compound, the ink composition of the present invention can be improved in both ozone-gas resistance and moisture resistance compared to a conventional ink composition. This compound can be obtained by a method described in International Publication No. WO 2006/051850.

$R^1$, $R^2$, $R^5$, $R^6$, and $R^7$ in the formula (1) are independently a hydrogen atom; a halogen atom; a cyano group; a hydroxy group; a sulfo group; a carboxy group; a sulfamoyl group; a phospho group; a nitro group; a ureido group; a (C1-C4) alkyl group; a (C1-C4) alkoxy group; a (C1-C4) alkyl group substituted with a hydroxy group or a (C1-C4) alkoxy group; a (C1-C4) alkoxy group substituted with at least one group selected from the group consisting of a hydroxy group, a (C1-C4) alkoxy group, a sulfo group, and a carboxy group; an acyl group; an N-alkylaminosulfonyl group; an N-phenylaminosulfonyl group; an N-alkylaminosulfonyl group substituted with at least one or more groups selected from the group consisting of a sulfo group, a carboxy group, and a hydroxy group; an alkylsulfonyl group; an alkylsulfonyl group substituted with at least one or more groups selected from the group consisting of a sulfo group, a carboxy group, and a hydroxy group; an acylamino group; an alkylsulfonylamino group; a phenylsulfonylamino group; or a phenylsulfonylamino group substituted with at least one or more groups selected from the group consisting of a halogen atom, a (C1-C4) alkyl group, and a nitro group.

The halogen atom as or in $R^1$, $R^2$, $R^5$, $R^6$, and $R^7$ in the formula (1) is a fluorine atom, a chlorine atom, a bromine atom, or an iodine atom, for example, and is preferably a fluorine atom, a chlorine atom, or a bromine atom and more preferably a fluorine atom or a chlorine atom.

Examples of the (C1-C4) alkyl group as or in $R^1$, $R^2$, $R^5$, $R^6$, and $R^7$ in the formula (1) include ones that are unsubstituted and constitute a linear or branched chain, preferably a linear chain. Specific examples include linear groups such as a methyl group, an ethyl group, an n-propyl group, and an n-butyl group; and branched groups such as an isopropyl group, an isobutyl group, a sec-butyl group, and a tert-butyl group. Preferable and specific examples include a methyl group and an n-propyl group, and a methyl group is more preferable.

Examples of the (C1-C4) alkoxy group as or in $R^1$, $R^2$, $R^5$, $R^6$, and $R^7$ in the formula (1) include ones in which an alkyl moiety thereof is unsubstituted and constitutes a linear or branched chain, preferably a linear chain. Specific examples include linear groups such as a methoxy group, an ethoxy group, an n-propoxy group, and an n-butoxy group; and branched groups such as an isopropoxy group, an isobutoxy group, a sec-butoxy group, and a tert-butoxy group. Among these, a methoxy group, an ethoxy group, and an n-propoxy group are preferable and a methoxy group is more preferable.

Examples of the (C1-C4) alkyl group substituted with a hydroxy group or a (C1-C4) alkoxy group, as or in $R^1$, $R^2$, $R^5$, $R^6$, and $R^7$ in the formula (1), include ones in which one of the carbon atoms of the (C1-C4) alkyl group has both or either of a hydroxy group and a (C1-C4) alkoxy group attached thereto as a substituent. The position to which a hydroxy group or a (C1-C4) alkoxy group as a substituent is attached is not particularly limited, but is preferably a terminus of the alkyl group. The number of substitution is 1 or 2 and is preferably 1. Examples of the (C1-C4) alkoxy group are the same as the examples of the (C1-C4) alkoxy group described above, including specific examples, preferable examples, and more preferable examples thereof. Specific examples of the (C1-C4) alkyl group substituted with a hydroxy group or a (C1-C4) alkoxy group include a hydroxymethyl group, a 2-hydroxyethyl group, a 3-hydroxy-n-propyl group, a 4-hydroxy-n-butyl group, a methoxymethyl group, a 2-methoxyethyl group, a 3-methoxy-n-propyl group, a 4-methoxy-n-butyl group, an ethoxymethyl group, a 2-ethoxyethyl group, a 3-ethoxy-n-propyl group, a 4-ethoxy-n-butyl group, an n-propoxymethyl group, a 2-(n-propoxy)ethyl group, a 3-(n-propoxy)-n-propyl group, a 4-(n-propoxy)-n-butyl group, an (n-butoxy)methyl group, a 2-(n-butoxy)ethyl group, a 3-(n-butoxy)-n-propyl group, and a 4-(n-butoxy)-n-butyl group.

Examples of the (C1-C4) alkoxy group substituted with at least one group selected from the group consisting of a hydroxy group, a (C1-C4) alkoxy group, a sulfo group, and a carboxy group, as or in $R^1$, $R^2$, $R^5$, $R^6$, and $R^7$ in the formula (1) include ones in which a carbon atom of the (C1-C4) alkoxy group has at least one group selected from the group consisting of a hydroxy group, a (C1-C4) alkoxy group, a sulfo group, and a carboxy group attached thereto as a substituent. The position to which a hydroxy group, a (C1-C4) alkoxy group, a sulfo group, or a carboxy group as a substituent is attached is not particularly limited, but is preferably a terminus of the alkyl group. The number of substitution is 1 or 2 and is preferably 1. Examples of the (C1-C4) alkoxy group as a substituent are the same as the examples of the (C1-C4) alkoxy group described above, including specific examples, preferable examples, and more preferable examples thereof. Specific examples of the (C1-C4) alkoxy group substituted with at least one group selected from the group consisting of a hydroxy group, a (C1-C4) alkoxy group, a sulfo group, and a carboxy group include ones substituted with a hydroxy group, such as a hydroxymethoxy group, a hydroxyethoxy group, a hydroxy-n-propoxy group, and a hydroxy-n-butoxy group; ones substituted with a (C1-C4) alkoxy group, such as a methoxymethoxy group, a methoxyethoxy group, a methoxy-n-propoxy group, a methoxy-n-butoxy group, an ethoxymethoxy group, an ethoxyethoxy group, an ethoxy-n-propoxy group, an ethoxy-n-butoxy group, an (n-propoxy)methoxy group, an (n-propoxy)ethoxy group, an (n-propoxy)-n-propoxy group, an (n-propoxy)-n-butoxy group, an (n-butoxy)methoxy group, an (n-butoxy)ethoxy group, an (n-butoxy)-n-propoxy group, an (n-butoxy)-n-butoxy group, an isopropoxymethoxy group, an isopropoxyethoxy group, an isopropoxy-n-propoxy group, an isopropoxy-n-butoxy group, a (tert-butoxy)methoxy group, a (tert-butoxy)ethoxy group, a (tert-butoxy)-n-propoxy group, and a (tert-butoxy)-n-butoxy group; ones substituted with a sulfo group, such as a sulfomethoxy group, a sulfoethoxy group, a sulfo-n-propoxy group, and a sulfo-n-butoxy group; and ones substituted with a carboxy group, such as a carboxymethoxy group, a carboxyethoxy group, a carboxy-n-propoxy group, and a carboxy-n-butoxy group. A sulfo-n-propoxy group, a sulfo-n-butoxy group, a carboxy-n-propoxy group, and a carboxy-n-butoxy group are preferable, and a sulfo-n-propoxy group and a sulfo-n-butoxy group are more preferable.

The acyl group as or in $R^1$, $R^2$, $R^5$, $R^6$, and $R^7$ in the formula (1) is, for example, an alkylcarbonyl group, a phenylcarbonyl group (a benzoyl group), an aldehyde group, or an amido group. Examples of the alkylcarbonyl group include ones in which an alkyl moiety thereof is unsubstituted and constitutes a linear or branched chain, preferably a linear chain. Specific examples include linear groups such as an acetyl group (a methylcarbonyl group), a propionyl group (an ethylcarbonyl group), an n-propylcarbonyl group, and an n-butylcarbonyl group; and branched groups such as an isopropylcarbonyl group, an isobutylcarbonyl group, a sec-butylcarbonyl group, and a pivaloyl group (a tert-butylcarbonyl group). Among these, the linear ones are preferable, and an acetylamino group is more preferable. As the acyl group, an alkylcarbonyl group and a benzoyl group are preferable and an acetyl group is more preferable.

Examples of the N-alkylaminosulfonyl group as or in $R^1$, $R^2$, $R^5$, $R^6$, and $R^7$ in the formula (1) include ones in which an alkyl moiety thereof is a (C1-C8) alkyl group and is preferably a (C1-C6) alkyl group and more preferably a (C1-C4) alkyl group. Examples of the N-alkylaminosulfonyl group are the same as the examples of the (C1-C4) alkyl group described above, including specific examples, preferable examples, and more preferable examples thereof. Specific examples of the N-alkylaminosulfonyl group include an N-methylaminosulfonyl group, an N-ethylaminosulfonyl group, an N-(n-propyl)aminosulfonyl group, an N-(n-butyl)aminosulfonyl group, an N-isopropylaminosulfonyl group, and an N-(tert-butyl)aminosulfonyl group. An N-methylaminosulfonyl group, an N-ethylaminosulfonyl group, an N-(n-propyl)aminosulfonyl group, and an N-(n-butyl)aminosulfonyl group are preferable, and an N-methylaminosulfonyl group and an N-ethylaminosulfonyl group are more preferable.

Examples of the N-alkylaminosulfonyl group substituted with at least one or more groups selected from the group consisting of a sulfo group, a carboxy group, and a hydroxy group, as or in $R^1$, $R^2$, $R^5$, $R^6$, and $R^7$ in the formula (1), include ones in which a carbon atom of the alkyl moiety of the N-alkylaminosulfonyl group has, as a substituent, at least one or more groups selected from the group consisting of a sulfo group, a carboxy group, and a hydroxy group. The position of substitution is not particularly limited, but is preferably a terminus of the alkyl group. The number of substitution is usually 1 to 3 and is preferably 1. Specific examples of the N-alkylaminosulfonyl group substituted with at least one or more groups selected from the group consisting of a sulfo group, a carboxy group, and a hydroxy group include ones substituted with a sulfo group, such as an N-sulfomethylaminosulfonyl group, an N-(2-sulfoethyl)aminosulfonyl group, an N-(3-sulfo-n-propyl)aminosulfonyl group, and an N-(4-sulfo-n-butyl)aminosulfonyl group; ones substituted with a carboxy group, such as an N-carboxymethylaminosulfonyl group, an N-(2-carboxyethyl)aminosulfonyl group, an N-(3-carboxy-n-propyl)aminosulfonyl group, and an N-(4-carboxy-n-butyl)aminosulfonyl group; and ones substituted with a hydroxy group, such as an N-hydroxymethylaminosulfonyl group, an N-(2-hydroxyethyl)aminosulfonyl group, an N-(3-hydroxy-n-propyl)aminosulfonyl group, and an N-(4-hydroxy-n-butyl)aminosulfonyl group. The ones substituted with a sulfo group or a carboxy group are preferable, and an N-(2-sulfoethyl)aminosulfonyl group and an N-(2-carboxyethyl)aminosulfonyl group are more preferable.

Examples of the alkylsulfonyl group as or in $R^1$, $R^2$, $R^5$, $R^6$, and $R^7$ in the formula (1) include ones in which an alkyl moiety thereof is a (C1-C8) alkyl group and is preferably a (C1-C6) alkyl group and more preferably a (C1-C4) alkyl group. Examples thereof are the same as the examples of the (C1-C4) alkyl group described above, including specific examples, preferable examples, and more preferable examples thereof. Specific examples of the alkylsulfonyl group include a methylsulfonyl group, an ethylsulfonyl group, an n-propylsulfonyl group, and an n-butylsulfonyl group.

Examples of the alkylsulfonyl group substituted with at least one or more groups selected from the group consisting of a sulfo group, a carboxy group, and a hydroxy group, as or in $R^1$, $R^2$, $R^5$, $R^6$, and $R^7$ in the formula (1), include ones in which a carbon atom of the alkyl moiety of the alkylsulfonyl group has at least one or more groups selected from the group consisting of a sulfo group, a carboxy group, and a hydroxy group attached thereto as a substituent. The position of substitution is not particularly limited, but is preferably a terminus of the alkyl group. The number of substitution is usually 1 to 3 and is preferably 1 or 2. Specific examples of the alkylsulfonyl group substituted with at least one or more groups selected from the group consisting of a sulfo group, a carboxy group, and a hydroxy group include ones substituted with a sulfo group, such as a sulfomethylsulfonyl group, a 2-sulfoethylsulfonyl group, a 3-sulfo-n-propylsulfonyl group, and a 4-sulfo-n-butylsulfonyl group; ones substituted with a carboxy group, such as a carboxymethylsulfonyl group, a 2-carboxyethylsulfonyl group, a 3-carboxy-n-propylsulfonyl group, and a 4-carboxy-n-butylsulfonyl group; and ones substituted with a hydroxy group, such as a hydroxymethylsulfonyl group, a 2-hydroxyethylsulfonyl group, a 3-hydroxy-n-propylsulfonyl group, and a 4-carboxy-n-butylsulfonyl group. The ones substituted with a sulfo group or a carboxy group are preferable, and a 2-sulfoethylsulfonyl group and a 2-carboxyethylsulfonyl group are more preferable.

Examples of the acylamino group as or in $R^1$, $R^2$, $R^5$, $R^6$, and $R^7$ in the formula (1) include ones in which an amino group thereof is substituted with the acyl group described above. Examples thereof include an alkylcarbonylamino group and a phenylcarbonylamino group (a benzoylamino group). Specific examples of the alkylcarbonylamino group include linear groups such as an acetylamino group (a methylcarbonylamino group), a propionylamino group (an ethylcarbonylamino group), an n-propylcarbonylamino group, and an n-butylcarbonylamino group; and branched groups such as an isopropylcarbonylamino group, an isobutylcarbonylamino group, a sec-butylcarbonylamino group, and a pivaloylamino group (tert-butylcarbonylamino group). Among these, the linear ones are preferable, and an acetylamino group is more preferable. The acylamino group is preferably an alkylcarbonylamino group or a benzoylamino group and is more preferably an acetylamino group or a benzoylamino group.

Examples of the alkylsulfonylamino group as or in $R^1$, $R^2$, $R^5$, $R^6$, and $R^7$ in the formula (1) include ones in which an alkyl moiety thereof is a (C1-C8) alkyl group and is preferably a (C1-C6) alkyl group and more preferably a (C1-C4) alkyl group. Examples of the alkylsulfonylamino group are the same as the examples of the (C1-C4) alkyl group described above, including specific examples, preferable examples, and more preferable examples thereof. Specific examples of the alkylsulfonylamino group include a methylsulfonylamino group, an ethylsulfonylamino group, an n-propylsulfonylamino group, an n-butylsulfonylamino group, an isopropylsulfonylamino group, and a tert-butylsulfonylamino group. A methylsulfonylamino group, an ethylsulfonylamino group, an n-propylsulfonylamino group, and an n-butylsulfonylamino group are preferable, and a methylsulfonylamino group and an ethylsulfonylamino group are more preferable.

Examples of the phenylsulfonylamino group substituted with at least one group selected from the group consisting of a halogen atom, a (C1-C4) alkyl group, and a nitro group, as or in $R^1$, $R^2$, $R^5$, $R^6$, and $R^7$ in the formula (1) include ones in which a carbon atom of the phenylsulfonylamino group has at least one group selected from the group consisting of a halogen atom, a (C1-C4) alkyl group, and a nitro group attached thereto as a substituent. The position to which at least one group selected from the group consisting of a halogen atom, a (C1-C4) alkyl group, and a nitro group as a substituent is attached is not particularly limited, but is preferably a carbon atom different from the carbon atom to which the sulfur atom is bonded. The number of substitution is usually 1 to 3, preferably 1 or 2, and more preferably 1. Examples of the halogen atom are the same as the examples of the halogen atom described above, including specific examples, preferable examples, and more preferable examples thereof. Examples of the (C1-C4) alkyl group are the same as the examples of the (C1-C4) alkyl group described above, including specific examples, preferable examples, and more preferable examples thereof. Specific examples of the phenylsulfonylamino group substituted with at least one or more groups selected from the group consisting of a halogen atom, a (C1-C4) alkyl group, and a nitro group include ones substituted with a halogen atom, such as a 2-chlorophenylsulfonylamino group, a 3-chlorophenylsulfonylamino group, a 4-chlorophenylsulfonylamino group, a 2-bromophenylsulfonylamino group, and a 4-fluorophenylsulfonylamino group; ones substituted with a (C1-C4) alkyl group, such as a 2-methylphenylsulfonylamino group, a 3-methylphenylsulfonylamino group, a 4-methylphenylsulfonylamino group, a 2-ethylphenylsulfonylamino group, a 3-(n-propyl)phenylsulfonylamino group, and a 4-(n-butyl) phenylsulfonylamino group; and ones substituted with a nitro group, such as a 2-nitrophenylsulfonylamino group, a 3-nitrophenylsulfonylamino group, and a 4-nitrophenylsulfonylamino group. Those substituted with a (C1-C4) alkyl group are preferable, and a 4-methylphenylsulfonylamino group is more preferable.

In the formula (1), $R^3$ and $R^4$ are independently a hydrogen atom; a halogen atom; a cyano group; a carboxy group; a sulfo group; a nitro group; a (C1-C4) alkyl group; a (C1-C4) alkyl group substituted with a hydroxy group or a (C1-C4) alkoxy group; a (C1-C4) alkoxy group; a (C1-C4) alkoxy group substituted with at least one group selected from the group consisting of a hydroxy group, a (C1-C4) alkoxy group, a sulfo group, and a carboxy group; a (C1-C4) alkylthio group; a (C1-C4) alkylthio group substituted with a sulfo group or a carboxy group; an acylamino group; an alkylsulfonylamino group; a phenylsulfonylamino group; or a phenylsulfonylamino group substituted with at least one or more groups selected from the group consisting of a halogen atom, a (C1-C4) alkyl group, and a nitro group.

Examples of the halogen atom as or in $R^3$ and $R^4$ in the formula (1) are the same as the examples of the halogen atom as or in $R^1$, $R^2$, $R^5$, $R^6$, and $R^7$ described above, including specific examples, preferable examples, and more preferable examples thereof.

Examples of the (C1-C4) alkyl group as or in $R^3$ and $R^4$ in the formula (1) are the same as the examples of the (C1-C4) alkyl group as or in $R^1$, $R^2$, $R^5$, $R^6$, and $R^7$ described above, including specific examples, preferable examples, and more preferable examples thereof.

Examples of the (C1-C4) alkyl group substituted with a hydroxy group or a (C1-C4) alkoxy group as or in $R^3$ and $R^4$ in the formula (1) are the same as the examples of the (C1-C4) alkyl group substituted with a hydroxy group or a (C1-C4) alkoxy group as or in $R^1$, $R^2$, $R^5$, $R^6$, and $R^7$ described above, including specific examples, preferable examples, and more preferable examples thereof.

Examples of the (C1-C4) alkoxy group as or in $R^3$ and $R^4$ in the formula (1) are the same as the examples of the (C1-C4) alkoxy group as or in $R^1$, $R^2$, $R^5$, $R^6$, and $R^7$ described above, including specific examples, preferable examples, and more preferable examples thereof.

Examples of the (C1-C4) alkoxy group substituted with at least one group selected from the group consisting of a hydroxy group, a (C1-C4) alkoxy group, a sulfo group, and a carboxy group as or in $R^3$ and $R^4$ in the formula (1) are the same as the examples of the (C1-C4) alkoxy group substituted with at least one group selected from the group consisting of a hydroxy group, a (C1-C4) alkoxy group, a sulfo group, or a carboxy group as or in $R^1$, $R^2$, $R^5$, $R^6$, and $R^7$ described above, including specific examples, preferable examples, and more preferable examples thereof.

Examples of the (C1-C4) alkylthio group as or in $R^3$ and $R^4$ in the formula (1) include ones in which an alkyl moiety thereof is unsubstituted and constitutes a linear or branched chain, preferably a linear chain. Specific examples include linear groups such as a methylthio group, an ethylthio group, an n-propylthio group, and an n-butylthio group; and branched groups such as an isopropylthio group, an isobutylthio group, a sec-propylthio group, and a tert-butylthio group. The linear ones are preferable, and a methylthio group is more preferable.

Examples of the (C1-C4) alkylthio group substituted with a sulfo group or a carboxy group as or in $R^3$ and $R^4$ in the formula (1) include ones in which any of the carbon atoms of the (C1-C4) alkylthio group has a substituent attached thereto. The number of such substitution is usually 1 or 2 and is preferably 1. The position of substitution is not particularly limited, but is preferably a carbon atom different from the carbon atom to which a sulfur atom in the alkylthio group is bonded. Specific examples include ones substituted with a sulfo group, such as a 2-sulfoethylthio group, a 3-sulfo-n-propylthio group, and a 4-sulfo-n-butylthio group; and ones substituted with a carboxy group, such as a 2-carboxyethylthio group, a 3-carboxy-n-propylthio group, and a 4-carboxy-n-butylthio group. The ones substituted with a sulfo group are preferable, and a 3-sulfopropylthio group is particularly preferable.

Examples of the acylamino group as or in $R^3$ and $R^4$ in the formula (1) are the same as the examples of the acylamino group as or in $R^1$, $R^2$, $R^5$, $R^6$, and $R^7$ described above, including specific examples, preferable examples, and more preferable examples thereof.

Examples of the alkylsulfonylamino group as or in $R^3$ and $R^4$ in the formula (1) are the same as the examples of the alkylsulfonylamino group as or in $R^1$, $R^2$, $R^5$, $R^6$, and $R^7$ described above, including specific examples, preferable examples, and more preferable examples thereof.

Examples of the phenylsulfonylamino group substituted with at least one or more groups selected from the group consisting of a halogen atom, a (C1-C4) alkyl group, and a nitro group, as or in $R^3$ and $R^4$ in the formula (1), are the same as the examples of the phenylsulfonylamino group substituted with at least one or more groups selected from the group consisting of a halogen atom, a (C1-C4) alkyl group, and a nitro group as or in $R^1$, $R^2$, $R^5$, $R^6$, and $R^7$ described above, including specific examples, preferable examples, and more preferable examples thereof.

It is preferable that one of $R^1$ and $R^2$ in the formula (1) is a hydrogen atom or a sulfo group and the other is a carboxy group, a sulfo group, or a (C1-C4) alkoxy group. It is more preferable that one of $R^1$ and $R^2$ in the formula (1) is a hydrogen atom and the other is a carboxy group or a sulfo group.

It is preferable that one of $R^3$ and $R^4$ is a sulfo group, a carboxy group, or a sulfo (C1-C4) alkoxy group and the other is a hydrogen atom, a sulfo group, or a (C1-C4) alkyl group. It is more preferable that one of $R^3$ and $R^4$ is a sulfo group and the other is a hydrogen atom.

It is preferable that at least one of $R^5$, $R^6$, and $R^7$ has a water-soluble substituent, and it is preferable that one of $R^5$, $R^6$, and $R^7$ is a sulfo group, a carboxy group, a (C1-C4) alkoxy group, or a halogen atom. A sulfo group is more preferable.

n may denote 0 or 1 and more preferably denotes 1.

In a preferable embodiment of the present invention, five or more among $R^4$ to $R^7$ are water-soluble substituents.

In another preferable embodiment, three or more among $R^1$ to $R^7$ are each a sulfo group or a carboxy group. Most preferably, five or more among $R^1$ to $R^7$ are water-soluble substituents and three or more among $R^1$ to $R^7$ are each a sulfo group or a carboxy group.

A compound adopting a combination of the preferable ones as $R^1$ to $R^7$ is more preferable, and a compound adopting a combination of the more preferable ones as $R^1$ to $R^7$ is further preferable. The same applies to a combination of the preferable ones with the more preferable ones.

Specific examples of the coloring matter represented by the formula (1) are shown in Tables 1 to 3 below. However, the present invention is not limited thereto.

Among these, a coloring matter shown under Compound No. 1 is particularly preferable.

TABLE 1

| Compound No. | Structural formula |
|---|---|
| 1 | 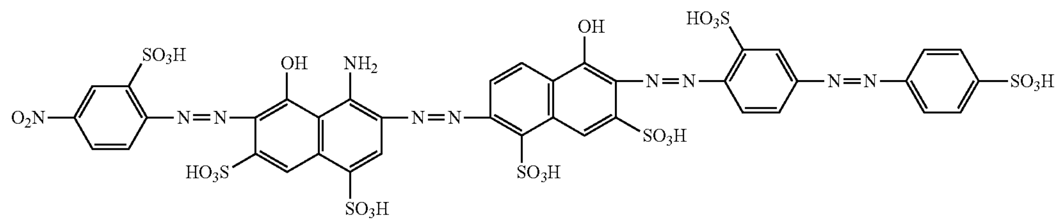 |
| 2 | 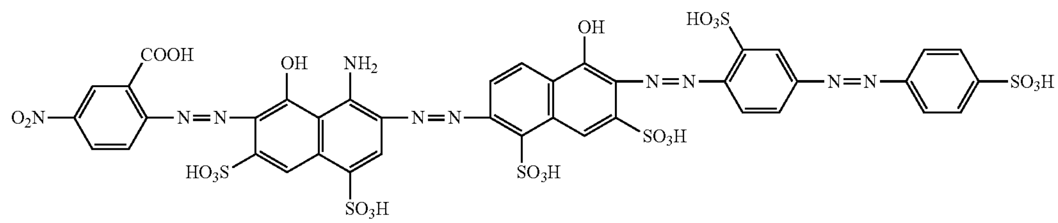 [SMILES: Nc1c(N=Nc2ccc3c(O)c(N=Nc4ccc(N=Nc5ccc(S(=O)(=O)O)cc5)cc4S(=O)(=O)O)c(S(=O)(=O)O)cc3c2S(=O)(=O)O)cc(S(=O)(=O)O)c2cc(S(=O)(=O)O)c(N=Nc3ccc([N+](=O)[O-])cc3C(=O)O)c(O)c12] |
| 3 | 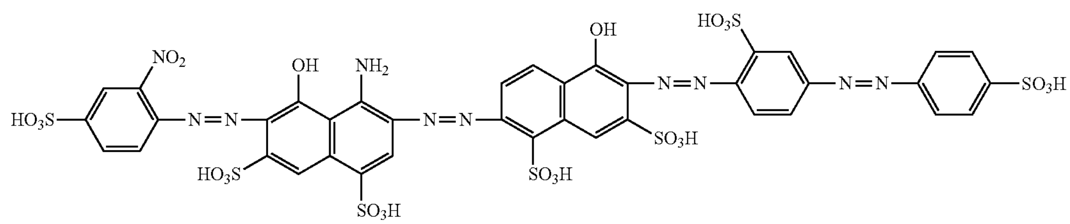 [SMILES: Nc1c(N=Nc2ccc3c(O)c(N=Nc4ccc(N=Nc5ccc(S(=O)(=O)O)cc5)cc4S(=O)(=O)O)c(S(=O)(=O)O)cc3c2S(=O)(=O)O)cc(S(=O)(=O)O)c2cc(S(=O)(=O)O)c(N=Nc3ccc(S(=O)(=O)O)cc3[N+](=O)[O-])c(O)c12] |
| 4 | 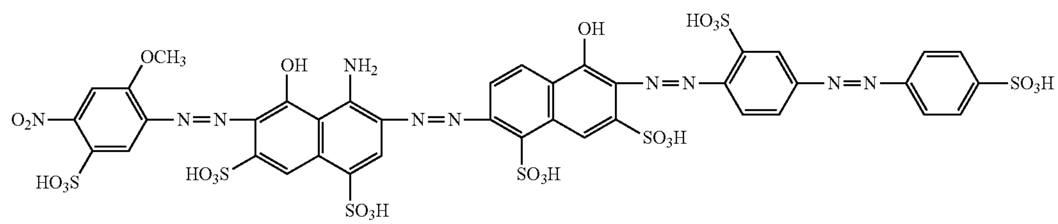 |
| 5 | 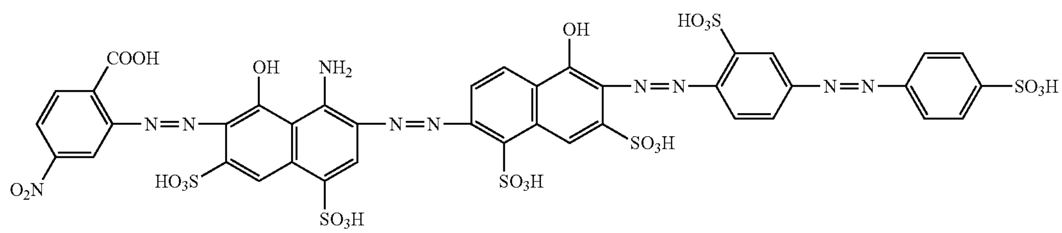 [SMILES: Nc1c(N=Nc2ccc3c(O)c(N=Nc4ccc(N=Nc5ccc(S(=O)(=O)O)cc5)cc4S(=O)(=O)O)c(S(=O)(=O)O)cc3c2S(=O)(=O)O)cc(S(=O)(=O)O)c2cc(S(=O)(=O)O)c(N=Nc3cc([N+](=O)[O-])ccc3C(=O)O)c(O)c12] |
| 6 | 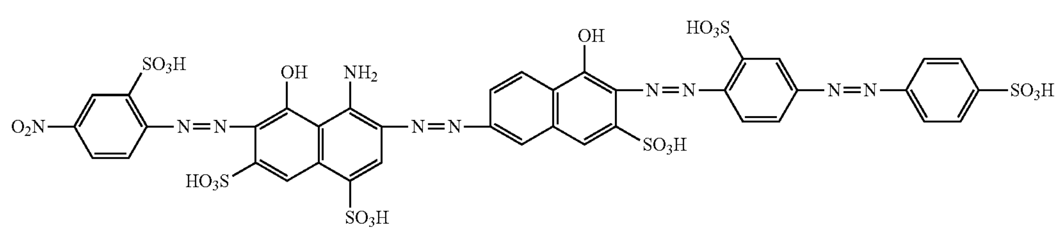 [SMILES: Nc1c(N=Nc2ccc3c(O)c(N=Nc4ccc(N=Nc5ccc(S(=O)(=O)O)cc5)cc4S(=O)(=O)O)c(S(=O)(=O)O)cc3c2)cc(S(=O)(=O)O)c2cc(S(=O)(=O)O)c(N=Nc3ccc([N+](=O)[O-])cc3S(=O)(=O)O)c(O)c12] |

TABLE 1-continued
| Compound No. | Structural formula |
|---|---|
| 7 | 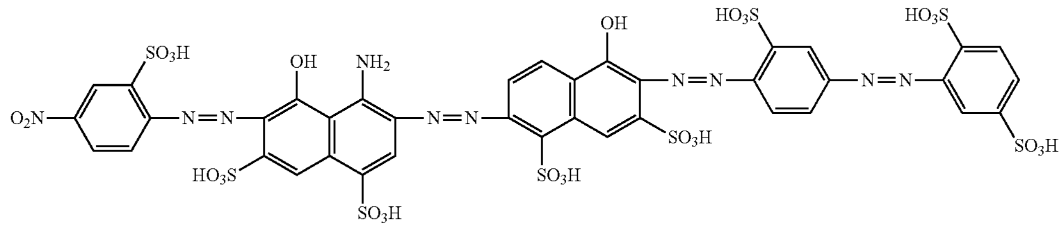 |
| 8 | 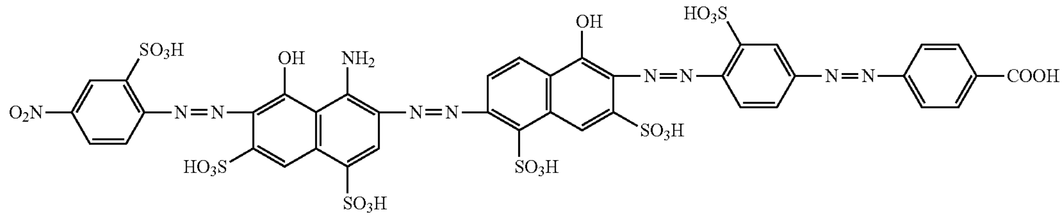 [SMILES: Nc1c(N=Nc2ccc3c(O)c(N=Nc4ccc(N=Nc5ccc(C(=O)O)cc5)cc4S(=O)(=O)O)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |
TABLE 2
| Compound No. | Structural formula |
|---|---|
| 9 | 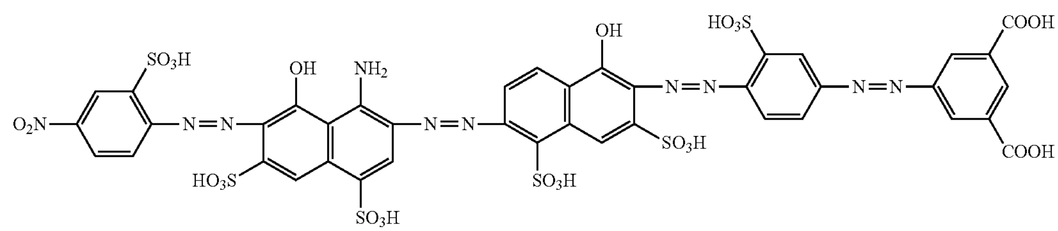 [SMILES: Nc1c(N=Nc2ccc3c(O)c(N=Nc4ccc(N=Nc5cc(C(=O)O)cc(C(=O)O)c5)cc4S(=O)(=O)O)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |
| 10 | 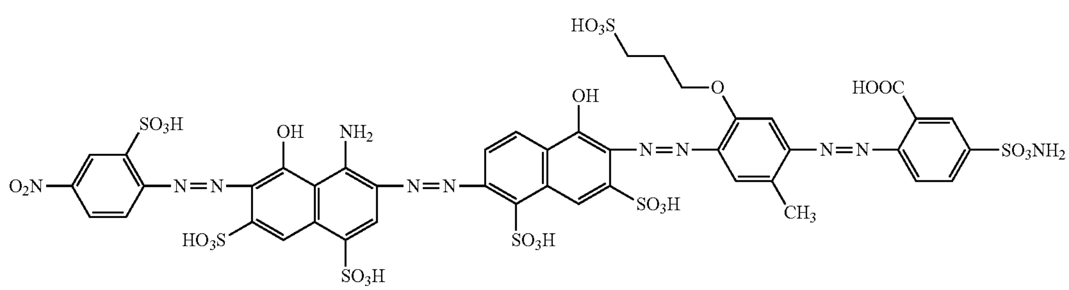 |
| 11 | 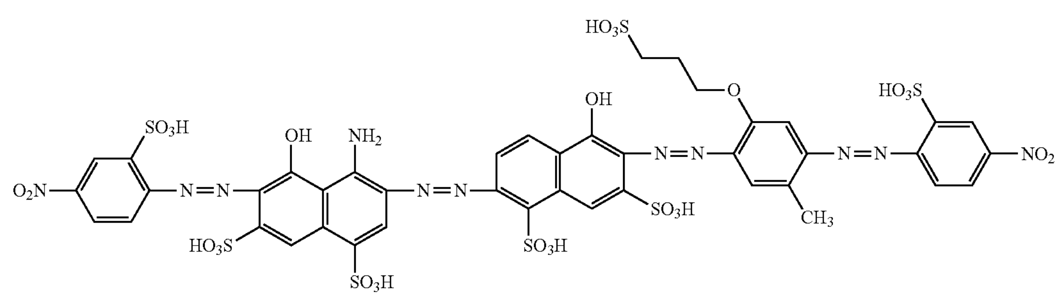 [SMILES: Cc1cc(N=Nc2c(S(=O)(=O)O)cc3c(S(=O)(=O)O)c(N=Nc4cc(S(=O)(=O)O)c5cc(S(=O)(=O)O)c(N=Nc6ccc([N+](=O)[O-])cc6S(=O)(=O)O)c(O)c5c4N)ccc3c2O)c(OCCCS(=O)(=O)O)cc1N=Nc1ccc([N+](=O)[O-])cc1S(=O)(=O)O] |

TABLE 2-continued
| Compound No. | Structural formula |
| --- | --- |
| 12 | 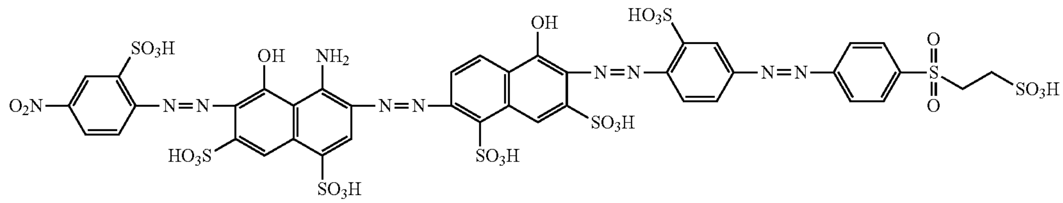 [SMILES: Nc1c(N=Nc2ccc3c(O)c(N=Nc4ccc(N=Nc5ccc(S(=O)(=O)CCS(=O)(=O)O)cc5)cc4S(=O)(=O)O)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |
| 13 | 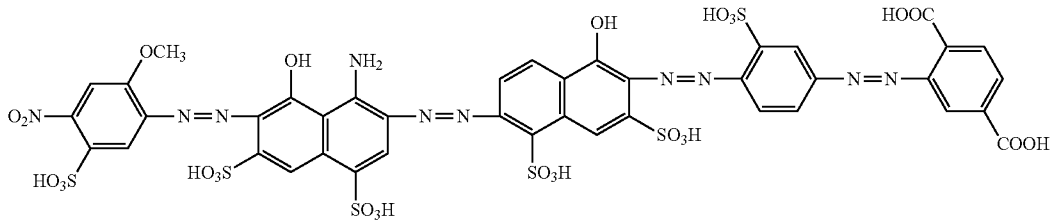 [SMILES: COc1cc([N+](=O)[O-])c(S(=O)(=O)O)cc1N=Nc1c(S(=O)(=O)O)cc2c(S(=O)(=O)O)cc(N=Nc3ccc4c(O)c(N=Nc5ccc(N=Nc6cc(C(=O)O)ccc6C(=O)O)cc5S(=O)(=O)O)c(S(=O)(=O)O)cc4c3S(=O)(=O)O)c(N)c2c1O] |
| 14 | 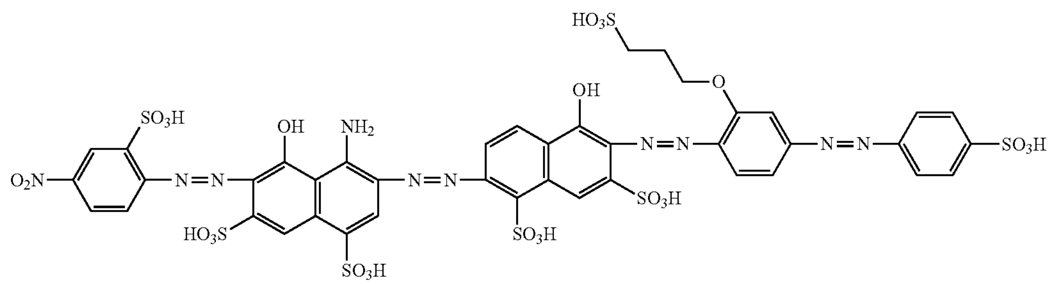 [SMILES: Nc1c(N=Nc2ccc3c(O)c(N=Nc4ccc(N=Nc5ccc(S(=O)(=O)O)cc5)cc4OCCCS(=O)(=O)O)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |
| 15 | 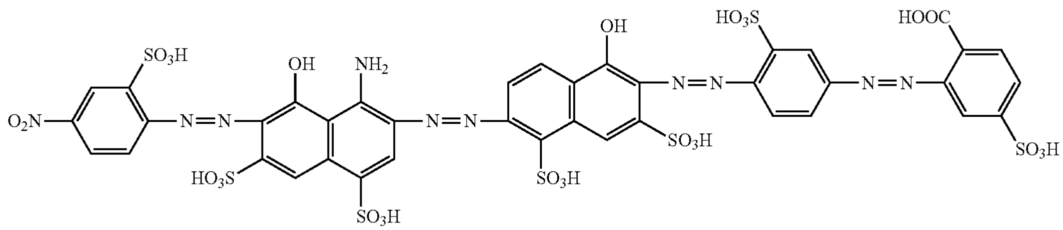 |
| 16 | 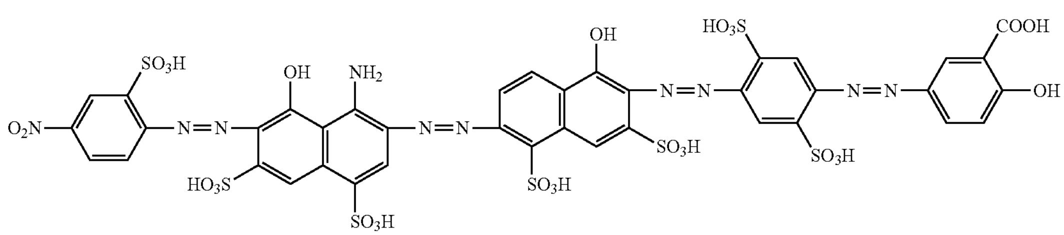 [SMILES: Nc1c(N=Nc2ccc3c(O)c(N=Nc4cc(S(=O)(=O)O)c(N=Nc5ccc(O)c(C(=O)O)c5)cc4S(=O)(=O)O)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |
TABLE 3
| Compound No. | Structural formula |
| --- | --- |
| 17 | 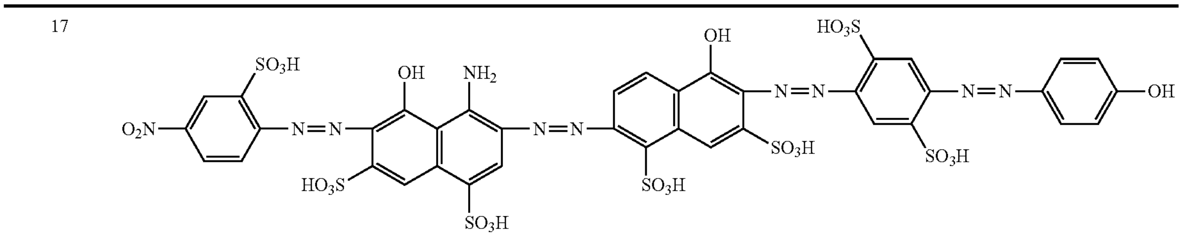 |

TABLE 3-continued
| Compound No. | Structural formula |
|---|---|
| 18 | 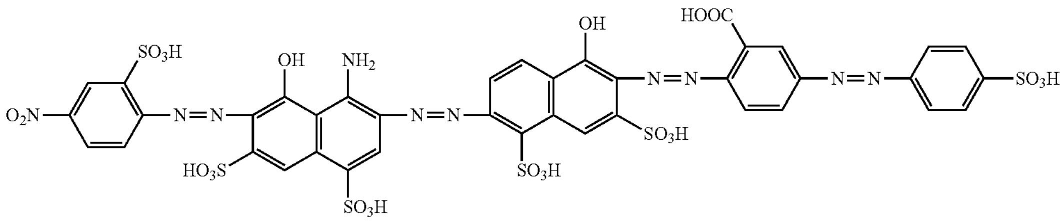 |
| 19 | 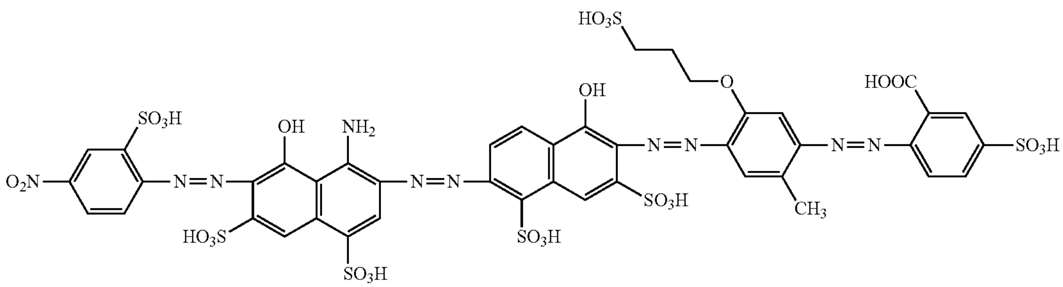 [SMILES: Cc1cc(N=Nc2c(S(=O)(=O)O)cc3c(S(=O)(=O)O)c(N=Nc4cc(S(=O)(=O)O)c5cc(S(=O)(=O)O)c(N=Nc6ccc([N+](=O)[O-])cc6S(=O)(=O)O)c(O)c5c4N)ccc3c2O)c(OCCCS(=O)(=O)O)cc1N=Nc1ccc(S(=O)(=O)O)cc1C(=O)O] |
| 20 | 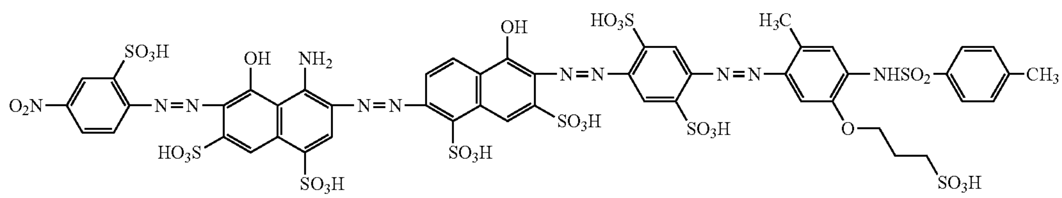 |
| 21 | 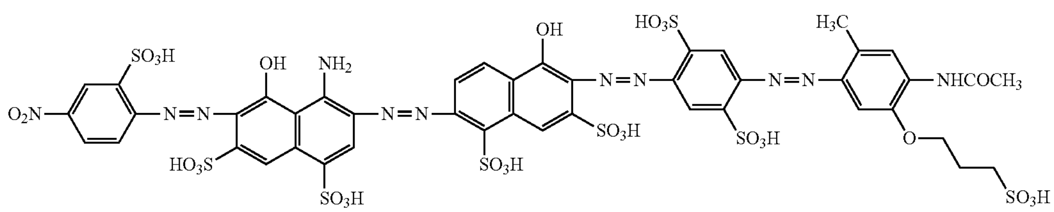 |
| 22 | 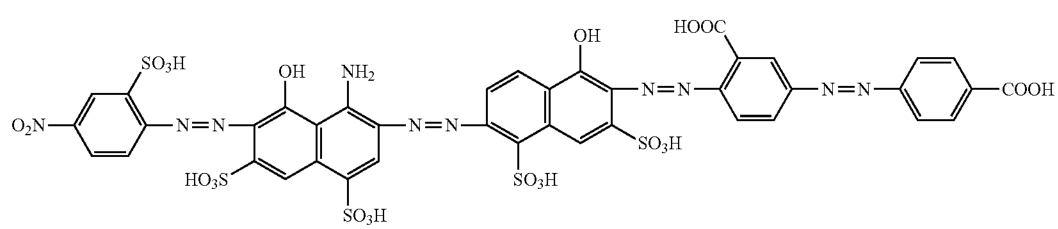 |
| 23 | 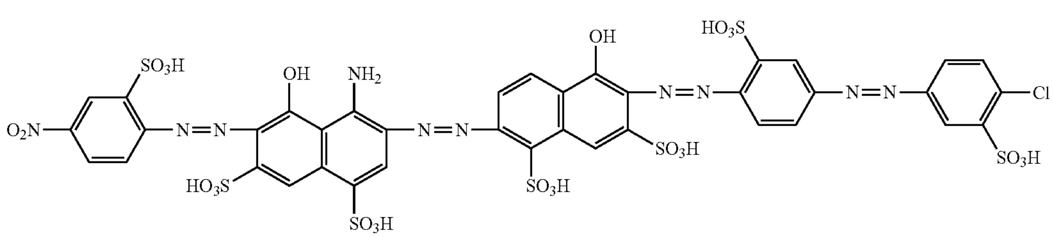 [SMILES: Nc1c(N=Nc2ccc3c(O)c(N=Nc4ccc(N=Nc5ccc(Cl)c(S(=O)(=O)O)c5)cc4S(=O)(=O)O)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |

TABLE 3-continued

| Compound No. | Structural formula |
|---|---|
| 24 | 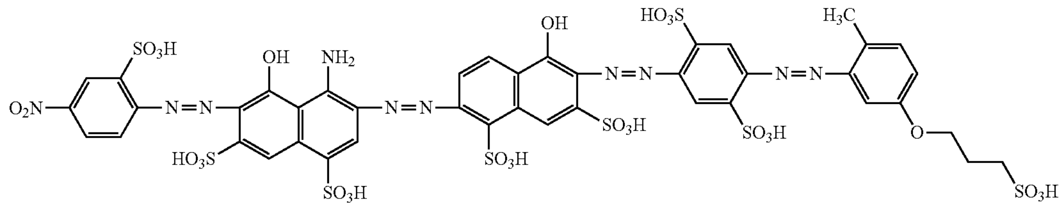 [SMILES: Cc1ccc(OCCCS(=O)(=O)O)cc1N=Nc1cc(S(=O)(=O)O)c(N=Nc2c(S(=O)(=O)O)cc3c(S(=O)(=O)O)c(N=Nc4cc(S(=O)(=O)O)c5cc(S(=O)(=O)O)c(N=Nc6ccc([N+](=O)[O-])cc6S(=O)(=O)O)c(O)c5c4N)ccc3c2O)cc1S(=O)(=O)O] |

The ink composition of the present invention contains one, two, or more coloring matters selected from the group consisting of (B-a) to (B-t) as a component (B).

Description will follow sequentially, starting from a component (B-a).

[Component (B-a)]

The component (B-a) can be obtained, for example, by a method described in International Publication No. WO 2006/001274.

$R^{101}$ and $R^{102}$ in the formula (a1) are independently a hydrogen atom; a hydroxy group; a carboxy group; a (C1-C4) alkyl group; a (C1-C4) alkyl group substituted with a hydroxy group or a (C1-C4) alkoxy group; a (C1-C4) alkoxy group; a (C1-C4) alkoxy group substituted with at least one group selected from the group consisting of a hydroxy group, a (C1-C4) alkoxy group, a sulfo group, and a carboxy group; a (C1-C4) alkylamino group; a (C1-C4) alkylamino group substituted with a hydroxy group or a (C1-C4) alkoxy group; a carboxy (C1-C5) alkylamino group; a bis(carboxy (C1-C5) alkyl)amino group; a (C1-C4) alkylcarbonylamino group; a (C1-C4) alkylcarbonylamino group substituted with a hydroxy group or a (C1-C4) alkoxy group; a phenylamino group; a phenylamino group that has a benzene ring substituted with at least one group selected from the group consisting of a carboxy group, a sulfo group, and an amino group; a sulfo group; a halogen atom; an acyl group; or a ureido group. X is a substituted amino group having a sulfo group or a carboxy group.

Examples of the (C1-C4) alkyl group as or in $R^{101}$ and $R^{102}$ in the formula (a1) are the same as the examples of the (C1-C4) alkyl group as or in $R^1$, $R^2$, $R^5$, $R^6$, and $R^7$ described above, including specific examples, preferable examples, and more preferable examples thereof.

Examples of the (C1-C4) alkyl group substituted with a hydroxy group or a (C1-C4) alkoxy group as or in $R^{101}$ and $R^{102}$ in the formula (a1) are the same as the examples of the (C1-C4) alkyl group substituted with a hydroxy group or a (C1-C4) alkoxy group as or in $R^1$, $R^2$, $R^5$, $R^6$, and $R^7$ described above, including specific examples, preferable examples, and more preferable examples thereof.

Examples of the (C1-C4) alkoxy group as or in $R^{101}$ and $R^{102}$ in the formula (a1) are the same as the examples of the (C1-C4) alkoxy group as or in $R^1$, $R^2$, $R^5$, $R^6$, and $R^7$ described above, including specific examples, preferable examples, and more preferable examples thereof.

Examples of the (C1-C4) alkoxy group substituted with at least one group selected from the group consisting of a hydroxy group, a (C1-C4) alkoxy group, a sulfo group, and a carboxy group as or in $R^{101}$ and $R^{102}$ in the formula (a1) are the same as the examples of the (C1-C4) alkoxy group substituted with at least one group selected from the group consisting of a hydroxy group, a (C1-C4) alkoxy group, a sulfo group, and a carboxy group as or in $R^1$, $R^2$, $R^5$, $R^6$, and $R^7$ described above, including specific examples, preferable examples, and more preferable examples thereof.

Examples of the (C1-C4) alkylamino group as or in $R^{101}$ and $R^{102}$ in the formula (a1) include ones in which an alkyl moiety thereof is the same as the (C1-C4) alkyl group as or in $R^1$, $R^2$, $R^5$, $R^6$, and $R^7$. Specific examples include a methylamino group, an ethylamino group, an n-propylamino group, an n-butylamino group, an isopropylamino group, an isobutylamino group, a sec-butylamino group, and a tert-butylamino group. Among these, the linear ones are preferable and a methylamino group is more preferable.

Examples of the (C1-C4) alkylamino group substituted with a hydroxy group or a (C1-C4) alkoxy group as or in $R^{101}$ and $R^{102}$ in the formula (a1) include ones in which a carbon atom of the (C1-C4) alkylamino group has a hydroxy group or a (C1-C4) alkoxy group attached thereto as a substituent. Although the position to which a hydroxy group or a (C1-C4) alkoxy group as a substituent is attached is not particularly limited, one of the carbon atoms of the (C1-C4) alkyl group has both or either of a hydroxy group and a (C1-C4) alkoxy group attached thereto as a substituent, for instance. The position to which a hydroxy group or a (C1-C4) alkoxy group as a substituent is attached is not particularly limited, but is preferably a terminus of the alkyl group. The number of substitution is 1 or 2 and is preferably 1. Examples of the (C1-C4) alkoxy group are the same as the examples of the (C1-C4) alkoxy group as or in $R^1$, $R^2$, $R^5$, $R^6$, and $R^7$ described above, including specific examples, preferable examples, and more preferable examples thereof. Specific examples of the (C1-C4) alkylamino group substituted with a hydroxy group or a (C1-C4) alkoxy group include a hydroxymethylamino group, a 2-hydroxyethylamino group, a 3-hydroxy-n-propylamino group, a 4-hydroxy-n-butylamino group, a methoxymethylamino group, a 2-methoxyethylamino group, a 3-methoxy-n-propylamino group, a 4-methoxy-n-butylamino group, an ethoxymethylamino group, a 2-ethoxyethylamino group, a 3-ethoxy-n-propylamino group, a 4-ethoxy-n-butylamino group, an n-propoxymethylamino group, a 2-(n-propoxy)ethylamino group, a 3-(n-propoxy)-n-propylamino group, a 4-(n-propoxy)-n-butylamino group, an (n-butoxy)methylamino group, a 2-(n-butoxy)ethylamino group, a 3-(n-butoxy)-n-propylamino group, and a 4-(n-butoxy)-n-butylamino group.

Examples of the carboxy (C1-C5) alkylamino group as or in $R^{101}$ and $R^{102}$ in the formula (a1) include ones in which one of the carbon atoms of the (C1-C5) alkylamino group has a carboxy group attached thereto as a substituent. The position to which a carboxy group as a substituent is attached is not particularly limited, but is preferably a terminus of the alkyl group. The number of substitution is 1 or 2 and is preferably 1. Examples of the (C1-C5) alkylamino group include ones that are unsubstituted and constitute a linear or branched chain, preferably a linear chain. Specific examples include linear groups such as a methylamino group, an ethylamino group, an n-propylamino group, an n-butylamino group, and an n-pentylamino group; and branched groups such as an isopropylamino group, an isobutylamino group, a sec-butylamino group, a tert-butylamino group, an isopentylamino group, and a tert-pentylamino group. Preferable and specific examples include a methylamino group and an n-pentylamino group, and a methylamino group is more preferable. Specific examples of the carboxy (C1-C5) alkylamino group include a carboxymethylamino group, a 2-carboxyethylamino group, a 3-carboxy (n-propyl)amino group, a 4-carboxy(n-butyl)amino group, a 5-carboxy(n-pentyl)amino group, a 2-carboxyisopropylamino group, a 3-carboxyisobutylamino group, a 3-carboxy-sec-butylamino group, a 2-carboxy-tert-butylamino group, a 4-carboxyisopentylamino group, and a 3-carboxy-tert-pentylamino group. Preferable and specific examples include a carboxymethylamino group and a 5-carboxy(n-pentyl)amino group, and a carboxymethylamino group is more preferable.

Examples of the bis(carboxy (C1-C4) alkyl)amino group as or in $R^{101}$ and $R^{102}$ in the formula (a1) include ones in which two carboxy (C1-C4) alkyl moieties in the carboxy (C1-C4) alkylamino group are attached to a nitrogen atom as substituents. Specific examples of the bis(carboxy (C1-C4) alkyl)amino group include a bis(carboxymethyl)amino group, a bis(2-carboxyethyl)amino group, a bis{3-carboxy (n-propyl)}amino group, and a bis{4-carboxy(n-butyl) }amino group, and a preferable one is a bis(carboxymethyl) amino group.

Examples of the (C1-C4) alkylcarbonylamino group as or in $R^{101}$ and $R^{102}$ in the formula (a1) include ones in which an alkyl moiety thereof is unsubstituted and constitutes a linear or branched chain, preferably a linear chain. Specific examples include linear groups such as an acetylamino group (a methylcarbonylamino group), a propionylamino group (an ethylcarbonylamino group), an n-propylcarbonylamino group, and an n-butylcarbonylamino group; and branched groups such as an isopropylcarbonylamino group, an isobutylcarbonylamino group, a sec-butylcarbonylamino group, and a pivaloylamino group (tert-butylcarbonylamino group). Among these, the linear ones are preferable, and an acetylamino group is more preferable.

Examples of the (C1-C4) alkylcarbonylamino group substituted with a hydroxy group or a (C1-C4) alkoxy group as or in $R^{101}$ and $R^{102}$ in the formula (a1) include ones in which one of the carbon atoms of the (C1-C4) alkylcarbonylamino group has a hydroxy group or a (C1-C4) alkoxy group attached thereto as a substituent. The position to which a hydroxy group or a (C1-C4) alkoxy group as a substituent is attached is not particularly limited, but is preferably a terminus of the alkyl group. The number of substitution is 1 or 2 and is preferably 1. Specific examples of the (C1-C4) alkylcarbonylamino group substituted with a hydroxy group or a (C1-C4) alkoxy group include a hydroxymethylcarbonylamino group, a 2-hydroxyethylcarbonylamino group, a 3-hydroxy-n-propylcarbonylamino group, a 4-hydroxy-n-butylcarbonylamino group, a methoxymethylcarbonylamino group, a 2-methoxyethylcarbonylamino group, a 3-methoxy-n-propylcarbonylamino group, a 4-methoxy-n-butylcarbonylamino group, an ethoxymethylcarbonylamino group, a 2-ethoxyethylcarbonylamino group, a 3-ethoxy-n-propylcarbonylamino group, a 4-ethoxy-n-butylcarbonylamino group, an n-propoxymethylcarbonylamino group, a 2-(n-propoxy)ethylcarbonylamino group, a 3-(n-propoxy)-n-propylcarbonylamino group, a 4-(n-propoxy)-n-butylcarbonylamino group, an (n-butoxy)methylcarbonylamino group, a 2-(n-butoxy)ethylcarbonylamino group, a 3-(n-butoxy)-n-propylcarbonylamino group, and a 4-(n-butoxy)-n-butylcarbonylamino group. A hydroxymethylcarbonylamino group and a methoxymethylcarbonylamino group are preferable.

Examples of the phenylamino group that has a benzene ring substituted with at least one group selected from the group consisting of a carboxy group, a sulfo group, and an amino group, as or in $R^{101}$ and $R^{102}$ in the formula (a1), include ones in which one of the carbon atoms in the benzene ring has at least one group selected from the group consisting of a carboxy group, a sulfo group, and an amino group attached thereto as a substituent. The position to which a carboxy group as a substituent are attached is not particularly limited, but is preferably a carbon atom to which no nitrogen atom is bonded. The number of substitution is usually 1 to 3 and is preferably 1. Specific examples of the phenylamino group that has a benzene ring substituted with at least one group selected from the group consisting of a carboxy group, a sulfo group, and an amino group include a 2-carboxyphenylamino group, a 3-carboxyphenylamino group, a 4-carboxyphenylamino group, a 2,5-dicarboxyphenylamino group, a 3,5-dicarboxyphenylamino group, a 2-sulfophenylamino group, a 3-sulfophenylamino group, a 4-sulfophenylamino group, a 2,4-disulfophenylamino group, a 2,5-disulfophenylamino group, a 3,5-disulfophenylamino group, a 2-aminophenylamino group, a 3-aminophenylamino group, a 4-aminophenylamino group, a 3,5-diaminophenylamino group, a 2-carboxy-4-sulfophenylamino group, and a 2-carboxy-5-sulfophenylamino group. The ones substituted with a carboxy group or a sulfo group are preferable, and a 2-carboxyphenylamino group, a 4-carboxyphenylamino group, a 2-sulfophenylamino group, and a 4-sulfophenylamino group are preferable.

Examples of the halogen atom as or in $R^{101}$ and $R^{102}$ in the formula (a1) are the same as the examples of the halogen atom as or in $R^1$, $R^2$, $R^5$, $R^6$, and $R^7$ in the formula (1) described above, including specific examples, preferable examples, and more preferable examples thereof.

Each of $R^{101}$ and $R^{102}$ in the formula (a1) is preferably a (C1-C4) alkyl group, among these. A methyl group is particularly preferable.

In the formula (a1), X is a substituted amino group having a sulfo group or a carboxy group.

Examples of the substituted amino group having a sulfo group or a carboxy group in the formula (a1) include ones in which a carbon atom of the substituted amino group has a sulfo group or a carboxy group attached thereto as a substituent. The position of substitution is not particularly limited. The number of substitution is usually 1 to 3 and is preferably 1 or 2. The substituted amino group is, for example, an aliphatic amino group; an aromatic amino group; or a heterocyclic amino group (including a condensate ring formed via condensation with a benzene ring or the like), and an aliphatic amino group is preferable.

The aliphatic amino group having a sulfo group or a carboxy group is, for example, a mono(C1-C5) alkylamino group or a di((C1-C5) alkyl)amino group each of which is substituted with a sulfo group or a carboxy group, such as a linear or branched, preferably linear sulfo (C1-C5) alkylamino group; a linear or branched, preferably linear carboxy (C1-C5) alkylamino group; a linear or branched, preferably linear di(sulfo (C1-C5) alkyl)amino group; or a linear or branched, preferably linear di(carboxy (C1-C5)

alkyl)amino group. The range of the number of carbon atoms therein is usually (C1-C5), preferably (C1-C4), more preferably (C1-C3), and further preferably (C1-C2). Specific examples include a sulfo (C1-C5) alkylamino group such as a sulfomethylamino group, a sulfoethylamino group, a sulfopropylamino group, a sulfobutylamino group, and a sulfopentylamino group; a carboxy (C1-C5) alkylamino group such as a carboxymethylamino group, a carboxyethylamino group, a carboxypropylamino group, a carboxybutylamino group, and a carboxypentylamino group; a di(sulfo (C1-C5) alkyl)amino group such as a di(sulfomethyl)amino group, a di(sulfoethyl)amino group, and a di(sulfopropyl)amino group; and a di(carboxy (C1-C5) alkyl)amino group such as a di(carboxymethyl)amino group.

The aromatic amino group having a sulfo group or a carboxy group is, for example, a phenylamino group substituted with a sulfo group or a carboxy group, such as a sulfophenylamino group and a carboxyphenylamino group; a naphthyl group substituted with a sulfo group or a carboxy group, such as a sulfonaphthylamino group and a carboxynaphthylamino group; or an anthracenyl group substituted with a sulfo group or a carboxy group, such as a sulfoanthracenyl group and a carboxyanthracenyl group. A sulfophenylamino group or a carboxyphenylamino group is preferable.

The heterocyclic amino group having a sulfo group or a carboxy group is, for example, a sulfopyrrolylamino group, a carboxypyrrolylamino group, a sulfopyrrolinylamino group, a carboxypyrrolinylamino group, a sulfopyrrolidinylamino group, a carboxypyrrolidinylamino group, a sulfopyrazolylamino group, a carboxypyrazolylamino group, a sulfopyrazolinylamino group, a carboxypyrazolinylamino group, a sulfopyrazolidinylamino group, a carboxypyrazolidinylamino group, a sulfoimidazolynylamino group, a carboxyimidazolynylamino group, a sulfotriazolinylamino group, a carboxytriazolinylamino group, a sulfopyridinylamino group, a carboxypyridinylamino group, a sulfopiperazinylamino group, a carboxypiperazinylamino group, a sulfopyridazinylamino group, a carboxypyridazinylamino group, a sulfopyrimidinylamino group, a carboxypyrimidinylamino group, a sulfopyrazinylamino group, a carboxypyrazinylamino group, a sulfofuranylamino group, a carboxyfuranylamino group, a sulfodioxolanylamino group, a carboxydioxolanylamino group, a sulfooxazolinylamino group, a carboxyoxazolinylamino group, a sulfothiazolinylamino group, a carboxythiazolinylamino group, a sulfothiadiazolinylamino group, a carboxythiadiazolinylamino group, a sulfobenzothiazolinylamino group, a carboxybenzothiazolinylamino group, a sulfobenzoimidazolynylamino group, a carboxybenzoimidazolynylamino group, a sulfobenzothiadiazolinylamino group, or a carboxybenzothiadiazolinylamino group. A sulfobenzothiazolylamino group, a carboxybenzothiazolylamino group, a sulfobenzoimidazolylamino group, and a carboxybenzoimidazolylamino group are preferable.

Among these, X is preferably a sulfo (C1-C5) alkylamino group or a di(carboxy (C1-C5) alkyl)amino group, more preferably the former one, particularly preferably a sulfoethylamino group.

Specific examples of the coloring matter represented by the formula (a1) are shown in Tables 4 to 6 below. However, the present invention is not limited thereto.

Among these, a coloring matter shown under Compound No. a25 is particularly preferable.

TABLE 4

| Compound No. | Structural formula |
|---|---|
| a1 | 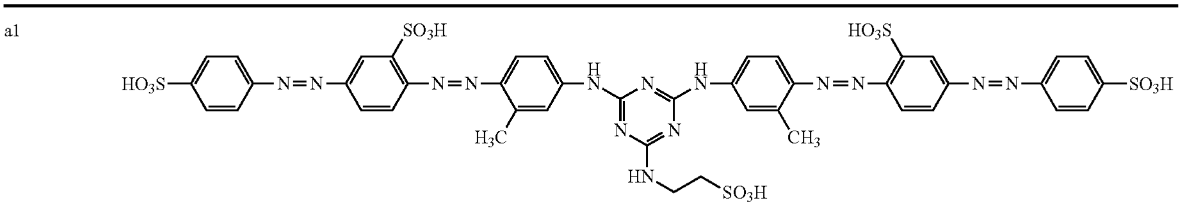 |
| a2 | 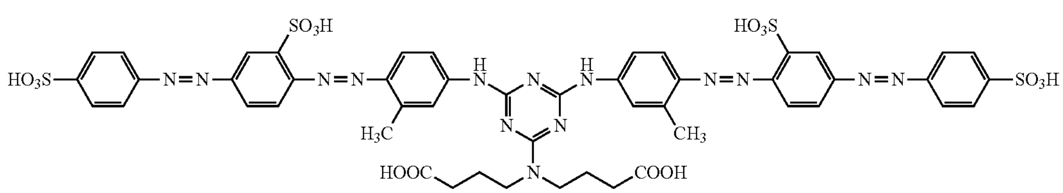 [SMILES: Cc1cc(Nc2nc(Nc3ccc(N=Nc4ccc(N=Nc5ccc(S(=O)(=O)O)cc5)cc4S(=O)(=O)O)c(C)c3)nc(N(CCCC(=O)O)CCCC(=O)O)n2)ccc1N=Nc1ccc(N=Nc2ccc(S(=O)(=O)O)cc2)cc1S(=O)(=O)O] |
| a3 | 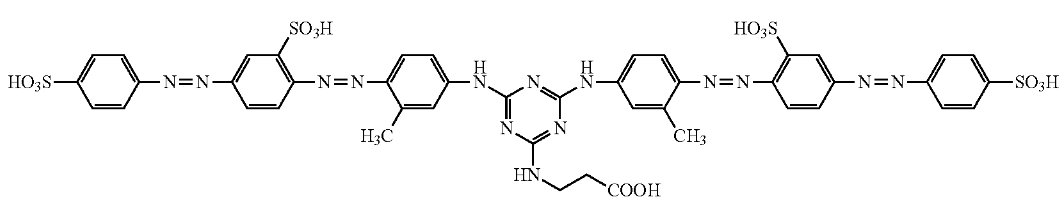 [SMILES: Cc1cc(Nc2nc(NCCC(=O)O)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |

TABLE 4-continued
| Compound No. | Structural formula |
| --- | --- |
| a4 | 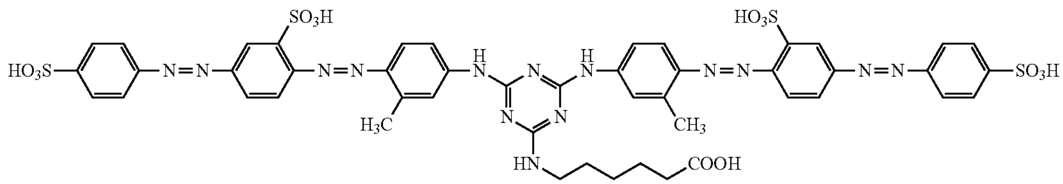 [SMILES: Cc1cc(Nc2nc(NCCCCCC(=O)O)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |
| a5 | 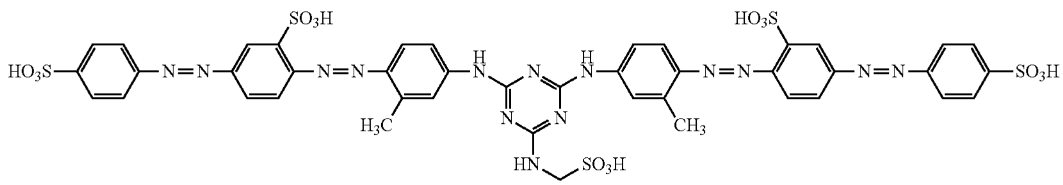 [SMILES: Cc1cc(Nc2nc(NCS(=O)(=O)O)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |
| a6 | 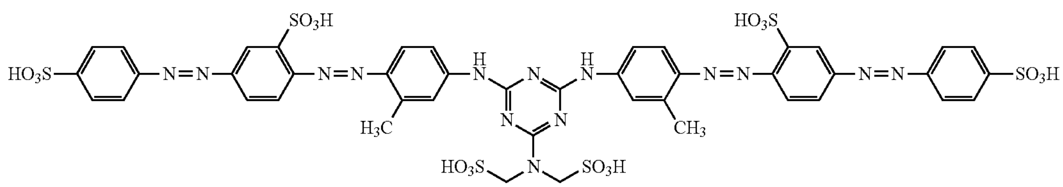 [SMILES: Cc1cc(Nc2nc(Nc3ccc(N=Nc4ccc(N=Nc5ccc(S(=O)(=O)O)cc5)cc4S(=O)(=O)O)c(C)c3)nc(N(CS(=O)(=O)O)CS(=O)(=O)O)n2)ccc1N=Nc1ccc(N=Nc2ccc(S(=O)(=O)O)cc2)cc1S(=O)(=O)O] |
| a7 | 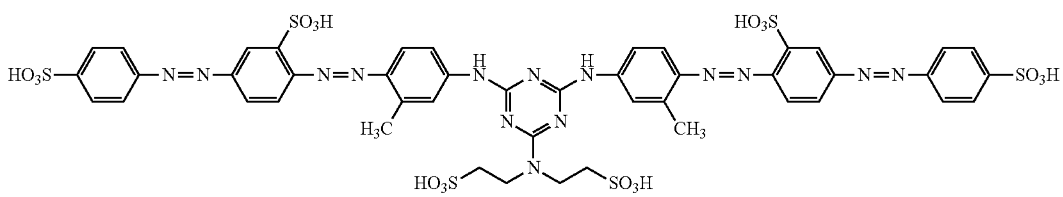 [SMILES: Cc1cc(Nc2nc(Nc3ccc(N=Nc4ccc(N=Nc5ccc(S(=O)(=O)O)cc5)cc4S(=O)(=O)O)c(C)c3)nc(N(CCS(=O)(=O)O)CCS(=O)(=O)O)n2)ccc1N=Nc1ccc(N=Nc2ccc(S(=O)(=O)O)cc2)cc1S(=O)(=O)O] |
| a8 | 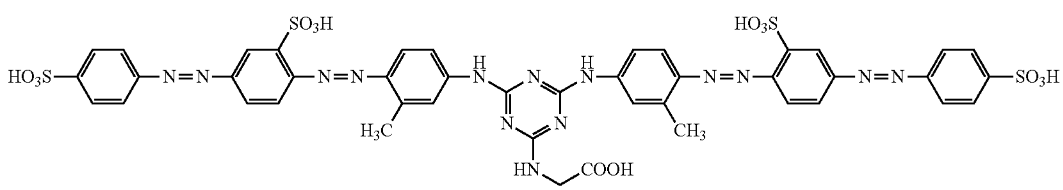 [SMILES: Cc1cc(Nc2nc(NCC(=O)O)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |
TABLE 5
| Compound No. | Structural formula |
| --- | --- |
| a9 | 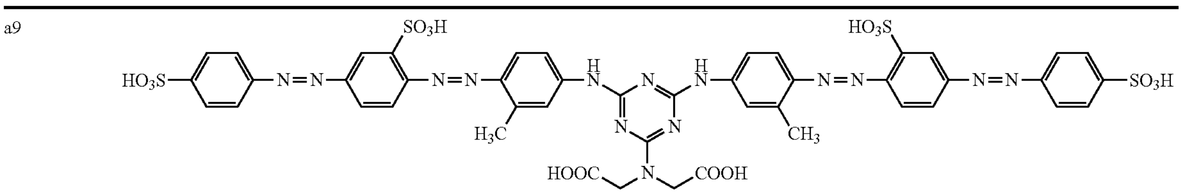 |
| a10 | 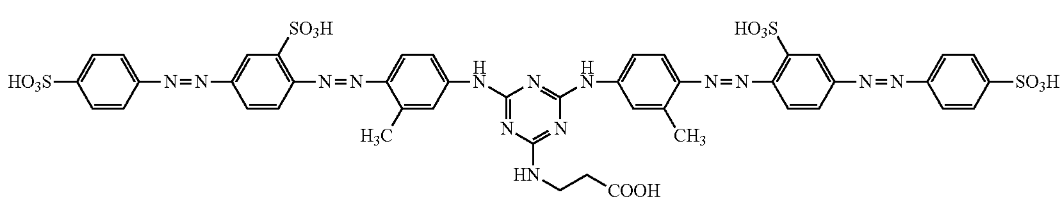 [SMILES: Cc1cc(Nc2nc(NCCC(=O)O)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |

TABLE 5-continued
| Compound No. | Structural formula |
| --- | --- |
| a11 | 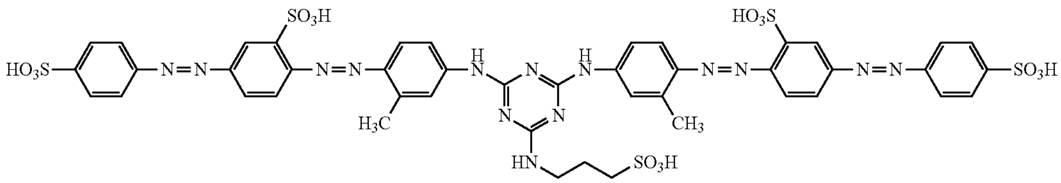 |
| a12 | 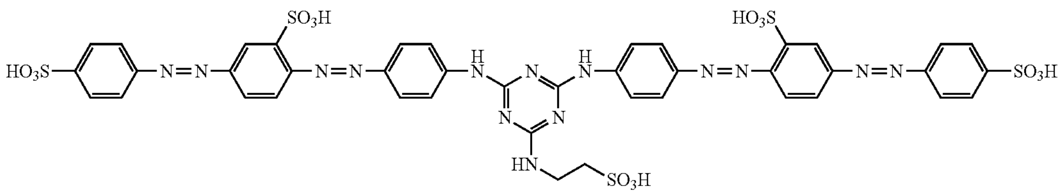 [SMILES: O=S(=O)(O)CCNc1nc(Nc2ccc(N=Nc3ccc(N=Nc4ccc(S(=O)(=O)O)cc4)cc3S(=O)(=O)O)cc2)nc(Nc2ccc(N=Nc3ccc(N=Nc4ccc(S(=O)(=O)O)cc4)cc3S(=O)(=O)O)cc2)n1] |
| a13 | 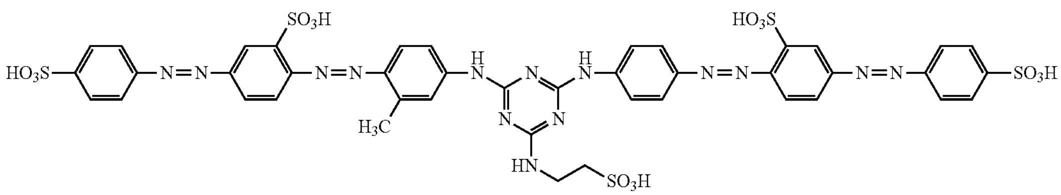 [SMILES: Cc1cc(Nc2nc(NCCS(=O)(=O)O)nc(Nc3ccc(N=Nc4ccc(N=Nc5ccc(S(=O)(=O)O)cc5)cc4S(=O)(=O)O)cc3)n2)ccc1N=Nc1ccc(N=Nc2ccc(S(=O)(=O)O)cc2)cc1S(=O)(=O)O] |
| a14 | 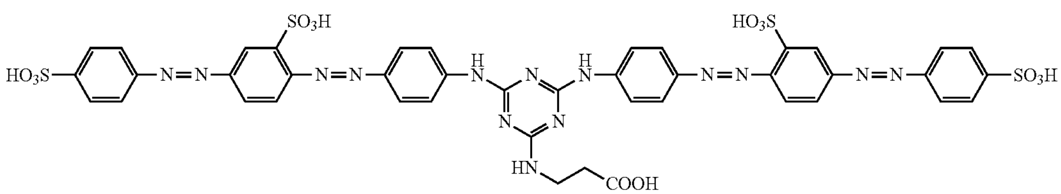 [SMILES: O=C(O)CCNc1nc(Nc2ccc(N=Nc3ccc(N=Nc4ccc(S(=O)(=O)O)cc4)cc3S(=O)(=O)O)cc2)nc(Nc2ccc(N=Nc3ccc(N=Nc4ccc(S(=O)(=O)O)cc4)cc3S(=O)(=O)O)cc2)n1] |
| a15 | 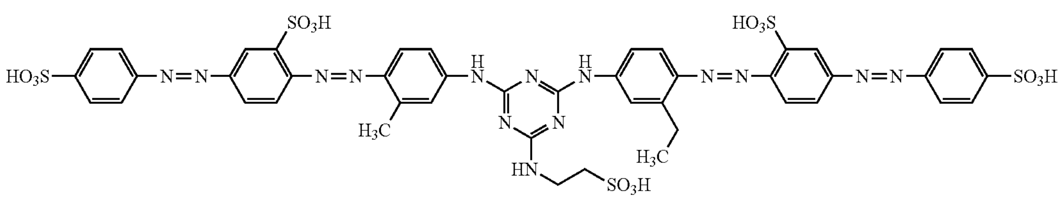 |
| a16 | 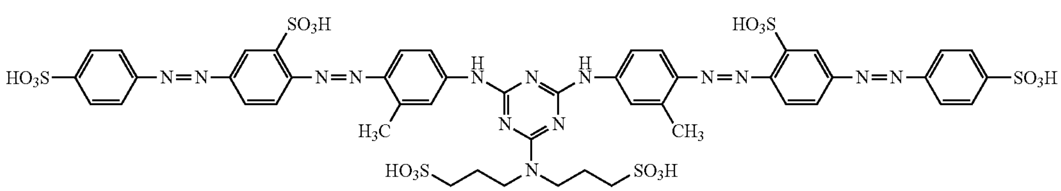 [SMILES: Cc1cc(Nc2nc(Nc3ccc(N=Nc4ccc(N=Nc5ccc(S(=O)(=O)O)cc5)cc4S(=O)(=O)O)c(C)c3)nc(N(CCCS(=O)(=O)O)CCCS(=O)(=O)O)n2)ccc1N=Nc1ccc(N=Nc2ccc(S(=O)(=O)O)cc2)cc1S(=O)(=O)O] |
TABLE 6
| Compound No. | Structural formula |
| --- | --- |
| a17 | 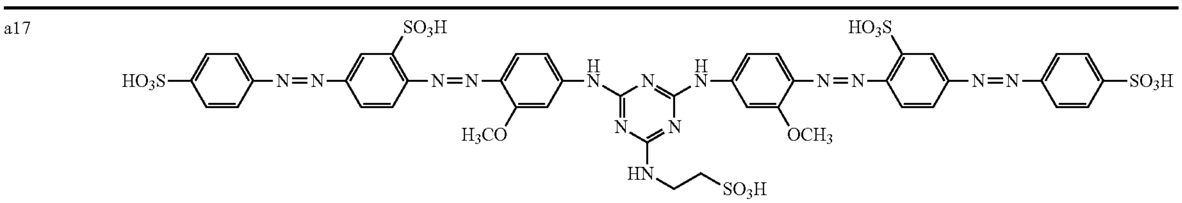 |

TABLE 6-continued

| Compound No. | Structural formula |
|---|---|
| a18 | 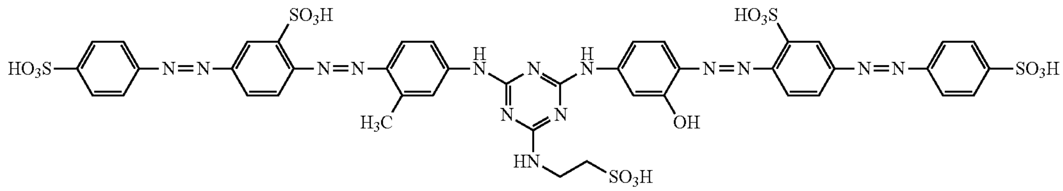 [SMILES: Cc1cc(Nc2nc(NCCS(=O)(=O)O)nc(Nc3ccc(N=Nc4ccc(N=Nc5ccc(S(=O)(=O)O)cc5)cc4S(=O)(=O)O)c(O)c3)n2)ccc1N=Nc1ccc(N=Nc2ccc(S(=O)(=O)O)cc2)cc1S(=O)(=O)O] |
| a19 | 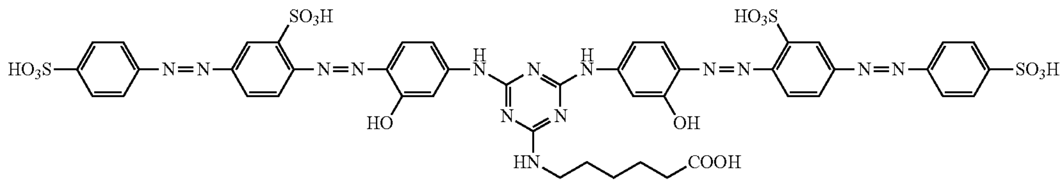 [SMILES: O=C(O)CCCCCNc1nc(Nc2ccc(N=Nc3ccc(N=Nc4ccc(S(=O)(=O)O)cc4)cc3S(=O)(=O)O)c(O)c2)nc(Nc2ccc(N=Nc3ccc(N=Nc4ccc(S(=O)(=O)O)cc4)cc3S(=O)(=O)O)c(O)c2)n1] |
| a20 | 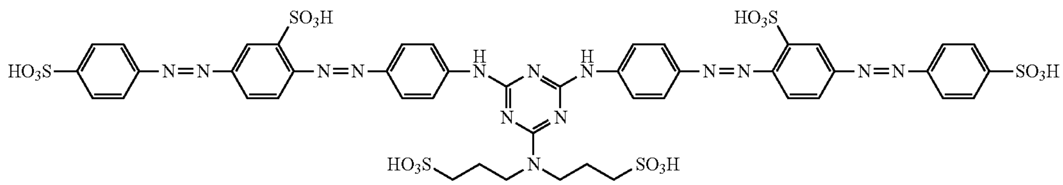 [SMILES: O=S(=O)(O)CCCN(CCCS(=O)(=O)O)c1nc(Nc2ccc(N=Nc3ccc(N=Nc4ccc(S(=O)(=O)O)cc4)cc3S(=O)(=O)O)cc2)nc(Nc2ccc(N=Nc3ccc(N=Nc4ccc(S(=O)(=O)O)cc4)cc3S(=O)(=O)O)cc2)n1] |
| a21 | 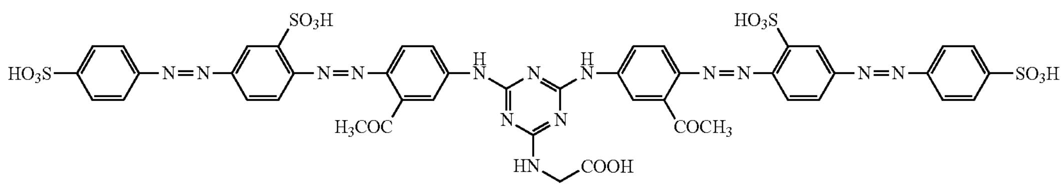 |
| a22 | 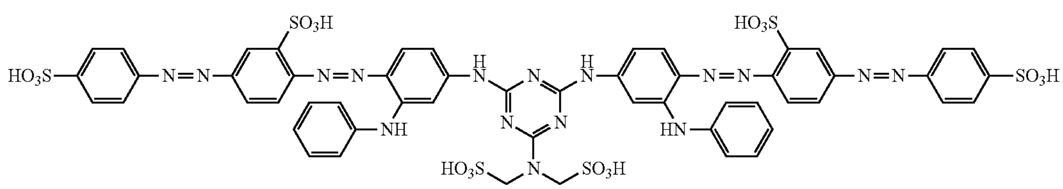 [SMILES: O=S(=O)(O)CN(CS(=O)(=O)O)c1nc(Nc2ccc(N=Nc3ccc(N=Nc4ccc(S(=O)(=O)O)cc4)cc3S(=O)(=O)O)c(Nc3ccccc3)c2)nc(Nc2ccc(N=Nc3ccc(N=Nc4ccc(S(=O)(=O)O)cc4)cc3S(=O)(=O)O)c(Nc3ccccc3)c2)n1] |
| a23 | 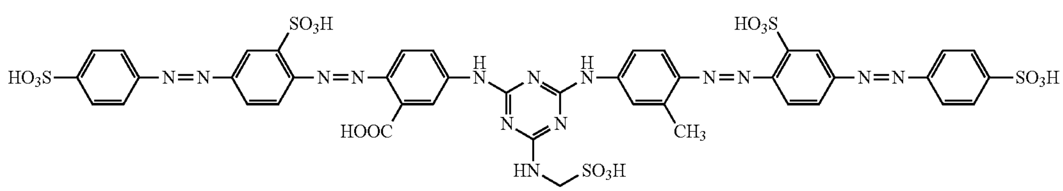 [SMILES: Cc1cc(Nc2nc(NCS(=O)(=O)O)nc(Nc3ccc(N=Nc4ccc(N=Nc5ccc(S(=O)(=O)O)cc5)cc4S(=O)(=O)O)c(C(=O)O)c3)n2)ccc1N=Nc1ccc(N=Nc2ccc(S(=O)(=O)O)cc2)cc1S(=O)(=O)O] |
| a24 | 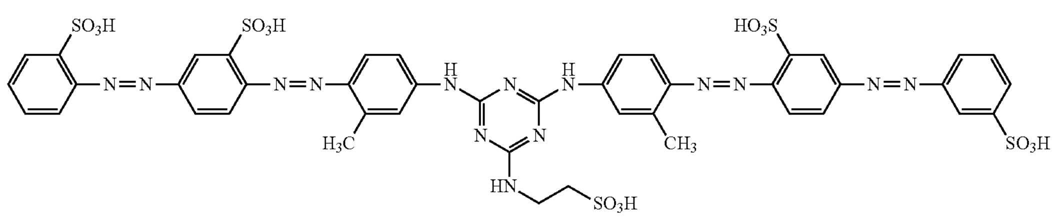 [SMILES: Cc1cc(Nc2nc(NCCS(=O)(=O)O)nc(Nc3ccc(N=Nc4ccc(N=Nc5ccccc5S(=O)(=O)O)cc4S(=O)(=O)O)c(C)c3)n2)ccc1N=Nc1ccc(N=Nc2cccc(S(=O)(=O)O)c2)cc1S(=O)(=O)O] |

[Component (B-b)]

A component (B-b) can be obtained, for example, by a method described in International Publication No. WO 2011/043184.

In the formula (b1), A is a structure represented by the formula (b2), B is a structure represented by the formula (b3), X is a divalent crosslinking group (the divalent crosslinking group contains at least two or more nitrogen atoms, and each of A and B as a substituent is attached to a different nitrogen atom of the divalent crosslinking group).

Specific examples of X in the formula (b1) include a (C1-C8) alkylenediamino group; a (C1-C8) alkylenediamino group substituted with a hydroxy group or a carboxy group; an N—(C1-C4) alkyl-(C1-C6) alkylenediamino group; an N—(C1-C4) alkyl-(C1-C6) alkylenediamino group with the alkyl moiety substituted with a hydroxy group or a carboxy group; an amino (C1-C6) alkoxy (C1-C6) alkylamino group; an amino (C1-C4) alkoxy (C1-C4) alkoxy (C1-C4) alkylamino group; a xylylenediamino group; a piperazine-1,4-diyl group; a piperazine-1,4-diyl group substituted with a (C1-C4) alkyl group or a (C1-C4) alkoxy group; or a phenylenediamino group.

X in the formula (b1) is preferably an aliphatic diamine, provided that each of A and B as a substituent is attached to a different nitrogen atom of X.

The aliphatic diamine may be a linear one, a branched one, or a ring, and may be either saturated or unsaturated. Using an aliphatic diamine as X is more advantageous than using an aromatic diamine as X in terms of easy synthesis.

In other words, X in the formula (b1) is preferably a (C1-C8) alkylenediamino group; a (C1-C8) alkylenediamino group substituted with a hydroxy group or a carboxy group; an N—(C1-C4) alkyl-(C1-C6) alkylenediamino group; an N—(C1-C4) alkyl-(C1-C6) alkylenediamino group with the alkyl moiety substituted with a hydroxy group or a carboxy group; an amino (C1-C6) alkoxy (C1-C6) alkylamino group; an amino (C1-C4) alkoxy (C1-C4) alkoxy (C1-C4) alkylamino group; a piperazine-1,4-diyl group; or a piperazine-1,4-diyl group substituted with a (C1-C4) alkyl group or a (C1-C4) alkoxy group. The ones having a ring structure are more preferable. A piperazine-1,4-diyl group is particularly preferable.

Examples of the (C1-C8) alkylenediamino group as or in X include ones that constitute a linear or branched chain, preferably a linear chain. The range of the number of carbon atoms therein is usually (C1-C8), preferably (C2-C8), more preferably (C2-C6), and further preferably (C2-C4). Specific examples include linear groups such as an ethylenediamino group, a 1,3-propylenediamino group, a 1,4-butylenediamino group, a 1,5-pentylenediamino group, a 1,6-hexylenediamino group, a 1,7-heptylenediamino group, and a 1,8-octylenediamino group; and branched groups such as a 2-methyl-1,3-propylenediamino group, a 3-methyl-1,4-butylenediamino group, and a 4-methyl-1,6-hexylenediamino group.

Examples of the (C1-C8) alkylenediamino group substituted with a hydroxy group or a carboxy group as or in X include ones in which any of the carbon atoms of the (C1-C8) alkylenediamino group has a substituent attached thereto. The number of such substitution is not particularly limited, and is preferably 1 or 2. When multiple substituents are present, the substituents may be of the same kind or different kinds and are preferably of the same kind. Specific examples include a (C1-C8) alkylenediamino group substituted with a hydroxy group, such as a 2-hydroxy-1,3-propylenediamino group, a 2-hydroxy-1,4-butylenediamino group, and a 3-hydroxy-1,6-hexylenediamino group; and a (C1-C8) alkylenediamino group substituted with a carboxy groups such as a 1-carboxyethylenediamino group, a 1-carboxy-1,3-propylenediamino group, a 1-carboxy-1,4-butylenediamino group, a 1-carboxy-1,5-pentylenediamino group, and a 1,5-dicarboxy-1,5-pentylenediamino group.

The N—(C1-C4) alkyl-(C1-C6) alkylenediamino group as or in X refers to one in which one of the nitrogen atoms in the (C1-C6) alkylenediamino group has a (C1-C4) alkyl group attached thereto as a substituent. As for the diamino group in the present specification, a nitrogen atom that has a (C1-C4) alkyl group attached thereto as a substituent is expressed as “N”, while, where appropriate, the other nitrogen atom is expressed as “N'”. The range of the number of carbon atoms in the alkylene moiety is usually (C1-C6), preferably C2-C4, and particularly preferably C2 or C3. Examples of the (C1-C4) alkyl group include ones that constitute a linear or branched chain, preferably a linear chain. Specific examples include an N-linear (C1-C4) alkyl-(C1-C6) alkylenediamino group such as an N-methylethylenediamino group, an N-ethylethylenediamino group, an N-propylethylenediamino group, and an N-butylethylenediamino group; and an N-branched (C1-C4) alkyl-(C1-C6) alkylenediamino group such as an N-isopropylethylenediamino group, an N-isobutylethylenediamino group, an N-sec-butylethylenediamino group, and an N-t-butylethylenediamino group.

Examples of the N—(C1-C4) alkyl-(C1-C6) alkylenediamino group as or in X in which the alkyl moiety is substituted with a hydroxy group or a carboxy group include ones in which any of the carbon atoms in the alkyl moiety in the N—(C1-C4) alkyl group in the N—(C1-C4) alkyl-(C1-C6) alkylenediamino group has a hydroxy group or a carboxy group attached thereto. The position of substitution is not particularly limited, but none of the carbon atoms preferably has both a nitrogen atom and a hydroxy group as substituents. The range of the number of carbon atoms in the alkylene moiety is, for example, the same range as the range for the N—(C1-C4) alkyl-(C1-C6) alkylenediamino group, including preferable examples thereof. The range of the number of carbon atoms in the alkyl moiety is usually (C1-C4), preferably (C2-C4), and more preferably (C2-C3). The number of such substitution is usually 1 or 2 and is preferably 1. When multiple substituents are present, the substituents may be of the same kind or different kinds and are preferably of the same kind. Specific examples include an N-hydroxy-substituted (C1-C4) alkyl-(C1-C6) alkylenediamino group such as an N-(2-hydroxyethyl)ethylenediamino group, an N-(3-hydroxypropyl)ethylenediamino group, an N-(2-hydroxypropyl)ethylenediamino group, and an N-(4-hydroxybutyl)ethylenediamino group; and an N-carboxy-substituted (C1-C4) alkyl-(C1-C6) alkylenediamino group such as an N-(carboxymethyl)ethylenediamino group, an N-(2-carboxyethyl)ethylenediamino group, an N-(3-carboxypropyl)ethylenediamino group, and an N-(4-carboxybutyl)ethylenediamino group.

Examples of the amino (C1-C6) alkoxy (C1-C6) alkylamino group as or in X include ones that constitute a linear or branched chain, preferably a linear chain. As for the range of the number of carbon atoms therein, an amino (C1-C6) alkoxy (C1-C6) alkylamino group is usually used, an amino (C2-C4) alkoxy (C2-C4) alkylamino group is preferable, and an amino (C2-C3) alkoxy (C2-C3) alkylamino group is particularly preferable. Specific examples include an aminoethoxyethylamino group, an aminoethoxypropylamino group, an aminopropoxypropylamino group, and an aminoethoxypentylamino group.

Examples of the amino (C1-C4) alkoxy (C1-C4) alkoxy (C1-C4) alkylamino group as or in X include ones that constitute a linear or branched chain, preferably a linear chain. As for the range of the number of carbon atoms therein, an amino (C1-C4) alkoxy (C1-C4) alkoxy (C1-C4) alkylamino group is usually used, an amino (C2-C4) alkoxy (C2-C4) alkoxy (C2-C4) alkylamino group is preferable, and an amino (C2-C3) alkoxy (C2-C3) alkoxy (C2-C3) alkylamino group is particularly preferable. Specific examples include linear groups such as an aminoethoxyethoxyethylamino group, an aminoethoxypropoxyethylamino group, and an aminoethoxybutoxyethylamino group; and branched groups such as an aminoethoxy(2-methylethoxy)ethylamino group and an aminoethoxy(2-methylpropoxy)ethylamino group.

The xylylenediamino group as or in X is, for example, an o-, m-, or p-xylylenediamino group, and is preferably an m- or p-xylylenediamino group.

Examples of the piperazine-1,4-diyl group substituted with a (C1-C4) alkyl group or a (C1-C4) alkoxy group as or in X include ones in which a substituent is attached to any of the ring carbon atoms of the piperazine ring. The number of such substitution is usually 1 or 2 and is preferably 1. When multiple substituents are present, the substituents may be of the same kind or different kinds and are preferably of the same kind. Specific examples include a 2-methylpiperazine-1,4-diyl group, a 2-ethylpiperazine-1,4-diyl group, a 2,5-dimethylpiperazine-1,4-diyl group, a 2,6-dimethylpiperazine-1,4-diyl group, a 2,5-diethylpiperazine-1,4-diyl group, and a 2-methyl-5-ethylpiperazine-1,4-diyl group.

The phenylenediamino group as or in X is, for example, an o-, m-, or p-phenylenediamino group and is preferably an m- or p-phenylenediamino group.

Among these, preferable examples of X include a (C1-C8) alkylenediamino group; a (C1-C8) alkylenediamino group substituted with a carboxy group; an N—(C1-C4) alkyl-(C1-C6) alkylenediamino group in which the alkyl moiety is substituted with a hydroxy group; an amino (C1-C4) alkoxy (C1-C4) alkoxy (C1-C4) alkylamino group; a xylylenediamino group; or a piperazine-1,4-diyl group. More preferable examples of X include a (C2-C4) alkylenediamino group; a (C2-C6) alkylenediamino group substituted with a carboxy group; an N—(C2-C3) alkyl-(C2-C3) alkylenediamino group in which the alkyl moiety is substituted with a hydroxy group; an amino (C2-C3) alkoxy (C2-C3) alkoxy (C2-C3) alkylamino group; a m- or p-xylylenediamino group; and a piperazine-1,4-diyl group. Further preferable examples of X include a (C1-C8) alkylenediamino group; a xylylenediamino group; and a piperazine-1,4-diyl group. Among these, preferable and specific examples include a 1,2-ethylenediamino group; a 1,3-propylenediamino group; a 1,4-butylenediamino group; a 1-carboxypentylene-1,5-diamino group; an N-2-hydroxyethyl-ethylenediamino group; an aminoethoxyethoxyethylamino group; a m-xylylenediamino group; and a piperazine-1,4-diyl group.

$R^{101}$ to $R^{108}$ in the formulae (b2) and (b3) are independently a hydrogen atom; a halogen atom; a sulfo group; a carboxy group; a sulfamoyl group; a carbamoyl group; a (C1-C4) alkyl group; a (C1-C4) alkoxy group; a (C1-C4) alkoxy group substituted with at least one group selected from the group consisting of a hydroxy group, a (C1-C4) alkoxy group, a hydroxy (C1-C4) alkoxy group, a sulfo group, and a carboxy group; a (C1-C4) alkylcarbonylamino group; a (C1-C4) alkylcarbonylamino group substituted with a carboxy group; a ureido group; a mono (C1-C4) alkylureido group; a di(C1-C4) alkylureido group; a mono (C1-C4) alkylureido group substituted with at least one group selected from the group consisting of a hydroxy group, a sulfo group, and a carboxy group; a di(C1-C4) alkylureido group substituted with at least one group selected from the group consisting of a hydroxy group, a sulfo group, and a carboxy group; a benzoylamino group; a benzoylamino group that has a benzene ring substituted with at least one group selected from the group consisting of a halogen atom, a (C1-C4) alkyl group, a nitro group, a sulfo group, and a carboxy group; a benzenesulfonylamino group; or a phenylsulfonylamino group that has a benzene ring substituted with at least one group selected from the group consisting of a halogen atom, a (C1-C4) alkyl group, a nitro group, a sulfo group, and a carboxy group.

Examples of the halogen atom as or in $R^{101}$ to $R^{108}$ in the formulae (b2) and (b3) are the same as the examples of the halogen atom as or in $R^1$, $R^2$, $R^5$, $R^6$, and $R^7$ in the formula (1) described above, including specific examples, preferable examples, and more preferable examples thereof.

Examples of the (C1-C4) alkyl group as or in $R^{101}$ to $R^{108}$ in the formulae (b2) and (b3) are the same as the examples of the (C1-C4) alkyl group as or in $R^1$, $R^2$, $R^5$, $R^6$, and $R^7$ in the formula (1) described above, including specific examples, preferable examples, and more preferable examples thereof.

Examples of the (C1-C4) alkoxy group as or in $R^{101}$ to $R^{108}$ in the formulae (b2) and (b3) are the same as the examples of the (C1-C4) alkoxy group as or in $R^1$, $R^2$, $R^5$, $R^6$, and $R^7$ in the formula (1) described above, including specific examples, preferable examples, and more preferable examples thereof.

Examples of the (C1-C4) alkoxy group substituted with at least one group selected from the group consisting of a hydroxy group, a (C1-C4) alkoxy group, a hydroxy (C1-C4) alkoxy group, a sulfo group, and a carboxy group, as or in $R^{101}$ to $R^{108}$ in the formulae (b2) and (b3), include ones in which a carbon atom of the (C1-C4) alkoxy group has at least one group selected from the group consisting of a hydroxy group, a (C1-C4) alkoxy group, a hydroxy (C1-C4) alkoxy group, a sulfo group, and a carboxy group attached thereto as a substituent. The position to which a hydroxy group, a (C1-C4) alkoxy group, a hydroxy (C1-C4) alkoxy group, a sulfo group, or a carboxy group as a substituent is attached is not particularly limited, but is preferably a terminus of the alkyl group. The number of substitution is 1 or 2 and is preferably 1. Examples of the (C1-C4) alkoxy group as a substituent are the same as the examples of the (C1-C4) alkoxy group described above, including specific examples, preferable examples, and more preferable examples thereof. Specific examples of the (C1-C4) alkoxy group substituted with at least one group selected from the group consisting of a hydroxy group, a (C1-C4) alkoxy group, a sulfo group, and a carboxy group include ones substituted with a hydroxy group, such as a hydroxymethoxy group, a hydroxyethoxy group, a hydroxy-n-propoxy group, and a hydroxy-n-butoxy group; ones substituted with a (C1-C4) alkoxy group, such as a methoxymethoxy group, a methoxyethoxy group, a methoxy-n-propoxy group, a methoxy-n-butoxy group, an ethoxymethoxy group, an ethoxyethoxy group, an ethoxy-n-propoxy group, an ethoxy-n-butoxy group, an (n-propoxy) methoxy group, an (n-propoxy)ethoxy group, an (n-propoxy)-n-propoxy group, an (n-propoxy)-n-butoxy group, an (n-butoxy)methoxy group, an (n-butoxy)ethoxy group, an (n-butoxy)-n-propoxy group, an (n-butoxy)-n-butoxy group, an isopropoxymethoxy group, an isopropoxyethoxy group, an isopropoxy-n-propoxy group, an isopropoxy-n-butoxy group, a (tert-butoxy)methoxy group, a (tert-butoxy)ethoxy group, a (tert-butoxy)-n-propoxy group, and a (tert-butoxy)-n-butoxy group; ones substituted with a hydroxy (C1-C4) alkoxy group, such as a hydroxymethoxymethoxy group, a 2-hydroxymethoxyethoxy group, a 3-(hydroxy-n-propoxy)methoxy group, a (4-hydroxy-n-butoxy)methoxy group, and a 4-(4-hydroxy-n-butoxy)-n-butoxy group; ones substituted with a sulfo group, such as a sulfomethoxy group, a sulfoethoxy group, a sulfo-n-propoxy group, and a sulfo-n-butoxy group; and ones substituted with a carboxy group, such as a carboxymethoxy group, a carboxyethoxy group, a carboxy-n-propoxy group, and a carboxy-n-butoxy group. A sulfo-n-propoxy group, a sulfo-n-butoxy group, a carboxy-n- propoxy group, and a carboxy-n-butoxy group are preferable, and a sulfo-n-propoxy group and a sulfo-n-butoxy group are more preferable.

Examples of the (C1-C4) alkylcarbonylamino group as or in $R^{101}$ to $R^{108}$ in the formulae (b2) and (b3) include ones in which an alkyl moiety thereof is unsubstituted and constitutes a linear or branched chain, preferably a linear chain. Specific examples include linear groups such as an acetylamino group (a methylcarbonylamino group), a propionylamino group (an ethylcarbonylamino group), an n-propylcarbonylamino group, and an n-butylcarbonylamino group; and branched groups such as an isopropylcarbonylamino group, an isobutylcarbonylamino group, a sec-butylcarbonylamino group, and a pivaloylamino group (a tert-butylcarbonylamino group). Among these, the linear ones are preferable, and an acetylamino group is more preferable.

Examples of the (C1-C4) alkylcarbonylamino group substituted with a carboxy group as or in $R^{101}$ to $R^{108}$ in the formulae (b2) and (b3) include ones in which an alkyl moiety thereof constitutes a linear or branched chain, preferably a linear chain. Specific examples include linear groups such as a carboxymethylcarbonylamino group, a 2-carboxyethylcarbonylamino group, a 3-carboxy-n-propylcarbonylamino group, and a 4-carboxy-n-butylcarbonylamino group; and branched groups such as a carboxyisopropylcarbonylamino group, a carboxyisobutylcarbonylamino group, a carboxy-sec-butylcarbonylamino group, and a carboxy-tert-butylcarbonylamino group. Among these, the linear ones are preferable, and a carboxymethylamino group is more preferable.

Examples of the mono (C1-C4) alkylureido group as or in $R^{101}$ to $R^{108}$ in the formulae (b2) and (b3) include ones in which an alkyl moiety thereof constitutes a linear or branched chain. The position to which the (C1-C4) alkyl group as a substituent is attached is not particularly limited, but is preferably the position "N'". In the present specification, the "mono (C1-C4) alkylureido group" refers to a "(C1-C4) alkyl NH—CO—NH—" group or an "$H_2N$—CO—N((C1-C4) alkyl)-" group. Considering each of the benzene rings to which $R^{101}$ and $R^{108}$ are bonded, each nitrogen atom being directly bonded to the corresponding benzene ring is called "N", and each nitrogen atom being bonded to such a nitrogen atom via a carbonyl (CO) group is called "N'". Therefore, the position to which the (C1-C4) alkyl group as a substituent is attached is "N'" in the former case and is "N" in the latter case. Specific examples include linear groups such as an N'-ethyl ureido group, an N'-propyl ureido group, and an N'-butyl ureido group; and branched groups such as an N'-isopropyl ureido group, an N'-isobutyl ureido group, and an N'-t-butyl ureido group.

Examples of the di (C1-C4) alkylureido group as or in $R^{101}$ to $R^{108}$ in the formulae (b2) and (b3) include ones that constitute a linear or branched chain. The position to which the (C1-C4) alkyl group as a substituent is attached is not particularly limited. Based on the position of substitution defined above in the "mono (C1-C4) alkylureido group", each of "N" and "N'" has a substituent, or "N'" has two substituents, for instance. The latter is preferable. The two (C1-C4) alkyl groups may be of the same kind or different kinds and are preferably of the same kind. Specific examples include linear groups such as an N',N'-dimethyl ureido group, an N',N'-diethyl ureido group, an N',N'-dipropyl ureido group, and an N',N'-dibutyl ureido group; and branched groups such as an N',N'-diisopropyl ureido group and an N',N'-diisobutyl ureido group.

Examples of the mono (C1-C4) alkylureido group substituted with at least one group selected from the group consisting of a hydroxy group, a sulfo group, and a carboxy group, as or in $R^{101}$ to $R^{108}$ in the formulae (b2) and (b3) include ones in which any of the carbon atoms of the mono (C1-C4) alkylureido group has a substituent attached thereto. The number of such substitution is usually 1 or 2 and is preferably 1. The position of such substitution is not particularly limited, but none of the carbon atoms preferably has both a nitrogen atom and a hydroxy group as substituents. Specific examples include an N'-mono(hydroxy(C1-C4) alkyl)ureido group such as an N'-2-hydroxyethyl ureido group and an N'-3-hydroxypropyl ureido group; an N'-mono (sulfo (C1-C4) alkyl)ureido group such as an N'-2-sulfoethyl ureido group and an N'-3-sulfopropyl ureido group; and an N'-mono(carboxy (C1-C4) alkyl)ureido group such as an N'-carboxymethyl ureido group, an N'-2-carboxyethyl ureido group, an N'-3-carboxypropyl ureido group, and an N'-4-carboxybutyl ureido group.

Examples of the di(C1-C4) alkylureido group substituted with at least one group selected from the group consisting of a hydroxy group, a sulfo group, and a carboxy group, as or in $R^{101}$ to $R^{108}$ in the formulae (b2) and (b3), include ones in which any of the carbon atoms of the di(C1-C4) alkylureido group has a substituent attached thereto. The number of such substitution is usually 1 or 2 and is preferably 2. The position of such substitution is not particularly limited, but none of the carbon atoms preferably has both a nitrogen atom and a hydroxy group as substituents. When multiple substituents are present, the substituents may be of the same kind or different kinds and are preferably of the same kind. Specific examples include an N',N'-di(hydroxy(C1-C4) alkyl)ureido group such as an N',N'-di(2-hydroxyethyl) ureido group, an N',N'-di(2-hydroxypropyl)ureido group, and an N',N'-di(3-hydroxypropyl)ureido group; an N',N'-di (sulfo (C1-C4) alkyl)ureido group such as an N',N'-di(3-sulfopropyl)ureido group; and an N',N'-di(carboxy (C1-C4) alkyl)ureido group such as an N',N'-di(carboxymethyl) ureido group.

Examples of the benzoylamino group that has a benzene ring substituted with at least one group selected from the group consisting of a halogen atom, a (C1-C4) alkyl group, a nitro group, a sulfo group, and a carboxy group, as or in $R^{101}$ to $R^{108}$ in the formulae (b2) and (b3), include ones in which a carbon atom of the benzene ring in the benzoylamino group has at least one group selected from the group consisting of a halogen atom, a (C1-C4) alkyl group, a nitro group, a sulfo group, and a carboxy group attached thereto as a substituent.

Examples of the phenylsulfonylamino group that has a benzene ring substituted with at least one group selected from the group consisting of a halogen atom, a (C1-C4) alkyl group, a nitro group, a sulfo group, and a carboxy group, as or in $R^{101}$ to $R^{108}$ in the formulae (b2) and (b3), include ones in which a carbon atom of the benzene ring in the phenylsulfonylamino group has at least one group selected from the group consisting of a halogen atom, a (C1-C4) alkyl group, a nitro group, a sulfo group, and a carboxy group, attached thereto as a substituent. Examples of the halogen atom are the same as the examples of the halogen atom described above, including specific examples, preferable examples, and particularly preferable examples thereof. Examples of the (C1-C4) alkyl group are the same as the examples of the (C1-C4) alkyl group described above, including specific examples, preferable examples, and more preferable examples thereof. The number of substitution is usually 1 to 3 and is preferably 1. Specific examples include ones substituted with a halogen atom, such as a 2-chlorophenylsulfonylamino group, a 3-chlorophenylsulfonylamino group, a 4-chlorophenylsulfonylamino group, a 2,4-dichlorophenylsulfonylamino group, a 2-fluorophenylsulfonylamino group, a 3-fluorophenylsulfonylamino group, a 4-fluorophenylsulfonylamino group, a 2-bromophenylsulfonylamino group, a 3-bromophenylsulfonylamino group, a 4-bromophenylsulfonylamino group, a 2-iodophenylsulfonylamino group, a 3-iodophenylsulfonylamino group, and a 4-iodophenylsulfonylamino group; ones substituted with a (C1-C4) alkyl group, such as a 2-methylphenylsulfonylamino group, a 3-methylphenylsulfonylamino group, a 4-methylphenylsulfonylamino group, a 2-ethylphenylsulfonylamino group, a 3-ethylphenylsulfonylamino group, a 4-ethylphenylsulfonylamino group, a 2-(n-propyl)phenylsulfonylamino group, a 3-(n-propyl)phenylsulfonylamino group, a 4-(n-propyl)phenylsulfonylamino group, a 2-(n-butyl)phenylsulfonylamino group, a 3-(n-butyl)phenylsulfonylamino group, and a 4-(n-butyl)phenylsulfonylamino group; ones substituted with a nitro group, such as a 2-nitrophenylsulfonylamino group, a 3-nitrophenylsulfonylamino group, a 4-nitrophenylsulfonylamino group, and a 3,5-dinitrophenylsulfonyl group; ones substituted with a sulfo group, such as a 2-sulfophenylsulfonylamino group, a 3-sulfophenylsulfonylamino group, a 4-sulfophenylsulfonylamino group, a 2,4-disulfophenylsulfonylamino group; and ones substituted with a carboxy group, such as a 2-carboxyphenylsulfonylamino group, a 3-carboxyphenylsulfonylamino group, a 4-carboxyphenylsulfonylamino group, and a 3,5-dicarboxyphenylsulfonylamino group. The ones substituted with a sulfo group and a carboxy group are preferable, and ones substituted with a sulfo group are more preferable.

At least one of $R^{101}$ to $R^{108}$ in the formulae (b2) and (b3) is preferably a (C1-C4) alkoxy group substituted with a sulfo group. It is more preferable that $R^{101}$ to $R^{104}$ are independently a hydrogen atom, a (C1-C4) alkyl group, or a (C1-C4) alkoxy group substituted with a sulfo group, at least one of $R^{101}$ to $R^{104}$ is a (C1-C4) alkoxy group substituted with a sulfo group, and $R^{105}$ to $R^{108}$ are independently a hydrogen atom or a (C1-C4) alkyl group. It is further preferable that at least one of $R^{101}$ and $R^{102}$ is a sulfopropoxy group, at least one of $R^{103}$ and $R^{104}$ is a sulfopropoxy group, and $R^{105}$ to $R^{108}$ are (C1-C4) alkyl groups.

It is particularly preferable that one of $R^{101}$ and $R^{102}$ is a sulfopropoxy group and the other is a hydrogen atom or a sulfopropoxy group, one of $R^{103}$ and $R^{104}$ is a sulfopropoxy group and the other is a hydrogen atom or a sulfopropoxy group, and $R^{105}$ to $R^{108}$ are methyl groups.

The position to which $R^{101}$ to $R^{108}$ as substituents are attached is not particularly limited. Considering each of the benzene rings that are substituted with $R^{101}$ and $R^{108}$, each position where a nitrogen atom bonded to the triazine ring is attached is called a position 1, and each position to which an azo group as a substituent is attached is called a position 4. It is preferable that each of $R^{101}$ to $R^{104}$ is attached to a position 2 and each of $R^{105}$ to $R^{108}$ is attached to a position 5.

As for the four sulfo groups in the formulae (b2) and (b3) not specified in terms of the positions of substitution, the positions of substitution are not particularly limited. A sulfo group as a substituent that is attached to a benzene ring bonded to one azo group, with the azo group being attached to the 1-position, is preferably attached to the 2-position, the 3-position, or the 4-position, preferably the 4-position.

Specific examples of the coloring matter represented by the formula (b1) are shown in Tables 7 to 28 below. However, the present invention is not limited thereto.

Among these, a coloring matter shown under Compound No. b59 is particularly preferable.

TABLE 7

| Compound No. | Stuctural formula |
|---|---|
| b1 | 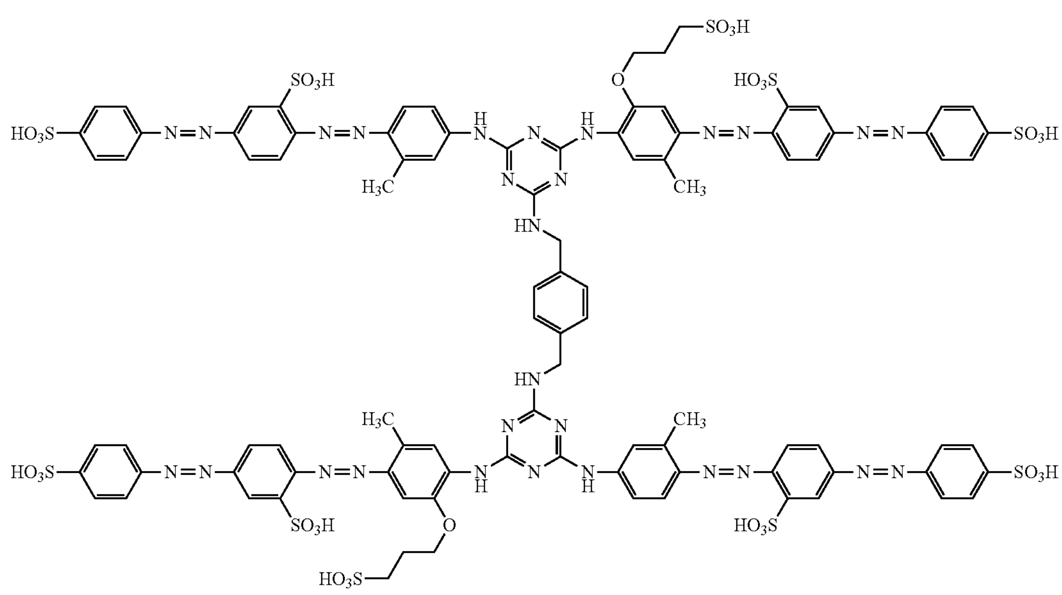 [SMILES: Cc1cc(Nc2nc(NCc3ccc(CNc4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)cc3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |

TABLE 7-continued
| Compound No. | Stuctural formula |
|---|---|
| b2 | 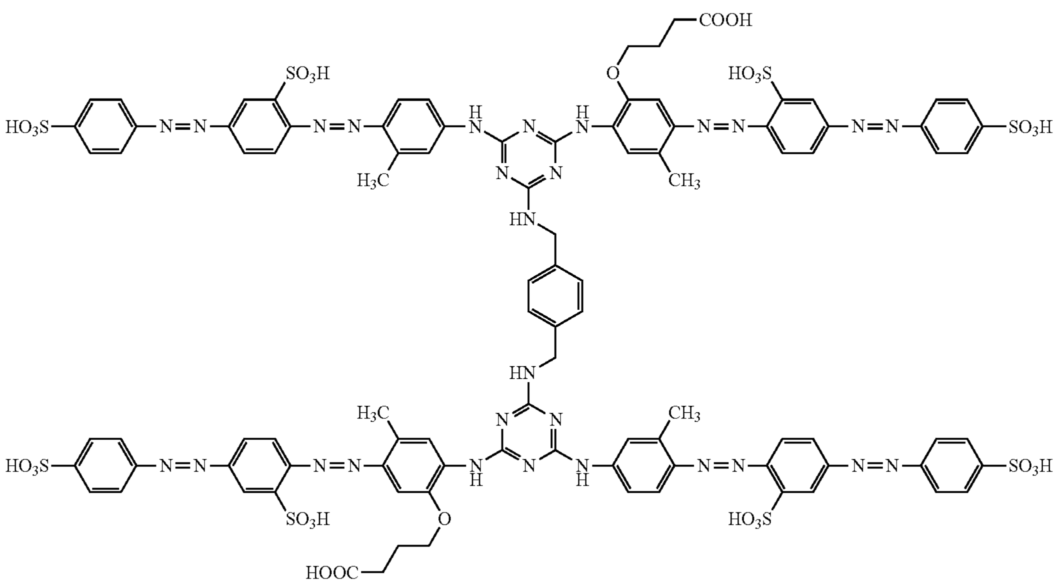 [SMILES: Cc1cc(Nc2nc(NCc3ccc(CNc4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCC(=O)O)n4)cc3)nc(Nc3cc(C)c(N=Nc4ccc(N=Nc5ccc(S(=O)(=O)O)cc5)cc4S(=O)(=O)O)cc3OCCCC(=O)O)n2)ccc1N=Nc1ccc(N=Nc2ccc(S(=O)(=O)O)cc2)cc1S(=O)(=O)O] |
| b3 | 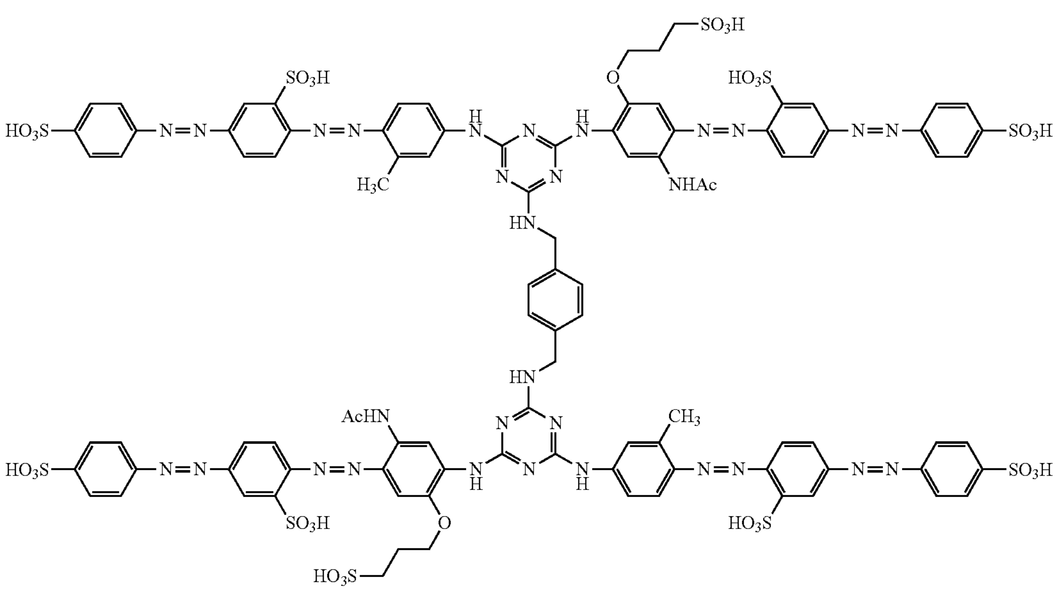 [SMILES: CC(=O)Nc1cc(Nc2nc(NCc3ccc(CNc4nc(Nc5ccc(N=Nc6ccc(N=Nc7ccc(S(=O)(=O)O)cc7)cc6S(=O)(=O)O)c(C)c5)nc(Nc5cc(NC(C)=O)c(N=Nc6ccc(N=Nc7ccc(S(=O)(=O)O)cc7)cc6S(=O)(=O)O)cc5OCCCS(=O)(=O)O)n4)cc3)nc(Nc3ccc(N=Nc4ccc(N=Nc5ccc(S(=O)(=O)O)cc5)cc4S(=O)(=O)O)c(C)c3)n2)c(OCCCS(=O)(=O)O)cc1N=Nc1ccc(N=Nc2ccc(S(=O)(=O)O)cc2)cc1S(=O)(=O)O] |

TABLE 8
| Compound No. | Structural formula |
|---|---|
| b4 | 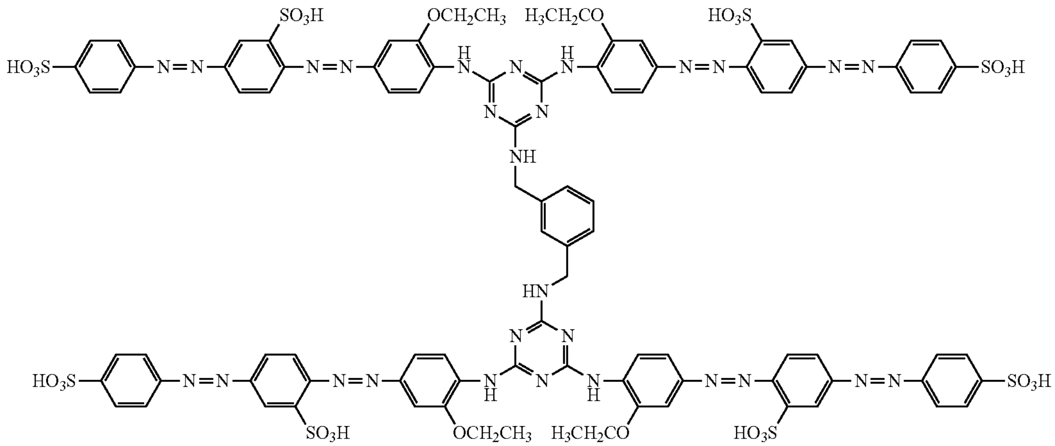 |
| b5 | 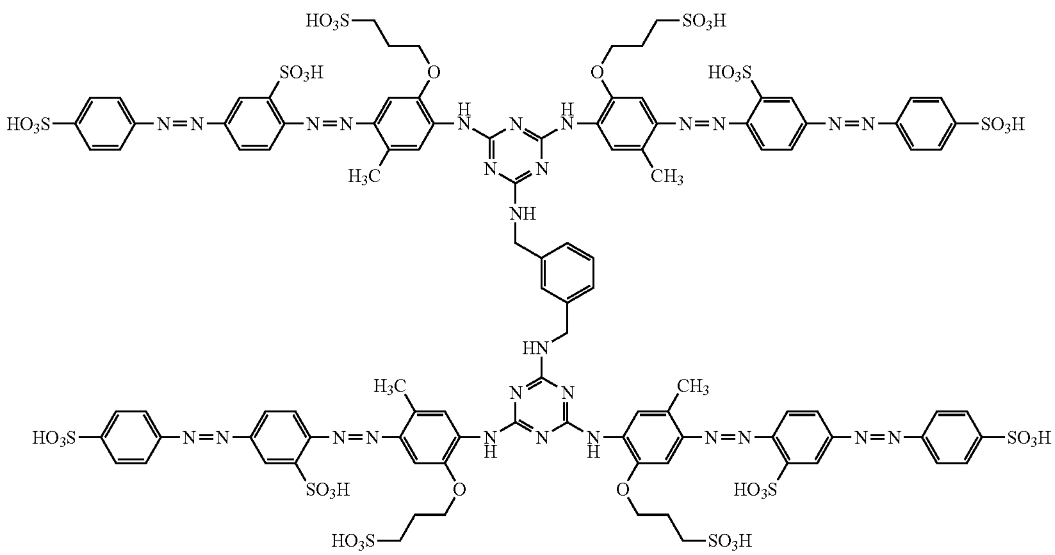 [SMILES: Cc1cc(Nc2nc(NCc3cccc(CNc4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)c3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |
| b6 | 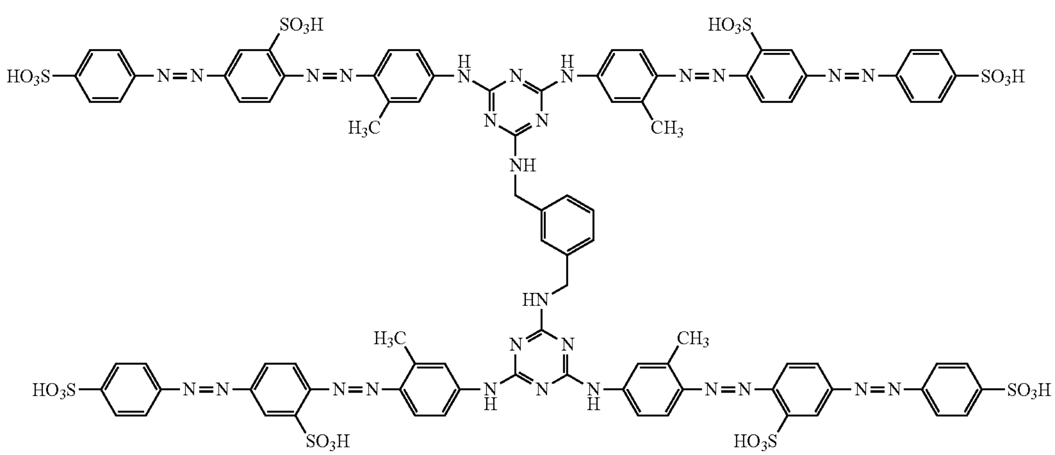 [SMILES: Cc1cc(Nc2nc(NCc3cccc(CNc4nc(Nc5ccc(N=Nc6ccc(N=Nc7ccc(S(=O)(=O)O)cc7)cc6S(=O)(=O)O)c(C)c5)nc(Nc5ccc(N=Nc6ccc(N=Nc7ccc(S(=O)(=O)O)cc7)cc6S(=O)(=O)O)c(C)c5)n4)c3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |

TABLE 9
| Compound No. | Structural formula |
|---|---|
| b7 | 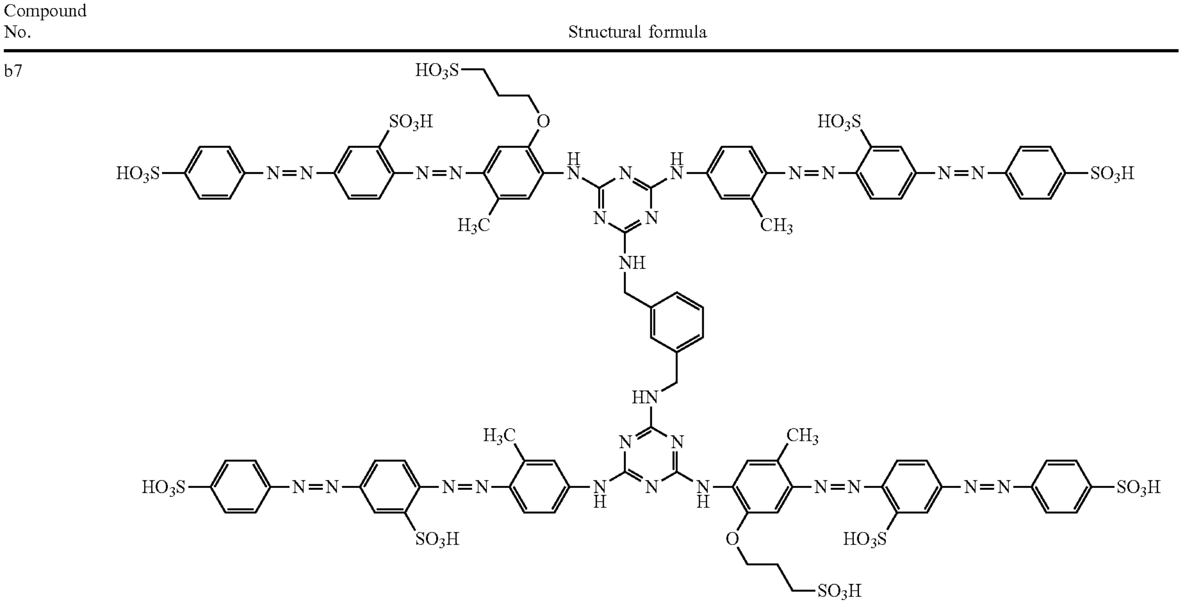 |
| b8 | 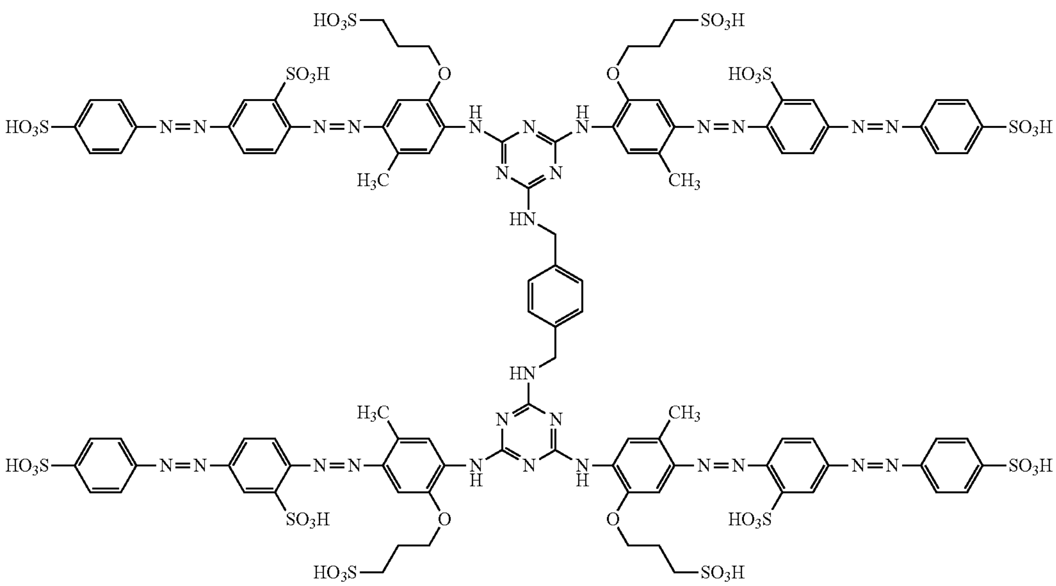 [SMILES: Cc1cc(Nc2nc(NCc3ccc(CNc4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)cc3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |
| b9 | 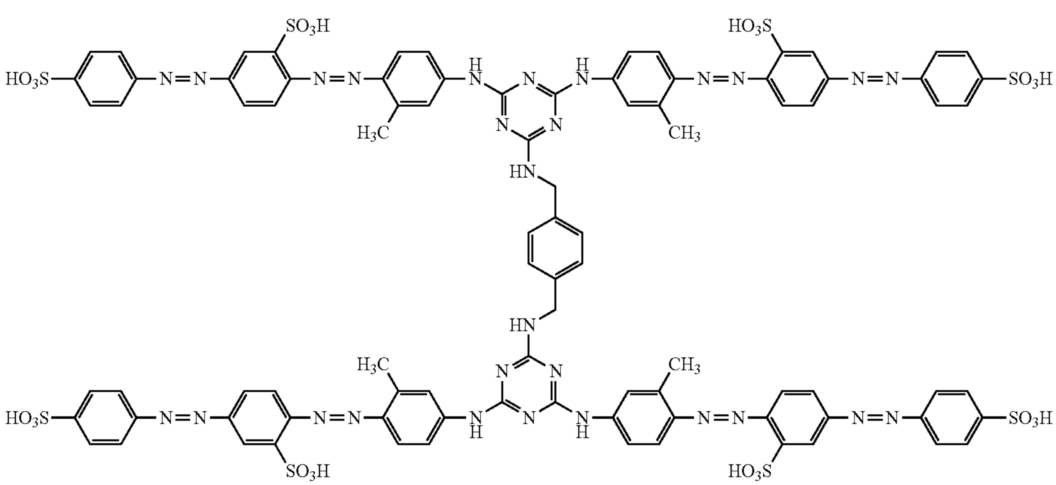 [SMILES: Cc1cc(Nc2nc(NCc3ccc(CNc4nc(Nc5ccc(N=Nc6ccc(N=Nc7ccc(S(=O)(=O)O)cc7)cc6S(=O)(=O)O)c(C)c5)nc(Nc5ccc(N=Nc6ccc(N=Nc7ccc(S(=O)(=O)O)cc7)cc6S(=O)(=O)O)c(C)c5)n4)cc3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |

TABLE 10
| Compound No. | Structural formula |
|---|---|
| b10 | 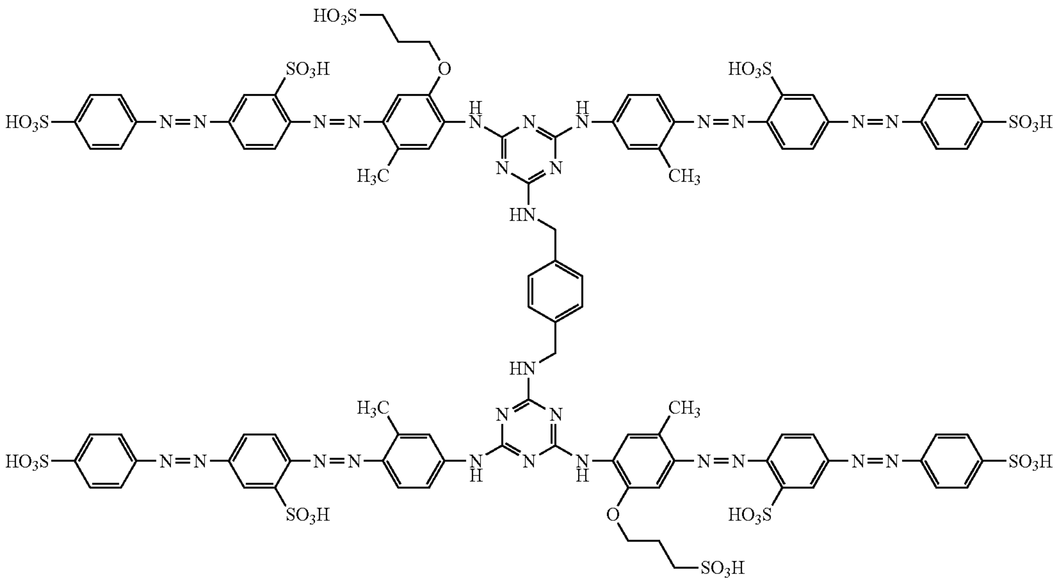 [SMILES: Cc1cc(Nc2nc(NCc3ccc(CNc4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)cc3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
| b11 | 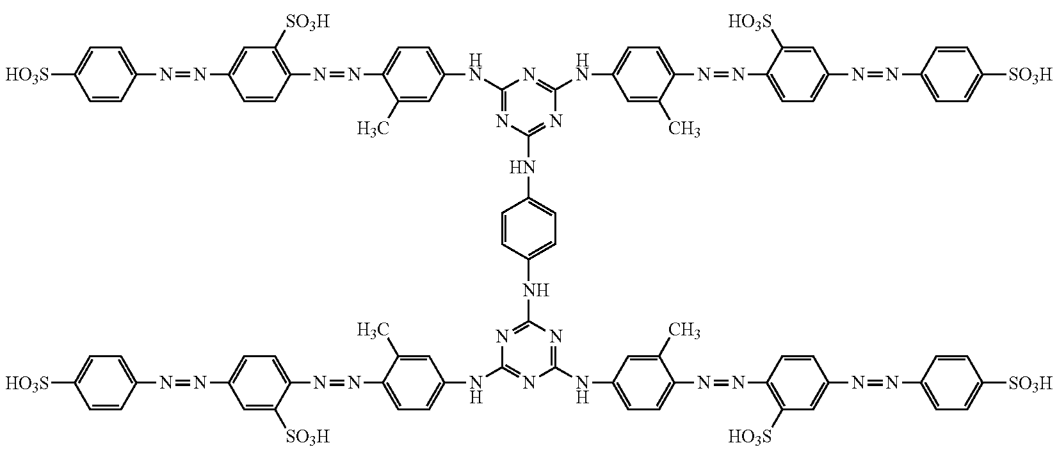 [SMILES: Cc1cc(Nc2nc(Nc3ccc(Nc4nc(Nc5ccc(N=Nc6ccc(N=Nc7ccc(S(=O)(=O)O)cc7)cc6S(=O)(=O)O)c(C)c5)nc(Nc5ccc(N=Nc6ccc(N=Nc7ccc(S(=O)(=O)O)cc7)cc6S(=O)(=O)O)c(C)c5)n4)cc3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |
| b12 | 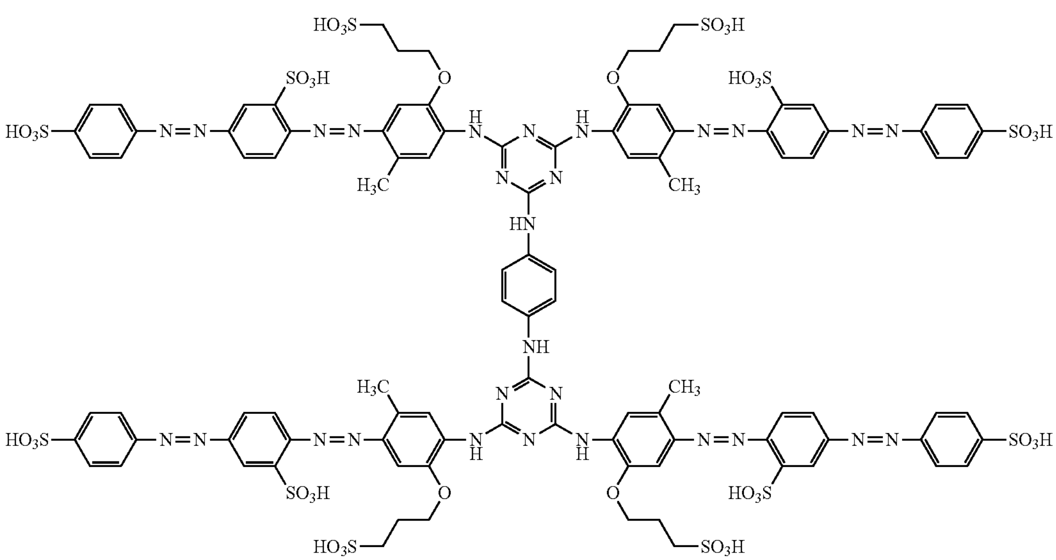 [SMILES: Cc1cc(Nc2nc(Nc3ccc(Nc4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)cc3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |

TABLE 11
| Compound No. | Structural formula |
|---|---|
| b13 | 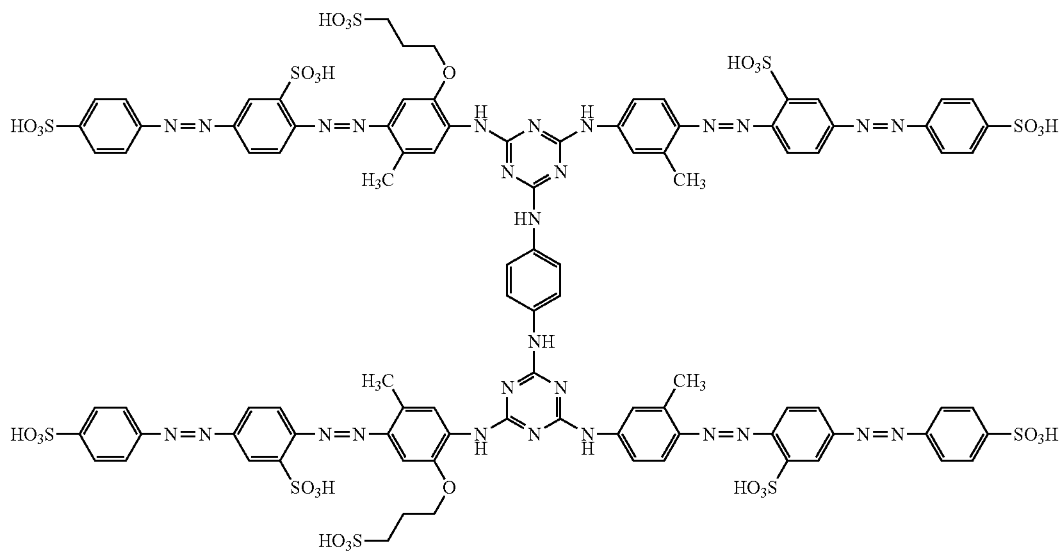 [SMILES: Cc1cc(Nc2nc(Nc3ccc(Nc4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)cc3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
| b14 | 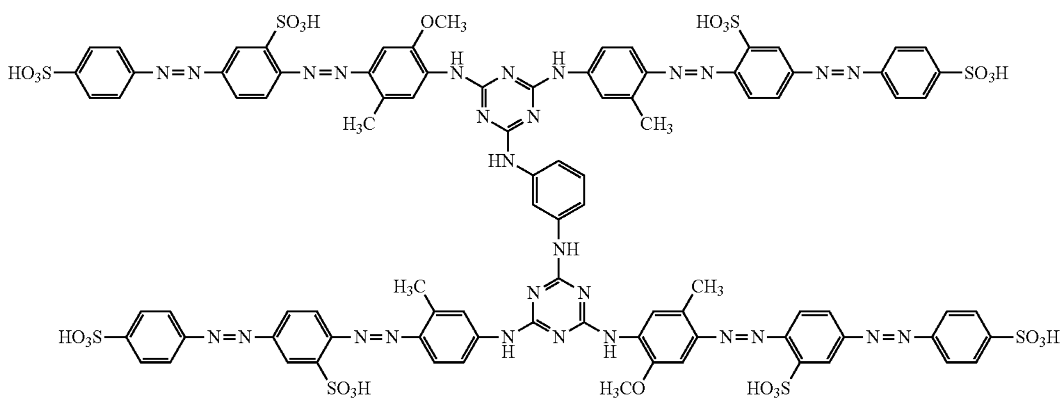 [SMILES: COc1cc(N=Nc2ccc(N=Nc3ccc(S(=O)(=O)O)cc3)cc2S(=O)(=O)O)c(C)cc1Nc1nc(Nc2cccc(Nc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OC)n3)c2)nc(Nc2ccc(N=Nc3ccc(N=Nc4ccc(S(=O)(=O)O)cc4)cc3S(=O)(=O)O)c(C)c2)n1] |
| b15 | 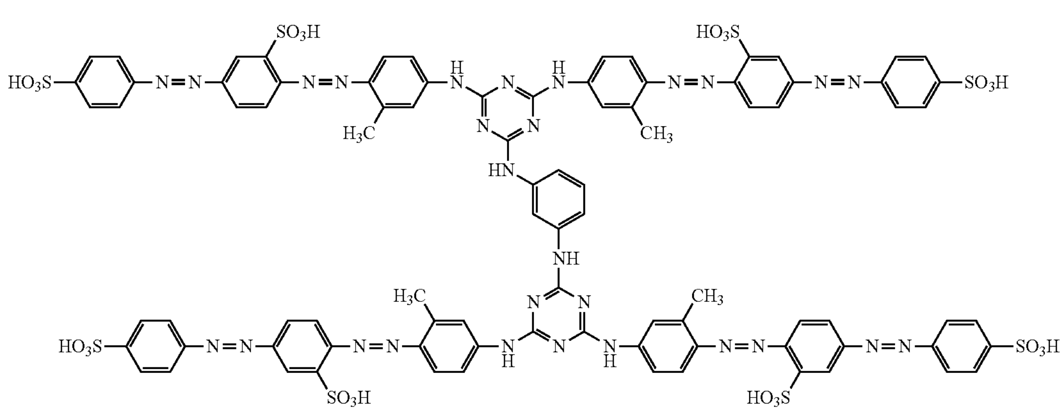 [SMILES: Cc1cc(Nc2nc(Nc3cccc(Nc4nc(Nc5ccc(N=Nc6ccc(N=Nc7ccc(S(=O)(=O)O)cc7)cc6S(=O)(=O)O)c(C)c5)nc(Nc5ccc(N=Nc6ccc(N=Nc7ccc(S(=O)(=O)O)cc7)cc6S(=O)(=O)O)c(C)c5)n4)c3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |

TABLE 11-continued
| Compound No. | Structural formula |
|---|---|
| b16 | 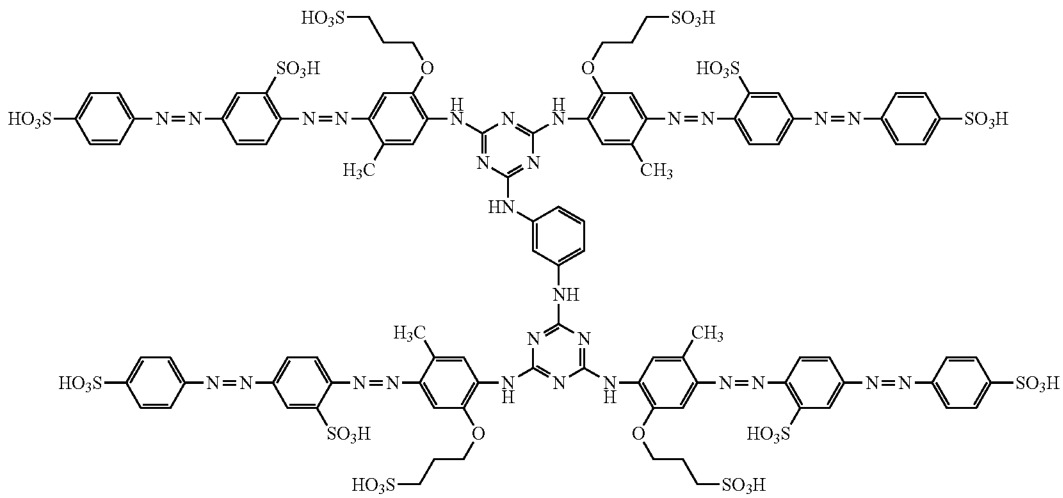 [SMILES: Cc1cc(Nc2nc(Nc3cccc(Nc4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)c3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |
TABLE 12
| Compound No | Structural formula |
|---|---|
| b17 | 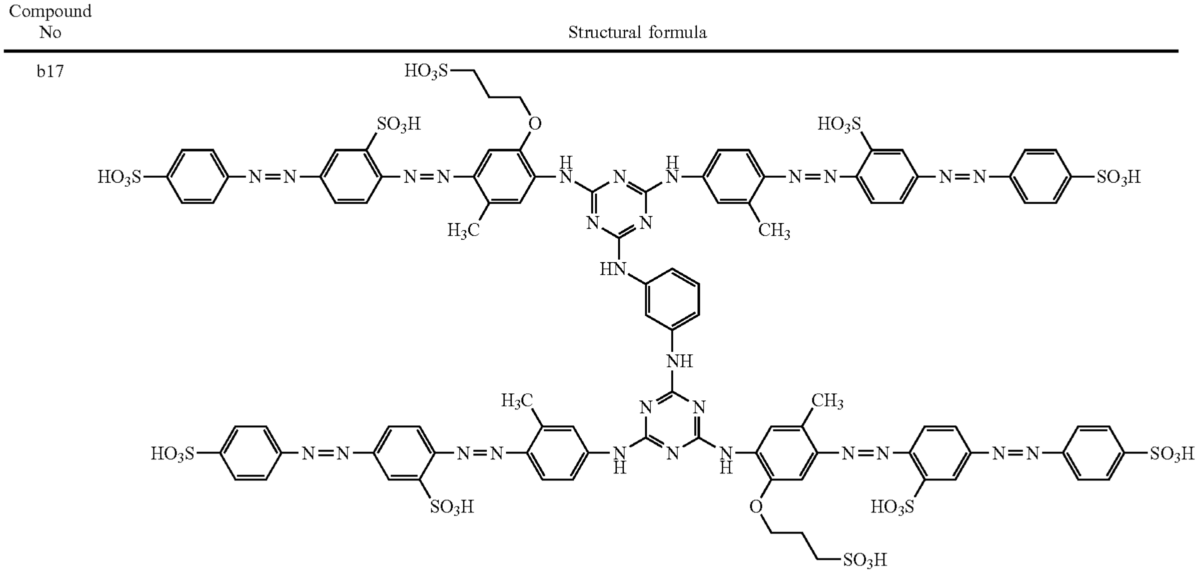 |
| b18 | 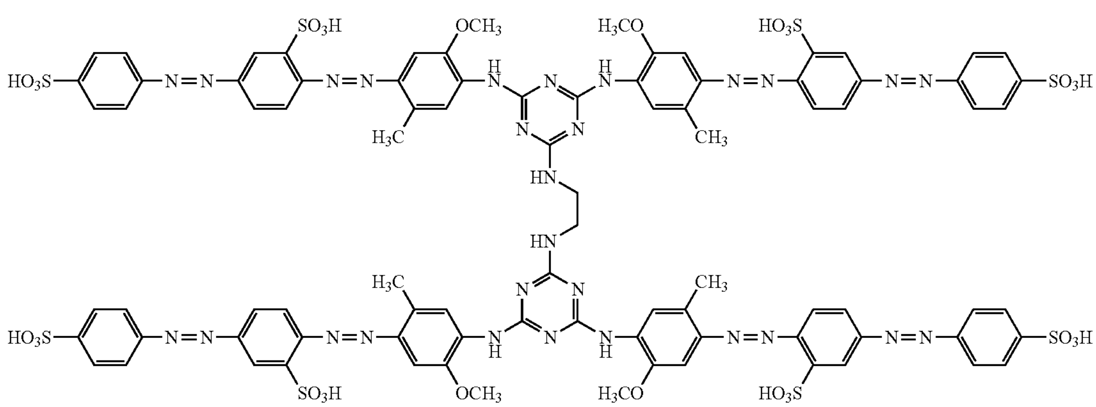 [SMILES: COc1cc(N=Nc2ccc(N=Nc3ccc(S(=O)(=O)O)cc3)cc2S(=O)(=O)O)c(C)cc1Nc1nc(NCCNc2nc(Nc3cc(C)c(N=Nc4ccc(N=Nc5ccc(S(=O)(=O)O)cc5)cc4S(=O)(=O)O)cc3OC)nc(Nc3cc(C)c(N=Nc4ccc(N=Nc5ccc(S(=O)(=O)O)cc5)cc4S(=O)(=O)O)cc3OC)n2)nc(Nc2cc(C)c(N=Nc3ccc(N=Nc4ccc(S(=O)(=O)O)cc4)cc3S(=O)(=O)O)cc2OC)n1] |

TABLE 12-continued
| Compound No | Structural formula |
| --- | --- |
| b19 | 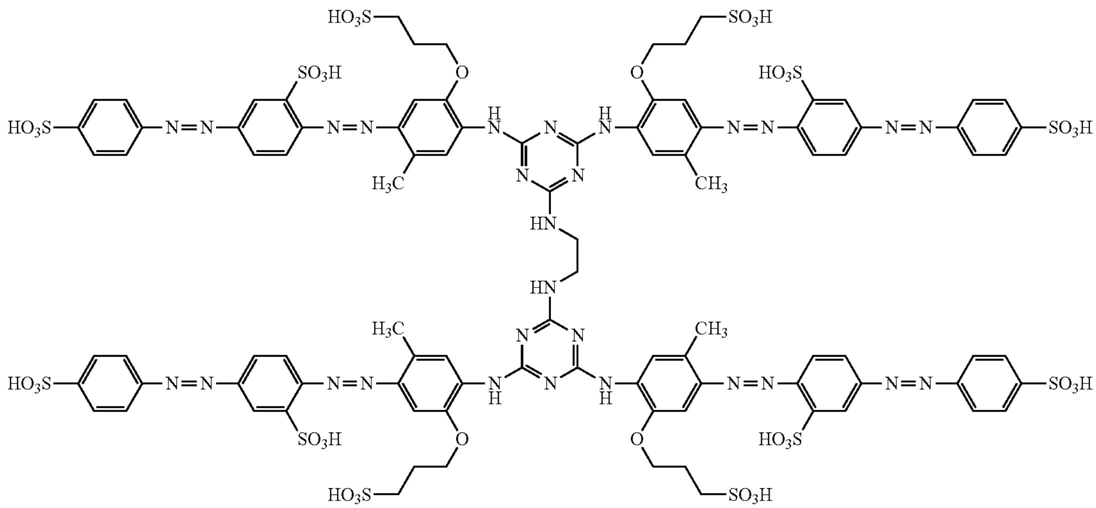 [SMILES: Cc1cc(Nc2nc(NCCNc3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |
| b20 | 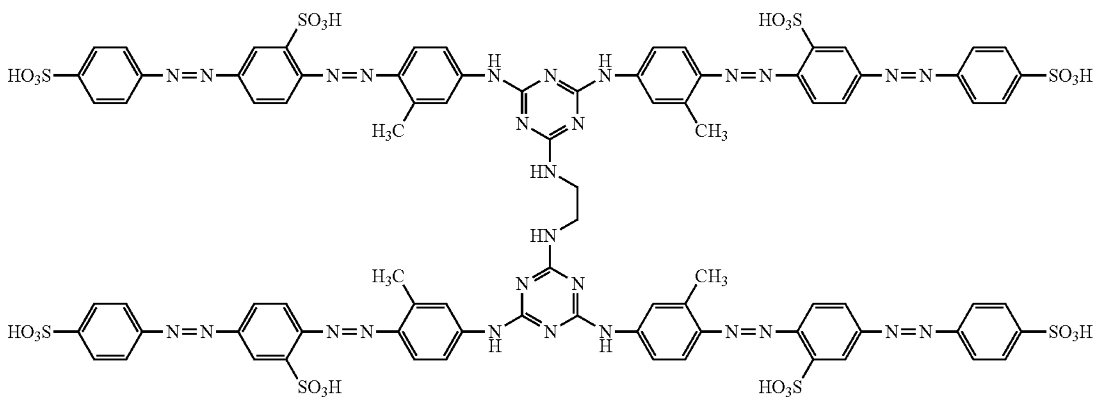 [SMILES: Cc1cc(Nc2nc(NCCNc3nc(Nc4ccc(N=Nc5ccc(N=Nc6ccc(S(=O)(=O)O)cc6)cc5S(=O)(=O)O)c(C)c4)nc(Nc4ccc(N=Nc5ccc(N=Nc6ccc(S(=O)(=O)O)cc6)cc5S(=O)(=O)O)c(C)c4)n3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |
TABLE 13
| Compound No | Structural formula |
| --- | --- |
| b21 | 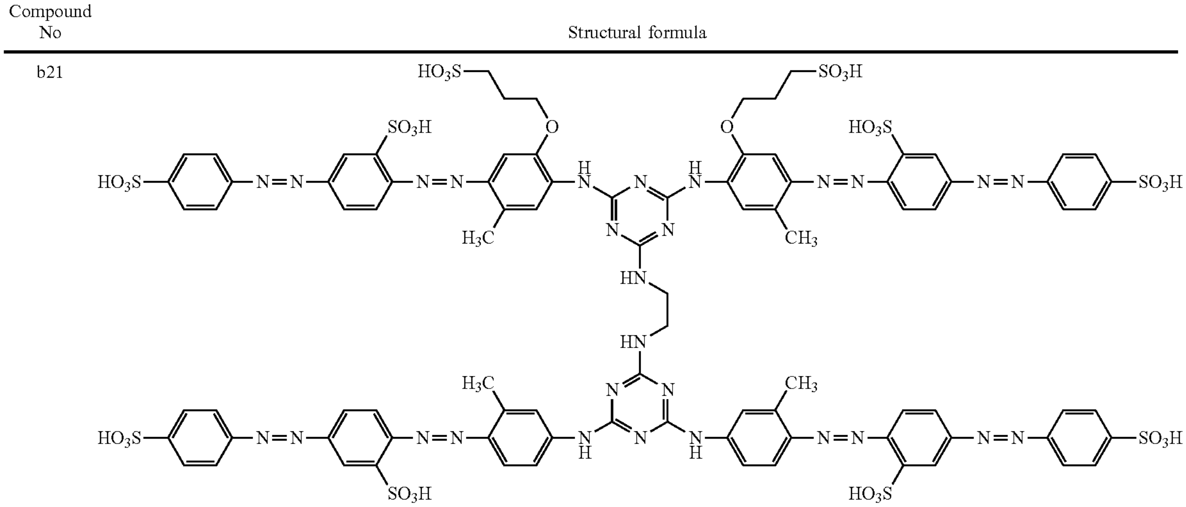 |

TABLE 13-continued
| Compound No | Structural formula |
|---|---|
| b22 | 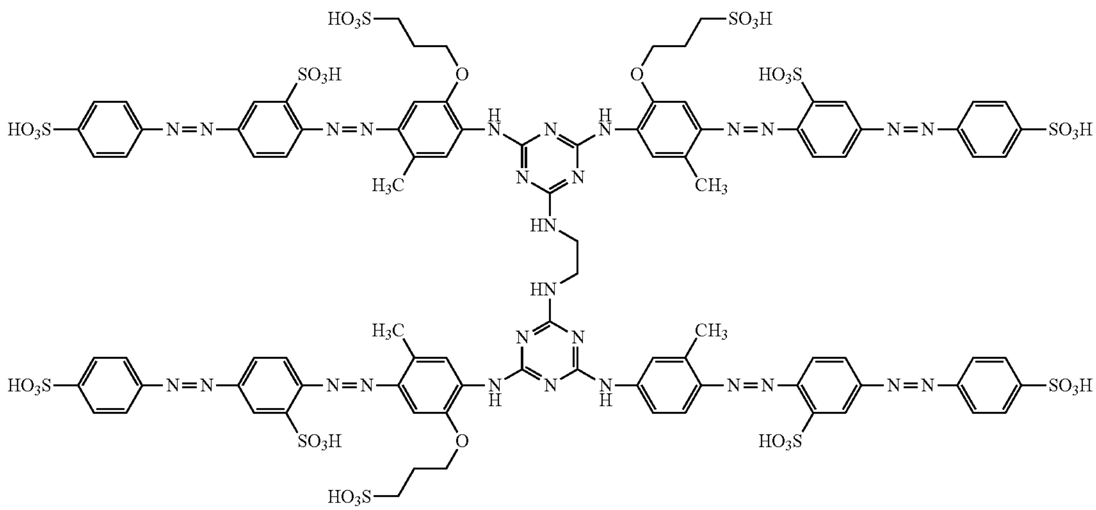 [SMILES: Cc1cc(Nc2nc(NCCNc3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
| b23 | 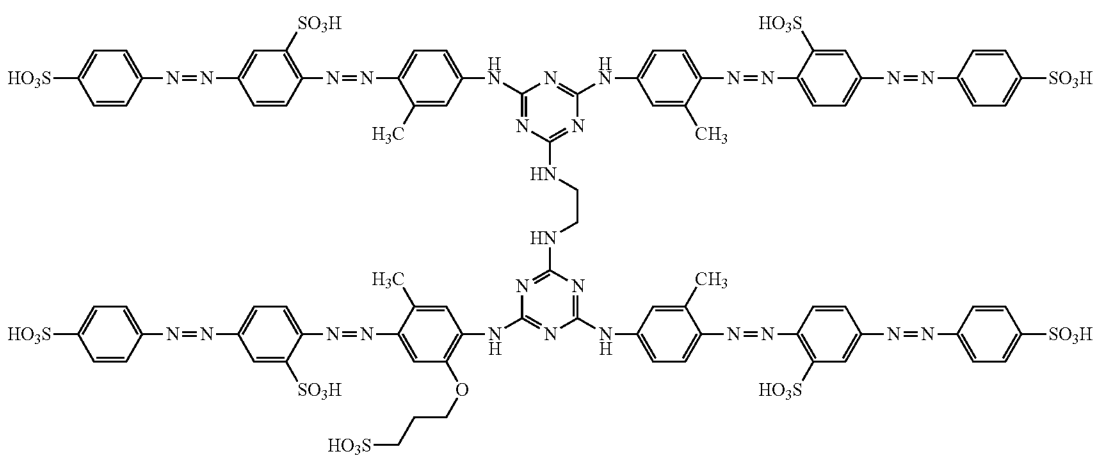 [SMILES: Cc1cc(Nc2nc(NCCNc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |
| b24 | 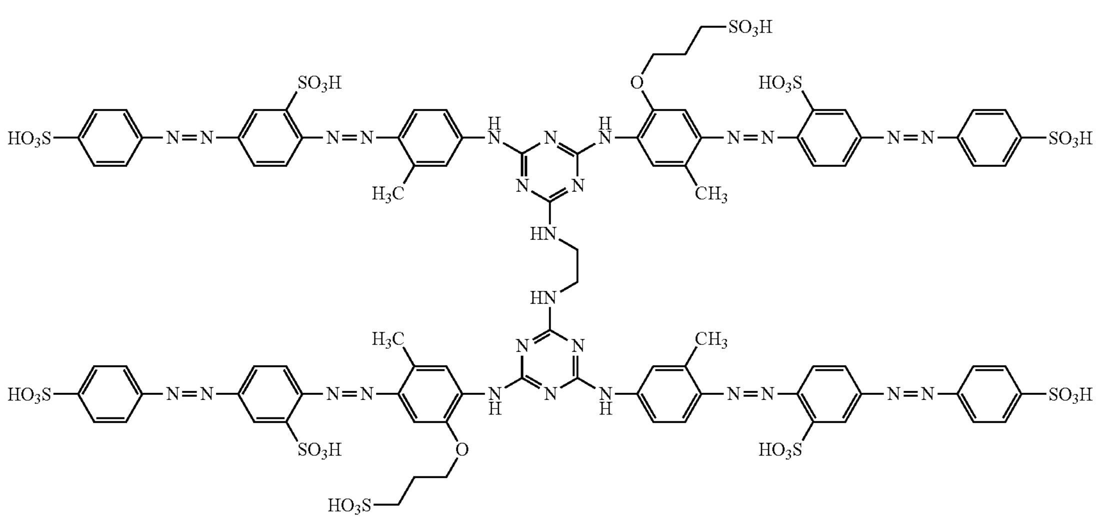 [SMILES: Cc1cc(Nc2nc(NCCNc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |

TABLE 14
| Compound No | Structural formula |
| --- | --- |
| b25 | 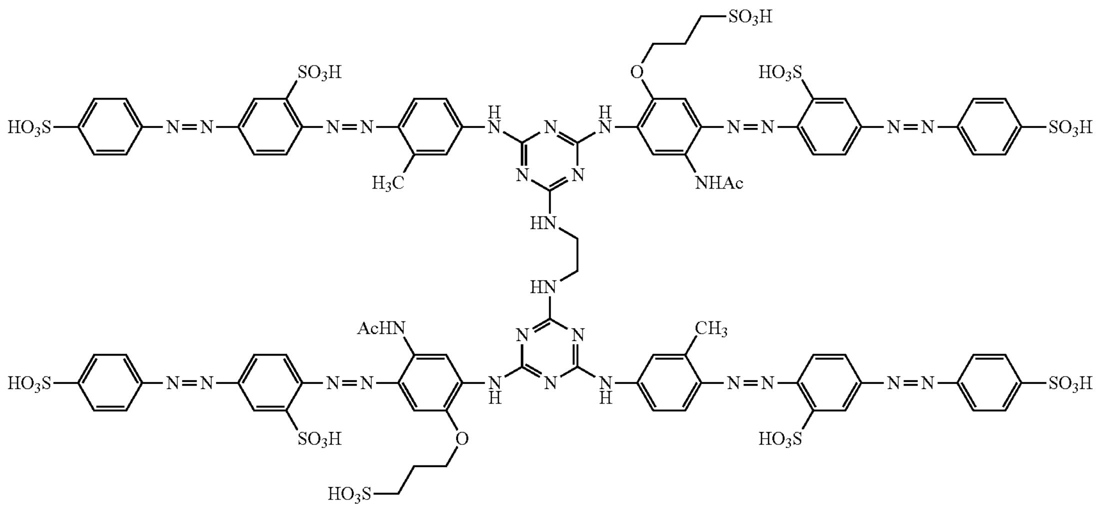 [SMILES: CC(=O)Nc1cc(Nc2nc(NCCNc3nc(Nc4ccc(N=Nc5ccc(N=Nc6ccc(S(=O)(=O)O)cc6)cc5S(=O)(=O)O)c(C)c4)nc(Nc4cc(NC(C)=O)c(N=Nc5ccc(N=Nc6ccc(S(=O)(=O)O)cc6)cc5S(=O)(=O)O)cc4OCCCS(=O)(=O)O)n3)nc(Nc3ccc(N=Nc4ccc(N=Nc5ccc(S(=O)(=O)O)cc5)cc4S(=O)(=O)O)c(C)c3)n2)c(OCCCS(=O)(=O)O)cc1N=Nc1ccc(N=Nc2ccc(S(=O)(=O)O)cc2)cc1S(=O)(=O)O] |
| b26 | 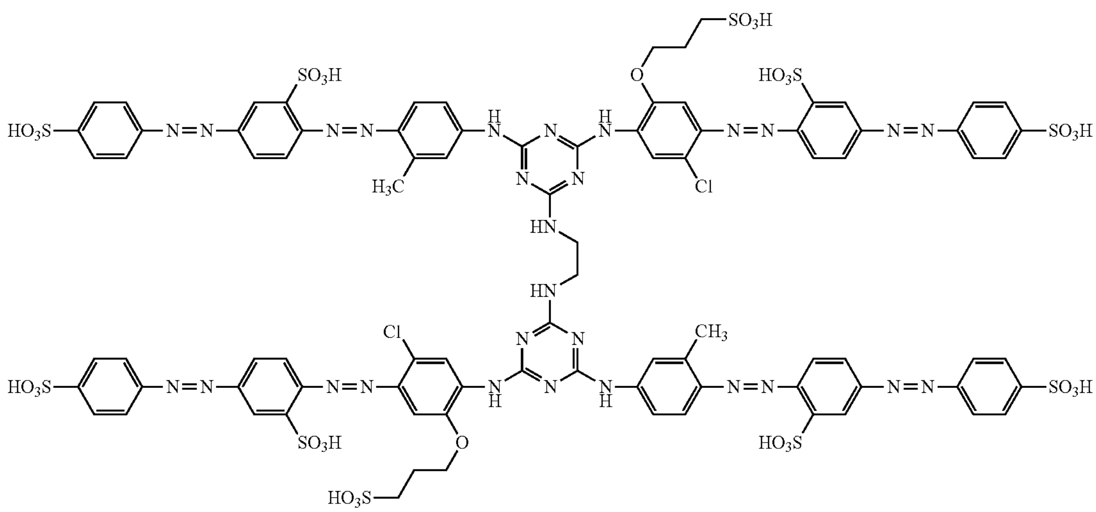 |
| b27 | 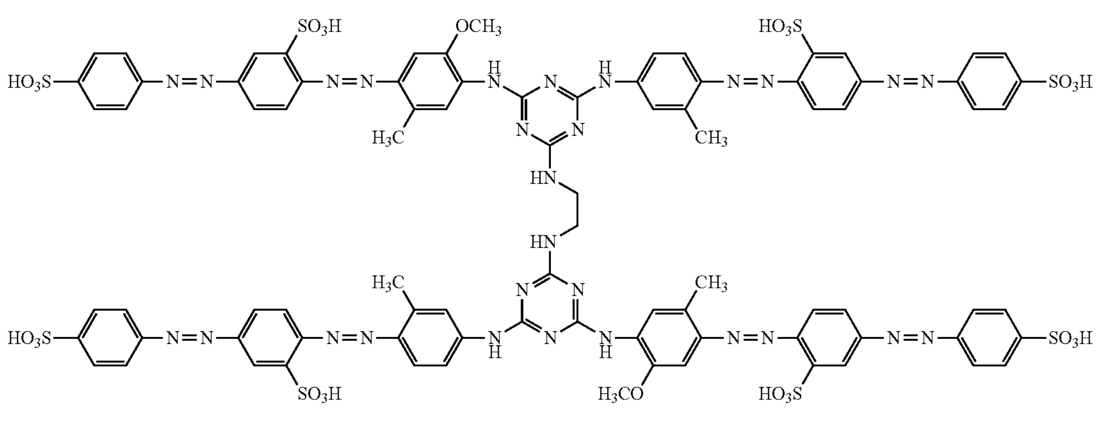 |

TABLE 14-continued
| Compound No | Structural formula |
|---|---|
| b28 | 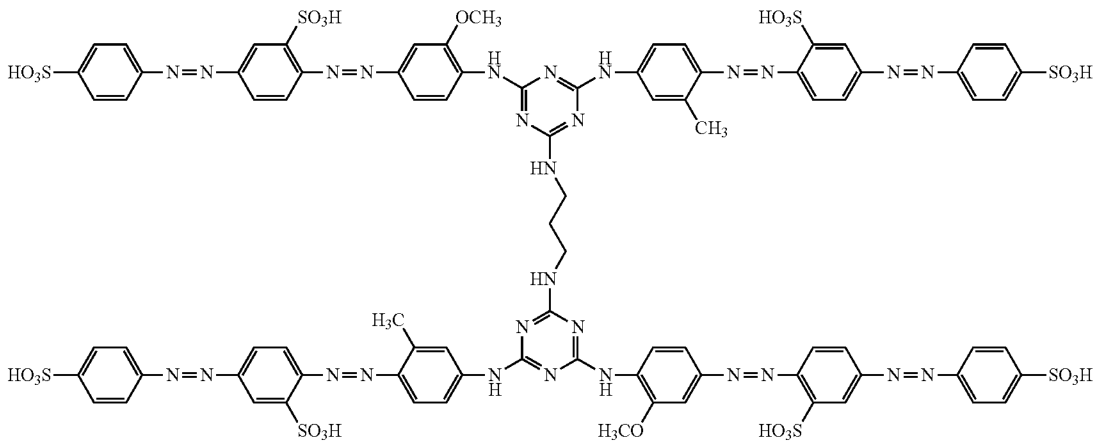 [SMILES: COc1cc(N=Nc2ccc(N=Nc3ccc(S(=O)(=O)O)cc3)cc2S(=O)(=O)O)ccc1Nc1nc(NCCCNc2nc(Nc3ccc(N=Nc4ccc(N=Nc5ccc(S(=O)(=O)O)cc5)cc4S(=O)(=O)O)c(C)c3)nc(Nc3ccc(N=Nc4ccc(N=Nc5ccc(S(=O)(=O)O)cc5)cc4S(=O)(=O)O)cc3OC)n2)nc(Nc2ccc(N=Nc3ccc(N=Nc4ccc(S(=O)(=O)O)cc4)cc3S(=O)(=O)O)c(C)c2)n1] |
TABLE 15
| Compound No | Structural formula |
|---|---|
| b29 | 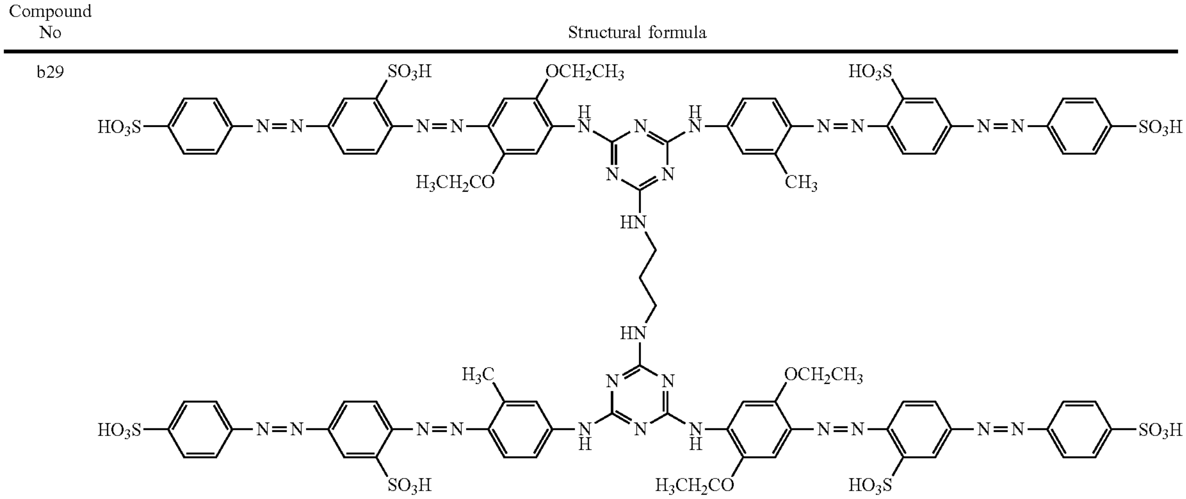 |
| b30 | 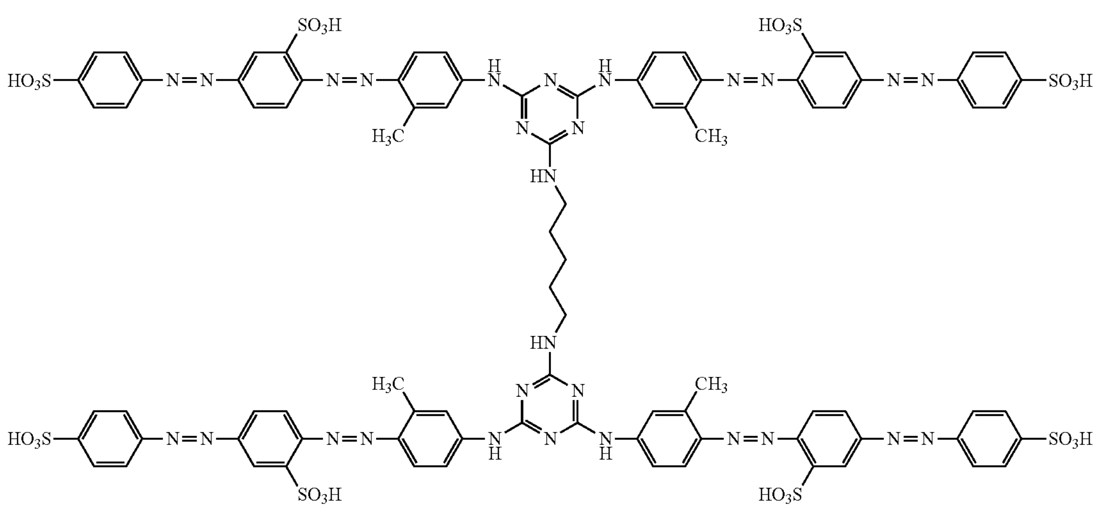 [SMILES: Cc1cc(Nc2nc(NCCCCCNc3nc(Nc4ccc(N=Nc5ccc(N=Nc6ccc(S(=O)(=O)O)cc6)cc5S(=O)(=O)O)c(C)c4)nc(Nc4ccc(N=Nc5ccc(N=Nc6ccc(S(=O)(=O)O)cc6)cc5S(=O)(=O)O)c(C)c4)n3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |

TABLE 15-continued
| Compound No | Structural formula |
|---|---|
| b31 | 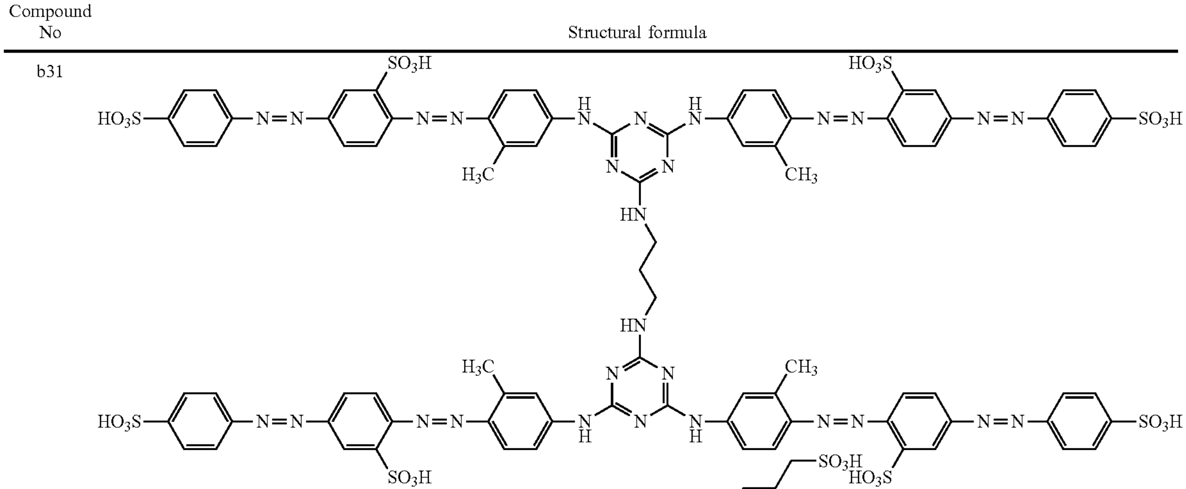 |
| b32 | 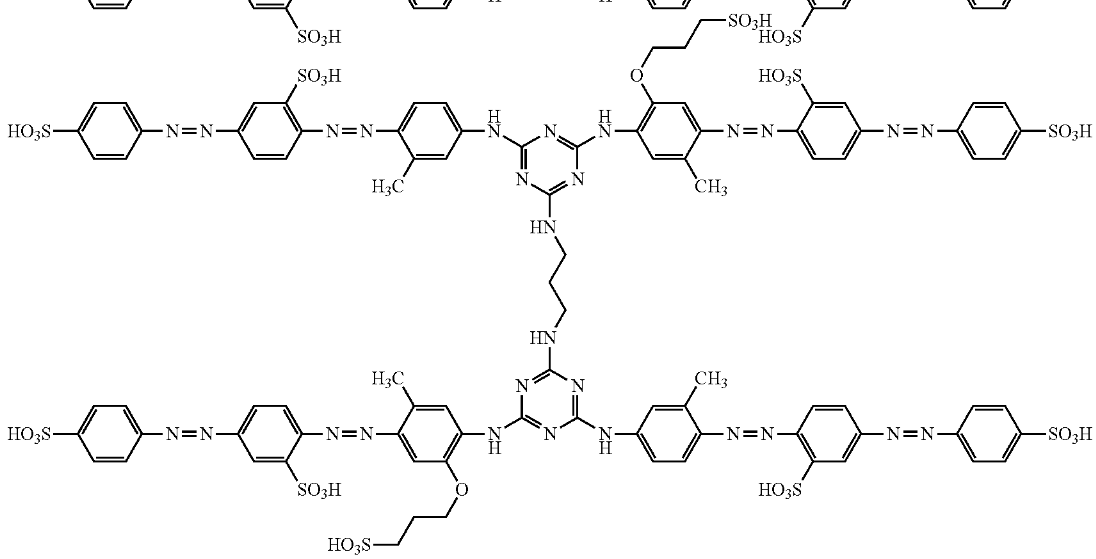 |
TABLE 16
| Compound No | Structural formula |
|---|---|
| b33 | 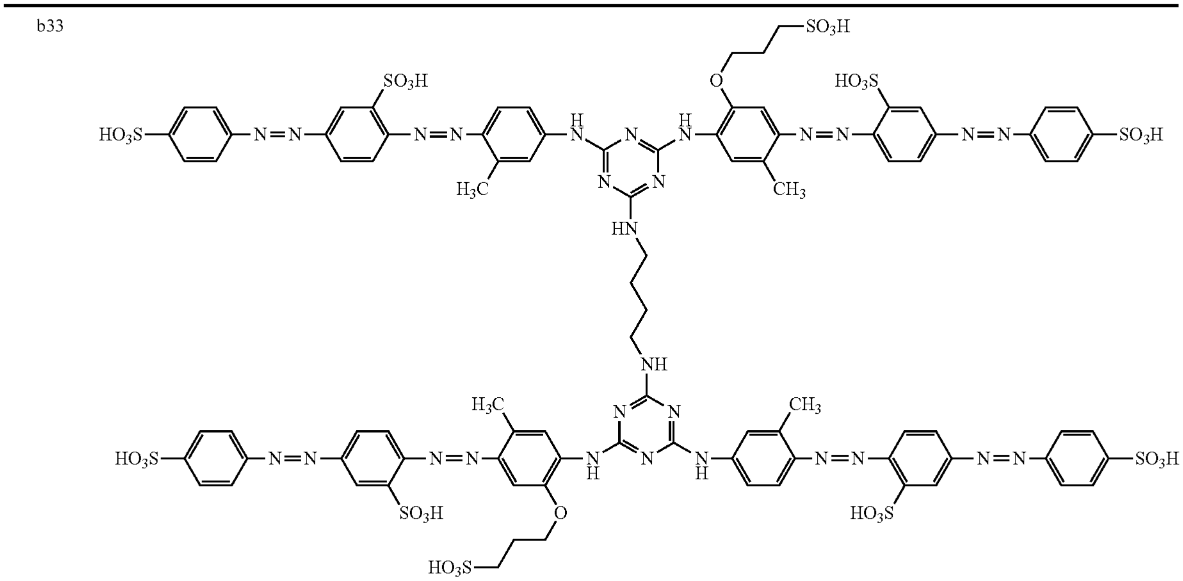 |

TABLE 16-continued
| Compound No | Structural formula |
|---|---|
| b34 | 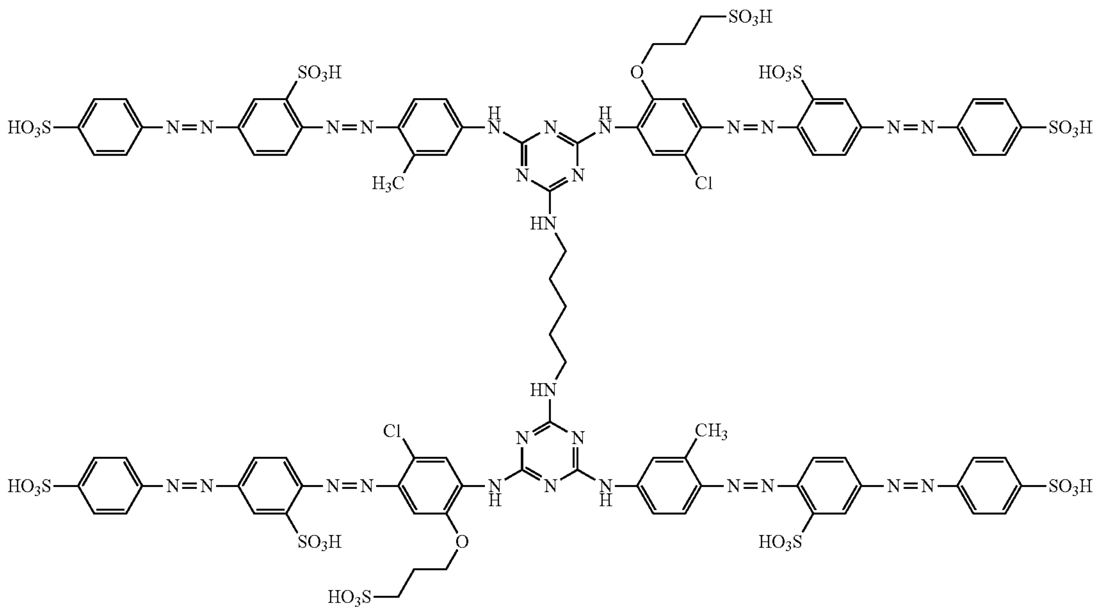 |
| b35 | 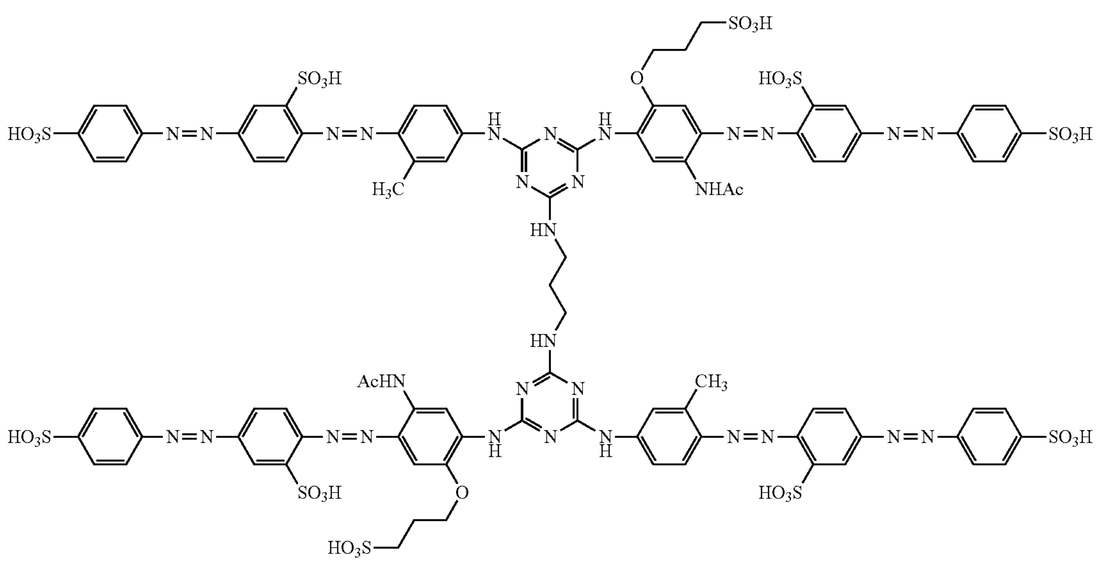 [SMILES: Cc1cc(Nc2nc(NCCCNc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |

TABLE 17
| Compound No | Structural formula |
|---|---|
| b36 | 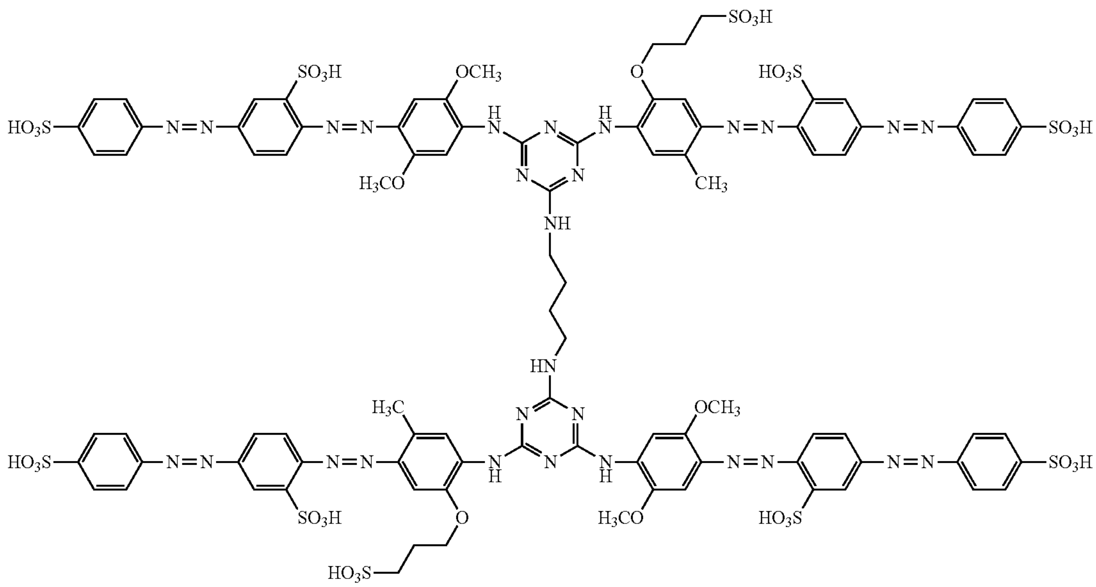 [SMILES: COc1cc(Nc2nc(NCCCCNc3nc(Nc4cc(OC)c(N=Nc5ccc(N=Nc6ccc(S(=O)(=O)O)cc6)cc5S(=O)(=O)O)cc4OC)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)c(OC)cc1N=Nc1ccc(N=Nc2ccc(S(=O)(=O)O)cc2)cc1S(=O)(=O)O] |
| b37 | 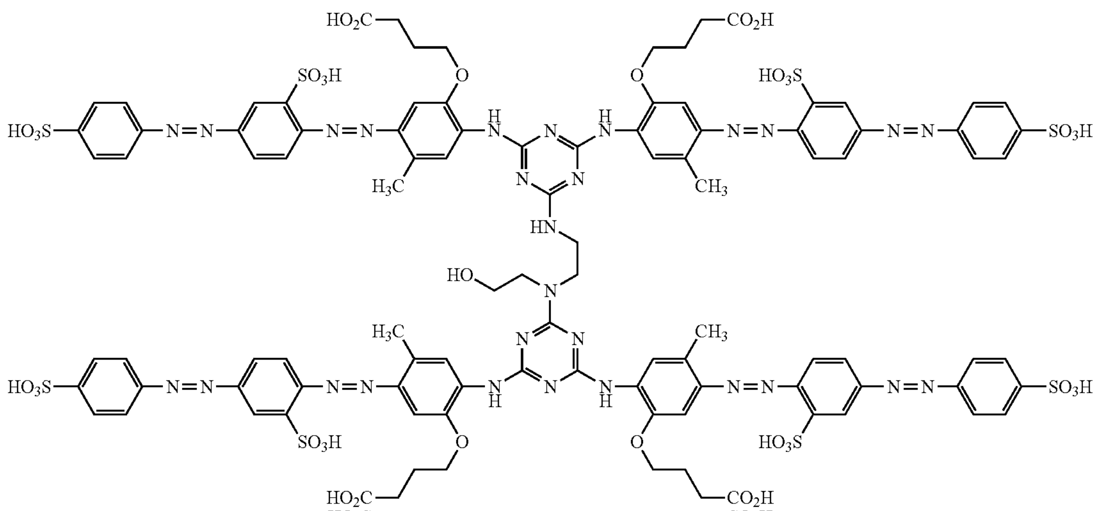 [SMILES: Cc1cc(Nc2nc(NCCN(CCO)c3nc(Nc4cc(C)c(N=Nc5ccc(N=Nc6ccc(S(=O)(=O)O)cc6)cc5S(=O)(=O)O)cc4OCCCC(=O)O)nc(Nc4cc(C)c(N=Nc5ccc(N=Nc6ccc(S(=O)(=O)O)cc6)cc5S(=O)(=O)O)cc4OCCCC(=O)O)n3)nc(Nc3cc(C)c(N=Nc4ccc(N=Nc5ccc(S(=O)(=O)O)cc5)cc4S(=O)(=O)O)cc3OCCCC(=O)O)n2)c(OCCCC(=O)O)cc1N=Nc1ccc(N=Nc2ccc(S(=O)(=O)O)cc2)cc1S(=O)(=O)O] |
| b38 | 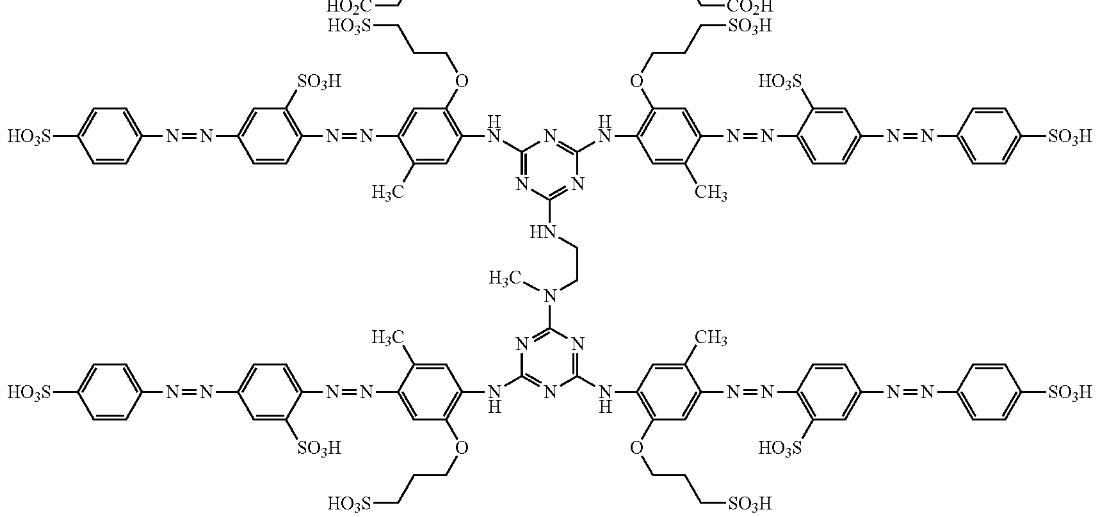 |

TABLE 18
| Compound No | Structural formula |
| --- | --- |
| b39 | 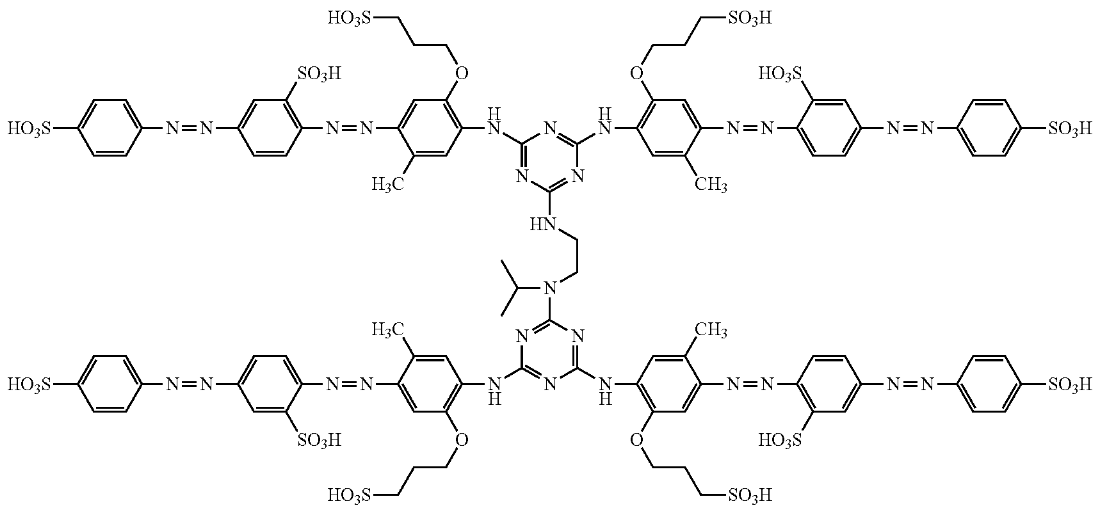 [SMILES: Cc1cc(Nc2nc(NCCN(c3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)C(C)C)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |
| b40 | 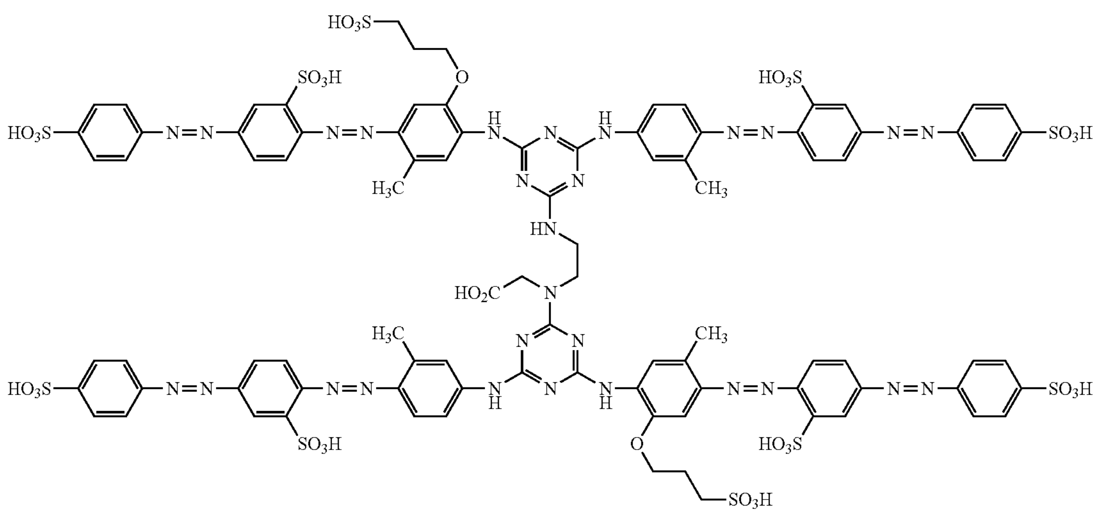 [SMILES: Cc1cc(Nc2nc(NCCN(CC(=O)O)c3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
| b41 | 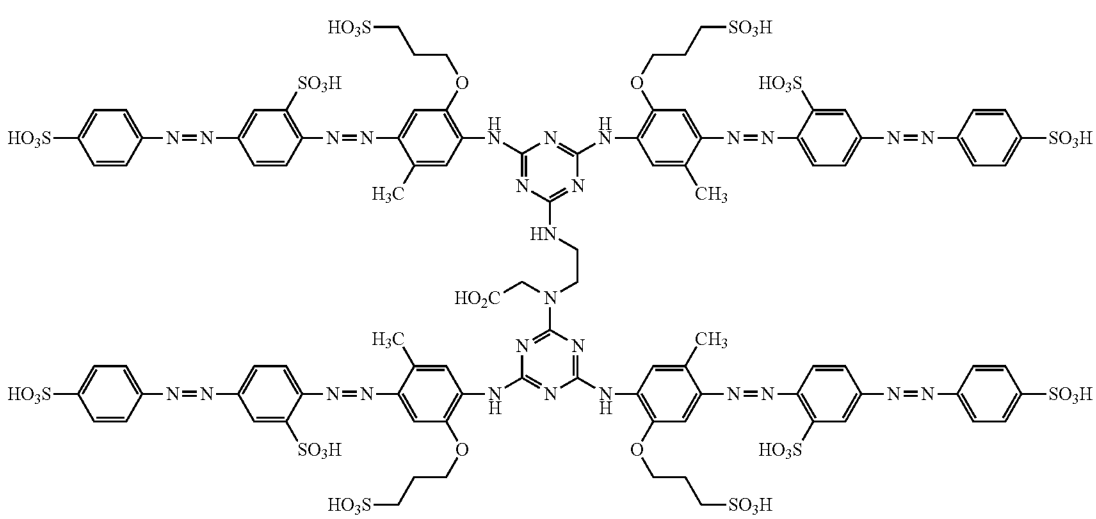 [SMILES: Cc1cc(Nc2nc(NCCN(CCO)c3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |

TABLE 19
| Compound No | Structural formula |
| --- | --- |
| b42 | 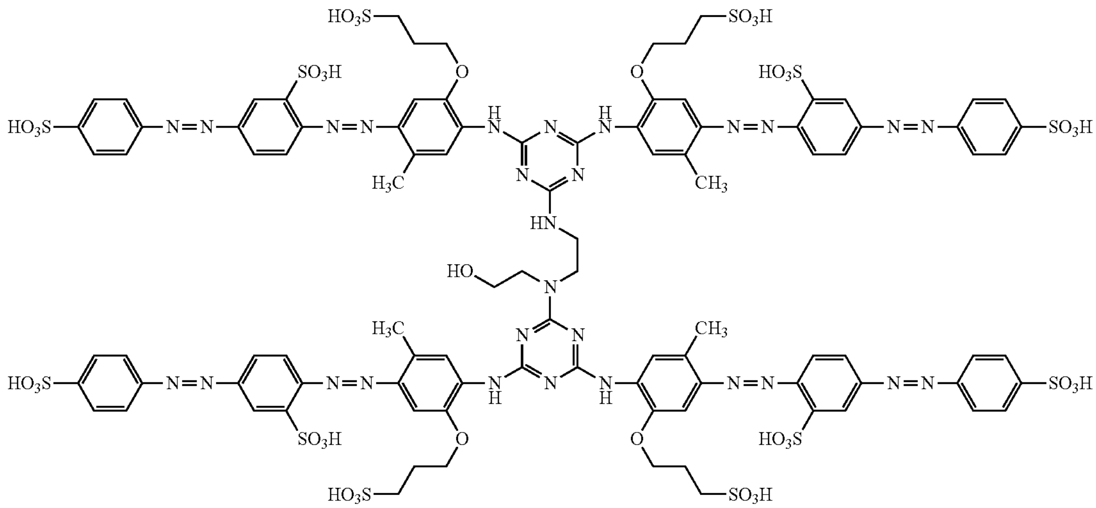 |
| b43 | 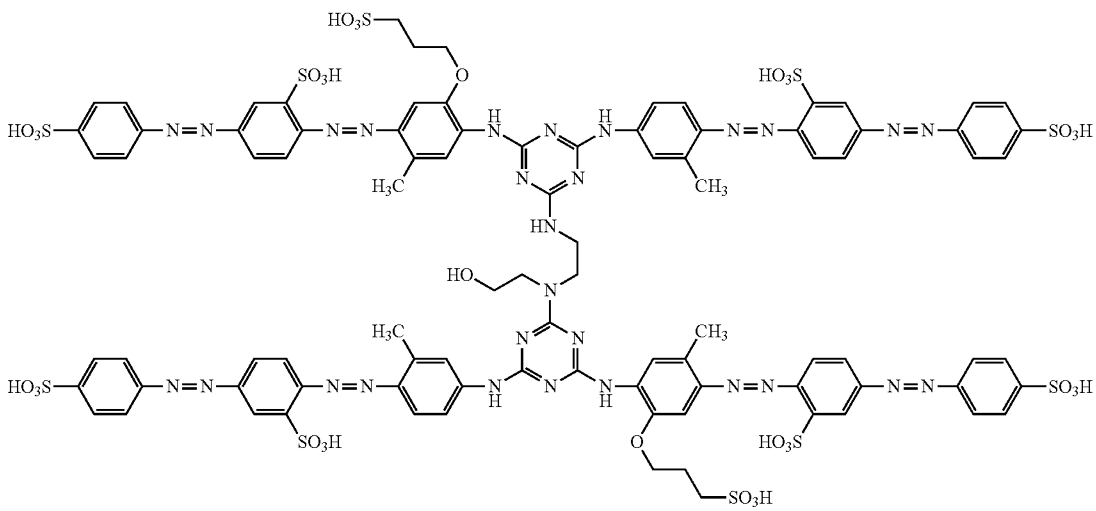 [SMILES: Cc1cc(Nc2nc(NCCN(CCO)c3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
| b44 | 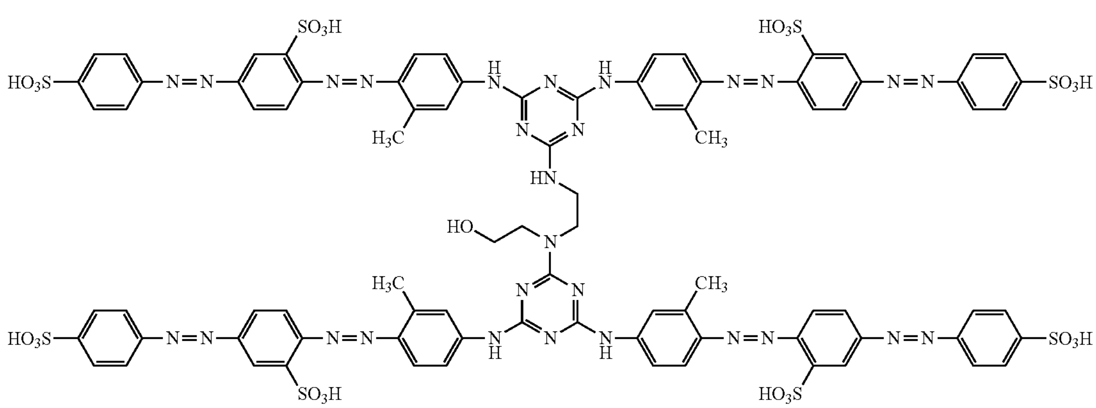 [SMILES: Cc1cc(Nc2nc(NCCN(CCO)c3nc(Nc4ccc(N=Nc5ccc(N=Nc6ccc(S(=O)(=O)O)cc6)cc5S(=O)(=O)O)c(C)c4)nc(Nc4ccc(N=Nc5ccc(N=Nc6ccc(S(=O)(=O)O)cc6)cc5S(=O)(=O)O)c(C)c4)n3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |

TABLE 19-continued
| Compound No | Structural formula |
|---|---|
| b45 | 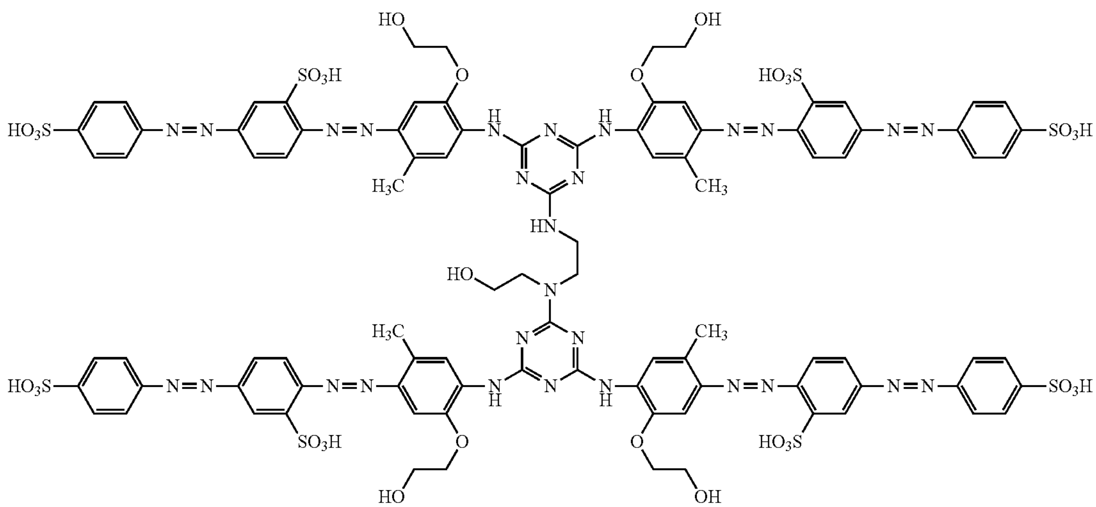 [SMILES: Cc1cc(Nc2nc(NCCN(CCO)c3nc(Nc4cc(C)c(N=Nc5ccc(N=Nc6ccc(S(=O)(=O)O)cc6)cc5S(=O)(=O)O)cc4OCCO)nc(Nc4cc(C)c(N=Nc5ccc(N=Nc6ccc(S(=O)(=O)O)cc6)cc5S(=O)(=O)O)cc4OCCO)n3)nc(Nc3cc(C)c(N=Nc4ccc(N=Nc5ccc(S(=O)(=O)O)cc5)cc4S(=O)(=O)O)cc3OCCO)n2)c(OCCO)cc1N=Nc1ccc(N=Nc2ccc(S(=O)(=O)O)cc2)cc1S(=O)(=O)O] |
TABLE 20
| Compound No | Structural formula |
|---|---|
| b46 | 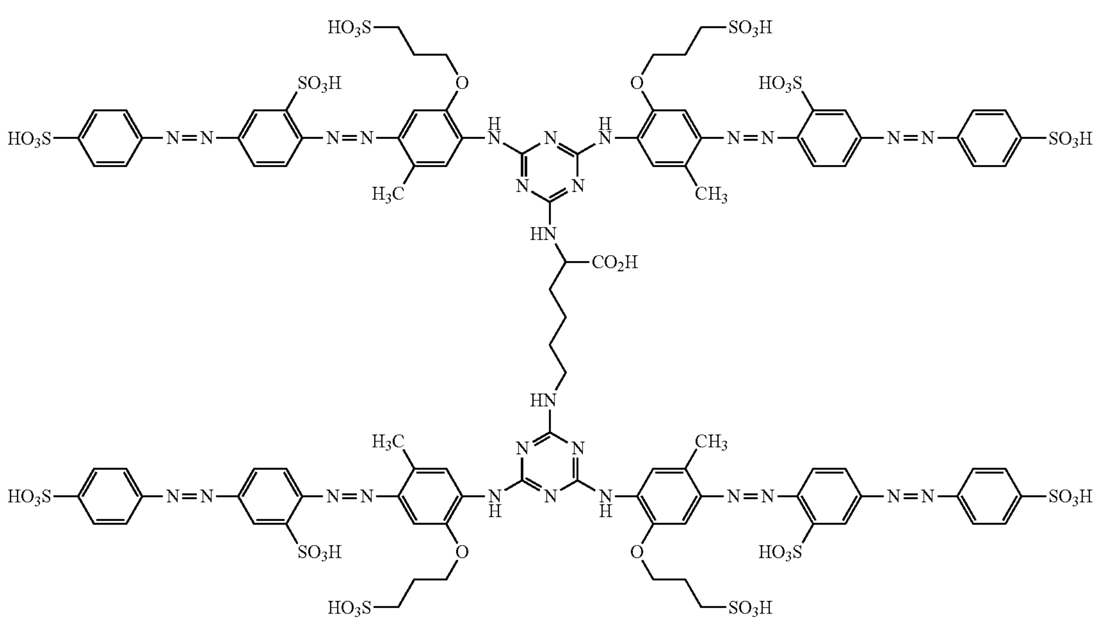 |

TABLE 20-continued
| Compound No | Structural formula |
| --- | --- |
| b47 | 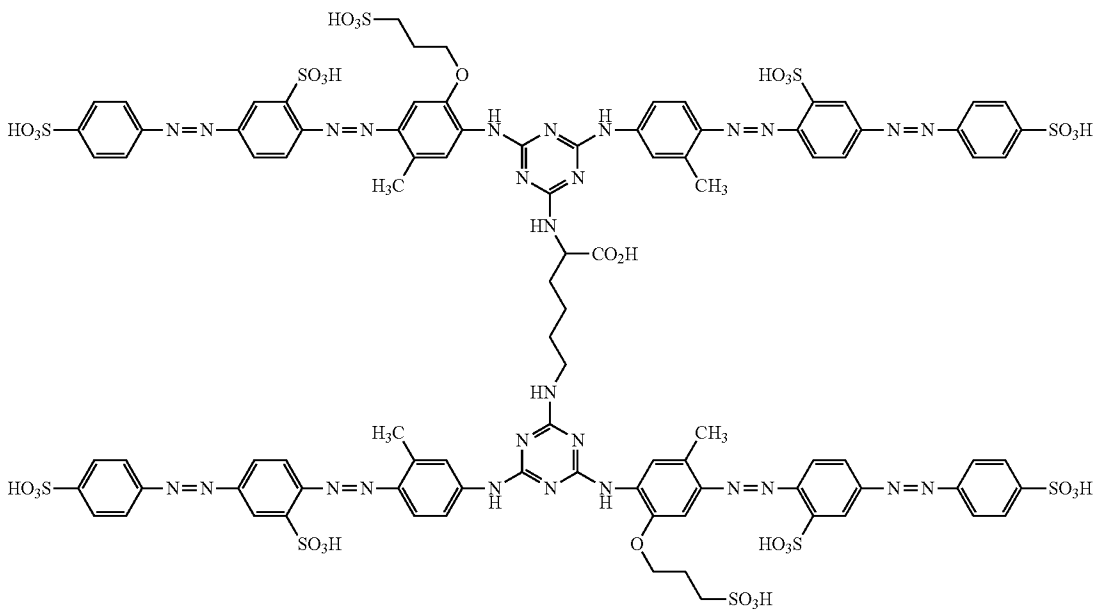 [SMILES: Cc1cc(Nc2nc(NCCCCC(Nc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)C(=O)O)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
| b48 | 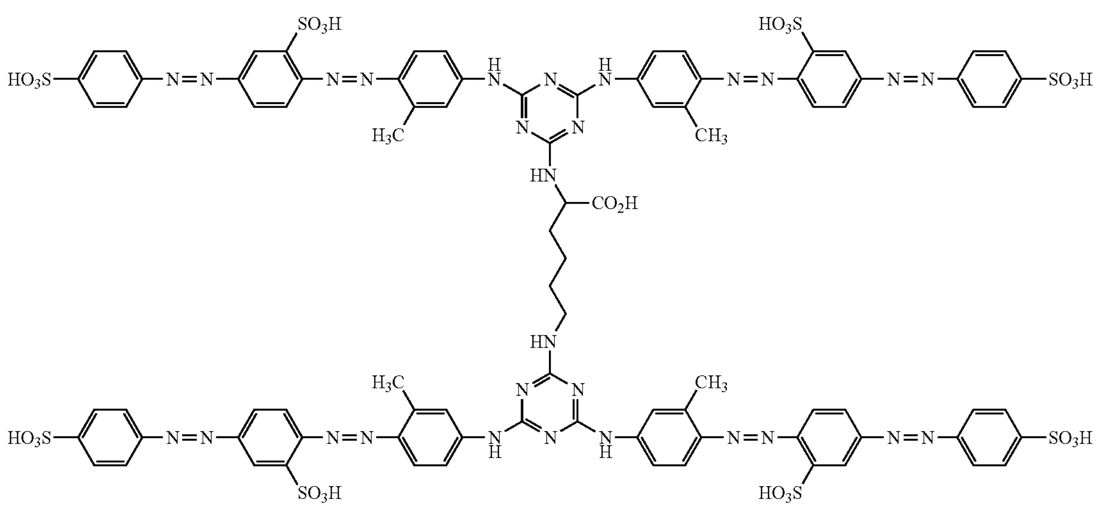 [SMILES: Cc1cc(Nc2nc(NCCCCC(Nc3nc(Nc4ccc(N=Nc5ccc(N=Nc6ccc(S(=O)(=O)O)cc6)cc5S(=O)(=O)O)c(C)c4)nc(Nc4ccc(N=Nc5ccc(N=Nc6ccc(S(=O)(=O)O)cc6)cc5S(=O)(=O)O)c(C)c4)n3)C(=O)O)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |

TABLE 21
| Compound No | Structural formula |
| --- | --- |
| b49 | 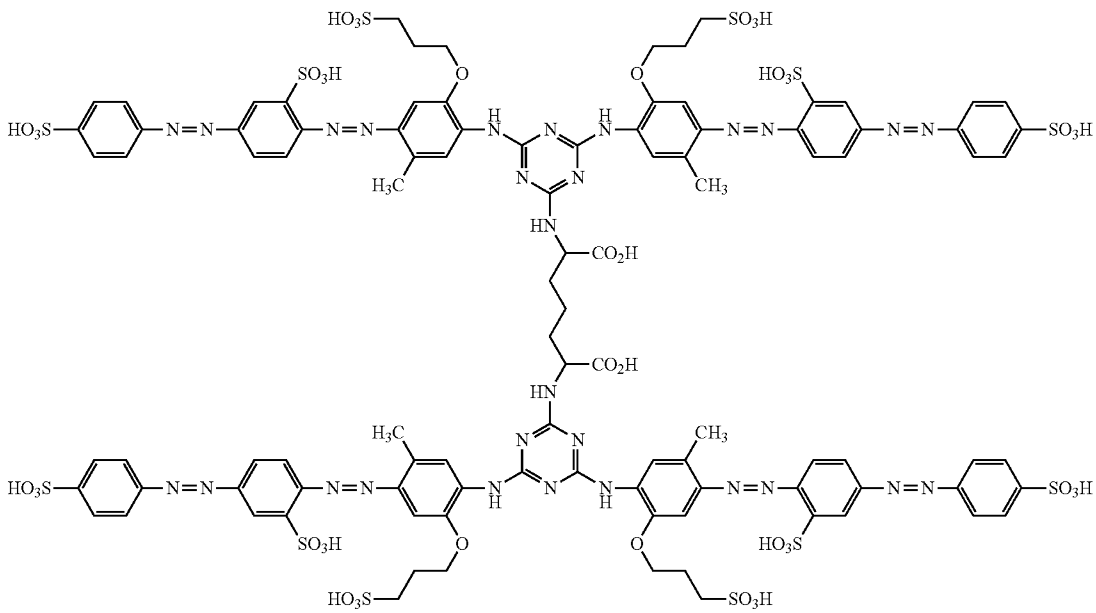 [SMILES: Cc1cc(Nc2nc(Nc3cc(C)c(N=Nc4ccc(N=Nc5ccc(S(=O)(=O)O)cc5)cc4S(=O)(=O)O)cc3OCCCS(=O)(=O)O)nc(NC(CCCC(Nc3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)C(=O)O)C(=O)O)n2)c(OCCCS(=O)(=O)O)cc1N=Nc1ccc(N=Nc2ccc(S(=O)(=O)O)cc2)cc1S(=O)(=O)O] |
| b50 | 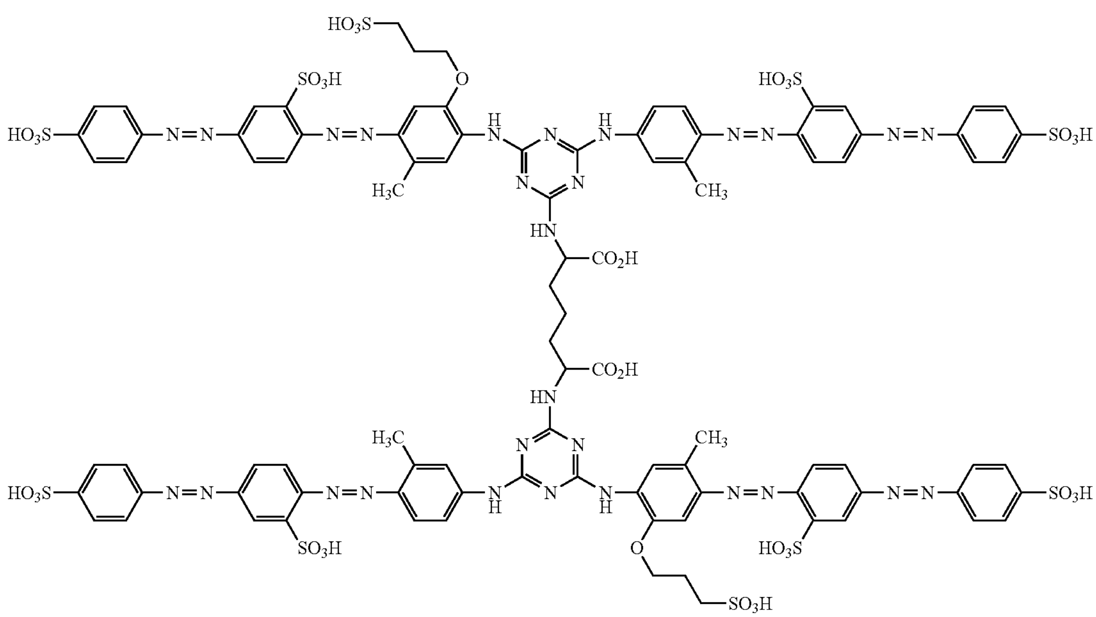 [SMILES: Cc1cc(Nc2nc(Nc3cc(C)c(N=Nc4ccc(N=Nc5ccc(S(=O)(=O)O)cc5)cc4S(=O)(=O)O)cc3OCCCS(=O)(=O)O)nc(NC(CCCC(Nc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)C(=O)O)C(=O)O)n2)ccc1N=Nc1ccc(N=Nc2ccc(S(=O)(=O)O)cc2)cc1S(=O)(=O)O] |

TABLE 21-continued
| Compound No | Structural formula |
|---|---|
| b51 | 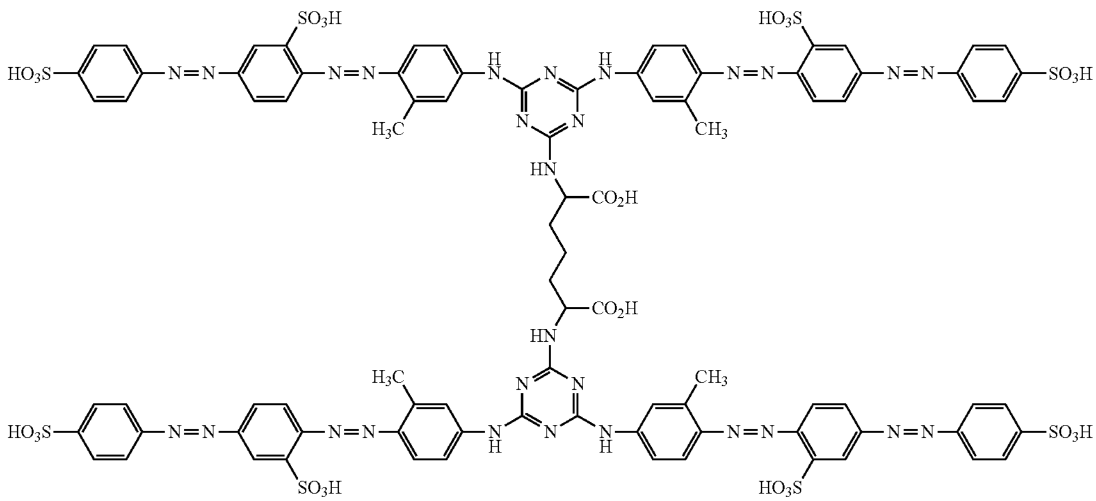 [SMILES: Cc1cc(Nc2nc(Nc3ccc(N=Nc4ccc(N=Nc5ccc(S(=O)(=O)O)cc5)cc4S(=O)(=O)O)c(C)c3)nc(NC(CCCC(Nc3nc(Nc4ccc(N=Nc5ccc(N=Nc6ccc(S(=O)(=O)O)cc6)cc5S(=O)(=O)O)c(C)c4)nc(Nc4ccc(N=Nc5ccc(N=Nc6ccc(S(=O)(=O)O)cc6)cc5S(=O)(=O)O)c(C)c4)n3)C(=O)O)C(=O)O)n2)ccc1N=Nc1ccc(N=Nc2ccc(S(=O)(=O)O)cc2)cc1S(=O)(=O)O] |
TABLE 22
| Compound No | Structural formula |
|---|---|
| b52 | 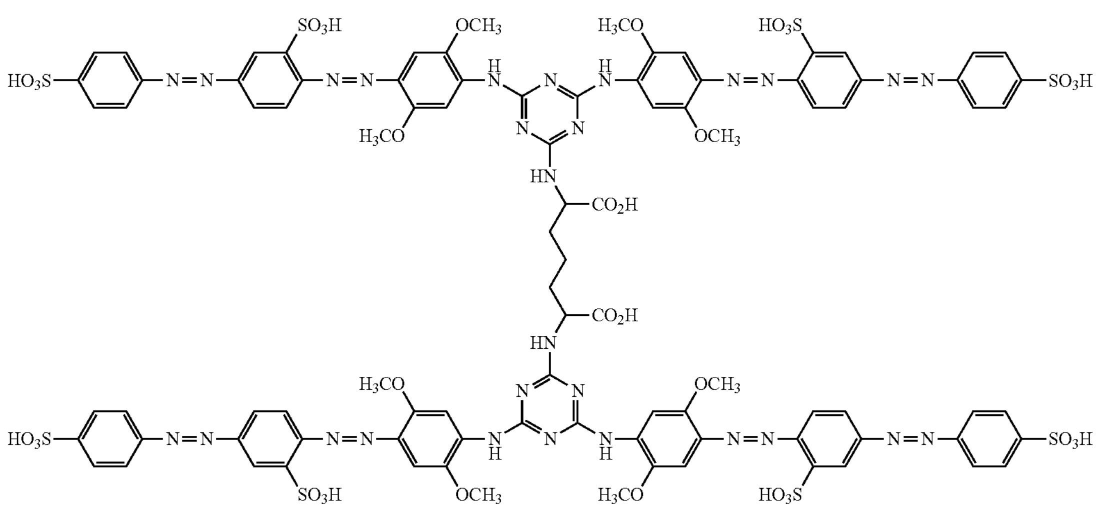 [SMILES: COc1cc(Nc2nc(Nc3cc(OC)c(N=Nc4ccc(N=Nc5ccc(S(=O)(=O)O)cc5)cc4S(=O)(=O)O)cc3OC)nc(NC(CCCC(Nc3nc(Nc4cc(OC)c(N=Nc5ccc(N=Nc6ccc(S(=O)(=O)O)cc6)cc5S(=O)(=O)O)cc4OC)nc(Nc4cc(OC)c(N=Nc5ccc(N=Nc6ccc(S(=O)(=O)O)cc6)cc5S(=O)(=O)O)cc4OC)n3)C(=O)O)C(=O)O)n2)c(OC)cc1N=Nc1ccc(N=Nc2ccc(S(=O)(=O)O)cc2)cc1S(=O)(=O)O] |

TABLE 22-continued
| Compound No | Structural formula |
|---|---|
| b53 | 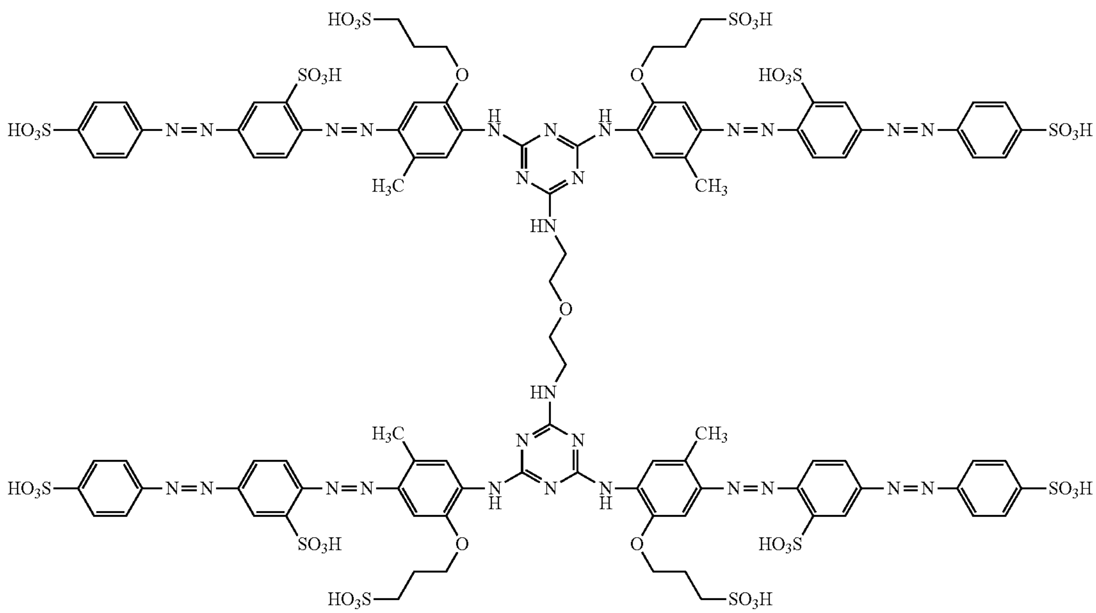 [SMILES: Cc1cc(Nc2nc(NCCOCCNc3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |
| b54 | 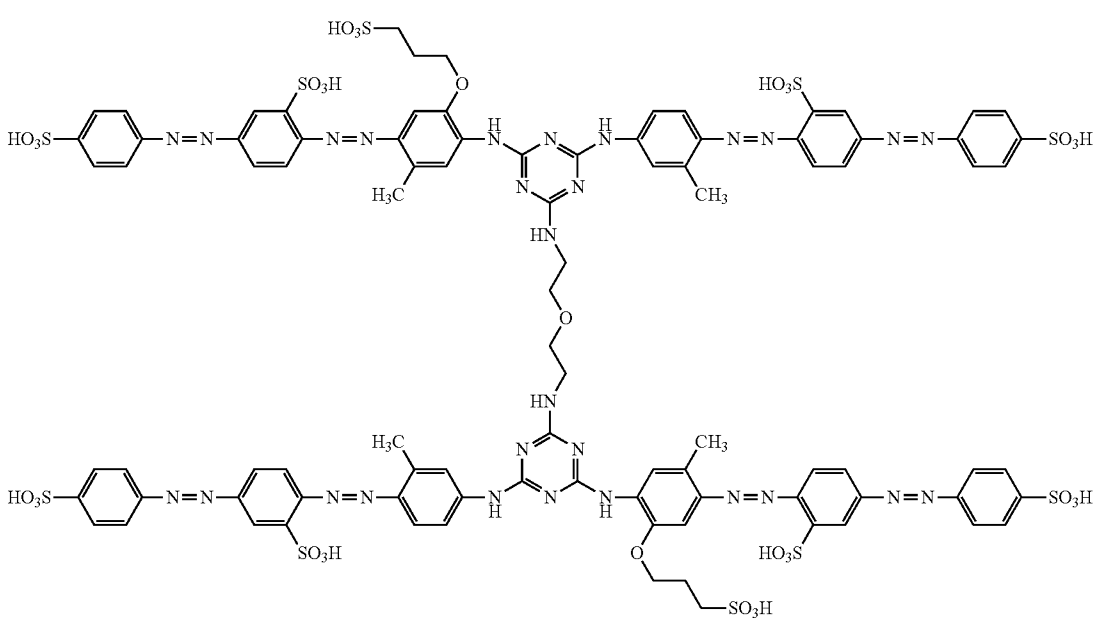 [SMILES: Cc1cc(Nc2nc(NCCOCCNc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |

TABLE 23
| Compound No | Structural formula |
| --- | --- |
| b55 | 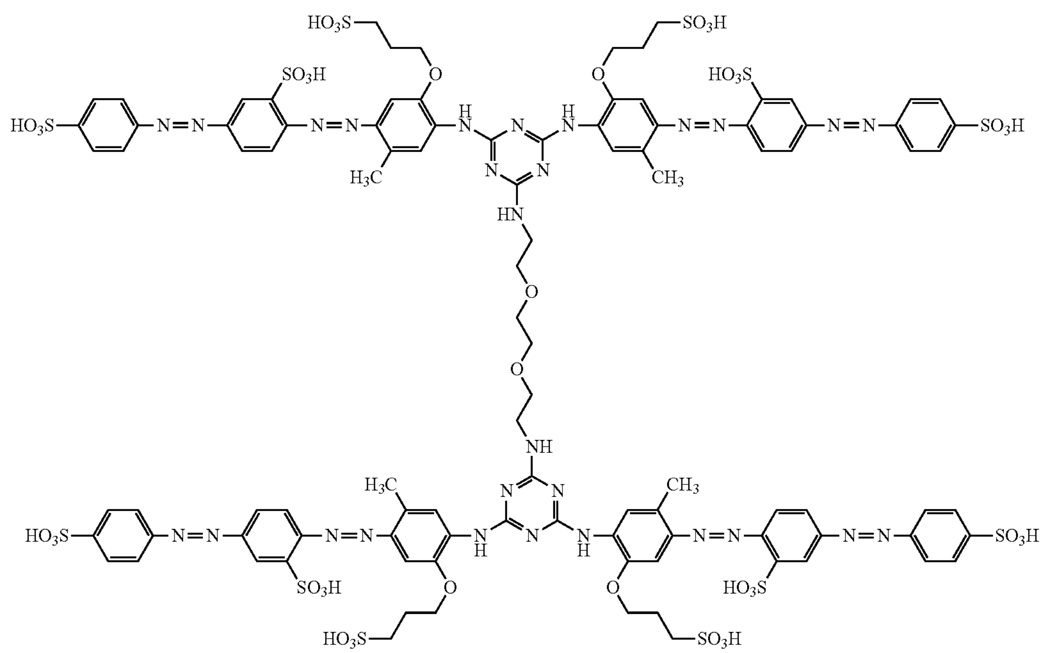 [SMILES: Cc1cc(Nc2nc(NCCOCCOCCNc3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |
| b56 | 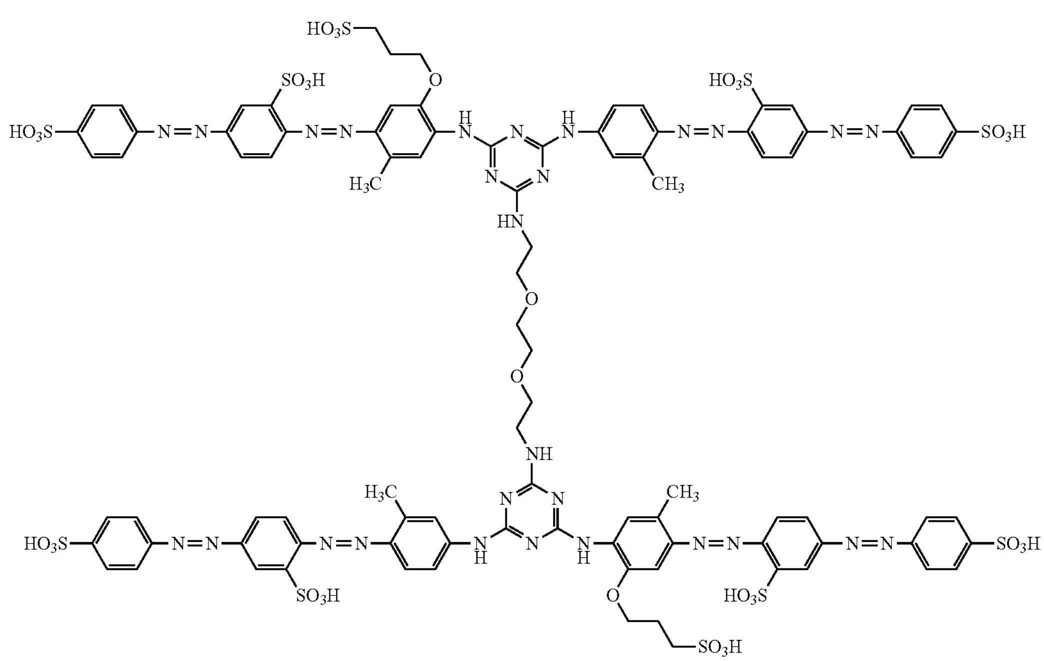 [SMILES: Cc1cc(Nc2nc(NCCOCCOCCNc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |

TABLE 23-continued
| Compound No | Structural formula |
| --- | --- |
| b57 | 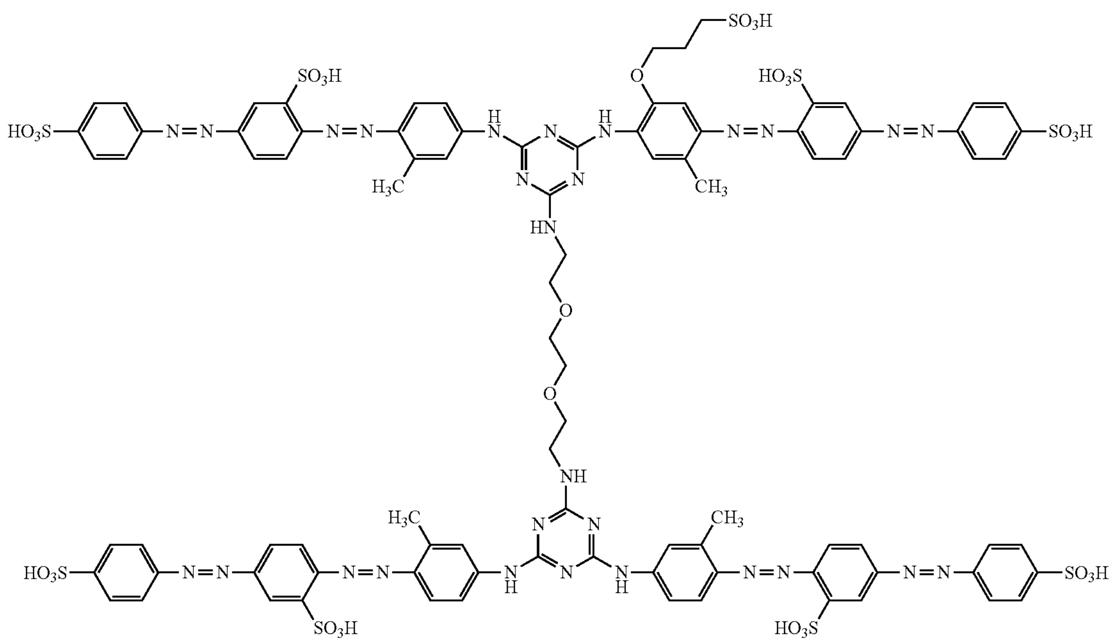 [SMILES: Cc1cc(Nc2nc(NCCOCCOCCNc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |
TABLE 24
| Compound No | Structural formula |
| --- | --- |
| b58 | 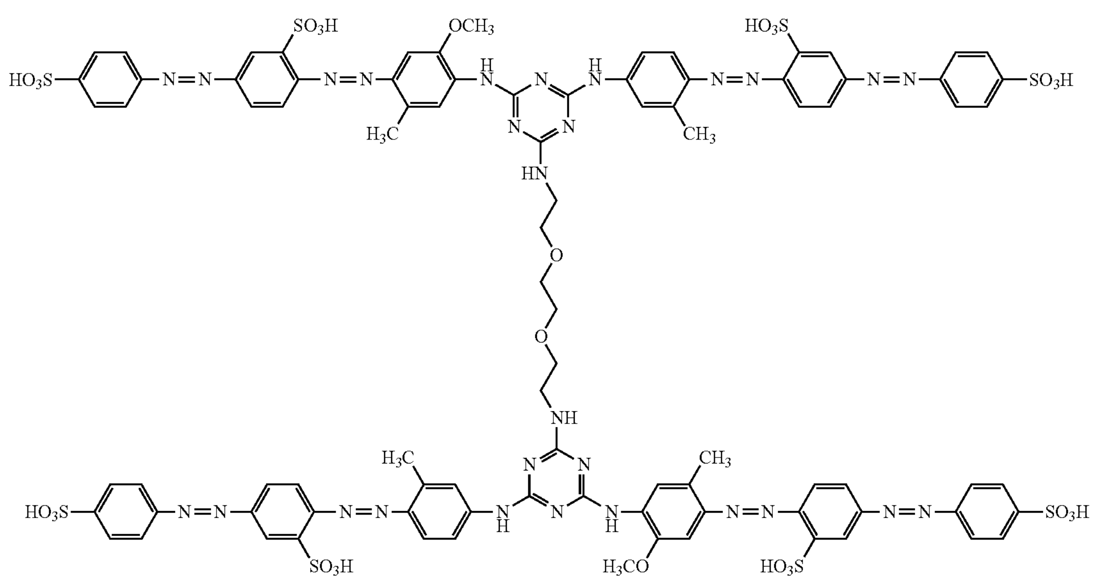 [SMILES: COc1cc(N=Nc2ccc(N=Nc3ccc(S(=O)(=O)O)cc3)cc2S(=O)(=O)O)c(C)cc1Nc1nc(NCCOCCOCCNc2nc(Nc3ccc(N=Nc4ccc(N=Nc5ccc(S(=O)(=O)O)cc5)cc4S(=O)(=O)O)c(C)c3)nc(Nc3cc(C)c(N=Nc4ccc(N=Nc5ccc(S(=O)(=O)O)cc5)cc4S(=O)(=O)O)cc3OC)n2)nc(Nc2ccc(N=Nc3ccc(N=Nc4ccc(S(=O)(=O)O)cc4)cc3S(=O)(=O)O)c(C)c2)n1] |

TABLE 24-continued
| Compound No | Structural formula |
|---|---|
| b59 | 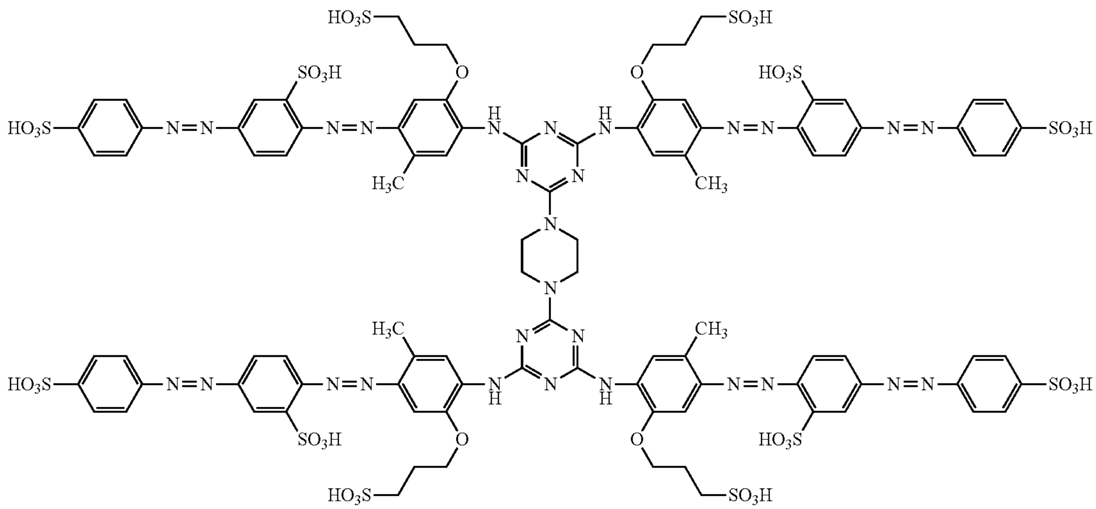 [SMILES: Cc1cc(Nc2nc(Nc3cc(C)c(N=Nc4ccc(N=Nc5ccc(S(=O)(=O)O)cc5)cc4S(=O)(=O)O)cc3OCCCS(=O)(=O)O)nc(N3CCN(c4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)CC3)n2)c(OCCCS(=O)(=O)O)cc1N=Nc1ccc(N=Nc2ccc(S(=O)(=O)O)cc2)cc1S(=O)(=O)O] |
| b60 | 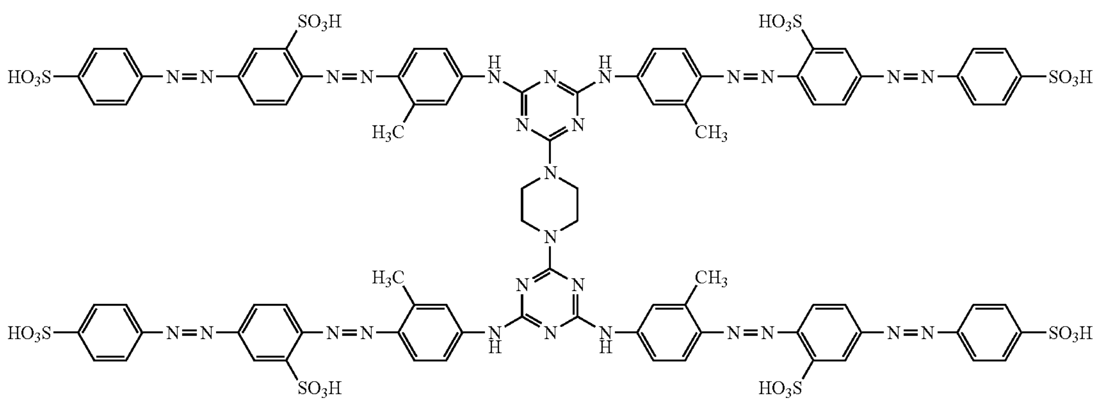 [SMILES: Cc1cc(Nc2nc(Nc3ccc(N=Nc4ccc(N=Nc5ccc(S(=O)(=O)O)cc5)cc4S(=O)(=O)O)c(C)c3)nc(N3CCN(c4nc(Nc5ccc(N=Nc6ccc(N=Nc7ccc(S(=O)(=O)O)cc7)cc6S(=O)(=O)O)c(C)c5)nc(Nc5ccc(N=Nc6ccc(N=Nc7ccc(S(=O)(=O)O)cc7)cc6S(=O)(=O)O)c(C)c5)n4)CC3)n2)ccc1N=Nc1ccc(N=Nc2ccc(S(=O)(=O)O)cc2)cc1S(=O)(=O)O] |
| b61 | 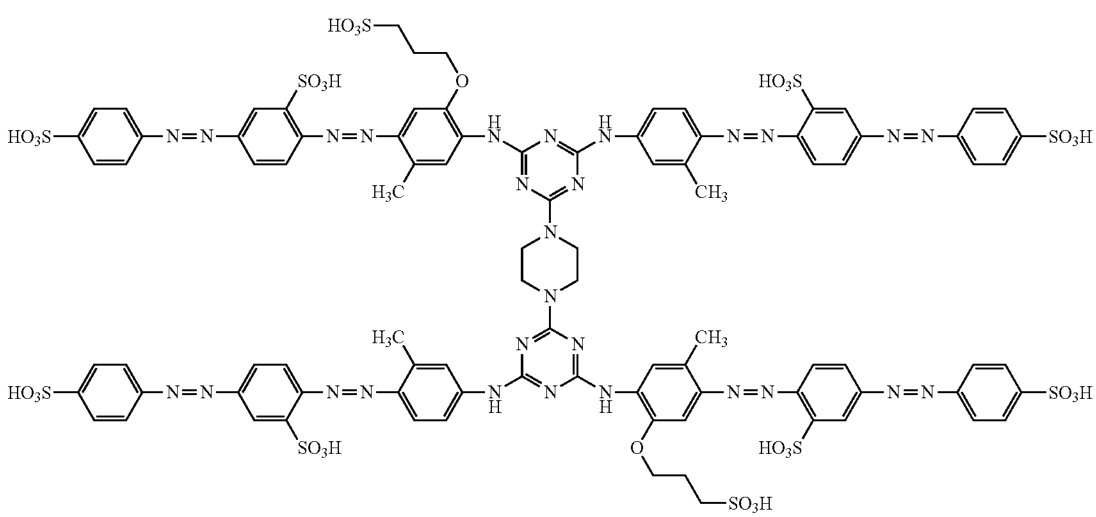 [SMILES: Cc1cc(Nc2nc(Nc3cc(C)c(N=Nc4ccc(N=Nc5ccc(S(=O)(=O)O)cc5)cc4S(=O)(=O)O)cc3OCCCS(=O)(=O)O)nc(N3CCN(c4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)CC3)n2)ccc1N=Nc1ccc(N=Nc2ccc(S(=O)(=O)O)cc2)cc1S(=O)(=O)O] |

TABLE 25
| Compound No. | Structural formula |
|---|---|
| b62 | 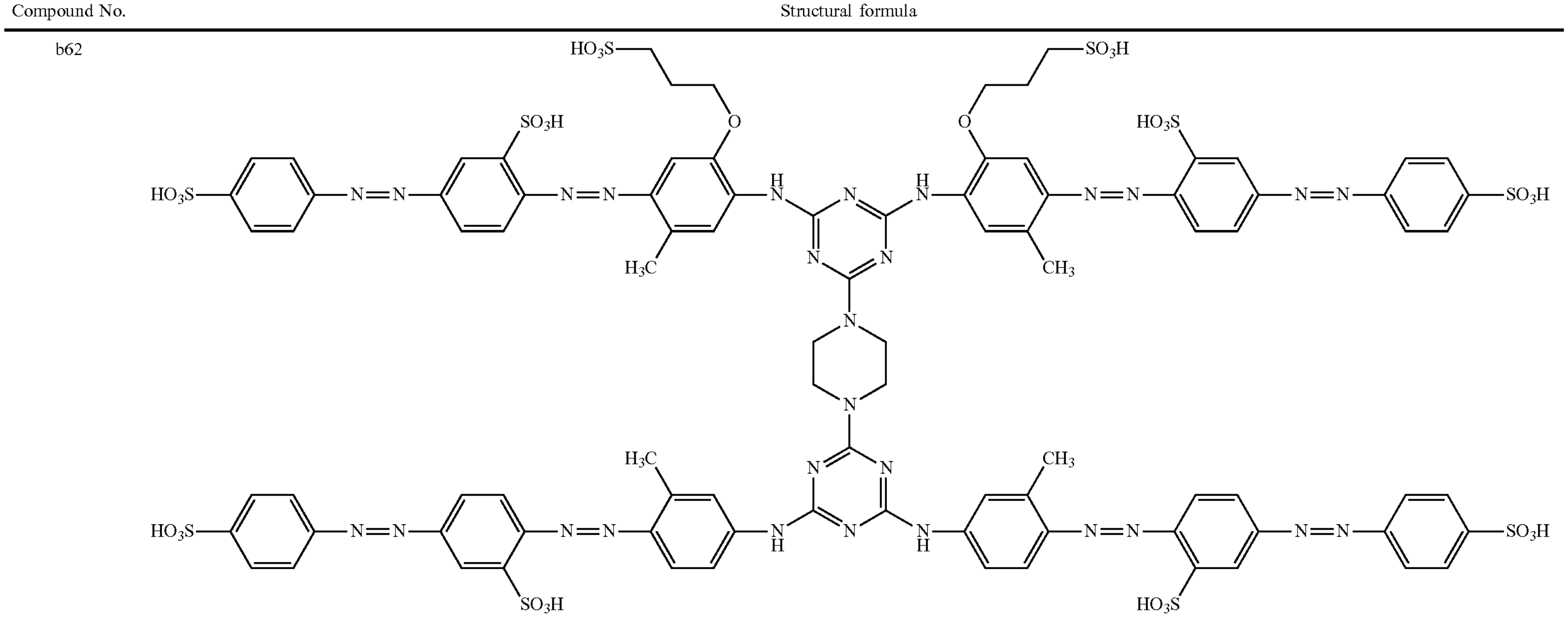 |

TABLE 25-continued
| Compound No. | Structural formula |
| --- | --- |
| b63 | 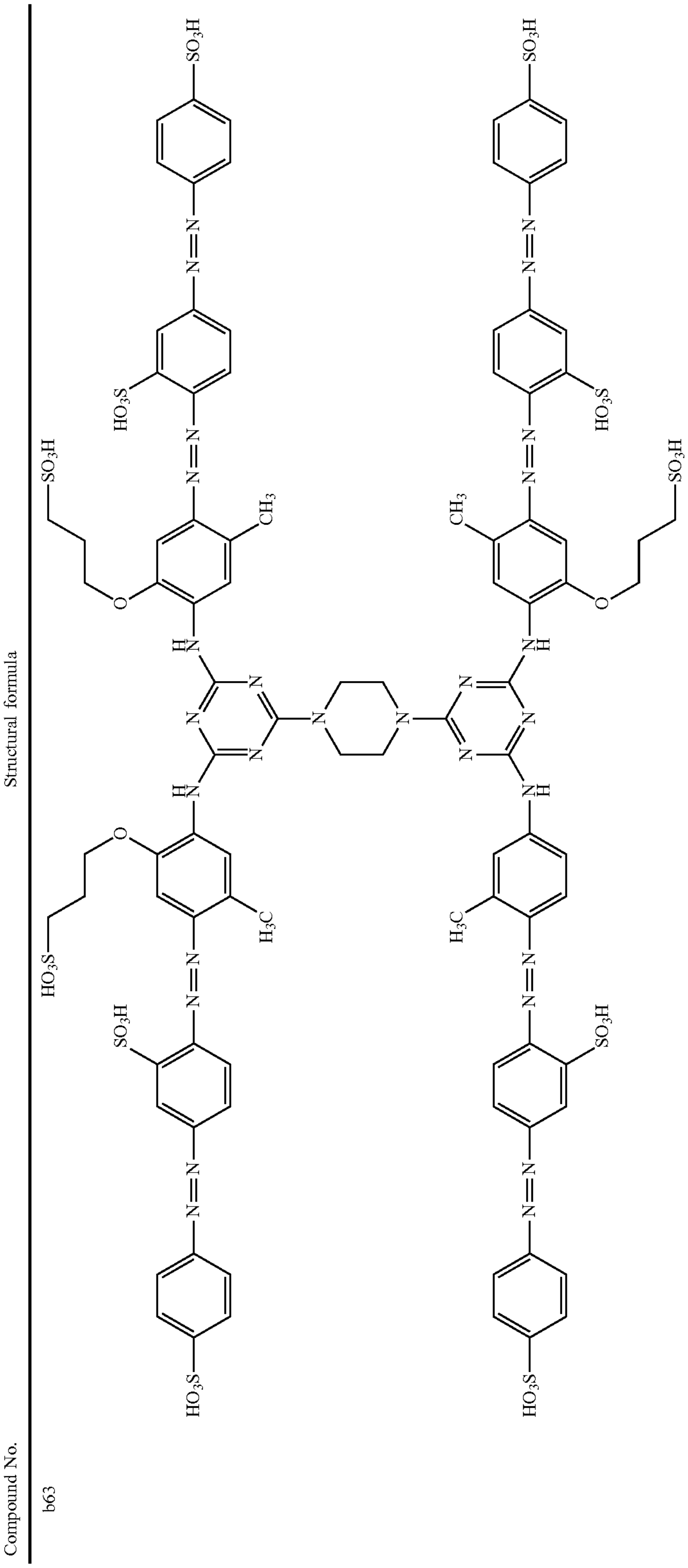 |

TABLE 25-continued
| Compound No. | Structural formula |
| --- | --- |
| b64 | 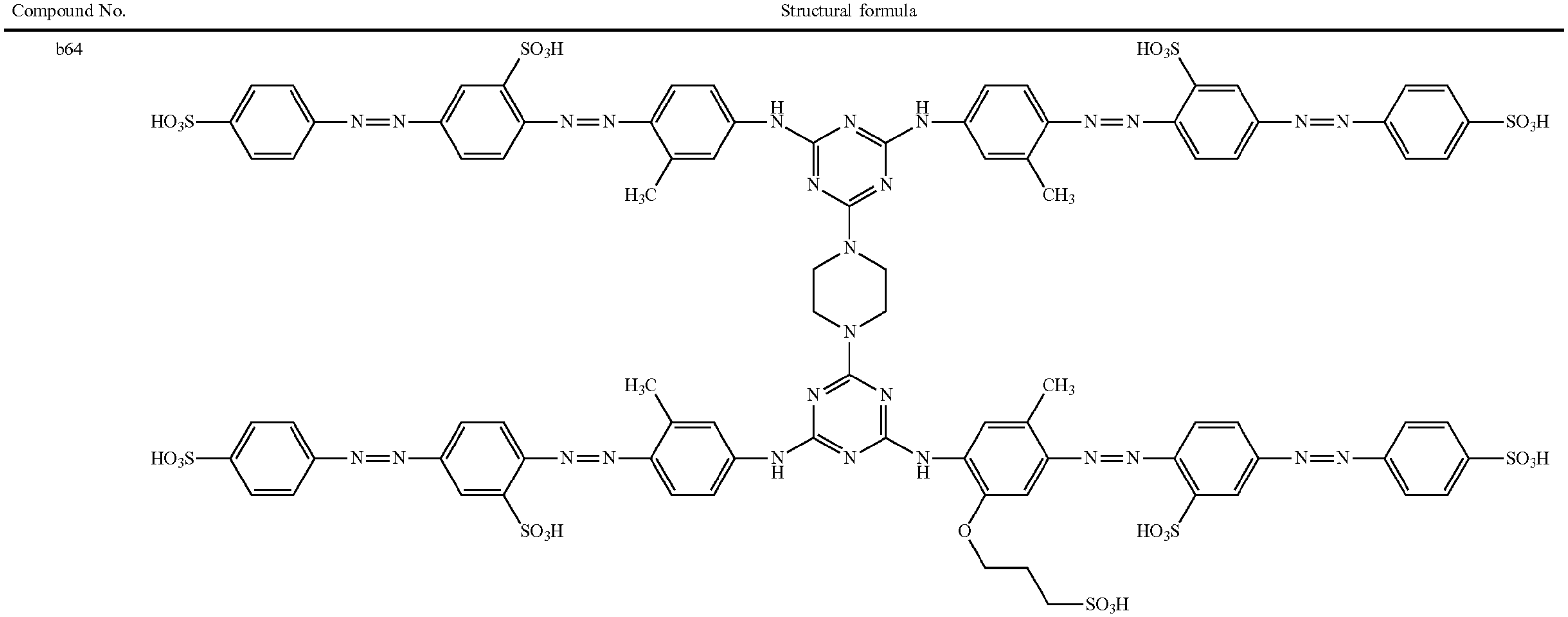 |

TABLE 25-continued
| Compound No. | Structural formula |
| --- | --- |
| b65 | 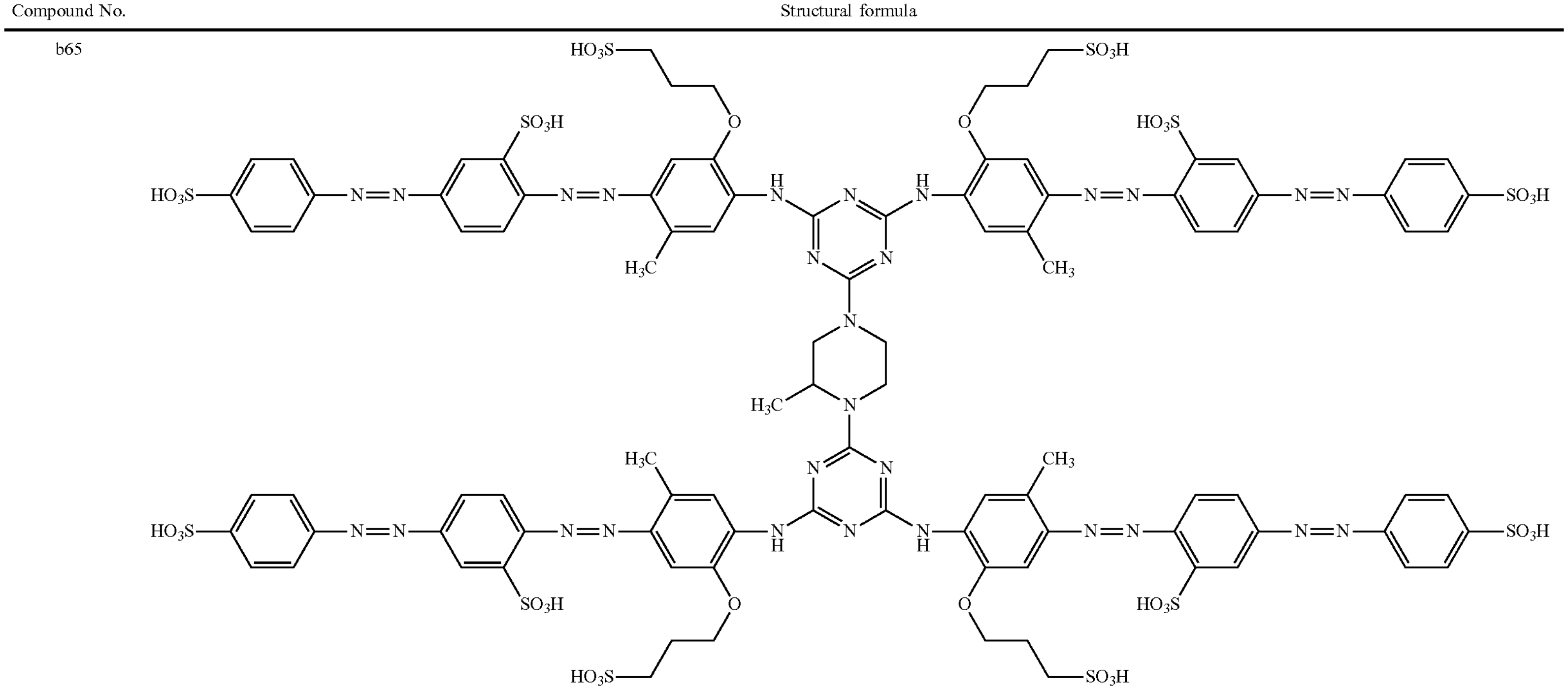 |

TABLE 26
| Compound No. | Structural formula |
| --- | --- |
| b66 | 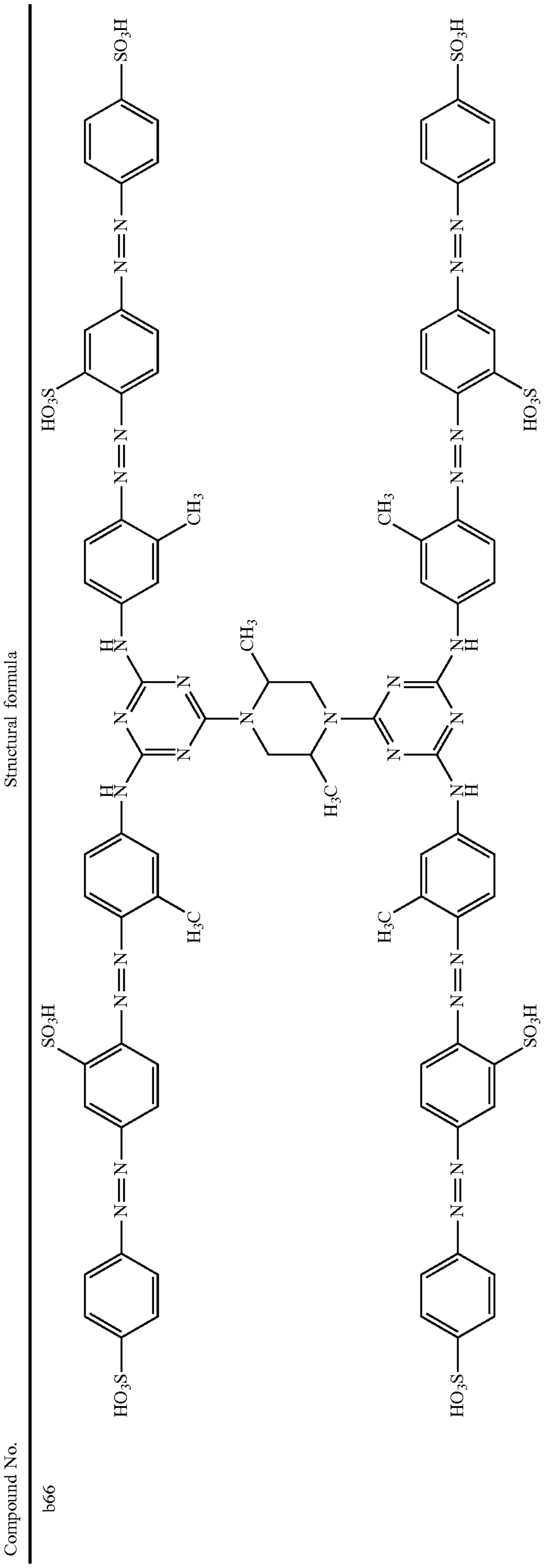 |

TABLE 26-continued
| Compound No. | Structural formula |
|---|---|
| b67 | 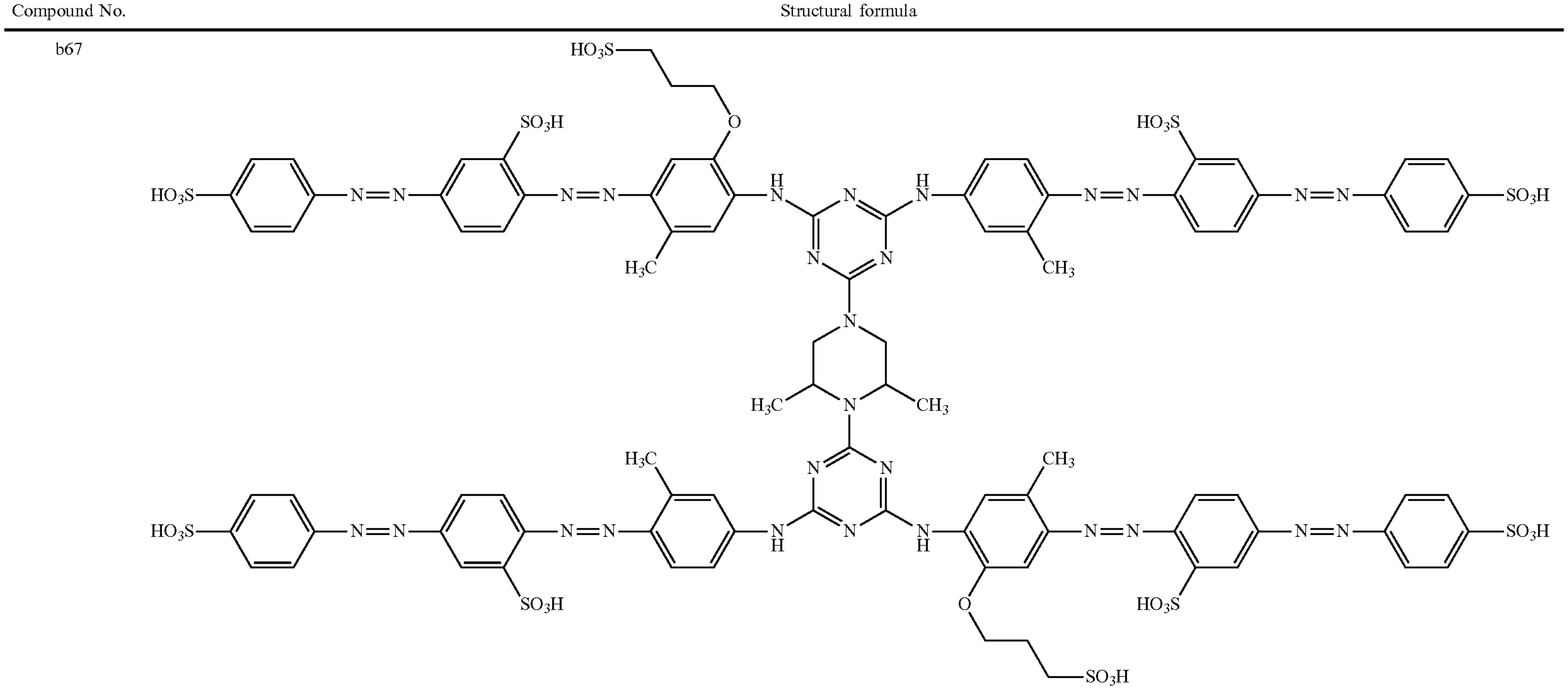 |

TABLE 26-continued
| Compound No. | Structural formula |
| --- | --- |
| b68 | 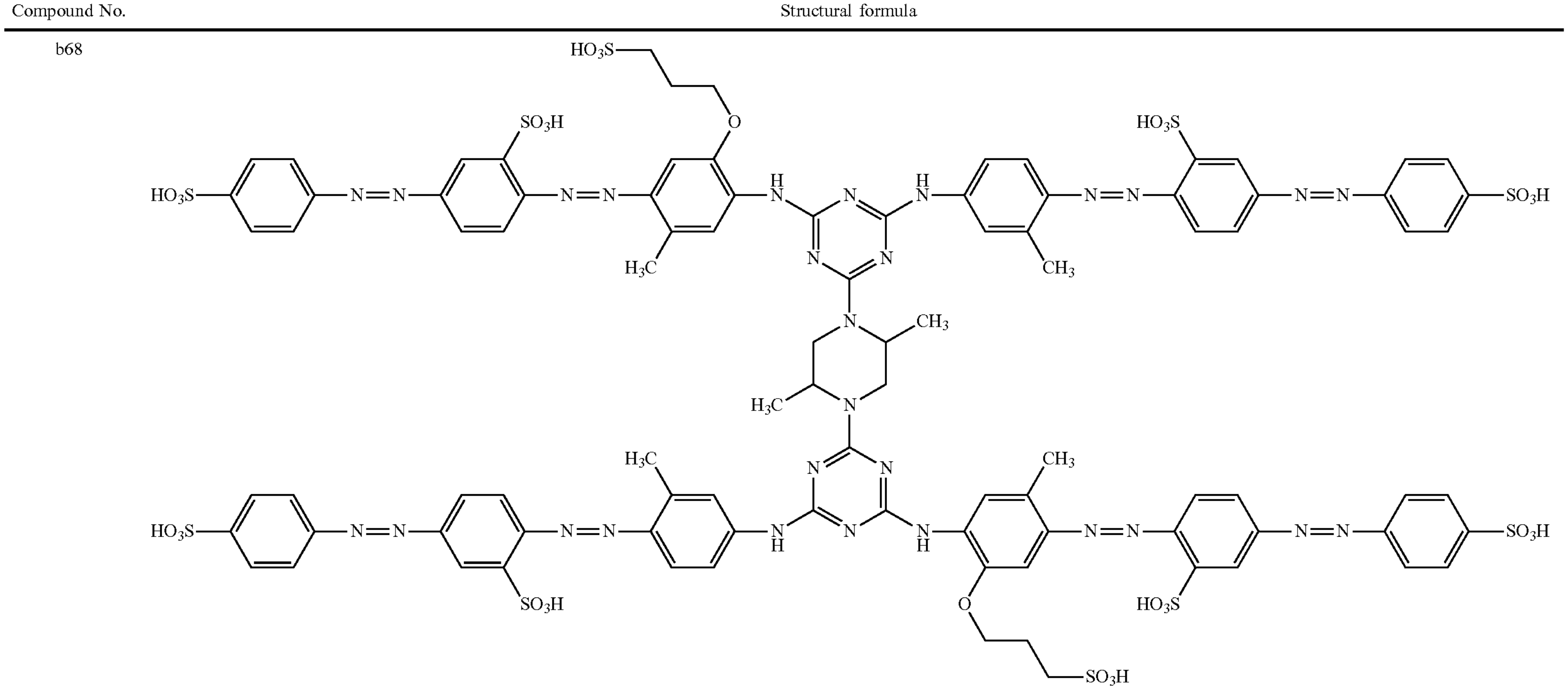 |

TABLE 26-continued
| Compound No. | Structural formula |
| --- | --- |
| b69 | 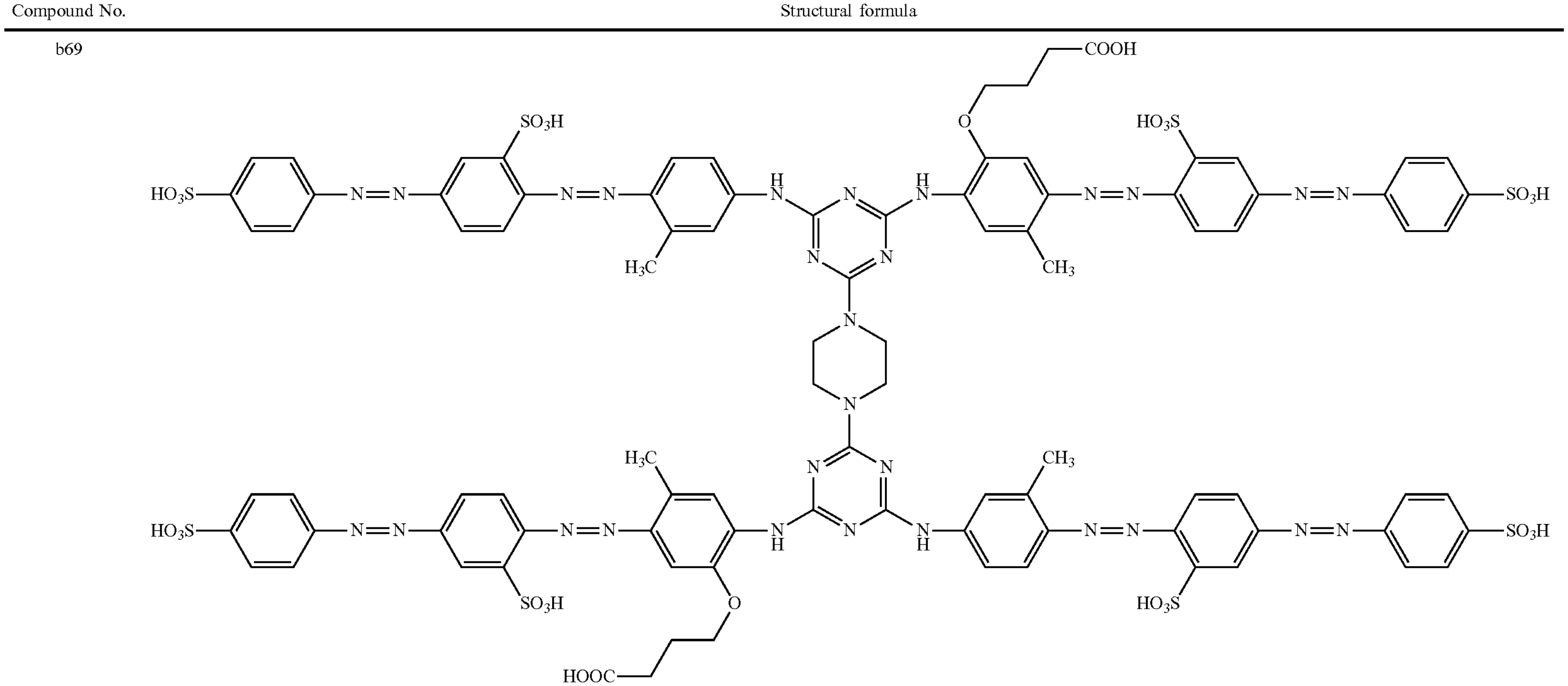 |

TABLE 27
| Compound No. | Structural formula |
| --- | --- |
| b70 | 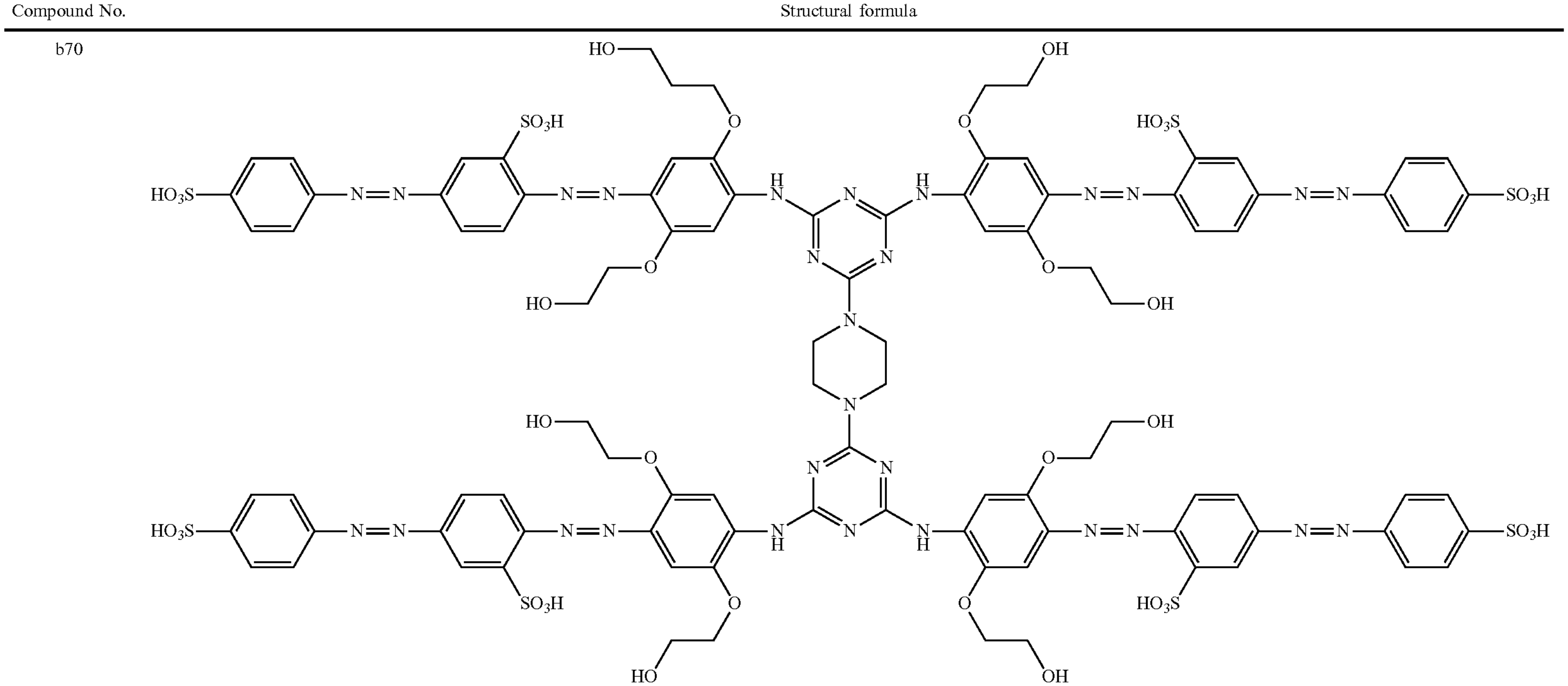 |

TABLE 27-continued
| Compound No. | Structural formula |
| --- | --- |
| b71 | 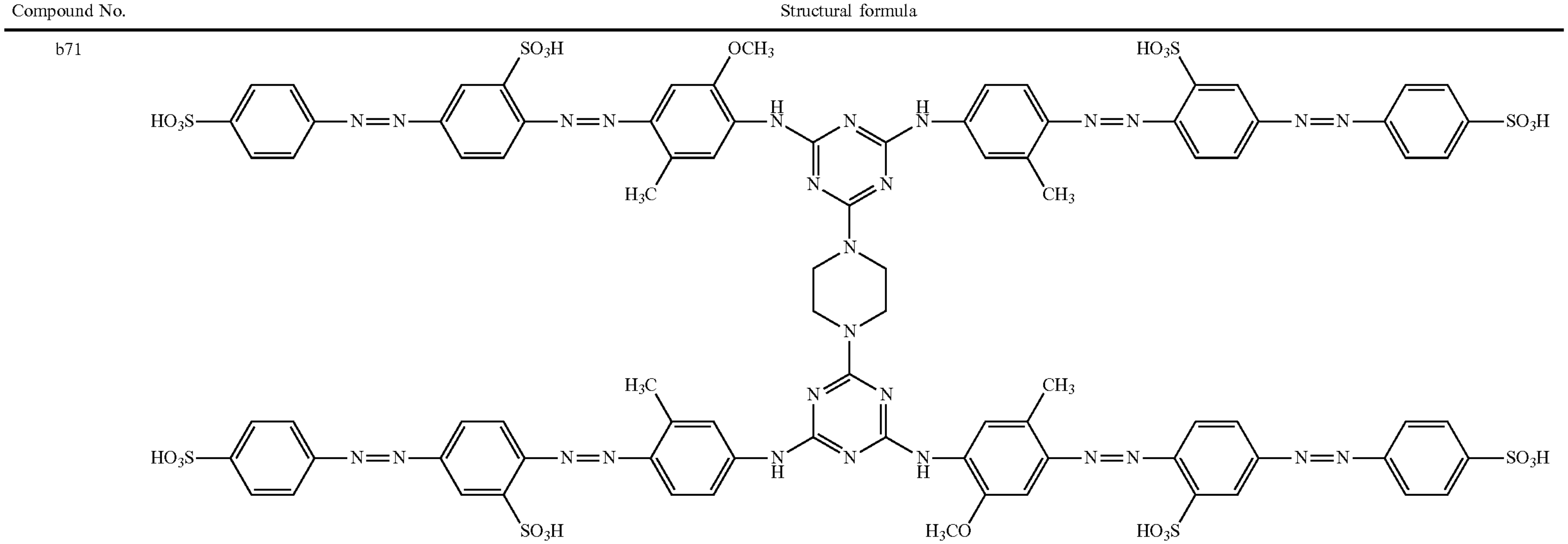 |

TABLE 27-continued
| Compound No. | Structural formula |
| --- | --- |
| b72 | 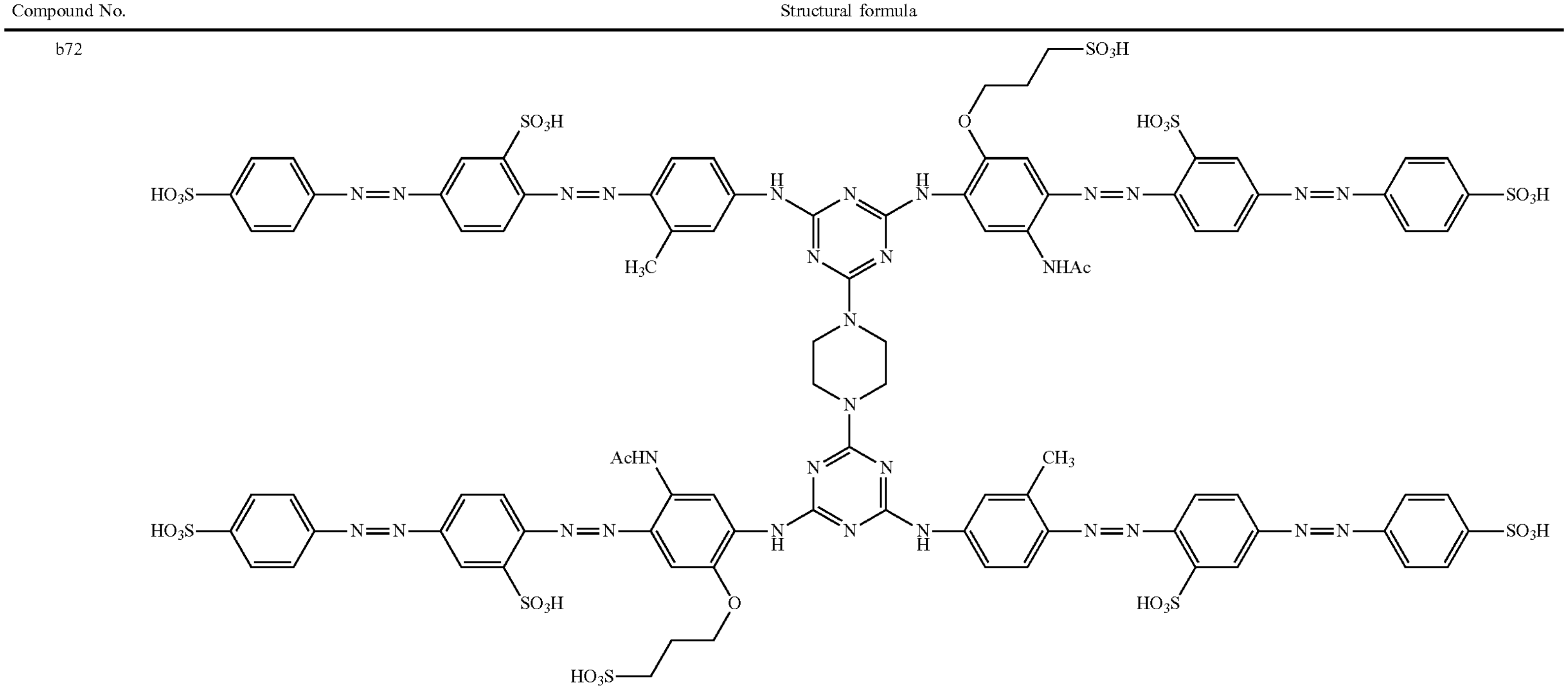 |

TABLE 27-continued
| Compound No. | Structural formula |
| --- | --- |
| b73 | 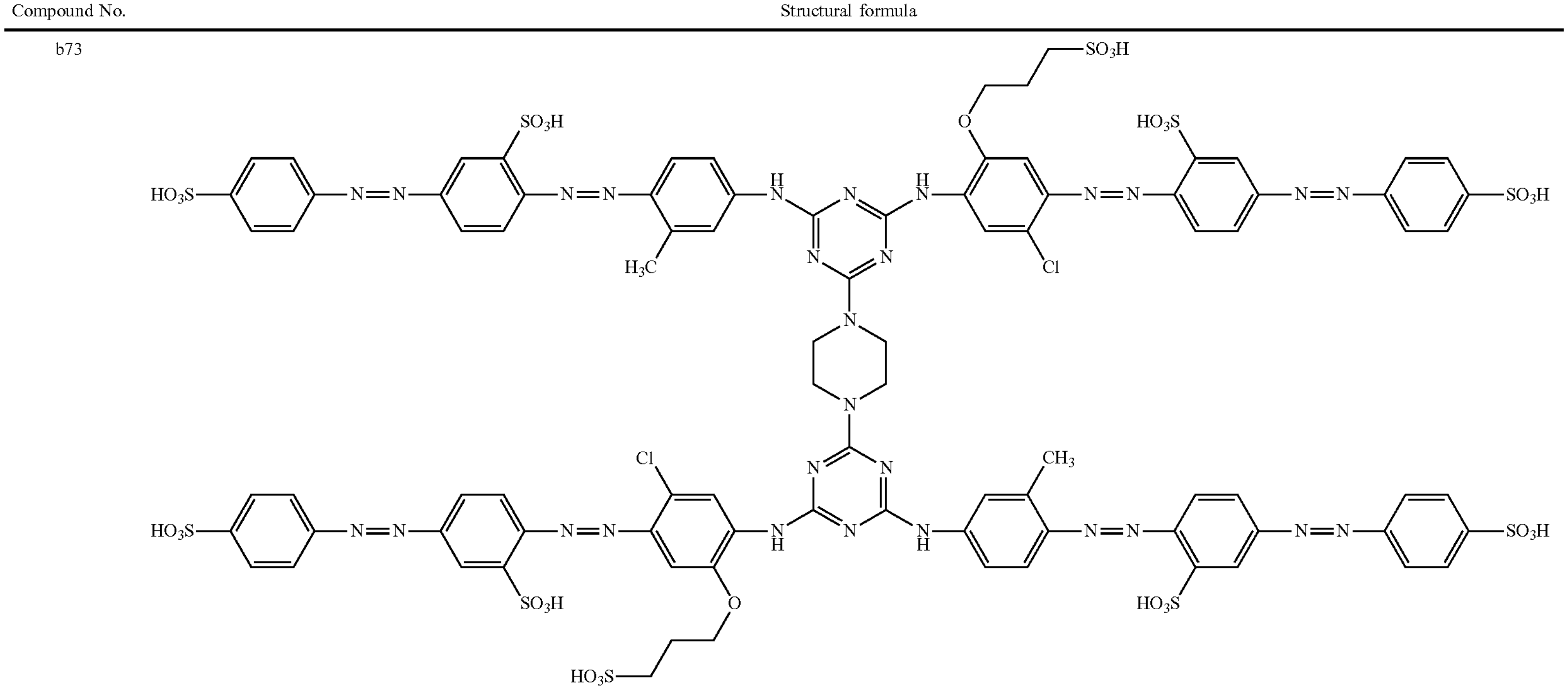 |

TABLE 28
| Compound No. | Structural formula |
| --- | --- |
| b74 | 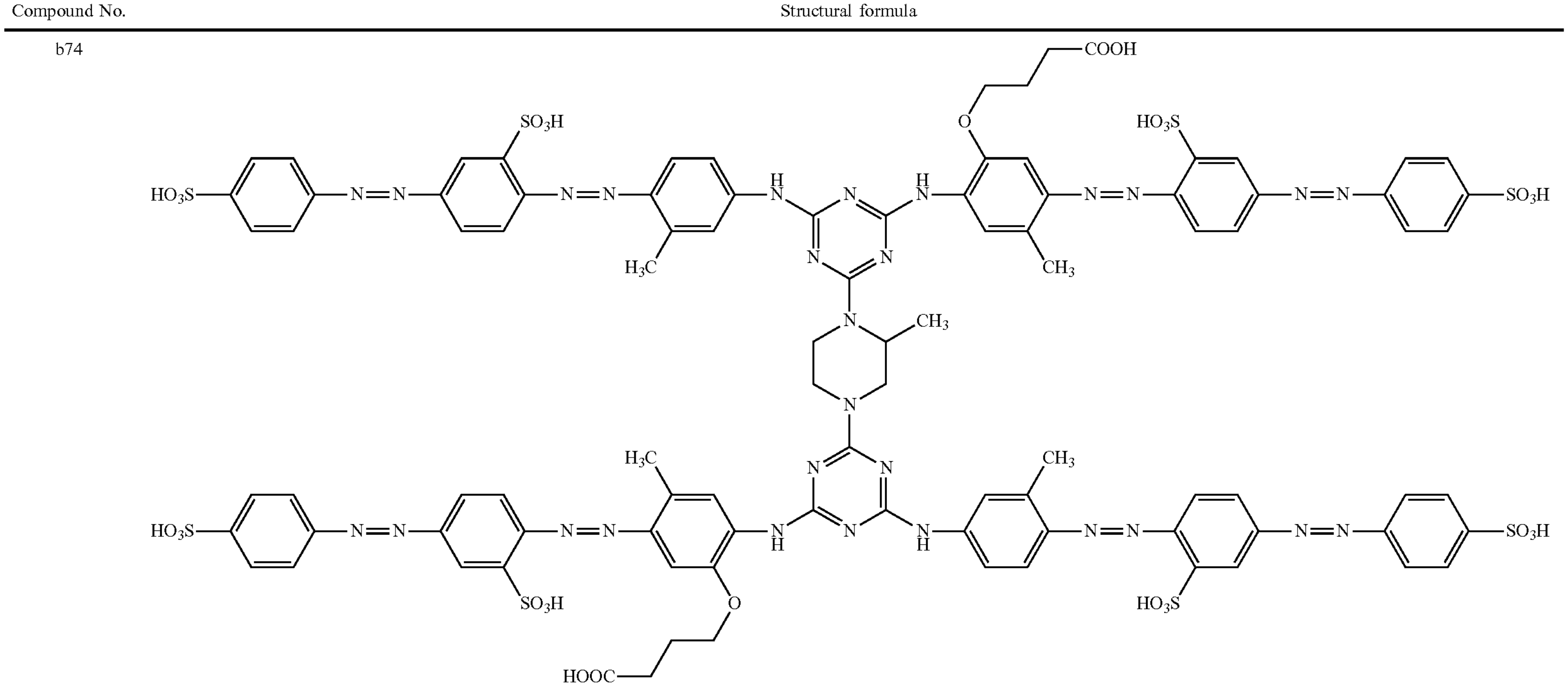 |

TABLE 28-continued
| Compound No. | Structural formula |
| --- | --- |
| b75 | 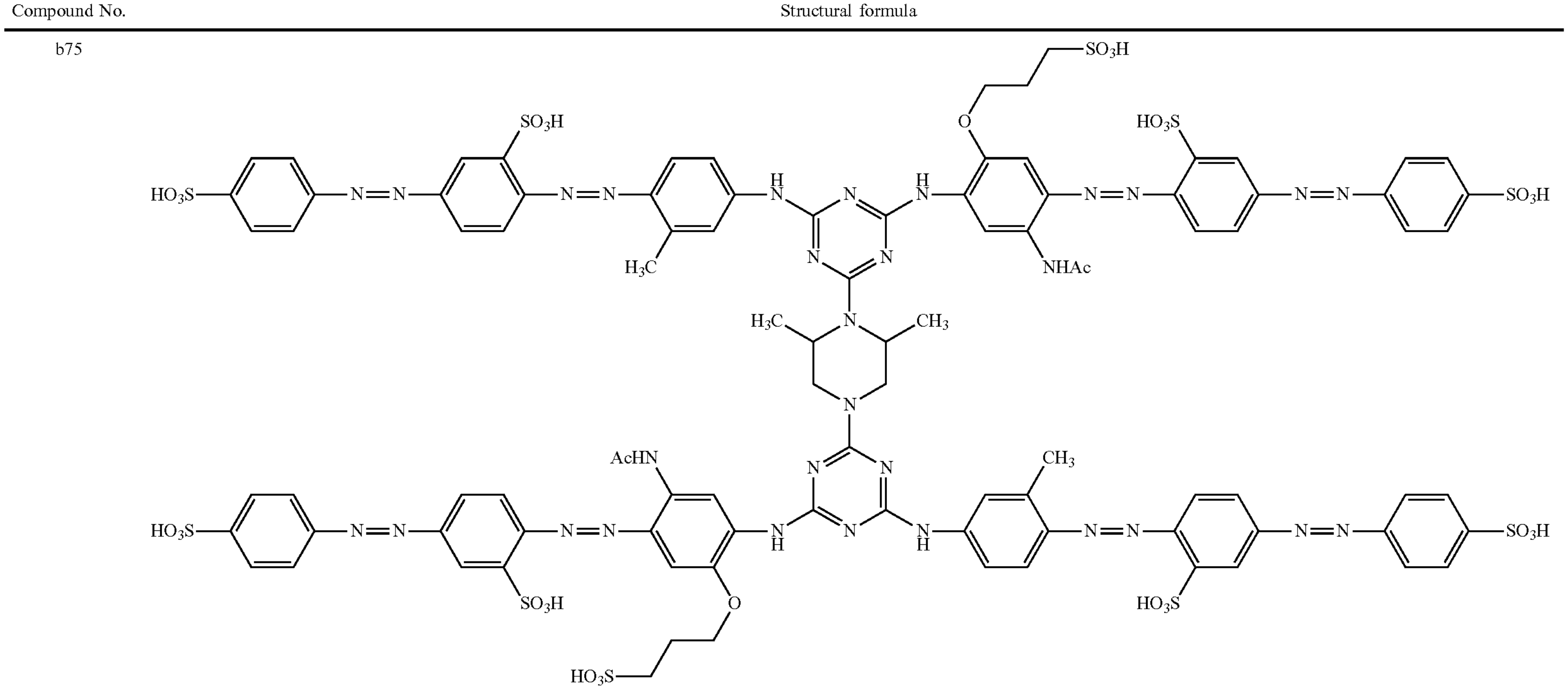 |

TABLE 28-continued
| Compound No. | Structural formula |
| --- | --- |
| b76 | 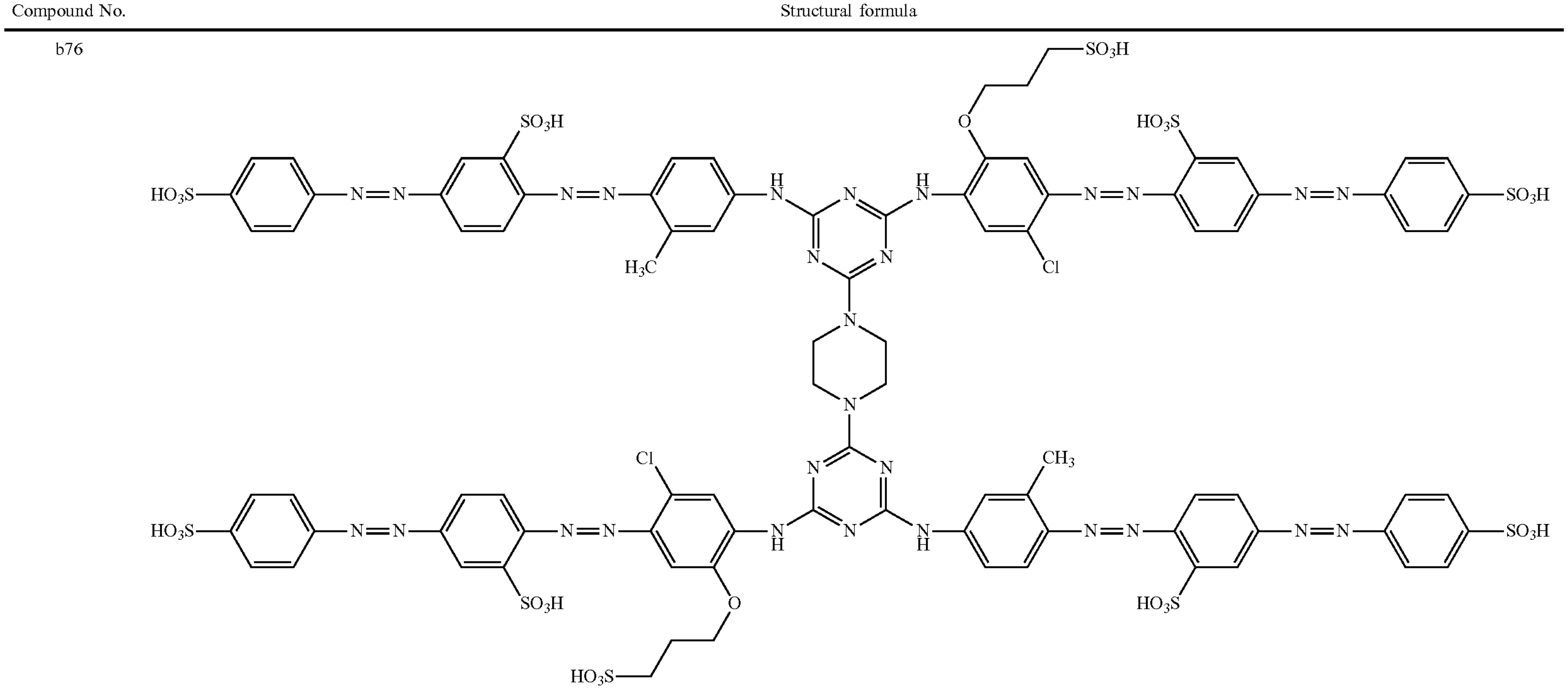 |

TABLE 28-continued
| Compound No. | Structural formula |
| --- | --- |
| b77 | 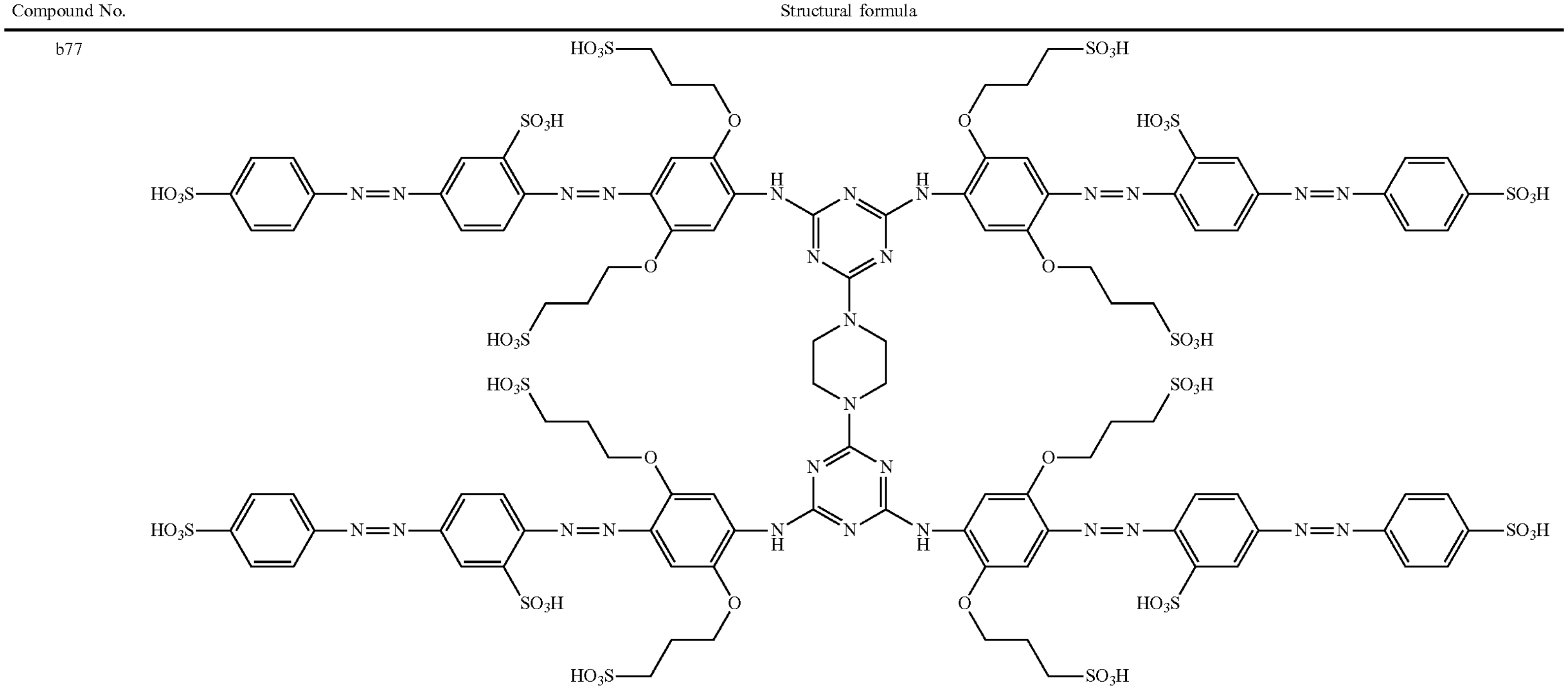 |

[Component (B-c)]

A component (B-c) can improve both color development properties and moisture resistance in particular. The compound can be obtained by a method described in International Publication No. WO 2011/12246.

In the formula (c1), Q is a halogen atom, x denotes an integer of 2 to 4, and A is an amino group represented by the formula (3).

Specific examples of the halogen atom as Q in the formula (c1) include a fluorine atom, a chlorine atom, a bromine atom, an iodine atom, and a chlorine atom is preferable.

In the formula (c1), x denotes an integer of 2 to 4, preferably 3.

In the formula (c2), y denotes an integer of 1 to 3, preferably 2.

A compound adopting a combination of the preferable ones as Q, x, and y is more preferable.

Specific examples of the coloring matter represented by the formula (c1) are shown in Tables 29 and 30 below. However, the present invention is not limited thereto.

Among these, a coloring matter shown under Compound No. c2 is particularly preferable.

TABLE 29

| Compound No. | Structural formula |
|---|---|
| c1 | 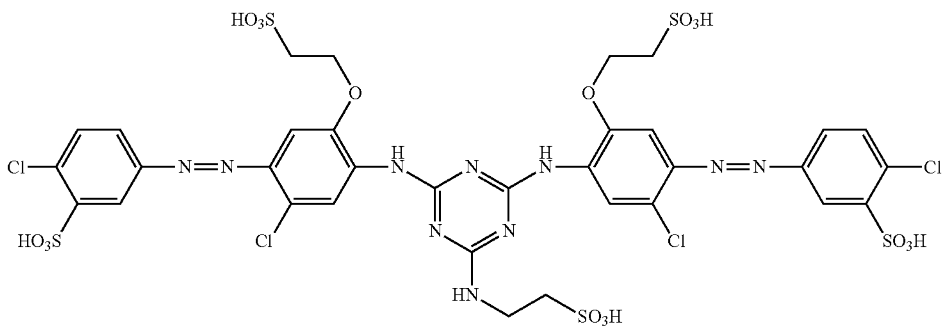 [SMILES: O=S(=O)(O)CCNc1nc(Nc2cc(Cl)c(N=Nc3ccc(Cl)c(S(=O)(=O)O)c3)cc2OCCS(=O)(=O)O)nc(Nc2cc(Cl)c(N=Nc3ccc(Cl)c(S(=O)(=O)O)c3)cc2OCCS(=O)(=O)O)n1] |
| c2 | 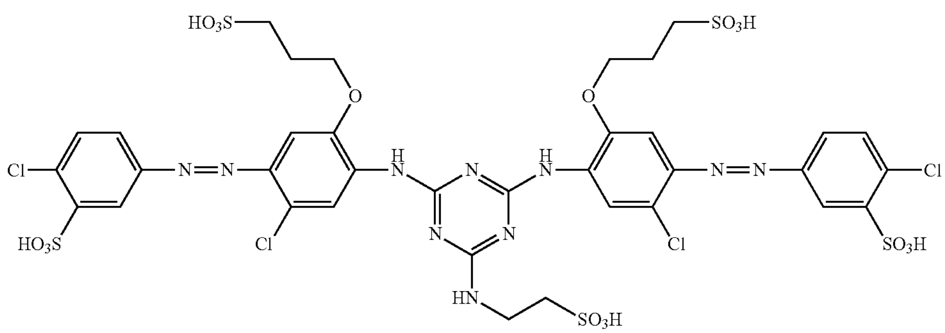 [SMILES: O=S(=O)(O)CCCOc1cc(N=Nc2ccc(Cl)c(S(=O)(=O)O)c2)c(Cl)cc1Nc1nc(NCCS(=O)(=O)O)nc(Nc2cc(Cl)c(N=Nc3ccc(Cl)c(S(=O)(=O)O)c3)cc2OCCCS(=O)(=O)O)n1] |
| c3 | 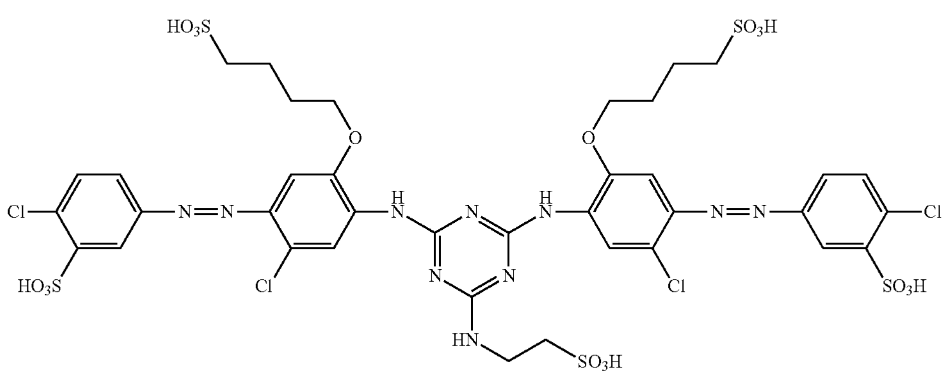 [SMILES: O=S(=O)(O)CCCCOc1cc(N=Nc2ccc(Cl)c(S(=O)(=O)O)c2)c(Cl)cc1Nc1nc(NCCS(=O)(=O)O)nc(Nc2cc(Cl)c(N=Nc3ccc(Cl)c(S(=O)(=O)O)c3)cc2OCCCCS(=O)(=O)O)n1] |

TABLE 29-continued
| Compound No. | Structural formula |
| --- | --- |
| c4 | 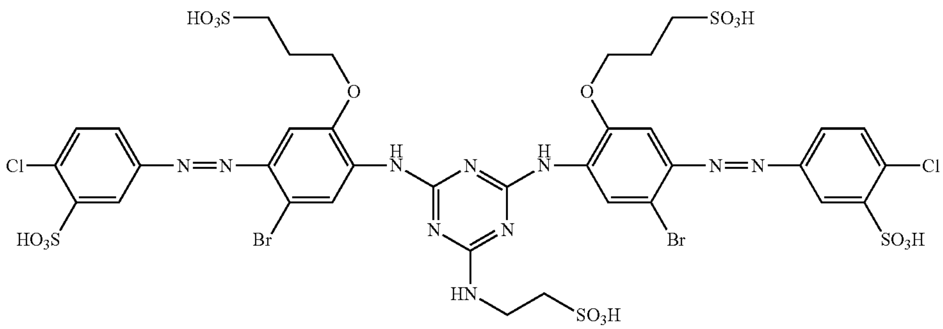 |
TABLE 30
| Compound No. | Structural formula |
| --- | --- |
| c5 | 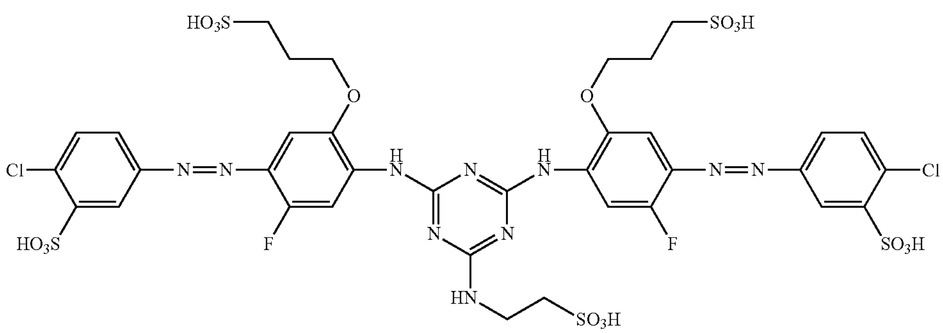 [SMILES: O=S(=O)(O)CCCOc1cc(N=Nc2ccc(Cl)c(S(=O)(=O)O)c2)c(I)cc1Nc1nc(NCCS(=O)(=O)O)nc(Nc2cc(I)c(N=Nc3ccc(Cl)c(S(=O)(=O)O)c3)cc2OCCCS(=O)(=O)O)n1] |
| c6 | 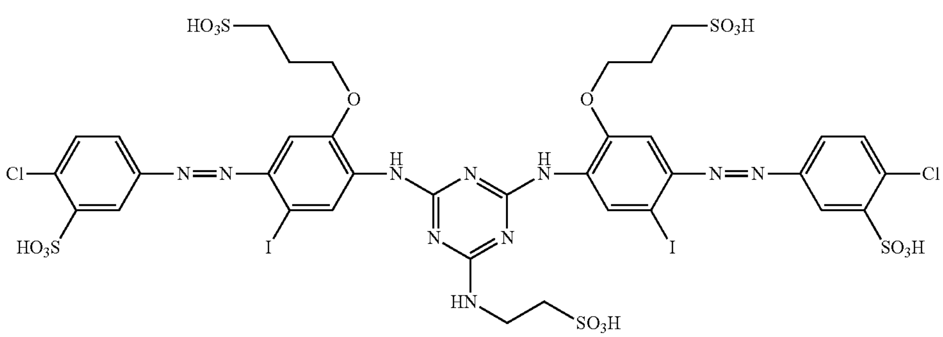 |
| c7 | 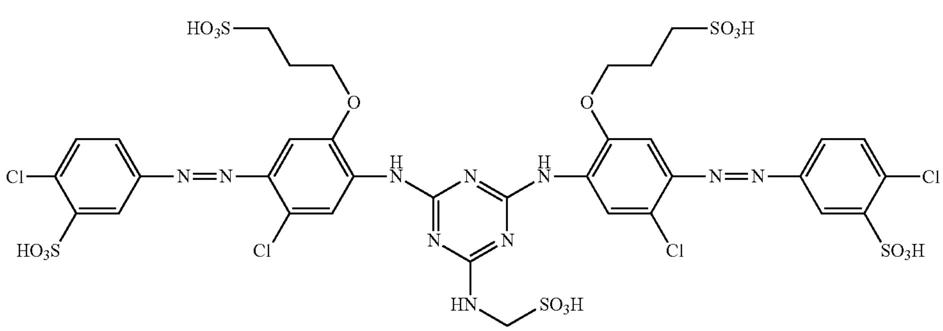 [SMILES: O=S(=O)(O)CCCOc1cc(N=Nc2ccc(Cl)c(S(=O)(=O)O)c2)c(Cl)cc1Nc1nc(NCS(=O)(=O)O)nc(Nc2cc(Cl)c(N=Nc3ccc(Cl)c(S(=O)(=O)O)c3)cc2OCCCS(=O)(=O)O)n1] |

TABLE 30-continued

| Compound No. | Structural formula |
| --- | --- |
| c8 | 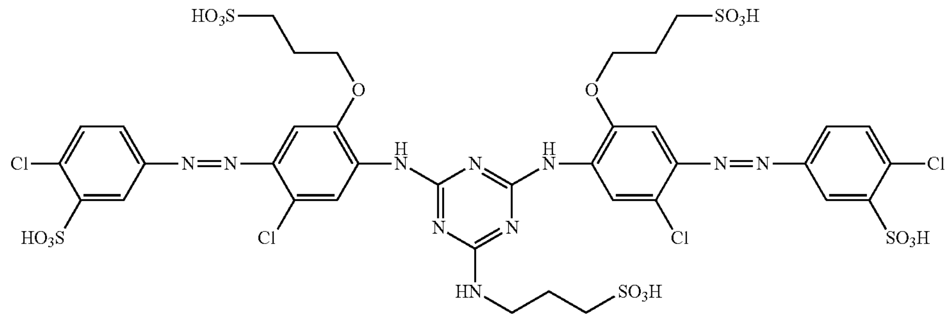 [SMILES: O=S(=O)(O)CCCNc1nc(Nc2cc(Cl)c(N=Nc3ccc(Cl)c(S(=O)(=O)O)c3)cc2OCCCS(=O)(=O)O)nc(Nc2cc(Cl)c(N=Nc3ccc(Cl)c(S(=O)(=O)O)c3)cc2OCCCS(=O)(=O)O)n1] |

[Component (B-d)]

A component (B-d) can improve both color development properties and moisture resistance in particular. The coloring matter is a compound of the formula (12) described in International Publication No. WO 2005/033211 and can be obtained by carrying out a method described in the document.

[Component (B-e)]

A component (B-e) can improve both ozone resistance and moisture resistance in particular. $R^{101}$ and $R^{102}$ in the formula (e1) are independently a hydrogen atom; a (C1-C4) alkyl group; a (C1-C4) alkoxy group; a (C1-C4) alkylcarbonyl group; a phenylcarbonyl group; a (C1-C4) alkoxy group substituted with a (C1-C4) alkoxy group; a sulfo group; a carboxy group; or a ureido group (it should be noted that both of $R^{101}$ and $R^{102}$ are not hydrogen atoms).

Examples of the (C1-C4) alkyl group as or in $R^{101}$ and $R^{102}$ in the formula (e1) are the same as the examples of the (C1-C4) alkyl group as or in $R^1$, $R^2$, $R^5$, $R^6$, and $R^7$ described above, including specific examples, preferable examples, and more preferable examples thereof.

Examples of the (C1-C4) alkoxy group as or in $R^{101}$ and $R^{102}$ in the formula (e1) are the same as the examples of the (C1-C4) alkoxy group as or in $R^1$, $R^2$, $R^5$, $R^6$, and $R^7$ described above, including specific examples, preferable examples, and more preferable examples thereof.

Examples of the (C1-C4) alkylcarbonyl group as or in $R^{101}$ and $R^{102}$ in the formula (e1) include ones in which an alkyl moiety thereof is unsubstituted and constitutes a linear or branched chain, preferably a linear chain. Specific examples include linear groups such as a methylcarbonyl group, an ethylcarbonyl group, an n-propylcarbonyl group, and an n-butylcarbonyl group; and branched groups such as an isopropylcarbonyl group, an isobutylcarbonyl group, a sec-butylcarbonyl group, and a pivaloyl group (a tert-butylcarbonyl group). Among these, the linear ones are preferable and a methylcarbonyl group is more preferable.

Examples of the (C1-C4) alkoxy group substituted with a (C1-C4) alkoxy group as or in $R^{101}$ and $R^{102}$ in the formula (e1) include ones in which a carbon atom of the (C1-C4) alkoxy group has a (C1-C4) alkoxy group attached thereto as a substituent. The position of substitution is not particularly limited, but is preferably a terminus of the alkyl moiety. The number of substitution is usually 1 to 3 and is preferably 1. Examples of the (C1-C4) alkoxy group are the same as the examples of the (C1-C4) alkoxy group as or in $R^1$, $R^2$, $R^5$, $R^6$, and $R^7$ described above, including specific examples, preferable examples, and more preferable examples thereof. Specific examples of the (C1-C4) alkoxy group substituted with a (C1-C4) alkoxy group include a methoxymethoxy group, a 2-methoxyethoxy group, a 3-methoxy-n-propoxy group, a 4-methoxy-n-butoxy group, an ethoxymethoxy group, a 2-ethoxyethoxy group, a 3-ethoxy-n-propoxy group, a 4-ethoxy-n-butoxy group, an n-propoxymethoxy group, a 2-(n-propoxy)ethoxy group, a 3-(n-propoxy)-n-propoxy group, a 4-(n-propoxy)-n-butoxy group, an n-butoxymethoxy group, a 2-(n-butoxy)ethoxy group, a 3-(n-butoxy)-n-propoxy group, and a 4-(n-butoxy)-n-butoxy group. A methoxymethoxy group, a 2-methoxyethoxy group, and a 3-methoxy-n-propoxy group are preferable.

In the formula (e1), m and n independently denote 1 or 2. m and n are preferably 1.

A compound adopting a combination of the preferable ones as $R^{101}$ and $R^{102}$ is more preferable, and a compound adopting a combination of the more preferable ones as $R^{101}$ and $R^{102}$ is further preferable. The same applies to a combination of the preferable ones with the more preferable ones, for instance.

Specific examples of the coloring matter represented by the formula (e1) are shown in Tables 31 to 33 below. However, the present invention is not limited thereto. Among these, a coloring matter shown under Compound No. e25 is particularly preferable.

TABLE 31

| Compound No. | Structural formula |
| --- | --- |
| e1 | 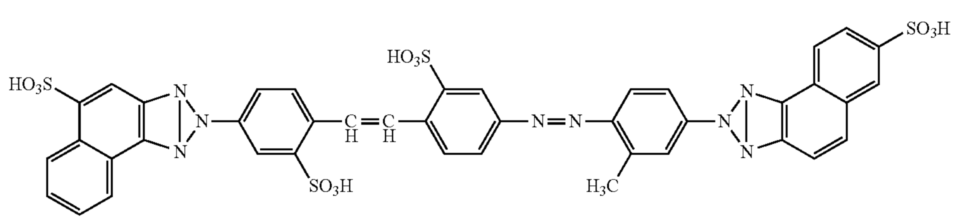 [SMILES: Cc1cc(-n2n3c4ccc5cc(S(=O)(=O)O)ccc5c4n23)ccc1N=Nc1ccc(C=Cc2ccc(-n3n4c5cc(S(=O)(=O)O)c6ccccc6c5n34)cc2S(=O)(=O)O)c(S(=O)(=O)O)c1] |

TABLE 31-continued
| Compound No. | Structural formula |
| --- | --- |
| e2 | 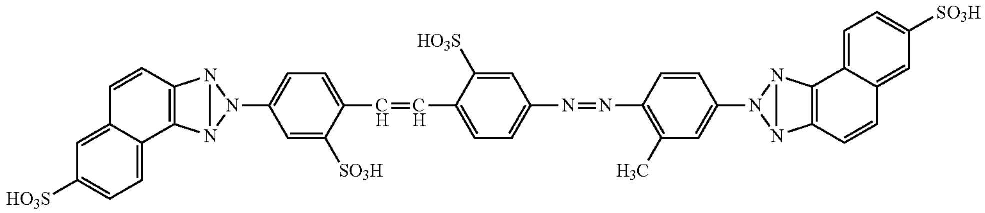 [SMILES: Cc1cc(-n2n3c4ccc5cc(S(=O)(=O)O)ccc5c4n23)ccc1N=Nc1ccc(C=Cc2ccc(-n3n4c5ccc6cc(S(=O)(=O)O)ccc6c5n34)cc2S(=O)(=O)O)c(S(=O)(=O)O)c1] |
| e3 | 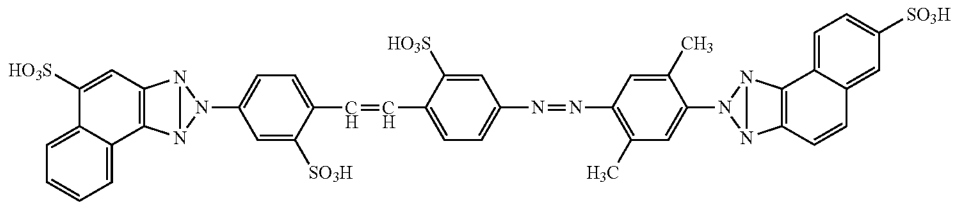 |
| e4 | 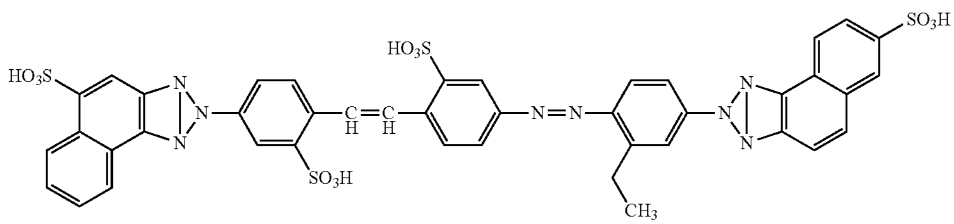 [SMILES: CCc1cc(-n2n3c4ccc5cc(S(=O)(=O)O)ccc5c4n23)ccc1N=Nc1ccc(C=Cc2ccc(-n3n4c5cc(S(=O)(=O)O)c6ccccc6c5n34)cc2S(=O)(=O)O)c(S(=O)(=O)O)c1] |
| e5 | 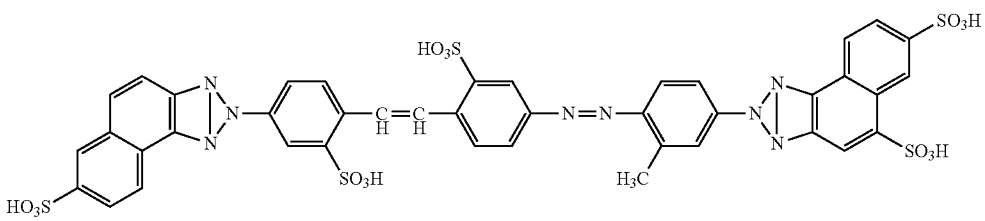 [SMILES: Cc1cc(-n2n3c4cc(S(=O)(=O)O)c5cc(S(=O)(=O)O)ccc5c4n23)ccc1N=Nc1ccc(C=Cc2ccc(-n3n4c5ccc6cc(S(=O)(=O)O)ccc6c5n34)cc2S(=O)(=O)O)c(S(=O)(=O)O)c1] |
| e6 | 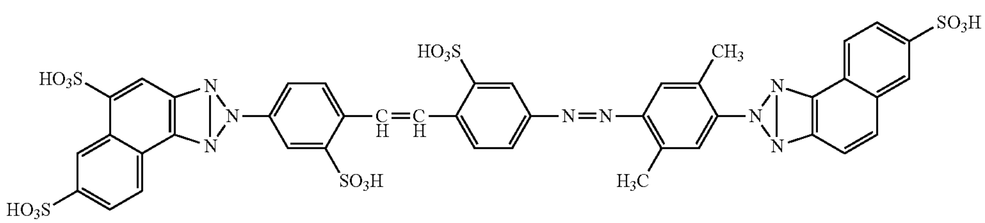 [SMILES: Cc1cc(-n2n3c4ccc5cc(S(=O)(=O)O)ccc5c4n23)c(C)cc1N=Nc1ccc(C=Cc2ccc(-n3n4c5cc(S(=O)(=O)O)c6cc(S(=O)(=O)O)ccc6c5n34)cc2S(=O)(=O)O)c(S(=O)(=O)O)c1] |
| e7 | 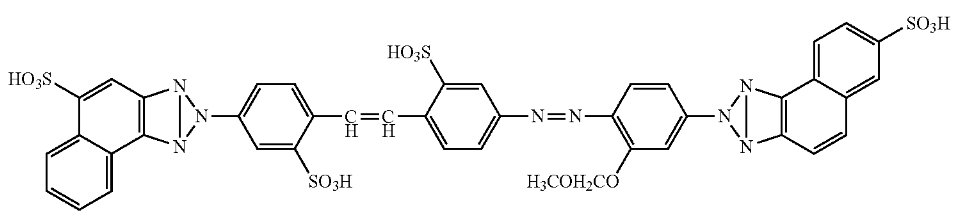 |
| e8 | 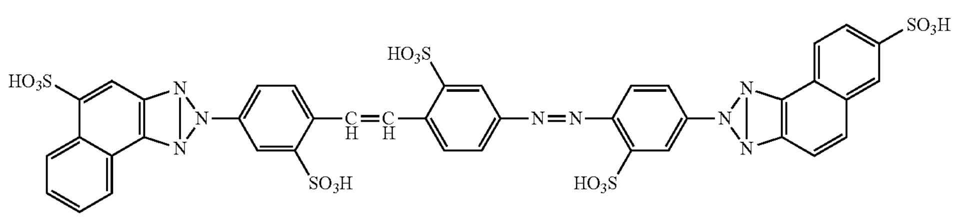 |

TABLE 32
| Compound No. | Structural formula |
| --- | --- |
| e9 | 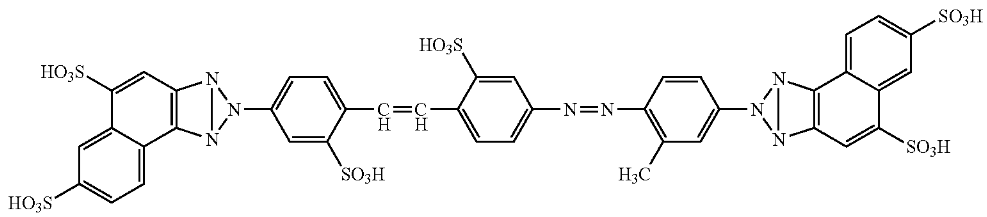 [SMILES: Cc1cc(-n2n3c4cc(S(=O)(=O)O)c5cc(S(=O)(=O)O)ccc5c4n23)ccc1N=Nc1ccc(C=Cc2ccc(-n3n4c5cc(S(=O)(=O)O)c6cc(S(=O)(=O)O)ccc6c5n34)cc2S(=O)(=O)O)c(S(=O)(=O)O)c1] |
| e10 | 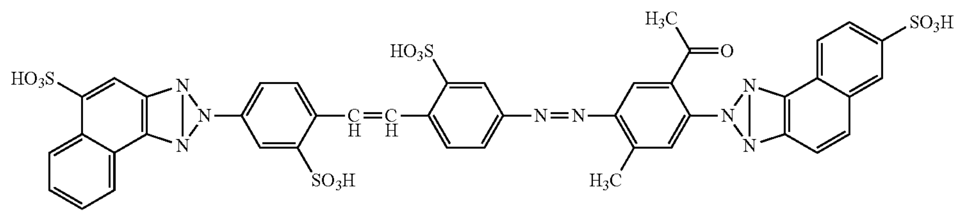 [SMILES: CC(=O)c1cc(N=Nc2ccc(C=Cc3ccc(-n4n5c6cc(S(=O)(=O)O)c7ccccc7c6n45)cc3S(=O)(=O)O)c(S(=O)(=O)O)c2)c(C)cc1-n1n2c3ccc4cc(S(=O)(=O)O)ccc4c3n12] |
| e11 | 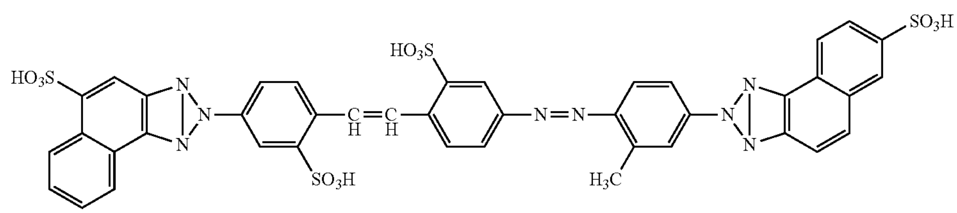 [SMILES: Cc1cc(-n2n3c4ccc5cc(S(=O)(=O)O)ccc5c4n23)ccc1N=Nc1ccc(C=Cc2ccc(-n3n4c5cc(S(=O)(=O)O)c6ccccc6c5n34)cc2S(=O)(=O)O)c(S(=O)(=O)O)c1] |
| e12 | 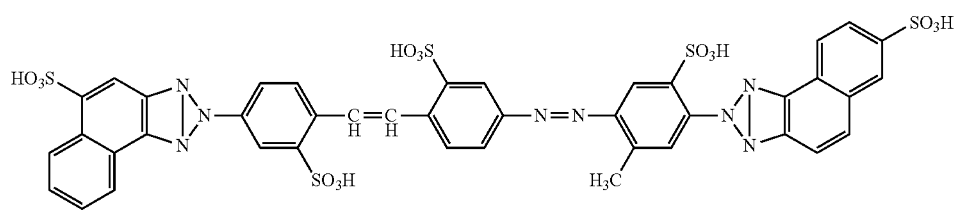 [SMILES: Cc1cc(-n2n3c4ccc5cc(S(=O)(=O)O)ccc5c4n23)c(S(=O)(=O)O)cc1N=Nc1ccc(C=Cc2ccc(-n3n4c5cc(S(=O)(=O)O)c6ccccc6c5n34)cc2S(=O)(=O)O)c(S(=O)(=O)O)c1] |
| e13 | 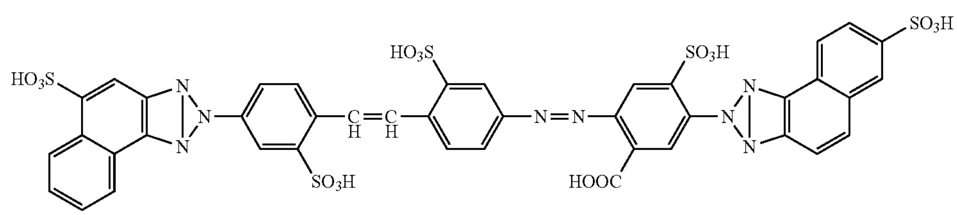 [SMILES: O=C(O)c1cc(-n2n3c4ccc5cc(S(=O)(=O)O)ccc5c4n23)c(S(=O)(=O)O)cc1N=Nc1ccc(C=Cc2ccc(-n3n4c5cc(S(=O)(=O)O)c6ccccc6c5n34)cc2S(=O)(=O)O)c(S(=O)(=O)O)c1] |
| e14 | 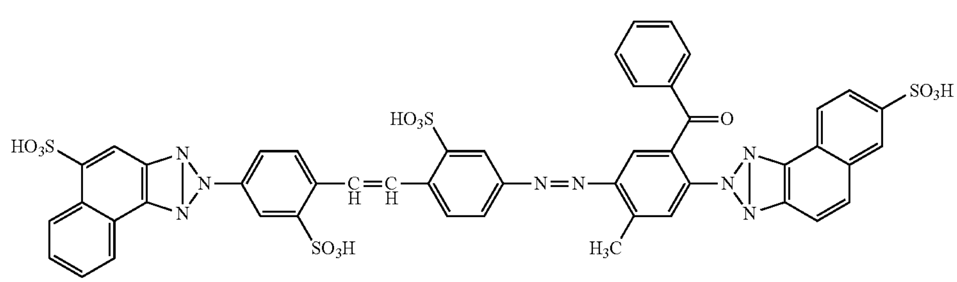 [SMILES: Cc1cc(-n2n3c4ccc5cc(S(=O)(=O)O)ccc5c4n23)c(C(=O)c2ccccc2)cc1N=Nc1ccc(C=Cc2ccc(-n3n4c5cc(S(=O)(=O)O)c6ccccc6c5n34)cc2S(=O)(=O)O)c(S(=O)(=O)O)c1] |
| e15 | 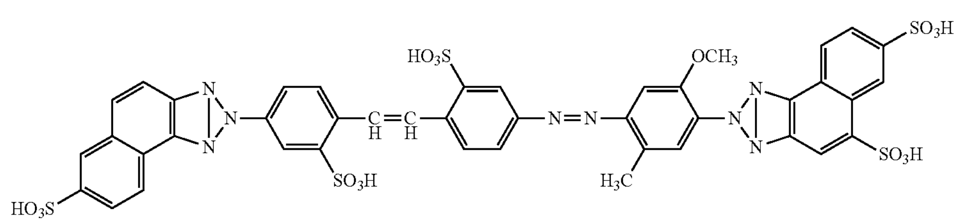 |

TABLE 32-continued
| Compound No. | Structural formula |
|---|---|
| e16 | 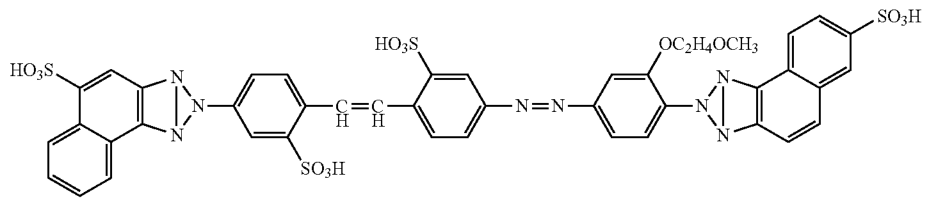 |
TABLE 33
| Compound No. | Structural formula |
|---|---|
| e17 | 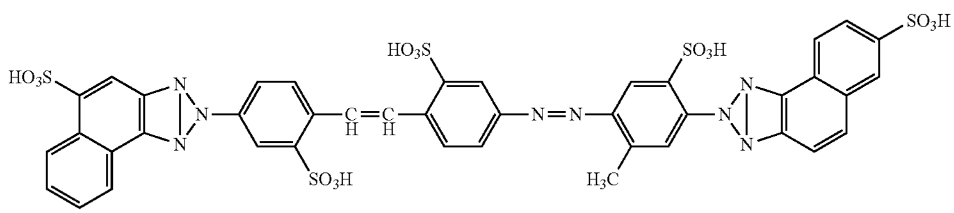 [SMILES: Cc1cc(-n2n3c4ccc5cc(S(=O)(=O)O)ccc5c4n23)c(S(=O)(=O)O)cc1N=Nc1ccc(C=Cc2ccc(-n3n4c5cc(S(=O)(=O)O)c6ccccc6c5n34)cc2S(=O)(=O)O)c(S(=O)(=O)O)c1] |
| e18 | 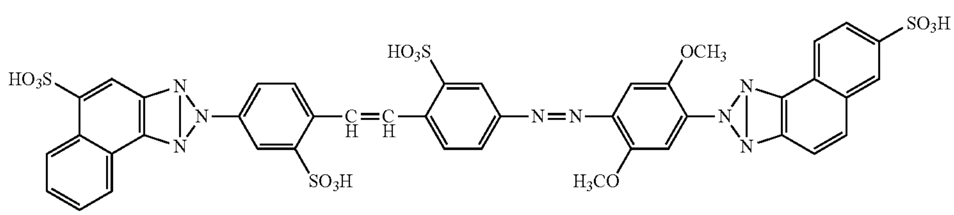 [SMILES: COc1cc(-n2n3c4ccc5cc(S(=O)(=O)O)ccc5c4n23)c(OC)cc1N=Nc1ccc(C=Cc2ccc(-n3n4c5cc(S(=O)(=O)O)c6ccccc6c5n34)cc2S(=O)(=O)O)c(S(=O)(=O)O)c1] |
| e19 | 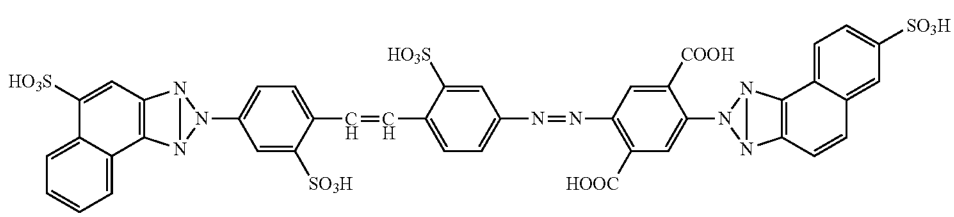 [SMILES: O=C(O)c1cc(-n2n3c4ccc5cc(S(=O)(=O)O)ccc5c4n23)c(C(=O)O)cc1N=Nc1ccc(C=Cc2ccc(-n3n4c5cc(S(=O)(=O)O)c6ccccc6c5n34)cc2S(=O)(=O)O)c(S(=O)(=O)O)c1] |
| e20 | 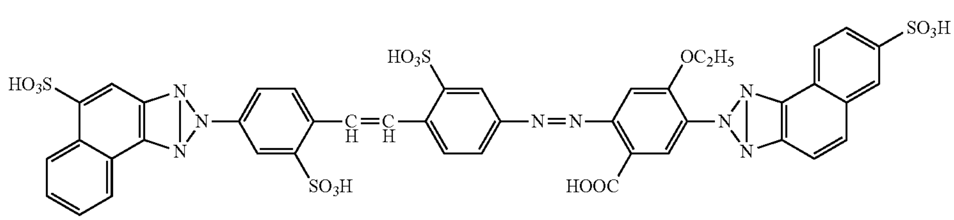 |
| e21 | 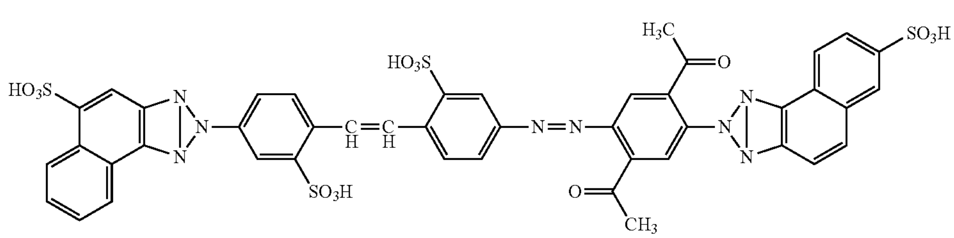 [SMILES: CC(=O)c1cc(-n2n3c4ccc5cc(S(=O)(=O)O)ccc5c4n23)c(C(C)=O)cc1N=Nc1ccc(C=Cc2ccc(-n3n4c5cc(S(=O)(=O)O)c6ccccc6c5n34)cc2S(=O)(=O)O)c(S(=O)(=O)O)c1] |

TABLE 33-continued

| Compound No. | Structural formula |
|---|---|
| e22 | 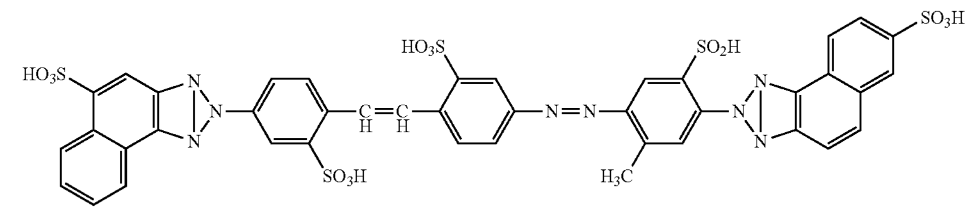 |
| e23 | 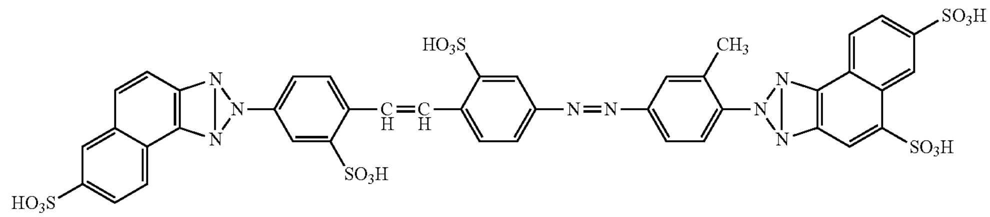 [SMILES: Cc1cc(N=Nc2ccc(C=Cc3ccc(-n4n5c6ccc7cc(S(=O)(=O)O)ccc7c6n45)cc3S(=O)(=O)O)c(S(=O)(=O)O)c2)ccc1-n1n2c3cc(S(=O)(=O)O)c4cc(S(=O)(=O)O)ccc4c3n12] |
| e24 | 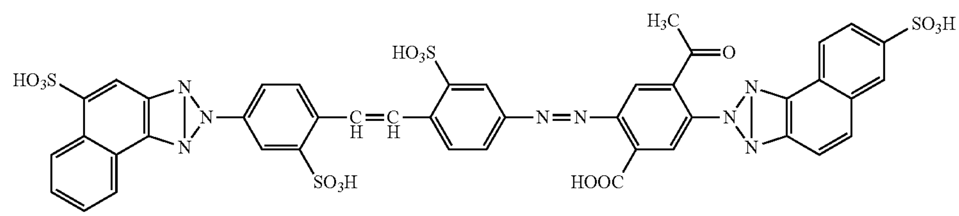 [SMILES: CC(=O)c1cc(N=Nc2ccc(C=Cc3ccc(-n4n5c6cc(S(=O)(=O)O)c7ccccc7c6n45)cc3S(=O)(=O)O)c(S(=O)(=O)O)c2)c(C(=O)O)cc1-n1n2c3ccc4cc(S(=O)(=O)O)ccc4c3n12] |

[Component (B-f)]

A component (B-f) can significantly improve both color development properties and moisture resistance in particular. The compound can be obtained, for example, by a method described in Japanese Patent Application Publication No. H09-217018.

In the formula (f1), A is a monoazo or polyazo dye residue. The monoazo residue is a group having, as constituents, two aromatic rings (which can be heterocyclic) bonded to each other via an azo group, and the polyazo residue is a group having, as constituents, three or more aromatic rings (which can be heterocyclic) bonded to each other via azo groups.

In the formula (f1), B is a hydrogen atom or a (C1-C6) alkyl group.

Examples of the (C1-C6) alkyl group as or in B in the formula (f1) include ones that are unsubstituted and constitute a linear or branched chain, preferably a linear chain. Specific examples include linear groups such as a methyl group, an ethyl group, an n-propyl group, an n-butyl group, an n-pentyl group, and an n-hexyl group; and branched groups such as an isopropyl group, an isobutyl group, a sec-butyl group, and a tert-butyl group. Preferable and specific examples include a methyl group and an n-propyl group, and a methyl group is more preferable.

In the formula (f1), each of m and n usually denotes an integer of 2 to 6, preferably an integer of 2 to 4, and more preferably 2 or 3.

In the formula (f2), $R^{101}$ and $R^{102}$ are independently a hydrogen atom: a (C1-C4) alkyl group; a (C1-C4) alkoxy group; or a ureido group.

Examples of the (C1-C4) alkyl group as or in $R^{101}$ and $R^{102}$ in the formula (f2) are the same as the examples of the $R^2$, $R^5$, $R^6$, (C1-C4) alkyl group as or in $R^1$, and $R^7$ in the formula (1) described above, including specific examples, preferable examples, and more preferable examples thereof.

Examples of the (C1-C4) alkoxy group as or in $R^{101}$ and $R^{102}$ in the formula (f2) are the same as the examples of the (C1-C4) alkoxy group as or in $R^1$, $R^2$, $R^5$, $R^6$, and $R^7$ in the formula (1) described above, including specific examples, preferable examples, and more preferable examples thereof.

In the formula (f2), p denotes an integer of 1 to 3 and more preferably an integer of 2.

In the formula (f2), when p denotes 1 and the azo group is attached to the 2-position, the sulfo group as a substituent is attached to the 1-position; the 4-position; the 5-position; the 6-position; the 7-position; or the 8-position of the naphthalene ring, and is more preferably attached to the 4-position; the 6-position; or the 8-position of the naphthalene ring. When p denotes 2 and the azo group is attached to the 2-position, the sulfo groups as substituents are attached to the 4-position and the 8-position; the 5-position and the 7-position; the 6-position and the 8-position; or the 1-position and the 5-position of the naphthalene ring, and are more preferably attached to the 4-position and the 8-position; or the 6-position and the 8-position of the naphthalene ring. When p denotes 3 and the azo group is attached to the 2-position, the sulfo groups as substituents are attached to the 3-position, the 6-position, and the 8-position; or the 4-position, the 6-position, and the 8-position of the naphthalene ring, any of which cases is preferable.

A compound adopting a combination of the preferable ones as A, B, m, n, $R^{101}$, $R^{102}$, and p in the formulae (f1) and (f2) is more preferable, and a compound adopting a combination of the more preferable ones as A, B, m, n, $R^{101}$, $R^{102}$, and p in the formulae (f1) and (f2) is further preferable.

Specific examples of the coloring matter represented by the formula (f1) are shown in Tables 34 to 36 below. However, the present invention is not limited thereto.

Among these, coloring matters shown under Compound Nos. f26 and f37 are particularly preferable.

TABLE 34
| Compound No. | Structural formula |
| --- | --- |
| f1 | 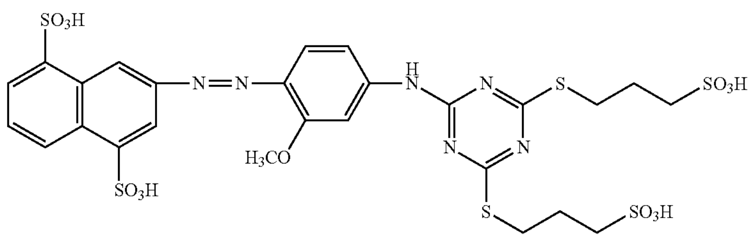 |
| f2 | 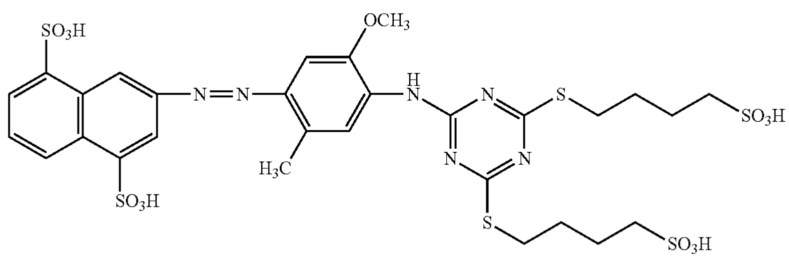 [SMILES: COc1cc(N=Nc2cc(S(=O)(=O)O)c3cccc(S(=O)(=O)O)c3c2)c(C)cc1Nc1nc(SCCCCS(=O)(=O)O)nc(SCCCCS(=O)(=O)O)n1] |
| f3 | 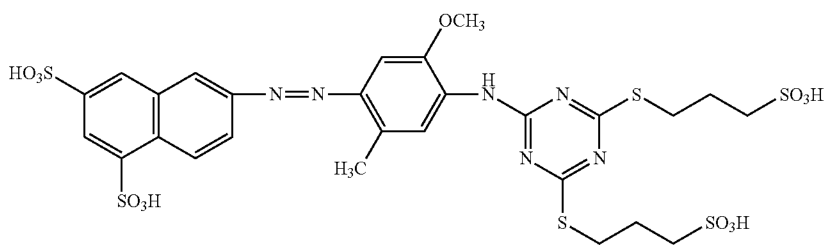 [SMILES: COc1cc(N=Nc2ccc3c(S(=O)(=O)O)cc(S(=O)(=O)O)cc3c2)c(C)cc1Nc1nc(SCCCS(=O)(=O)O)nc(SCCCS(=O)(=O)O)n1] |
| f4 | 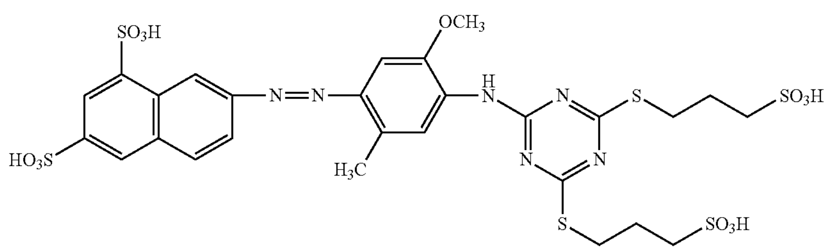 [SMILES: COc1cc(N=Nc2ccc3cc(S(=O)(=O)O)cc(S(=O)(=O)O)c3c2)c(C)cc1Nc1nc(SCCCS(=O)(=O)O)nc(SCCCS(=O)(=O)O)n1] |
| f5 | 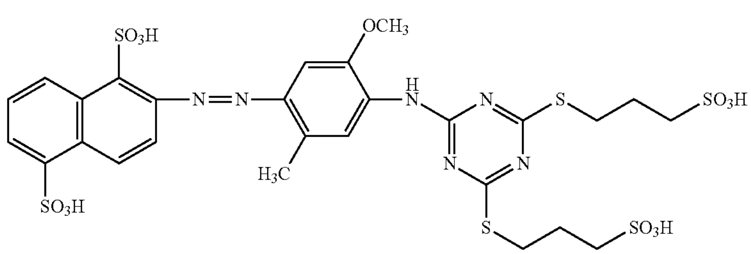 [SMILES: COc1cc(N=Nc2ccc3c(S(=O)(=O)O)cccc3c2S(=O)(=O)O)c(C)cc1Nc1nc(SCCCS(=O)(=O)O)nc(SCCCS(=O)(=O)O)n1] |
| f6 | 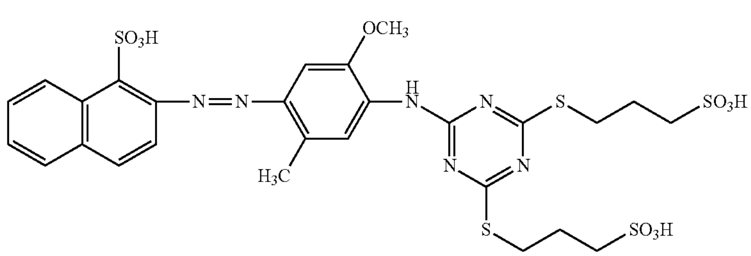 [SMILES: COc1cc(N=Nc2ccc3ccccc3c2S(=O)(=O)O)c(C)cc1Nc1nc(SCCCS(=O)(=O)O)nc(SCCCS(=O)(=O)O)n1] |

TABLE 34-continued
| Compound No. | Structural formula |
|---|---|
| f7 | 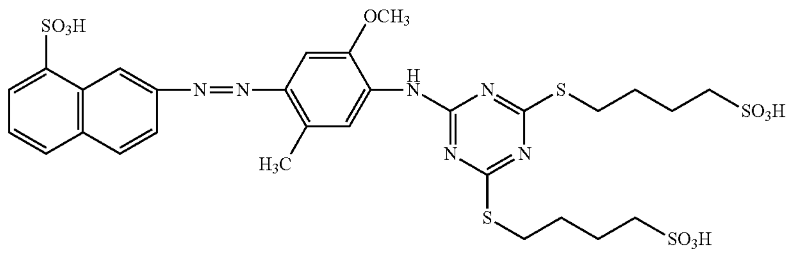 [SMILES: COc1cc(N=Nc2ccc3cccc(S(=O)(=O)O)c3c2)c(C)cc1Nc1nc(SCCCCS(=O)(=O)O)nc(SCCCCS(=O)(=O)O)n1] |
| f8 | 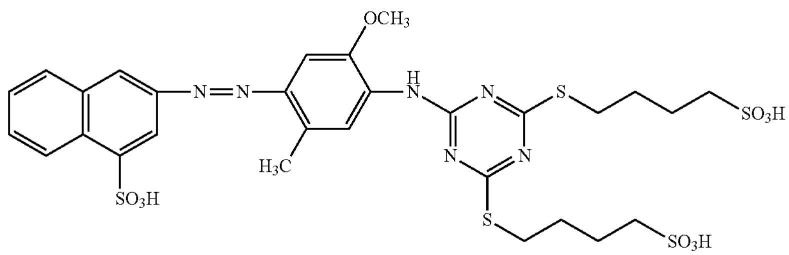 [SMILES: COc1cc(N=Nc2cc(S(=O)(=O)O)c3ccccc3c2)c(C)cc1Nc1nc(SCCCCS(=O)(=O)O)nc(SCCCCS(=O)(=O)O)n1] |
TABLE 35
| Compound No. | Structural formula |
|---|---|
| f9 | 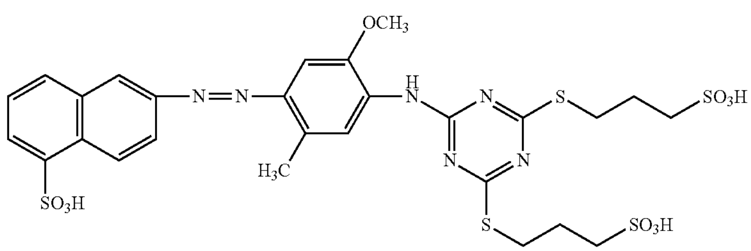 [SMILES: COc1cc(N=Nc2ccc3c(S(=O)(=O)O)cccc3c2)c(C)cc1Nc1nc(SCCCS(=O)(=O)O)nc(SCCCS(=O)(=O)O)n1] |
| f10 | 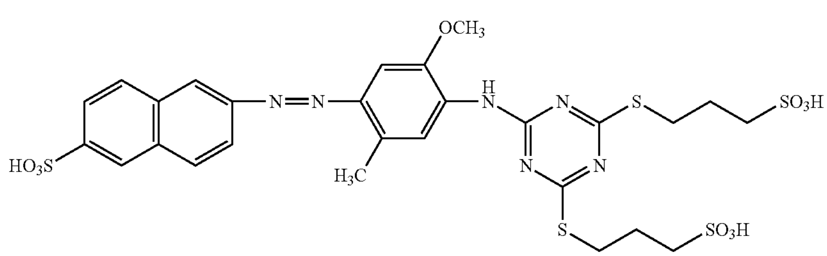 [SMILES: COc1cc(N=Nc2ccc3cc(S(=O)(=O)O)ccc3c2)c(C)cc1Nc1nc(SCCCS(=O)(=O)O)nc(SCCCS(=O)(=O)O)n1] |
| f11 | 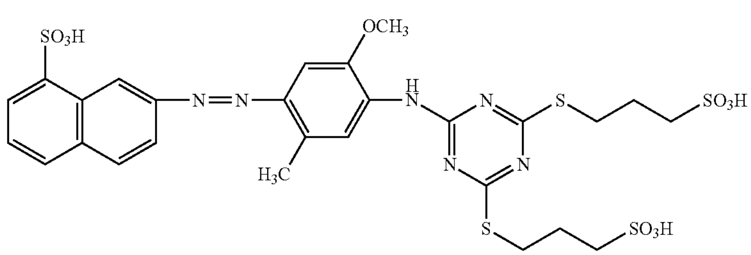 [SMILES: COc1cc(N=Nc2ccc3cccc(S(=O)(=O)O)c3c2)c(C)cc1Nc1nc(SCCCS(=O)(=O)O)nc(SCCCS(=O)(=O)O)n1] |

TABLE 35-continued
| Compound No. | Structural formula |
| --- | --- |
| f12 | 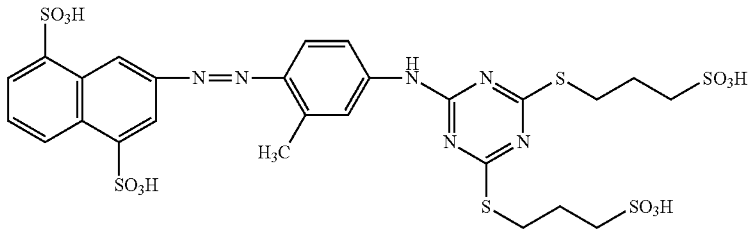 [SMILES: Cc1cc(Nc2nc(SCCCS(=O)(=O)O)nc(SCCCS(=O)(=O)O)n2)ccc1N=Nc1cc(S(=O)(=O)O)c2cccc(S(=O)(=O)O)c2c1] |
| f13 | 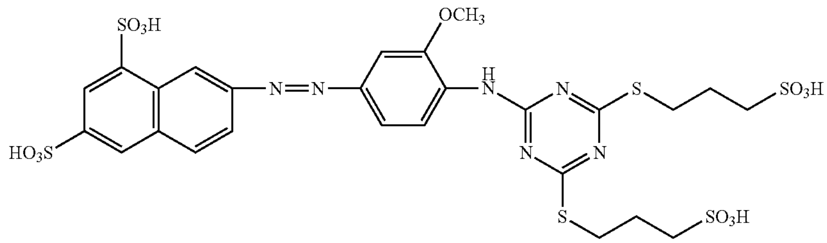 [SMILES: COc1cc(N=Nc2ccc3cc(S(=O)(=O)O)cc(S(=O)(=O)O)c3c2)ccc1Nc1nc(SCCCS(=O)(=O)O)nc(SCCCS(=O)(=O)O)n1] |
| f14 | 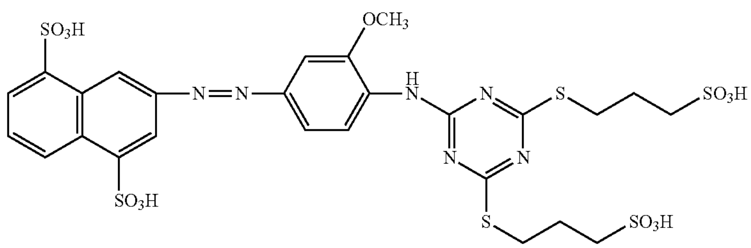 [SMILES: COc1cc(N=Nc2cc(S(=O)(=O)O)c3cccc(S(=O)(=O)O)c3c2)ccc1Nc1nc(SCCCS(=O)(=O)O)nc(SCCCS(=O)(=O)O)n1] |
| f15 | 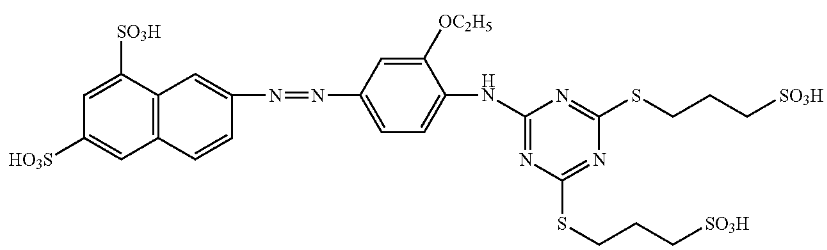 [SMILES: CCOc1cc(N=Nc2ccc3cc(S(=O)(=O)O)cc(S(=O)(=O)O)c3c2)ccc1Nc1nc(SCCCS(=O)(=O)O)nc(SCCCS(=O)(=O)O)n1] |
| f16 | 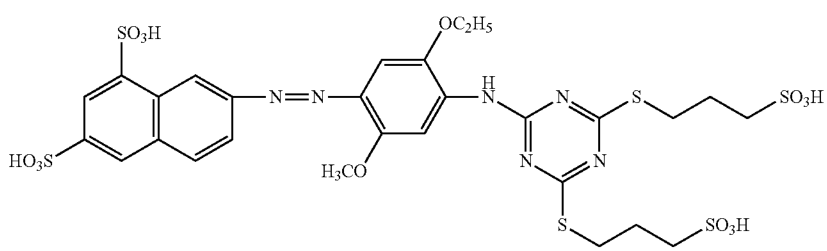 [SMILES: CCOc1cc(N=Nc2ccc3cc(S(=O)(=O)O)cc(S(=O)(=O)O)c3c2)c(OC)cc1Nc1nc(SCCCS(=O)(=O)O)nc(SCCCS(=O)(=O)O)n1] |
TABLE 36
| Compound No. | Structural formula |
| --- | --- |
| f17 | 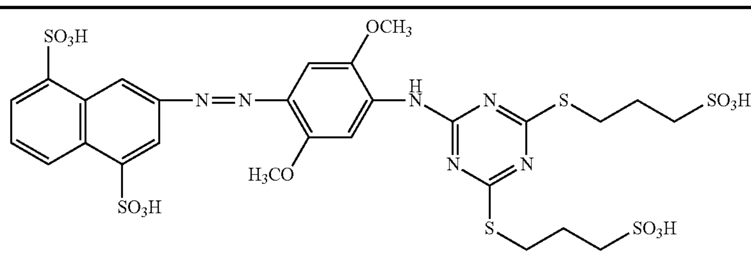 |

TABLE 36-continued
| Compound No. | Structural formula |
| --- | --- |
| f18 | 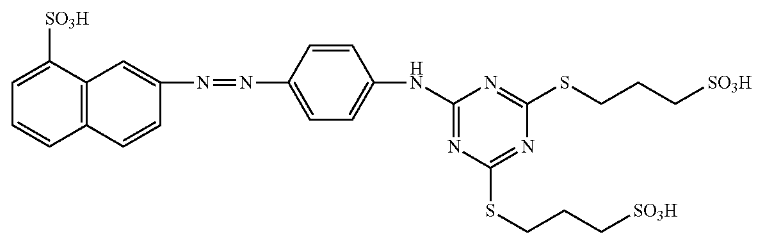 [SMILES: O=S(=O)(O)CCCSc1nc(Nc2ccc(N=Nc3ccc4cccc(S(=O)(=O)O)c4c3)cc2)nc(SCCCS(=O)(=O)O)n1] |
| f19 | 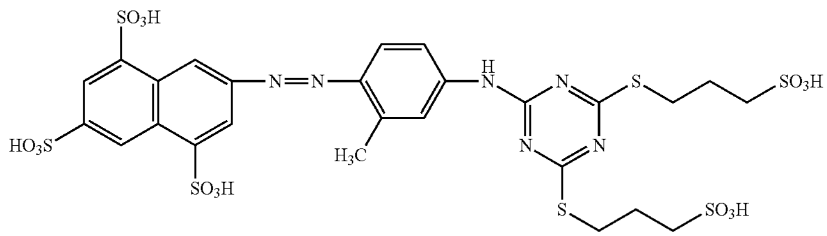 [SMILES: Cc1cc(Nc2nc(SCCCS(=O)(=O)O)nc(SCCCS(=O)(=O)O)n2)ccc1N=Nc1cc(S(=O)(=O)O)c2cc(S(=O)(=O)O)cc(S(=O)(=O)O)c2c1] |
| f20 | 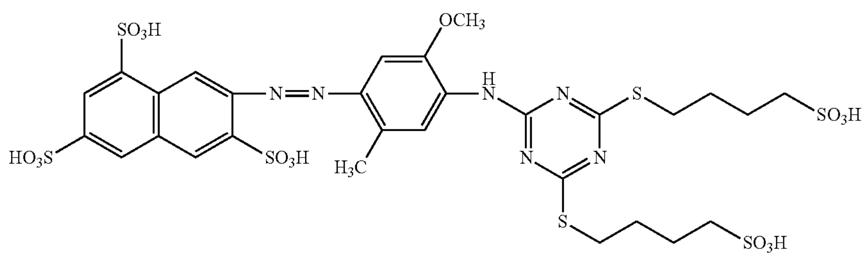 [SMILES: COc1cc(N=Nc2cc3c(S(=O)(=O)O)cc(S(=O)(=O)O)cc3cc2S(=O)(=O)O)c(C)cc1Nc1nc(SCCCCS(=O)(=O)O)nc(SCCCCS(=O)(=O)O)n1] |
| f21 | 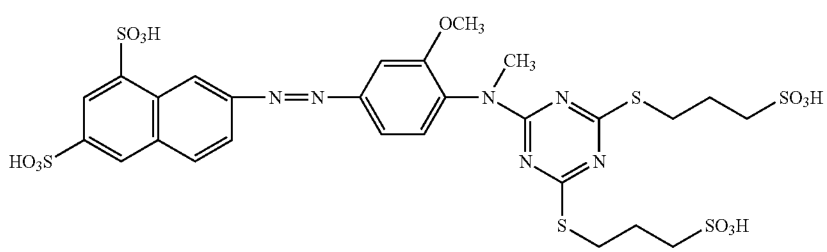 [SMILES: COc1cc(N=Nc2ccc3cc(S(=O)(=O)O)cc(S(=O)(=O)O)c3c2)ccc1N(C)c1nc(SCCCS(=O)(=O)O)nc(SCCCS(=O)(=O)O)n1] |
| f22 | 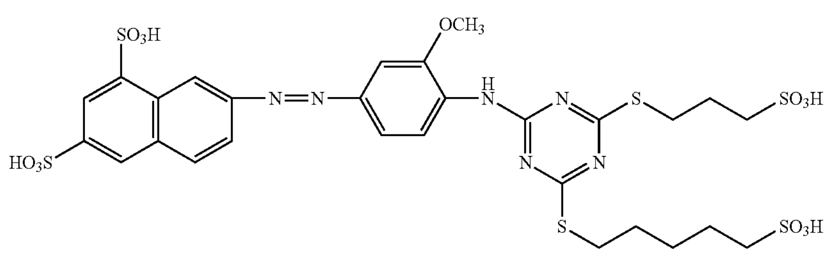 [SMILES: COc1cc(N=Nc2ccc3cc(S(=O)(=O)O)cc(S(=O)(=O)O)c3c2)ccc1Nc1nc(SCCCCCS(=O)(=O)O)nc(SCCCS(=O)(=O)O)n1] |
| f23 | 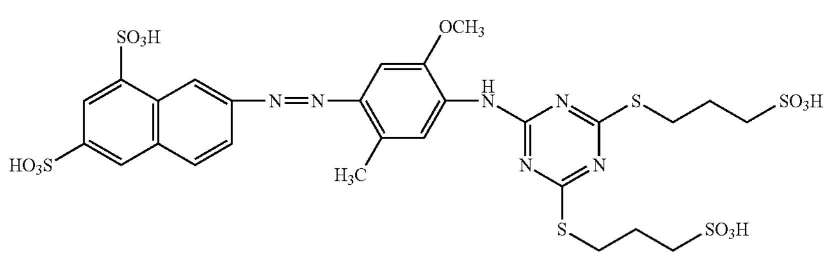 [SMILES: COc1cc(N=Nc2ccc3cc(S(=O)(=O)O)cc(S(=O)(=O)O)c3c2)c(C)cc1Nc1nc(SCCCS(=O)(=O)O)nc(SCCCS(=O)(=O)O)n1] |

TABLE 36-continued

| Compound No. | Structural formula |
| --- | --- |
| f24 | 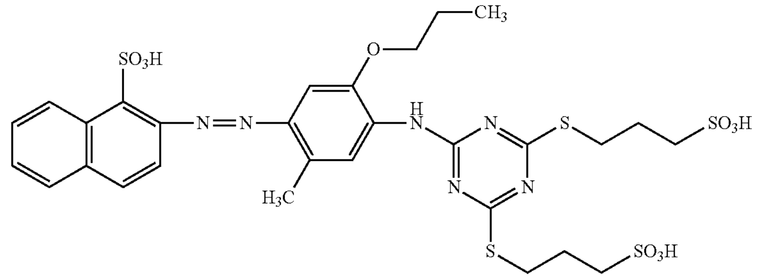 [SMILES: CCCOc1cc(N=Nc2ccc3ccccc3c2S(=O)(=O)O)c(C)cc1Nc1nc(SCCCS(=O)(=O)O)nc(SCCCS(=O)(=O)O)n1] |

[Component (B-g)]

A component (B-g) can improve light resistance in particular. The compound can be obtained, for example, by a method described in Japanese Patent Application Publication No. 2004-285351 and Japanese Patent Application Publication No. 2005-036222.

In the formula (g1), A and D are independently a phenyl group having at least a carboxy group and/or a sulfo group as a substituent, a naphthyl group having at least a carboxy group and/or a sulfo group as a substituent, or a 5- or 6-membered aromatic heterocyclic group having at least a carboxy group and/or a sulfo group as a substituent and being bonded to the corresponding azo group at one of the carbon atoms. One of X and Y is a hydroxy group, and the other is an amino group.

The carboxy group and/or a sulfo group in A and D in the formula (g1) may be directly attached to the phenyl group, the naphthyl group, or the aromatic heterocyclic group to serve as a substituent, or may be contained in a substituent of the phenyl group, the naphthyl group, or the aromatic heterocyclic group.

The 5- or 6-membered aromatic heterocyclic group being bonded to the corresponding azo group at one of the carbon atoms is, for example, a heterocyclic ring having at least one constituent heteroatom selected from a nitrogen atom, an oxygen atom, and a sulfur atom. The heterocyclic group may further be ring-condensed with another ring, and such a ring-condensed product is preferably formed by ring-condensation with a 5- or 6-membered ring.

A and D are more preferably a phenyl group or a naphthyl group, among others.

Another group, except for a carboxy group and a sulfo group, that can substitute A and D is, for example, a halogen atom; a hydroxy group; an amino group; a nitro group; a (C1-C4) alkyl group; a (C1-C4) alkoxy group; an acyl group; a phenyl group; a ureido group; a (C1-C4) alkyl group substituted with at least one or more groups selected from the group consisting of a hydroxy group, a (C1-C4) alkoxy group, a sulfo group, and a carboxy group; a (C1-C4) alkoxy group substituted with at least one or more groups selected from the group consisting of a hydroxy group, a (C1-C4) alkoxy group, a sulfo group, and a carboxy group; or an amino group that is substituted with a phenyl group optionally substituted with a carboxy group or a sulfo group, a (C1-C4) alkyl group, or an acyl group.

Examples of the halogen atom as or in A and D in the formula (g1) are the same as the examples of the halogen atom as or in $R^1$, $R^2$, $R^5$, $R^6$, and $R^7$ described above, including specific examples, preferable examples, and more preferable examples thereof.

Examples of the (C1-C4) alkyl group as or in A and D in the formula (g1) are the same as the examples of the (C1-C4) alkyl group as or in $R^1$, $R^2$, $R^5$, $R^6$, and $R^7$ described above, including specific examples, preferable examples, and more preferable examples thereof.

Examples of the (C1-C4) alkoxy group as or in A and D in the formula (g1) are the same as the examples of the (C1-C4) alkoxy group as or in $R^1$, $R^2$, $R^5$, $R^6$, and $R^7$ described above, including specific examples, preferable examples, and more preferable examples thereof.

Examples of the acyl group as or in A and D in the formula (g1) are the same as the examples of the acyl group as or in $R^1$, $R^2$, $R^5$, $R^6$, and $R^7$ described above, including specific examples, preferable examples, and more preferable examples thereof.

Examples of the (C1-C4) alkyl group substituted with at least one or more groups selected from the group consisting of a hydroxy group, a (C1-C4) alkoxy group, a sulfo group, and a carboxy group as or in A and D in the formula (g1) include ones in which one of the carbon atoms of the (C1-C4) alkyl group has one, two, or more groups selected from a hydroxy group, a (C1-C4) alkoxy group, a sulfo group, and a carboxy group attached thereto as a substituent. The position to which a substituent is attached is not particularly limited, but is preferably a terminus of the alkyl group. The number of substitution is 1 or 2 and is preferably 1. Examples of the (C1-C4) alkoxy group are the same as the examples of the (C1-C4) alkoxy group described above, including specific examples, preferable examples, and more preferable examples thereof. Specific examples of the (C1-C4) alkyl group substituted with a sulfo group, a hydroxy group, or a (C1-C4) alkoxy group include a hydroxymethyl group, a 2-hydroxyethyl group, a 3-hydroxy-n-propyl group, a 4-hydroxy-n-butyl group, a methoxymethyl group, a 2-methoxyethyl group, a 3-methoxy-n-propyl group, a 4-methoxy-n-butyl group, an ethoxymethyl group, a 2-ethoxyethyl group, a 3-ethoxy-n-propyl group, a 4-ethoxy-n-butyl group, an n-propoxymethyl group, a 2-(n-propoxy)ethyl group, a 3-(n-propoxy)-n-propyl group, a 4-(n-propoxy)-n-butyl group, an (n-butoxy)methyl group, a 2-(n-butoxy)ethyl group, a 3-(n-butoxy)-n-propyl group, a 4-(n-butoxy)-n-butyl group, a sulfomethyl group, a 2-sulfoethyl group, a 3-sulfo-n-propyl group, a 4-sulfo-n-butyl group, a carboxymethyl group, a 2-carboxyethyl group, a 3-carboxy-n-propyl group, and a 4-carboxy-n-butyl group.

Examples of the (C1-C4) alkoxy group substituted with at least one or more groups selected from the group consisting of a hydroxy group, a (C1-C4) alkoxy group, a sulfo group, and a carboxy group as or in A and D in the formula (g1) are the same as the examples of the acyl group as or in $R^1$, $R^2$, $R^5$, $R^6$, and $R^7$ described above, including specific examples, preferable examples, and more preferable examples thereof.

Examples of the (C1-C4) alkyl group and the acyl group in the amino group that is substituted with a phenyl group optionally substituted with a carboxy group or a sulfo group, a (C1-C4) alkyl group, or an acyl group as or in A and D in the formula (g1) are the same as the examples of the (C1-C4) alkyl group and the acyl group as or in $R^1$, $R^2$, $R^5$, $R^6$, and $R^7$ described above, including specific examples, preferable examples, and more preferable examples thereof.

In the formula (g1), a preferable group as A is a phenyl group having at least one sulfo group directly attached thereto or as a constituent of a sulfo (C1-C4) alkoxy group, at an o-position or a m-position and more preferably at an o-position relative to the azo group, or is a naphthyl group having one to three sulfo groups, for instance. The phenyl group is more preferable. When A in the formula (g1) is the phenyl group, one or two groups and more preferably one group among the exemplified preferable substituent groups of A and D may be further contained. When the phenyl group has two substituents including a sulfo group, these two substituents are preferably attached to the 2-position and the 4-position, the 2-position and the 5-position, or the 3-position and the 4-position of the phenyl group and are further preferably attached to the 2-position and the 4-position of the phenyl group, with the azo group being attached to the 1-position.

Preferable examples of D in the formula (g1) are the same as the preferable groups as A described above, D being independent of A.

In the formula (g1), i, j, and k denote 1 or 2, and preferably i denotes 1 and j and k denote 2.

The structure of the formula (g1) is preferably the structure of the formula (4), for example. A and D in the compound of the formula (4) are the same as A and D in the formula (g1) described above, including preferable examples thereof. i, k, and l independently denote 0 to 1. It is preferable that i denotes 0 and k and l denote 1.

In addition, the compound can also be a compound in which the bond a is bonded to the 12-position or the 13-position, the bond b is bonded to the 16-position or the 17-position, and one of X and Y is a hydroxy group and the other is an amino group.

Specific examples of the coloring matter represented by the formula (g1) are shown in Tables 37 to 39 below. However, the present invention is not limited thereto.

Among these, a coloring matter shown under Compound No. g30 is particularly preferable.

TABLE 37

| Compound No. | Structural formula |
| --- | --- |
| g1 | 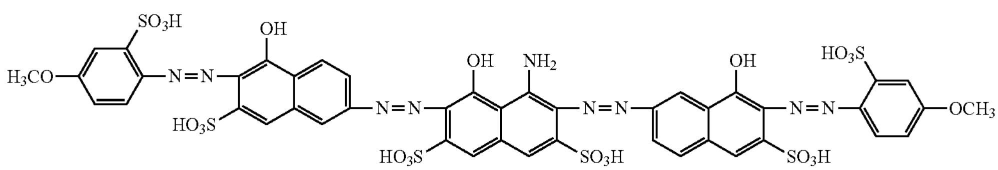 [SMILES: COc1ccc(N=Nc2c(S(=O)(=O)O)cc3cc(N=Nc4c(S(=O)(=O)O)cc5cc(S(=O)(=O)O)c(N=Nc6ccc7cc(S(=O)(=O)O)c(N=Nc8ccc(OC)cc8S(=O)(=O)O)c(O)c7c6)c(N)c5c4O)ccc3c2O)c(S(=O)(=O)O)c1] |
| g2 | 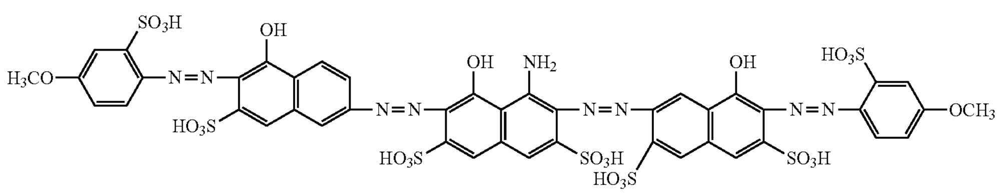 [SMILES: COc1ccc(N=Nc2c(S(=O)(=O)O)cc3cc(N=Nc4c(S(=O)(=O)O)cc5cc(S(=O)(=O)O)c(N=Nc6cc7c(O)c(N=Nc8ccc(OC)cc8S(=O)(=O)O)c(S(=O)(=O)O)cc7cc6S(=O)(=O)O)c(N)c5c4O)ccc3c2O)c(S(=O)(=O)O)c1] |
| g3 | 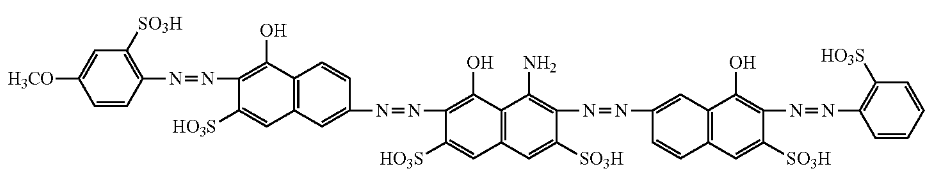 [SMILES: COc1ccc(N=Nc2c(S(=O)(=O)O)cc3cc(N=Nc4c(S(=O)(=O)O)cc5cc(S(=O)(=O)O)c(N=Nc6ccc7cc(S(=O)(=O)O)c(N=Nc8ccccc8S(=O)(=O)O)c(O)c7c6)c(N)c5c4O)ccc3c2O)c(S(=O)(=O)O)c1] |
| g4 | 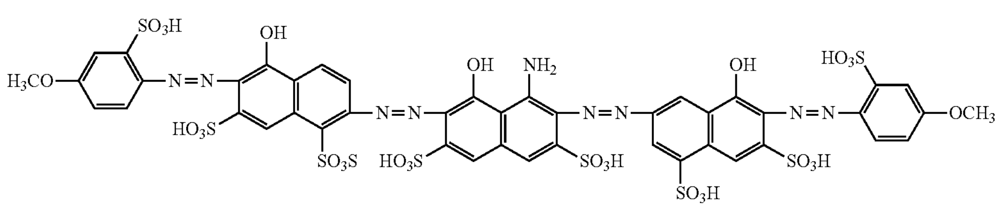 |
| g5 | 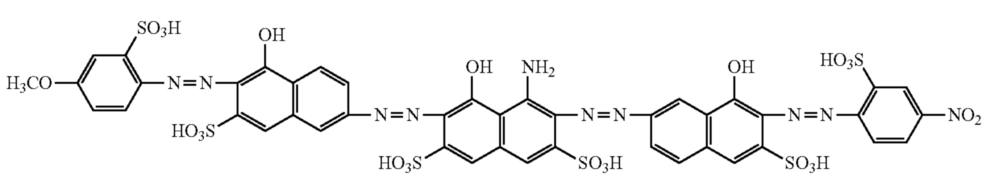 [SMILES: COc1ccc(N=Nc2c(S(=O)(=O)O)cc3cc(N=Nc4c(S(=O)(=O)O)cc5cc(S(=O)(=O)O)c(N=Nc6ccc7cc(S(=O)(=O)O)c(N=Nc8ccc([N+](=O)[O-])cc8S(=O)(=O)O)c(O)c7c6)c(N)c5c4O)ccc3c2O)c(S(=O)(=O)O)c1] |

TABLE 37-continued
| Compound No. | Structural formula |
|---|---|
| g6 | 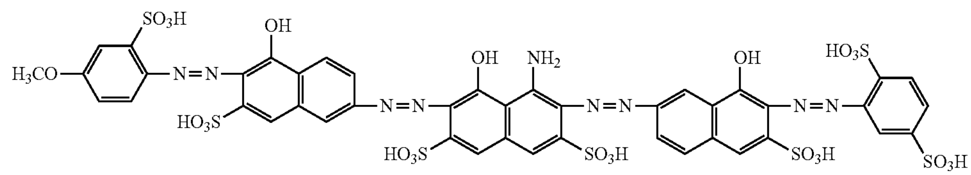 [SMILES: COc1ccc(N=Nc2c(S(=O)(=O)O)cc3cc(N=Nc4c(S(=O)(=O)O)cc5cc(S(=O)(=O)O)c(N=Nc6ccc7cc(S(=O)(=O)O)c(N=Nc8cc(S(=O)(=O)O)ccc8S(=O)(=O)O)c(O)c7c6)c(N)c5c4O)ccc3c2O)c(S(=O)(=O)O)c1] |
| g7 | 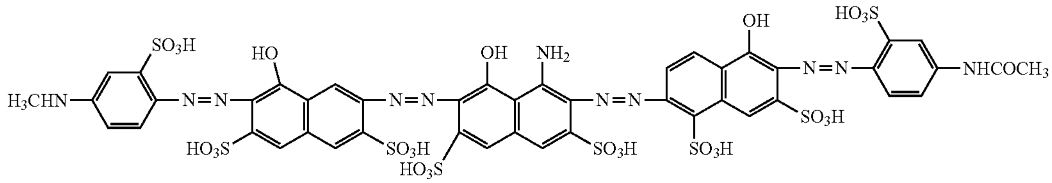 |
| g8 | 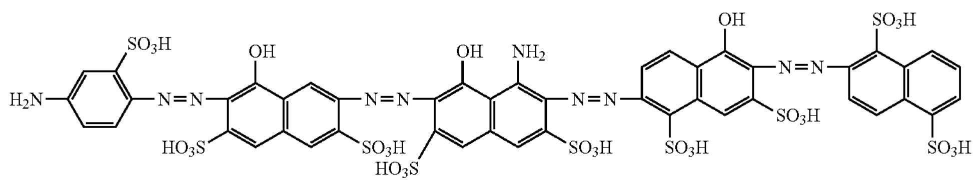 [SMILES: Nc1ccc(N=Nc2c(S(=O)(=O)O)cc3cc(S(=O)(=O)O)c(N=Nc4c(S(=O)(=O)O)cc5cc(S(=O)(=O)O)c(N=Nc6ccc7c(O)c(N=Nc8ccc9c(S(=O)(=O)O)cccc9c8S(=O)(=O)O)c(S(=O)(=O)O)cc7c6S(=O)(=O)O)c(N)c5c4O)cc3c2O)c(S(=O)(=O)O)c1] |
| g9 | 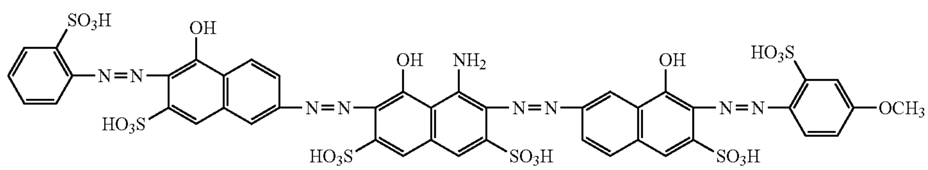 [SMILES: COc1ccc(N=Nc2c(S(=O)(=O)O)cc3ccc(N=Nc4c(S(=O)(=O)O)cc5cc(S(=O)(=O)O)c(N=Nc6ccc7c(O)c(N=Nc8ccccc8S(=O)(=O)O)c(S(=O)(=O)O)cc7c6)c(O)c5c4N)cc3c2O)c(S(=O)(=O)O)c1] |
| g10 | 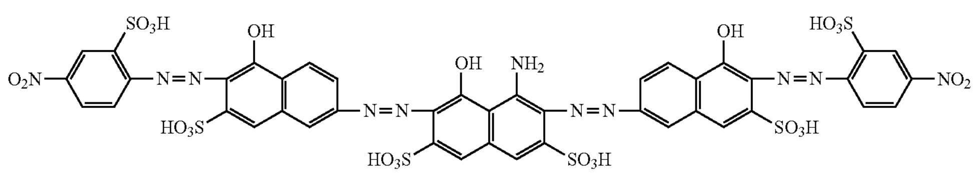 [SMILES: Nc1c(N=Nc2ccc3c(O)c(N=Nc4ccc([N+](=O)[O-])cc4S(=O)(=O)O)c(S(=O)(=O)O)cc3c2)c(S(=O)(=O)O)cc2cc(S(=O)(=O)O)c(N=Nc3ccc4c(O)c(N=Nc5ccc([N+](=O)[O-])cc5S(=O)(=O)O)c(S(=O)(=O)O)cc4c3)c(O)c12] |
| g11 | 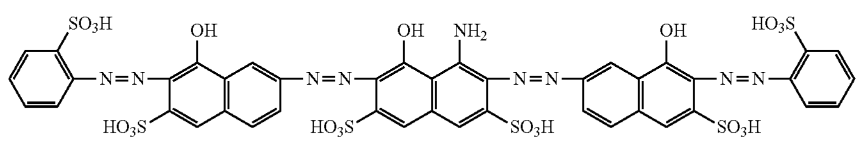 [SMILES: Nc1c(N=Nc2ccc3cc(S(=O)(=O)O)c(N=Nc4ccccc4S(=O)(=O)O)c(O)c3c2)c(S(=O)(=O)O)cc2cc(S(=O)(=O)O)c(N=Nc3ccc4cc(S(=O)(=O)O)c(N=Nc5ccccc5S(=O)(=O)O)c(O)c4c3)c(O)c12] |
| g12 | 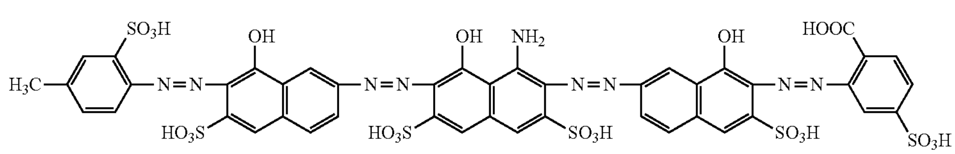 [SMILES: Cc1ccc(N=Nc2c(S(=O)(=O)O)cc3ccc(N=Nc4c(S(=O)(=O)O)cc5cc(S(=O)(=O)O)c(N=Nc6ccc7cc(S(=O)(=O)O)c(N=Nc8cc(S(=O)(=O)O)ccc8C(=O)O)c(O)c7c6)c(N)c5c4O)cc3c2O)c(S(=O)(=O)O)c1] |
TABLE 38
| Compound No. | Structural formula |
|---|---|
| g13 | 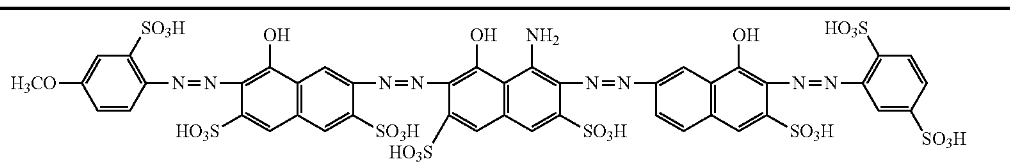 |

TABLE 38-continued
| Compound No. | Structural formula |
| --- | --- |
| g14 | 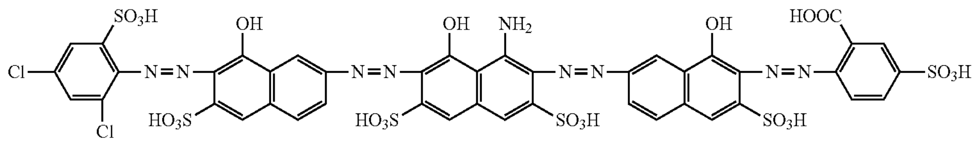 [SMILES: Nc1c(N=Nc2ccc3cc(S(=O)(=O)O)c(N=Nc4ccc(S(=O)(=O)O)cc4C(=O)O)c(O)c3c2)c(S(=O)(=O)O)cc2cc(S(=O)(=O)O)c(N=Nc3ccc4cc(S(=O)(=O)O)c(N=Nc5c(Cl)cc(Cl)cc5S(=O)(=O)O)c(O)c4c3)c(O)c12] |
| g15 | 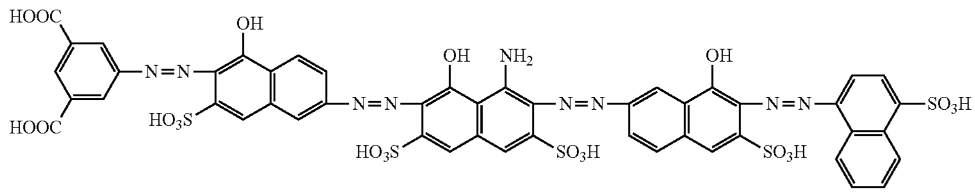 [SMILES: Nc1c(N=Nc2ccc3cc(S(=O)(=O)O)c(N=Nc4ccc(S(=O)(=O)O)c5ccccc45)c(O)c3c2)c(S(=O)(=O)O)cc2cc(S(=O)(=O)O)c(N=Nc3ccc4c(O)c(N=Nc5cc(C(=O)O)cc(C(=O)O)c5)c(S(=O)(=O)O)cc4c3)c(O)c12] |
| g16 | 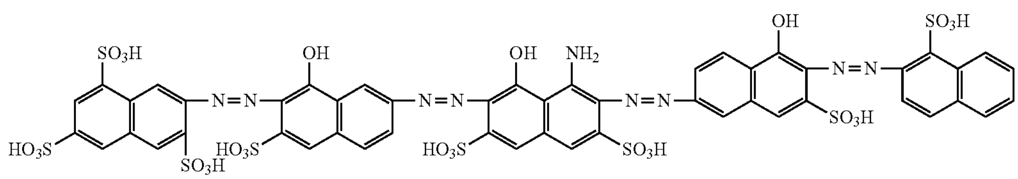 [SMILES: Nc1c(N=Nc2ccc3c(O)c(N=Nc4ccc5ccccc5c4S(=O)(=O)O)c(S(=O)(=O)O)cc3c2)c(S(=O)(=O)O)cc2cc(S(=O)(=O)O)c(N=Nc3ccc4cc(S(=O)(=O)O)c(N=Nc5cc6c(S(=O)(=O)O)cc(S(=O)(=O)O)cc6cc5S(=O)(=O)O)c(O)c4c3)c(O)c12] |
| g17 | 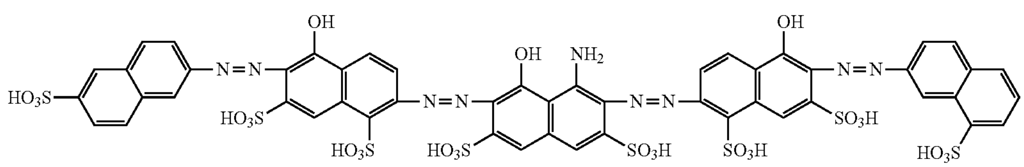 [SMILES: Nc1c(N=Nc2ccc3c(O)c(N=Nc4ccc5cccc(S(=O)(=O)O)c5c4)c(S(=O)(=O)O)cc3c2S(=O)(=O)O)c(S(=O)(=O)O)cc2cc(S(=O)(=O)O)c(N=Nc3ccc4c(O)c(N=Nc5ccc6cc(S(=O)(=O)O)ccc6c5)c(S(=O)(=O)O)cc4c3S(=O)(=O)O)c(O)c12] |
| g18 | 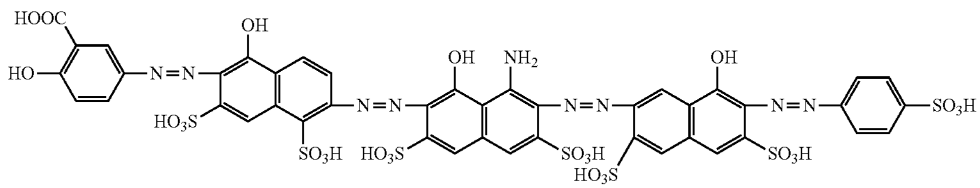 [SMILES: Nc1c(N=Nc2cc3c(O)c(N=Nc4ccc(S(=O)(=O)O)cc4)c(S(=O)(=O)O)cc3cc2S(=O)(=O)O)c(S(=O)(=O)O)cc2cc(S(=O)(=O)O)c(N=Nc3ccc4c(O)c(N=Nc5ccc(O)c(C(=O)O)c5)c(S(=O)(=O)O)cc4c3S(=O)(=O)O)c(O)c12] |
| g19 | 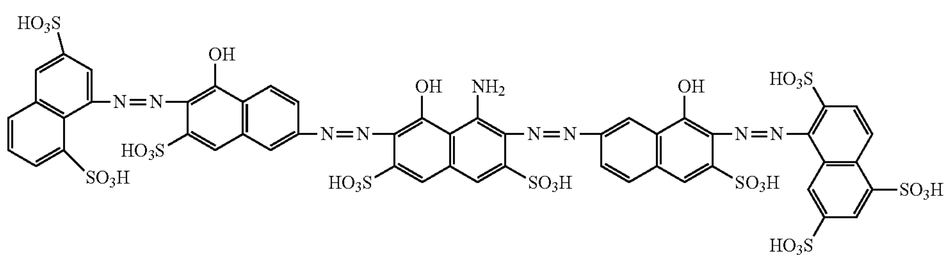 [SMILES: Nc1c(N=Nc2ccc3cc(S(=O)(=O)O)c(N=Nc4c(S(=O)(=O)O)ccc5c(S(=O)(=O)O)cc(S(=O)(=O)O)cc45)c(O)c3c2)c(S(=O)(=O)O)cc2cc(S(=O)(=O)O)c(N=Nc3ccc4c(O)c(N=Nc5cc(S(=O)(=O)O)cc6cccc(S(=O)(=O)O)c56)c(S(=O)(=O)O)cc4c3)c(O)c12] |
| g20 | 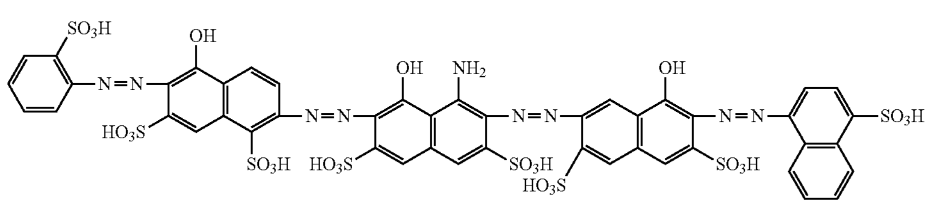 [SMILES: Nc1c(N=Nc2cc3c(O)c(N=Nc4ccc(S(=O)(=O)O)c5ccccc45)c(S(=O)(=O)O)cc3cc2S(=O)(=O)O)c(S(=O)(=O)O)cc2cc(S(=O)(=O)O)c(N=Nc3ccc4c(O)c(N=Nc5ccccc5S(=O)(=O)O)c(S(=O)(=O)O)cc4c3S(=O)(=O)O)c(O)c12] |
| g21 | 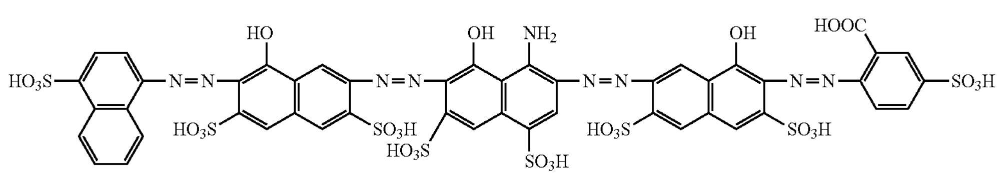 [SMILES: Nc1c(N=Nc2cc3c(O)c(N=Nc4ccc(S(=O)(=O)O)cc4C(=O)O)c(S(=O)(=O)O)cc3cc2S(=O)(=O)O)cc(S(=O)(=O)O)c2cc(S(=O)(=O)O)c(N=Nc3cc4c(O)c(N=Nc5ccc(S(=O)(=O)O)c6ccccc56)c(S(=O)(=O)O)cc4cc3S(=O)(=O)O)c(O)c12] |

TABLE 38-continued
| Compound No. | Structural formula |
|---|---|
| g22 | 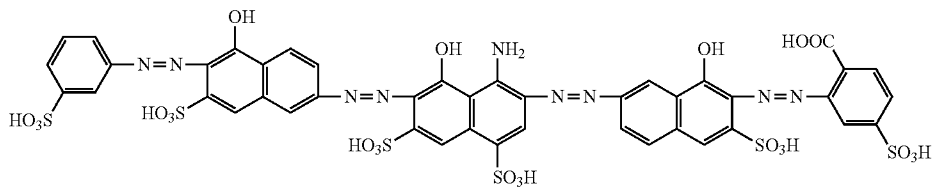 [SMILES: Nc1c(N=Nc2ccc3cc(S(=O)(=O)O)c(N=Nc4cc(S(=O)(=O)O)ccc4C(=O)O)c(O)c3c2)cc(S(=O)(=O)O)c2cc(S(=O)(=O)O)c(N=Nc3ccc4c(O)c(N=Nc5cccc(S(=O)(=O)O)c5)c(S(=O)(=O)O)cc4c3)c(O)c12] |
| g23 | 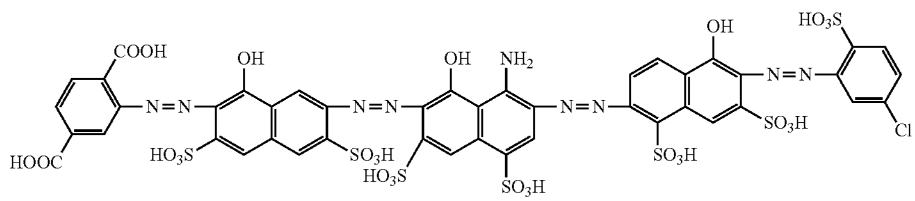 [SMILES: Nc1c(N=Nc2ccc3c(O)c(N=Nc4cc(Cl)ccc4S(=O)(=O)O)c(S(=O)(=O)O)cc3c2S(=O)(=O)O)cc(S(=O)(=O)O)c2cc(S(=O)(=O)O)c(N=Nc3cc4c(O)c(N=Nc5cc(C(=O)O)ccc5C(=O)O)c(S(=O)(=O)O)cc4cc3S(=O)(=O)O)c(O)c12] |
| g24 | 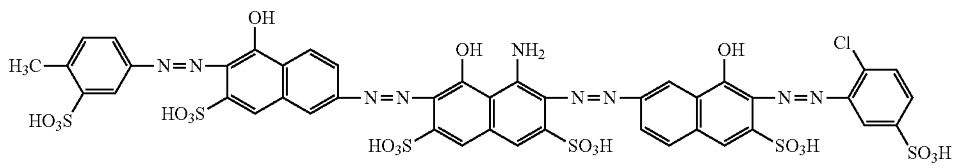 [SMILES: Cc1ccc(N=Nc2c(S(=O)(=O)O)cc3cc(N=Nc4c(S(=O)(=O)O)cc5cc(S(=O)(=O)O)c(N=Nc6ccc7cc(S(=O)(=O)O)c(N=Nc8cc(S(=O)(=O)O)ccc8Cl)c(O)c7c6)c(N)c5c4O)ccc3c2O)cc1S(=O)(=O)O] |
TABLE 39
| Compound No. | Structural formula |
|---|---|
| g25 | 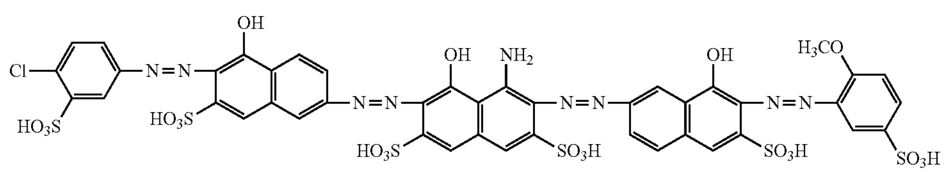 [SMILES: COc1ccc(S(=O)(=O)O)cc1N=Nc1c(S(=O)(=O)O)cc2ccc(N=Nc3c(S(=O)(=O)O)cc4cc(S(=O)(=O)O)c(N=Nc5ccc6c(O)c(N=Nc7ccc(Cl)c(S(=O)(=O)O)c7)c(S(=O)(=O)O)cc6c5)c(O)c4c3N)cc2c1O] |
| g26 | 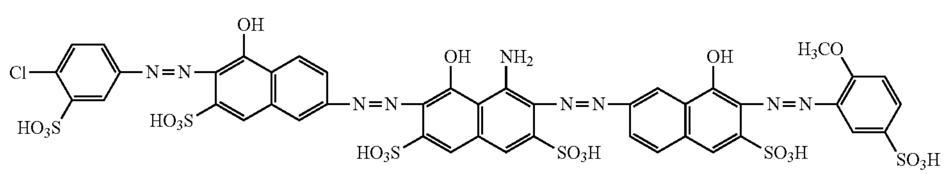 [SMILES: COc1ccc(S(=O)(=O)O)cc1N=Nc1c(S(=O)(=O)O)cc2ccc(N=Nc3c(S(=O)(=O)O)cc4cc(S(=O)(=O)O)c(N=Nc5ccc6c(O)c(N=Nc7ccc(Cl)c(S(=O)(=O)O)c7)c(S(=O)(=O)O)cc6c5)c(O)c4c3N)cc2c1O] |
| g27 | 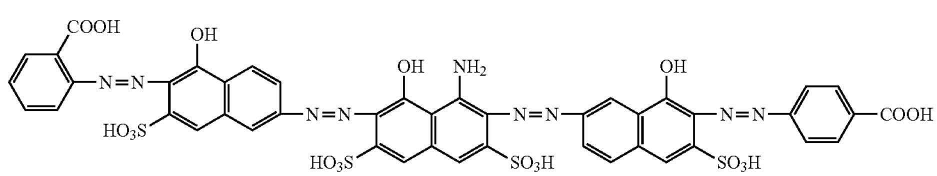 [SMILES: Nc1c(N=Nc2ccc3cc(S(=O)(=O)O)c(N=Nc4ccc(C(=O)O)cc4)c(O)c3c2)c(S(=O)(=O)O)cc2cc(S(=O)(=O)O)c(N=Nc3ccc4c(O)c(N=Nc5ccccc5C(=O)O)c(S(=O)(=O)O)cc4c3)c(O)c12] |
| g28 | 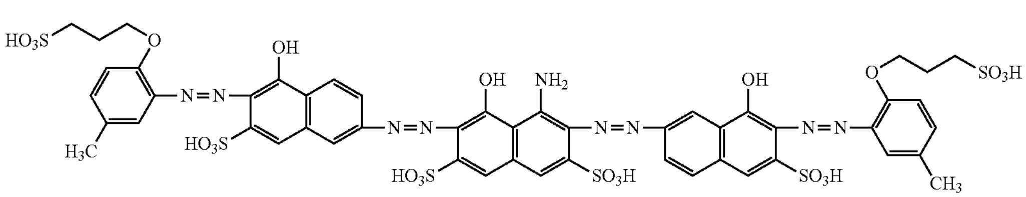 [SMILES: Cc1ccc(OCCCS(=O)(=O)O)c(N=Nc2c(S(=O)(=O)O)cc3cc(N=Nc4c(S(=O)(=O)O)cc5cc(S(=O)(=O)O)c(N=Nc6ccc7cc(S(=O)(=O)O)c(N=Nc8cc(C)ccc8OCCCS(=O)(=O)O)c(O)c7c6)c(N)c5c4O)ccc3c2O)c1] |

TABLE 39-continued

| Compound No. | Structural formula |
|---|---|
| g29 | 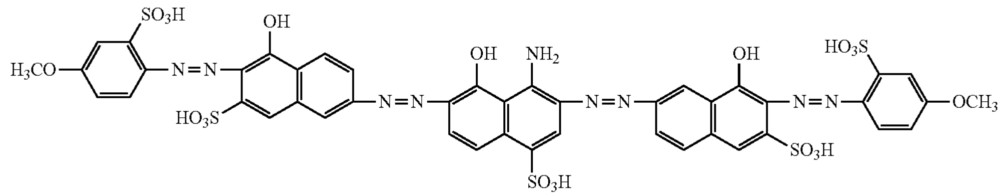 [SMILES: COc1ccc(N=Nc2c(S(=O)(=O)O)cc3cc(N=Nc4ccc5c(S(=O)(=O)O)cc(N=Nc6ccc7cc(S(=O)(=O)O)c(N=Nc8ccc(OC)cc8S(=O)(=O)O)c(O)c7c6)c(N)c5c4O)ccc3c2O)c(S(=O)(=O)O)c1] |
| g30 | 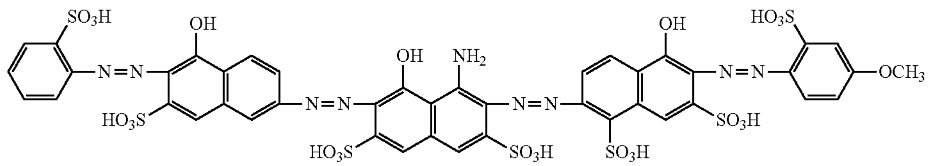 [SMILES: COc1ccc(N=Nc2c(S(=O)(=O)O)cc3c(S(=O)(=O)O)c(N=Nc4c(S(=O)(=O)O)cc5cc(S(=O)(=O)O)c(N=Nc6ccc7c(O)c(N=Nc8ccccc8S(=O)(=O)O)c(S(=O)(=O)O)cc7c6)c(O)c5c4N)ccc3c2O)c(S(=O)(=O)O)c1] |

[Component (B-h)]

In the formula (B-h), $R^{201}$ to $R^{203}$ are independently a hydrogen atom; a halogen atom; a cyano group; a hydroxy group; an amino group; a sulfo group; a carboxy group; an N—(C1-C4) alkylaminosulfonyl group; a phenylaminosulfonyl group; a phosphate group; a nitro group; an acyl group; a phenyl group; a ureido group; a (C1-C4) alkyl group that is optionally substituted with a hydroxy group or a (C1-C4) alkoxy group; a (C1-C4) alkoxy group that is optionally substituted with at least one or more groups selected from the group consisting of a hydroxy group, a (C1-C4) alkoxy group, a sulfo group, and a carboxy group; an amino group substituted with a phenyl group that is further and optionally substituted with a carboxy group or a sulfo group; a (C1-C4) alkylamino group; or an acylamino group.

Examples of the halogen atom as or in $R^{201}$ to $R^{203}$ in the formula (h1) are the same as the examples of the halogen atom as or in $R^1$, $R^2$, $R^5$, $R^6$, and $R^7$ described above, including specific examples, preferable examples, and more preferable examples thereof.

Examples of the N-alkylaminosulfonyl group as or in $R^{201}$ to $R^{203}$ in the formula (h1) are the same as the examples of the N—(C1-C4) alkylaminosulfonyl group as or in $R^1$, $R^2$, $R^5$, $R^6$, and $R^7$ described above, including specific examples, preferable examples, and more preferable examples thereof.

Examples of the acyl group as or in $R^{201}$ to $R^{203}$ in the formula (h1) are the same as the examples of the acyl group as or in $R^1$, $R^2$, $R^5$, $R^6$, and $R^7$ described above, including specific examples, preferable examples, and more preferable examples thereof.

Examples of the (C1-C4) alkyl group that is optionally substituted with a hydroxy group or a (C1-C4) alkoxy group as or in $R^{201}$ to $R^{203}$ in the formula (h1) are the same as the examples of the (C1-C4) alkyl group or the (C1-C4) alkyl group substituted with a hydroxy group or a (C1-C4) alkoxy group as or in $R^1$, $R^2$, $R^5$, $R^6$, and $R^7$ described above, including specific examples thereof.

Examples of the (C1-C4) alkoxy group that is optionally substituted with at least one or more groups selected from the group consisting of a hydroxy group, a (C1-C4) alkoxy group, a sulfo group, and a carboxy group as or in $R^{201}$ to $R^{203}$ in the formula (h1) are the same as the examples of the (C1-C4) alkoxy group or the (C1-C4) alkoxy group substituted with at least one group selected from the group consisting of a hydroxy group, a (C1-C4) alkoxy group, a sulfo group, and a carboxy group as or in $R^1$, $R^2$, $R^5$, $R^6$, x and $R^7$ described above, including specific examples, preferable examples, and more preferable examples thereof.

Examples of the amino group substituted with a phenyl group that is further and optionally substituted with a carboxy group or a sulfo group as or in $R^{201}$ to $R^{203}$ in the formula (h1) include ones substituted with a sulfo group, such as a 2-sulfophenylamino group, a 3-sulfophenylamino group, a 4-sulfophenylamino group, a 2,4-disulfophenylamino group, and a 3,5-disulfophenylamino group; and ones substituted with a carboxy group, such as a 2-carboxyphenylamino group, a 3-carboxyphenylamino group, a 4-carboxyphenylamino group, a 2,5-dicarboxyphenylamino group, and a 3,5-dicarboxyphenylamino group, any of the groups thus exemplified being preferable.

Examples of the (C1-C4) alkylamino group as or in $R^{201}$ to 8203 in the formula (h1) include ones in which an alkyl moiety thereof is unsubstituted and constitutes a linear or branched chain, preferably a linear chain. Specific examples include linear groups such as a methylamino group, an ethylamino group, an n-propylamino group, and an n-butylamino group; and branched groups such as an isopropylamino group, an isobutylamino group, a sec-propylamino group, and a tert-butylamino group. The linear ones are preferable, and a methylamino group is more preferable.

Examples of the acylamino group as or in $R^{201}$ to $R^{203}$ in the formula (h1) are the same as the examples of the acylamino group as or in $R^1$, $R^2$, $R^5$, $R^6$, and $R^7$ described above, including specific examples, preferable examples, and more preferable examples thereof.

In the formula (h1), $R^{204}$ is a hydrogen atom; a (C1-C4) alkyl group that is optionally substituted with a hydroxy group, a (C1-C4) alkoxy group, a sulfo group, or a carboxy group; at least one group selected from the group consisting of a phenyl group that is optionally substituted with an amino group, a (C1-C4) alkyl group, a (C1-C4) alkoxy group, a carboxy group, and a sulfo group.

The (C1-C4) alkyl group that is optionally substituted with a hydroxy group, a (C1-C4) alkoxy group, a sulfo group, or a carboxy group as or in $R^{2N}$ in the formula (h1) is, for example, the same group as the (C1-C4) alkyl group as or in $R^1$, $R^2$, $R^5$, $R^6$, and $R^7$, or is the (C1-C4) alkyl group in which a carbon atom thereof has at least one group selected from the group consisting of a hydroxy group, a (C1-C4) alkoxy group, a sulfo group, and a carboxy group attached thereto as a substituent. The position to which a hydroxy group, a (C1-C4) alkoxy group, a sulfo group, or a carboxy group as a substituent is attached is not particularly limited, but is preferably a terminus of the alkyl group. The number of substitution is 1 or 2 and is preferably 1. Examples of the (C1-C4) alkoxy group as a substituent are the same as the examples of the (C1-C4) alkoxy group as or in $R^1$, $R^2$, $R^5$, $R^6$, and $R^7$ described above, including specific examples, preferable examples, and more preferable examples thereof. Specific examples of the (C1-C4) alkyl group substituted with at least one group selected from the group consisting of a hydroxy group, a (C1-C4) alkoxy group, a sulfo group, and a carboxy group include ones substituted with a hydroxy group, such as a hydroxymethyl group, a hydroxyethyl group, a hydroxy-n-propyl group, and a hydroxy-n-butyl group; ones substituted with a (C1-C4) alkoxy group, such as a methoxymethyl group, a methoxyethyl group, a methoxy-n-propyl group, a methoxy-n-butyl group, an ethoxymethyl group, an ethoxyethyl group, an ethoxy-n-propyl group, an ethoxy-n-butyl group, an (n-propoxy)methyl group, an (n-propoxy)ethyl group, an (n-propoxy)-n-propyl group, an (n-propoxy)-n-butyl group, an (n-butoxy)methyl group, an (n-butoxy)ethyl group, an (n-butoxy)-n-propyl group, an (n-butoxy)-n-butyl group, an isopropoxymethyl group, an isopropoxyethyl group, an isopropoxy-n-propyl group, an isopropoxy-n-butyl group, a (tert-butoxy)methyl group, a (tert-butoxy)ethyl group, a (tert-butoxy)-n-propyl group, and a (tert-butoxy)-n-butyl group; ones substituted with a sulfo group, such as a sulfomethyl group, a sulfoethyl group, a sulfo-n-propyl group, and a sulfo-n-butyl group; and ones substituted with a carboxy group, such as a carboxymethyl group, a carboxyethyl group, a carboxy-n-propyl group, and a carboxy-n-butyl group. A sulfo-n-propyl group, a sulfo-n-butyl group, a carboxy-n-propyl group, and a carboxy-n-butyl group are preferable, and a sulfo-n-propyl group and a sulfo-n-butyl group are more preferable.

Examples of the (C1-C4) alkyl group and the (C1-C4) alkoxy group in the phenyl group that is optionally substituted with at least one or more groups selected from the group consisting of an amino group, a (C1-C4) alkyl group, a (C1-C4) alkoxy group, a carboxy group, and a sulfo group, as or in $R^{204}$ in the formula (h1), are the same as the examples of the (C1-C4) alkyl group and a (C1-C4) alkoxy group as or in $R^1$, $R^2$, $R^5$, $R^6$, and $R^7$ described above, including specific examples, preferable examples, and more preferable examples thereof. Specific examples include a 2-aminophenyl group, a 3-aminophenyl group, a 4-aminophenyl group, a 2-methylphenyl group, a 3-methylphenyl group, a 4-methylphenyl group, a 2-ethylphenyl group, a 3-ethylphenyl group, a 4-ethylphenyl group, a 2-methoxyphenyl group, a 3-methoxyphenyl group, a 4-methoxyphenyl group, a 2-ethoxyphenyl group, a 3-ethoxyphenyl group, a 4-ethoxyphenyl group, a 2-(n-propoxy)phenyl group, a 3-(n-propoxy)methoxyphenyl group, a 4-(n-propoxy) methoxyphenyl group, a 2-(n-butoxy)phenyl group, a 3-(n-butoxy)methoxyphenyl group, a 4-(n-butoxy)methoxyphenyl group, a 2-carboxyphenyl group, a 3-carboxyphenyl group, a 4-carboxyphenyl group, a 2-sulfophenyl group, a 3-sulfophenyl group, and a 4-sulfophenyl group. A carboxyphenyl group and a sulfophenyl group are preferable.

In the formula (h1), $R^{205}$ and $R^{206}$ are independently a hydrogen atom; a sulfo group; an acetylamino group; a (C1-C4) alkyl group that is optionally substituted with a hydroxy group or a (C1-C4) alkoxy group; or a (C1-C4) alkoxy group that is optionally substituted with a hydroxy group, a (C1-C4) alkoxy group, a sulfo group, or a carboxy group.

Examples of the (C1-C4) alkyl group that is optionally substituted with a hydroxy group or a (C1-C4) alkoxy group as or in $R^{205}$ and $R^{206}$ in the formula (h1) are the same as the examples of the (C1-C4) alkyl group or the (C1-C4) alkyl group substituted with a hydroxy group or a (C1-C4) alkoxy group as or in $R^1$, $R^2$, $R^5$, $R^6$, and $R^7$ described above, including specific examples thereof.

Examples of the (C1-C4) alkoxy group that is optionally substituted with a hydroxy group, a (C1-C4) alkoxy group, a sulfo group, or a carboxy group as or in $R^{205}$ and $R^{206}$ in the formula (h1) are the same as the examples of the (C1-C4) alkoxy group or the (C1-C4) alkoxy group that is optionally substituted with or a hydroxy group, a (C1-C4) alkoxy group, a sulfo group, or a carboxy group as or in $R^1$, $R^2$, $R^5$, $R^6$, and $R^7$ described above, including specific examples, preferable examples, and more preferable examples thereof.

In the formula (h1), the integers of 1 to 8 indicate positions of substitution.

In the formula (h1), I is attached to the 2-position or the 3-position, preferably the 3-position.

In the formula (h1), J is attached to the 6-position or the 7-position, preferably the 7-position.

I and J are single bonds.

In the formula (h1), p denotes 0 or 1, preferably 0.

In the formula (h1), when p denotes 1, the $(SO_3H)_p$ group is attached to the 3-position or the 4-position, preferably the 4-position.

In the formula (h1), q denotes 0 or 1, preferably 1.

In the formula (h1), when q denotes 1, the $(SO_3H)_q$ group is attached to the 7-position or the 8-position, preferably the 8-position.

In the formula (h1), r denotes 1 or 2, either being preferable.

Specific examples of the coloring matter represented by the formula (h1) are shown in Tables 40 to 42 below. However, the present invention is not limited thereto.

Among these, a coloring matter shown under Compound No. h14 is particularly preferable.

TABLE 40

| Compound No. | Structural formula |
|---|---|
| h1 | 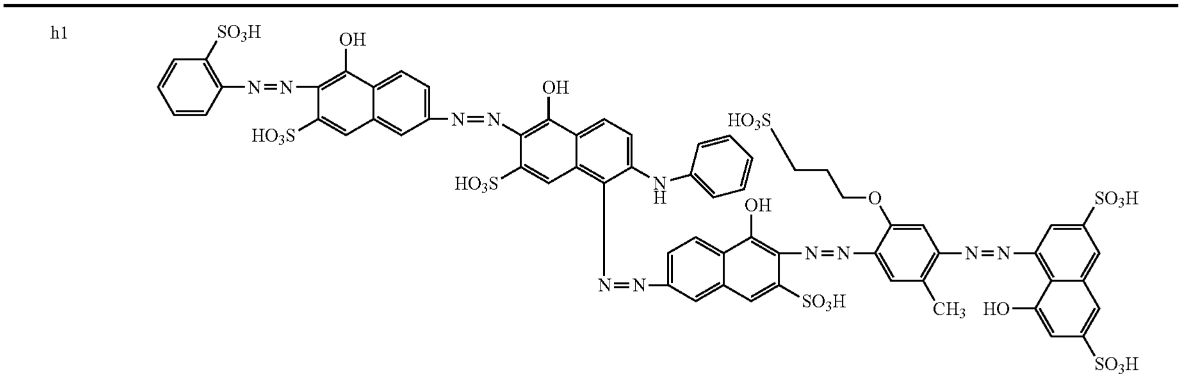 |

TABLE 40-continued
| Compound No. | Structural formula |
| --- | --- |
| h2 | 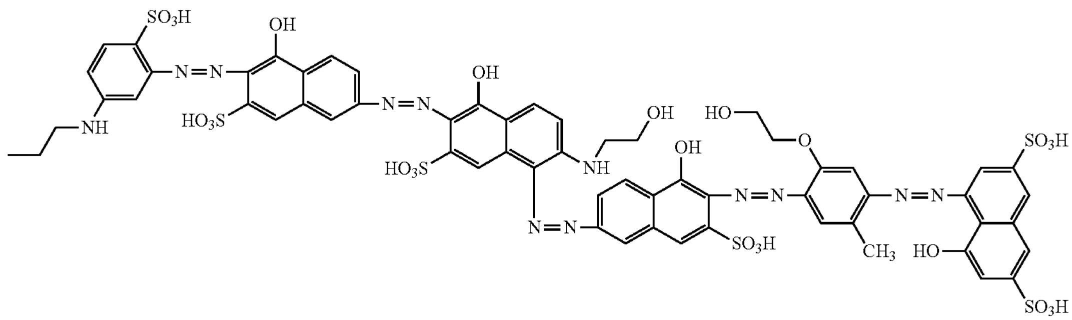 [SMILES: CCCNc1ccc(S(=O)(=O)O)c(N=Nc2c(S(=O)(=O)O)cc3cc(N=Nc4c(S(=O)(=O)O)cc5c(N=Nc6ccc7c(O)c(N=Nc8cc(C)c(N=Nc9cc(S(=O)(=O)O)cc%10cc(S(=O)(=O)O)cc(O)c9%10)cc8OCCO)c(S(=O)(=O)O)cc7c6)c(NCCO)ccc5c4O)ccc3c2O)c1] |
| h3 | 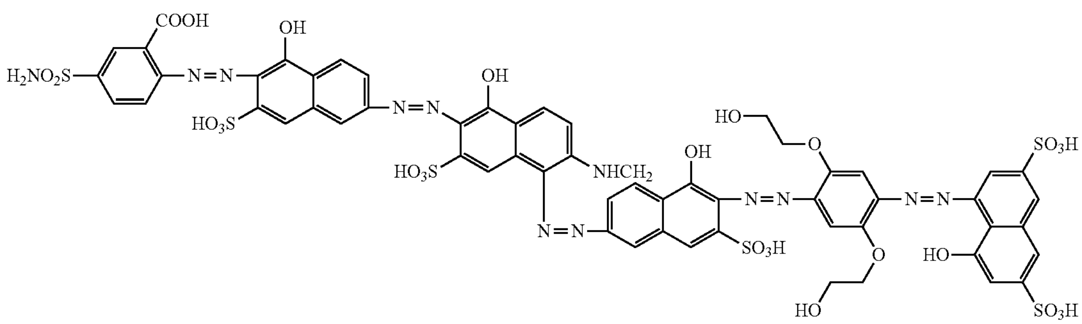 |
| h4 | 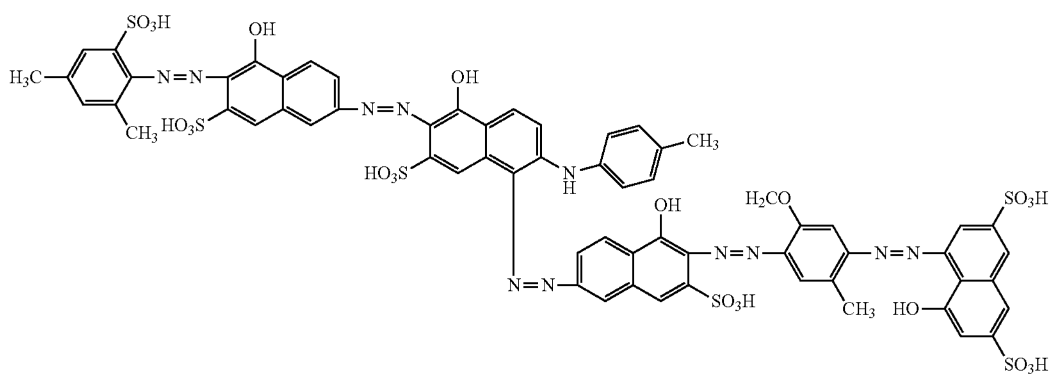 |
| h5 | 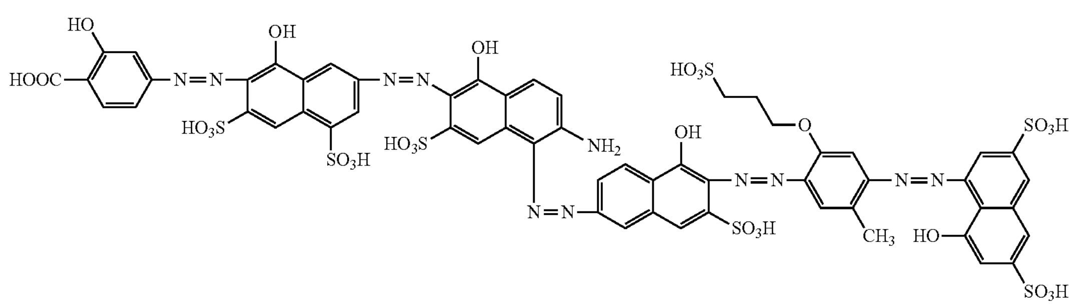 [SMILES: Cc1cc(N=Nc2c(S(=O)(=O)O)cc3cc(N=Nc4c(N)ccc5c(O)c(N=Nc6cc(S(=O)(=O)O)c7cc(S(=O)(=O)O)c(N=Nc8ccc(C(=O)O)c(O)c8)c(O)c7c6)c(S(=O)(=O)O)cc45)ccc3c2O)c(OCCCS(=O)(=O)O)cc1N=Nc1cc(S(=O)(=O)O)cc2cc(S(=O)(=O)O)cc(O)c12] |
| h6 | 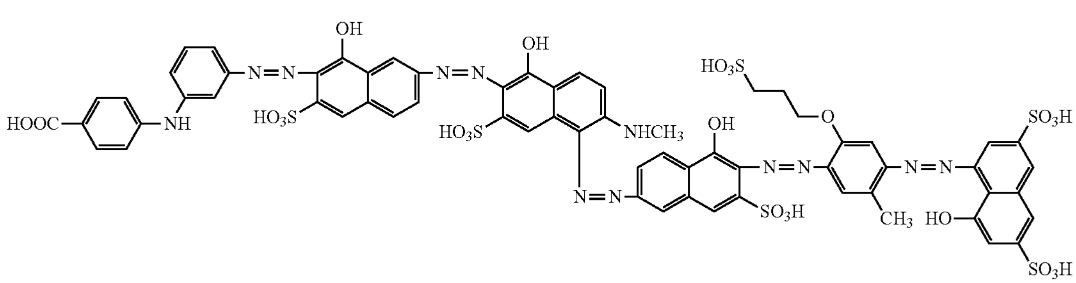 [SMILES: CNc1ccc2c(O)c(N=Nc3ccc4cc(S(=O)(=O)O)c(N=Nc5cccc(Nc6ccc(C(=O)O)cc6)c5)c(O)c4c3)c(S(=O)(=O)O)cc2c1N=Nc1ccc2c(O)c(N=Nc3cc(C)c(N=Nc4cc(S(=O)(=O)O)cc5cc(S(=O)(=O)O)cc(O)c45)cc3OCCCS(=O)(=O)O)c(S(=O)(=O)O)cc2c1] |

TABLE 40-continued
| Compound No. | Structural formula |
| --- | --- |
| h7 | 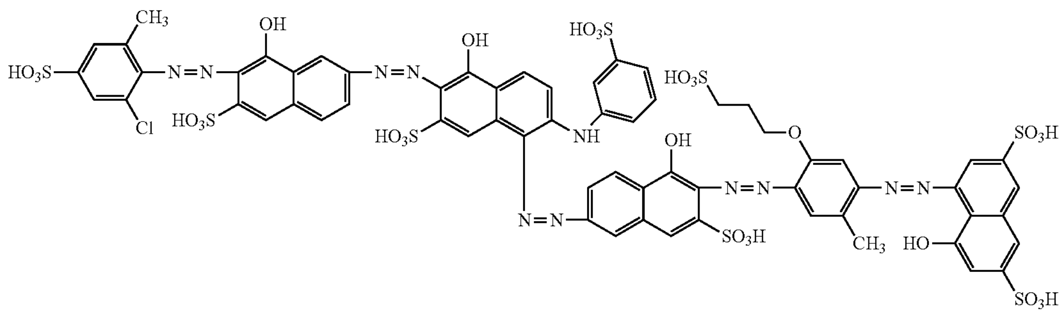 [SMILES: Cc1cc(N=Nc2c(S(=O)(=O)O)cc3cc(N=Nc4c(Nc5cccc(S(=O)(=O)O)c5)ccc5c(O)c(N=Nc6ccc7cc(S(=O)(=O)O)c(N=Nc8c(C)cc(S(=O)(=O)O)cc8Cl)c(O)c7c6)c(S(=O)(=O)O)cc45)ccc3c2O)c(OCCCS(=O)(=O)O)cc1N=Nc1cc(S(=O)(=O)O)cc2cc(S(=O)(=O)O)cc(O)c12] |
TABLE 41
| Compound No. | Structural formula |
| --- | --- |
| h8 | 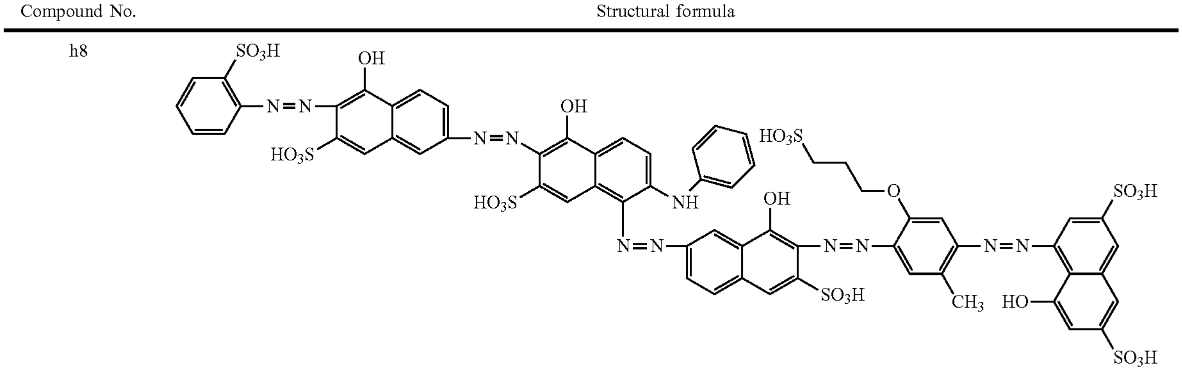 |
| h9 | 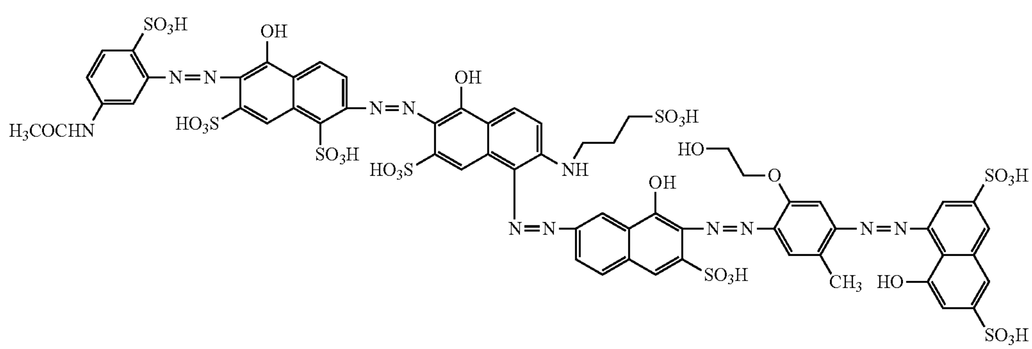 |
| h10 | 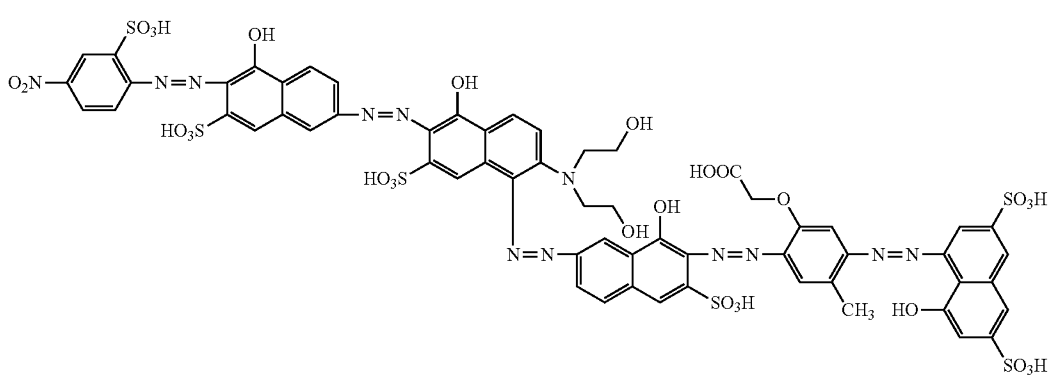 [SMILES: Cc1cc(N=Nc2c(S(=O)(=O)O)cc3ccc(N=Nc4c(N(CCO)CCO)ccc5c(O)c(N=Nc6ccc7c(O)c(N=Nc8ccc([N+](=O)[O-])cc8S(=O)(=O)O)c(S(=O)(=O)O)cc7c6)c(S(=O)(=O)O)cc45)cc3c2O)c(OCC(=O)O)cc1N=Nc1cc(S(=O)(=O)O)cc2cc(S(=O)(=O)O)cc(O)c12] |

TABLE 41-continued
| Compound No. | Structural formula |
| --- | --- |
| h11 | 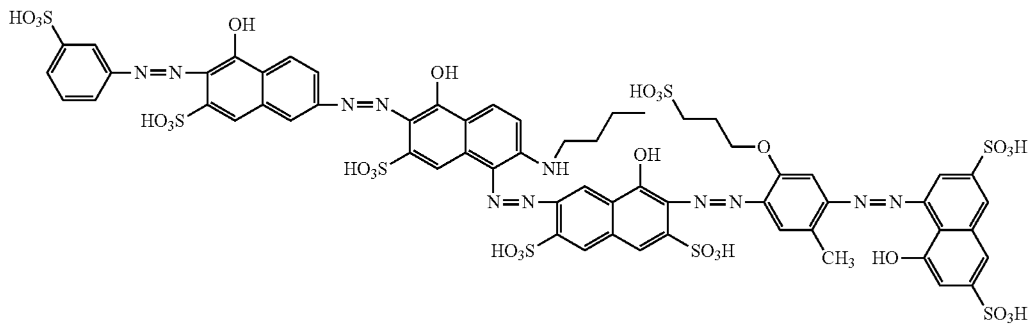 [SMILES: CCCCNc1ccc2c(O)c(N=Nc3ccc4c(O)c(N=Nc5cccc(S(=O)(=O)O)c5)c(S(=O)(=O)O)cc4c3)c(S(=O)(=O)O)cc2c1N=Nc1cc2c(O)c(N=Nc3cc(C)c(N=Nc4cc(S(=O)(=O)O)cc5cc(S(=O)(=O)O)cc(O)c45)cc3OCCCS(=O)(=O)O)c(S(=O)(=O)O)cc2cc1S(=O)(=O)O] |
| h12 | 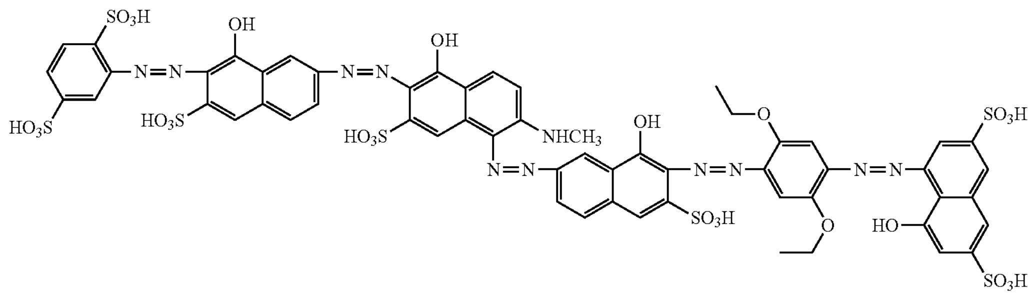 [SMILES: CCOc1cc(N=Nc2cc(S(=O)(=O)O)cc3cc(S(=O)(=O)O)cc(O)c23)c(OCC)cc1N=Nc1c(S(=O)(=O)O)cc2ccc(N=Nc3c(NC)ccc4c(O)c(N=Nc5ccc6cc(S(=O)(=O)O)c(N=Nc7cc(S(=O)(=O)O)ccc7S(=O)(=O)O)c(O)c6c5)c(S(=O)(=O)O)cc34)cc2c1O] |
| h13 | 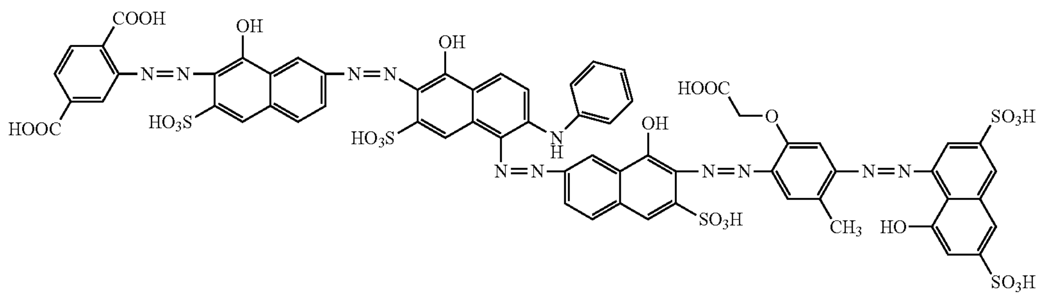 [SMILES: Cc1cc(N=Nc2c(S(=O)(=O)O)cc3ccc(N=Nc4c(Nc5ccccc5)ccc5c(O)c(N=Nc6ccc7cc(S(=O)(=O)O)c(N=Nc8cc(C(=O)O)ccc8C(=O)O)c(O)c7c6)c(S(=O)(=O)O)cc45)cc3c2O)c(OCC(=O)O)cc1N=Nc1cc(S(=O)(=O)O)cc2cc(S(=O)(=O)O)cc(O)c12] |
TABLE 42
| Compound No. | Structural formula |
| --- | --- |
| h14 | 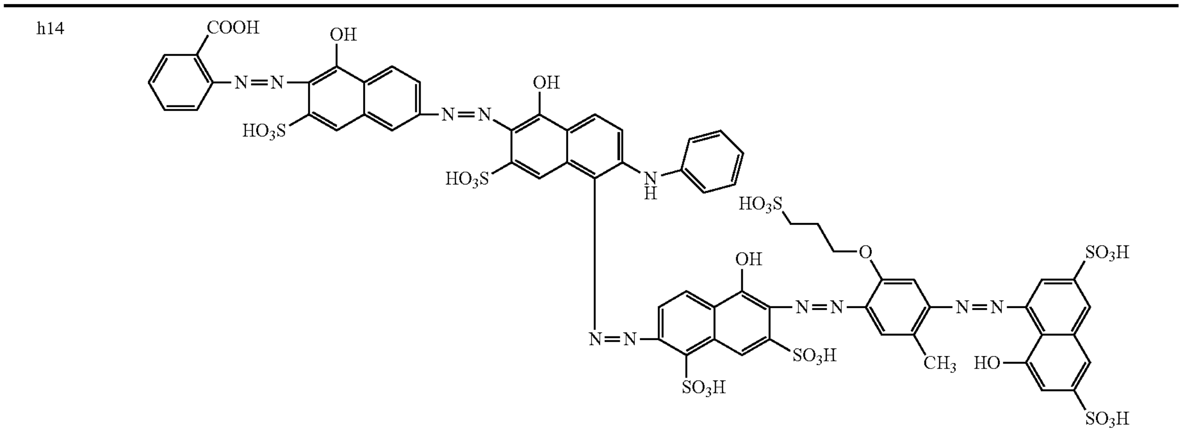 |

TABLE 42-continued
| Compound No. | Structural formula |
| --- | --- |
| h15 | 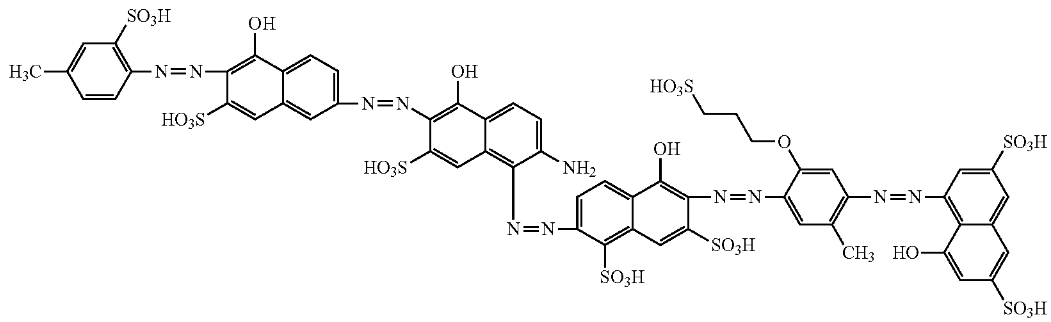 [SMILES: Cc1ccc(N=Nc2c(S(=O)(=O)O)cc3cc(N=Nc4c(S(=O)(=O)O)cc5c(N=Nc6ccc7c(O)c(N=Nc8cc(C)c(N=Nc9cc(S(=O)(=O)O)cc%10cc(S(=O)(=O)O)cc(O)c9%10)cc8OCCCS(=O)(=O)O)c(S(=O)(=O)O)cc7c6S(=O)(=O)O)c(N)ccc5c4O)ccc3c2O)c(S(=O)(=O)O)c1] |
| h16 | 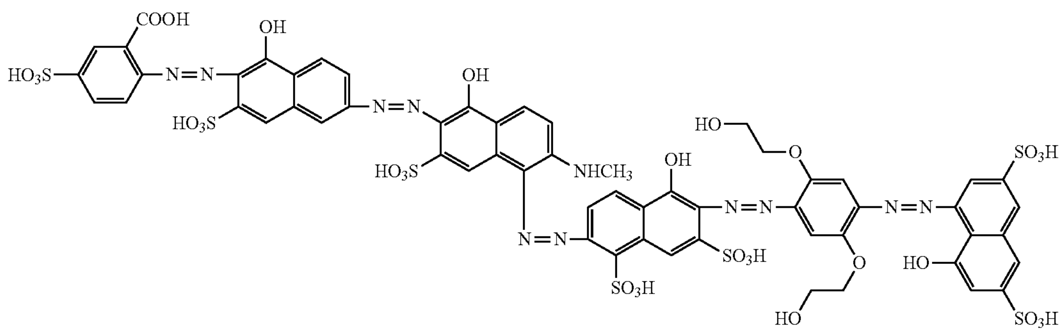 [SMILES: CNc1ccc2c(O)c(N=Nc3ccc4c(O)c(N=Nc5ccc(S(=O)(=O)O)cc5C(=O)O)c(S(=O)(=O)O)cc4c3)c(S(=O)(=O)O)cc2c1N=Nc1ccc2c(O)c(N=Nc3cc(OCCO)c(N=Nc4cc(S(=O)(=O)O)cc5cc(S(=O)(=O)O)cc(O)c45)cc3OCCO)c(S(=O)(=O)O)cc2c1S(=O)(=O)O] |
| h17 | 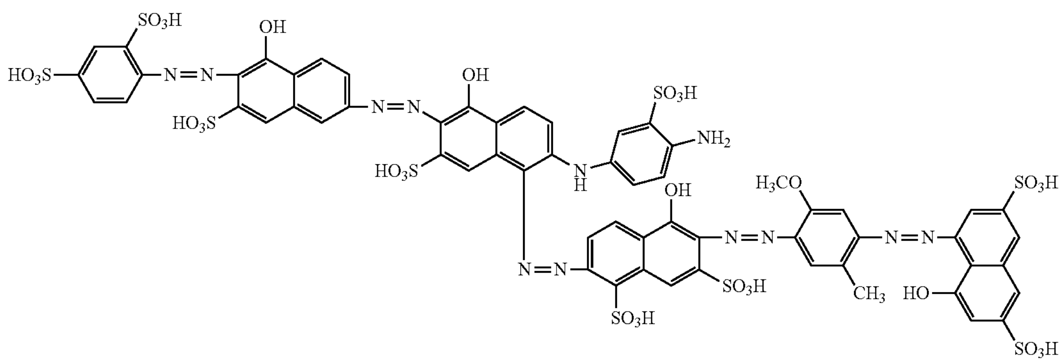 [SMILES: COc1cc(N=Nc2cc(S(=O)(=O)O)cc3cc(S(=O)(=O)O)cc(O)c23)c(C)cc1N=Nc1c(S(=O)(=O)O)cc2c(S(=O)(=O)O)c(N=Nc3c(Nc4ccc(N)c(S(=O)(=O)O)c4)ccc4c(O)c(N=Nc5ccc6c(O)c(N=Nc7ccc(S(=O)(=O)O)cc7S(=O)(=O)O)c(S(=O)(=O)O)cc6c5)c(S(=O)(=O)O)cc34)ccc2c1O] |
| h18 | 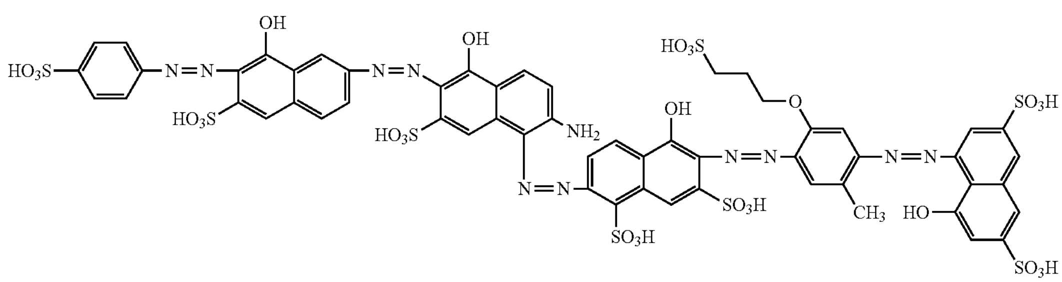 [SMILES: Cc1cc(N=Nc2c(S(=O)(=O)O)cc3c(S(=O)(=O)O)c(N=Nc4c(N)ccc5c(O)c(N=Nc6ccc7cc(S(=O)(=O)O)c(N=Nc8ccc(S(=O)(=O)O)cc8)c(O)c7c6)c(S(=O)(=O)O)cc45)ccc3c2O)c(OCCCS(=O)(=O)O)cc1N=Nc1cc(S(=O)(=O)O)cc2cc(S(=O)(=O)O)cc(O)c12] |
| h19 | 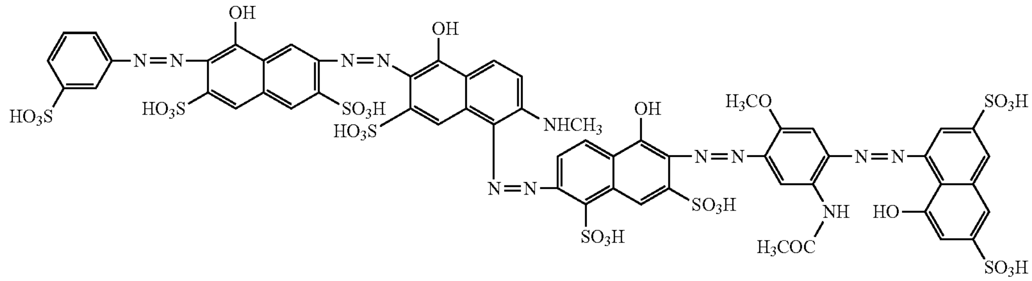 |

TABLE 42-continued

| Compound No. | Structural formula |
|---|---|
| h20 | 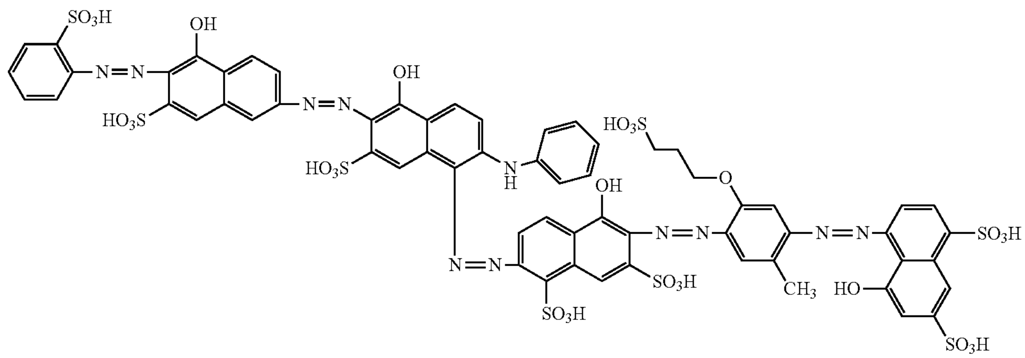 [SMILES: Cc1cc(N=Nc2c(S(=O)(=O)O)cc3c(S(=O)(=O)O)c(N=Nc4c(Nc5ccccc5)ccc5c(O)c(N=Nc6ccc7c(O)c(N=Nc8ccccc8S(=O)(=O)O)c(S(=O)(=O)O)cc7c6)c(S(=O)(=O)O)cc45)ccc3c2O)c(OCCCS(=O)(=O)O)cc1N=Nc1ccc(S(=O)(=O)O)c2cc(S(=O)(=O)O)cc(O)c12] |

[Component (B-i)]

A component (B-i) can improve ozone resistance in particular. The compound can be obtained, for example, by a method described in International Publication No. WO 2007/077931.

The trisazo compound represented by the formula (i1) is known to have a tautomer thereof. The tautomer of the trisazo compound of the formula (i1) is represented by the formula (i3) or (i4), for example, and an ink composition containing such a compound is also encompassed in the scope of the present invention.

(i3)

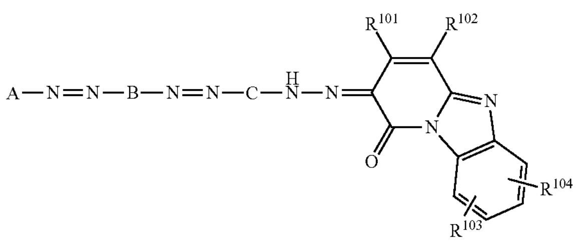

(In the formula (i3), A, B, C, and $R^{101}$ to $R^{104}$ are the same as defined in the formula (i1).)

(i4)

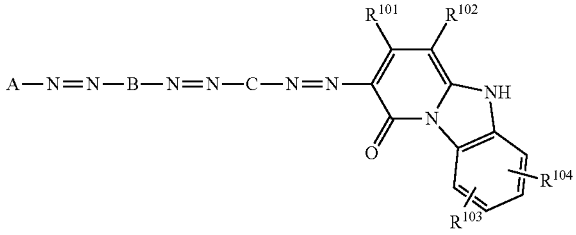

(In the formula (i4), A, B, C, and $R^{101}$ to $R^{104}$ are the same as defined in the formula (i1).)

In the formula (i1), A is a substituted phenyl group, and has a substituent selected from the group consisting of a carboxy group; a sulfo group; a halogen atom; a cyano group; a nitro group; a sulfamoyl group; a (C1-C4) alkyl group; a (C1-C4) alkoxy group; a (C1-C4) alkoxy group substituted with at least one group selected from the group consisting of a hydroxy group, a (C1-C4) alkoxy group, a sulfo group, and a carboxy group; and an alkylsulfonyl group substituted with at least one group selected from the group consisting of a hydroxy group, a sulfo group, and a carboxy group.

Examples of the halogen atom as a substituent of A in the formula (i1) are the same as the examples of the halogen atom as or in $R^1$, $R^2$, $R^5$, $R^6$, and $R^7$ described above, including specific examples, preferable examples, and more preferable examples thereof.

Examples of the (C1-C4) alkyl group as a substituent of A in the formula (i1) are the same as the examples of the (C1-C4) alkyl group as or in $R^1$, $R^2$, $R^5$, $R^6$, and $R^7$ described above, including specific examples, preferable examples, and more preferable examples thereof.

Examples of the (C1-C4) alkoxy group as a substituent of A in the formula (i1) are the same as the examples of the (C1-C4) alkoxy group as or in $R^1$, $R^2$, $R^5$, $R^6$, and $R^7$ described above, including specific examples thereof.

Examples of the (C1-C4) alkoxy group substituted with at least one group selected from the group consisting of a hydroxy group, a (C1-C4) alkoxy group, a sulfo group, and a carboxy group in the formula (i1) are the same as the examples of the (C1-C4) alkoxy group substituted with at least one group selected from the group consisting of a hydroxy group, a (C1-C4) alkoxy group, a sulfo group, and a carboxy group as or in $R^1$, $R^2$, $R^5$, $R^6$, and $R^7$ described above, including specific examples, preferable examples, and more preferable examples thereof.

Examples of the alkylsulfonyl group substituted with at least one or more groups selected from the group consisting of a sulfo group, a carboxy group, and a hydroxy group in the formula (i1) are the same as the examples of the alkylsulfonyl group substituted with at least one or more groups selected from the group consisting of a sulfo group, a carboxy group, and a hydroxy group as or in $R^1$, $R^2$, $R^5$, $R^6$, and $R^7$ described above, including specific examples, preferable examples, and more preferable examples thereof.

The substituent of A in the formula (i1) is preferably a carboxy group; a sulfo group; a halogen atom; a (C1-C4) alkyl group; or a (C1-C4) alkoxy group, and is more preferably a carboxy group or a sulfo group.

Each of B and C in the formula (i1) is a substituted p-phenylene group, and independently has a substituent selected from the group consisting of a carboxy group; a sulfo group; a (C1-C4) alkyl group; a (C1-C4) alkoxy group; and a (C1-C4) alkoxy group substituted with at least one group selected from the group consisting of a hydroxy group, a (C1-C4) alkoxy group, a sulfo group, and a carboxy group.

Examples of the (C1-C4) alkyl group as a substituent of B and C in the formula (i1) are the same as the examples of the (C1-C4) alkyl group as or in $R^1$, $R^2$, $R^5$, $R^6$, and $R^7$ described above, including specific examples, preferable examples, and more preferable examples thereof.

Examples of the (C1-C4) alkoxy group as a substituent of B and C in the formula (i1) are the same as the examples of the (C1-C4) alkoxy group as or in $R^1$, $R^2$, $R^5$, $R^6$, and $R^7$ described above, including specific examples thereof.

Examples of the (C1-C4) alkoxy group substituted with at least one group selected from the group consisting of a hydroxy group, a (C1-C4) alkoxy group, a sulfo group, and a carboxy group as a substituent of B and C in the formula (i1) are the same as the examples of the (C1-C4) alkoxy group substituted with at least one group selected from the group consisting of a hydroxy group, a (C1-C4) alkoxy group, a sulfo group, and a carboxy group as or in $R^1$, $R^2$, $R^5$, $R^6$, and $R^7$ described above, including specific examples, preferable examples, and more preferable examples thereof.

In the formula (i1), $R^{101}$ is a (C1-C4) alkyl group that is optionally substituted with a carboxy group, a phenyl group that is optionally substituted with a sulfo group, or a carboxy group, $R^{102}$ is a cyano group, a carbamoyl group, or a carboxy group, and $R^{103}$ and $R^{104}$ are independently a hydrogen atom, a methyl group, a chlorine atom, or a sulfo group.

In the formula (i1), $R^{101}$ is a (C1-C4) alkyl group that is optionally substituted with a carboxy group; a phenyl group that is optionally substituted with a sulfo group; or a carboxy group;
$R^{102}$ is a cyano group; a carbamoyl group; or a carboxy group; and
$R^{103}$ and $R^{104}$ are independently a hydrogen atom; a (C1-C4) alkyl group; a (C1-C4) alkoxy group; a halogen atom; or a sulfo group.

The (C1-C4) alkyl group that is optionally substituted with a carboxy group as or in $R^{101}$ in the formula (i1) is, for example, the (C1-C4) alkyl group described above, or the alkyl group in which one of the carbon atoms thereof has a carboxy group attached thereto as a substituent. The position to which a carboxy group as a substituent is attached is not particularly limited, but is preferably a terminus of the alkyl group. The number of substitution is 1 or 2 and is preferably 1. Specific examples include a carboxymethyl group, a 2-carboxyethyl group, a 3-carboxy-n-propyl group, and a 4-carboxy-n-butyl group. A carboxymethyl group and a 2-carboxyethyl group are preferable.

The phenyl group that is optionally substituted with a sulfo group as or in $R^{101}$ in the formula (i1) is, for example, a phenyl group, or a phenyl group in which one of the carbon atoms thereof has a sulfo group attached thereto as a substituent. The position to which a sulfo group as a substituent is attached is not particularly limited. The number of substitution is 1 or 2 and is preferably 1. Specific examples include a 2-sulfophenyl group, a 3-sulfophenyl group, a 4-sulfophenyl group, a 2,4-disulfophenyl group, a 3,5-disulfophenyl group, and a 2,5-disulfophenyl group. A 2-sulfophenyl group and a 4-sulfophenyl group are preferable.

Examples of the (C1-C4) alkyl group as or in $R^{103}$ and $R^{104}$ in the formula (i1) are the same as the examples of the (C1-C4) alkyl group as or in $R^1$, $R^2$, $R^5$, $R^6$, and $R^7$ described above, including specific examples, preferable examples, and more preferable examples thereof.

Examples of the (C1-C4) alkoxy group as or in $R^{103}$ and $R^{104}$ in the formula (i1) are the same as the examples of the (C1-C4) alkoxy group as or in $R^1$, $R^2$, $R^5$, $R^6$, and $R^7$ described above, including specific examples thereof.

Examples of the halogen atom as or in $R^{103}$ and $R^{104}$ in the formula (i1) are the same as the examples of the halogen atom as or in $R^1$, $R^2$, $R^5$, $R^6$, and $R^7$ described above, including specific examples, preferable examples, and more preferable examples thereof.

In a preferable combination of $R^{101}$ and $R^{102}$ in the formula (i1), $R^{101}$ is a methyl group and $R^{102}$ is a cyano group, or $R^{101}$ is a methyl group and $R^{102}$ is a carbamoyl group.

Each of $R^{103}$ and $R^{104}$ in the formula (i1) is preferably a hydrogen atom, a methyl group, a methoxy group, and a sulfo group. In a preferable combination of $R^{103}$ and $R^{104}$, one is a hydrogen atom and the other is a sulfo group.

In the formula (i2), $R^{105}$ is a sulfo group or a sulfopropoxy group, and is preferably a sulfopropoxy group.

In the formula (i2), $R^{106}$ is a hydrogen atom, a methyl group, an ethyl group, a methoxy group, or an ethoxy group, preferably a hydrogen atom or a methyl group, and more preferably a methyl group.

Specific examples of the coloring matter represented by the formula (i1) are shown in Tables 43 to 46 below. However, the present invention is not limited thereto.

Among these, a coloring matter shown under Compound No. i17 is particularly preferable.

TABLE 43

| Compound No. | Structural formula |
|---|---|
| i1 | 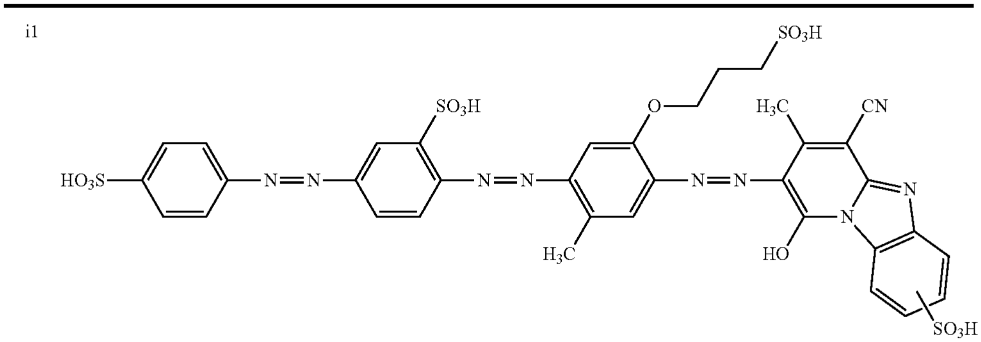 |

TABLE 43-continued
| Compound No. | Structural formula |
|---|---|
| i2 | 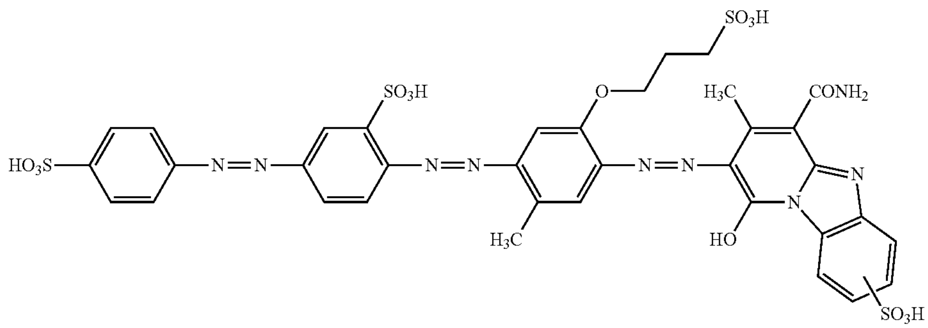 |
| i3 | 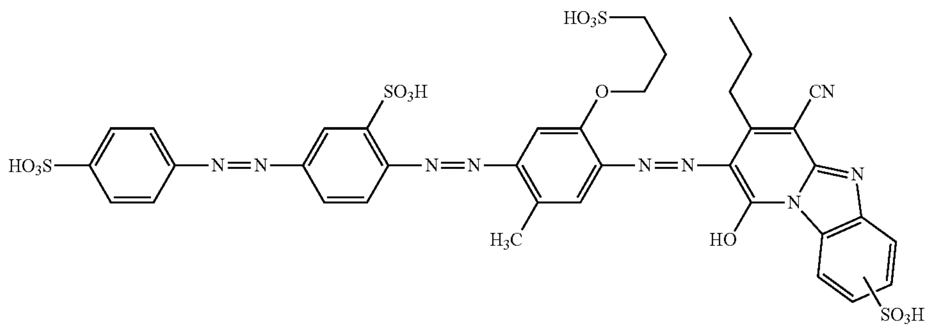 |
| i4 | 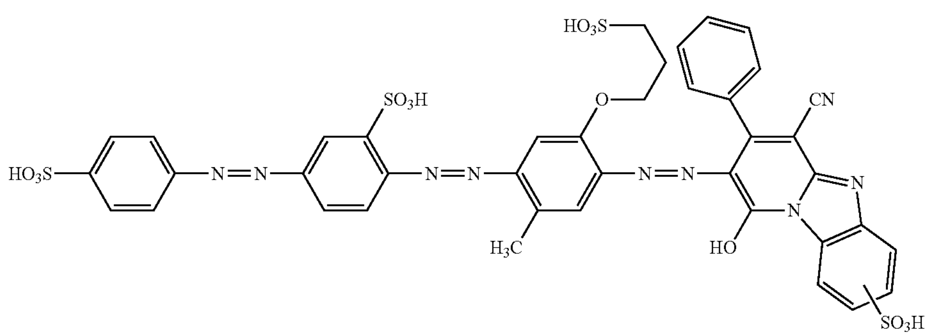 |
| i5 | 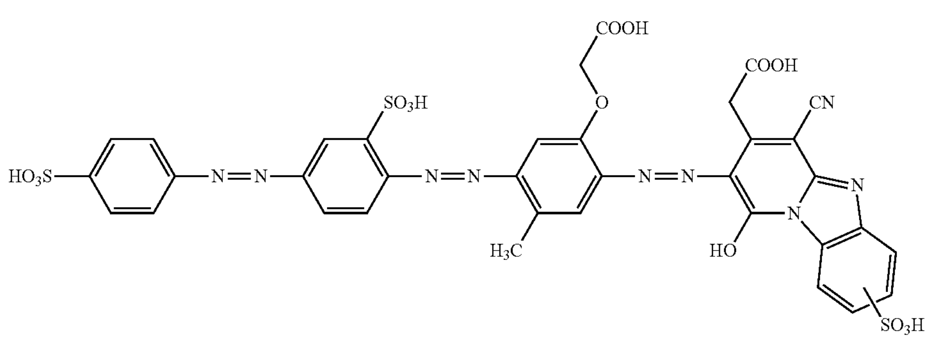 |

TABLE 43-continued
| Compound No. | Structural formula |
|---|---|
| i6 | 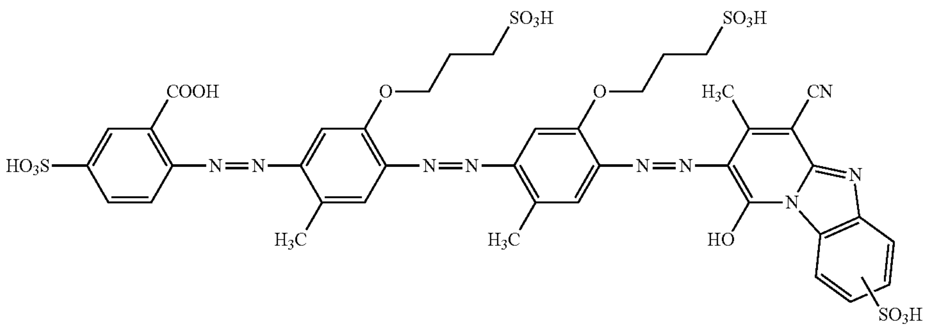 |
TABLE 44
| Compound No. | Structural formula |
|---|---|
| i7 | 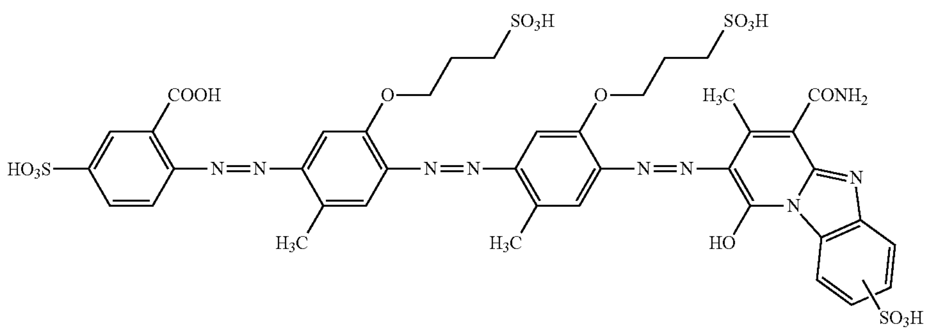 |
| i8 | 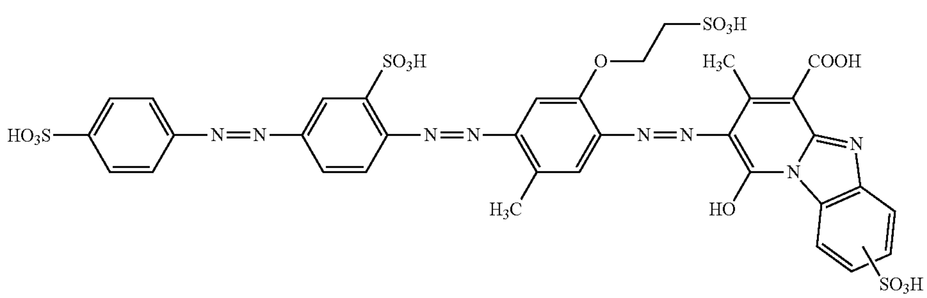 |
| i9 | 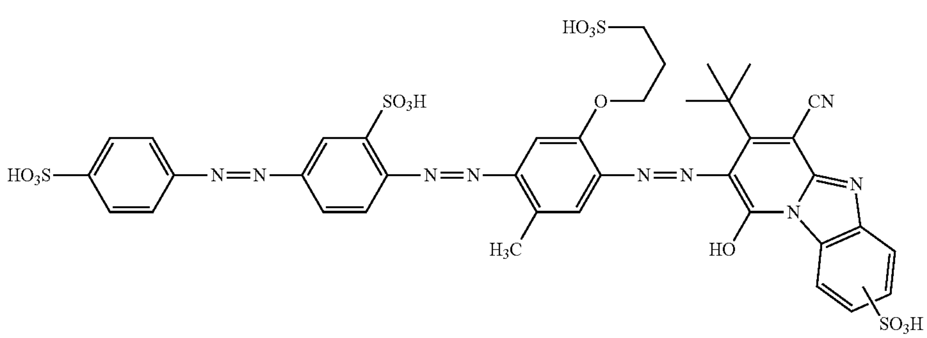 |

TABLE 44-continued
| Compound No. | Structural formula |
| --- | --- |
| i10 | 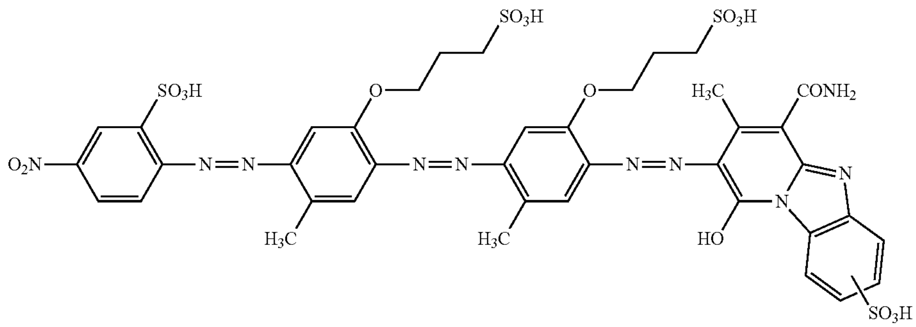 |
| i11 | 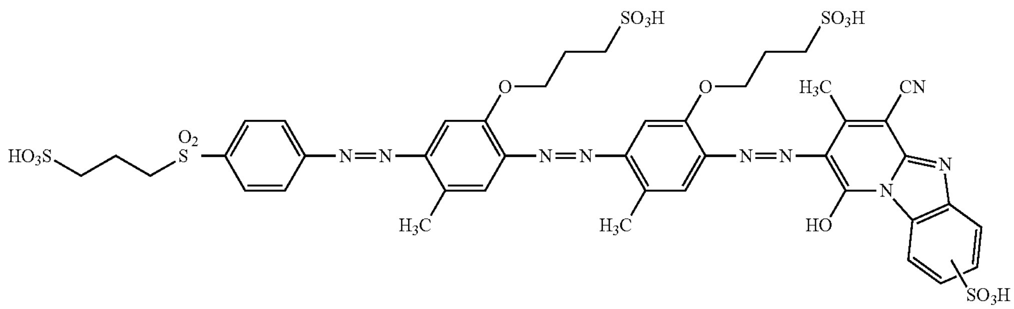 |
| i12 | 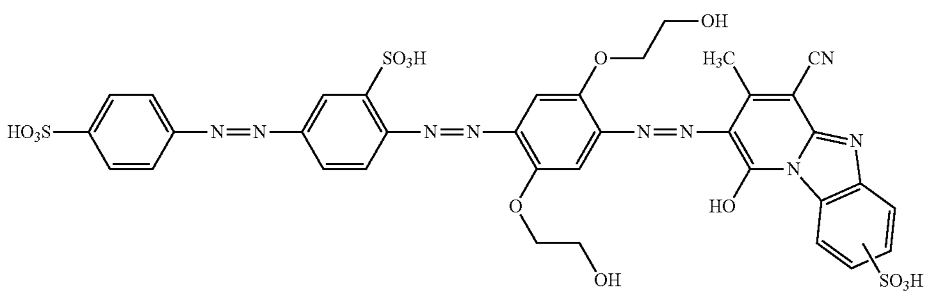 |
TABLE 45
| Compound No. | Structural formula |
| --- | --- |
| i13 | 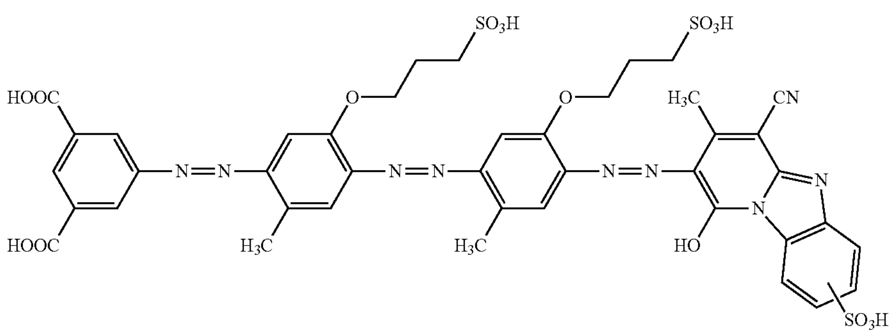 |

TABLE 45-continued
| Compound No. | Structural formula |
|---|---|
| i14 | 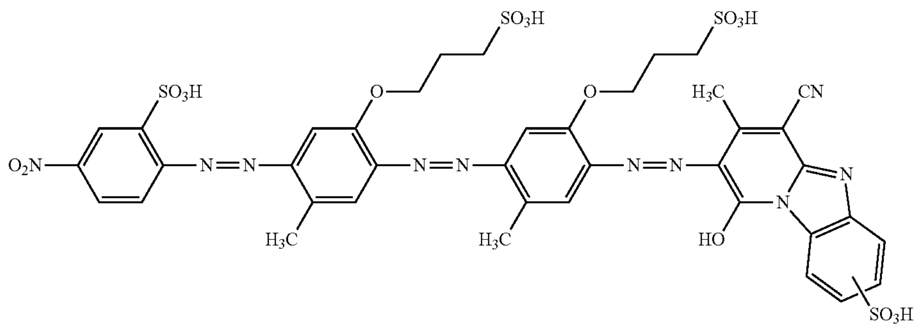 |
| i15 | 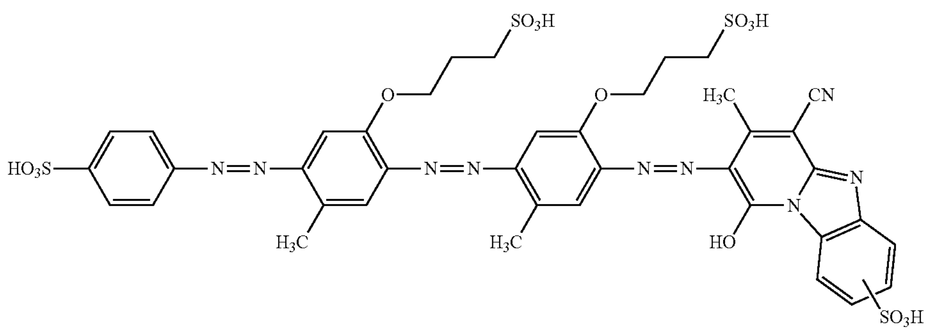 |
| i16 | 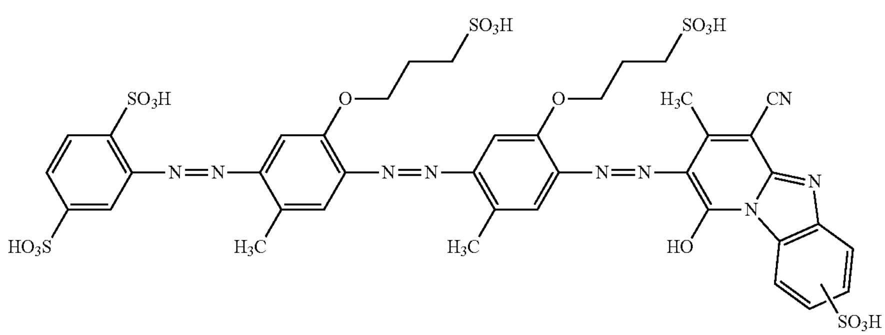 |
| i17 | 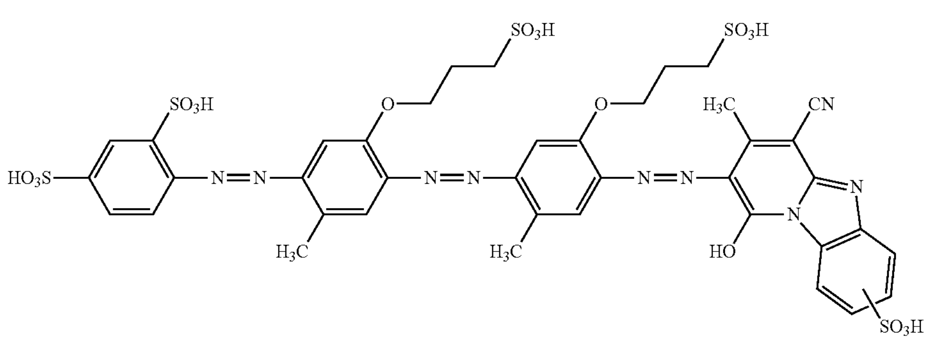 |

TABLE 46

| Compound No. | Structural formula |
|---|---|
| i18 | 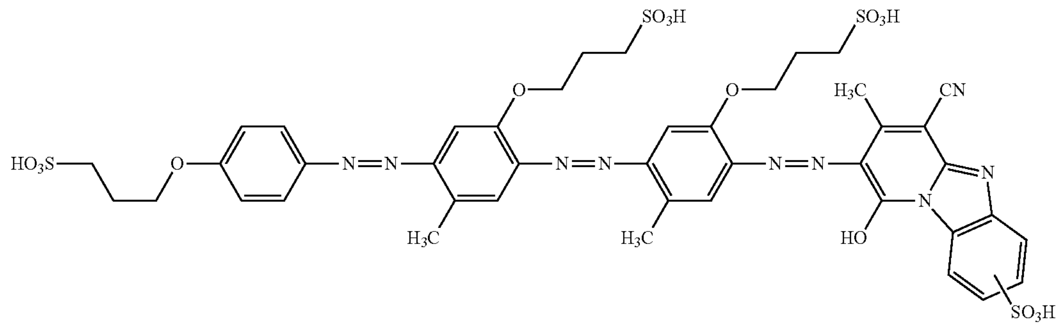 |
| i19 | 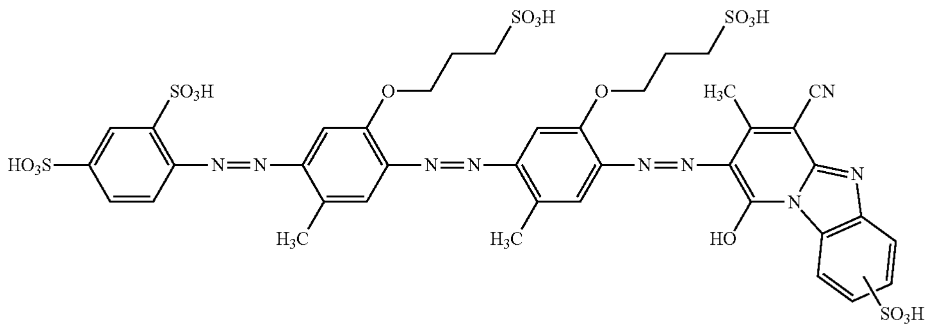 |
| i20 | 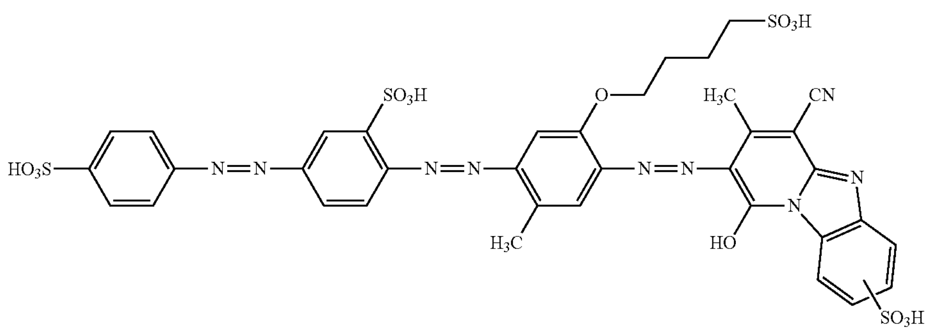 |

[Component (B-j)]

A component (B-j) can improve light resistance and ozone resistance compared to a conventional ink composition. The component can be obtained, for example, by a method described in Japanese Patent Application Publication No. 2009-084346 publication.

The trisazo compound represented by the formula (j1) has a tautomer thereof. Other than the compound of the formula (j1), the tautomer is represented by the formulae (j3) to (j5), for example. An ink composition employing such a tautomer is also encompassed in the scope of the present invention.

(j3)

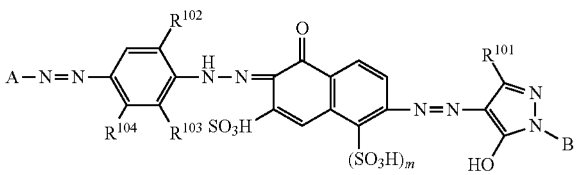

[In the formula (j3), A, B, and $R^{101}$ to $R^{104}$ are the same as defined in the formula (j1).]

(j4)

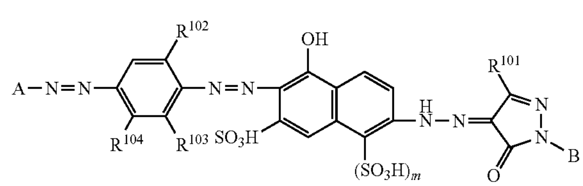

[In the formula (j4), A, B, and $R^{101}$ to $R^{104}$ are the same as defined in the formula (j1).]

(j5)

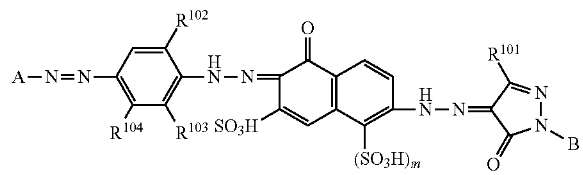

[In the formula (j5), A, B, and $R^{101}$ to $R^{104}$ are the same as defined in the formula (j1).]

In the formula (j1), m denotes 0 or 1, preferably 1.

In the formula (j1), $R^{101}$ is a carboxy group; a (C1-C8) alkoxycarbonyl group; a (C1-C4) alkyl group that is optionally substituted with a (C1-C8) alkoxycarbonyl group or a carboxy group; or a phenyl group that is optionally substituted with a hydroxy group, a sulfo group, or a carboxy group. $R^{102}$ to $R^{104}$ are independently a hydrogen atom; a halogen atom; a hydroxy group; a sulfo group; a carboxy group; a sulfamoyl group; a carbamoyl group; a (C1-C4) alkyl group; a (C1-C4) alkoxy group substituted with at least one or more groups selected from the group consisting of a hydroxy group, a (C1-C4) alkoxy group, a hydroxy (C1-C4) alkoxy group, a sulfo group, and a carboxy group; a mono- or di(C1-C4) alkylamino group; a mono- or di(C1-C4) alkylamino group substituted with at least one group selected from the group consisting of a hydroxy group, a sulfo group, and a carboxy group; a (C1-C4) alkylcarbonylamino group; a (C1-C4) alkylcarbonylamino group substituted with a hydroxy group or a carboxy group; an N'—(C1-C4) alkylureido group; an N'—(C1-C4) alkylureido group substituted with a hydroxy group, a sulfo group, or a carboxy group; a phenylamino group; a phenylamino group that has a benzene ring substituted with at least one group selected from the group consisting of a chlorine atom, a (C1-C4) alkyl group, a nitro group, a sulfo group, and a carboxy group; a benzoylamino group; a benzoylamino group that has a benzene ring substituted with at least one group selected from the group consisting of a chlorine atom, a (C1-C4) alkyl group, a nitro group, a sulfo group, and a carboxy group; a phenylsulfonylamino group; or a phenylsulfonylamino group that has a benzene ring substituted with at least one group selected from the group consisting of a chlorine atom, a (C1-C4) alkyl group, a nitro group, a sulfo group, and a carboxy group.

Examples of the (C1-C8) alkoxycarbonyl group as or in $R^{101}$ in the formula (j1) include ones in which a (C1-C4) alkyl moiety thereof constitutes a linear chain, a branched chain, or a ring, preferably a linear chain or a branched chain, and more preferably a linear chain. The carbon chain usually contains 1 to 8 carbon atoms, preferably 1 to 6 carbon atoms, and more preferably 1 to 4 carbon atoms. Specific examples include linear groups such as a methoxycarbonyl group, an ethoxycarbonyl group, an n-propoxycarbonyl group, an n-butoxycarbonyl group, an n-pentyloxycarbonyl group, an n-hexyloxycarbonyl group, an n-heptyloxycarbonyl group, and an n-octyloxycarbonyl group; branched groups such as an isopropoxycarbonyl group, an isobutyloxycarbonyl group, a sec-butoxycarbonyl group, a tert-butoxycarbonyl group, a 2,2-dimethylpropoxycarbonyl group, an isopentyloxycarbonyl group, a sec-pentyloxycarbonyl group, and a 2-methylbutyloxycarbonyl group; and ones having a cyclic alkyl moiety, such as a cyclopropylmethyloxycarbonyl group, a cyclobutylmethyloxycarbonyl group, a cyclopentyloxycarbonyl group, and a cyclohexyloxycarbonyl group. The linear ones are preferable, and a methoxycarbonyl group, an ethoxycarbonyl group, and an n-propoxycarbonyl group are more preferable.

The (C1-C4) alkyl group that is optionally substituted with a (C1-C8) alkoxycarbonyl group or a carboxy group as or in $R^{101}$ in the formula (j1) is, for example, an unsubstituted (C1-C4) alkyl group; or one in which a carbon atom of the (C1-C4) alkyl group has a (C1-C8) alkoxycarbonyl group or a carboxy group attached thereto as a substituent. Examples of the (C1-C4) alkyl group are the same as the examples of the (C1-C4) alkyl group as or in $R^1$, $R^2$, $R^5$, $R^6$, and $R^7$ described above, including specific examples, preferable examples, and more preferable examples thereof. The position to which a (C1-C8) alkoxycarbonyl group or a carboxy group as a substituent is attached is not particularly limited, but is preferably a terminus of the (C1-C4) alkyl group. Examples of the (C1-C8) alkoxycarbonyl group as a substituent are the same as the examples of the (C1-C8) alkoxycarbonyl group described above, including specific examples, preferable examples, and more preferable examples thereof. Preferable and specific examples include a methoxycarbonylmethyl group, an ethoxycarbonylethyl group, an n-butoxycarbonylmethyl group, an n-octyloxycarboxyethyl group, a carboxymethyl group, a 2-carboxyethyl group, and a 3-carboxypropyl group.

The phenyl group that is optionally substituted with a hydroxy group, a sulfo group, or a carboxy group as or in $R^{101}$ in the formula (j1) is, for example, an unsubstituted phenyl group, a 2-hydroxyphenyl group, a 3-hydroxyphenyl group, a 4-hydroxyphenyl group, a 2,5-hydroxyphenyl group, a 2-sulfophenyl group, a 3-sulfophenyl group, a 4-sulfophenyl group, a 2,4-disulfophenyl group, a 3,5-disulfophenyl group, a 2,5-disulfophenyl group, a 2-carboxyphenyl group, a 3-carboxyphenyl group, a 4-carboxyphenyl group, a 2,5-dicarboxyphenyl group, or a 3,5-dicarboxyphenyl group. A sulfophenyl group is preferable.

In the formula (j1), $R^{101}$ is preferably a carboxy group or an unsubstituted alkyl group, and is more preferably a carboxy group or a methyl group.

Examples of the halogen atom as or in $R^{102}$ to $R^{104}$ in the formula (j1) are the same as the examples of the halogen atom as or in $R^1$, $R^2$, $R^5$, $R^6$, and $R^7$ described above, including specific examples, preferable examples, and more preferable examples thereof.

Examples of the (C1-C4) alkyl group as or in $R^{102}$ to $R^{104}$ in the formula (j1) are the same as the examples of the (C1-C4) alkyl group as or in $R^1$, $R^2$, $R^5$, $R^6$, and $R^7$ described above, including specific examples, preferable examples, and more preferable examples thereof.

Examples of the (C1-C4) alkoxy group substituted with at least one or more groups selected from the group consisting of a hydroxy group, a (C1-C4) alkoxy group, a hydroxy (C1-C4) alkoxy group, a sulfo group, and a carboxy group as or in $R^{102}$ to $R^{104}$ in the formula (j1) include ones in which a carbon atom of the (C1-C4) alkoxy group as or in $R^1$, $R^2$, $R^5$, $R^6$, and $R^7$ has at least one group selected from the group consisting of a hydroxy group, a (C1-C4) alkoxy group, a hydroxy (C1-C4) alkoxy group, a sulfo group, and a carboxy group attached thereto as a substituent. The position to which a hydroxy group, a (C1-C4) alkoxy group, a hydroxy (C1-C4) alkoxy group, a sulfo group, or a carboxy group as a substituent is attached is not particularly limited, but is preferably a terminus of the (C1-C4) alkoxy group. The number of substitution is 1 or 2 and is preferably 1. Examples of the (C1-C4) alkoxy group as a substituent are the same as the examples of the (C1-C4) alkoxy group described above, including specific examples, preferable examples, and more preferable examples thereof. Examples of the hydroxy (C1-C4) alkoxy group as a substituent include ones in which an alkyl alkoxy group thereof constitutes a linear or branched chain, preferably a linear chain. Examples of the hydroxy (C1-C4) alkoxy group as a substituent include ones in which a carbon atom of the (C1-C4) alkoxy group has a hydroxy group attached thereto as a substituent. The position of substitution is not particularly limited, but is preferably a terminus of the (C1-C4) alkoxy group. The number of substitution is 1 or 2 and is preferably 1. The hydroxy (C1-C4) alkoxy group as a substituent is, for example, a hydroxymethoxy group, a hydroxyethoxy group, a hydroxy-n-propoxy group, or a hydroxy-n-butoxy group. Specific examples of the (C1-C4) alkoxy group substituted with at least one group selected from the group consisting of a hydroxy group, a (C1-C4) alkoxy group, a hydroxy (C1-C4) alkoxy group, a sulfo group, and a carboxy group include ones substituted with a hydroxy group, such as a hydroxymethoxy group, a hydroxyethoxy group, a hydroxy-n-propoxy group, and a hydroxy-n-butoxy group; ones substituted with a (C1-C4) alkoxy group, such as a methoxymethoxy group, a methoxyethoxy group, a methoxy-n-propoxy group, a methoxy-n-butoxy group, an ethoxymethoxy group, an ethoxyethoxy group, an ethoxy-n-propoxy group, an ethoxy-n-butoxy group, an (n-propoxy) methoxy group, an (n-propoxy)ethoxy group, an (n-propoxy)-n-propoxy group, an (n-propoxy)-n-butoxy group, an (n-butoxy)methoxy group, an (n-butoxy)ethoxy group, an (n-butoxy)-n-propoxy group, an (n-butoxy)-n-butoxy group, an isopropoxymethoxy group, an isopropoxyethoxy group, an isopropoxy-n-propoxy group, an isopropoxy-n-butoxy group, a (tert-butoxy)methoxy group, a (tert-butoxy)ethoxy group, a (tert-butoxy)-n-propoxy group, and a (tert-butoxy)-n-butoxy group; ones substituted with a hydroxy (C1-C4) alkoxy group, such as a hydroxymethoxymethoxy group, a 2-(hydroxymethoxy) ethoxy group, a 3-(hydroxymethoxy)-n-propoxy group, a 4-(hydroxymethoxy)-n-butoxy group, a hydroxyethoxymethoxy group, a 2-(hydroxyethoxy)ethoxy group, a 3-(hydroxyethoxy)-n-propoxy group, a 4-(hydroxyethoxy)-n-butoxy group, a hydroxy-n-propoxymethoxy group, a 2-(hydroxy-n-propoxy)ethoxy group, a 3-(hydroxy-n-propoxy)-n-propoxy group, a 4-(hydroxy-n-propoxy)-n-butoxy group, a hydroxy-n-butoxymethoxy group, a 2-(hydroxy-n-butoxy)ethoxy group, a 3-(hydroxy-n-butoxy)-n-propoxy group, and a 4-(hydroxy-n-butoxy)-n-butoxy group; ones substituted with a sulfo group, such as a sulfomethoxy group, a 2-sulfoethoxy group, a 3-sulfo-n-propoxy group, and a 4-sulfo-n-butoxy group; and ones substituted with a carboxy group, such as a carboxymethoxy group, a 2-carboxyethoxy group, a 3-carboxy-n-propoxy group, and a 4-carboxy-n-butoxy group. A 3-sulfo-n-propoxy group, a 4-sulfo-n-butoxy group, a 3-carboxy-n-propoxy group, and a 4-carboxy-n-butoxy group are preferable, and a 3-sulfo-n-propoxy group and a 4-sulfo-n-butoxy group are more preferable.

Examples of the mono- or di(C1-C4) alkylamino group as or in $R^{102}$ to $R^{104}$ in the formula (j1) include ones in which a (C1-C4) alkyl moiety thereof constitutes a linear chain or a branched chain, either being preferable. Specific examples include linear ones such as a methylamino group, an ethylamino group, an n-propylamino group, an isopropylamino group, an n-butylamino group, a dimethylamino group, a diethylamino group, a di-n-propylamino group, and a di-n-butylamino group; and branched ones such as a sec-butylamino group, a tert-butylamino group, and a diisopropylamino group.

Examples of the mono- or di(C1-C4) alkylamino group substituted with at least one group selected from the group consisting of a hydroxy group, a sulfo group, and a carboxy group as or in $R^{102}$ to $R^{101}$ in the formula (j1) include ones in which a carbon atom of the mono- or di(C1-C4) alkylamino group has at least one group selected from the group consisting of a hydroxy group, a sulfo group, and a carboxy group attached thereto as a substituent. The position of substitution is not particularly limited, but is preferably a terminus of the alkyl moiety. The number of substitution is 1 or 2 and is preferably 1. Specific examples include a hydroxy-substituted mono- or di(C1-C4) alkylamino group such as a 2-hydroxyethylamino group, a 2-hydroxypropylamino group, and a 2,2'-dihydroxydiethylamino group; a sulfo-substituted mono- or di(C1-C4) alkylamino group such as a 2-sulfoethylamino group, a 3-sulfopropylamino group, a 4-sulfobutylamino group, and a 3,3'-disulfodipropylamino group; and a carboxy-substituted mono- or di(C1-C4) alkylamino group such as a carboxymethylamino group, a 2-carboxyethylamino group, a 3-carboxypropylamino group, and a 2,2'-dicarboxydiethylamino group.

Examples of the (C1-C4) alkylcarbonylamino group as or in $R^{102}$ to $R^{104}$ in the formula (j1) include ones in which a (C1-C4) alkyl moiety thereof constitutes a linear or branched chain, preferably a linear chain. Specific examples include an acetylamino group, a propanoylamino group, and a butanoylamino group. An acetylamino group is preferable.

Examples of the (C1-C4) alkylcarbonylamino group substituted with a hydroxy group or a carboxy group as or in $R^{102}$ to $R^{104}$ in the formula (j1) include ones in which a carbon atom of the (C1-C4) alkylcarbonylamino group has a hydroxy group or a carboxy group attached thereto as a substituent. The position to which a hydroxy group or a carboxy group is attached is not particularly limited, but is preferably a terminus of the (C1-C4) alkyl moiety. The number of substitution is 1 or 2 and is preferably 1. Specific examples of the (C1-C4) alkylcarbonylamino group that is optionally substituted with a hydroxy group or a carboxy group include a hydroxy (C1-C4) alkylcarbonylamino group such as a hydroxyethanoylamino group, a 2-hydroxypropanoylamino group, and a 4-hydroxybutanoylamino group; and a carboxy (C1-C4) alkylcarbonylamino group such as a 3-carboxypropanoylamino group.

Examples of the N'—(C1-C4) alkylureido group as or in $R^{102}$ to $R^{104}$ in the formula (j1) include ones in which a (C1-C4) alkyl group as a substituent is attached to the N' atom of the ureido group. Examples of the alkyl group are the same as the examples of the (C1-C4) alkyl group as or in $R^1$, $R^2$, $R^5$, $R^6$, and $R^7$ described above, including specific examples, preferable examples, and more preferable examples thereof. Specific examples of the N'—(C1-C4) alkylureido group include an N'-methylureido group, an N'-ethylureido group, an N'-(n-propyl)ureido group, and an N'-(n-butyl)ureido group.

Examples of the N'—(C1-C4) alkylureido group substituted with a hydroxy group, a sulfo group, or a carboxy group, as or in $R^{102}$ to $R^{104}$ in the formula (j1), include ones in which a (C1-C4) alkyl moiety in the N'—(C1-C4) alkylureido group has a carbon atom that has a hydroxy group, a sulfo group, or a carboxy group attached thereto as a substituent. The position to which a hydroxy group, a sulfo group, or a carboxy group as a substituent is attached is not particularly limited, but is preferably a terminus of the alkyl moiety. The number of substitution is 1 or 2 and is preferably 1. Specific examples of the N'—(C1-C4) alkylureido group substituted with a hydroxy group, a sulfo group, or a carboxy group include an N'-(hydroxymethyl)ureido group, an N'-(2-hydroxyethyl)ureido group, an N'-(3-hydroxy-n-propyl) ureido group, an N'-(4-hydroxy-n-butyl)ureido group, an N'-(sulfomethyl)ureido group, an N'-(2-sulfoethyl)ureido group, an N'-(3-sulfo-n-propyl)ureido group, an N'-(4-sulfo-n-butyl)ureido group, an N'-(carboxymethyl)ureido group, an N'-(2-carboxyethyl)ureido group, an N'-(3-carboxy-n-propyl)ureido group, and an N'-(4-carboxy-n-butyl)ureido group. The sulfo-substituted ones are preferable, and an N'-(sulfomethyl)ureido group, an N'-(2-sulfoethyl)ureido group, and an N'-(3-sulfo-n-propyl)ureido group are preferable.

Examples of the (C1-C4) alkyl group in the phenylamino group that has a benzene ring substituted with at least one group selected from the group consisting of a chlorine atom, a (C1-C4) alkyl group, a nitro group, a sulfo group, and a carboxy group as or in $R^{102}$ to $R^{104}$ in the formula (j1) are the same as the examples of the (C1-C4) alkyl group as or in $R^1$, $R^2$, $R^5$, $R^6$, and $R^7$ described above, including specific examples, preferable examples, and more preferable examples thereof. Specific examples include a phenylamino group substituted with a chlorine atom, such as a 2-chlorophenylamino group, a 4-chlorophenylamino group, and a 2,4-dichlorophenylamino group; a phenylamino group substituted with a (C1-C4) alkyl group, such as a 2-methylphenylamino group, a 4-methylphenylamino group, and a 4-tert-butylphenylamino group; a nitro-substituted phenylamino group such as a 2-nitrophenylamino group and a 4-nitrophenylamino group; a sulfo-substituted phenylamino group such as a 3-sulfophenylamino group, a 4-sulfophenylamino group, a 2,4-disulfophenylamino group, and a 3,5-disulfophenylamino group; and a carboxy-substituted phenylamino group such as a 2-carboxyphenylamino group, a 4-carboxyphenylamino group, a 2,5-dicarboxyphenylamino group, and a 3,5-dicarboxyphenylamino group.

Examples of the (C1-C4) alkyl group in the benzoylamino group that has a benzene ring substituted with at least one group selected from the group consisting of a chlorine atom, a (C1-C4) alkyl group, a nitro group, a sulfo group, and a carboxy group as or in $R^{102}$ to $R^{104}$ in the formula (j1) are the same as the examples of the (C1-C4) alkyl group as or in $R^1$, $R^2$, $R^5$, $R^6$, and $R^7$ described above, including specific examples, preferable examples, and more preferable examples thereof. Specific examples include a benzoylamino group substituted with a chlorine atom, such as a 2-chlorobenzoylamino group, a 4-chlorobenzoylamino group, and a 2,4-dichlorophenylamino group; a benzoylamino group substituted with a (C1-C4) alkyl group, such as a 2-methylbenzoylamino group, a 3-methylbenzoylamino group, and a 4-methylbenzoylamino group; a nitro-substituted benzoylamino group such as a 2-nitrobenzoylamino group, a 4-nitrobenzoylamino group, and a 3,5-dinitrobenzoylamino group; a sulfo-substituted benzoylamino group such as a 2-sulfobenzoylamino group and a 4-sulfobenzoylamino group; and a carboxy-substituted benzoylamino group such as a 2-carboxybenzoylamino group, a 4-carboxybenzoylamino group, and a 3,5-dicarboxybenzoylamino group.

Examples of the (C1-C4) alkyl group in the phenylsulfonylamino group that has a benzene ring substituted with at least one or more groups selected from the group consisting of a chlorine atom, a (C1-C4) alkyl group, a nitro group, a sulfo group, and a carboxy group as or in $R^{102}$ to $R^{104}$ in the formula (j1) are the same as the examples of the (C1-C4) alkyl group as or in $R^1$, $R^2$, $R^5$, $R^6$, and $R^7$ described above, including specific examples, preferable examples, and more preferable examples thereof. Specific examples include a phenylsulfonylamino group substituted with a chlorine atom, such as a 2-chlorophenylsulfonylamino group and a 4-chlorophenylsulfonylamino group; a phenylsulfonylamino group substituted with a (C1-C4) alkyl group, such as a 2-methylphenylsulfonylamino group, a 4-methylphenylsulfonylamino group, and a 4-tert-butylphenylsulfonylamino group; a nitro-substituted phenylsulfonylamino group such as a 2-nitrophenylsulfonylamino group, a 3-nitrophenylsulfonylamino group, and a 4-nitrophenylsulfonylamino group; a sulfo-substituted phenylsulfonylamino group such as a 3-sulfophenylsulfonylamino group and a 4-sulfophenylsulfonylamino group; and a carboxy-substituted phenylsulfonylamino group such as a 3-carboxyphenylsulfonylamino group and a 4-carboxyphenylsulfonylamino group.

Specific examples of preferable $R^{102}$ to $R^{104}$ in the formula (j1) include a hydrogen atom, a carboxy group, a sulfo group, a methyl group, an ethyl group, a methoxy group, an ethoxy group, a 2-hydroxyethoxy group, a 2-sulfoethoxy group, a 3-sulfopropoxy group, a 4-sulfobutoxy group, a carboxymethoxy group, a 2-carboxyethoxy group, a methylamino group, an ethylamino group, a 2-hydroxyethylamino group, a 2-sulfoethylamino group, a 3-sulfopropylamino group, a 2-carboxyethylamino group, a dimethylamino group, a diethylamino group, a 2,2'-dihydroxydiethylamino group, a 2,2'-dicarboxydiethylamino group, a 3,3'-disulfodipropylamino group, an acetylamino group, a 3-carboxypropanoylamino group, a 4-hydroxybutanoylamino group, an N'-carboxymethylureido group, an N'-2-sulfoethylureido group, a 4-sulfophenylamino group, a 2,4-disulfophenylamino group, a 2,5-dicarboxyphenylamino group, a benzoylamino group, a 3-sulfobenzoylamino group, a 2-carboxybenzoylamino group, a phenylsulfonylamino group, a 4-methylphenylsulfonylamino group, a 4-nitrophenylsulfonylamino group, a 3-sulfophenylsulfonylamino group, and a 4-carboxyphenylsulfonylamino group. A hydrogen atom, a sulfo group, a methyl group, a methoxy group, a 2-hydroxyethoxy group, a 2-sulfoethoxy group, a 3-sulfopropoxy group, a 4-sulfobutoxy group, a dimethylamino group, a 3,3'-disulfodipropylamino group, an acetylamino group, a 3-carboxypropanoylamino group, an N'-2-sulfoethylureido group, a 2,4-disulfophenylamino group, a benzoylamino group, and a 4-methylphenylsulfonylamino group are more preferable, and a hydrogen atom, a sulfo group, a methyl group, a methoxy group, and a 3-sulfopropoxy group are further preferable.

In a preferable combination of $R^{102}$ to $R^{104}$ in the formula (j1), $R^{102}$ is a 3-sulfopropoxy group or a 4-sulfobutoxy group, $R^{103}$ is a hydrogen atom, and $R^{104}$ is a methyl group.

In the formula (j2), $R^{105}$ to $R^{107}$ are independently a hydrogen atom; a halogen atom; a carboxy group; a sulfo group; a nitro group; a hydroxy group; a carbamoyl group; a sulfamoyl group; a (C1-C4) alkyl group; a (C1-C4) alkoxy group; a (C1-C4) alkoxy group substituted with at least one group selected from the group consisting of a hydroxy group, a (C1-C4) alkoxy group, a sulfo group, and a carboxy group; an alkylsulfonyl group substituted with at least one group selected from the group consisting of a sulfo group, a carboxy group, and a hydroxy group; or a phenylsulfonyl group that has a benzene ring optionally substituted with a chlorine atom, a (C1-C4) alkyl group, a nitro group, a sulfo group, or a carboxy group.

Examples of the halogen atom as or in $R^{105}$ to $R^{107}$ in the formula (j2) are the same as the examples of the halogen atom as or in $R^1$, $R^2$, $R^5$, $R^6$, and $R^7$ described above, including specific examples, preferable examples, and more preferable examples thereof.

Examples of the (C1-C4) alkyl group as or in $R^{105}$ to $R^{107}$ in the formula (j2) are the same as the examples of the (C1-C4) alkyl group as or in $R^1$, $R^2$, $R^5$, $R^6$, and $R^7$ described above, including specific examples, preferable examples, and more preferable examples thereof.

Examples of the (C1-C4) alkoxy group as or in $R^{105}$ to $R^{107}$ in the formula (j2) are the same as the examples of the (C1-C4) alkoxy group as or in $R^1$, $R^2$, $R^5$, $R^6$, and $R^7$ described above, including specific examples, preferable examples, and more preferable examples thereof.

Examples of the (C1-C4) alkoxy group substituted with at least one group selected from the group consisting of a hydroxy group, a (C1-C4) alkoxy group, a sulfo group, and a same as the examples of the (C1-C4) alkoxy group substituted with at least one group selected from the group consisting of a hydroxy group, a (C1-C4) alkoxy group, a sulfo group, and a carboxy group as or in $R^1$, $R^2$, $R^5$, $R^6$, and $R^7$ described above, including specific examples, preferable examples, and more preferable examples thereof.

Examples of the alkylsulfonyl group substituted with at least one group selected from the group consisting of a sulfo group, a carboxy group, and a hydroxy group as or in $R^{105}$ to $R^{107}$ in the formula (j2) are the same as the examples of the alkylsulfonyl group substituted with at least one or more groups selected from the group consisting of a sulfo group, a carboxy group, or a hydroxy group as or in $R^1$, $R^2$, $R^5$, $R^6$, and $R^7$ described above, including specific examples, preferable examples, and more preferable examples thereof.

Examples of the (C1-C4) alkyl group in the phenylsulfonyl group that has a benzene ring optionally substituted with a chlorine atom, a (C1-C4) alkyl group, a nitro group, a sulfo group, or a carboxy group as or in $R^{105}$ to $R^{107}$ in the formula (j2) are the same as the examples of the (C1-C4) alkyl group as or in $R^1$, $R^2$, $R^5$, $R^6$, and $R^7$ described above, including specific examples, preferable examples, and more preferable examples thereof. Specific examples include an unsubstituted phenylsulfonyl group; a phenylsulfonyl group substituted with a chlorine atom, such as a 2-chlorophenylsulfonyl group and a 4-chlorophenylsulfonyl group; a phenylsulfonyl group substituted with a (C1-C4) alkyl group, such as a 2-methylphenylsulfonyl group, a 4-methylphenylsulfonyl group, a 2,4-dimethylphenylsulfonyl group, and a 4-tert-butylphenylsulfonyl group; nitro-substituted phenylsulfonyl group such as a 2-nitrophenylsulfonyl group and a 4-nitrophenylsulfonyl group; a sulfo-substituted phenylsulfonyl group such as a 3-sulfophenylsulfonyl group, a 4-sulfophenylsulfonyl group, and a 3,5-disulfophenylsulfonyl group; and a carboxy-substituted phenylsulfonyl group such as a 2-carboxyphenylsulfonyl group, a 4-carboxyphenylsulfonyl group, and a 3,5-dicarboxyphenylsulfonyl group.

A preferable combination of $R^{105}$ to $R^{107}$ in the formula (j2) is a combination of a hydrogen atom, a methoxy group, and a sulfo group, or a combination of one sulfo group and two hydrogen atoms. When one is a sulfo group and the other two are hydrogen atoms, it is more preferable that the sulfo group is attached to the 6-position of the benzothiazole ring.

In the formula (j1), B is a phenyl group that is optionally substituted, and a substituent that is optionally attached to B is a substituent selected from the group consisting of a hydroxy group; a sulfo group; a carboxy group; a (C1-C4) alkyl group; a (C1-C4) alkoxy group; an amino group; a mono- or di(C1-C4) alkylamino group; an acetylamino group; and a benzoylamino group that has a benzene ring substituted with at least one group selected from the group consisting of a chlorine atom, a (C1-C4) alkyl group, a nitro group, a sulfo group, and a carboxy group.

Examples of the (C1-C4) alkyl group as a substituent that is optionally attached to B in the formula (j1) are the same as the examples of the (C1-C4) alkyl group as or in $R^1$, $R^2$, $R^5$, $R^6$, and $R^7$ described above, including specific examples, preferable examples, and more preferable examples thereof.

Examples of the (C1-C4) alkoxy group as a substituent that is optionally attached to B in the formula (j1) are the same as the examples of the (C1-C4) alkoxy group as or in $R^1$, $R^2$, $R^5$, $R^6$, and $R^7$ described above, including specific examples, preferable examples, and more preferable examples thereof.

Examples of the mono- or di (C1-C4) alkylamino group as a substituent that is optionally attached to B in the formula (j1) are the same as the examples of the mono- or di(C1-C4) alkylamino group as or in $R^{102}$ to $R^{104}$ described above, including specific examples, preferable examples, and more preferable examples thereof.

Examples of the benzoylamino group that has a benzene ring substituted with at least one group selected from the group consisting of a chlorine atom, a (C1-C4) alkyl group, a nitro group, a sulfo group, and a carboxy group, as a substituent that is optionally attached to B in the formula (j1), are the same as the examples of the benzoylamino group that has a benzene ring substituted with at least one group selected from the group consisting of a chlorine atom, a (C1-C4) alkyl group, a nitro group, a sulfo group, and a carboxy group as or in $R^{102}$ to $R^{104}$ described above, including specific examples, preferable examples, and more preferable examples thereof.

Preferable and specific examples of a substituent that is optionally attached to B in the formula (j1) include a hydrogen atom, a hydroxy group, a sulfo group, a carboxy group, a methyl group, an ethyl group, a methoxy group, an ethoxy group, a dimethylamino group, an acetylamino group, a benzoylamino group, a 4-sulfobenzoylamino group, and a 4-carboxybenzoylamino group. A hydrogen atom, a hydroxy group, a sulfo group, a carboxy group, a methyl group, and an acetylamino group are more preferable, and a hydrogen atom, a sulfo group, and a carboxy group are further preferable.

Preferable and specific examples of B in the formula (j1) include a phenyl group, a 2-sulfophenyl group, a 4-sulfophenyl group, a 2,4-disulfophenyl group, a 3,5-disulfophenyl group, a 4-carboxyphenyl group, a 3,5-carboxyphenyl group, a 4-methylphenyl group, a 3-methylphenyl group, a 3-hydroxy-4-carboxyphenyl group, a 5-sulfo-3-carboxy-2-hydroxyphenyl group, a 4-methoxyphenyl group, and a 4-acetylaminophenyl group. A phenyl group, a 4-sulfophenyl group, a 2,4-disulfophenyl group, a 4-carboxyphenyl group, and a 3,5-carboxyphenyl group are more preferable, and a phenyl group, a 4-sulfophenyl group, a 4-carboxyphenyl group, and a 3,5-carboxyphenyl group are further preferable.

A compound adopting a combination of the preferable ones as substituents in the formula (j1) and (j2) is more preferable, and a compound adopting a combination of the more preferable ones is further preferable. The same applies to a combination of the further preferable ones.

Specific examples of the coloring matter represented by the formula (j1) are shown in Tables 47 to 50 below. However, the present invention is not limited thereto.

Among these, coloring matters shown under Compound Nos. j2 and j10 are particularly preferable.

TABLE 47
| Compound No. | Structural formula |
|---|---|
| j1 | 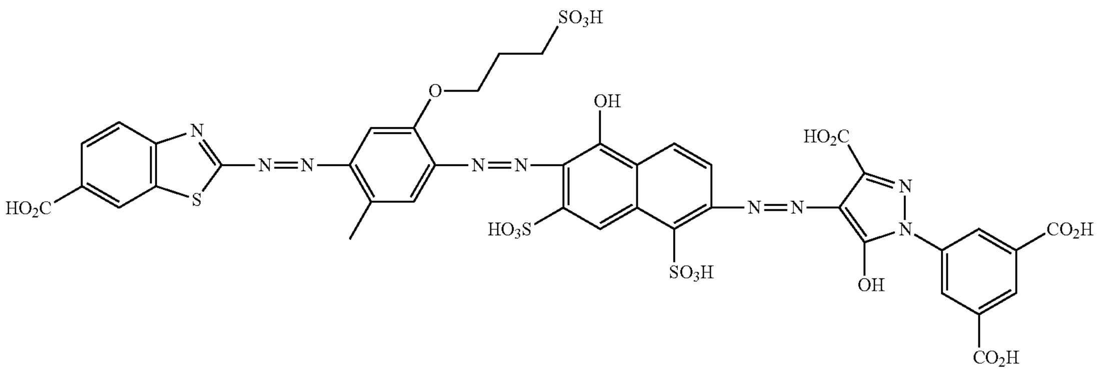 [SMILES: Cc1cc(N=Nc2c(S(=O)(=O)O)cc3c(S(=O)(=O)O)c(N=Nc4c(C(=O)O)nn(-c5cc(C(=O)O)cc(C(=O)O)c5)c4O)ccc3c2O)c(OCCCS(=O)(=O)O)cc1N=Nc1nc2ccc(C(=O)O)cc2s1] |
| j2 | 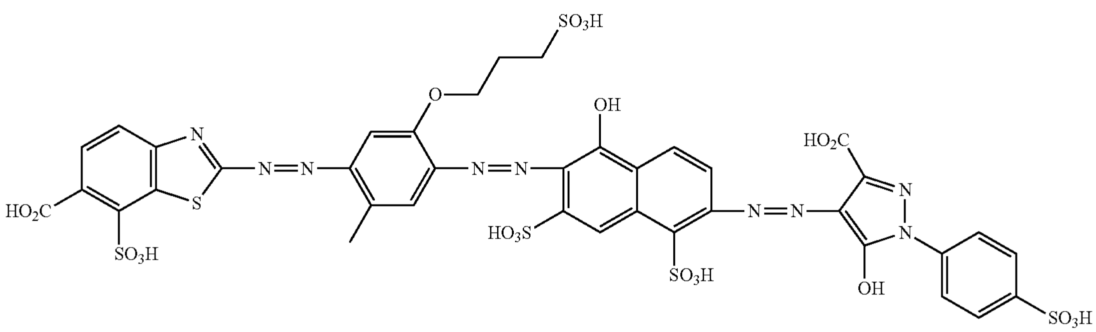 [SMILES: Cc1cc(N=Nc2c(S(=O)(=O)O)cc3c(S(=O)(=O)O)c(N=Nc4c(C(=O)O)nn(-c5ccc(S(=O)(=O)O)cc5)c4O)ccc3c2O)c(OCCCS(=O)(=O)O)cc1N=Nc1nc2ccc(C(=O)O)c(S(=O)(=O)O)c2s1] |
| j3 | 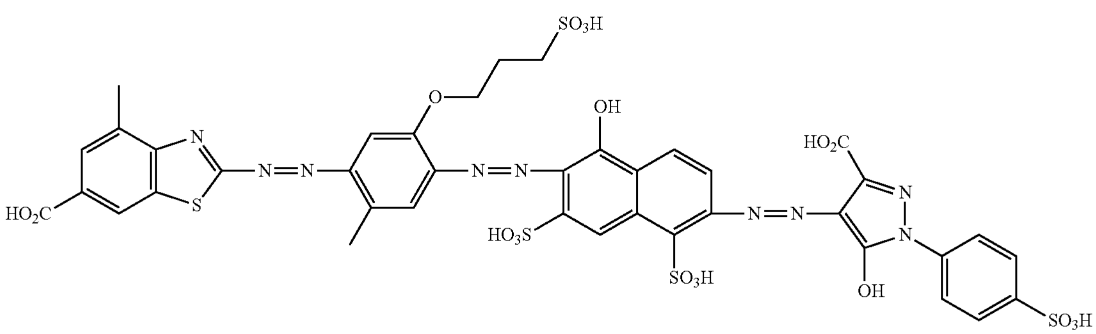 [SMILES: Cc1cc(N=Nc2c(S(=O)(=O)O)cc3c(S(=O)(=O)O)c(N=Nc4c(C(=O)O)nn(-c5ccc(S(=O)(=O)O)cc5)c4O)ccc3c2O)c(OCCCS(=O)(=O)O)cc1N=Nc1nc2c(C)cc(C(=O)O)cc2s1] |
| j4 | 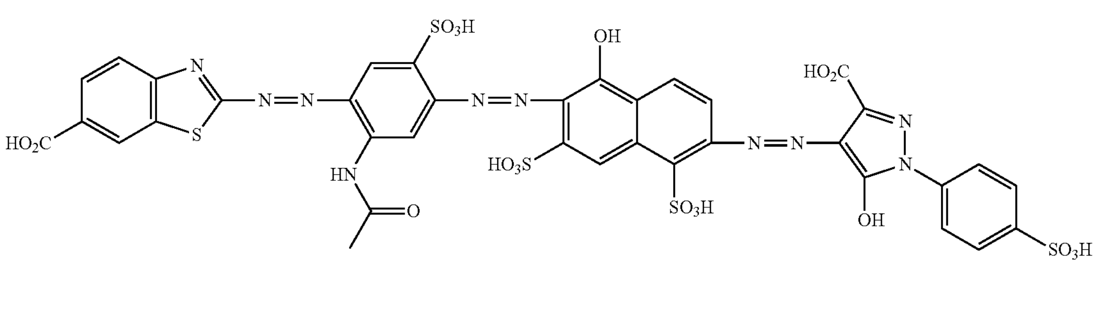 [SMILES: CC(=O)Nc1cc(N=Nc2c(S(=O)(=O)O)cc3c(S(=O)(=O)O)c(N=Nc4c(C(=O)O)nn(-c5ccc(S(=O)(=O)O)cc5)c4O)ccc3c2O)c(S(=O)(=O)O)cc1N=Nc1nc2ccc(C(=O)O)cc2s1] |

TABLE 47-continued
| Compound No. | Structural formula |
|---|---|
| j5 | 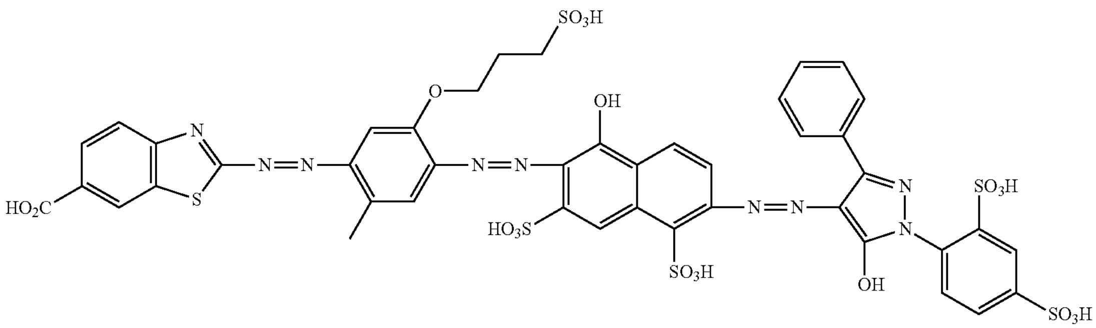 [SMILES: Cc1cc(N=Nc2c(S(=O)(=O)O)cc3c(S(=O)(=O)O)c(N=Nc4c(-c5ccccc5)nn(-c5ccc(S(=O)(=O)O)cc5S(=O)(=O)O)c4O)ccc3c2O)c(OCCCS(=O)(=O)O)cc1N=Nc1nc2ccc(C(=O)O)cc2s1] |
| j6 | 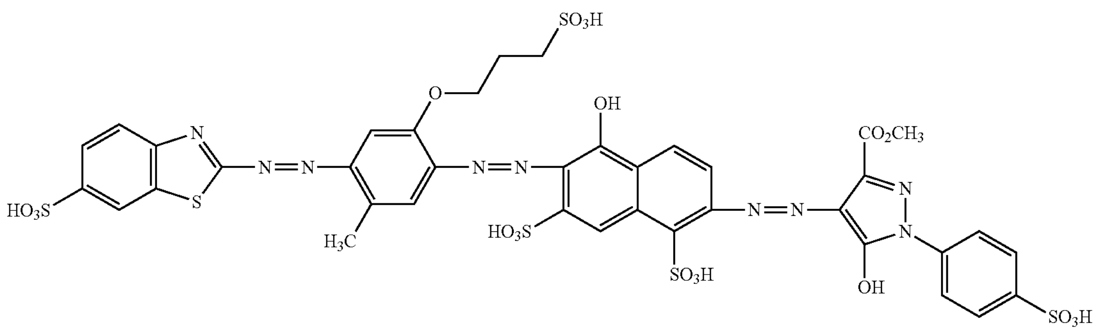 [SMILES: COC(=O)c1nn(-c2ccc(S(=O)(=O)O)cc2)c(O)c1N=Nc1ccc2c(O)c(N=Nc3cc(C)c(N=Nc4nc5ccc(S(=O)(=O)O)cc5s4)cc3OCCCS(=O)(=O)O)c(S(=O)(=O)O)cc2c1S(=O)(=O)O] |
TABLE 48
| Compound No. | Structural formula |
|---|---|
| j7 | 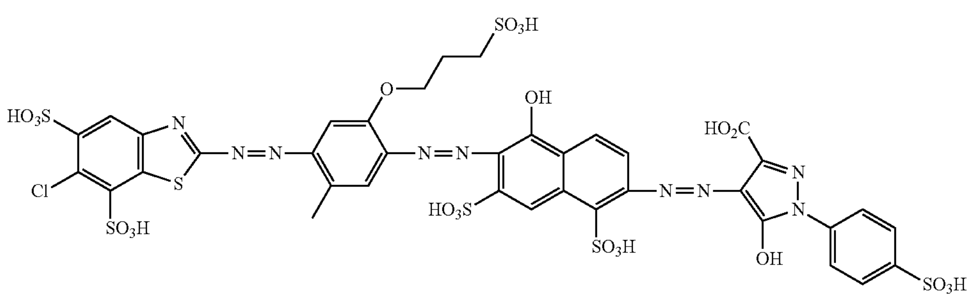 [SMILES: Cc1cc(N=Nc2c(S(=O)(=O)O)cc3c(S(=O)(=O)O)c(N=Nc4c(C(=O)O)nn(-c5ccc(S(=O)(=O)O)cc5)c4O)ccc3c2O)c(OCCCS(=O)(=O)O)cc1N=Nc1nc2cc(S(=O)(=O)O)c(Cl)c(S(=O)(=O)O)c2s1] |
| j8 | 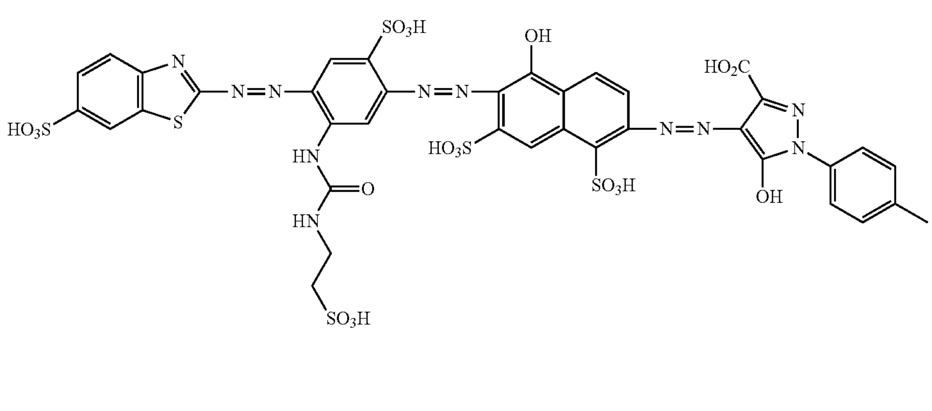 [SMILES: Cc1ccc(-n2nc(C(=O)O)c(N=Nc3ccc4c(O)c(N=Nc5cc(NC(=O)NCCS(=O)(=O)O)c(N=Nc6nc7ccc(S(=O)(=O)O)cc7s6)cc5S(=O)(=O)O)c(S(=O)(=O)O)cc4c3S(=O)(=O)O)c2O)cc1] |

TABLE 48-continued
| Compound No. | Structural formula |
| --- | --- |
| j9 | 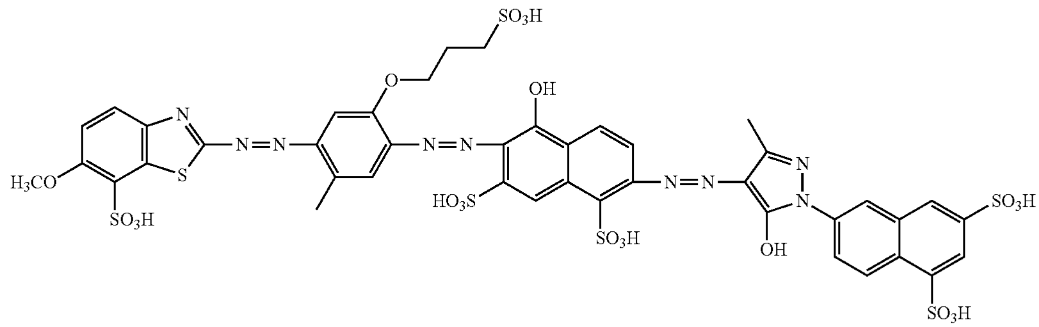 [SMILES: COc1ccc2nc(N=Nc3cc(OCCCS(=O)(=O)O)c(N=Nc4c(S(=O)(=O)O)cc5c(S(=O)(=O)O)c(N=Nc6c(C)nn(-c7ccc8c(S(=O)(=O)O)cc(S(=O)(=O)O)cc8c7)c6O)ccc5c4O)cc3C)sc2c1S(=O)(=O)O] |
| j10 | 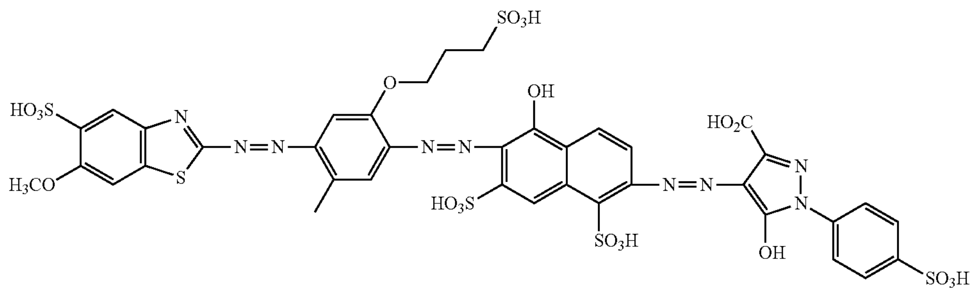 [SMILES: COc1cc2sc(N=Nc3cc(OCCCS(=O)(=O)O)c(N=Nc4c(S(=O)(=O)O)cc5c(S(=O)(=O)O)c(N=Nc6c(C(=O)O)nn(-c7ccc(S(=O)(=O)O)cc7)c6O)ccc5c4O)cc3C)nc2cc1S(=O)(=O)O] |
| j11 | 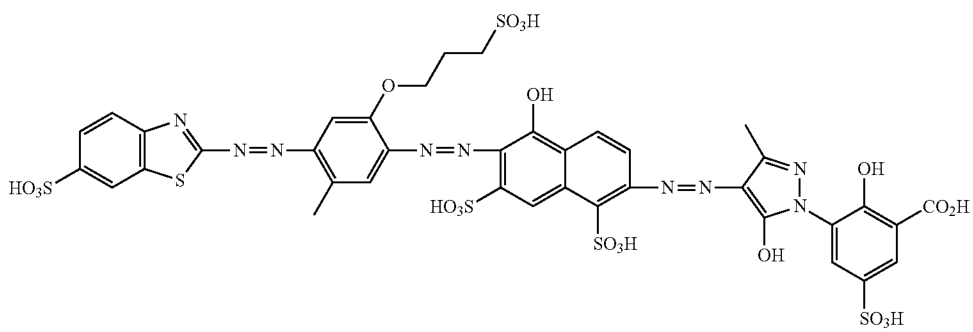 [SMILES: Cc1cc(N=Nc2c(S(=O)(=O)O)cc3c(S(=O)(=O)O)c(N=Nc4c(C)nn(-c5cc(S(=O)(=O)O)cc(C(=O)O)c5O)c4O)ccc3c2O)c(OCCCS(=O)(=O)O)cc1N=Nc1nc2ccc(S(=O)(=O)O)cc2s1] |
| j12 | 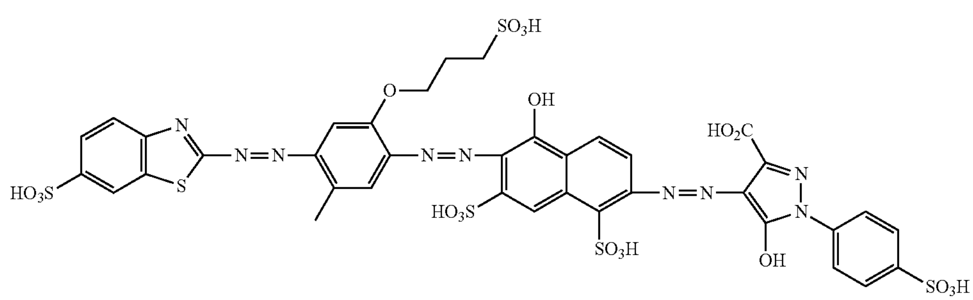 [SMILES: Cc1cc(N=Nc2c(S(=O)(=O)O)cc3c(S(=O)(=O)O)c(N=Nc4c(C(=O)O)nn(-c5ccc(S(=O)(=O)O)cc5)c4O)ccc3c2O)c(OCCCS(=O)(=O)O)cc1N=Nc1nc2ccc(S(=O)(=O)O)cc2s1] |

TABLE 49
| Compound No. | Structural formula |
| --- | --- |
| j13 | 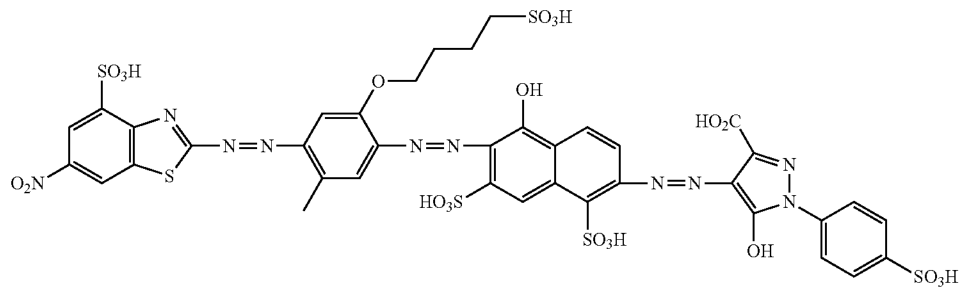 [SMILES: Cc1cc(N=Nc2c(S(=O)(=O)O)cc3c(S(=O)(=O)O)c(N=Nc4c(C(=O)O)nn(-c5ccc(S(=O)(=O)O)cc5)c4O)ccc3c2O)c(OCCCCS(=O)(=O)O)cc1N=Nc1nc2c(S(=O)(=O)O)cc([N+](=O)[O-])cc2s1] |
| j14 | 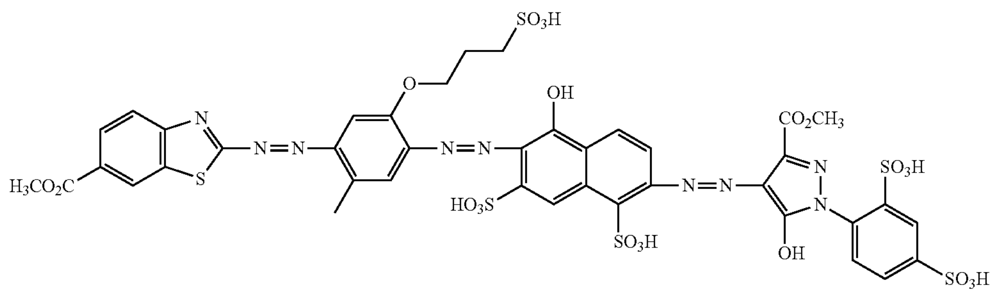 [SMILES: COC(=O)c1ccc2nc(N=Nc3cc(OCCCS(=O)(=O)O)c(N=Nc4c(S(=O)(=O)O)cc5c(S(=O)(=O)O)c(N=Nc6c(C(=O)OC)nn(-c7ccc(S(=O)(=O)O)cc7S(=O)(=O)O)c6O)ccc5c4O)cc3C)sc2c1] |
| j15 | 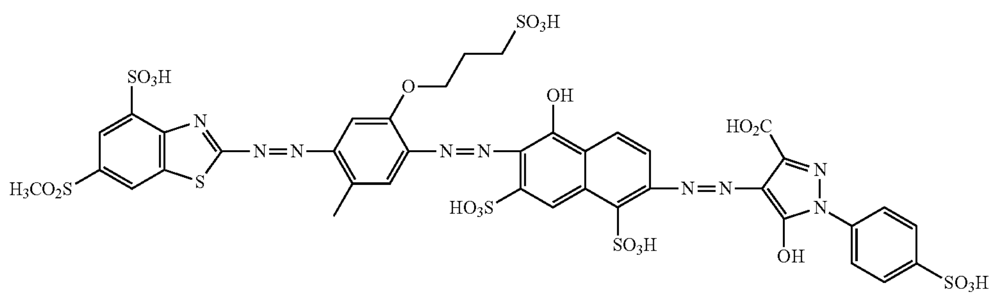 |
| j16 | 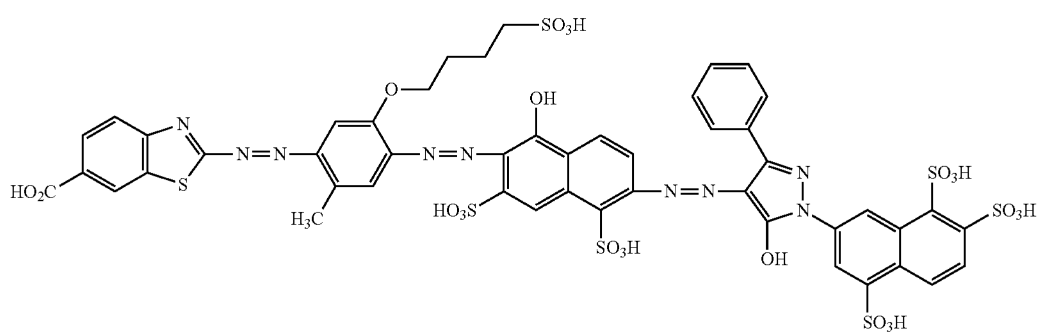 [SMILES: Cc1cc(N=Nc2c(S(=O)(=O)O)cc3c(S(=O)(=O)O)c(N=Nc4c(-c5ccccc5)nn(-c5cc(S(=O)(=O)O)c6ccc(S(=O)(=O)O)c(S(=O)(=O)O)c6c5)c4O)ccc3c2O)c(OCCCCS(=O)(=O)O)cc1N=Nc1nc2ccc(C(=O)O)cc2s1] |
| j17 | 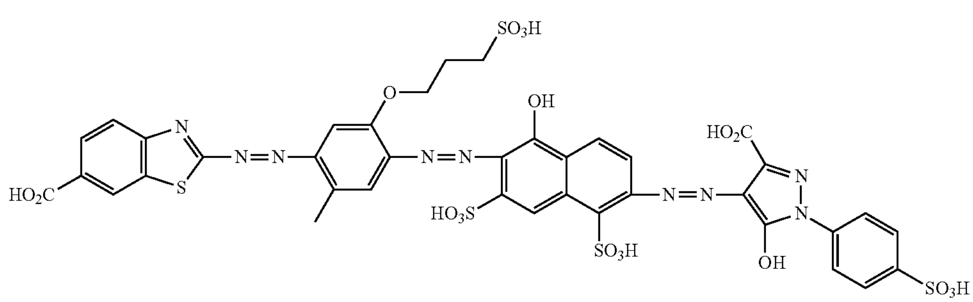 |

TABLE 49-continued
| Compound No. | Structural formula |
|---|---|
| j18 | 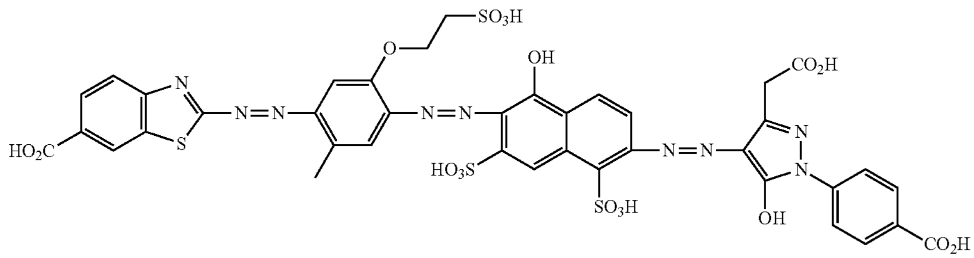 [SMILES: Cc1cc(N=Nc2c(S(=O)(=O)O)cc3c(S(=O)(=O)O)c(N=Nc4c(CC(=O)O)nn(-c5ccc(C(=O)O)cc5)c4O)ccc3c2O)c(OCCS(=O)(=O)O)cc1N=Nc1nc2ccc(C(=O)O)cc2s1] |
TABLE 50
| Compound No. | Structural formula |
|---|---|
| j19 | 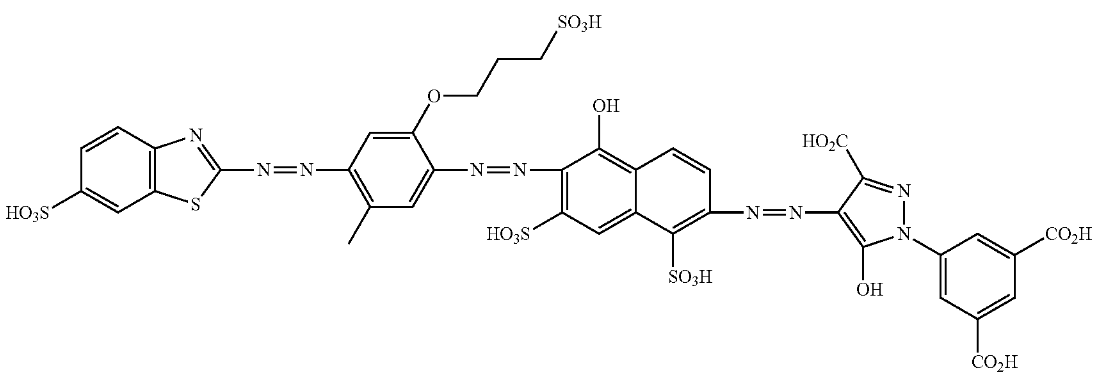 |
| j20 | 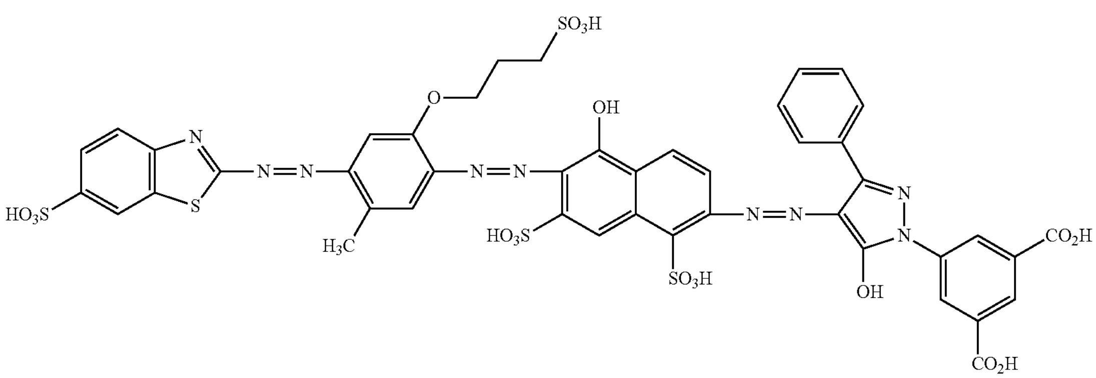 [SMILES: Cc1cc(N=Nc2c(S(=O)(=O)O)cc3c(S(=O)(=O)O)c(N=Nc4c(-c5ccccc5)nn(-c5cc(C(=O)O)cc(C(=O)O)c5)c4O)ccc3c2O)c(OCCCS(=O)(=O)O)cc1N=Nc1nc2ccc(S(=O)(=O)O)cc2s1] |
| j21 | 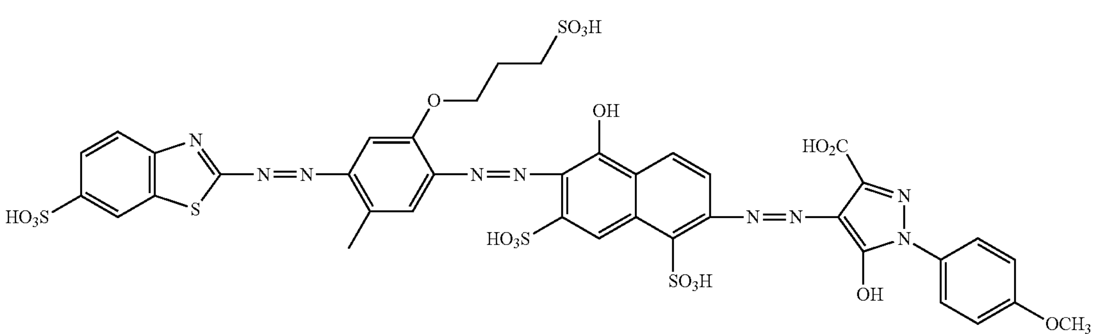 [SMILES: COc1ccc(-n2nc(C(=O)O)c(N=Nc3ccc4c(O)c(N=Nc5cc(C)c(N=Nc6nc7ccc(S(=O)(=O)O)cc7s6)cc5OCCCS(=O)(=O)O)c(S(=O)(=O)O)cc4c3S(=O)(=O)O)c2O)cc1] |

TABLE 50-continued

| Compound No. | Structural formula |
| --- | --- |
| j22 | 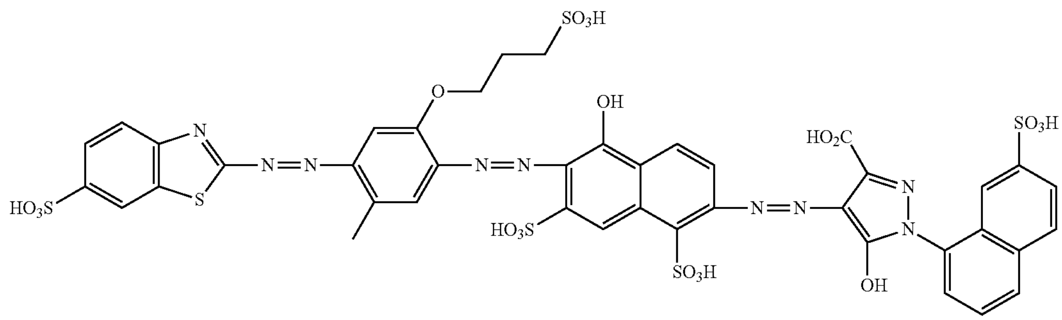 [SMILES: Cc1cc(N=Nc2c(S(=O)(=O)O)cc3c(S(=O)(=O)O)c(N=Nc4c(C(=O)O)nn(-c5cccc6ccc(S(=O)(=O)O)cc56)c4O)ccc3c2O)c(OCCCS(=O)(=O)O)cc1N=Nc1nc2ccc(S(=O)(=O)O)cc2s1] |
| j23 | 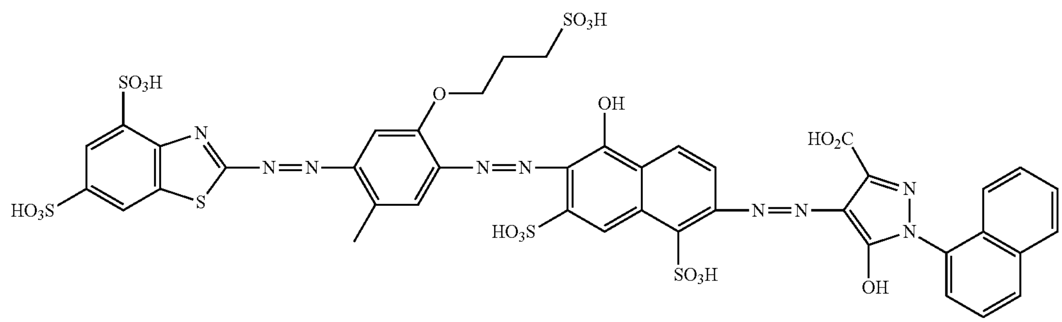 [SMILES: Cc1cc(N=Nc2c(S(=O)(=O)O)cc3c(S(=O)(=O)O)c(N=Nc4c(C(=O)O)nn(-c5cccc6ccccc56)c4O)ccc3c2O)c(OCCCS(=O)(=O)O)cc1N=Nc1nc2c(S(=O)(=O)O)cc(S(=O)(=O)O)cc2s1] |
| j24 | 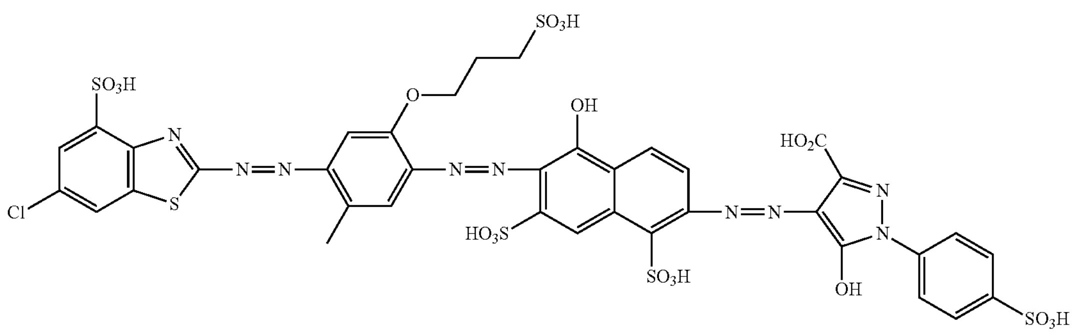 [SMILES: Cc1cc(N=Nc2c(S(=O)(=O)O)cc3c(S(=O)(=O)O)c(N=Nc4c(C(=O)O)nn(-c5ccc(S(=O)(=O)O)cc5)c4O)ccc3c2O)c(OCCCS(=O)(=O)O)cc1N=Nc1nc2c(S(=O)(=O)O)cc(Cl)cc2s1] |

[Component (B-k)]

A compound (B-k) is a compound similar to the component (A) in structure and characteristics, and therefore can improve fastness such as light resistance. In addition, since the structure thereof is not completely identical to the structure of the component (A), the compound (B-k) gives an ink composition excellent in solubility in water and long-term storage stability as well.

$R^1$, $R^2$, $R^5$, $R^6$, and $R^7$ in the formula (k1) are the same as $R^1$, $R^2$, $R^5$, $R^6$, and $R^7$ in the formula (1), respectively, including specific examples, preferable examples, and more preferable examples thereof, and are independent of $R^1$, $R^2$, $R^5$, $R^6$, and $R^7$ in the formula (1), respectively.

In the formula (k1), $R^8$ is a carboxy group, and $R^9$, $R^{10}$, and $R^{11}$ are independently a hydrogen atom; a halogen atom; a cyano group; a carboxy group; a sulfo group; a nitro group; a (C1-C4) alkyl group; a (C1-C4) alkoxy group that is optionally substituted with a hydroxy group, a (C1-C4) alkoxy group, or a sulfo group; or an acylamino group that is optionally substituted with a hydroxy group, a (C1-C4) alkoxy group, or a sulfo group.

Examples of the halogen atom as or in $R^9$, $R^{10}$, and $R^{11}$ in the formula (k2) are the same as the examples of the halogen atom as or in $R^1$, $R^2$, $R^5$, $R^6$, and $R^7$ in the formula (1) described above, including specific examples, preferable examples, and more preferable examples thereof.

Examples of the (C1-C4) alkyl group as or in $R^9$, $R^{10}$, and $R^{11}$ in the formula (k2) are the same as the examples of the (C1-C4) alkyl group as or in $R^1$, $R^2$, $R^5$, $R^6$, and $R^7$ in the formula (1) described above, including specific examples, preferable examples, and more preferable examples thereof.

Examples of the (C1-C4) alkoxy group substituted with at least one group selected from the group consisting of a hydroxy group, a (C1-C4) alkoxy group, a sulfo group, and a carboxy group as or in $R^9$, $R^{10}$, and $R^{11}$ in the formula (k2) are the same as the examples of the (C1-C4) alkoxy group substituted with at least one group selected from the group consisting of a hydroxy group, a (C1-C4) alkoxy group, a sulfo group, and a carboxy group as or in $R^1$, $R^2$, $R^5$, $R^6$, and $R^7$ in the formula (1) described above, including specific examples, preferable examples, and more preferable examples thereof.

Examples of the acylamino group that is optionally substituted with a hydroxy group, a (C1-C4) alkoxy group, or a sulfo group as or in $R^9$, $R^{10}$, and $R^{11}$ in the formula (k2) include ones in which a carbon atom of the acylamino group as or in $R^1$, $R^2$, $R^5$, $R^6$, and $R^7$ in the formula (1) has a hydroxy group, a (C1-C4) alkoxy group, or a sulfo group attached thereto as a substituent. Examples of the acylamino group are the same as the examples of the acylamino group as or in $R^1$, $R^2$, $R^5$, $R^6$, and $R^7$ in the formula (1) described above, including specific examples, preferable examples, and more preferable examples thereof. Examples of the (C1-C4) alkoxy group as a substituent are the same as the examples of the (C1-C4) alkoxy group as a substituent of the (C1-C4) alkyl group substituted with a hydroxy group or a (C1-C4) alkoxy group as or in $R^1$, $R^2$, $R^5$, $R^6$, and $R^7$ in the formula (1). Specific examples include a hydroxymethylcarbonylamino group, a hydroxyethylcarbonylamino group, a hydroxy-n-propylcarbonylamino group, a hydroxy-n-butylcarbonylamino group, a hydroxybenzoylamino group, a methoxymethylcarbonylamino group, a methoxyethylcarbonylamino group, a methoxy-n-propylcarbonylamino group, a methoxy-n-butylcarbonylamino group, a methoxybenzoylamino group, an ethoxymethylcarbonylamino group, an ethoxyethylcarbonylamino group, an ethoxy-n-propylcarbonylamino group, an ethoxy-n-butylcarbonylamino group, an ethoxybenzoylamino group, an n-propoxymethylcarbonylamino group, an n-propoxyethylcarbonylamino group, an n-propoxy-n-propylcarbonylamino group, an n-propoxy-n-butylcarbonylamino group, an n-propoxybenzoylamino group, an n-butoxymethylcarbonylamino group, an n-butoxyethylcarbonylamino group, an n-butoxy-n-propylcarbonylamino group, an n-butoxy-n-butylcarbonylamino group, an n-butoxybenzoylamino group, a sulfomethylcarbonylamino group, a sulfoethylcarbonylamino group, a sulfo-n-propylcarbonylamino group, a sulfo-n-butylcarbonylamino group, and a sulfobenzoylamino group. The ones substituted with a sulfo group are preferable.

In the formula (k2), at least one of $R^9$, $R^{10}$, and $R^{11}$ is a sulfo group or a carboxy group.

In a preferable combination of $R^9$, $R^{10}$, and $R^{11}$ in the formula (k2), $R^9$ is a hydrogen atom, a halogen atom, or a (C1-C4) alkyl group, preferably a hydrogen atom, $R^{10}$ is a carboxy group, a sulfo group, or a nitro group, preferably a carboxy group or a sulfo group, and $R^{11}$ is a hydrogen atom, a halogen atom, a carboxy group, or a sulfo group. The positions to which $R^9$, $R^{10}$, and $R^{11}$ as substituents are attached are not particularly limited. With the pyrazole ring being bonded to the 1-position, when none of $R^9$, $R^{10}$, and $R^{11}$ is a hydrogen atom, the positions to which $R^9$, $R^{10}$, and $R^{11}$ as substituents are attached are preferably a combination of the 2-position, the 4-position, and the 6-position, or a combination of the 2-position, the 4-position, and the 5-position, while when one of $R^9$ and $R^{11}$ is a hydrogen atom and the other is not a hydrogen atom, such positions are preferably the 2-position and the 4-position, the 2-position and the 5-position, or the 3-position and the 5-position, for example.

The phenyl group substituted with $R^9$, $R^{10}$, and $R^{11}$ in the formula (k2) is preferably a p-sulfophenyl group, a 2,5-disulfophenyl group, or a 3,5-dicarboxyphenyl group, for example.

A compound adopting a combination of the preferable ones as $R^1$ to $R^{11}$ in the formula (k1) is more preferable, and a compound adopting a combination of the more preferable ones is further preferable. The same applies to a combination of the preferable ones with the more preferable ones, for instance.

Specific examples of the compound (B-k) are shown in Tables 51 to 54 below. However, the present invention is not limited thereto.

Among these, a coloring matter shown under Compound No. k26 is particularly preferable.

TABLE 51

| Compound No. | Structural formula |
|---|---|
| k1 | 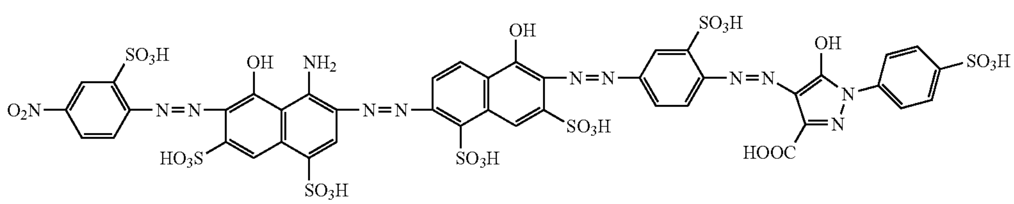 [SMILES: Nc1c(N=Nc2ccc3c(O)c(N=Nc4ccc(N=Nc5c(C(=O)O)nn(-c6ccc(S(=O)(=O)O)cc6)c5O)c(S(=O)(=O)O)c4)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |
| k2 | 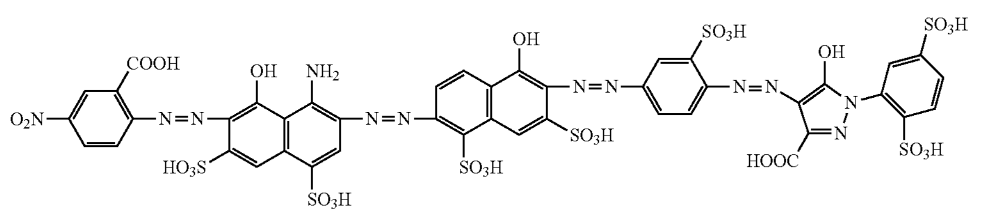 [SMILES: Nc1c(N=Nc2ccc3c(O)c(N=Nc4ccc(N=Nc5c(C(=O)O)nn(-c6cc(S(=O)(=O)O)ccc6S(=O)(=O)O)c5O)c(S(=O)(=O)O)c4)c(S(=O)(=O)O)cc3c2S(=O)(=O)O)cc(S(=O)(=O)O)c2cc(S(=O)(=O)O)c(N=Nc3ccc([N+](=O)[O-])cc3C(=O)O)c(O)c12] |
| k3 | 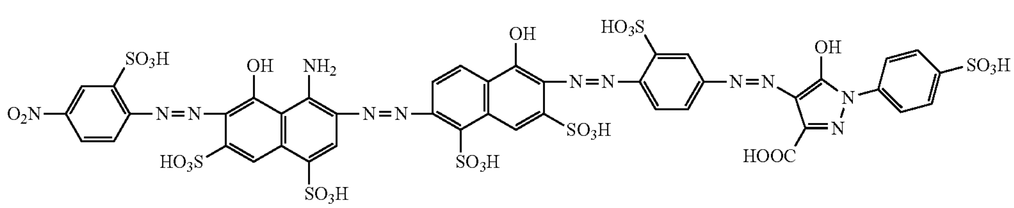 [SMILES: Nc1c(N=Nc2ccc3c(O)c(N=Nc4ccc(N=Nc5c(C(=O)O)nn(-c6ccc(S(=O)(=O)O)cc6)c5O)cc4S(=O)(=O)O)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |

TABLE 51-continued
| Compound No. | Structural formula |
|---|---|
| k4 | 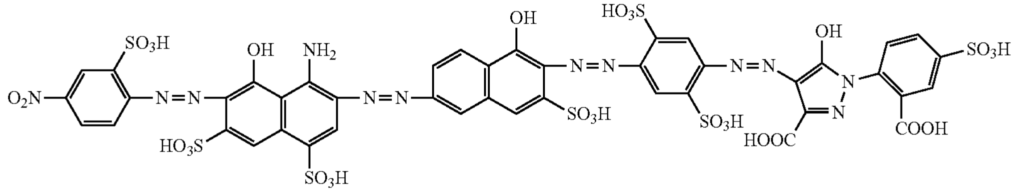 [SMILES: Nc1c(N=Nc2ccc3c(O)c(N=Nc4cc(S(=O)(=O)O)c(N=Nc5c(C(=O)O)nn(-c6ccc(S(=O)(=O)O)cc6C(=O)O)c5O)cc4S(=O)(=O)O)c(S(=O)(=O)O)cc3c2)cc(S(=O)(=O)O)c2cc(S(=O)(=O)O)c(N=Nc3ccc([N+](=O)[O-])cc3S(=O)(=O)O)c(O)c12] |
| k5 | 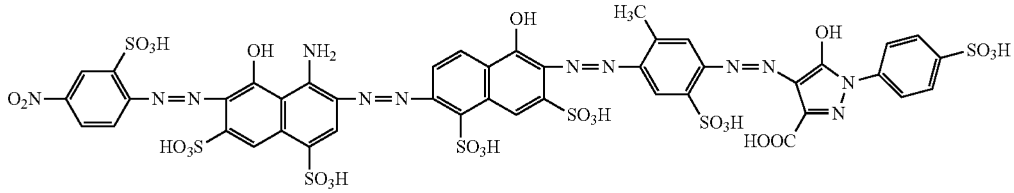 [SMILES: Cc1cc(N=Nc2c(C(=O)O)nn(-c3ccc(S(=O)(=O)O)cc3)c2O)c(S(=O)(=O)O)cc1N=Nc1c(S(=O)(=O)O)cc2c(S(=O)(=O)O)c(N=Nc3cc(S(=O)(=O)O)c4cc(S(=O)(=O)O)c(N=Nc5ccc([N+](=O)[O-])cc5S(=O)(=O)O)c(O)c4c3N)ccc2c1O] |
| k6 | 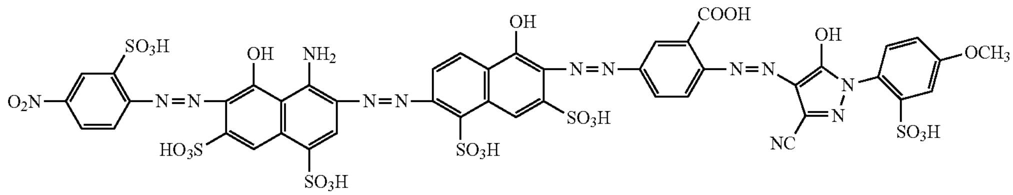 [SMILES: COc1ccc(-n2nc(C#N)c(N=Nc3ccc(N=Nc4c(S(=O)(=O)O)cc5c(S(=O)(=O)O)c(N=Nc6cc(S(=O)(=O)O)c7cc(S(=O)(=O)O)c(N=Nc8ccc([N+](=O)[O-])cc8S(=O)(=O)O)c(O)c7c6N)ccc5c4O)cc3C(=O)O)c2O)c(S(=O)(=O)O)c1] |
| k7 | 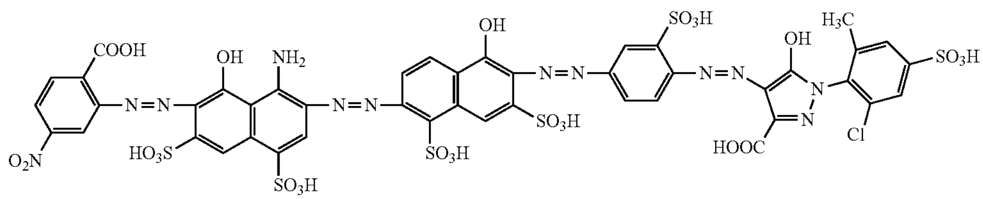 [SMILES: Cc1cc(S(=O)(=O)O)cc(Cl)c1-n1nc(C(=O)O)c(N=Nc2ccc(N=Nc3c(S(=O)(=O)O)cc4c(S(=O)(=O)O)c(N=Nc5cc(S(=O)(=O)O)c6cc(S(=O)(=O)O)c(N=Nc7cc([N+](=O)[O-])ccc7C(=O)O)c(O)c6c5N)ccc4c3O)cc2S(=O)(=O)O)c1O] |
TABLE 52
| Compound No. | Structural formula |
|---|---|
| k8 | 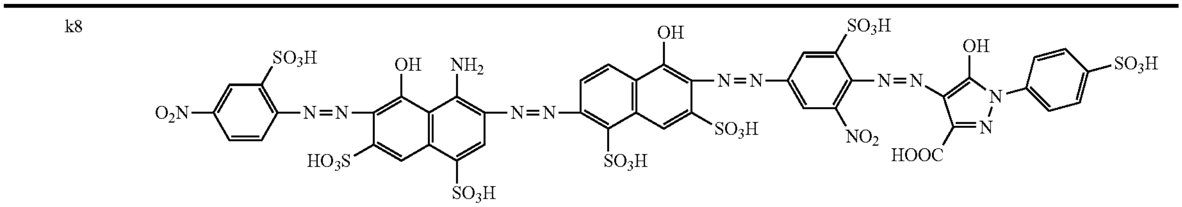 |
| k9 | 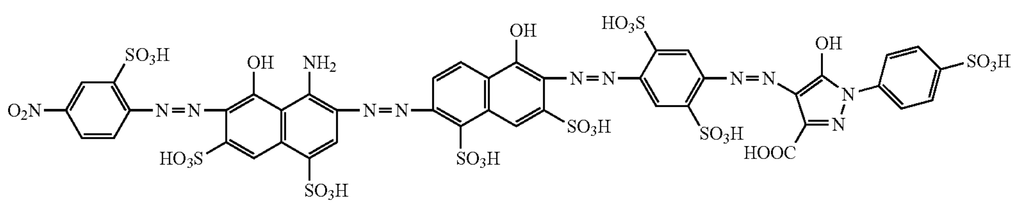 [SMILES: Nc1c(N=Nc2ccc3c(O)c(N=Nc4cc(S(=O)(=O)O)c(N=Nc5c(C(=O)O)nn(-c6ccc(S(=O)(=O)O)cc6)c5O)cc4S(=O)(=O)O)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |
| k10 | 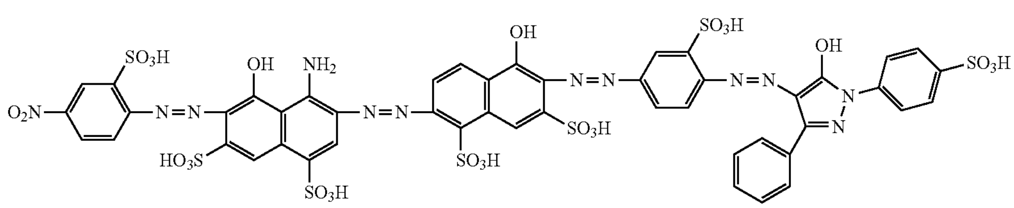 [SMILES: Nc1c(N=Nc2ccc3c(O)c(N=Nc4ccc(N=Nc5c(-c6ccccc6)nn(-c6ccc(S(=O)(=O)O)cc6)c5O)c(S(=O)(=O)O)c4)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |

TABLE 52-continued
| Compound No. | Structural formula |
| --- | --- |
| k11 | 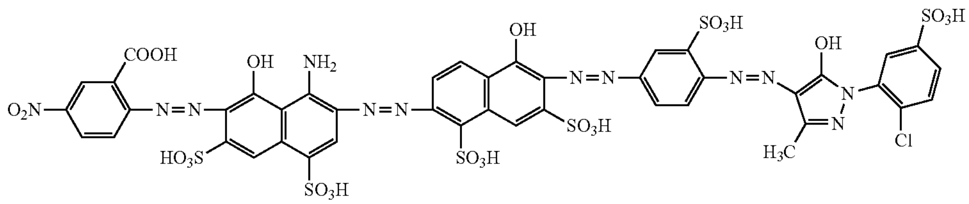 [SMILES: Cc1nn(-c2cc(S(=O)(=O)O)ccc2Cl)c(O)c1N=Nc1ccc(N=Nc2c(S(=O)(=O)O)cc3c(S(=O)(=O)O)c(N=Nc4cc(S(=O)(=O)O)c5cc(S(=O)(=O)O)c(N=Nc6ccc([N+](=O)[O-])cc6C(=O)O)c(O)c5c4N)ccc3c2O)cc1S(=O)(=O)O] |
| k12 | 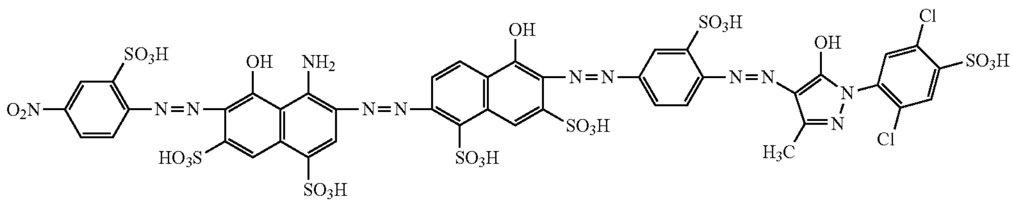 [SMILES: Cc1nn(-c2cc(Cl)c(S(=O)(=O)O)cc2Cl)c(O)c1N=Nc1ccc(N=Nc2c(S(=O)(=O)O)cc3c(S(=O)(=O)O)c(N=Nc4cc(S(=O)(=O)O)c5cc(S(=O)(=O)O)c(N=Nc6ccc([N+](=O)[O-])cc6S(=O)(=O)O)c(O)c5c4N)ccc3c2O)cc1S(=O)(=O)O] |
| k13 | 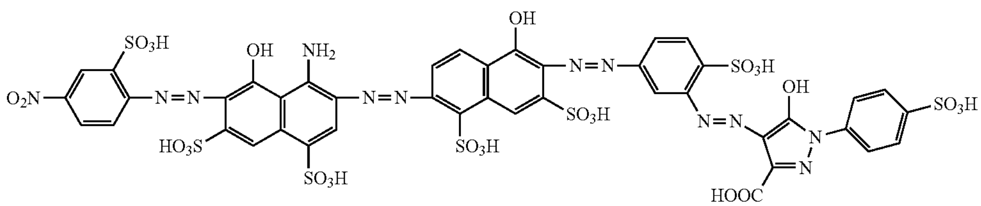 [SMILES: Nc1c(N=Nc2ccc3c(O)c(N=Nc4ccc(S(=O)(=O)O)c(/N=N/c5c(C(=O)O)nn(-c6ccc(S(=O)(=O)O)cc6)c5O)c4)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |
| k14 | 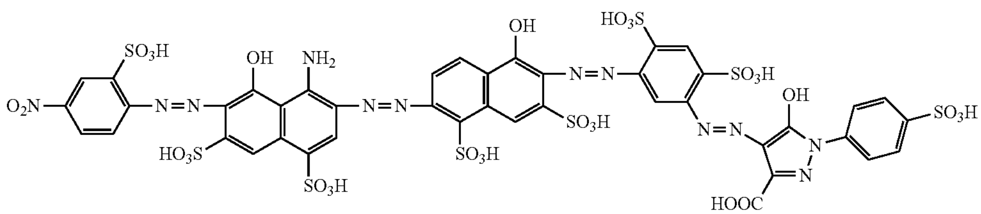 [SMILES: Nc1c(N=Nc2ccc3c(O)c(N=Nc4cc(/N=N/c5c(C(=O)O)nn(-c6ccc(S(=O)(=O)O)cc6)c5O)c(S(=O)(=O)O)cc4S(=O)(=O)O)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |
TABLE 53
| Compound No. | Structural formula |
| --- | --- |
| k15 | 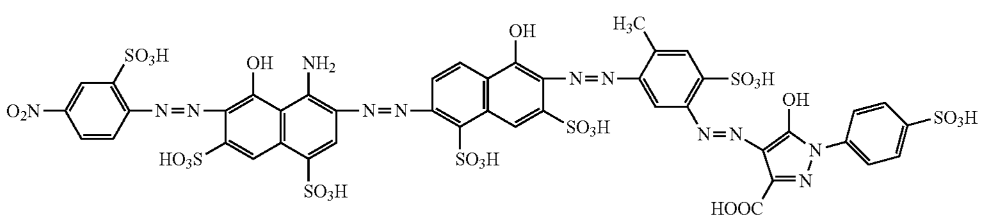 |
| k16 | 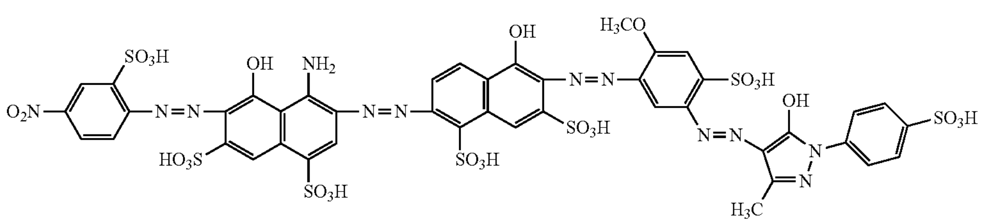 [SMILES: COc1cc(S(=O)(=O)O)c(/N=N/c2c(C)nn(-c3ccc(S(=O)(=O)O)cc3)c2O)cc1N=Nc1c(S(=O)(=O)O)cc2c(S(=O)(=O)O)c(N=Nc3cc(S(=O)(=O)O)c4cc(S(=O)(=O)O)c(N=Nc5ccc([N+](=O)[O-])cc5S(=O)(=O)O)c(O)c4c3N)ccc2c1O] |

TABLE 53-continued
| Compound No. | Structural formula |
| --- | --- |
| k17 | 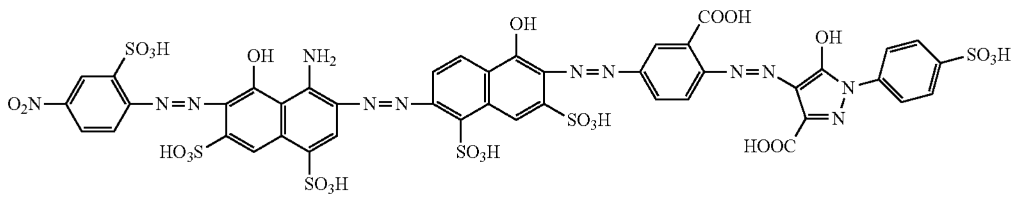 [SMILES: Nc1c(N=Nc2ccc3c(O)c(N=Nc4ccc(N=Nc5c(C(=O)O)nn(-c6ccc(S(=O)(=O)O)cc6)c5O)c(C(=O)O)c4)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |
| k18 | 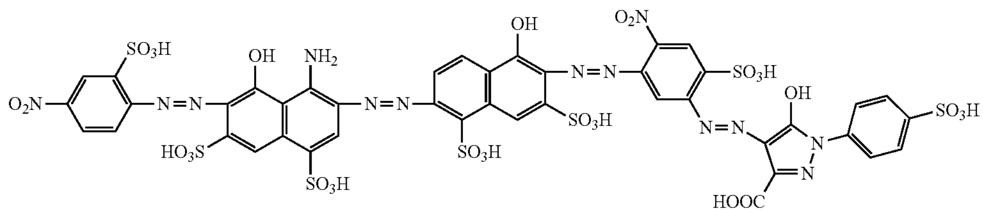 [SMILES: Nc1c(N=Nc2ccc3c(O)c(N=Nc4cc(/N=N/c5c(C(=O)O)nn(-c6ccc(S(=O)(=O)O)cc6)c5O)c(S(=O)(=O)O)cc4[N+](=O)[O-])c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |
| k19 | 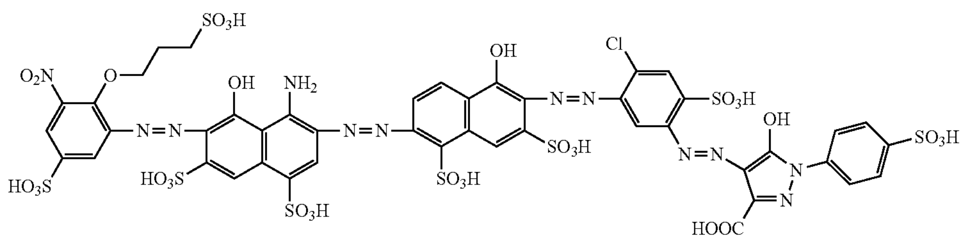 [SMILES: Nc1c(N=Nc2ccc3c(O)c(N=Nc4cc(/N=N/c5c(C(=O)O)nn(-c6ccc(S(=O)(=O)O)cc6)c5O)c(S(=O)(=O)O)cc4Cl)c(S(=O)(=O)O)cc3c2S(=O)(=O)O)cc(S(=O)(=O)O)c2cc(S(=O)(=O)O)c(N=Nc3cc(S(=O)(=O)O)cc([N+](=O)[O-])c3OCCCS(=O)(=O)O)c(O)c12] |
| k20 | 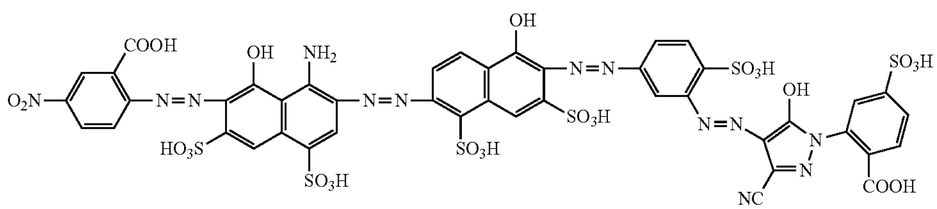 [SMILES: N#Cc1nn(-c2cc(S(=O)(=O)O)ccc2C(=O)O)c(O)c1/N=N/c1cc(N=Nc2c(S(=O)(=O)O)cc3c(S(=O)(=O)O)c(N=Nc4cc(S(=O)(=O)O)c5cc(S(=O)(=O)O)c(N=Nc6ccc([N+](=O)[O-])cc6C(=O)O)c(O)c5c4N)ccc3c2O)ccc1S(=O)(=O)O] |
TABLE 54
| Compound No. | Structural formula |
| --- | --- |
| k21 | 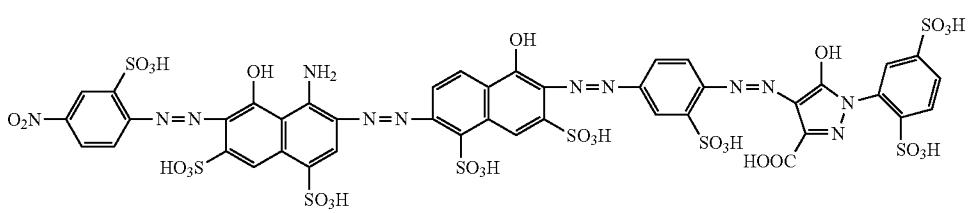 [SMILES: Nc1c(N=Nc2ccc3c(O)c(N=Nc4ccc(N=Nc5c(C(=O)O)nn(-c6cc(S(=O)(=O)O)ccc6S(=O)(=O)O)c5O)c(S(=O)(=O)O)c4)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |
| k22 | 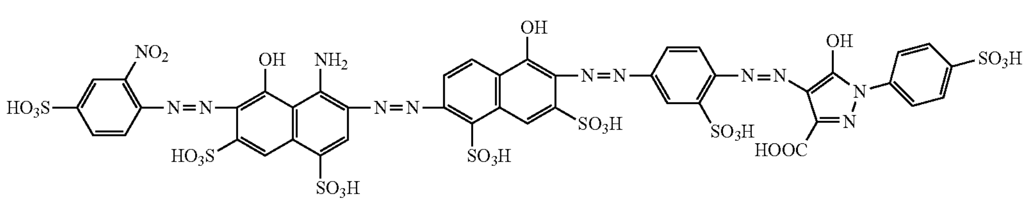 [SMILES: Nc1c(N=Nc2ccc3c(O)c(N=Nc4ccc(N=Nc5c(C(=O)O)nn(-c6ccc(S(=O)(=O)O)cc6)c5O)c(S(=O)(=O)O)c4)c(S(=O)(=O)O)cc3c2S(=O)(=O)O)cc(S(=O)(=O)O)c2cc(S(=O)(=O)O)c(N=Nc3ccc(S(=O)(=O)O)cc3[N+](=O)[O-])c(O)c12] |

TABLE 54-continued

| Compound No. | Structural formula |
| --- | --- |
| k23 | 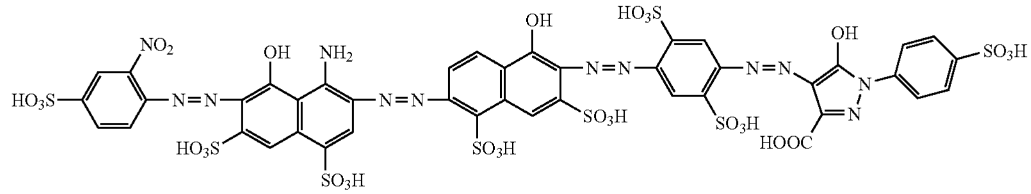 [SMILES: Nc1c(N=Nc2ccc3c(O)c(N=Nc4cc(S(=O)(=O)O)c(N=Nc5c(C(=O)O)nn(-c6ccc(S(=O)(=O)O)cc6)c5O)cc4S(=O)(=O)O)c(S(=O)(=O)O)cc3c2S(=O)(=O)O)cc(S(=O)(=O)O)c2cc(S(=O)(=O)O)c(N=Nc3ccc(S(=O)(=O)O)cc3[N+](=O)[O-])c(O)c12] |
| k24 | 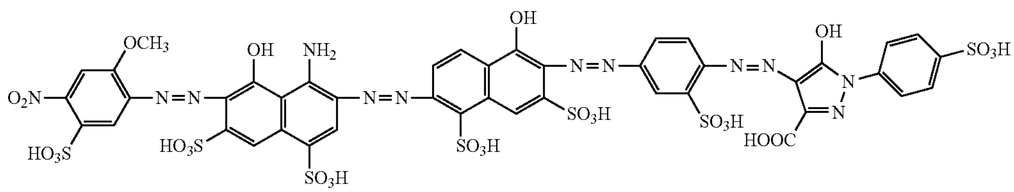 [SMILES: COc1cc([N+](=O)[O-])c(S(=O)(=O)O)cc1N=Nc1c(S(=O)(=O)O)cc2c(S(=O)(=O)O)cc(N=Nc3ccc4c(O)c(N=Nc5ccc(N=Nc6c(C(=O)O)nn(-c7ccc(S(=O)(=O)O)cc7)c6O)c(S(=O)(=O)O)c5)c(S(=O)(=O)O)cc4c3S(=O)(=O)O)c(N)c2c1O] |
| k25 | 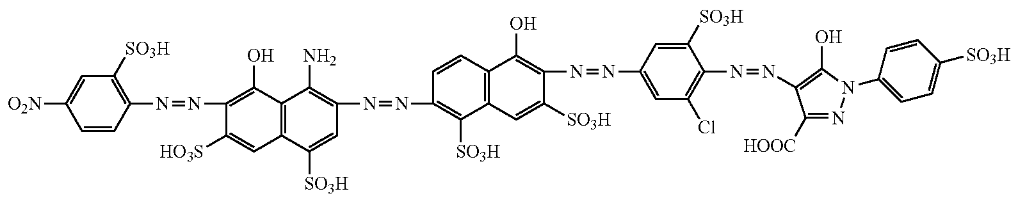 |
| k26 | 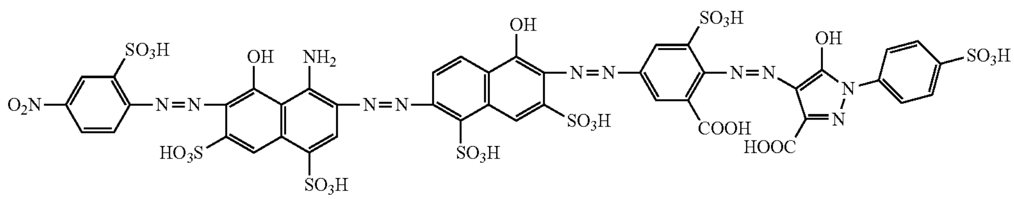 [SMILES: Nc1c(N=Nc2ccc3c(O)c(N=Nc4cc(C(=O)O)c(N=Nc5c(C(=O)O)nn(-c6ccc(S(=O)(=O)O)cc6)c5O)c(S(=O)(=O)O)c4)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |
| k27 | 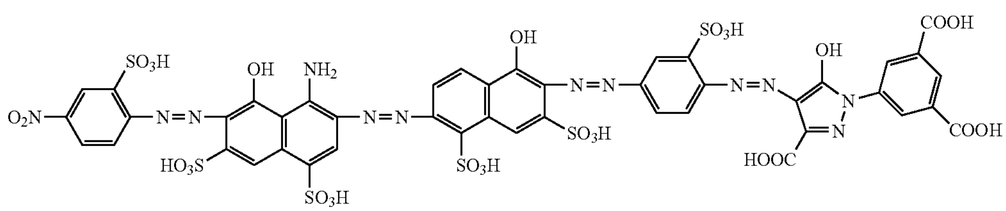 [SMILES: Nc1c(N=Nc2ccc3c(O)c(N=Nc4ccc(N=Nc5c(C(=O)O)nn(-c6cc(C(=O)O)cc(C(=O)O)c6)c5O)c(S(=O)(=O)O)c4)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |

[Component (B-l)]

A component (B-l) can significantly improve ozone-gas resistance in particular. The compound can be obtained, for example, by a method described in International Publication No. WO 2012/081640.

The trisazo compound represented by the formula (l1) has a tautomer thereof. Other than the compound of the formula (l1), the tautomer is represented by the formulae (l3) and (l4), for example. An ink composition employing such a tautomer is also encompassed in the scope of the present invention.

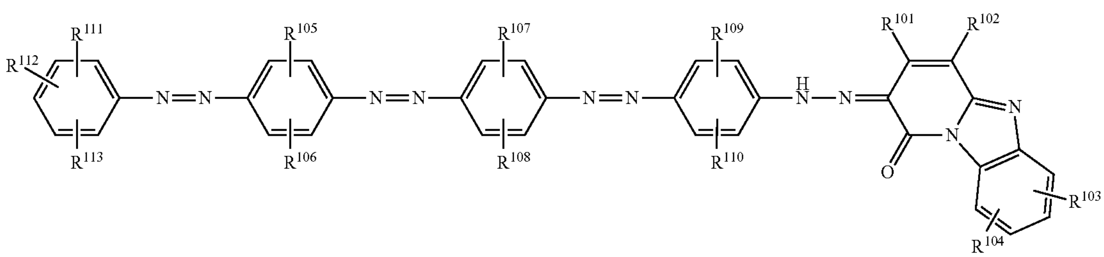

(l3)

[In the formula (13), $R^{101}$ to $R^{113}$ are the same as defined in the formula (11).]

(14)

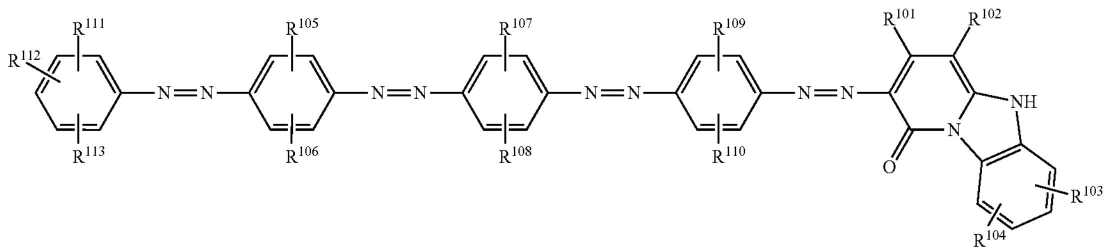

[In the formula (14), $R^{101}$ to $R^{113}$ are the same as defined in the formula (11).]

In the formula (11), $R^{101}$ is a (C1-C4) alkyl group; a (C1-C4) alkyl group substituted with a carboxy group; a phenyl group; a phenyl group substituted with a sulfo group; or a carboxy group.

Examples of the (C1-C4) alkyl group as or in $R^{101}$ in the formula (11) are the same as the examples of the (C1-C4) alkyl specific examples, preferable examples, and more preferable examples thereof.

Examples of the (C1-C4) alkyl group substituted with a carboxy group as or in $R^{101}$ in the formula (11) include ones in which one of the carbon atoms of the (C1-C4) alkyl group has a carboxy group attached thereto as a substituent. The position to which the carboxy group as a substituent is attached is not particularly limited, but is preferably a terminus of the alkyl group. The number of substitution is 1 or 2 and is preferably 1. Specific examples of the (C1-C4) alkyl group substituted with a carboxy group include a carboxymethyl group, a 2-carboxyethyl group, a 3-carboxy-n-propyl group, and a 4-carboxy-n-butyl group.

Examples of the phenyl group substituted with a sulfo group as or in $R^{101}$ in the formula (11) include ones in which a carbon atom of the phenyl group has a sulfo group attached thereto as a substituent. The number of substitution is 1 to 3, preferably 1 or 2, more preferably 1. Specific examples of the phenyl group substituted with a sulfo group include a 2-sulfophenyl group, a 3-sulfophenyl group, a 4-sulfophenyl group, a 2,4-disulfophenyl group, a 3,5-disulfophenyl group, and a 2,5-disulfophenyl group. A 2-sulfophenyl group or a 4-sulfophenyl group is preferable.

In the formula (11), $R^{102}$ is a cyano group; a carbamoyl group; or a carboxy group.

In the formula (11), $R^{103}$ and $R^{104}$ are independently a hydrogen atom; a (C1-C4) alkyl group; a halogen atom; a (C1-C4) alkoxy group; or a sulfo group.

Examples of the (C1-C4) alkyl group as or in $R^{103}$ and $R^{104}$ in the formula (11) are the same as the examples of the (C1-C4) alkyl group as or in $R^1$, $R^2$, $R^5$, $R^6$, and $R^7$ described above, including specific examples, preferable examples, and more preferable examples thereof.

Examples of the halogen atom as or in $R^{103}$ and $R^{104}$ in the formula (11) are the same as the examples of the halogen atom as or in $R^1$, $R^2$, $R^5$, $R^6$, and $R^7$ described above, including specific examples, preferable examples, and more preferable examples thereof.

Examples of the (C1-C4) alkoxy group as or in $R^{103}$ and $R^{104}$ in the formula (11) are the same as the examples of the (C1-C4) alkoxy group as or in $R^1$, $R^2$, $R^5$, $R^6$, and $R^7$ described above, including specific examples, preferable examples, and more preferable examples thereof.

In a preferable combination of $R^{101}$ to $R^{104}$ in the formula (11), $R^{101}$ is a methyl group or a phenyl group, $R^{102}$ is a cyano group or a carbamoyl group, $R^{103}$ is a hydrogen atom, a methyl group, or a methoxy group, and $R^{104}$ is a sulfo group.

In the formula (11), each of $R^{105}$ and $R^{107}$ is a (C1-C4) alkylthio group; or a (C1-C4) alkylthio group substituted with at least one group selected from the group consisting of a hydroxy group, a sulfo group, and a carboxy group.

Examples of the (C1-C4) alkylthio group as or in $R^{105}$ and $R^{107}$ in the formula (11) are the same as the examples of the (C1-C4) alkylthio group as or in $R^1$, $R^2$, $R^5$, $R^6$, and $R^7$ described above, including specific examples, preferable examples, and more preferable examples thereof.

Examples of the (C1-C4) alkylthio group substituted with at least one group selected from the group consisting of a hydroxy group, a sulfo group, and a carboxy group as or in $R^{105}$ and $R^{107}$ in the formula (11) include ones in which any of the carbon atoms of the (C1-C4) alkylthio group has a substituent attached thereto. The number of such substitution is usually 1 or 2 and is preferably 1. The position of substitution is not particularly limited, but is preferably a carbon atom different from the carbon atom to which a sulfur atom in the alkylthio group is bonded. Specific examples include ones substituted with a hydroxy group, such as a 2-hydroxyethylthio group, a 3-hydroxy-n-propylthio group, and a 4-hydroxy-n-butylthio group; ones substituted with a sulfo group, such as a 2-sulfoethylthio group, a 3-sulfo-n-propylthio group, and a 4-sulfo-n-butylthio group; and ones substituted with a carboxy group, such as a 2-carboxyethylthio group, a 3-carboxy-n-propylthio group, and a 4-carboxy-n-butylthio group. The ones substituted with a sulfo group are preferable, and a 3-sulfopropylthio group is particularly preferable.

In the formula (11), each of $R^{105}$ and $R^{107}$ is preferably an alkylthio group substituted with a sulfo group, and is more preferably a 3-sulfo-n-propylthio group or 4-sulfo-n-butylthio group.

In the formula (11), each of $R^{106}$ and $R^{108}$ is an acylamino group.

Examples of the acylamino group as or in $R^{106}$ and $R^{108}$ in the formula (11) are the same as the examples of the acylamino group as or in $R^1$, $R^2$, $R^5$, $R^6$, and $R^7$ described above, including specific examples and preferable examples thereof. An acetylamino group is more preferable.

In the formula (11), $R^{109}$ and $R^{110}$ are independently a hydrogen atom; a carboxy group; a sulfo group; a (C1-C4) alkylcarbonylamino group; a halogen atom; a (C1-C4) alkyl group; a (C1-C4) alkoxy group; or a (C1-C4) alkoxy group substituted with at least one group selected from the group consisting of a hydroxy group, a (C1-C4) alkoxy group, a sulfo group, and a carboxy group.

The (C1-C4) alkylcarbonylamino group as or in $R^{109}$ and $R^{110}$ in the formula (l1) is a carbonylamino group having a (C1-C4) alkyl group as or in $R^1$, $R^2$, $R^5$, $R^6$, and $R^7$. Preferable and specific examples include an acetylamino group.

Examples of the halogen atom as or in $R^{109}$ and $R^{110}$ in the formula (l1) are the same as the examples of the halogen atom as or in $R^1$, $R^2$, $R^5$, $R^6$, and $R^7$ described above, including specific examples, preferable examples, and more preferable examples thereof.

Examples of the (C1-C4) alkyl group as or in $R^{109}$ and $R^{110}$ in the formula (l1) are the same as the examples of the (C1-C4) alkyl group as or in $R^1$, $R^2$, $R^5$, $R^6$, and $R^7$ described above, including specific examples, preferable examples, and more preferable examples thereof.

Examples of the (C1-C4) alkoxy group as or in $R^{109}$ and $R^{110}$ in the formula (l1) are the same as the examples of the (C1-C4) alkoxy group as or in $R^1$, $R^2$, $R^5$, $R^6$, and $R^7$ described above, including specific examples, preferable examples, and more preferable examples thereof.

Examples of the (C1-C4) alkoxy group substituted with at least one group selected from the group consisting of a hydroxy group, a (C1-C4) alkoxy group, a sulfo group, and a carboxy group as or in $R^{109}$ and $R^{110}$ in the formula (l1) are the same as the examples of the (C1-C4) alkoxy group substituted with at least one group selected from the group consisting of a hydroxy group, a (C1-C4) alkoxy group, a sulfo group, and a carboxy group as or in $R^1$, $R^2$, $R^5$, $R^6$, and $R^7$ described above, including specific examples, preferable examples, and more preferable examples thereof.

In the formula (l1), a (C1-C4) alkyl group or an acetylamino group is preferable, a (C1-C4) alkyl group is more preferable, and a methyl group is further preferable.

In the formula (l1), $R^{111}$ to $R^{113}$ are independently a hydrogen atom; a carboxy group; a sulfo group; a hydroxy group; an acetylamino group; a halogen atom; a cyano group; a nitro group; a sulfamoyl group; a (C1-C4) alkyl group; a (C1-C4) alkoxy group; a (C1-C4) alkoxy group substituted with at least one group selected from the group consisting of a hydroxy group, a (C1-C4) alkoxy group, a sulfo group, and a carboxy group; an alkylsulfonyl group; or a (C1-C4) alkylsulfonyl group substituted with at least one group selected from the group consisting of a sulfo group, a carboxy group, and a hydroxy group.

Examples of the halogen atom as or in $R^{111}$ to $R^{113}$ in the formula (l1) are the same as the examples of the halogen atom as or in $R^1$, $R^2$, $R^5$, $R^6$, and $R^7$ described above, including specific examples, preferable examples, and more preferable examples thereof.

Examples of the (C1-C4) alkyl group as or in $R^{111}$ to $R^{113}$ in the formula (l1) are the same as the examples of the (C1-C4) alkyl group as or in $R^1$, $R^2$, $R^5$, $R^6$, and $R^7$ described above, including specific examples, preferable examples, and more preferable examples thereof.

Examples of the (C1-C4) alkoxy group as or in $R^{111}$ to $R^{113}$ in the formula (l1) are the same as the examples of the (C1-C4) alkoxy group as or in $R^1$, $R^2$, $R^5$, $R^6$, and $R^7$ described above, including specific examples, preferable examples, and more preferable examples thereof.

Examples of the (C1-C4) alkoxy group substituted with at least one group selected from the group consisting of a hydroxy group, a (C1-C4) alkoxy group, a sulfo group, and a carboxy group as or in $R^{111}$ to $R^{113}$ in the formula (l1) are the same as the examples of the (C1-C4) alkoxy group substituted with at least one group selected from the group consisting of a hydroxy group, a (C1-C4) alkoxy group, a sulfo group, and a carboxy group as or in $R^1$, $R^2$, $R^5$, $R^6$, and $R^7$ described above, including specific examples, preferable examples, and more preferable examples thereof.

Examples of the alkylsulfonyl group as or in $R^{111}$ to $R^{113}$ in the formula (l1) are the same as the examples of the alkylsulfonyl group as or in $R^1$, $R^2$, $R^5$, $R^6$, and $R^7$ described above, including specific examples, preferable examples, and more preferable examples thereof.

Examples of the (C1-C4) alkylsulfonyl group substituted with at least one group selected from the group consisting of a sulfo group, a carboxy group, and a hydroxy group as or in $R^{111}$ to $R^{113}$ in the formula (l1) are the same as the examples of the (C1-C4) alkylsulfonyl group substituted with at least one group selected from the group consisting of a sulfo group, a carboxy group, and a hydroxy group as or in $R^1$, $R^2$, $R^5$, $R^6$, and $R^7$ described above, including specific examples, preferable examples, and more preferable examples thereof.

In a more preferable combination of $R^{111}$ to $R^{113}$ in the formula (l1), $R^{111}$ to $R^{113}$ are independently a hydrogen atom; a carboxy group; a sulfo group; a chlorine atom; a nitro group; a methyl group; a methoxy group; or a sulfamoyl group, $R^{110}$ is a (C1-C4) alkyl group, $R^{111}$ is a hydrogen atom or a sulfo group, $R^{112}$ is a sulfo group or a chlorine atom, and $R^{113}$ is a hydrogen atom or a sulfo group.

A compound adopting a combination of the preferable ones as substituents in the formula (l1) is more preferable, and a compound adopting a combination of the more preferable ones is further preferable. The same applies to a combination of the further preferable ones.

Specific examples of the coloring matter represented by the formula (l1) are shown in Tables 55 to 70 below. However, the present invention is not limited thereto.

Among these, coloring matters shown under Compound Nos. l7 to l112 are particularly preferable.

TABLE 55

| Compound No. | Structural formula |
|---|---|
| l1 | 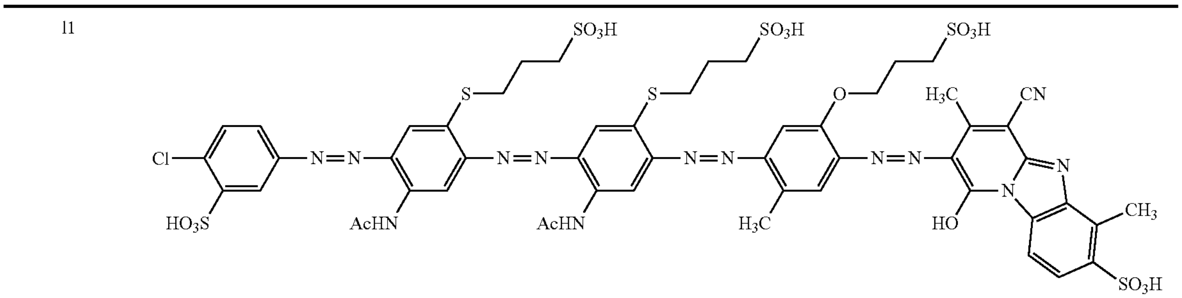 |

TABLE 55-continued
| Compound No. | Structural formula |
|---|---|
| I2 | 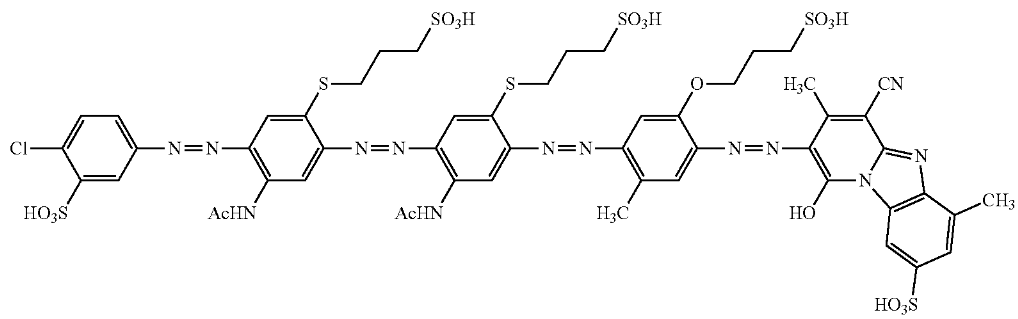 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6c(C)cc(S(=O)(=O)O)cc6n5c4O)cc3C)cc2NC(C)=O)c(SCCCS(=O)(=O)O)cc1N=Nc1ccc(Cl)c(S(=O)(=O)O)c1] |
| I3 | 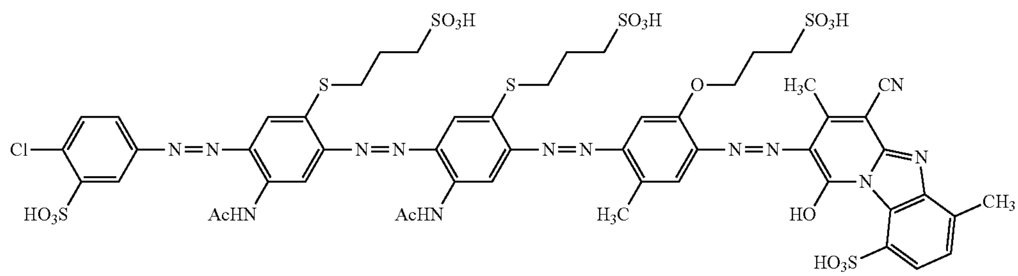 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6c(C)ccc(S(=O)(=O)O)c6n5c4O)cc3C)cc2NC(C)=O)c(SCCCS(=O)(=O)O)cc1N=Nc1ccc(Cl)c(S(=O)(=O)O)c1] |
| I4 | 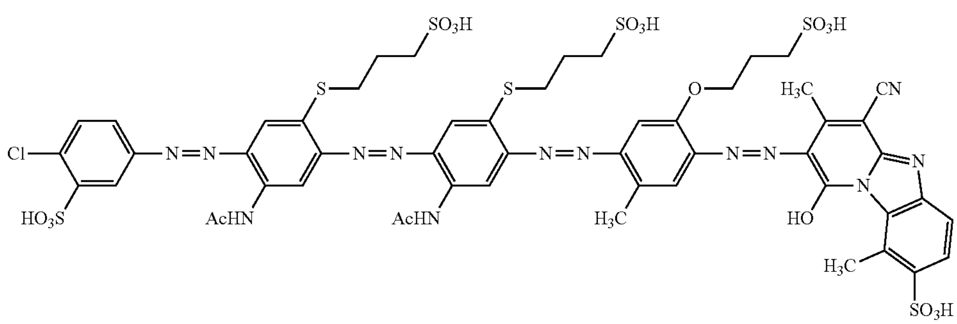 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6ccc(S(=O)(=O)O)c(C)c6n5c4O)cc3C)cc2NC(C)=O)c(SCCCS(=O)(=O)O)cc1N=Nc1ccc(Cl)c(S(=O)(=O)O)c1] |
| I5 | 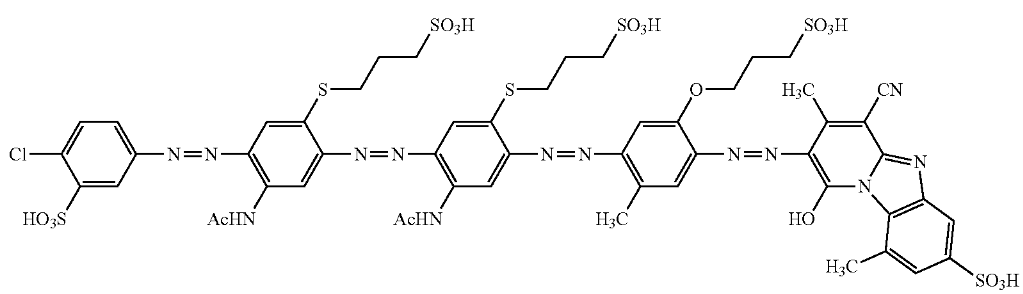 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6cc(S(=O)(=O)O)cc(C)c6n5c4O)cc3C)cc2NC(C)=O)c(SCCCS(=O)(=O)O)cc1N=Nc1ccc(Cl)c(S(=O)(=O)O)c1] |
| I6 | 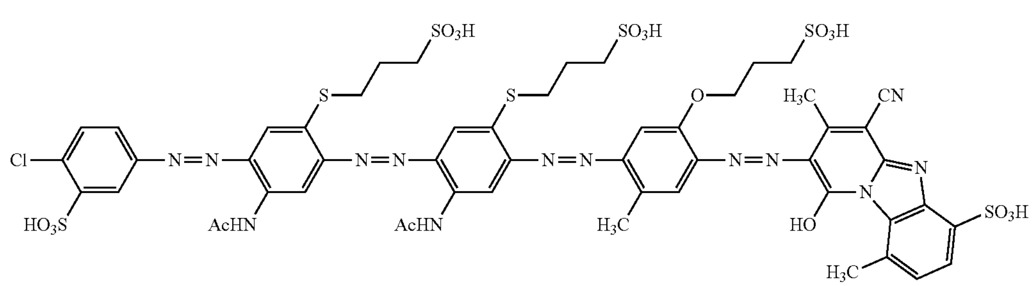 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6c(S(=O)(=O)O)ccc(C)c6n5c4O)cc3C)cc2NC(C)=O)c(SCCCS(=O)(=O)O)cc1N=Nc1ccc(Cl)c(S(=O)(=O)O)c1] |

TABLE 56
| Compound No. | Structural formula |
|---|---|
| I7 | 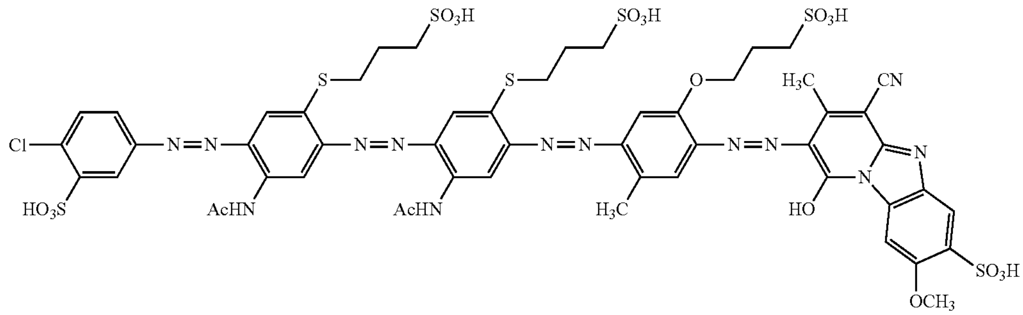 [SMILES: COc1cc2c(cc1S(=O)(=O)O)nc1c(C#N)c(C)c(N=Nc3cc(C)c(N=Nc4cc(NC(C)=O)c(N=Nc5cc(NC(C)=O)c(N=Nc6ccc(Cl)c(S(=O)(=O)O)c6)cc5SCCCS(=O)(=O)O)cc4SCCCS(=O)(=O)O)cc3OCCCS(=O)(=O)O)c(O)n12] |
| I8 | 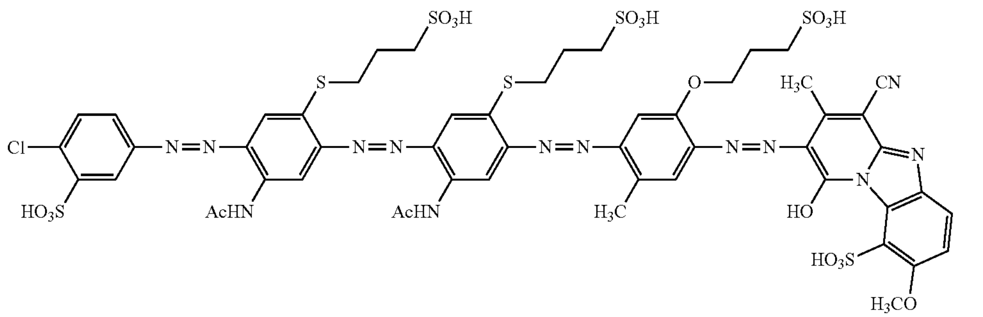 [SMILES: COc1ccc2nc3c(C#N)c(C)c(N=Nc4cc(C)c(N=Nc5cc(NC(C)=O)c(N=Nc6cc(NC(C)=O)c(N=Nc7ccc(Cl)c(S(=O)(=O)O)c7)cc6SCCCS(=O)(=O)O)cc5SCCCS(=O)(=O)O)cc4OCCCS(=O)(=O)O)c(O)n3c2c1S(=O)(=O)O] |
| I9 | 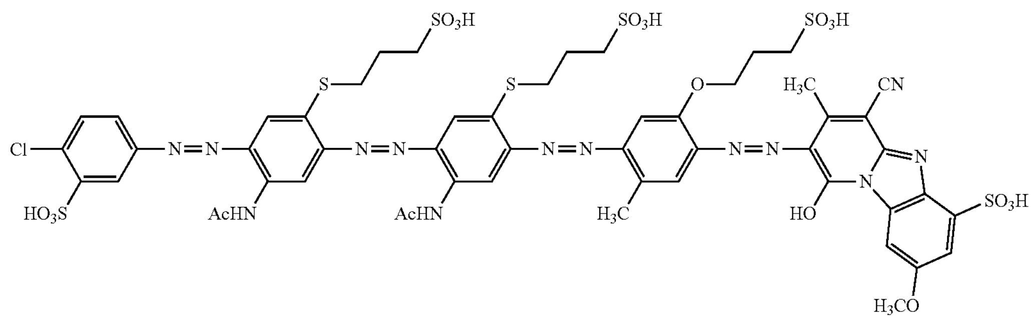 [SMILES: COc1cc(S(=O)(=O)O)c2nc3c(C#N)c(C)c(N=Nc4cc(C)c(N=Nc5cc(NC(C)=O)c(N=Nc6cc(NC(C)=O)c(N=Nc7ccc(Cl)c(S(=O)(=O)O)c7)cc6SCCCS(=O)(=O)O)cc5SCCCS(=O)(=O)O)cc4OCCCS(=O)(=O)O)c(O)n3c2c1] |
| I10 | 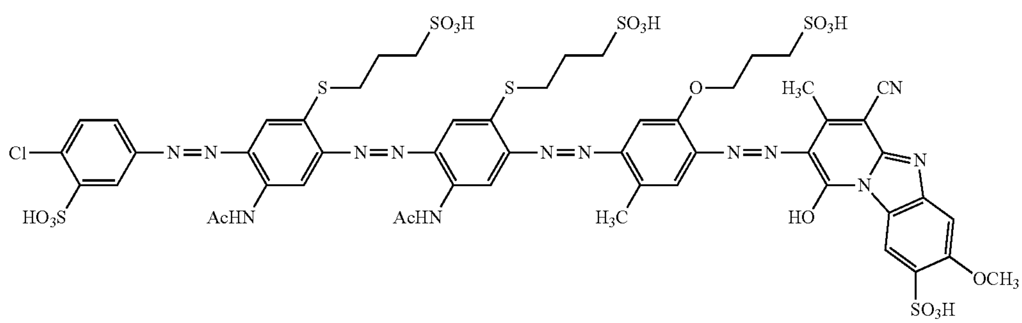 [SMILES: COc1cc2nc3c(C#N)c(C)c(N=Nc4cc(C)c(N=Nc5cc(NC(C)=O)c(N=Nc6cc(NC(C)=O)c(N=Nc7ccc(Cl)c(S(=O)(=O)O)c7)cc6SCCCS(=O)(=O)O)cc5SCCCS(=O)(=O)O)cc4OCCCS(=O)(=O)O)c(O)n3c2cc1S(=O)(=O)O] |
| I11 | 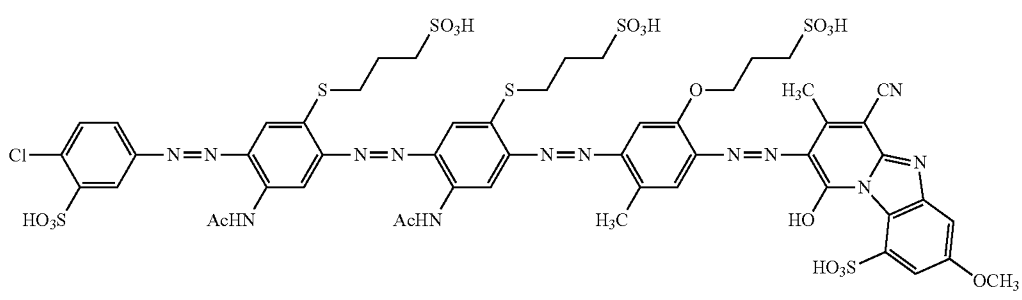 [SMILES: COc1cc(S(=O)(=O)O)c2c(c1)nc1c(C#N)c(C)c(N=Nc3cc(C)c(N=Nc4cc(NC(C)=O)c(N=Nc5cc(NC(C)=O)c(N=Nc6ccc(Cl)c(S(=O)(=O)O)c6)cc5SCCCS(=O)(=O)O)cc4SCCCS(=O)(=O)O)cc3OCCCS(=O)(=O)O)c(O)n12] |

TABLE 56-continued
| Compound No. | Structural formula |
| --- | --- |
| I12 | 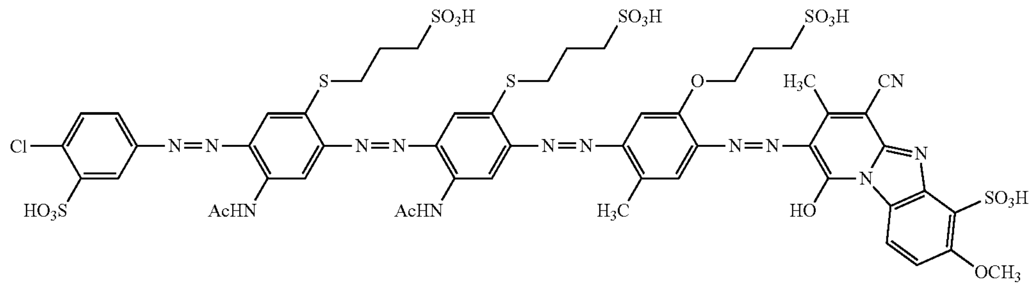 [SMILES: COc1ccc2c(nc3c(C#N)c(C)c(N=Nc4cc(C)c(N=Nc5cc(NC(C)=O)c(N=Nc6cc(NC(C)=O)c(N=Nc7ccc(Cl)c(S(=O)(=O)O)c7)cc6SCCCS(=O)(=O)O)cc5SCCCS(=O)(=O)O)cc4OCCCS(=O)(=O)O)c(O)n32)c1S(=O)(=O)O] |
TABLE 57
| Compound No. | Structural formula |
| --- | --- |
| I13 | 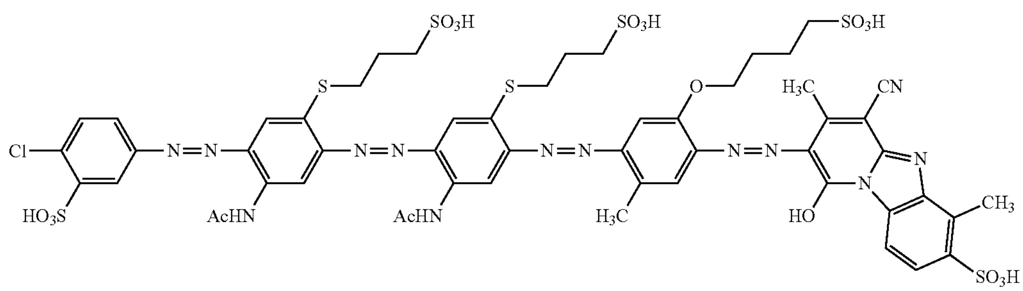 [SMILES: CC(=O)Nc1cc(N=Nc2cc(SCCCS(=O)(=O)O)c(N=Nc3cc(OCCCCS(=O)(=O)O)c(N=Nc4c(C)c(C#N)c5nc6c(C)c(S(=O)(=O)O)ccc6n5c4O)cc3C)cc2NC(C)=O)c(SCCCS(=O)(=O)O)cc1N=Nc1ccc(Cl)c(S(=O)(=O)O)c1] |
| I14 | 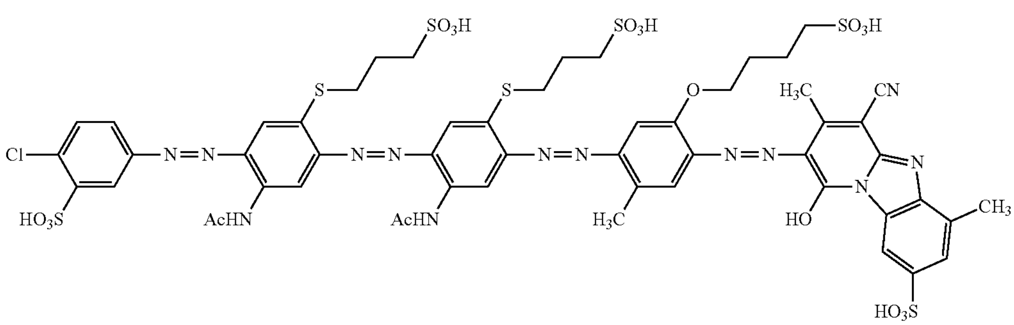 [SMILES: CC(=O)Nc1cc(N=Nc2cc(SCCCS(=O)(=O)O)c(N=Nc3cc(OCCCCS(=O)(=O)O)c(N=Nc4c(C)c(C#N)c5nc6c(C)cc(S(=O)(=O)O)cc6n5c4O)cc3C)cc2NC(C)=O)c(SCCCS(=O)(=O)O)cc1N=Nc1ccc(Cl)c(S(=O)(=O)O)c1] |
| I15 | 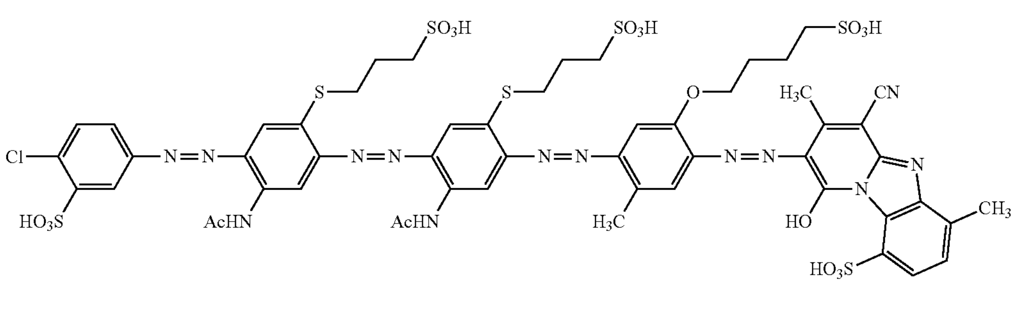 [SMILES: CC(=O)Nc1cc(N=Nc2cc(SCCCS(=O)(=O)O)c(N=Nc3cc(OCCCCS(=O)(=O)O)c(N=Nc4c(C)c(C#N)c5nc6c(C)ccc(S(=O)(=O)O)c6n5c4O)cc3C)cc2NC(C)=O)c(SCCCS(=O)(=O)O)cc1N=Nc1ccc(Cl)c(S(=O)(=O)O)c1] |

TABLE 57-continued
| Compound No. | Structural formula |
| --- | --- |
| l16 | 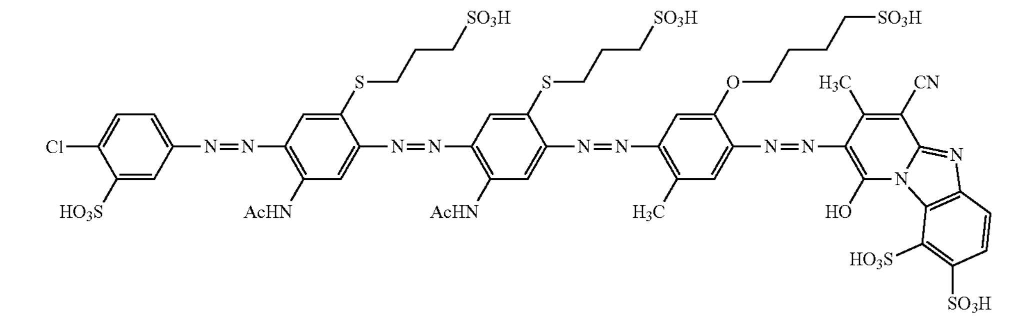 [SMILES: CC(=O)Nc1cc(N=Nc2cc(SCCCS(=O)(=O)O)c(N=Nc3cc(OCCCCS(=O)(=O)O)c(N=Nc4c(C)c(C#N)c5nc6ccc(S(=O)(=O)O)c(S(=O)(=O)O)c6n5c4O)cc3C)cc2NC(C)=O)c(SCCCS(=O)(=O)O)cc1N=Nc1ccc(Cl)c(S(=O)(=O)O)c1] |
| l17 | 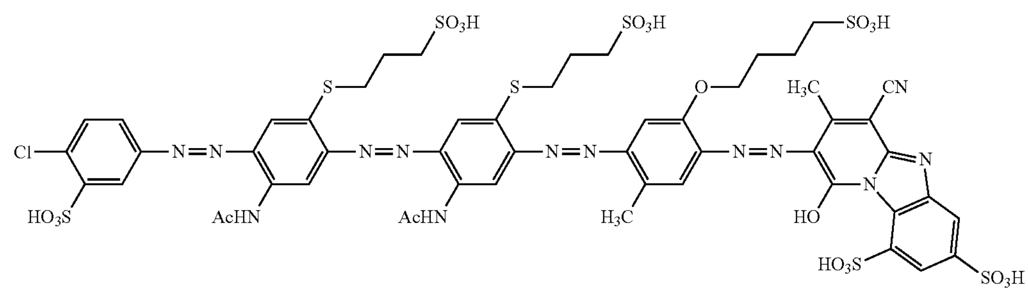 [SMILES: CC(=O)Nc1cc(N=Nc2cc(SCCCS(=O)(=O)O)c(N=Nc3cc(OCCCCS(=O)(=O)O)c(N=Nc4c(C)c(C#N)c5nc6cc(S(=O)(=O)O)cc(S(=O)(=O)O)c6n5c4O)cc3C)cc2NC(C)=O)c(SCCCS(=O)(=O)O)cc1N=Nc1ccc(Cl)c(S(=O)(=O)O)c1] |
| l18 | 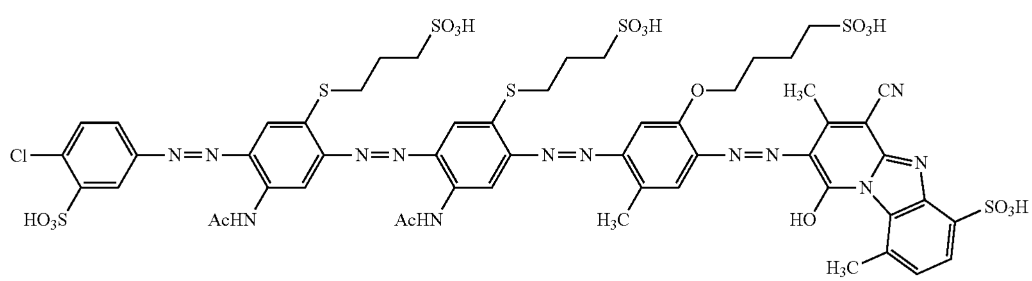 [SMILES: CC(=O)Nc1cc(N=Nc2cc(SCCCS(=O)(=O)O)c(N=Nc3cc(OCCCCS(=O)(=O)O)c(N=Nc4c(C)c(C#N)c5nc6c(S(=O)(=O)O)ccc(C)c6n5c4O)cc3C)cc2NC(C)=O)c(SCCCS(=O)(=O)O)cc1N=Nc1ccc(Cl)c(S(=O)(=O)O)c1] |
TABLE 58
| Compound No. | Structural formula |
| --- | --- |
| l19 | 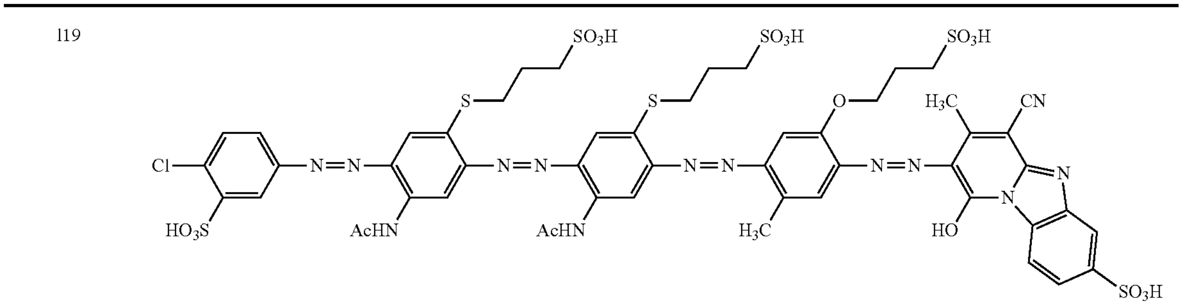 |

TABLE 58-continued
| Compound No. | Structural formula |
| --- | --- |
| I20 | 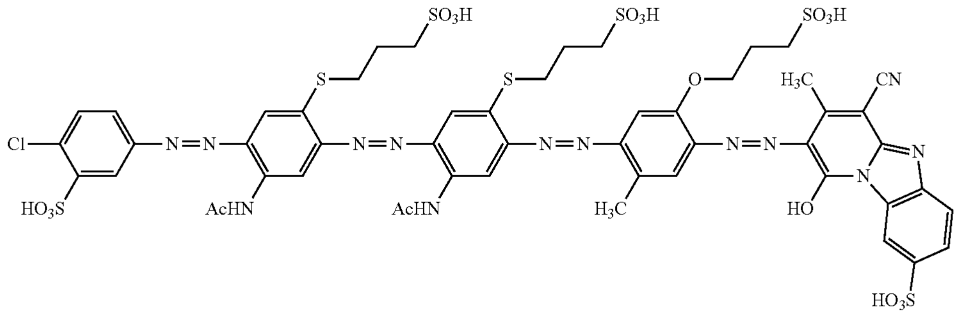 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6ccc(S(=O)(=O)O)cc6n5c4O)cc3C)cc2NC(C)=O)c(SCCCS(=O)(=O)O)cc1N=Nc1ccc(Cl)c(S(=O)(=O)O)c1] |
| I21 | 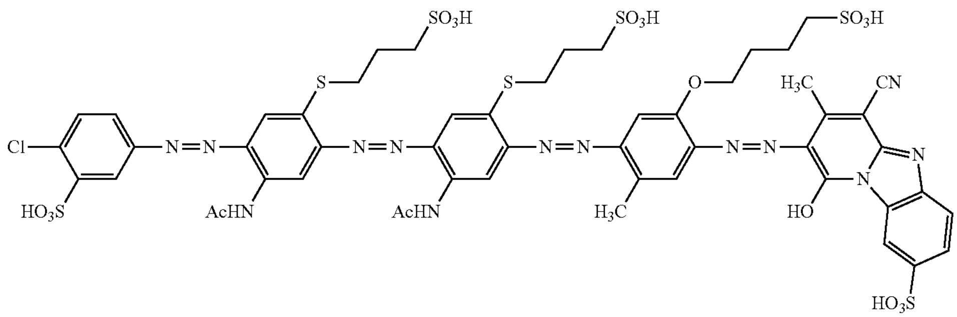 [SMILES: CC(=O)Nc1cc(N=Nc2cc(SCCCS(=O)(=O)O)c(N=Nc3cc(OCCCCS(=O)(=O)O)c(N=Nc4c(C)c(C#N)c5nc6ccc(S(=O)(=O)O)cc6n5c4O)cc3C)cc2NC(C)=O)c(SCCCS(=O)(=O)O)cc1N=Nc1ccc(Cl)c(S(=O)(=O)O)c1] |
| I22 | 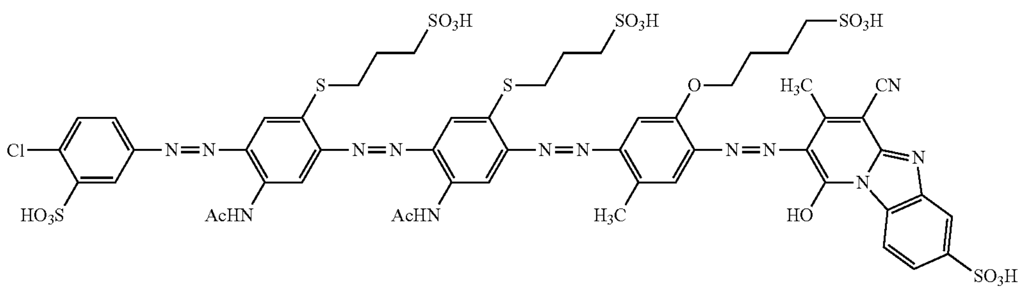 [SMILES: CC(=O)Nc1cc(N=Nc2cc(SCCCS(=O)(=O)O)c(N=Nc3cc(OCCCCS(=O)(=O)O)c(N=Nc4c(C)c(C#N)c5nc6cc(S(=O)(=O)O)ccc6n5c4O)cc3C)cc2NC(C)=O)c(SCCCS(=O)(=O)O)cc1N=Nc1ccc(Cl)c(S(=O)(=O)O)c1] |
| I23 | 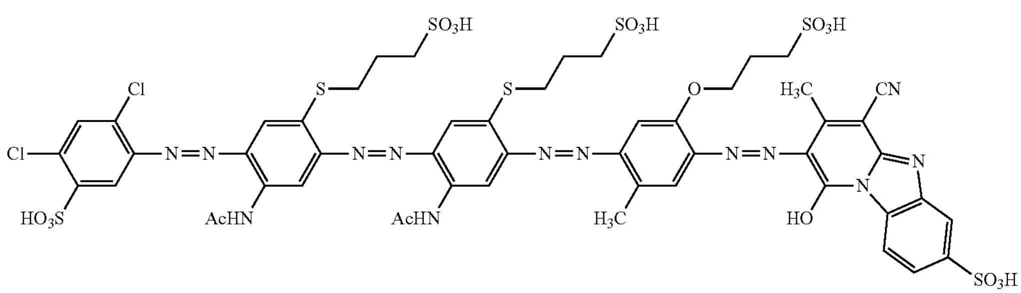 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6cc(S(=O)(=O)O)ccc6n5c4O)cc3C)cc2NC(C)=O)c(SCCCS(=O)(=O)O)cc1N=Nc1cc(S(=O)(=O)O)c(Cl)cc1Cl] |
| I24 | 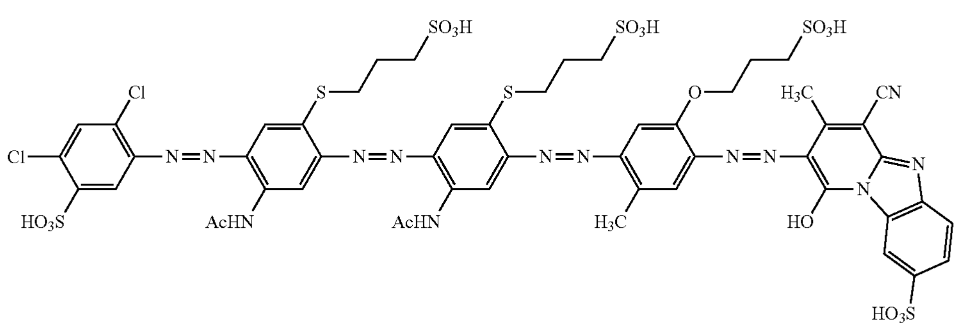 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6ccc(S(=O)(=O)O)cc6n5c4O)cc3C)cc2NC(C)=O)c(SCCCS(=O)(=O)O)cc1N=Nc1cc(S(=O)(=O)O)c(Cl)cc1Cl] |

TABLE 59
| Compound No. | Structural formula |
|---|---|
| 125 | 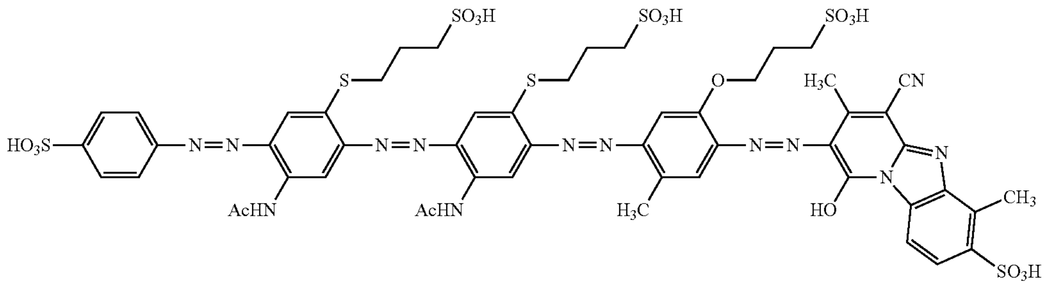 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6c(C)c(S(=O)(=O)O)ccc6n5c4O)cc3C)cc2NC(C)=O)c(SCCCS(=O)(=O)O)cc1N=Nc1ccc(S(=O)(=O)O)cc1] |
| 126 | 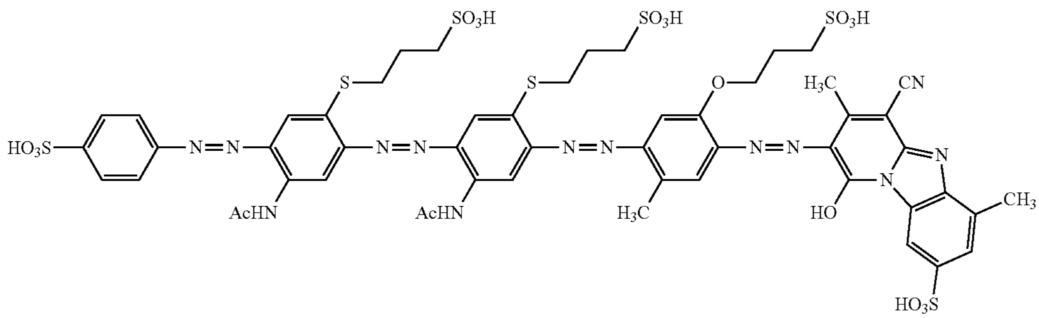 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6c(C)cc(S(=O)(=O)O)cc6n5c4O)cc3C)cc2NC(C)=O)c(SCCCS(=O)(=O)O)cc1N=Nc1ccc(S(=O)(=O)O)cc1] |
| 127 | 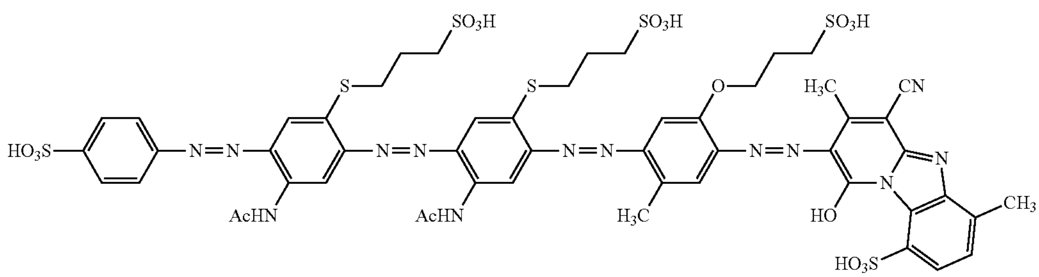 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6c(C)ccc(S(=O)(=O)O)c6n5c4O)cc3C)cc2NC(C)=O)c(SCCCS(=O)(=O)O)cc1N=Nc1ccc(S(=O)(=O)O)cc1] |
| 128 | 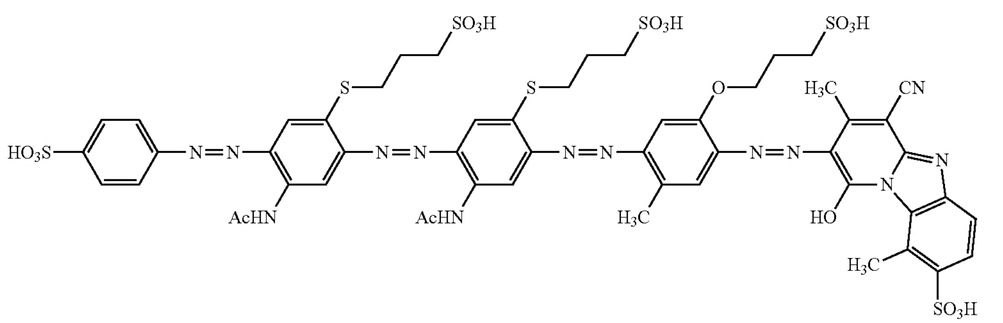 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6ccc(S(=O)(=O)O)c(C)c6n5c4O)cc3C)cc2NC(C)=O)c(SCCCS(=O)(=O)O)cc1N=Nc1ccc(S(=O)(=O)O)cc1] |
| 129 | 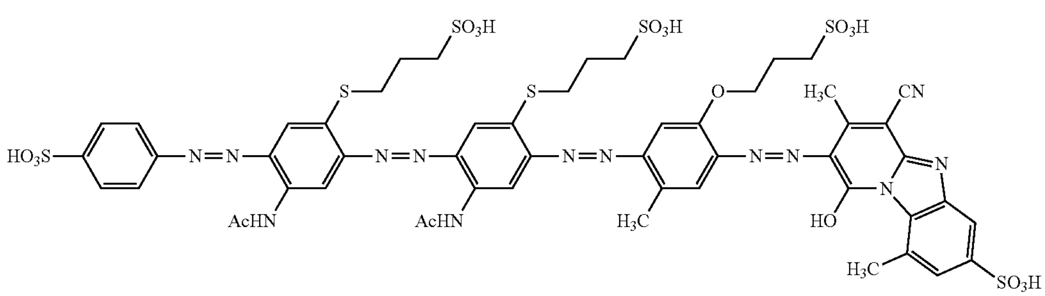 |

TABLE 59-continued
| Compound No. | Structural formula |
| --- | --- |
| 130 | 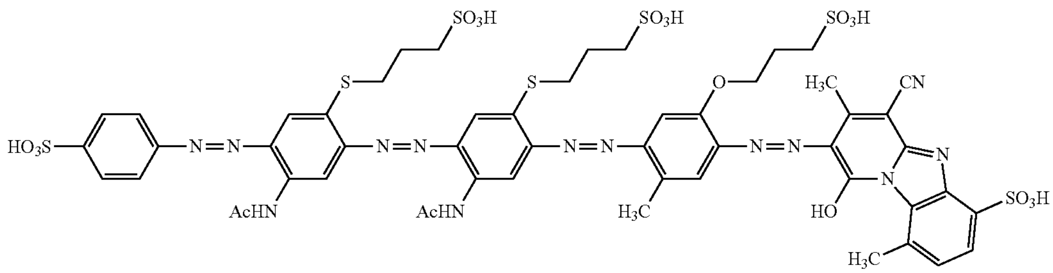 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6c(S(=O)(=O)O)ccc(C)c6n5c4O)cc3C)cc2NC(C)=O)c(SCCCS(=O)(=O)O)cc1N=Nc1ccc(S(=O)(=O)O)cc1] |
TABLE 60
| Compound No. | Structural formula |
| --- | --- |
| 131 | 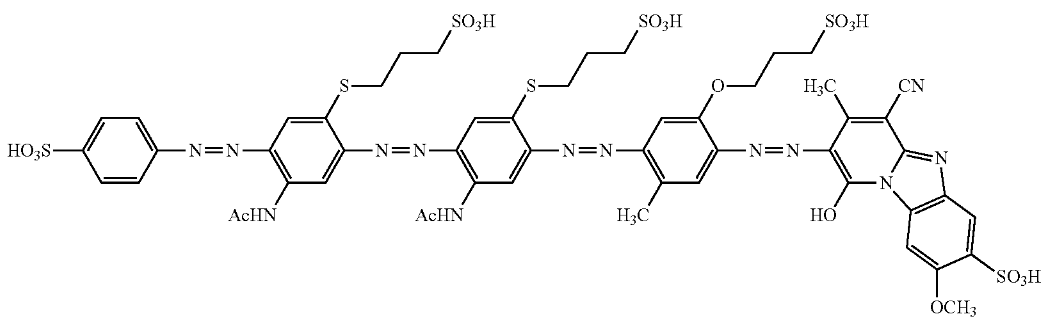 [SMILES: COc1cc2c(cc1S(=O)(=O)O)nc1c(C#N)c(C)c(N=Nc3cc(C)c(N=Nc4cc(NC(C)=O)c(N=Nc5cc(NC(C)=O)c(N=Nc6ccc(S(=O)(=O)O)cc6)cc5SCCCS(=O)(=O)O)cc4SCCCS(=O)(=O)O)cc3OCCCS(=O)(=O)O)c(O)n12] |
| 132 | 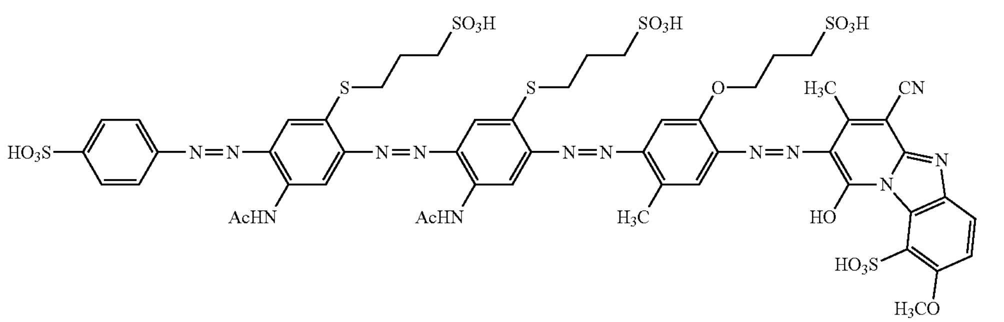 [SMILES: COc1ccc2nc3c(C#N)c(C)c(N=Nc4cc(C)c(N=Nc5cc(NC(C)=O)c(N=Nc6cc(NC(C)=O)c(N=Nc7ccc(S(=O)(=O)O)cc7)cc6SCCCS(=O)(=O)O)cc5SCCCS(=O)(=O)O)cc4OCCCS(=O)(=O)O)c(O)n3c2c1S(=O)(=O)O] |
| 133 | 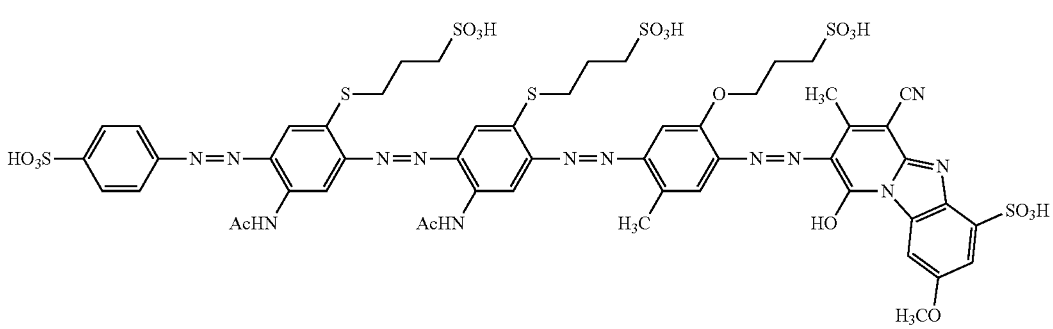 [SMILES: COc1cc(S(=O)(=O)O)c2nc3c(C#N)c(C)c(N=Nc4cc(C)c(N=Nc5cc(NC(C)=O)c(N=Nc6cc(NC(C)=O)c(N=Nc7ccc(S(=O)(=O)O)cc7)cc6SCCCS(=O)(=O)O)cc5SCCCS(=O)(=O)O)cc4OCCCS(=O)(=O)O)c(O)n3c2c1] |

TABLE 60-continued
| Compound No. | Structural formula |
| --- | --- |
| 134 | 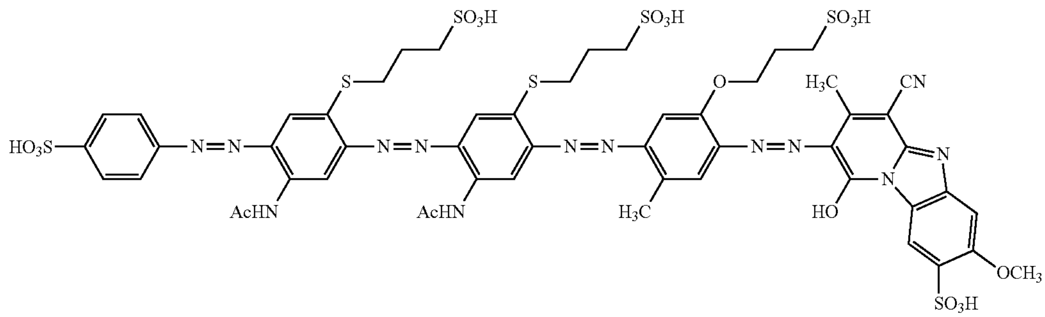 |
| 135 | 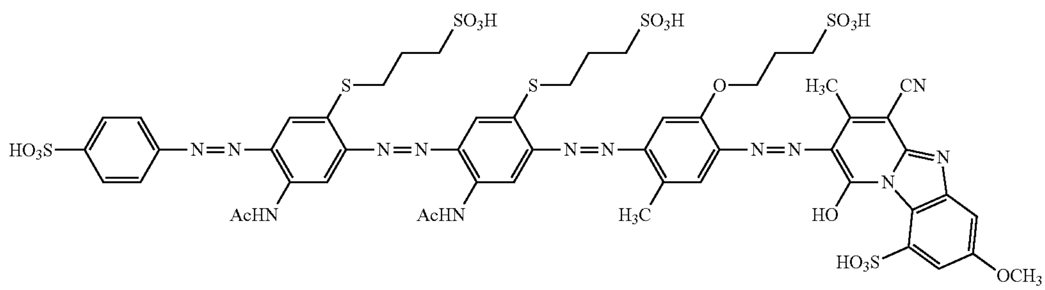 [SMILES: COc1cc(S(=O)(=O)O)c2c(c1)nc1c(C#N)c(C)c(N=Nc3cc(C)c(N=Nc4cc(NC(C)=O)c(N=Nc5cc(NC(C)=O)c(N=Nc6ccc(S(=O)(=O)O)cc6)cc5SCCCS(=O)(=O)O)cc4SCCCS(=O)(=O)O)cc3OCCCS(=O)(=O)O)c(O)n12] |
| 136 | 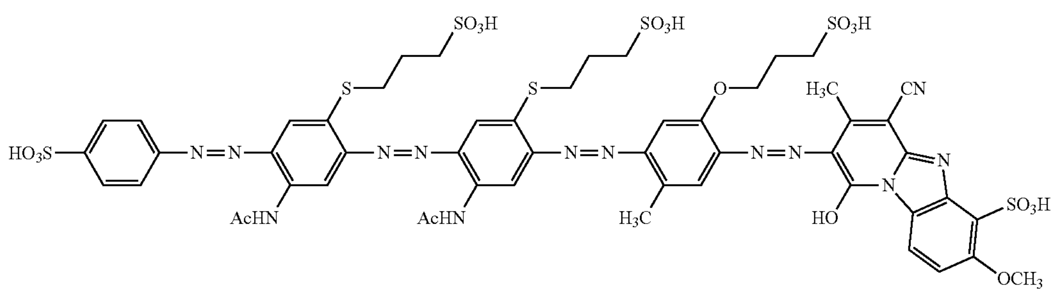 [SMILES: COc1ccc2c(nc3c(C#N)c(C)c(N=Nc4cc(C)c(N=Nc5cc(NC(C)=O)c(N=Nc6cc(NC(C)=O)c(N=Nc7ccc(S(=O)(=O)O)cc7)cc6SCCCS(=O)(=O)O)cc5SCCCS(=O)(=O)O)cc4OCCCS(=O)(=O)O)c(O)n32)c1S(=O)(=O)O] |
TABLE 61
| Compound No. | Structural formula |
| --- | --- |
| 137 | 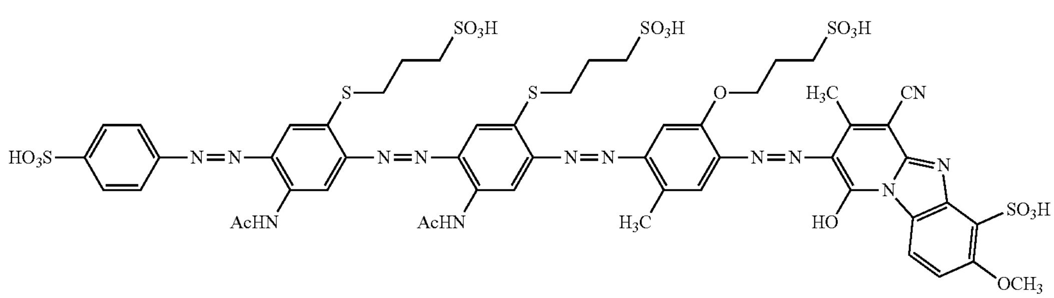 [SMILES: COc1ccc2c(nc3c(C#N)c(C)c(N=Nc4cc(C)c(N=Nc5cc(NC(C)=O)c(N=Nc6cc(NC(C)=O)c(N=Nc7ccc(S(=O)(=O)O)cc7)cc6SCCCS(=O)(=O)O)cc5SCCCS(=O)(=O)O)cc4OCCCS(=O)(=O)O)c(O)n32)c1S(=O)(=O)O] |

TABLE 61-continued
| Compound No. | Structural formula |
|---|---|
| 138 | 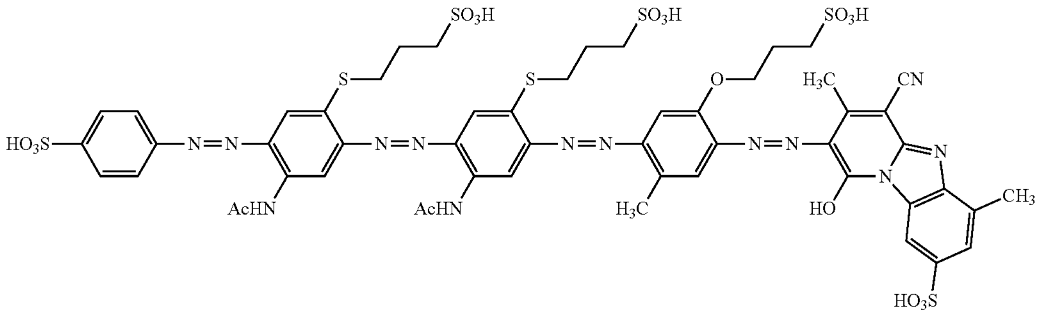 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6c(C)cc(S(=O)(=O)O)cc6n5c4O)cc3C)cc2NC(C)=O)c(SCCCS(=O)(=O)O)cc1N=Nc1ccc(S(=O)(=O)O)cc1] |
| 139 | 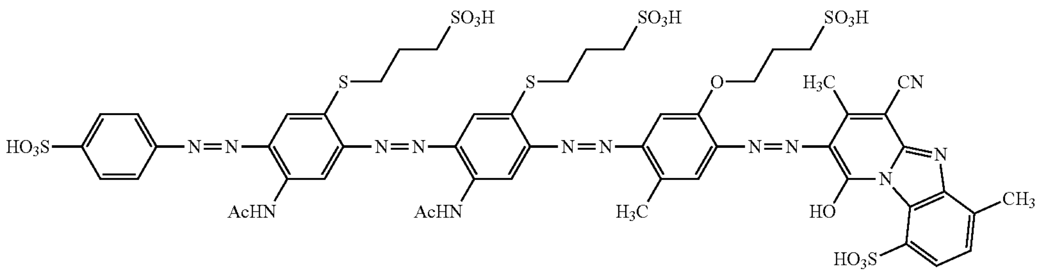 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6c(C)ccc(S(=O)(=O)O)c6n5c4O)cc3C)cc2NC(C)=O)c(SCCCS(=O)(=O)O)cc1N=Nc1ccc(S(=O)(=O)O)cc1] |
| 140 | 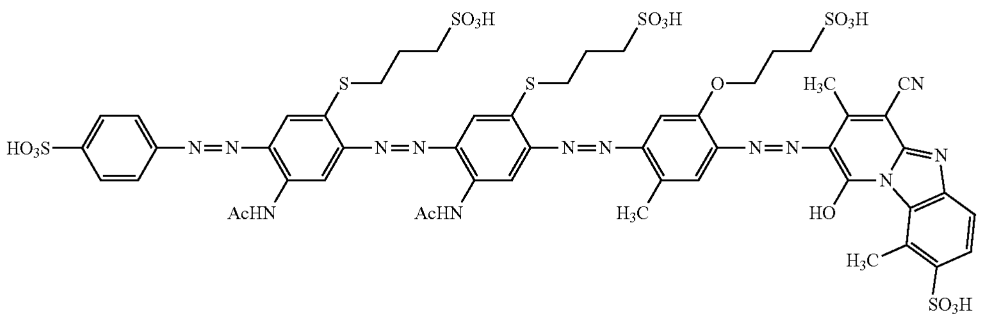 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6ccc(S(=O)(=O)O)c(C)c6n5c4O)cc3C)cc2NC(C)=O)c(SCCCS(=O)(=O)O)cc1N=Nc1ccc(S(=O)(=O)O)cc1] |
| 141 | 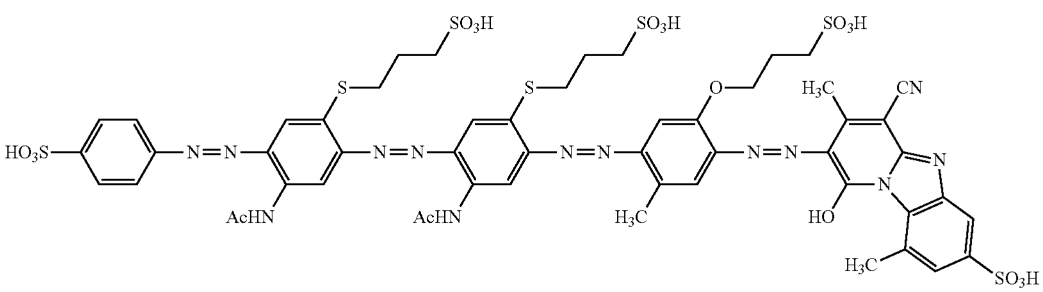 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6cc(S(=O)(=O)O)cc(C)c6n5c4O)cc3C)cc2NC(C)=O)c(SCCCS(=O)(=O)O)cc1N=Nc1ccc(S(=O)(=O)O)cc1] |
| 142 | 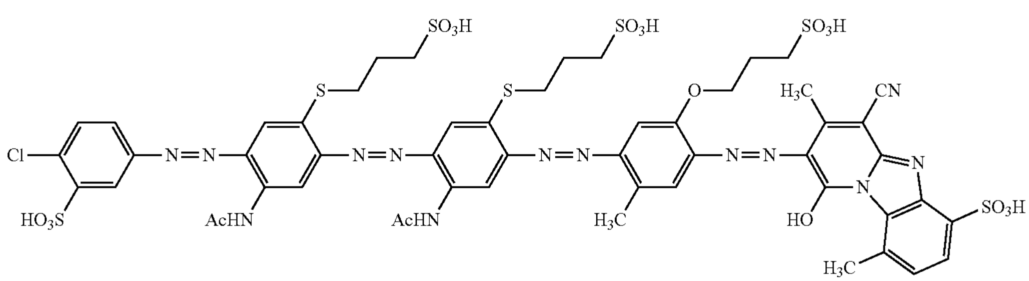 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6c(S(=O)(=O)O)ccc(C)c6n5c4O)cc3C)cc2NC(C)=O)c(SCCCS(=O)(=O)O)cc1N=Nc1ccc(Cl)c(S(=O)(=O)O)c1] |

TABLE 62
| Compound No. | Structural formula |
|---|---|
| I43 | 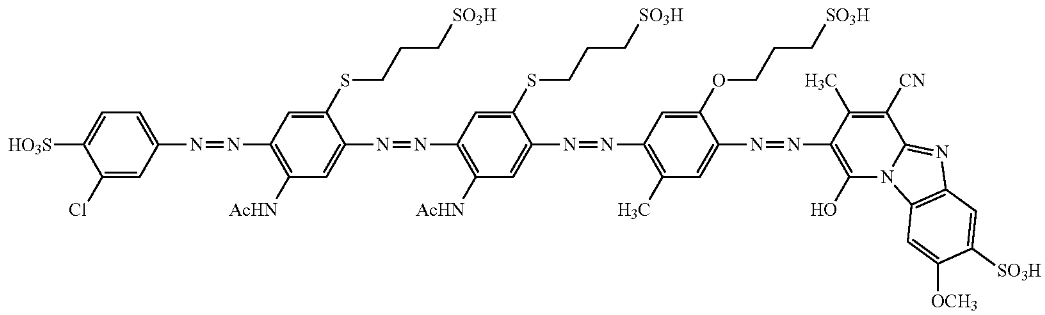 [SMILES: COc1cc2c(cc1S(=O)(=O)O)nc1c(C#N)c(C)c(N=Nc3cc(C)c(N=Nc4cc(NC(C)=O)c(N=Nc5cc(NC(C)=O)c(N=Nc6ccc(S(=O)(=O)O)c(Cl)c6)cc5SCCCS(=O)(=O)O)cc4SCCCS(=O)(=O)O)cc3OCCCS(=O)(=O)O)c(O)n12] |
| I44 | 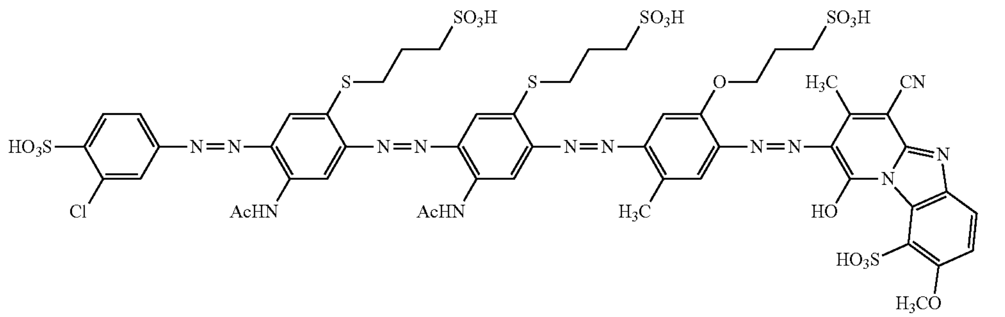 |
| I45 | 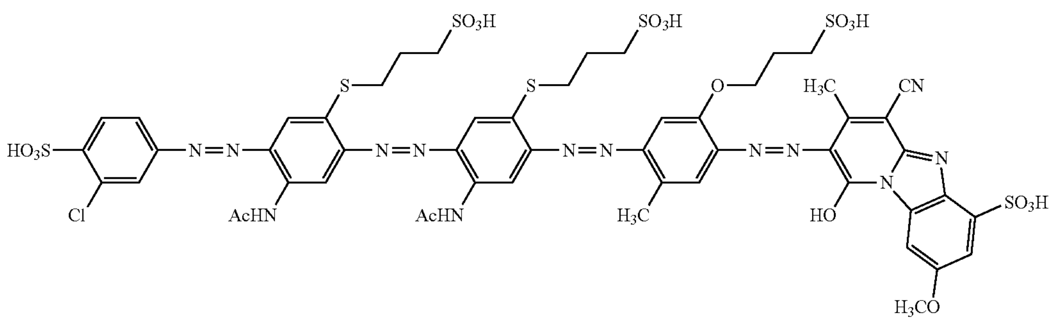 |
| I46 | 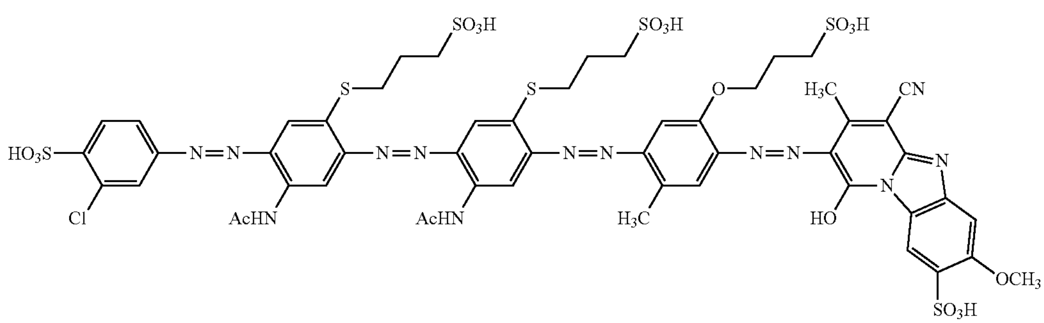 |
| I47 | 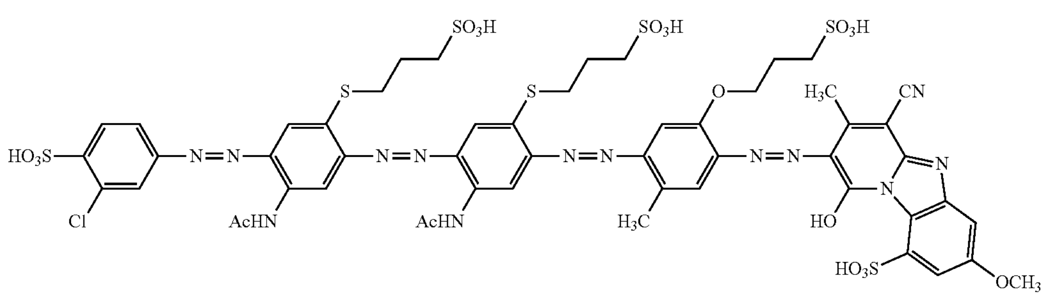 |

TABLE 62-continued
| Compound No. | Structural formula |
|---|---|
| 148 | 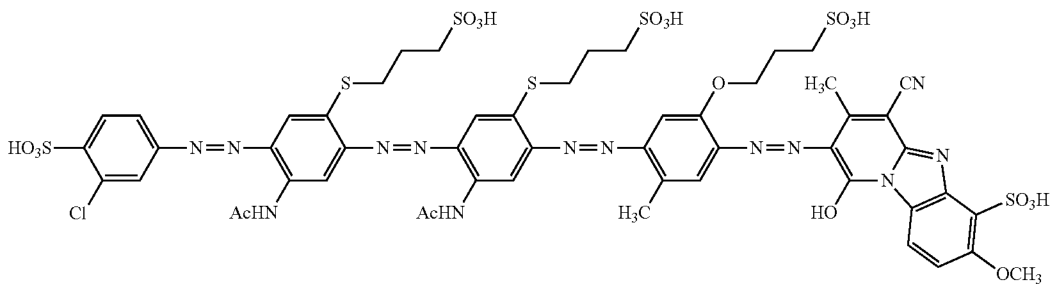 [SMILES: COc1ccc2c(nc3c(C#N)c(C)c(N=Nc4cc(C)c(N=Nc5cc(NC(C)=O)c(N=Nc6cc(NC(C)=O)c(N=Nc7ccc(S(=O)(=O)O)c(Cl)c7)cc6SCCCS(=O)(=O)O)cc5SCCCS(=O)(=O)O)cc4OCCCS(=O)(=O)O)c(O)n32)c1S(=O)(=O)O] |
TABLE 63
| Compound No. | Structural formula |
|---|---|
| 149 | 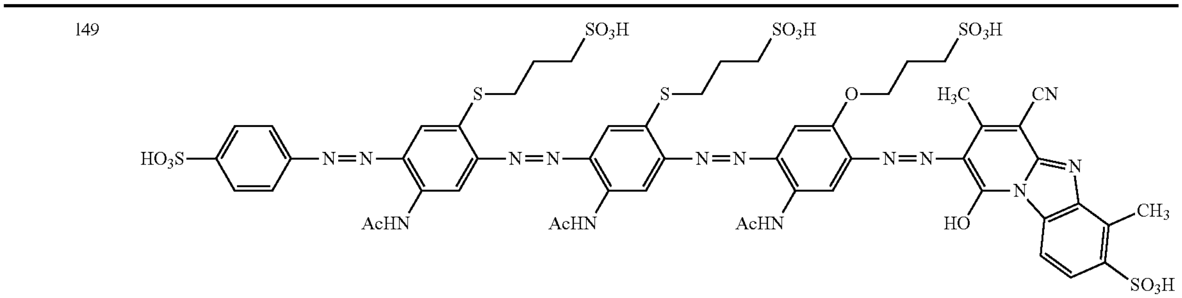 |
| 150 | 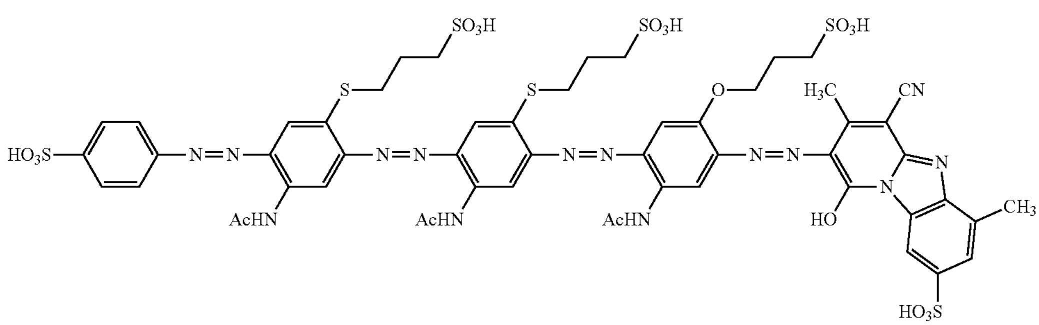 |
| 151 | 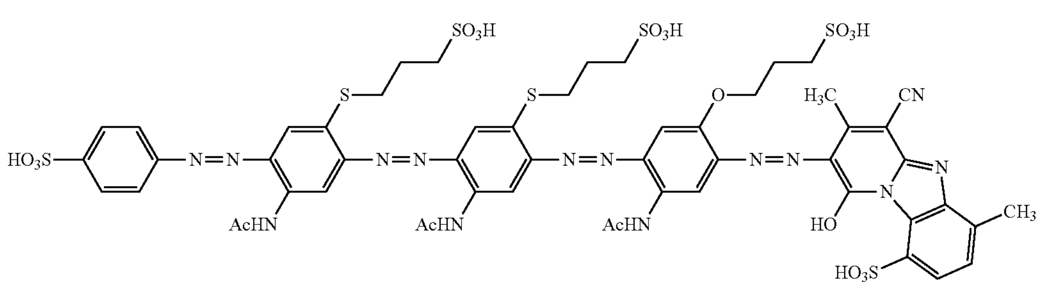 |

TABLE 63-continued
| Compound No. | Structural formula |
|---|---|
| 152 | 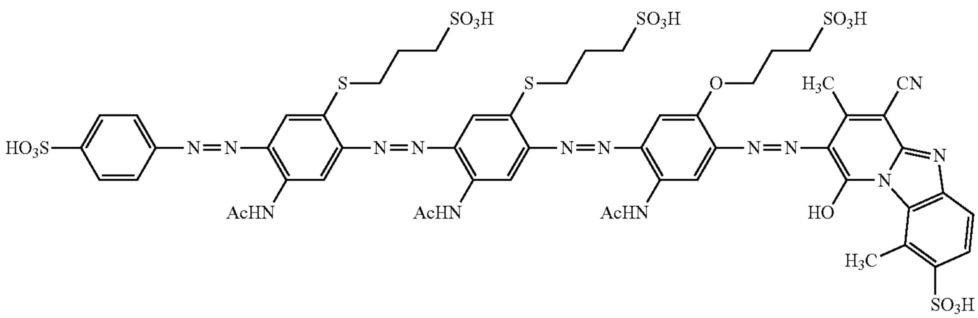 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6ccc(S(=O)(=O)O)c(C)c6n5c4O)cc3NC(C)=O)cc2NC(C)=O)c(SCCCS(=O)(=O)O)cc1N=Nc1ccc(S(=O)(=O)O)cc1] |
| 153 | 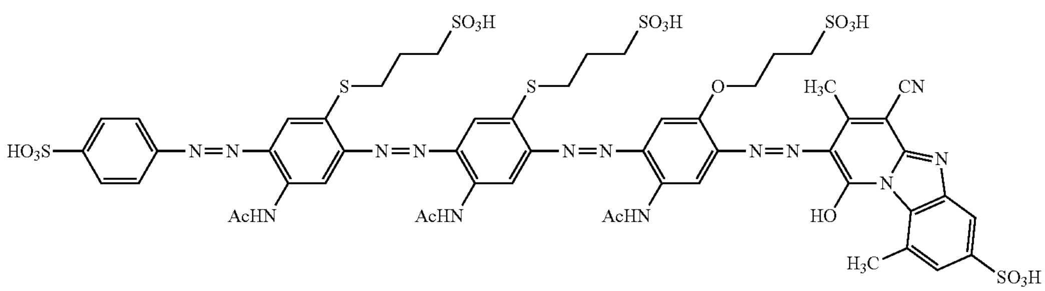 |
| 154 | 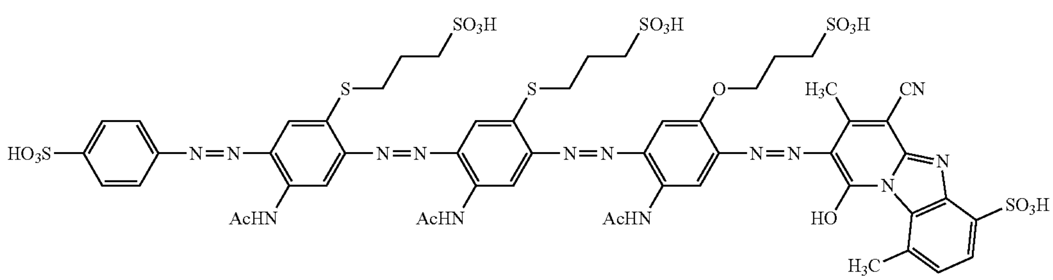 |
TABLE 64
| Compound No. | Structural formula |
|---|---|
| 155 | 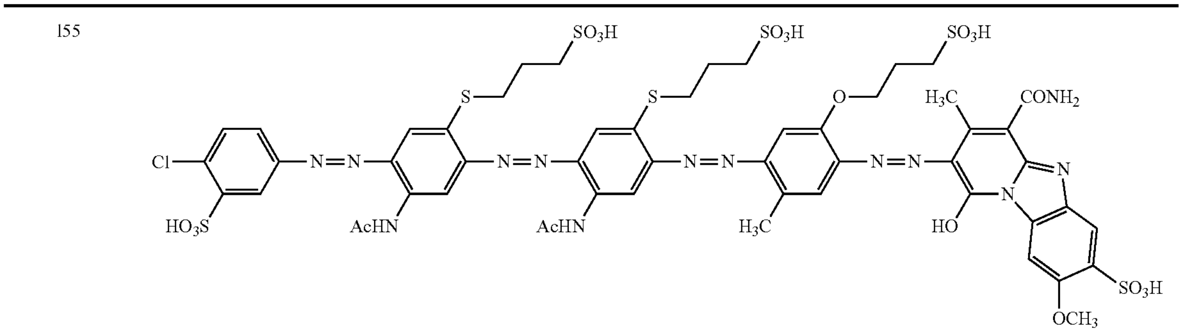 |

TABLE 64-continued
| Compound No. | Structural formula |
| --- | --- |
| I56 | 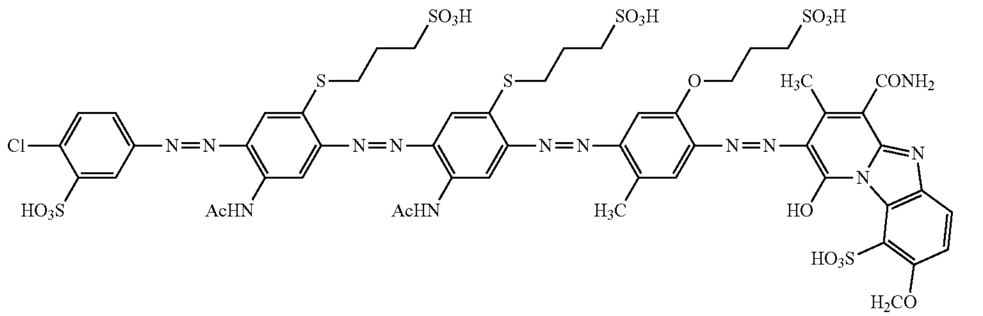 |
| I57 | 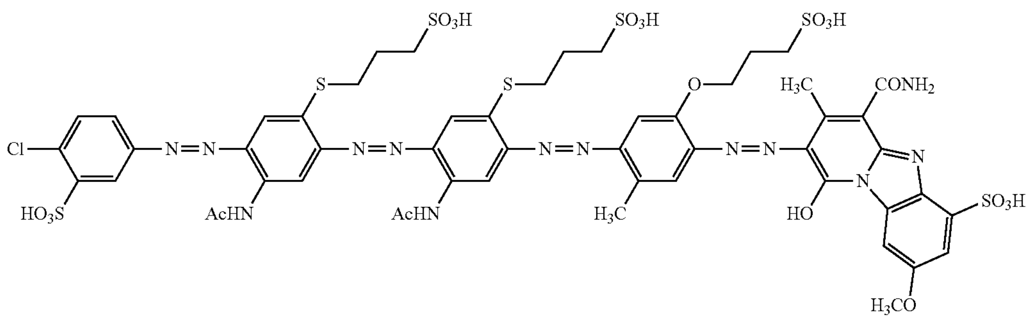 [SMILES: COc1cc(S(=O)(=O)O)c2nc3c(C(N)=O)c(C)c(N=Nc4cc(C)c(N=Nc5cc(NC(C)=O)c(N=Nc6cc(NC(C)=O)c(N=Nc7ccc(Cl)c(S(=O)(=O)O)c7)cc6SCCCS(=O)(=O)O)cc5SCCCS(=O)(=O)O)cc4OCCCS(=O)(=O)O)c(O)n3c2c1] |
| I58 | 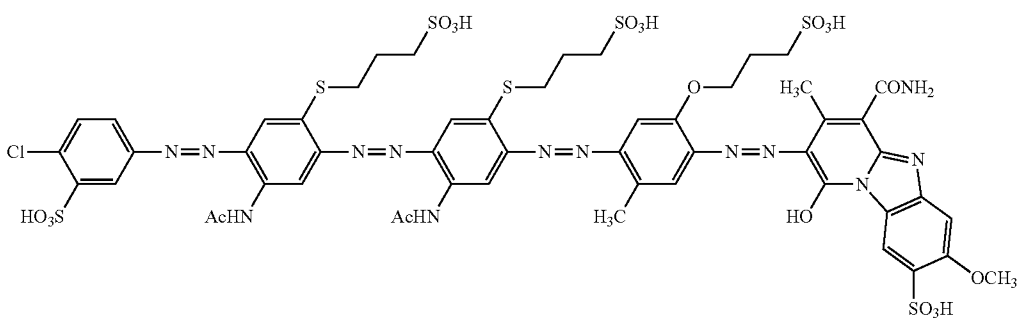 [SMILES: COc1cc2nc3c(C(N)=O)c(C)c(N=Nc4cc(C)c(N=Nc5cc(NC(C)=O)c(N=Nc6cc(NC(C)=O)c(N=Nc7ccc(Cl)c(S(=O)(=O)O)c7)cc6SCCCS(=O)(=O)O)cc5SCCCS(=O)(=O)O)cc4OCCCS(=O)(=O)O)c(O)n3c2cc1S(=O)(=O)O] |
| I59 | 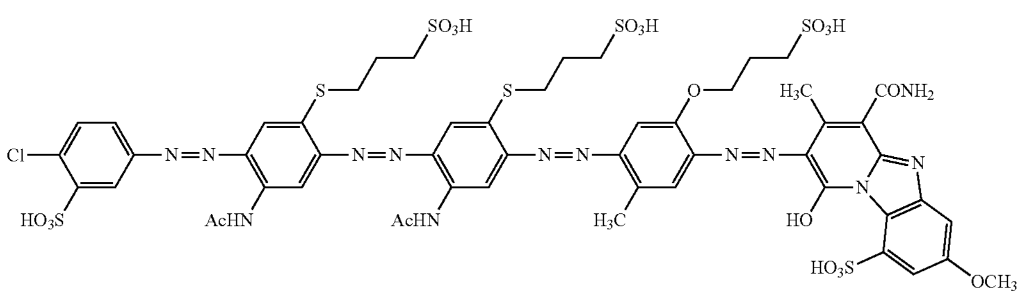 [SMILES: COc1cc(S(=O)(=O)O)c2c(c1)nc1c(C(N)=O)c(C)c(N=Nc3cc(C)c(N=Nc4cc(NC(C)=O)c(N=Nc5cc(NC(C)=O)c(N=Nc6ccc(Cl)c(S(=O)(=O)O)c6)cc5SCCCS(=O)(=O)O)cc4SCCCS(=O)(=O)O)cc3OCCCS(=O)(=O)O)c(O)n12] |
| I60 | 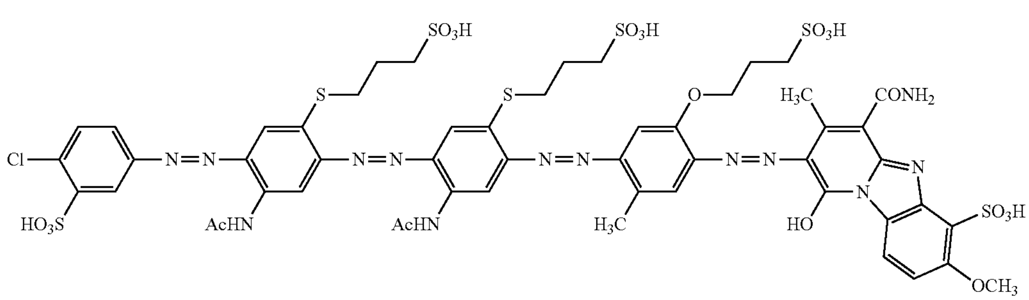 [SMILES: COc1ccc2c(nc3c(C(N)=O)c(C)c(N=Nc4cc(C)c(N=Nc5cc(NC(C)=O)c(N=Nc6cc(NC(C)=O)c(N=Nc7ccc(Cl)c(S(=O)(=O)O)c7)cc6SCCCS(=O)(=O)O)cc5SCCCS(=O)(=O)O)cc4OCCCS(=O)(=O)O)c(O)n32)c1S(=O)(=O)O] |

TABLE 65
| Compound No. | Structural formula |
| --- | --- |
| 161 | 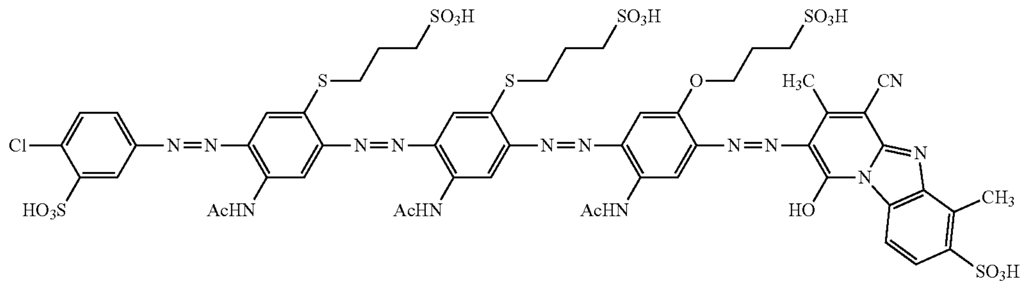 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6c(C)c(S(=O)(=O)O)ccc6n5c4O)cc3NC(C)=O)cc2NC(C)=O)c(SCCCS(=O)(=O)O)cc1N=Nc1ccc(Cl)c(S(=O)(=O)O)c1] |
| 162 | 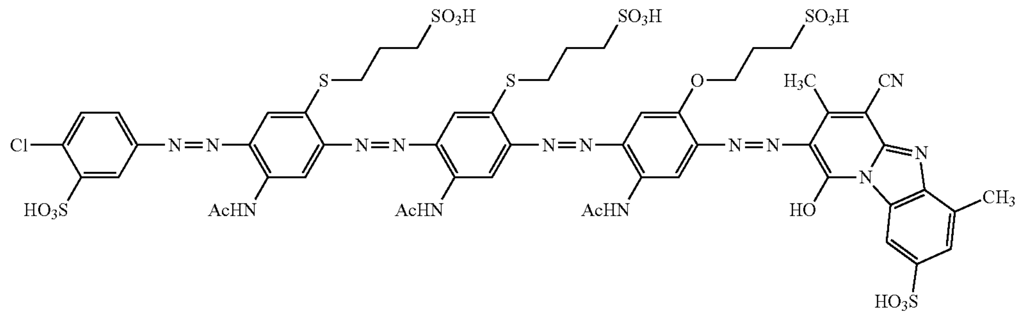 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6c(C)cc(S(=O)(=O)O)cc6n5c4O)cc3NC(C)=O)cc2NC(C)=O)c(SCCCS(=O)(=O)O)cc1N=Nc1ccc(Cl)c(S(=O)(=O)O)c1] |
| 163 | 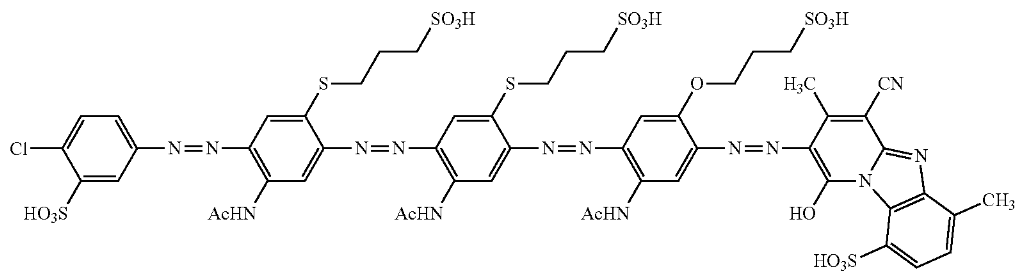 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6c(C)ccc(S(=O)(=O)O)c6n5c4O)cc3NC(C)=O)cc2NC(C)=O)c(SCCCS(=O)(=O)O)cc1N=Nc1ccc(Cl)c(S(=O)(=O)O)c1] |
| 164 | 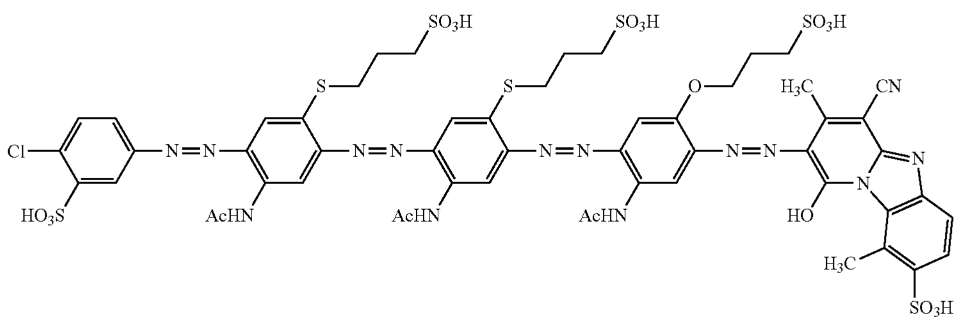 |
| 165 | 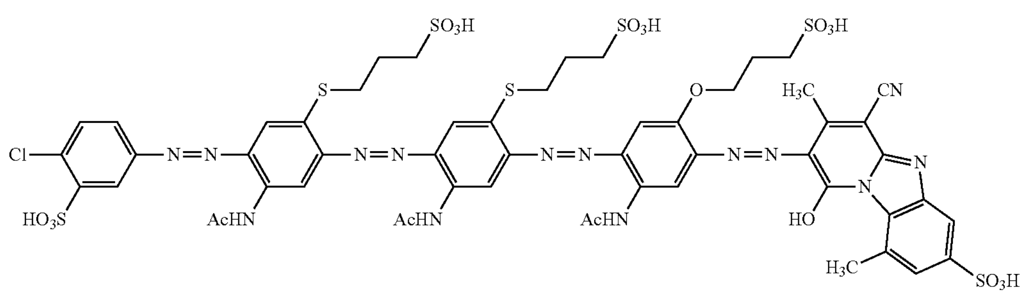 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6cc(S(=O)(=O)O)cc(C)c6n5c4O)cc3NC(C)=O)cc2NC(C)=O)c(SCCCS(=O)(=O)O)cc1N=Nc1ccc(Cl)c(S(=O)(=O)O)c1] |

TABLE 65-continued
| Compound No. | Structural formula |
| --- | --- |
| I66 | 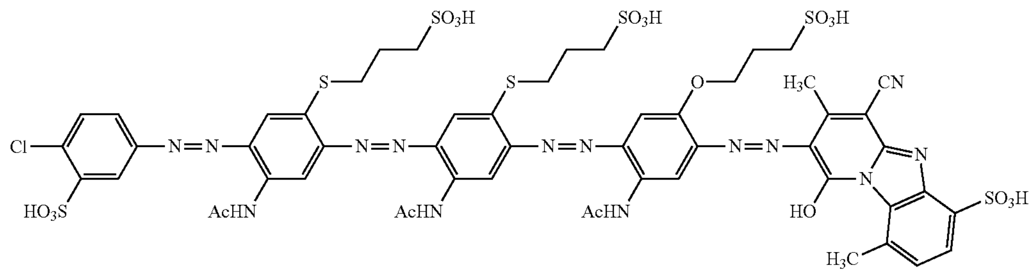 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6c(S(=O)(=O)O)ccc(C)c6n5c4O)cc3NC(C)=O)cc2NC(C)=O)c(SCCCS(=O)(=O)O)cc1N=Nc1ccc(Cl)c(S(=O)(=O)O)c1] |
TABLE 66
| Compound No. | Structural formula |
| --- | --- |
| I67 | 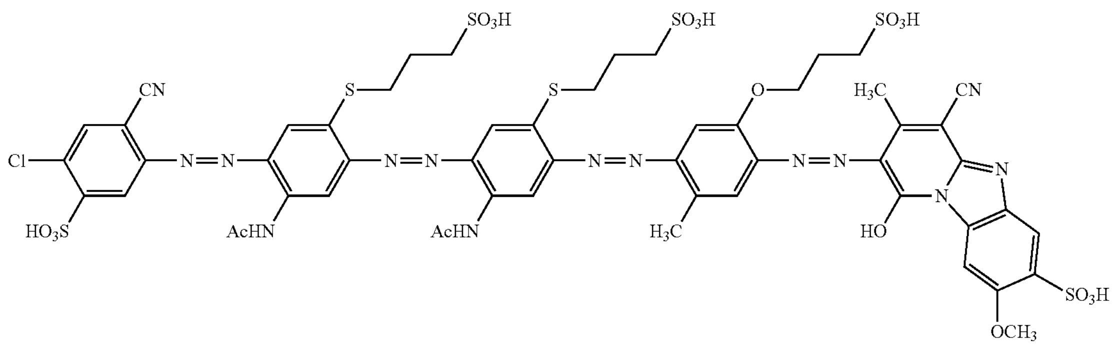 |
| I68 | 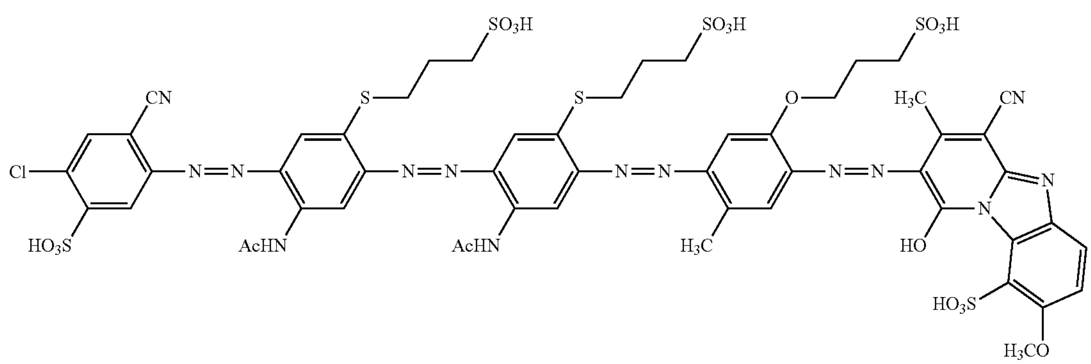 [SMILES: COc1ccc2nc3c(C#N)c(C)c(N=Nc4cc(C)c(N=Nc5cc(NC(C)=O)c(N=Nc6cc(NC(C)=O)c(N=Nc7cc(S(=O)(=O)O)c(Cl)cc7C#N)cc6SCCCS(=O)(=O)O)cc5SCCCS(=O)(=O)O)cc4OCCCS(=O)(=O)O)c(O)n3c2c1S(=O)(=O)O] |
| I69 | 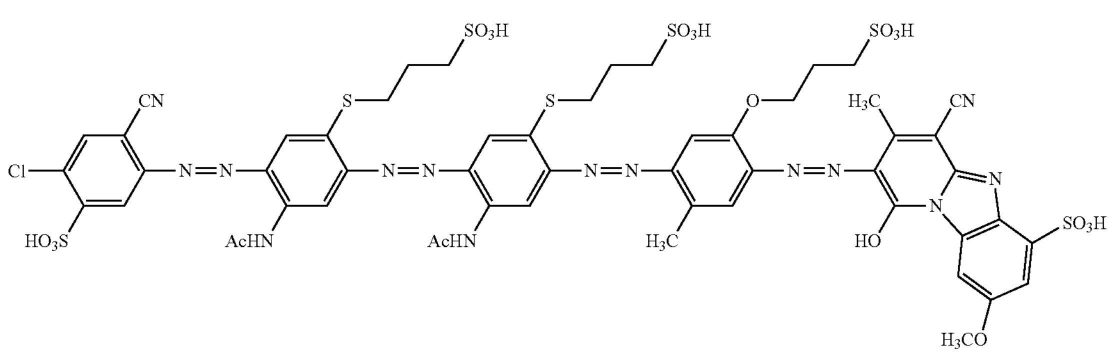 [SMILES: COc1cc(S(=O)(=O)O)c2nc3c(C#N)c(C)c(N=Nc4cc(C)c(N=Nc5cc(NC(C)=O)c(N=Nc6cc(NC(C)=O)c(N=Nc7cc(S(=O)(=O)O)c(Cl)cc7C#N)cc6SCCCS(=O)(=O)O)cc5SCCCS(=O)(=O)O)cc4OCCCS(=O)(=O)O)c(O)n3c2c1] |

TABLE 66-continued
| Compound No. | Structural formula |
| --- | --- |
| 170 | 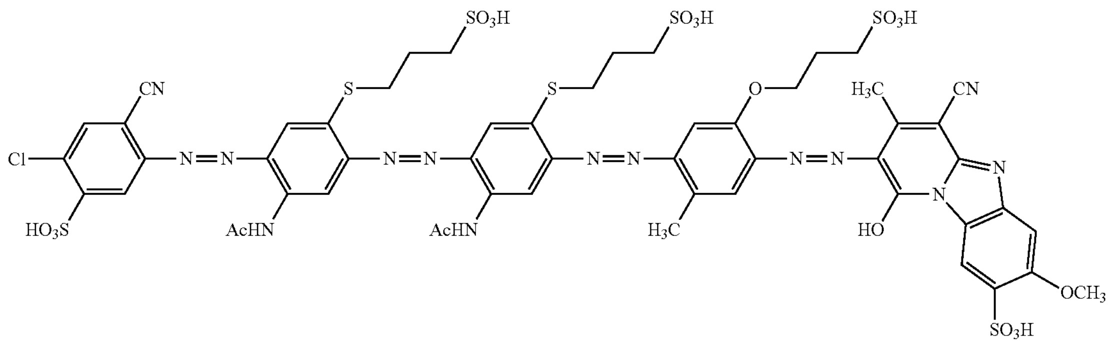 [SMILES: COc1cc2nc3c(C#N)c(C)c(N=Nc4cc(C)c(N=Nc5cc(NC(C)=O)c(N=Nc6cc(NC(C)=O)c(N=Nc7cc(S(=O)(=O)O)c(Cl)cc7C#N)cc6SCCCS(=O)(=O)O)cc5SCCCS(=O)(=O)O)cc4OCCCS(=O)(=O)O)c(O)n3c2cc1S(=O)(=O)O] |
| 171 | 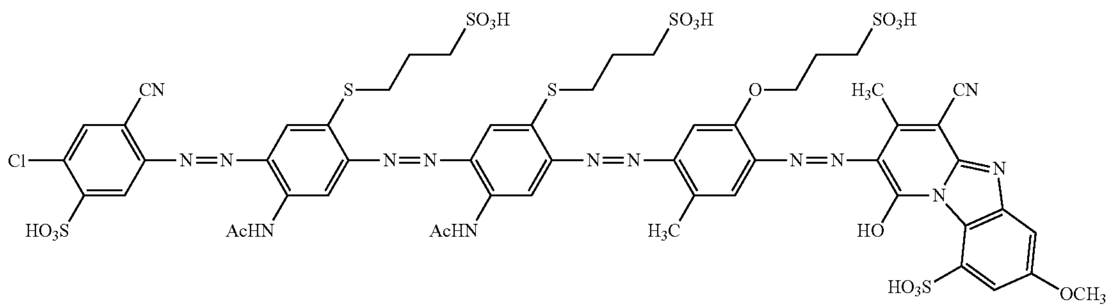 [SMILES: COc1cc(S(=O)(=O)O)c2c(c1)nc1c(C#N)c(C)c(N=Nc3cc(C)c(N=Nc4cc(NC(C)=O)c(N=Nc5cc(NC(C)=O)c(N=Nc6cc(S(=O)(=O)O)c(Cl)cc6C#N)cc5SCCCS(=O)(=O)O)cc4SCCCS(=O)(=O)O)cc3OCCCS(=O)(=O)O)c(O)n12] |
| 172 | 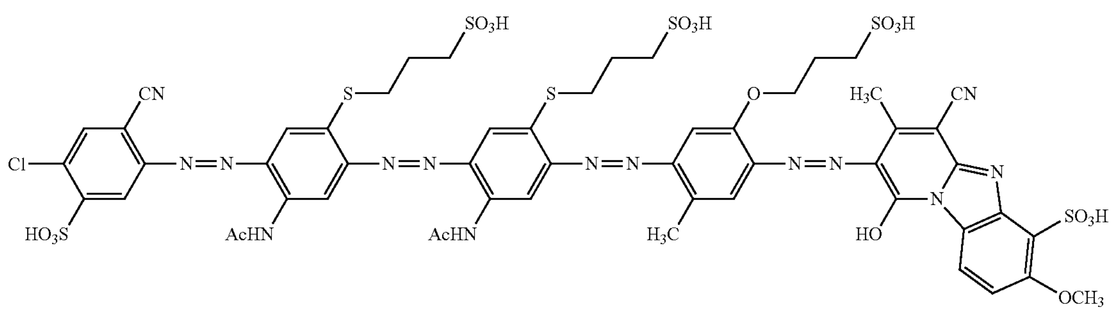 [SMILES: COc1ccc2c(nc3c(C#N)c(C)c(N=Nc4cc(C)c(N=Nc5cc(NC(C)=O)c(N=Nc6cc(NC(C)=O)c(N=Nc7cc(S(=O)(=O)O)c(Cl)cc7C#N)cc6SCCCS(=O)(=O)O)cc5SCCCS(=O)(=O)O)cc4OCCCS(=O)(=O)O)c(O)n32)c1S(=O)(=O)O] |
TABLE 67
| Compound No. | Structural formula |
| --- | --- |
| 173 | 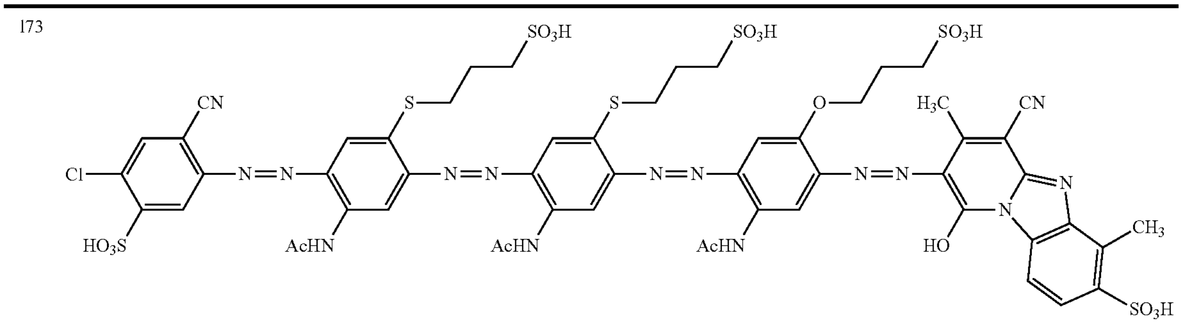 |

TABLE 67-continued
| Compound No. | Structural formula |
|---|---|
| I74 | 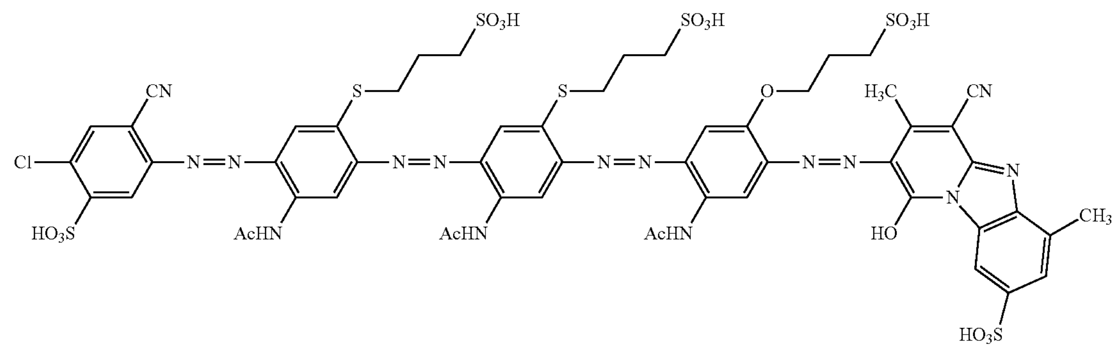 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6c(C)cc(S(=O)(=O)O)cc6n5c4O)cc3NC(C)=O)cc2NC(C)=O)c(SCCCS(=O)(=O)O)cc1N=Nc1cc(S(=O)(=O)O)c(Cl)cc1C#N] |
| I75 | 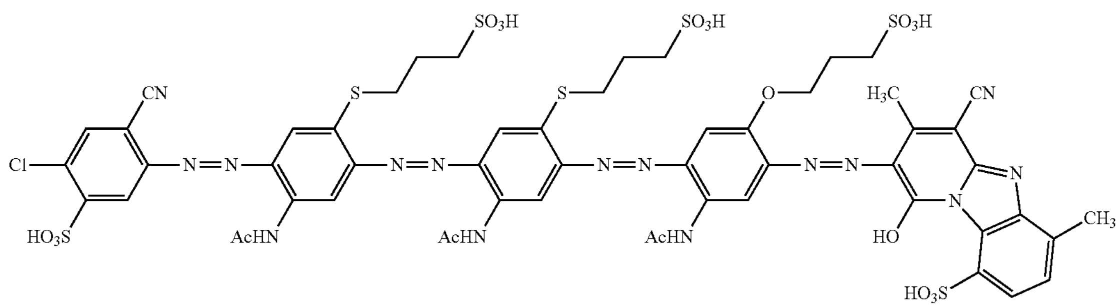 |
| I76 | 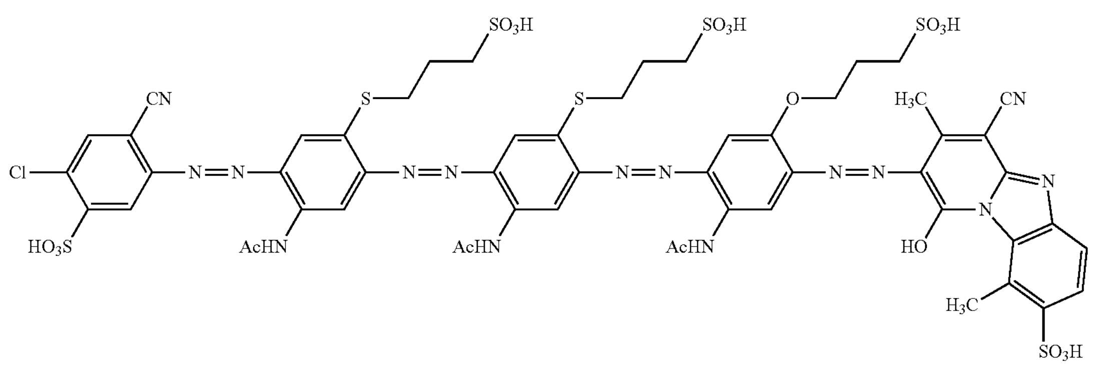 |
| I77 | 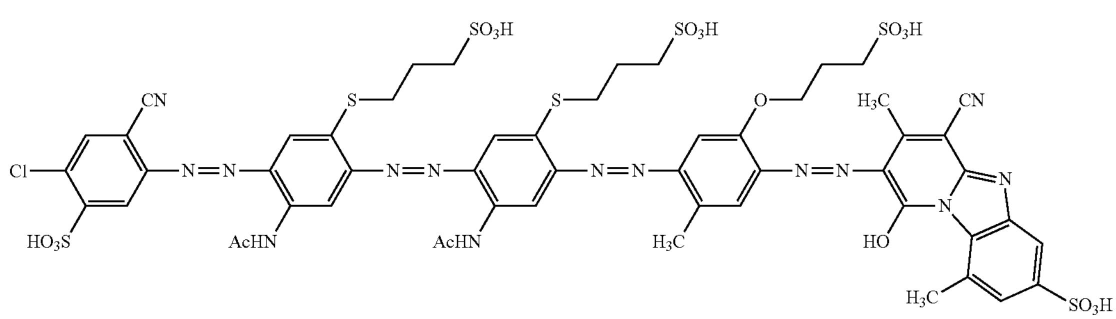 |

TABLE 67-continued
| Compound No. | Structural formula |
| --- | --- |
| 178 | 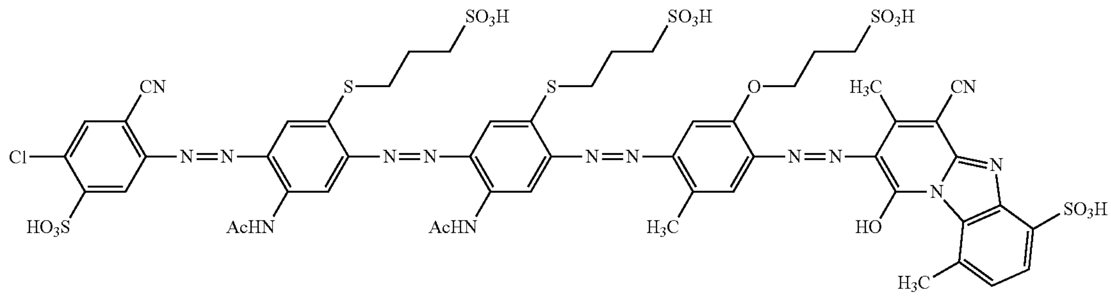 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6c(S(=O)(=O)O)ccc(C)c6n5c4O)cc3C)cc2NC(C)=O)c(SCCCS(=O)(=O)O)cc1N=Nc1cc(S(=O)(=O)O)c(Cl)cc1C#N] |
TABLE 68
| Compound No. | Structural formula |
| --- | --- |
| 179 | 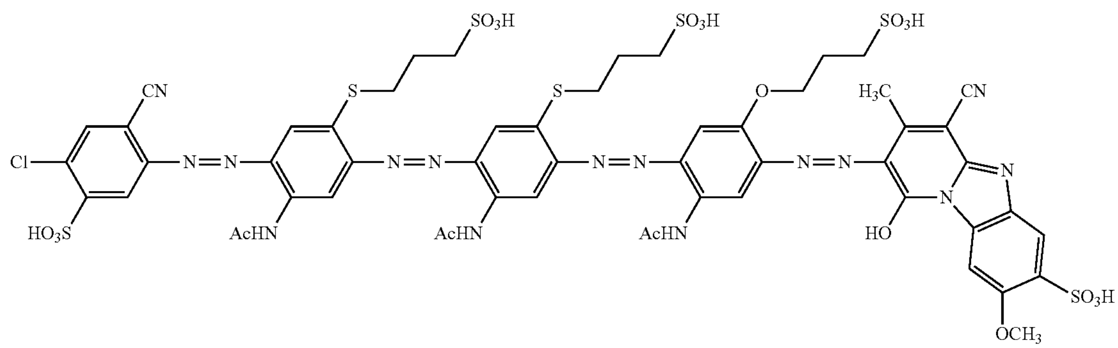 |
| 180 | 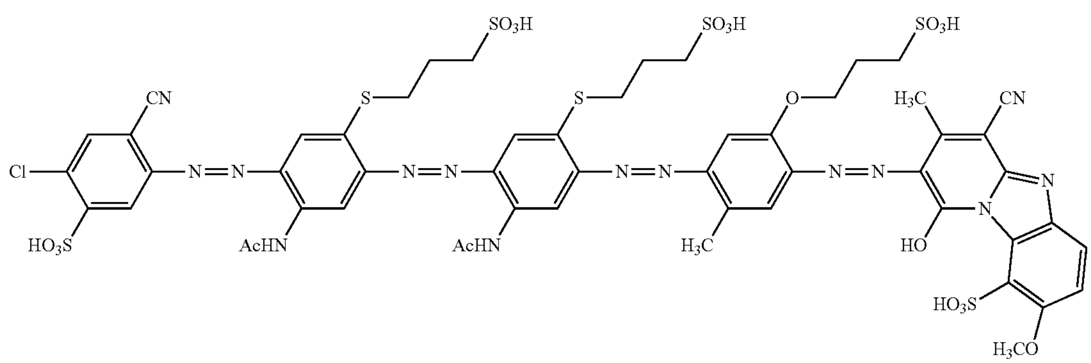 [SMILES: COc1ccc2nc3c(C#N)c(C)c(N=Nc4cc(C)c(N=Nc5cc(NC(C)=O)c(N=Nc6cc(NC(C)=O)c(N=Nc7cc(S(=O)(=O)O)c(Cl)cc7C#N)cc6SCCCS(=O)(=O)O)cc5SCCCS(=O)(=O)O)cc4OCCCS(=O)(=O)O)c(O)n3c2c1S(=O)(=O)O] |
| 181 | 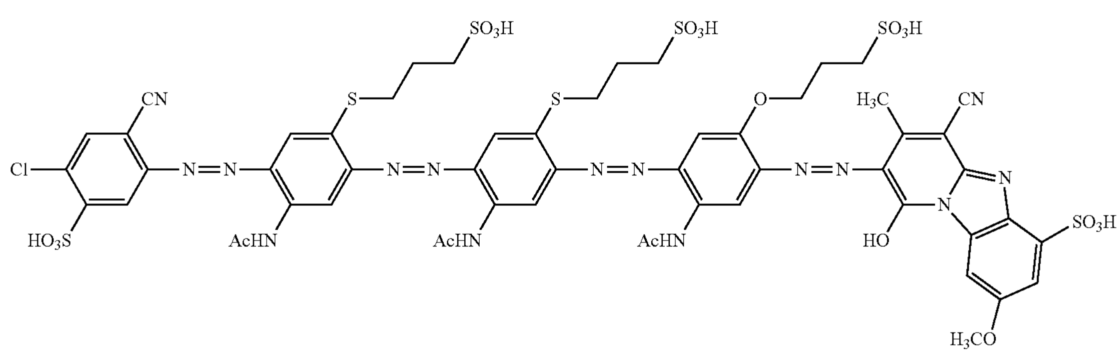 |

TABLE 68-continued
| Compound No. | Structural formula |
|---|---|
| 182 | 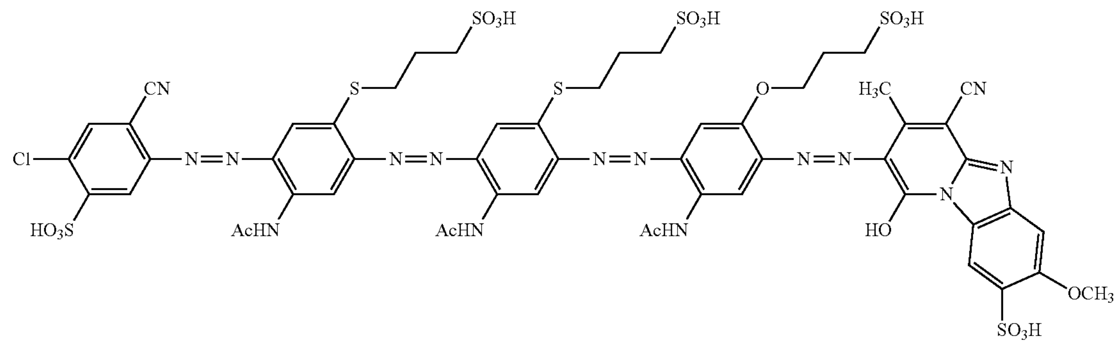 |
| 183 | 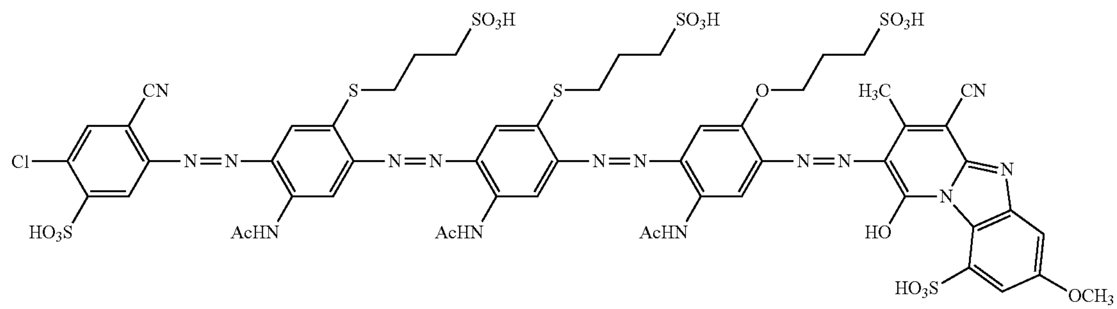 |
| 184 | 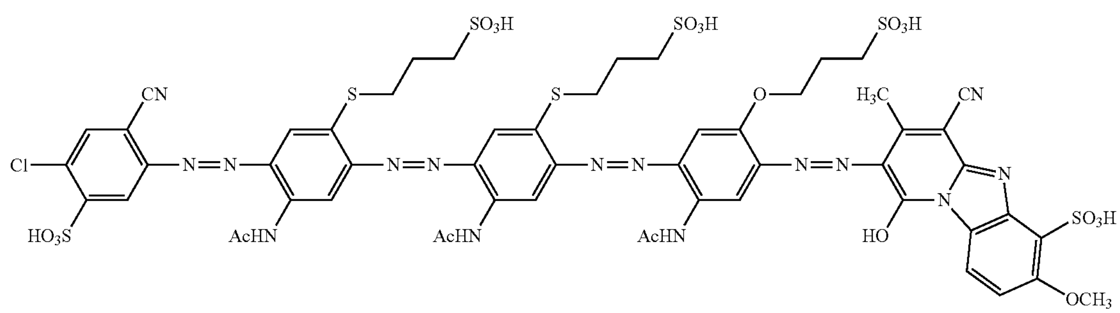 |
TABLE 69
| Compound No. | Structural formula |
|---|---|
| 185 | 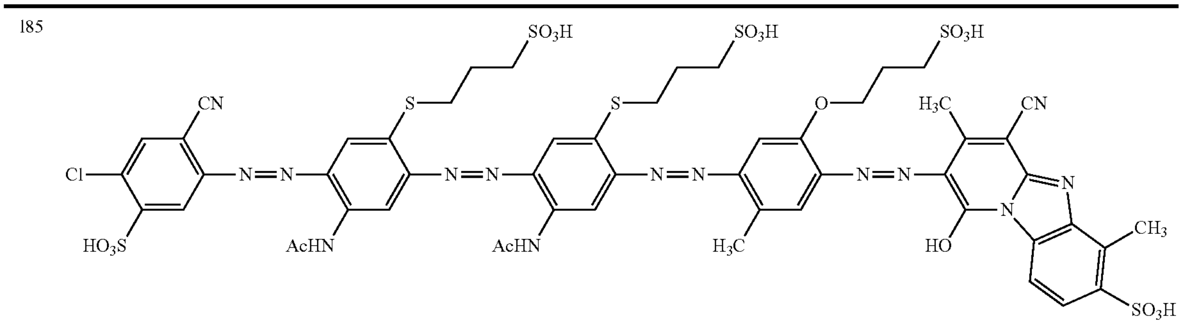 |

TABLE 69-continued
| Compound No. | Structural formula |
|---|---|
| I86 | 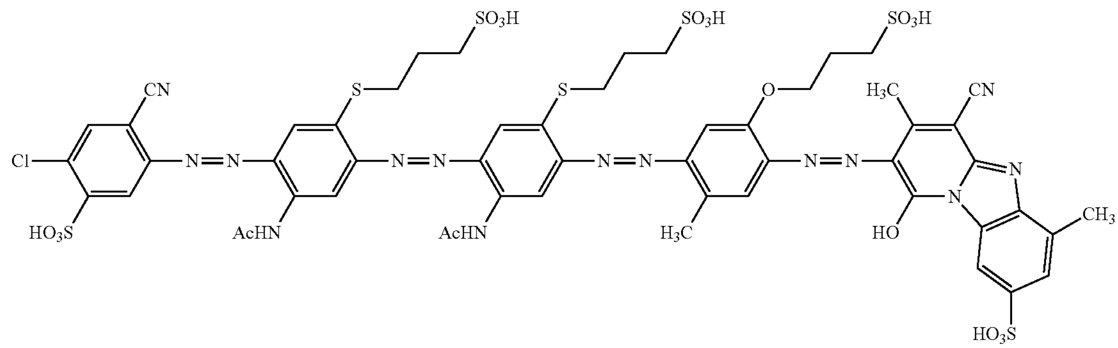 |
| I87 | 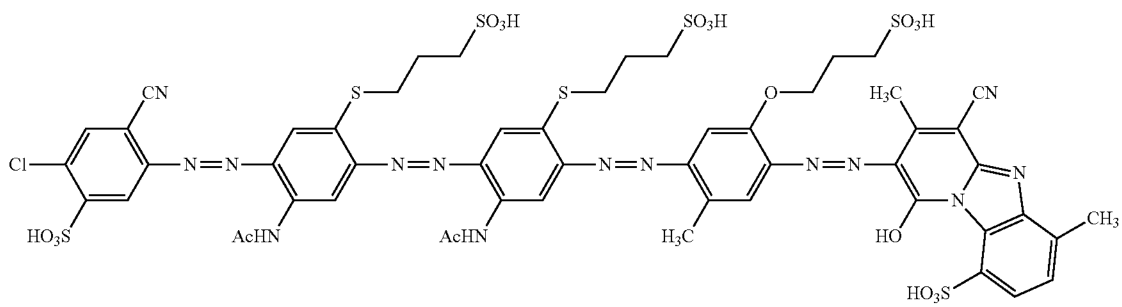 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6c(C)ccc(S(=O)(=O)O)c6n5c4O)cc3C)cc2NC(C)=O)c(SCCCS(=O)(=O)O)cc1N=Nc1cc(S(=O)(=O)O)c(Cl)cc1C#N] |
| I88 | 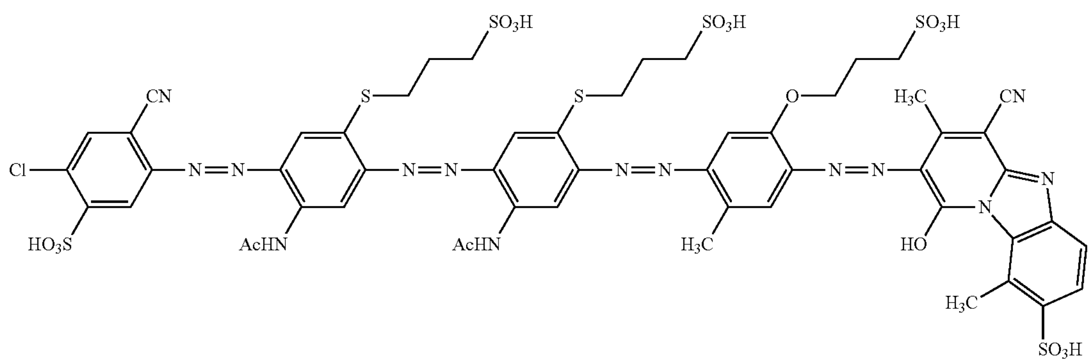 |
| I89 | 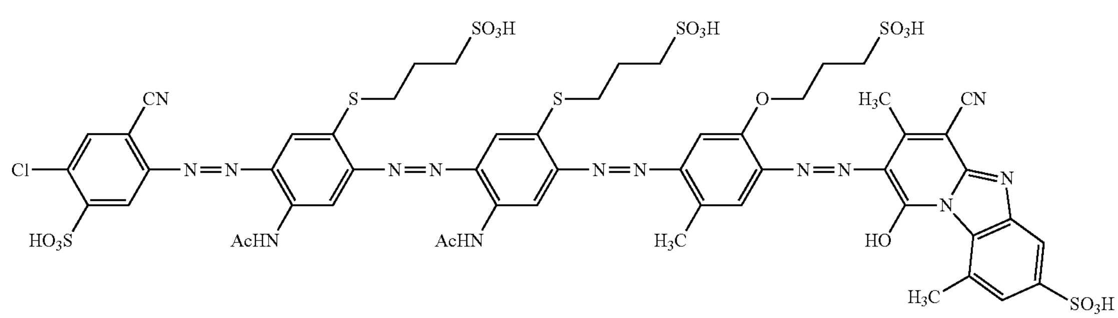 |

TABLE 69-continued
| Compound No. | Structural formula |
|---|---|
| I90 | 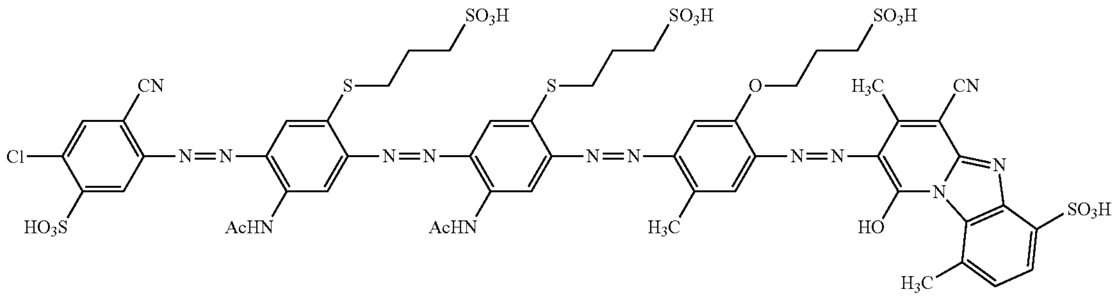 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6c(S(=O)(=O)O)ccc(C)c6n5c4O)cc3C)cc2NC(C)=O)c(SCCCS(=O)(=O)O)cc1N=Nc1cc(S(=O)(=O)O)c(Cl)cc1C#N] |
TABLE 70
| Compound No. | Structural formula |
|---|---|
| I91 | 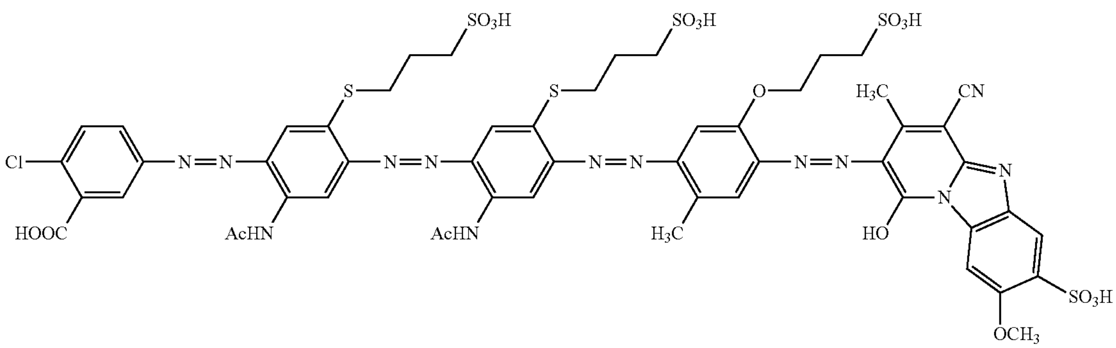 |
| I92 | 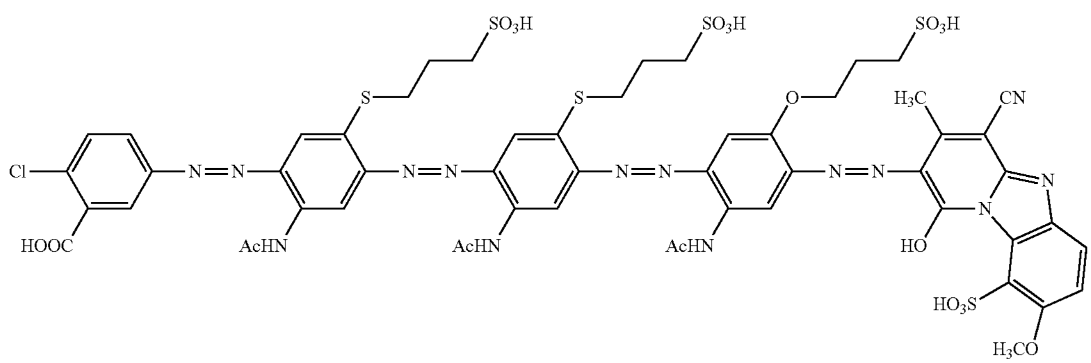 [SMILES: COc1ccc2nc3c(C#N)c(C)c(N=Nc4cc(NC(C)=O)c(N=Nc5cc(NC(C)=O)c(N=Nc6cc(NC(C)=O)c(N=Nc7ccc(Cl)c(C(=O)O)c7)cc6SCCCS(=O)(=O)O)cc5SCCCS(=O)(=O)O)cc4OCCCS(=O)(=O)O)c(O)n3c2c1S(=O)(=O)O] |
| I93 | 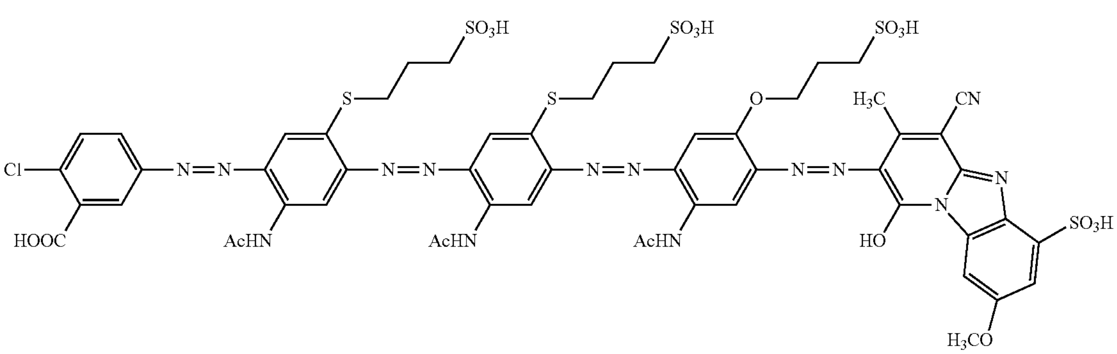 [SMILES: COc1cc(S(=O)(=O)O)c2nc3c(C#N)c(C)c(N=Nc4cc(NC(C)=O)c(N=Nc5cc(NC(C)=O)c(N=Nc6cc(NC(C)=O)c(N=Nc7ccc(Cl)c(C(=O)O)c7)cc6SCCCS(=O)(=O)O)cc5SCCCS(=O)(=O)O)cc4OCCCS(=O)(=O)O)c(O)n3c2c1] |

TABLE 70-continued

| Compound No. | Structural formula |
| --- | --- |
| 194 | 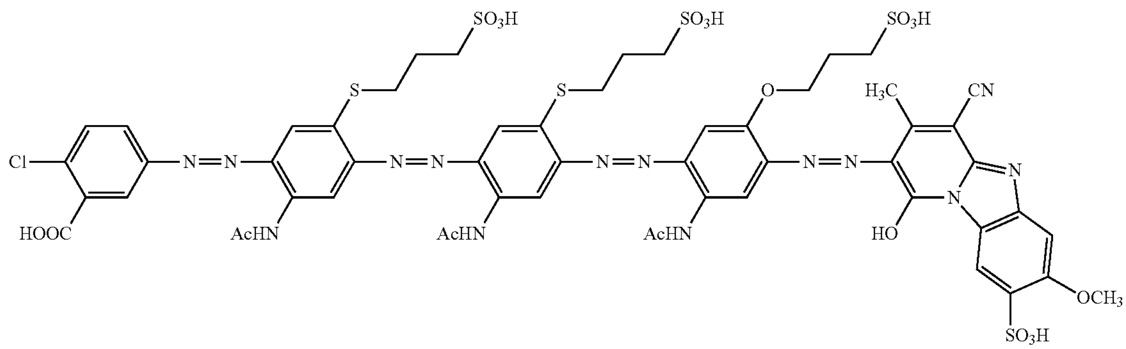 |
| 195 | 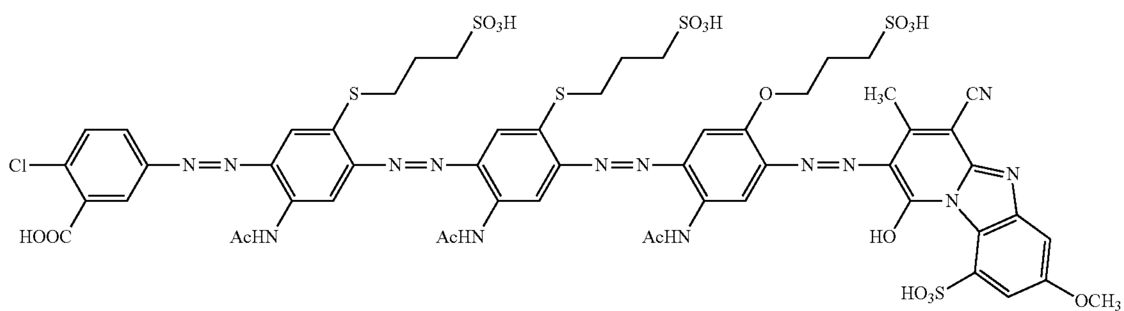 |
| 196 | 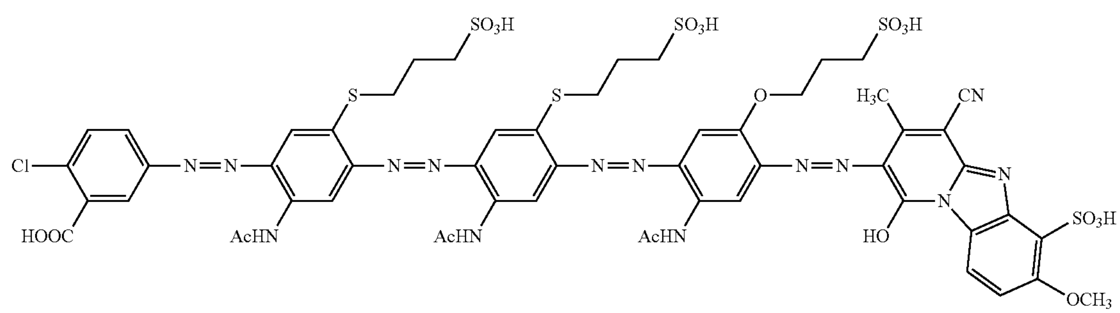 |

[Component (B-m)]

A component (B-m), when added, can enhance the color gamut and significantly improve color development properties, ozone-gas resistance, and light resistance, compared to a conventional ink composition. The compound can be obtained, for example, by a method described in International Publication No. WO 2008/111635.

The ink composition of the present invention contains a porphyrazine coloring matter of the formula (m1). In other words, a porphyrazine coloring matter has been found to be highly suitable as an ink for ink-jet printing when the porphyrazine coloring matter has a coloring-matter nucleus obtained by replacing one to three of the four benzo (benzene) rings in tetrabenzoporphyrazine (usually called phthalocyanine) with 6-membered nitrogen-containing aromatic heterocycles and has an unsubstituted sulfamoyl group and a particular substituted sulfamoyl group introduced thereinto. It has also been found that, as for a recorded matter obtained by using an ink containing the coloring matter, color development properties is excellent and light resistance is extremely excellent.

Examples of the nitrogen-containing aromatic heterocycles, A, B, C, and/or D, in the formula (m1) include a 6-membered nitrogen-containing aromatic heterocycle containing one to two nitrogen atoms, such as a pyridine ring, a pyrazine ring, a pyrimidine ring, or a pyridazine ring. Among these, a pyridine ring or a pyrazine ring is preferable, and a pyridine ring is most preferable. One to three of A, B, C, and D are nitrogen-containing aromatic heterocycles, and the rest is benzene rings. As the total number of the nitrogen-containing aromatic heterocycles increases, ozone resistance is improved, accompanied by increasing tendency of bronzing. Therefore, the total number of the nitrogen-containing aromatic heterocycles may be regulated, as needed, in consideration of ozone resistance and bronzing tendency so that ozone resistance and bronzing tendency are well-balanced. Since it depends on the kinds of the heterocycles, the total number of the nitrogen-containing aromatic heterocycles cannot be generally specified, but is usually greater than 0 and not greater than 3.00 and more preferably from 0.50 to 2.00 on average. The total number of the nitrogen-containing aromatic heterocycles is further preferably within the range from 0.50 to 1.75, and is particularly preferably within the range from 0.50 to 1.50. The rest is benzene rings. When the total number of the nitrogen-containing aromatic heterocycles is greater than 1 and smaller than 2, the total number of the nitrogen-containing aromatic heterocycles is the average number of heterocycles in a mixture of a compound having one such nitrogen-containing aromatic heterocycle and a compound having two such nitrogen-containing aromatic heterocycles. When two heterocycles are present, these two heterocycles are probably either adjacent to each other (as A and B, for example) or face each other (as A and C, for example). The structural formulae of the compounds are complicated and difficult to understand, and it is also unnecessary to differentiate such structures in the present invention. Therefore, in the section of describing production methods and in the Example section, the structural formula of only one of the compounds in which two rings A and C are heterocycles and the other rings B and D are benzene rings is shown, for convenience, unless otherwise indicated, which shall be interpreted to cover both of the compounds that can occur as described above.

b denotes 0 to smaller than 3.90, c denotes 0.10 to smaller than 4.00, and the sum of b and c is not smaller than 1.00 and smaller than 4.00.

As b increases, ozone resistance tends to be improved, accompanied by increasing tendency of bronzing. Therefore, the numerical values of b and c may be regulated as needed in consideration of ozone resistance and bronzing tendency so that ozone resistance and bronzing tendency are well-balanced. Usually, it is preferable that b ranges from 0.5 to 2.5, c ranges from 0.1 to 1.5, and b+c ranges from 1.5 to 3, and it is more preferable that b ranges from 1 to 2.5, c ranges from 0.5 to 1, and b+c ranges from 2.0 to 3.0.

The alkylene group as or in E is a C2-12 alkylene group, for example, more preferably a C2-6 alkylene group, and further preferably a C2-4 alkylene group. Specific examples include an ethylene group, a propylene group, a butylene group, a pentylene a group, a hexylene a group, a cyclopropylenediyl group, a 1,2- or 1,3-cyclopentylenediyl group, and cyclohexylene groups such as a 1,2-cyclohexylene group, a 1,3-cyclohexylene group and a 1,4-cyclohexylene group. An ethylene group, a propylene, or a butylene group is preferable, and an ethylene group is more preferable.

X is an anilino group or a naphthylamino group each having at least one group selected from the group consisting of a sulfo group, a carboxy group, and a phosphate group as a substituent. The anilino group or the naphthylamino group optionally has another substituent shown below. The number of such an optional another substituent group is usually 0 to 4 and is preferably 0 to 3. Examples of the optional another substituent include one, two, or more substituent groups selected from the group consisting of a sulfo group, a carboxy group, a phosphate group, a sulfamoyl group, a carbamoyl group, a hydroxy group, an alkoxy group, an amino group, a mono- or dialkylamino group, a mono- or diarylamino group, an acetylamino group, a ureido group, an alkyl group, a nitro group, a cyano group, a halogen atom, an alkylsulfonyl group, and an alkylthio group. As a substituent, an allyloxy group residue, a heterocyclic ring residue, or the like may further be added as well. Among these, a sulfo group, a carboxy group, and a hydroxy group are preferable as a substituent. When X is a naphthylamino group, a sulfo group and a hydroxy group are preferable among these substituent groups. A preferable group as X can be a mono- or a disulfo-substituted anilino group, a dicarboxy-substituted anilino group, or a mono- or disulfo-substituted naphthylamino group, for example, and a more preferable group as X can be a mono- or disulfo-substituted anilino group or a disulfo-substituted naphthylamino group. Specific examples include a 2,5-disulfoanilino group, a 2-sulfoanilino group, a 3-sulfoanilino group, a 4-sulfoanilino group, a 2-carboxyanilino group, a 4-carboxyanilino group, a 4-ethoxy-2-sulfoanilino group, a 2-methyl-5-sulfoanilino group, a 2-methoxy-4-nitro-5-sulfoanilino group, a 2-chloro-5-sulfoanilino group, a 3-carboxy-4-hydroxyanilino group, a 3-carboxy-4-hydroxy-5-sulfoanilino group, a 2-hydroxy-5-nitro-3-sulfoanilino group, a 4-acetylamino-2-sulfoanilino group, a 4-anilino-3-sulfoanilino group, a 3,5-dichloro-4-sulfoanilino group, a 3-phosphonoanilino group, a 3,5-dicarboxyanilino group, a 2-carboxy-4-sulfoanilino group, a 2-carboxy-5-sulfoanilino group, a 5,7-disulfonaphthalen-2-ylamino group, a 6,8-disulfonaphthalen-2-ylamino group, a 3,6-disulfonaphthalen-1-ylamino group, a 3,6,8-trisulfonaphthalen-1-ylamino group, a 8-hydroxy-3,6-disulfonaphthalen-1-ylamino group, a 4,8-disulfonaphthalen-2-ylamino group, a 3,6,8-trisulfonaphthalen-2-ylamino group, a 4,6,8-trisulfonaphthalen-2-ylamino group, an 8-chloro-3,6-disulfonaphthalen-1-ylamino group, an 8-hydroxy-6-sulfonaphthalen-2-ylamino group, and a 5-hydroxy-7-sulfonaphthalen-2-ylamino group. Groups preferable among these can be a 2,5-disulfoanilino group, a 2-sulfoanilino group, a 3-sulfoanilino group, a 4-sulfoanilino group, a 2-carboxyanilino group, a 4-carboxyanilino group, a 3,5-dicarboxyanilino group, a 5,7-disulfonaphthalen-2-ylamino group, a 6,8-disulfonaphthalen-2-ylamino group, a 3,6-disulfonaphthalen-1-ylamino group, and the like.

Y is represented by the formula (m2), (m3), or (m4).

In the formula (m2), $R^{101}$ and $R^{102}$ are independently a hydrogen atom; or an alkyl group, a phenyl group, or a nitrogen-containing aromatic heterocyclic group each of which is optionally substituted with a hydroxy group, a sulfo group, a carboxy group, or a phosphate group.

The alkyl group that is optionally substituted with a hydroxy group, a sulfo group, a carboxy group, or a phosphate group, the phenyl group that is optionally substituted with a hydroxy group, a sulfo group, a carboxy group, or a phosphate group, or the nitrogen-containing aromatic heterocyclic group that is optionally substituted with a hydroxy group, a sulfo group, a carboxy group, or a phosphate group, as or in $R^{101}$ and $R^{102}$ in the formula (m2) are, for example, an alkyl group that is unsubstituted, a phenyl group that is unsubstituted, a nitrogen-containing aromatic heterocyclic group that is unsubstituted, or any of the groups in which a carbon atom thereof has a substituent attached thereto. The position of substitution is not particularly limited. The number of substitution is 1 to 3 and is preferably 1 or 2. The alkyl group can be usually a (C1-C8) alkyl group, preferably a (C1-C6) alkyl group, and more preferably a (C1-C4) alkyl group. Examples of the (C1-C4) alkyl group include ones that constitute a linear or branched chain, preferably a linear chain. Specific examples include linear groups such as a methyl group, an ethyl group, an n-propyl group, an n-butyl group, an n-pentyl group, an n-hexyl group, an n-heptyl group, and an n-octyl group; and branched groups such as an isopropyl group, an isobutyl group, an isopentyl group, an isohexyl group, an isohepsyl group, an isooctyl group, a sec-butyl group, a tert-butyl group, and a neopentyl group. Preferable and specific examples include a methyl group, an ethyl group, and an n-propyl group. A methyl group and an ethyl group are more preferable.

In the formula (m3), $R^{201}$ is a hydrogen atom; a sulfo group; a carboxy group; a (C1-C6) alkoxy group; a (C1-C6) alkyl group; or a halogen atom,
the group F is a phenylene group; or a pyridylene group (in this case, $R^{201}$ is a hydrogen atom); and
a denotes 1 or 2.

The (C1-C6) alkoxy group in the formula (m3) is, for example, a linear, branched, or cyclic (C1-C6) alkyl group, preferably a linear, branched, or cyclic (C1-C4) alkyl group, and more preferably a linear, branched, or cyclic (C1-C3) alkyl group. The linear or branched ones are preferable, and the linear ones are more preferable. Specific examples include linear groups such as a methoxy group, an ethoxy group, an n-propoxy group, an n-butoxy group, an n-pentoxy group, and an n-hexyloxy group; branched groups such as an isopropoxy group, an isobutoxy group, a sec-butoxy group, a t-butoxy group, an isopentyloxy group, and an isohexyloxy group; and cyclic groups such as a cyclopropoxy group, a cyclopentoxy group, and a cyclohexyloxy group. Among these, a methoxy group or an ethoxy group is preferable, and a methoxy group is particularly preferable.

The (C1-C6) alkyl group in the formula (m3) is, for example, a linear, branched, or cyclic (C1-C6) alkyl group, preferably a linear, branched, or cyclic (C1-C4) alkyl group, and more preferably a linear, branched, or cyclic (C1-C3) alkyl group. The linear or branched ones are preferable, and the linear ones are more preferable. Specific examples include linear groups such as a methyl group, an ethyl group, an n-propyl group, an n-butyl group, an n-pentyl group, and an n-hexyl group; branched groups such as an isopropyl group, an isobutyl group, a sec-butyl group, a t-butyl group, an isopentyl group, and an isohexyl group; and cyclic groups such as a cyclopropyl group, a cyclopentyl group, and a cyclohexyl group. Among these, methyl group is preferable.

The halogen atom in the formula (m3) is a fluorine atom, a chlorine atom, a bromine atom, or an iodine atom, for example. A fluorine atom, a chlorine atom, and a bromine atom are preferable, and a fluorine atom and a chlorine atom are more preferable.

In the formula (m4), $R^{301}$ is a hydrogen atom or an alkyl group.

The alkyl group is usually a (C1-C4) alkyl group, for example.

Examples of the (C1-C4) alkyl group in the formula (m4) include ones that are unsubstituted and constitute a linear or branched chain, preferably a linear chain. Specific examples include linear groups such as a methyl group, an ethyl group, an n-propyl group, and an n-butyl group; and branched groups such as an isopropyl group, an isobutyl group, a sec-butyl group, and a tert-butyl group. Preferable and specific examples include a methyl group and an ethyl group. A methyl group is more preferable.

As $R^{301}$ in the formula (m4), either of a hydrogen atom and a (C1-C4) alkyl group is preferable, a hydrogen atom or a linear (C1-C4) alkyl group is more preferable, a hydrogen atom, a methyl group, or an ethyl group is further preferable, and a hydrogen atom or a methyl group is particularly preferable.

A preferable combination of X and Y is one shown as (I) or (II) below, for example.

(I) When Y is an amino group or a hydroxy group (preferably an amino group), X is an anilino group or a naphthylamino group each having a sulfo group, a carboxy group, or a phosphate group as a substituent, preferably an anilino group or a naphthylamino group each having one to three sulfo groups, and more preferably an anilino group or a naphthylamino group each having two sulfo groups.

(II) When Y is a mono- or di(C1-C4 alkyl)amino group having a group selected from the group consisting of a sulfo group, a carboxy group, and a hydroxy group as a substituent, or is a 5- to 7-membered nitrogen-containing heterocyclic group (preferably a 5- or 6-membered nitrogen-containing heterocyclic group, and further preferably a morpholino group) having a group selected from the group consisting of a methyl group, an ethyl group, a sulfo group, a carboxy group, and a hydroxy group, preferably a group selected from the group consisting of a sulfo group, a carboxy group, and a hydroxy group, as a substituent, and X is an anilino group or a naphthylamino group each having a group selected from the group consisting of a sulfo group, a carboxy group, a methoxy group, a nitro group, a chlorine atom, and a hydroxy group, preferably at least one group selected from the group consisting of a sulfo group, a carboxy group, and a hydroxy group, as a substituent. When X is the naphthylamino group, the naphthylamino group is more preferably has a group selected from the group consisting of a sulfo group and a hydroxy group as a substituent. It is more preferable to combine this preferable combination of X and Y with a further preferable group as E, for example, a C2-C4 alkylene group and more preferably an ethylene group (—C2H4-) or a propylene group (—C3H6-). In this case, each of the 6-membered nitrogen-containing aromatic rings shown as the rings A to D in the formula (m1) is further preferably a pyridine ring or a pyrazine ring and is more preferably a pyridine ring.

The compound of the formula (m1) can also form a salt together with a sulfo group, a carboxy group, a phosphate group, and the like present in the molecule. When the compound of the formula (m1) forms a salt, the salt preferably forms a salt together with a cation such as an inorganic metal ion, an ammonium ion, or an organic base ion. The inorganic metal is an alkali metal or an alkaline-earth metal, for example. Examples of the alkali metal include lithium, sodium, and potassium. Examples of the alkaline-earth metal include calcium and magnesium. Examples of the organic base include an organic amine, in particular, and include a C1-3 lower alkylamine such as methylamine and ethylamine or a mono-, di-, or tri-(C1-4 lower alkanol) amine such as monoethanolamine, diethanolamine, triethanolamine, monoisopropanolamine, diisopropanolamine, and triisopropanolamine. Particularly preferable salts among these are an alkali metal salt such as a sodium salt, a potassium salt, and a lithium salt, an onium salt of a mono-, di-, or tri-(C1-4 lower alkanol) amine, such as monoethanolamine, diethanolamine, triethanolamine, monoisopropanolamine, diisopropanolamine, and triisopropanolamine, and an ammonium salt.

Specific examples of A, B, C, D, E, X, and Y in the porphyrazine coloring matter represented by the formula (m1) of the present invention are shown in Tables 71 to 81, together with the numerical values a, b, and c. The following examples show typical compounds given for the purpose of describing the coloring matter of the present invention in detail, and are not limitative. When the nitrogen-containing aromatic heterocycle A, B, C, or D is a pyridine ring, the pyridine ring has a nitrogen-atom regioisomer or the like as described in Japanese Patent No. 5260493, and therefore the resulting coloring matter obtained via synthesis is a mixture of isomers. Isolation of these isomers is difficult, and analytic identification of these isomers is also difficult. Because of these reasons, the mixture is usually used as it is, where the mixture of these isomers causes no problem in the present invention. Therefore, in the present invention, these isomers are not described distinctively, and a single structural formula is used for convenience as described above.

Among these, coloring matters of Compound Nos. m25, m62, m130, m158, and m225 are more preferable.

The coloring matter represented by the formula (m1) is preferably a coloring matter obtained from a reaction of a porphyrazine compound represented by the formula (m5) and an organic amine represented by the formula (m6) in the presence of ammonia.

This is because of easy synthesis and industrial usefulness.

TABLE 71

| Compound No. | A | B | C | D | E | F | X | Y: Y(3) R101 | Y: Y(3) R102 | Y: Y(4) R201 | Y: Y(5) R301 | a | b | c |
|---|---|---|---|---|---|---|---|---|---|---|---|---|---|---|
| m1 | 2,3-Pyrido | Benzo | Benzo | Benzo | Ethylene | — | 2,5-Disulfoanilino | Hydrogen | Hydrogen | — | — | — | 2 | 1 |
| m2 | 2,3-Pyrido | 2,3-Pyrido | Benzo | Benzo | Ethylene | — | 2,5-Disulfoanilino | Hydrogen | Hydrogen | — | — | — | 1 | 1 |
| m3 | 2,3-Pyrido | Benzo | 2,3-Pyrido | Benzo | Ethylene | — | 2,5-Disulfoanilino | Hydrogen | Hydrogen | — | — | — | 1 | 1 |
| m4 | 2,3-Pyrido | 2,3-Pyrido | 2,3-Pyrido | Benzo | Ethylene | — | 2,5-Disulfoanilino | Hydrogen | Hydrogen | — | — | — | 0 | 1 |
| m5 | 2,3-Pyrido | Benzo | Benzo | Benzo | Ethylene | — | 4-Sulfoanilino | Hydrogen | Hydrogen | — | — | — | 2 | 1 |
| m6 | 2,3-Pyrido | Benzo | Benzo | Benzo | Ethylene | — | 3,5-Dicarboxyanilino | Hydrogen | Hydrogen | — | — | — | 2 | 1 |
| m7 | 2,3-Pyrido | Benzo | Benzo | Benzo | Propylene | — | 2,5-Disulfoanilino | Hydrogen | Hydrogen | — | — | — | 2 | 1 |
| m8 | 2,3-Pyrido | Benzo | Benzo | Benzo | Ethylene | — | 2-Carboxy-4-Sulfoanilino | Hydrogen | Hydrogen | — | — | — | 2 | 1 |
| m9 | 2,3-Pyrazino | Benzo | Benzo | Benzo | Ethylene | — | 2,5-Disulfoanilino | Hydrogen | Hydrogen | — | — | — | 2 | 1 |
| m10 | 2,3-Pyrazino | 2,3-Pyrazino | Benzo | Benzo | Ethylene | — | 2,5-Disulfoanilino | Hydrogen | Hydrogen | — | — | — | 1 | 1 |
| m11 | 2,3-Pyrazino | Benzo | 2,3-Pyrazino | Benzo | Ethylene | — | 2,5-Disulfoanilino | Hydrogen | Hydrogen | — | — | — | 1 | 1 |
| m12 | 2,3-Pyrazino | 2,3-Pyrazino | 2,3-Pyrazino | Benzo | Ethylene | — | 2,5-Disulfoanilino | Hydrogen | Hydrogen | — | — | — | 0 | 1 |
| m13 | 2,3-Pyrido | Benzo | Benzo | Benzo | Ethylene | — | 2-Methoxy-5-Sulfoanilino | Hydrogen | Hydrogen | — | — | — | 2 | 1 |
| m14 | 2,3-Pyrido | Benzo | Benzo | Benzo | Ethylene | — | 2-Nitro-4-Sulfonanilino | Hydrogen | Hydrogen | — | — | — | 2 | 1 |
| m15 | 2,3-Pyrido | Benzo | Benzo | Benzo | Ethylene | — | 2,5-Dichloro-4-Sulfonanilino | Hydrogen | Hydrogen | — | — | — | 2 | 1 |
| m16 | 2,3-Pyrido | Benzo | Benzo | Benzo | Ethylene | — | 2,5-Disulfoanilino | Hydrogen | Hydrogen | — | — | — | 2 | 1 |
| m17 | 2,3-Pyrido | Benzo | Benzo | Benzo | Ethylene | — | 3-Carboxy-4-hydroxy-5-Sulfonanilino | Hydrogen | Hydrogen | — | — | — | 2 | 1 |
| m18 | 3,4-Pyrido | Benzo | Benzo | Benzo | Ethylene | — | 2,5-Disulfoanilino | Hydrogen | Hydrogen | — | — | — | 2 | 1 |
| m19 | 3,4-Pyrido | 3,4-Pyrido | Benzo | Benzo | Ethylene | — | 2,5-Disulfoanilino | Hydrogen | Hydrogen | — | — | — | 1 | 1 |
| m20 | 3,4-Pyrido | Benzo | 3,4-Pyrido | Benzo | Ethylene | — | 2,5-Disulfoanilino | Hydrogen | Hydrogen | — | — | — | 1 | 1 |

TABLE 72

| Compound No. | A | B | C | D | E | F | X | Y: Y(3) R101 | Y: Y(3) R102 | Y: Y(4) R201 | Y: Y(5) R301 | a | b | c |
|---|---|---|---|---|---|---|---|---|---|---|---|---|---|---|
| m21 | 3,4-Pyrido | 3,4-Pyrido | 3,4-Pyrido | Benzo | Ethylene | — | 2,5-Disulfoanilino | Hydrogen | Hydrogen | — | — | — | 0 | 1 |
| m22 | 2,3-Pyrido | Benzo | Benzo | Benzo | Ethylene | — | 4-Sulfoanilino | Hydrogen | 2-Hydroxyethyl | — | — | — | 2 | 1 |
| m23 | 2,3-Pyrido | Benzo | Benzo | Benzo | Ethylene | — | 6-Sulfo-1-naphthylamino | Hydrogen | 2-Sulfoethyl | — | — | — | 2 | 1 |
| m24 | 2,3-Pyrido | Benzo | Benzo | Benzo | Ethylene | — | 3,6-disulfo-1-naphthylamino | Hydrogen | Hydrogen | — | — | — | 2 | 1 |
| m25 | 2,3-Pyrido | Benzo | Benzo | Benzo | Ethylene | — | 3,6-disulfo-1-naphthylamino | Hydrogen | 2-hydroxy-ethoxyethyl | — | — | — | 2 | 1 |
| m26 | 2,3-Pyrido | Benzo | Benzo | Benzo | Ethylene | — | 4-Sulfoanilino | Hydrogen | 2-hydroxy-ethoxyethyl | — | — | — | 2 | 1 |

TABLE 72-continued

| Compound No. | A | B | C | D | E | F | X | Y: Y(3): R^101 | Y: Y(3): R^102 | Y: Y(4): R^201 | Y: Y(5): R^301 | a | b | c |
|---|---|---|---|---|---|---|---|---|---|---|---|---|---|---|
| m27 | 2,3-Pyrido | Benzo | Benzo | Benzo | Ethylene | — | 3,8-disulfo-1-naphthylamino | Morpholino | | — | — | — | 2 | 1 |
| m28 | 2,3-Pyrido | Benzo | Benzo | Benzo | Ethylene | — | 6,8-disulfo-2-naphthylamino | Morpholino | | — | — | — | 2 | 1 |
| m29 | 2,3-Pyrido | Benzo | Benzo | Benzo | Ethylene | — | 6-Sulfo-1-naphthylamino | Hydrogen | 2-Sulfoethyl | — | — | — | 2 | 1 |
| m30 | 2,3-Pyrido | Benzo | Benzo | Benzo | Ethylene | — | 3,8-disulfo-1-naphthylamino | Hydrogen | Hydrogen | — | — | — | 2 | 1 |
| m31 | 2,3-Pyrido | Benzo | Benzo | Benzo | Ethylene | — | 3,6-disulfo-1-naphthylamino | Hydrogen | 2-hydroxy-ethoxyethyl | — | — | — | 2 | 1 |
| m32 | 2,3-Pyrido | Benzo | Benzo | Benzo | Ethylene | — | 4-Sulfoanilino | Hydrogen | 2-hydroxy-ethoxyethyl | — | — | — | 2 | 1 |
| m33 | Benzo | Benzo | 2,3-Pyrido | Benzo | Ethylene | — | 3,8-disulfo-1-naphthylamino | Morpholino | | — | — | — | 2 | 1 |
| m34 | Benzo | Benzo | 2,3-Pyrido | Benzo | Ethylene | — | 6,8-disulfo-2-naphthylamino | Morpholino | | — | — | — | 2 | 1 |
| m35 | 2,3-Pyrido | Benzo | Benzo | Benzo | Ethylene | — | 2,5-Disulfoanilino | Morpholino | | — | — | — | 2 | 1 |
| m36 | 2,3-Pyrido | Benzo | Benzo | Benzo | Ethylene | — | 2,4-Disulfoanilino | Morpholino | | — | — | — | 2 | 1 |
| m37 | 2,3-Pyrido | Benzo | Benzo | Benzo | Ethylene | — | 3-Sulfoanilino | Hydrogen | 2-Sulfoethyl | — | — | — | 2 | 1 |
| m38 | 2,3-Pyrido | Benzo | Benzo | Benzo | Ethylene | — | 4-Sulfoanilino | Hydrogen | 2-Sulfoethyl | — | — | — | 2 | 1 |
| m39 | 2,3-Pyrido | Benzo | Benzo | Benzo | Ethylene | — | 4-Sulfoanilino | 2-Carboxyethyl | 2-Carboxyethyl | — | — | — | 2 | 1 |
| m40 | 2,3-Pyrido | Benzo | Benzo | Benzo | Ethylene | — | 3,5-Dicarboxyanilino | Hydrogen | 2-Sulfoethyl | — | — | — | 2 | 1 |

TABLE 73

| Compound No. | A | B | C | D | E | F | X | Y: Y(3): R^101 | Y: Y(3): R^102 | Y: Y(4): R^201 | Y: Y(5): R^301 | a | b | c |
|---|---|---|---|---|---|---|---|---|---|---|---|---|---|---|
| m41 | 2,3-Pyrido | Benzo | Benzo | Benzo | Ethylene | — | 2,5-Disulfoanilino | 4-Ethylpiperazino | | — | — | — | 2 | 1 |
| m42 | 2,3-Pyrido | Benzo | Benzo | Benzo | Ethylene | — | 2,5-Disulfoanilino | 2-Ethylpiperazino | | — | — | — | 2 | 1 |
| m43 | 2,3-Pyrido | Benzo | Benzo | Benzo | Ethylene | — | 2,5-Disulfoanilino | 3-Methylpyrrolidino | | — | — | — | 2 | 1 |
| m44 | 2,3-Pyrido | Benzo | Benzo | Benzo | Ethylene | — | 2,5-Disulfoanilino | 2-Carboxypyrrolidino | | — | — | — | 2 | 1 |
| m45 | 2,3-Pyrido | Benzo | Benzo | Benzo | Ethylene | — | 2,5-Disulfoanilino | Pyrrolidino | | — | — | — | 2 | 1 |
| m46 | 2,3-Pyrido | 2,3-Pyrido | Benzo | Benzo | Ethylene | — | 3,8-Disulfo-1-naphthylamino | Hydrogen | Hydrogen | — | — | — | 2 | 1 |
| m47 | 2,3-Pyrido | Benzo | 2,3-Pyrido | Benzo | Ethylene | — | 3,6-Disulfo-1-naphthylamino | Hydrogen | 2-Hydroxy-ethoxyethyl | — | — | — | 2 | 1 |
| m48 | 2,3-Pyrido | 2,3-Pyrido | Benzo | Benzo | Ethylene | — | 4-Sulfoanilino | Hydrogen | 2-Hydroxy-ethoxyethyl | — | — | — | 2 | 1 |
| m49 | 2,3-Pyrido | 2,3-Pyrido | Benzo | Benzo | Ethylene | — | 3,8-Disulfo-1-naphthylamino | Morpholino | | — | — | — | 2 | 1 |
| m50 | 2,3-Pyrido | 2,3-Pyrido | Benzo | Benzo | Ethylene | — | 6,8-Disulfo-2-naphthylamino | Morpholino | | — | — | — | 2 | 1 |
| m51 | 2,3-Pyrido | Benzo | 2,3-Pyrido | Benzo | Ethylene | — | 2,5-Disulfoanilino | Morpholino | | — | — | — | 2 | 1 |
| m52 | 2,3-Pyrido | Benzo | 2,3-Pyrido | Benzo | Ethylene | — | 2,4-Disulfoanilino | Morpholino | | — | — | — | 2 | 1 |
| m53 | 2,3-Pyrido | Benzo | 2,3-Pyrido | Benzo | Ethylene | — | 4-Sulfoanilino | Hydrogen | 2-Hydroxyethyl | — | — | — | 1 | 1 |
| m54 | 2,3-Pyrido | Benzo | 2,3-Pyrido | Benzo | Ethylene | — | 3,5-Dicarboxyanilino | Hydrogen | 2-Sulfoethyl | — | — | — | 1 | 1 |
| m55 | 2,3-Pyrido | 2,3-Pyrido | Benzo | Benzo | Ethylene | — | 3-Sulfoanilino | Hydrogen | 2-Sulfoethyl | — | — | — | 1 | 1 |
| m56 | 2,3-Pyrido | Benzo | 2,3-Pyrido | Benzo | Ethylene | — | 4-Sulfoanilino | Hydrogen | 2-Sulfoethyl | — | — | — | 1 | 1 |
| m57 | 2,3-Pyrido | Benzo | 2,3-Pyrido | Benzo | Ethylene | — | 4-Sulfoanilino | 2-Carboxyethyl | 2-Carboxyethyl | — | — | — | 1 | 1 |

TABLE 73-continued

| Compound No. | A | B | C | D | E | F | X | Y: Y(3): R101 | Y: Y(3): R102 | Y: Y(4): R201 | Y: Y(5): R301 | a | b | c |
|---|---|---|---|---|---|---|---|---|---|---|---|---|---|---|
| m58 | 2,3-Pyrido | Benzo | 2,3-Pyrido | Benzo | Ethylene | — | 5-Sulfo-1-naphthylamino | Hydrogen | 2-Sulfoethyl | — | — | — | 1 | 1 |
| m59 | 2,3-Pyrido | Benzo | 2,3-Pyrido | Benzo | Ethylene | — | 3,8-Disulfo-1-naphthylamino | Hydrogen | Hydrogen | — | — | — | 1 | 1 |
| m60 | 2,3-Pyrido | Benzo | 2,3-Pyrido | Benzo | Ethylene | — | 3,6-Disulfo-1-naphthylamino | Hydrogen | 2-Hydroxy-ethoxyethyl | — | — | — | 1 | 1 |

TABLE 74

| Compound No. | A | B | C | D | E | F | X | Y: Y(3): R101 | Y: Y(3): R102 | Y: Y(4): R201 | Y: Y(5): R301 | a | b | c |
|---|---|---|---|---|---|---|---|---|---|---|---|---|---|---|
| m61 | 2,3-Pyrido | 2,3-Pyrido | 2,3-Pyrido | Benzo | Ethylene | — | 4-Sulfoanilino | Hydrogen | 2-Hydroxy-ethoxyethyl | — | — | — | 0 | 1 |
| m62 | 2,3-Pyrido | 2,3-Pyrido | 2,3-Pyrido | Benzo | Ethylene | — | 3,8-Disulfo-1-naphthylamino | Morpholino | | — | — | — | 0 | 1 |
| m63 | 2,3-Pyrido | 2,3-Pyrido | 2,3-Pyrido | Benzo | Ethylene | — | 6,8-Disulfo-2-naphthylamino | Morpholino | | — | — | — | 0 | 1 |
| m64 | 2,3-Pyrido | 2,3-Pyrido | 2,3-Pyrido | Benzo | Ethylene | — | 2,5-Disulfoanilino | Morpholino | | — | — | — | 0 | 1 |
| m65 | 2,3-Pyrido | 2,3-Pyrido | 2,3-Pyrido | Benzo | Ethylene | — | 2,4-Disulfoanilino | Morpholino | | — | — | — | 0 | 1 |
| m66 | 2,3-Pyrido | 2,3-Pyrido | 2,3-Pyrido | Benzo | Ethylene | — | 3,5-Dicarboxyanilino | Hydrogen | 2-Sulfoethyl | — | — | — | 0 | 1 |
| m67 | 2,3-Pyrido | 2,3-Pyrido | Benzo | 2,3-Pyrido | Ethylene | — | 4-Sulfoanilino | Hydrogen | 2-Hydroxyethyl | — | — | — | 0 | 1 |
| m68 | 2,3-Pyrido | 2,3-Pyrido | Benzo | 2,3-Pyrido | Ethylene | — | 6-Sulfo-1-naphthylamino | Hydrogen | 2-Sulfoethyl | — | — | — | 0 | 1 |
| m69 | 2,3-Pyrido | Benzo | 2,3-Pyrido | 2,3-Pyrido | Ethylene | — | 3,6,8-Trisulfo-1-naphthylamino | Morpholino | | — | — | — | 0 | 1 |
| m70 | 2,3-Pyrido | Benzo | 2,3-Pyrido | 2,3-Pyrido | Ethylene | — | 3,6,8-Trisulfo-1-naphthylamino | Hydrogen | 2-Sulfoethyl | — | — | — | 0 | 1 |
| m71 | Benzo | 2,3-Pyrido | 2,3-Pyrido | 2,3-Pyrido | Ethylene | — | 3,6,8-Trisulfo-1-naphthylamino | Hydrogen | 2-Hydroxyethyl | — | — | — | 0 | 1 |
| m72 | Benzo | 2,3-Pyrido | 2,3-Pyrido | 2,3-Pyrido | Ethylene | — | 3,6,8-Trisulfo-1-naphthylamino | Hydrogen | 2-Hydroxy-ethoxyethyl | — | — | — | 0 | 1 |
| m73 | 2,3-Pyrido | Benzo | Benzo | 2,3-Pyrido | Butylene | — | 2,5-Disulfoanilino | 4-Ethylpiperazino | | — | — | — | 1 | 1 |
| m74 | 2,3-Pyrido | Benzo | Benzo | 2,3-Pyrido | Butylene | — | 2,5-Disulfoanilino | 2-Ethylpiperazino | | — | — | — | 1 | 1 |
| m75 | 2,3-Pyrido | Benzo | Benzo | 2,3-Pyrido | Butylene | — | 2,5-Disulfoanilino | 3-Methylpyrrolidino | | — | — | — | 1 | 1 |
| m76 | 2,3-Pyrido | Benzo | Benzo | 2,3-Pyrido | Butylene | — | 2,5-Disulfoanilino | 2-Carboxypyrrolidino | | — | — | — | 1 | 1 |
| m77 | 2,3-Pyrido | Benzo | Benzo | 2,3-Pyrido | Butylene | — | 2,5-Disulfoanilino | Pyrrolidino | | — | — | — | 1 | 1 |
| m78 | 2,3-Pyrido | Benzo | 2,3-Pyrido | Benzo | Propylene | — | 2,5-Disulfoanilino | 4-Ethylpiperazino | | — | — | — | 1 | 1 |
| m79 | 2,3-Pyrido | Benzo | 2,3-Pyrido | Benzo | Propylene | — | 2,5-Disulfoanilino | 2-Ethylpiperazino | | — | — | — | 1 | 1 |
| m80 | 2,3-Pyrido | Benzo | 2,3-Pyrido | Benzo | Propylene | — | 2,5-Disulfoanilino | 3-Methylpyrrolidino | | — | — | — | 1 | 1 |

TABLE 75

| Compound No. | A | B | C | D | E | F | X | Y: Y(3) $R^{101}$ | Y: Y(3) $R^{102}$ | Y: Y(4) $R^{201}$ | Y: Y(5) $R^{301}$ | a | b | c |
|---|---|---|---|---|---|---|---|---|---|---|---|---|---|---|
| m81 | 2,3-Pyrido | Benzo | 2,3-Pyrido | Benzo | Propylene | — | 2,5-Disulfoanilino | 2-Carboxypyrrolidino | | — | — | — | 1 | 1 |
| m82 | 2,3-Pyrido | Benzo | 2,3-Pyrido | Benzo | Propylene | — | 2,5-Disulfoanilino | Pyrrolidino | | — | — | — | 1 | 1 |
| m83 | 2,3-Pyrido | 2,3-Pyrido | 2,3-Pyrido | Benzo | Ethylene | — | 2,5-Disulfoanilino | 4-Ethylpiperazino | | — | — | — | 0 | 1 |
| m84 | 2,3-Pyrido | 2,3-Pyrido | 2,3-Pyrido | Benzo | Ethylene | — | 2,5-Disulfoanilino | 2-Ethylpiperazino | | — | — | — | 0 | 1 |
| m85 | 2,3-Pyrido | Benzo | 2,3-Pyrido | 2,3-Pyrido | Ethylene | — | 3,6,8-Trisulfo-naphthalen-1-ylamino | 3-Methylpyrrolidino | | — | — | — | 0 | 1 |
| m86 | 2,3-Pyrido | Benzo | Benzo | Benzo | Ethylene | — | 3,6,8-Trisulfo-naphthalen-1-ylamino | Hydrogen | 2-Carboxyphenyl | — | — | — | 2 | 1 |
| m87 | 2,3-Pyrido | 2,3-Pyrido | Benzo | Benzo | Ethylene | — | 3,6,8-Trisulfo-naphthalen-1-ylamino | Hydrogen | 2-Carboxyphenyl | — | — | — | 1 | 1 |
| m88 | 2,3-Pyrido | Benzo | 2,3-Pyrido | Benzo | Ethylene | — | 3,6,8-Trisulfo-naphthalen-1-ylamino | Hydrogen | 2-Carboxyphenyl | — | — | — | 1 | 1 |
| m89 | 2,3-Pyrido | 2,3-Pyrido | 2,3-Pyrido | Benzo | Ethylene | — | 3,6,8-Trisulfo-naphthalen-1-ylamino | Hydrogen | 2-Carboxyphenyl | — | — | — | 0 | 1 |
| m90 | 2,3-Pyrido | Benzo | Benzo | Benzo | Ethylene | — | 3,6,8-Trisulfo-naphthalen-1-ylamino | Hydrogen | 4-Carboxyphenyl | — | — | — | 2 | 1 |
| m91 | 2,3-Pyrido | 2,3-Pyrido | Benzo | Benzo | Ethylene | — | 3,6,8-Trisulfo-naphthalen-1-ylamino | Hydrogen | 4-Carboxyphenyl | — | — | — | 1 | 1 |
| m92 | 2,3-Pyrido | Benzo | 2,3-Pyrido | Benzo | Ethylene | — | 3,6,8-Trisulfo-naphthalen-1-ylamino | Hydrogen | 4-Carboxyphenyl | — | — | — | 1 | 1 |
| m93 | 2,3-Pyrido | 2,3-Pyrido | 2,3-Pyrido | Benzo | Ethylene | — | 3,6,8-Trisulfo-naphthalen-1-ylamino | Hydrogen | 4-Carboxyphenyl | — | — | — | 0 | 1 |
| m94 | 2,3-Pyrido | Benzo | Benzo | Benzo | Ethylene | — | 3-Sulfoanilino | Hydrogen | 3-Sulfophenyl | — | — | — | 2 | 1 |
| m95 | 2,3-Pyrido | 2,3-Pyrido | Benzo | Benzo | Ethylene | — | 3-Sulfoanilino | Hydrogen | 3-Sulfophenyl | — | — | — | 1 | 1 |
| m96 | 2,3-Pyrido | Benzo | 2,3-Pyrido | Benzo | Ethylene | — | 3-Sulfoanilino | Hydrogen | 3-Sulfophenyl | — | — | — | 1 | 1 |
| m97 | 2,3-Pyrido | 2,3-Pyrido | 2,3-Pyrido | Benzo | Ethylene | — | 3-Sulfoanilino | Hydrogen | 3-Sulfophenyl | — | — | — | 0 | 1 |
| m98 | 2,3-Pyrido | Benzo | Benzo | Benzo | Ethylene | — | 6-Sulfo-naphthalen-2-ylamino | Hydrogen | 4-Sulfophenyl | — | — | — | 2 | 1 |
| m99 | 2,3-Pyrido | 2,3-Pyrido | Benzo | Benzo | Ethylene | — | 6-Sulfo-naphthalen-2-ylamino | Hydrogen | 4-Sulfophenyl | — | — | — | 1 | 1 |
| m100 | 2,3-Pyrido | Benzo | 2,3-Pyrido | Benzo | Ethylene | — | 6-Sulfo-naphthalen-2-ylamino | Hydrogen | 4-Sulfophenyl | — | — | — | 1 | 1 |

TABLE 76

| Compound No. | A | B | C | D | E | F | X | Y: Y(3) R$^{101}$ | Y: Y(3) R$^{102}$ | Y: Y(4) R$^{201}$ | Y: Y(5) R$^{301}$ | a | b | c |
|---|---|---|---|---|---|---|---|---|---|---|---|---|---|---|
| m101 | 2,3-Pyrido | 2,3-Pyrido | 2,3-Pyrido | Benzo | Ethylene | — | 6-Sulfo-naphthalen-2-ylamino | Hydrogen | 4-Sulfophenyl | — | — | — | 0 | 1 |
| m102 | 2,3-Pyrido | Benzo | Benzo | Benzo | Ethylene | — | 3-Sulfoanilino | Hydrogen | 2-Carboxy-4-sulfophenyl | — | — | — | 2 | 1 |
| m103 | 2,3-Pyrido | 2,3-Pyrido | Benzo | Benzo | Ethylene | — | 3-Sulfoanilino | Hydrogen | 2-Carboxy-4-sulfophenyl | — | — | — | 1 | 1 |
| m104 | 2,3-Pyrido | Benzo | 2,3-Pyrido | Benzo | Ethylene | — | 3-Sulfoanilino | Hydrogen | 2-Carboxy-4-sulfophenyl | — | — | — | 1 | 1 |
| m105 | 2,3-Pyrido | 2,3-Pyrido | 2,3-Pyrido | Benzo | Ethylene | — | 3-Sulfoanilino | Hydrogen | 2-Carboxy-4-sulfophenyl | — | — | — | 0 | 1 |
| m106 | 2,3-Pyrido | Benzo | Benzo | Benzo | Ethylene | — | 4-Sulfoanilino | Hydrogen | 3-Sulfophenyl | — | — | — | 2 | 1 |
| m107 | 2,3-Pyrido | 2,3-Pyrido | Benzo | Benzo | Ethylene | — | 4-Sulfoanilino | Hydrogen | 3-Sulfophenyl | — | — | — | 1 | 1 |
| m108 | 2,3-Pyrido | Benzo | 2,3-Pyrido | Benzo | Ethylene | — | 4-Sulfoanilino | Hydrogen | 3-Sulfophenyl | — | — | — | 1 | 1 |
| m109 | 2,3-Pyrido | 2,3-Pyrido | 2,3-Pyrido | Benzo | Ethylene | — | 4-Sulfoanilino | Hydrogen | 3-Sulfophenyl | — | — | — | 0 | 1 |
| m110 | 2,3-Pyrido | Benzo | Benzo | Benzo | Ethylene | — | 2,5-Disulfoanilino | Hydrogen | 2-Carboxy-4-sulfophenyl | — | — | — | 2 | 1 |
| m111 | 2,3-Pyrido | 2,3-Pyrido | Benzo | Benzo | Ethylene | — | 2,5-Disulfoanilino | Hydrogen | 2-Carboxy-4-sulfophenyl | — | — | — | 1 | 1 |
| m112 | 2,3-Pyrido | Benzo | 2,3-Pyrido | Benzo | Ethylene | — | 2,5-Disulfoanilino | Hydrogen | 2-Carboxy-4-sulfophenyl | — | — | — | 1 | 1 |
| m113 | 2,3-Pyrido | 2,3-Pyrido | 2,3-Pyrido | Benzo | Ethylene | — | 2,5-Disulfoanilino | Hydrogen | 2-Carboxy-4-sulfophenyl | — | — | — | 0 | 1 |
| m114 | 2,3-Pyrido | Benzo | Benzo | Benzo | Ethylene | — | 5,7-Disulfo-naphthalen-2-ylamino | Hydrogen | 5,7-Disulfo-naphthalen-2-ylamino | — | — | — | 2 | 1 |
| m115 | 2,3-Pyrido | 2,3-Pyrido | Benzo | Benzo | Ethylene | — | 5,7-Disulfo-naphthalen-2-ylamino | Hydrogen | 5,7-Disulfo-naphthalen-2-ylamino | — | — | — | 1 | 1 |
| m116 | 2,3-Pyrido | Benzo | 2,3-Pyrido | Benzo | Ethylene | — | 5,7-Disulfo-naphthalen-2-ylamino | Hydrogen | 5,7-Disulfo-naphthalen 2-ylamino | — | — | — | 1 | 1 |
| m117 | 2,3-Pyrido | 2,3-Pyrido | 2,3-Pyrido | Benzo | Ethylene | — | 5,7-Disulfo-naphthalen-2-ylamino | Hydrogen | 5,7-Disulfo-naphthalen 2-ylamino | — | — | — | 0 | 1 |
| m118 | 2,3-Pyrido | Benzo | Benzo | Benzo | Propylene | — | 3,6,8-Trisulfo-naphthalen-1-ylamino | Hydrogen | 2-Carboxyphenyl | — | — | — | 2 | 1 |
| m119 | 2,3-Pyrido | Benzo | Benzo | Benzo | Butylene | — | 3,6,8-Trisulfo-naphthalen-1-ylamino | Hydrogen | 2-Carboxyphenyl | — | — | — | 2 | 1 |
| m120 | 2,3-Pyrido | Benzo | Benzo | Benzo | Ethylene | — | 3,6,8-Trisulfo-naphthalen-1-ylamino | Hydrogen | 2-Carboxyphenyl | — | — | — | 2 | 1 |

TABLE 77

| Compound No. | A | B | C | D | E | F | X | Y: Y(3) R$^{101}$ | Y: Y(3) R$^{102}$ | Y: Y(4) R$^{201}$ | Y: Y(5) R$^{301}$ | a | b | c |
|---|---|---|---|---|---|---|---|---|---|---|---|---|---|---|
| m121 | 3,4-Pyrido | Benzo | Benzo | Benzo | Ethylene | — | 3,6,8-Trisulfo-naphthalen-1-ylamino | Hydrogen | 2-Carboxyphenyl | — | — | — | 2 | 1 |
| m122 | 2,3-Pyrido | Benzo | Benzo | Benzo | Ethylene | — | 6-Hydroxy-3,6-disulfo-naphthalen-1-ylamino | Hydrogen | 3-Carboxy-4-hydroxy-5-sulfophenyl | — | — | — | 2 | 1 |
| m123 | 2,3-Pyrido | Benzo | Benzo | Benzo | Ethylene | — | 2,4-Disulfoanilino | Hydrogen | 2-Methoxy-5-sulfophenyl | — | — | — | 2 | 1 |
| m124 | 2,3-Pyrido | Benzo | Benzo | Benzo | Ethylene | — | 2,5-Disulfoanilino | Hydrogen | 2,5-Dichloro-4-sulfophenyl | — | — | — | 2 | 1 |
| m125 | 2,3-Pyrido | Benzo | Benzo | Benzo | Ethylene | — | 3,6,8-Trisulfo-naphthalen-1-ylamino | Hydrogen | 2-Carboxy-4-sulfophenyl | — | — | — | 2 | 1 |

TABLE 77-continued

| Compound No. | A | B | C | D | E | F | X | Y: Y(3) R101 | Y: Y(3) R102 | Y: Y(4) R201 | Y: Y(5) R301 | a | b | c |
|---|---|---|---|---|---|---|---|---|---|---|---|---|---|---|
| m126 | 2,3-Pyrido | 2,3-Pyrido | Benzo | Benzo | Ethylene | — | 3,6,8-Trisulfo-naphthalen-1-ylamino | Hydrogen | 2-Carboxy-4-sulfophenyl | — | — | — | 1 | 1 |
| m127 | 2,3-Pyrido | Benzo | 2,3-Pyrido | Benzo | Ethylene | — | 3,6,8-Trisulfo-naphthalen-1-ylamino | Hydrogen | 2-Carboxy-4-sulfophenyl | — | — | — | 1 | 1 |
| m128 | 2,3-Pyrido | 2,3-Pyrido | 2,3-Pyrido | Benzo | Ethylene | — | 3,6,8-Trisulfo-naphthalen-1-ylamino | Hydrogen | 2-Carboxy-4-sulfophenyl | — | — | — | 0 | 1 |
| m129 | 2,3-Pyrido | Benzo | Benzo | Benzo | Ethylene | — | 3,6,8-Trisulfo-naphthalen-1-ylamino | Hydrogen | 2-Carboxy-5-sulfophenyl | — | — | — | 2 | 1 |
| m130 | 2,3-Pyrido | Benzo | Benzo | Benzo | Ethylene | — | 3,6,8-Trisulfo-naphthalen-1-ylamino | Hydrogen | 2-Nitro-4-sulfophenyl | — | — | — | 2 | 1 |
| m131 | 2,3-Pyrido | Benzo | Benzo | Benzo | Ethylene | — | 5,7-Disulfo-naphthalen-2-ylamino | Hydrogen | 2-Carboxy-4-sulfophenyl | — | — | — | 2 | 1 |
| m132 | 2,3-Pyrido | Benzo | Benzo | Benzo | Ethylene | — | 6,8-Disulfo-naphthalen-2-ylamino | Hydrogen | 6,8-Disulfo-naphthalen-2-ylamino | — | — | — | 2 | 1 |
| m133 | 2,3-Pyrido | Benzo | Benzo | Benzo | Ethylene | — | 6,8-Disulfo-naphthalen-2-ylamino | Hydrogen | 2-Carboxy-4-sulfophenyl | — | — | — | 2 | 1 |
| m134 | 2,3-Pyrido | Benzo | Benzo | Benzo | Ethylene | Phenyl | 2,5-Disulfoanilino | — | — | Hydrogen | — | 1 | 1 | 2 |
| m135 | 2,3-Pyrido | Benzo | Benzo | Benzo | Ethylene | Phenyl | 2,4-Disulfoanilino | — | — | Hydrogen | — | 1 | 1 | 2 |
| m136 | 2,3-Pyrido | Benzo | Benzo | Benzo | Ethylene | Phenyl | 2-Sulfoanilino | — | — | Hydrogen | — | 1 | 1 | 2 |
| m137 | 2,3-Pyrido | Benzo | Benzo | Benzo | Ethylene | Phenyl | 3-Sulfoanilino | — | — | Hydrogen | — | 1 | 1 | 2 |
| m138 | 2,3-Pyrido | Benzo | Benzo | Benzo | Ethylene | Phenyl | 4-Sulfoanilino | — | — | Hydrogen | — | 1 | 1 | 2 |
| m139 | 2,3-Pyrido | Benzo | Benzo | Benzo | Ethylene | Phenyl | 2,5-Disulfoanilino | — | — | Hydrogen | — | 2 | 1 | 2 |
| m140 | 2,3-Pyrido | Benzo | Benzo | Benzo | Ethylene | Phenyl | 2,5-Disulfoanilino | — | — | Hydrogen | — | 3 | 1 | 2 |

TABLE 78

| Compound No. | A | B | C | D | E | F | X | Y: Y(3) R101 | Y: Y(3) R102 | Y: Y(4) R201 | Y: Y(5) R301 | a | b | c |
|---|---|---|---|---|---|---|---|---|---|---|---|---|---|---|
| m141 | 2,3-Pyrido | Benzo | Benzo | Benzo | Ethylene | Phenyl | 2,5-Disulfoanilino | — | — | Hydrogen | — | 4 | 1 | 2 |
| m142 | Benzo | 2,3-Pyrido | 2,3-Pyrido | 2,3-Pyrido | Ethylene | Phenyl | 2,5-Disulfoanilino | — | — | Hydrogen | — | 1 | 0 | 1 |
| m143 | Benzo | 2,3-Pyrido | 2,3-Pyrido | Benzo | Ethylene | Phenyl | 2,5-Disulfoanilino | — | — | Hydrogen | — | 1 | 1 | 1 |
| m144 | 2,3-Pyrido | Benzo | Benzo | Benzo | Propylene | Phenyl | 2,5-Disulfoanilino | — | — | Hydrogen | — | 1 | 2 | 1 |
| m145 | 2,3-Pyrido | Benzo | 2,3-Pyrido | Benzo | Propylene | Phenyl | 2,5-Disulfoanilino | — | — | Hydrogen | — | 1 | 1 | 1 |
| m146 | 2,3-Pyrido | Benzo | 2,3-Pyrido | 2,3-Pyrido | Propylene | Phenyl | 2,5-Disulfoanilino | — | — | Hydrogen | — | 1 | 0 | 1 |
| m147 | 2,3-Pyrido | Benzo | Benzo | Benzo | Ethylene | Phenyl | 2-Sulfoanilino | — | — | 4-Sulfo group | — | 1 | 1 | 2 |
| m148 | 2,3-Pyrido | Benzo | Benzo | Benzo | Ethylene | Phenyl | 3-Sulfoanilino | — | — | 4-Sulfo group | — | 1 | 1 | 2 |
| m149 | 2,3-Pyrido | Benzo | Benzo | Benzo | Ethylene | Phenyl | 4-Sulfoanilino | — | — | 4-Sulfo group | — | 1 | 1 | 2 |
| m150 | Benzo | 2,3-Pyrido | 2,3-Pyrido | 2,3-Pyrido | Ethylene | Phenyl | 4-Sulfoanilino | — | — | 4-Sulfo group | — | 1 | 0 | 1 |
| m151 | Benzo | 2,3-Pyrido | 2,3-Pyrido | Benzo | Ethylene | Phenyl | 4-Sulfoanilino | — | — | 4-Sulfo group | — | 1 | 1 | 1 |
| m152 | 2,3-Pyrido | Benzo | Benzo | Benzo | Ethylene | Phenyl | 2,5-Disulfoanilino | — | — | 4-Sulfo group | — | 1 | 1 | 2 |

TABLE 78-continued

| Compound No. | A | B | C | D | E | F | X | Y: Y(3) R^101 | Y: Y(3) R^102 | Y: Y(4) R^201 | Y: Y(5) R^301 | a | b | c |
|---|---|---|---|---|---|---|---|---|---|---|---|---|---|---|
| m153 | Benzo | 2,3-Pyrido | 2,3-Pyrido | 2,3-Pyrido | Ethylene | Phenyl | 2,5-Disulfoanilino | — | — | 4-Sulfo group | — | 1 | 0 | 1 |
| m154 | Benzo | 2,3-Pyrido | 2,3-Pyrido | Benzo | Ethylene | Phenyl | 2,5-Disulfoanilino | — | — | 4-Sulfo group | — | 1 | 1 | 1 |
| m155 | 2,3-Pyrido | Benzo | Benzo | Benzo | Ethylene | Phenyl | 2-Sulfoanilino | — | — | 4-Carboxy group | — | 1 | 1 | 2 |
| m156 | 2,3-Pyrido | Benzo | Benzo | Benzo | Ethylene | Phenyl | 3-Sulfoanilino | — | — | 4-Carboxy group | — | 1 | 1 | 2 |
| m157 | 2,3-Pyrido | Benzo | Benzo | Benzo | Ethylene | Phenyl | 4-Sulfoanilino | — | — | 4-Carboxy group | — | 1 | 1 | 2 |
| m158 | 2,3-Pyrido | Benzo | Benzo | Benzo | Ethylene | Phenyl | 2,5-Disulfoanilino | — | — | 4-Carboxy group | — | 1 | 1 | 2 |
| m159 | Benzo | 2,3-Pyrido | 2,3-Pyrido | 2,3-Pyrido | Ethylene | Phenyl | 2,5-Disulfoanilino | — | — | 4-Carboxy group | — | 1 | 0 | 1 |
| m160 | Benzo | 2,3-Pyrido | 2,3-Pyrido | Benzo | Ethylene | Phenyl | 2,5-Disulfoanilino | — | — | 4-Carboxy group | — | 1 | 1 | 1 |

TABLE 79

| Compound No. | A | B | C | D | E | F | X | Y: Y(3) R^101 | Y: Y(3) R^102 | Y: Y(4) R^201 | Y: Y(5) R^301 | a | b | c |
|---|---|---|---|---|---|---|---|---|---|---|---|---|---|---|
| m161 | Benzo | 2,3-Pyrido | 2,3-Pyrido | 2,3-Pyrido | Ethylene | Phenyl | 4-Sulfoanilino | — | — | Hydrogen | — | 1 | 0 | 1 |
| m162 | Benzo | 2,3-Pyrido | 2,3-Pyrido | Benzo | Ethylene | Phenyl | 4-Sulfoanilino | — | — | Hydrogen | — | 1 | 1 | 1 |
| m163 | 2,3-Pyrido | Benzo | Benzo | Benzo | Propylene | Phenyl | 4-Sulfoanilino | — | — | Hydrogen | — | 1 | 2 | 1 |
| m164 | 2,3-Pyrido | Benzo | 2,3-Pyrido | Benzo | Propylene | Phenyl | 4-Sulfoanilino | — | — | Hydrogen | — | 1 | 1 | 1 |
| m165 | 2,3-Pyrido | Benzo | 2,3-Pyrido | 2,3-Pyrido | Propylene | Phenyl | 4-Sulfoanilino | — | — | Hydrogen | — | 1 | 0 | 1 |
| m166 | 2,3-Pyrido | Benzo | Benzo | Benzo | Ethylene | Phenyl | 2,5-Disulfoanilino | — | — | 4-Chloro | — | 1 | 1 | 2 |
| m167 | 2,3-Pyrido | Benzo | Benzo | Benzo | Ethylene | Phenyl | 2,5-Disulfoanilino | — | — | 4-Methyl | — | 1 | 1 | 2 |
| m168 | 2,3-Pyrido | Benzo | Benzo | Benzo | Ethylene | Phenyl | 2,5-Disulfoanilino | — | — | 4-Methoxy | — | 1 | 1 | 2 |
| m169 | 2,3-Pyrido | Benzo | Benzo | Benzo | Ethylene | Phenyl | 2,5-Disulfoanilino | — | — | 4-Fluoro | — | 1 | 1 | 2 |
| m170 | 2,3-Pyrido | Benzo | Benzo | Benzo | Ethylene | Phenyl | 2,5-Disulfoanilino | — | — | 2-Chloro | — | 1 | 1 | 2 |
| m171 | 2,3-Pyrido | Benzo | Benzo | Benzo | Ethylene | Phenyl | 2,5-Disulfoanilino | — | — | 2-Methyl | — | 2 | 1 | 2 |
| m172 | 2,3-Pyrido | Benzo | Benzo | Benzo | Ethylene | Phenyl | 2,5-Disulfoanilino | — | — | 2-Methoxy | — | 2 | 1 | 2 |
| m173 | 2,3-Pyrido | Benzo | Benzo | Benzo | Ethylene | Phenyl | 2,5-Disulfoanilino | — | — | Hydrogen | — | 2 | 1 | 2 |
| m174 | 2,3-Pyrido | Benzo | Benzo | Benzo | Ethylene | 2-Pyridyl | 2,5-Disulfoanilino | — | — | Hydrogen | — | 1 | 1 | 2 |
| m175 | Benzo | 2,3-Pyrido | 2,3-Pyrido | 2,3-Pyrido | Ethylene | 2-Pyridyl | 2,5-Disulfoanilino | — | — | Hydrogen | — | 1 | 0 | 1 |
| m176 | Benzo | 2,3-Pyrido | 2,3-Pyrido | Benzo | Ethylene | 2-Pyridyl | 2,5-Disulfoanilino | — | — | Hydrogen | — | 1 | 1 | 1 |
| m177 | 2,3-Pyrido | Benzo | Benzo | Benzo | Ethylene | Phenyl | 3,6,8-Trisulfo-1-naphthylamino | — | — | Hydrogen | — | 1 | 1 | 2 |
| m178 | Benzo | 2,3-Pyrido | 2,3-Pyrido | 2,3-Pyrido | Ethylene | Phenyl | 3,6,8-Trisulfo-1-naphthylamino | — | — | Hydrogen | — | 1 | 0 | 1 |
| m179 | Benzo | 2,3-Pyrido | 2,3-Pyrido | Benzo | Ethylene | Phenyl | 3,6,8-Trisulfo-1-naphthylamino | — | — | Hydrogen | — | 1 | 1 | 1 |
| m180 | 2,3-Pyrido | Benzo | Benzo | Benzo | Ethylene | Phenyl | 4,8-disulfo-2-naphthylamino | — | — | Hydrogen | — | 1 | 1 | 2 |

TABLE 80

| Compound | | | | | | | | Y | | | | | | |
|---|---|---|---|---|---|---|---|---|---|---|---|---|---|---|
| | | | | | | | | Y(3) | | Y(4) | Y(5) | | | |
| No. | A | B | C | D | E | F | X | $R^{101}$ | $R^{102}$ | $R^{201}$ | $R^{301}$ | a | b | c |
| m181 | 2,3-Pyrido | Benzo | Benzo | Benzo | Ethylene | 2-Pyridyl | 3,6-Disulfo-1-naphthylamino | — | — | 4-Chloro | — | 1 | 1 | 2 |
| m182 | 2,3-Pyrido | Benzo | Benzo | Benzo | Ethylene | Phenyl | 3,6-Disulfo-8-hydroxy-1-naphthylamino | — | — | Hydrogen | — | 1 | 2 | 1 |
| m183 | 2,3-Pyrido | Benzo | Benzo | Benzo | Ethylene | Phenyl | 4-Methoxy-2-sulfoanilino | — | — | Hydrogen | — | 1 | 2 | 1 |
| m184 | 2,3-Pyrido | Benzo | Benzo | Benzo | Ethylene | Phenyl | 4-Nitro-2-sulfoanilino | — | — | Hydrogen | — | 1 | 2 | 1 |
| m185 | 2,3-Pyrido | Benzo | Benzo | Benzo | Ethylene | Phenyl | 2-Chloro-5-sulfoanilino | — | — | Hydrogen | — | 1 | 2 | 1 |
| m186 | 2,3-Pyrido | Benzo | Benzo | Benzo | Ethylene | Phenyl | 3-Methyl-6-sulfoanilino | — | — | Hydrogen | — | 1 | 2 | 1 |
| m187 | 2,3-Pyrido | Benzo | Benzo | Benzo | Ethylene | Phenyl | 2-Carboxy-5-sulfoanilino | — | — | Hydrogen | — | 1 | 2 | 1 |
| m188 | 2,3-Pyrido | Benzo | Benzo | Benzo | Ethylene | Phenyl | 2,5-Dicarboxyanilino | — | — | Hydrogen | — | 1 | 2 | 1 |
| m189 | 2,3-Pyrido | Benzo | Benzo | Benzo | Ethylene | Phenyl | 3-Phosphoroamino | — | — | Hydrogen | — | 1 | 2 | 1 |
| m190 | 2,3-Pyrido | Benzo | Benzo | Benzo | Ethylene | Phenyl | 2-Hydroxy-3-acetylamino-5-sulfoanilino | — | — | Hydrogen | — | 1 | 2 | 1 |
| m191 | 2,3-Pyrido | Benzo | Benzo | Benzo | Ethylene | Phenyl | 5,7-Disulfo-2-naphthylamino | — | — | Hydrogen | — | 1 | 2 | 1 |
| m192 | 2,3-Pyrido | Benzo | Benzo | Benzo | Ethylene | 2-Pyridyl | 6,8-Disulfo-2-naphthylamino | — | — | Hydrogen | — | 1 | 2 | 1 |
| m193 | 2,3-Pyrido | Benzo | Benzo | Benzo | Ethylene | Phenyl | 3-Carboxy-4-hydroxy-5-sulfoanilino | — | — | 4-Methoxy | — | 1 | 2 | 1 |
| m194 | 2,3-Pyrido | Benzo | Benzo | Benzo | Ethylene | Phenyl | 3-Methyl-6-methoxy-4-sulfoanilino | — | — | 4-Sulfo | — | 1 | 2 | 1 |
| m195 | 2,3-Pyrido | Benzo | Benzo | Benzo | Ethylene | Phenyl | 4-Methylsulfonyl-2-sulfoanilino | — | — | Hydrogen | — | 1 | 2 | 1 |
| m196 | 2,3-Pyrido | Benzo | Benzo | Benzo | Ethylene | Phenyl | 4-Methylthio-2-sulfoanilino | — | — | Hydrogen | — | 1 | 2 | 1 |
| m197 | 2,3-Pyrido | Benzo | Benzo | Benzo | Ethylene | Phenyl | 3-Amino-4-sulfoanilino | — | — | 2-Methoxy | — | 1 | 2 | 1 |
| m198 | 2,3-Pyrido | Benzo | Benzo | Benzo | Ethylene | Phenyl | 4-Methylamino-5-sulfoanilino | — | — | 2-Chloro | — | 1 | 2 | 1 |
| m199 | 2,3-Pyrido | Benzo | Benzo | Benzo | Ethylene | Phenyl | 4-dimethylamino-5-sulfoanilino | — | — | Hydrogen | — | 1 | 2 | 1 |
| m200 | 2,3-Pyrido | Benzo | Benzo | Benzo | Ethylene | Phenyl | 4-Sulfamoyl-2-carboxyanilino | — | — | Hydrogen | — | 1 | 2 | 1 |

TABLE 81

| Compound | | | | | | | | Y | | | | | | |
|---|---|---|---|---|---|---|---|---|---|---|---|---|---|---|
| | | | | | | | | Y(3) | | Y(4) | Y(5) | | | |
| No. | A | B | C | D | E | F | X | $R^{101}$ | $R^{102}$ | $R^{201}$ | $R^{301}$ | a | b | c |
| m201 | 3,4-Pyrido | Benzo | Benzo | Benzo | Ethylene | — | 2,5-Disulfoanilino | — | — | — | Methyl | — | 2 | 1 |
| m202 | 3,4-Pyrido | Benzo | Benzo | Benzo | Ethylene | — | 2,4-Disulfoanilino | — | — | — | Methyl | — | 2 | 1 |
| m203 | 3,4-Pyrido | Benzo | Benzo | Benzo | Ethylene | — | 2-Sulfoanilino | — | — | — | Methyl | — | 2 | 1 |
| m204 | 3,4-Pyrido | Benzo | Benzo | Benzo | Ethylene | — | 3-Sulfoanilino | — | — | — | Methyl | — | 2 | 1 |
| m205 | 3,4-Pyrido | Benzo | Benzo | Benzo | Ethylene | — | 4-Sulfoanilino | — | — | — | Methyl | — | 2 | 1 |
| m206 | 3,4-Pyrido | Benzo | Benzo | Benzo | Ethylene | — | 2,5-Disulfoanilino | — | — | — | Ethyl | — | 2 | 1 |
| m207 | 3,4-Pyrido | Benzo | Benzo | Benzo | Ethylene | — | 2,5-Disulfoanilino | — | — | — | Isopropyl | — | 2 | 1 |

TABLE 81-continued

| Compound No. | A | B | C | D | E | F | X | Y: Y(3) R101 | Y: Y(3) R102 | Y: Y(4) R201 | Y: Y(5) R301 | a | b | c |
|---|---|---|---|---|---|---|---|---|---|---|---|---|---|---|
| m208 | 3,4-Pyrido | Benzo | Benzo | Benzo | Ethylene | — | 4-Methoxy-2-sulfoanilino | — | — | — | Methyl | — | 2 | 1 |
| m209 | 3,4-Pyrido | Benzo | Benzo | Benzo | Ethylene | — | 4-Nitro-2-sulfoanilino | — | — | — | Methyl | — | 2 | 1 |
| m210 | 3,4-Pyrido | Benzo | Benzo | Benzo | Ethylene | — | 2-Chloro-5-sulfoanilino | — | — | — | Methyl | — | 2 | 1 |
| m211 | 3,4-Pyrido | Benzo | 3,4-Pyrido | Benzo | Ethylene | — | 3-(Aminocarbonyl-amino)-5-sulfoanilino | — | — | — | Methyl | — | 1 | 1 |
| m212 | Benzo | 3,4-Pyrido | 3,4-Pyrido | 3,4-Pyrido | Ethylene | — | 2,5-Disulfoanilino | — | — | — | Methyl | — | 0 | 1 |
| m213 | Benzo | 3,4-Pyrido | 3,4-Pyrido | Benzo | Ethylene | — | 2,5-Disulfoanilino | — | — | — | Methyl | — | 1 | 1 |
| m214 | 3,4-Pyrido | Benzo | Benzo | Benzo | Propylene | — | 2-Hydroxy-3-acetylamino-5-sulfoanilino | — | — | — | Methyl | — | 2 | 1 |
| m215 | 3,4-Pyrido | Benzo | 3,4-Pyrido | Benzo | Propylene | — | 3-Carboxy-4-hydroxy-5-sulfoanilino | — | — | — | Methyl | — | 1 | 1 |
| m216 | 3,4-Pyrido | Benzo | 3,4-Pyrido | 3,4-Pyrido | Propylene | — | 2-Methyl-6-methoxy-4-sulfoanilino | — | — | — | Methyl | — | 0 | 1 |
| m217 | 3,4-Pyrido | Benzo | Benzo | Benzo | Ethylene | — | 5-Phosphano-2-sulfoanilino | — | — | — | Methyl | — | 2 | 1 |
| m218 | 2,3-Pyrido | Benzo | Benzo | Benzo | Ethylene | — | 2,5-Disulfoanilino | — | — | — | Hydrogen | — | 2 | 1 |
| m219 | 2,3-Pyrido | Benzo | Benzo | Benzo | Ethylene | — | 2-Sulfoanilino | — | — | — | Hydrogen | — | 2 | 1 |
| m220 | 2,3-Pyrido | Benzo | Benzo | Benzo | Ethylene | — | 3-Sulfoanilino | — | — | — | Hydrogen | — | 2 | 1 |
| m221 | 3,4-Pyrido | Benzo | Benzo | Benzo | Ethylene | — | 2,5-Disulfoanilino | — | — | — | Hydrogen | — | 2 | 1 |

[Component (B-n)]

A component (B-n), when added, can enhance the color gamut and significantly improve color development properties, ozone-gas resistance, and light resistance, compared to a conventional ink composition. The compound can be obtained, for example, by a method described in International Publication No. WO 2004/087815.

The ink composition of the present invention contains a porphyrazine coloring matter of the formula (n1). In other words, a porphyrazine coloring matter has been found to be highly suitable as an ink for ink-jet printing when the porphyrazine coloring matter has tetrabenzoporphyrazine (usually called phthalocyanine) as a coloring-matter nucleus and also has an unsubstituted sulfamoyl group and a particular substituted sulfamoyl group introduced thereinto. It has also been found that, as for a recorded matter obtained by using an ink containing the coloring matter, color development properties is excellent and light resistance is extremely excellent.

During synthesis, a phthalocyanine derivative may generally and inevitably be present with regioisomers thereof in which substituents $R^{101}$ to $R^{116}$ are attached to different positions in the formula (n6) (the positions to which $R^{101}$ to $R^{116}$ are bonded to benzene nuclei are defined as the 1-position to the 16-position, respectively). In most cases, these regioisomers are not distinctively expressed from each other, and are collectively regarded as a single derivative.

(n6)

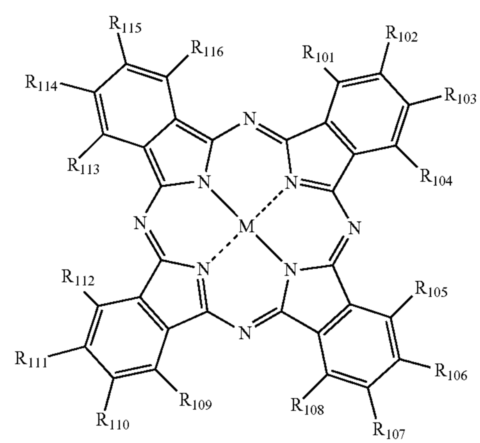

Phthalocyanine derivatives differing in positions of substitution are classified into three categories below. Each of the phthalocyanine derivatives differing in positions of substitution will be described as (i) a β-regioisomer, (ii) an α-regioisomer, or (iii) an α,β-mixed regioisomer.

(i)

β-Regioisomer: (a phthalocyanine compound having a substituent or substituents on the 2-position and/or the 3-position, on the 6-position and/or the 7-position, on the 10-position and/or the 11-position, or the 14-position and/or the 15-position)

(ii)

α-Regioisomer: (a phthalocyanine compound having a substituent or substituents on the 1-position and/or the 4-position, on the 5-position and/or the 8-position, on the 9-position and/or the 12-position, or on the 13-position and/or the 16-position)

(iii)

α,β-mixed regioisomer: (a phthalocyanine compound having a substituent or substituents on any position or positions from the 1-position to the 16-position)

The phthalocyanine coloring matter represented by the formula (n1) contained in the ink composition of the present invention belongs to the regioisomers (i) and (iii). In the method of the present invention, which of the β-regioisomer, the α-regioisomer, or the α,β-mixed regioisomer the substituted phthalocyanine coloring matter belongs to can be predicted from the position of substitution in a phthalic acid derivative used as a raw material (the phthalocyanine coloring matter has the corresponding position of substitution). Otherwise, the phthalocyanine coloring matter can be subjected to degradation using nitric acid or the like into phthalic acid derivatives, which are then subjected to NMR examination to identify the positions of substitution in the derivatives.

In the formula (n1), M is a hydrogen atom, a metal atom or an oxide thereof, a hydroxide, or a halide. Specific examples of the metal atom include Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, and Bi. Examples of the metal oxide include VO, GeO, and the like. Examples of the metal hydroxide include $Si(OH)_2$, $Cr(OH)_2$, $Sn(OH)_2$, AlOH, and the like. Furthermore, examples of the metal halide include $SiCl_2$, VCl, $VCl_2$, VOCl, FeCl, GaCl, ZrCl, AlCl, and the like. Among these, Cu, Ni, Zn, Al, and AlOH are preferable and Cu is most preferable.

In the formula (n1), $R^{117}$ and $R^{118}$ are independently a hydrogen atom, a substituted or unsubstituted alkyl group, a substituted or unsubstituted cycloalkyl group, a substituted or unsubstituted aralkyl group, a substituted or unsubstituted aryl group, a substituted or unsubstituted heterocyclic group, or a substituted or unsubstituted alkenyl group, and A is a crosslinking group, with adjacent $R^{117}$s, adjacent $R^{118}$s, and/or adjacent As being optionally bonded to each other to form a ring. Y and Z are independently a halogen atom, a hydroxy group, a sulfo group, a carboxy group, an amino group, a substituted or unsubstituted alkoxy group, a substituted or unsubstituted cycloalkyloxy group, a substituted or unsubstituted allyloxy group, a substituted or unsubstituted heterocyclic oxy group, a substituted or unsubstituted alkenyloxy group, a substituted or unsubstituted alkylamino group, a substituted or unsubstituted cycloalkylamino group, a substituted or unsubstituted arylamino group, a substituted or unsubstituted heterocyclic amino group, a substituted or unsubstituted alkenylamino group, a substituted or unsubstituted dialkylamino group, a substituted or unsubstituted alkylthio group, a substituted or unsubstituted arylthio group, a substituted or unsubstituted heterocyclic thio group, a substituted or unsubstituted aralkylthio group, or a substituted or unsubstituted alkenylthio group. At least one of Y and Z has a sulfo group, a carboxy group, or an ionic hydrophilic group as a substituent.

The substituted or unsubstituted alkyl group as or in $R^{117}$ and $R^{118}$ in the formula (n1) is a C1-12 alkyl group, for example. Such a substituent is a sulfo group, a carboxy group, a phosphate group, a hydroxy group, an alkoxy group, an amino group (optionally substituted with one or more groups selected from an alkyl group, an aryl group, and an acetyl group), an aryl group, a halogen atom, or a cyano group, for example.

The substituted or unsubstituted cycloalkyl group as or in $R^{117}$ and $R^{118}$ in the formula (n1) is a C3-12 cycloalkyl group, for example. Such a substituent is a sulfo group, a carboxy group, a phosphate group, a hydroxy group, an alkoxy group, an amino group (optionally substituted with one or more groups selected from an alkyl group, an aryl group, and an acetyl group), an aryl group, a halogen atom, or a cyano group, for example.

The substituted or unsubstituted aralkyl group as or in $R^{117}$ and $R^{118}$ in the formula (n1) is an aralkyl group in which the alkyl moiety contains 1 to 12 carbon atoms, for example. Such a substituent is a sulfo group, a carboxy group, a phosphate group, a hydroxy group, an alkoxy group, an amino group (optionally substituted with one or more groups selected from an alkyl group, an aryl group, and an acetyl group), an aryl group, a halogen atom, or a cyano group, for example.

The substituted or unsubstituted aryl group as or in $R^{117}$ and $R^{118}$ in the formula (n1) is a phenyl group or a naphthyl group, for example. Such a substituent is a sulfo group, a carboxy group, a phosphate group, a hydroxy group, an amino group (optionally substituted with one or more groups selected from an alkyl group, an aryl group, and an acetyl group), a ureido group, an alkyl group, an alkoxy group, a nitro group, a cyano group, a heterocyclic group, or a halogen atom, for example.

The substituted or unsubstituted heterocyclic group as or in $R^{117}$ and $R^{118}$ in the formula (n1) is preferably a 5- or 6-membered ring, and may further be ring-condensed. The substituted or unsubstituted heterocyclic group as or in $R^{117}$ and $R^{118}$ in the formula (n1) may be either of an aromatic heterocyclic ring and a non-aromatic heterocyclic ring. Examples of the heterocyclic ring include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, pyrrolidine, piperidine, piperazine, imidazolidine, and thiazoline. The heterocyclic ring may have a substituent, and the substituent is, for example, a sulfo group, a carboxy group, a phosphate group, a hydroxy group, an amino group (optionally substituted with one or more groups selected from an alkyl group, an aryl group, and an acetyl group), a ureido group, an alkyl group, an alkoxy group, a nitro group, a cyano group, and a heterocyclic group, each of which is optionally substituted with one or more groups selected from a halogen atom, a sulfo group, a carboxy group, a hydroxy group, an alkyl group, an aryl group, and an acetyl group.

The substituted or unsubstituted alkenyl group as or in $R^{117}$ and $R^{118}$ in the formula (n1) is a C1-12 alkenyl group, for example. The substituent is a sulfo group, a carboxy group, a phosphate group, a hydroxy group, an alkoxy group, an amino group (optionally substituted with one or more groups selected from an alkyl group, an aryl group, and an acetyl group), an aryl group, a halogen atom, or a cyano group, for example.

In the formula (n1), A is a crosslinking group. The crosslinking group is an alkylene group, a cycloalkylene group, or an arylene group, for example, and may also be a group formed from a combination of these groups. The group formed from a combination of these groups is a xylylene group, for example. A may also form a crosslinking group together with $R^{117}$ and $R^{118}$. The crosslinking group may have a substituent. The substituent is a sulfo group, a carboxy group, or a hydroxy group, for example.

The alkylene group is a C1-16 alkylene, for example. Some of the carbon atoms in the alkylene group is optionally substituted with a nitrogen atom, an oxygen atom, and/or a sulfur atom. The alkylene group may also be a group formed of a combination of an alkylene and a cycloalkylene.

The cycloalkylene group is a C3-16 cycloalkylene group, for example. Some of the carbon atoms in the cycloalkylene group is optionally substituted with a nitrogen atom, an oxygen atom, and/or a sulfur atom. The cycloalkylene group may also be a group formed of a combination of a cycloalkylene group and an alkylene group. The cycloalkylene group may be either a bridged cyclic hydrocarbon or a spirocyclic hydrocarbon.

The arylene group is a phenylene group or a naphthylene group, for example. Each of which optionally has a substituent. The substituent is a sulfo group, a carboxy group, a phosphate group, a hydroxy group, an amino group (optionally substituted with one or more groups selected from an alkyl group, an aryl group, and an acetyl group), a ureido group, an alkyl group, an alkoxy group, a nitro group, a cyano group, or a halogen atom, for example.

In the formula (n1), Y and Z are independently a halogen atom, a hydroxy group, a sulfo group, a carboxy group, an amino group, a substituted or unsubstituted alkoxy group, a substituted or unsubstituted cycloalkoxy group, a substituted or unsubstituted allyloxy group, a substituted or unsubstituted heterocyclic oxy group, a substituted or unsubstituted aralkyloxy group, a substituted or unsubstituted alkenyloxy group, a substituted or unsubstituted alkylamino group, a substituted or unsubstituted cycloalkylamino group, a substituted or unsubstituted dialkylamino group, a substituted or unsubstituted arylamino group, a substituted or unsubstituted heterocyclic amino group, a substituted or unsubstituted aralkylamino group, a substituted or unsubstituted alkenylamino group, a substituted or unsubstituted alkylthio group, a substituted or unsubstituted cycloalkylthio group, a substituted or unsubstituted arylthio group, a substituted or unsubstituted heterocyclic thio group, a substituted or unsubstituted aralkylthio group, or a substituted or unsubstituted alkenylthio group. At least one of Y and Z has a sulfo group, a carboxy group, or an ionic hydrophilic group as a substituent. The ionic hydrophilic group is present as a substituent. The ionic hydrophilic group is preferably an anionic hydrophilic group such as a sulfo group, a carboxy group, a phosphate group, or a hydroxy group. The ionic hydrophilic group may be present as a free form thereof, or may be present as an alkali metal salt, an alkaline-earth metal salt, an onium ion salt of an organic amine, or an ammonium salt. Examples of the alkali metal include sodium and potassium. Examples of the alkaline-earth metal include calcium and magnesium. An alkylamine as the organic amine is a C1-4 lower alkylamine such as methylamine and ethylamine, for example. An alkanolamine is a mono-, di-, or tri-(C1-4 lower alkanol) amine such as monoethanolamine, diethanolamine, triethanolamine, monoisopropanolamine, diisopropanolamine, or triisopropanolamine, for example. Salts of ammonium, sodium, potassium, lithium, monoethanolamine, diethanolamine, triethanolamine, monoisopropanolamine, diisopropanolamine, triisopropanolamine are preferable.

The substituted or unsubstituted alkoxy group is a C1-12 alkoxy group, for example. The substituent is a sulfo group, a carboxy group, a phosphate group, a hydroxy group, an alkoxy group, an amino group (optionally substituted with one or more groups selected from an alkyl group, an aryl group, and an acetyl group), an aryl group, a halogen atom, or a cyano group, for example. Among these, a sulfo group, a carboxy group, a phosphate group, or a hydroxyhydroxy group is preferable.

The substituted or unsubstituted cycloalkoxy group is a C3-12 cycloalkoxy group, for example. The substituent is a sulfo group, a carboxy group, a phosphate group, a hydroxy group, an alkoxy group, an amino group (optionally substituted with one or more groups selected from an alkyl group, an aryl group, and an acetyl group), an aryl group, a halogen atom, or a cyano group, for example. Among these, a sulfo group, a carboxy group, a phosphate group, or a hydroxyhydroxy group is preferable.

The substituted or unsubstituted allyloxy group is a phenoxy group or a naphthoxy group, for example. The substituent is a sulfo group, a carboxy group, a phosphate group, a hydroxy group, an amino group (optionally substituted with one or more groups selected from an alkyl group, an aryl group, and an acetyl group), a ureido group, an alkyl group, an alkoxy group, a nitro group, a cyano group, a heterocyclic group, or a halogen atom, for example. Among these, a sulfo group, a carboxy group, a phosphate group, or a hydroxy group is preferable.

The substituted or unsubstituted heterocyclic oxy group is preferably a 5- or 6-membered ring, and may further be ring-condensed. The substituted or unsubstituted heterocyclic oxy group may be either an aromatic heterocyclic ring or a non-aromatic heterocyclic ring. Examples of the heterocyclic ring include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, pyrrolidine, piperidine, piperazine, imidazolidine, thiazoline, and the like. The heterocyclic ring may have a substituent, and the substituent is a sulfo group, a carboxy group, a phosphate group, a hydroxy group, an amino group (optionally substituted with one or more groups selected from an alkyl group, an aryl group, and an acetyl group), a ureido group, an alkyl group, an alkoxy group, a nitro group, a cyano group, or a halogen atom, for example.

The substituted or unsubstituted aralkyloxy group is a C1-12 aralkyloxy group, for example. The substituent is a sulfo group, a carboxy group, a phosphate group, a hydroxy group, an amino group (optionally substituted with one or more groups selected from an alkyl group, an aryl group, and an acetyl group optionally substituted with one or more groups selected from an alkyl group, an aryl group, and an acetyl group), a ureido group, an alkyl group, an alkoxy group, a nitro group, a cyano group, a heterocyclic group, or halogen atom, for example. Among these, a sulfo group, a carboxy group, a phosphate group, or a hydroxy group is preferable.

The substituted or unsubstituted alkenyloxy group is a C1-12 alkenyloxy group, for example. The substituent is a sulfo group, a carboxy group, a phosphate group, a hydroxy group, an alkoxy group, an amino group (optionally substituted with one or more groups selected from an alkyl group, an aryl group, and an acetyl group), an aryl group, a halogen atom, or a cyano group, for example. Among these, a sulfo group, a carboxy group, a phosphate group, or a hydroxy group is preferable.

The substituted or unsubstituted alkylamino group is a C1-12 alkylamino group, for example. The substituent is a sulfo group, a carboxy group, a phosphate group, a hydroxy group, an alkoxy group, an amino group (optionally substituted with one or more groups selected from an alkyl group, an aryl group, and an acetyl group), an aryl group, a halogen atom, or a cyano group, for example. Among these, a sulfo group, a carboxy group, a phosphate group, or a hydroxy group is preferable.

The substituted or unsubstituted cycloalkylamino group is a C1-12 cycloalkylamino group, for example. The substituent is a sulfo group, a carboxy group, a phosphate group, a hydroxy group, an alkoxy group, an amino group (optionally substituted with an alkyl group, an aryl group, and an acetyl group), an aryl group, a halogen atom, or a cyano group, for example. Among these, a sulfo group, a carboxy group, a phosphate group, or a hydroxy group is preferable.

The substituted or unsubstituted arylamino group is an anilino group or a nalthylamino group, for example. The substituent is a sulfo group, a carboxy group, a phosphate group, a hydroxy group, an amino group (optionally substituted with one or more groups selected from an alkyl group, an aryl group, and an acetyl group), a ureido group, an alkyl group, an alkoxy group, a nitro group, a cyano group, a heterocyclic group, or a halogen atom, for example. Among these, a sulfo group, a carboxy group, a phosphate group, or a hydroxy group is preferable.

The substituted or unsubstituted heterocyclic amino group is preferably a 5- or 6-membered ring, and may further be ring-condensed. The substituted or unsubstituted heterocyclic amino group may be either an aromatic heterocyclic ring or a non-aromatic heterocyclic ring. Examples of the heterocyclic ring include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, pyrrolidine, piperidine, piperazine, imidazolidine, and thiazoline, for example. The heterocyclic ring may have a substituent, and the substituent is a sulfo group, a carboxy group, a phosphate group, a hydroxy group, an amino group (optionally substituted with one or more groups selected from an alkyl group, an aryl group, and an acetyl group), a ureido group, an alkyl group, an alkoxy group, a nitro group, a cyano group, or a halogen atom, for example.

The substituted or unsubstituted aralkylamino group is a C1-12 aralkylamino group, for example. The substituent is a sulfo group, a carboxy group, a phosphate group, a hydroxy group, an amino group (optionally substituted with one or more groups selected from an alkyl group, an aryl group, and an acetyl group), a ureido group, an alkyl group, an alkoxy group, a nitro group, a cyano group, a heterocyclic group, or a halogen atom, for example. Among these, a sulfo group, a carboxy group, a phosphate group, or a hydroxy group is preferable.

The substituted or unsubstituted alkenylamino group is a C2-12 alkenylamino group, for example. The substituent is a sulfo group, a carboxy group, a phosphate group, a hydroxy group, an alkoxy group, an amino group (optionally substituted with one or more groups selected from an alkyl group, an aryl group, and an acetyl group), an aryl group, a halogen atom, or a cyano group, for example. Among these, a sulfo group, a carboxy group, a phosphate group, or a hydroxy group is preferable.

The substituted or unsubstituted alkylthio group is a C1-12 alkylthio group, for example. The substituent is a sulfo group, a carboxy group, a phosphate group, a hydroxy group, an alkoxy group, an amino group (optionally substituted with one or more groups selected from an alkyl group, an aryl group, and an acetyl group), an aryl group, a halogen atom, or a cyano group, for example. Among these, a sulfo group, a carboxy group, a phosphate group, or a hydroxy group is preferable.

The substituted or unsubstituted cycloalkylthio group is a C3-12 cycloalkylthio group, for example. The substituent is a sulfo group, a carboxy group, a phosphate group, a hydroxy group, an alkoxy group, an amino group (optionally substituted with one or more groups selected from an alkyl group, an aryl group, and an acetyl group), an aryl group, a halogen atom, or a cyano group, for example. Among these, a sulfo group, a carboxy group, a phosphate group, or a hydroxy group is preferable.

The substituted or unsubstituted arylthio group is a phenylthio group or a naphthylthio group, for example. The substituent is a sulfo group, a carboxy group, a phosphate group, a hydroxy group, an amino group (optionally substituted with one or more groups selected from an alkyl group, an aryl group, and an acetyl group), a ureido group, an alkyl group, an alkoxy group, a nitro group, a cyano group, a heterocyclic group, or a halogen atom, for example. Among these, a sulfo group, a carboxy group, a phosphate group, or a hydroxy group is preferable.

The substituted or unsubstituted heterocyclic thio group is preferably a 5- or 6-membered ring, and may further be ring-condensed. The substituted or unsubstituted heterocyclic thio group may be either an aromatic heterocyclic ring or a non-aromatic heterocyclic ring. Examples of the heterocyclic ring include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, pyrrolidine, piperidine, piperazine, imidazolidine, thiazoline and the like. The heterocyclic ring may have a substituent, and the substituent is a sulfo group, a carboxy group, a phosphate group, a hydroxy group, an amino group (optionally substituted with one or more groups selected from an alkyl group, an aryl group, and an acetyl group), a ureido group, an alkyl group, an alkoxy group, a nitro group, a cyano group, or a halogen atom, for example.

The substituted or unsubstituted aralkylthio group is a C1-12 aralkylthio group, for example. The substituent is a sulfo group, a carboxy group, a phosphate group, a hydroxy group, an amino group (optionally substituted with one or more groups selected from an alkyl group, an aryl group, and an acetyl group), a ureido group, an alkyl group, an alkoxy group, a nitro group, a cyano group, a heterocyclic group, or a halogen atom, for example. Among these, a sulfo group, a carboxy group, a phosphate group, or a hydroxy group is preferable.

The substituted or unsubstituted alkenylthio group is a C2-12 alkenylthio group, for example. The substituent is a sulfo group, a carboxy group, a phosphate group, a hydroxy group, an alkoxy group, an amino group (optionally substituted with one or more groups selected from an alkyl group, an aryl group, and an acetyl group), an aryl group, a halogen atom, or a cyano group, for example. Among these, a sulfo group, a carboxy group, a phosphate group, or a hydroxy group is preferable.

In the formula (n1), each of the number (m) of the unsubstituted sulfamoyl group and the number (n) of the substituted sulfamoyl group is 1 to 3, with the sum of m and n being 2 to 4.

When the number (m) of the unsubstituted sulfamoyl group in the formula (n1) is relatively great, ozone resistance increases, accompanied by decreased solubility in water to make ink production difficult. On the other hand, when the number (n) of the substituted sulfamoyl group in the formula (n1) is relatively great, solubility in water increases and a bronzing phenomenon tends not to occur, accompanied by decreasing tendency of ozone resistance. Therefore, the ratio of the unsubstituted sulfamoyl group and the substituted sulfamoyl group may be regulated, as needed, depending on the kind of the substituted sulfamoyl group to achieve a good balance. Specific examples of a combination of M and the substituted sulfamoyl group in the mixed phthalocyanine coloring matter represented by the formula (n1) of the present invention are shown in Tables 88 and 89. The mixed phthalocyanine coloring matter used in the present invention, however, is not limited to the following examples. It should be noted that, in the tables, the substituted sulfamoyl group is expressed in a form of a free acid. It is not limited to the following examples. It should be noted that, in the tables, the formula (n1) is expressed in a form of a free acid.

TABLE 82

| No. | M | 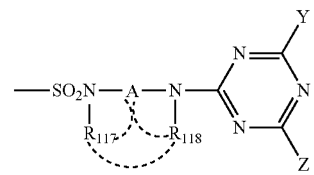 |
|---|---|---|
| n1 | Cu | 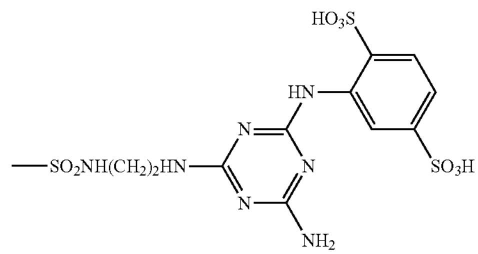 |
| n2 | Cu | 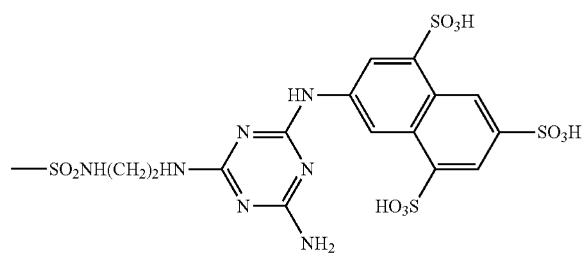 |
| n3 | Cu | 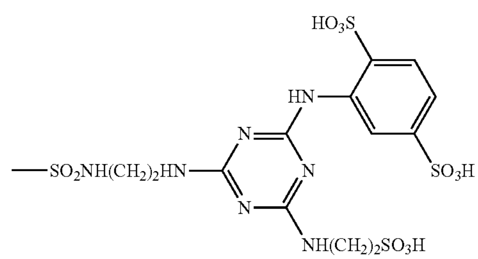 |
| n4 | Cu | 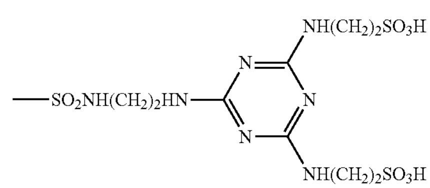 |

TABLE 82-continued
| No. | M | 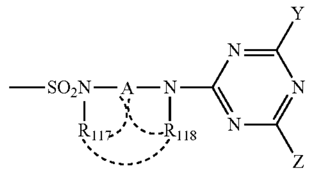 |
|---|---|---|
| n5 | Cu | 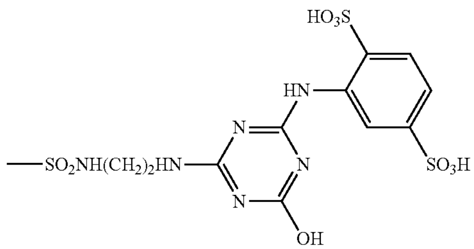 |
| n6 | Cu | 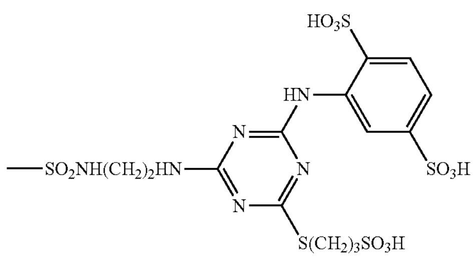 |
| n7 | Cu | 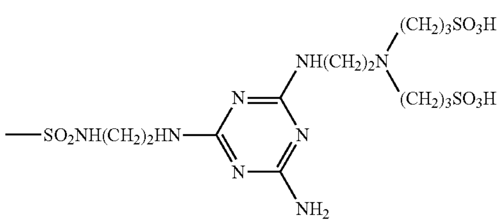 |
TABLE 83
| No. | M | 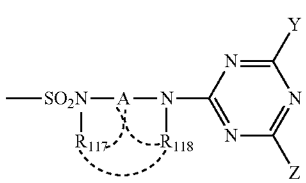 |
|---|---|---|
| n8 | Cu | 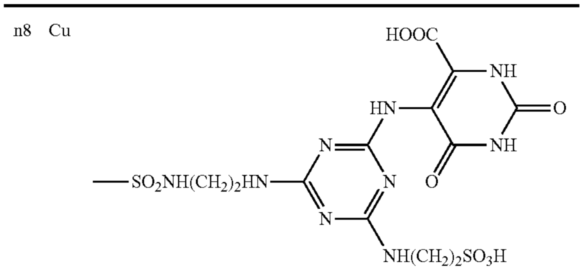 |
TABLE 83-continued
| No. | M | 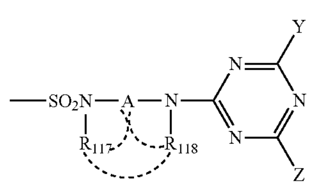 |
|---|---|---|
| n9 | Cu | 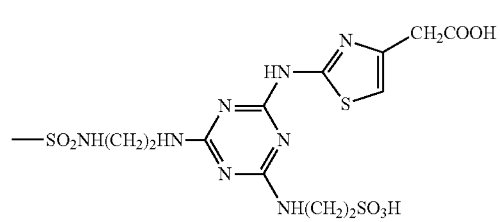 |

TABLE 83-continued
| No. | M | 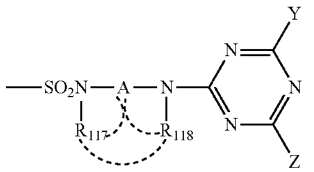 |
|---|---|---|
| n10 | Cu | 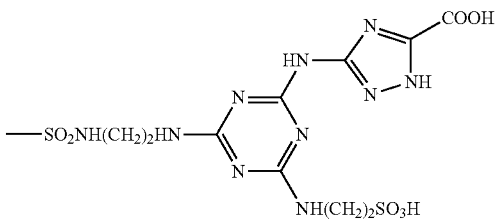 |
| n11 | Cu | 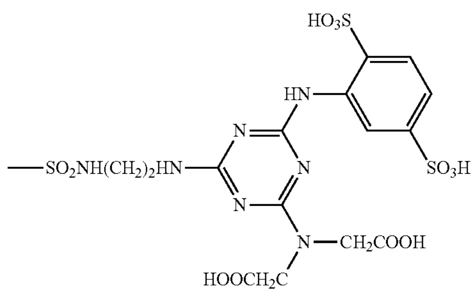 |
| n12 | Cu | 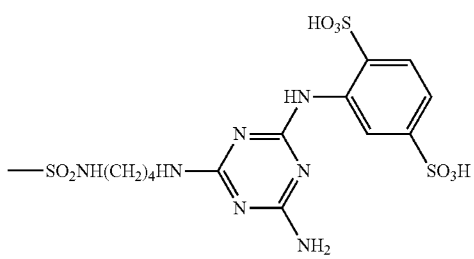 |
TABLE 83-continued
| No. | M | 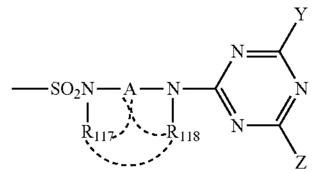 |
|---|---|---|
| n13 | Cu | 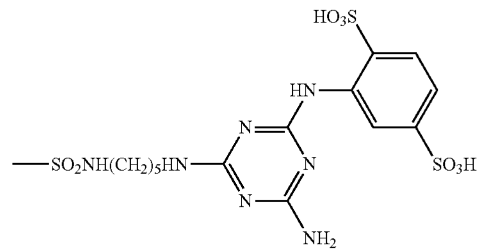 |
| n14 | Cu | 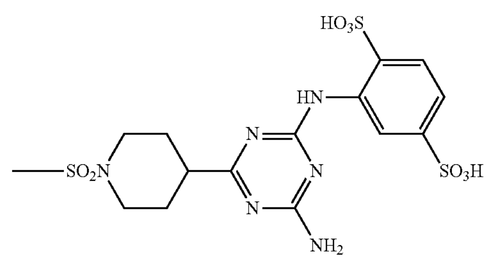 |
TABLE 84
| No. | M | 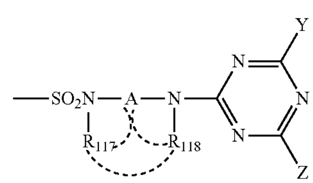 |
|---|---|---|
| n15 | Cu | 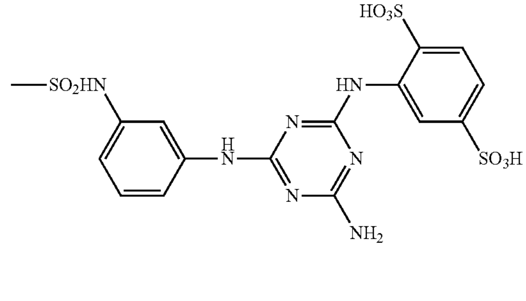 |

TABLE 84-continued
| No. | M | 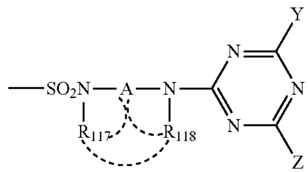 |
| --- | --- | --- |
| n16 | Cu | 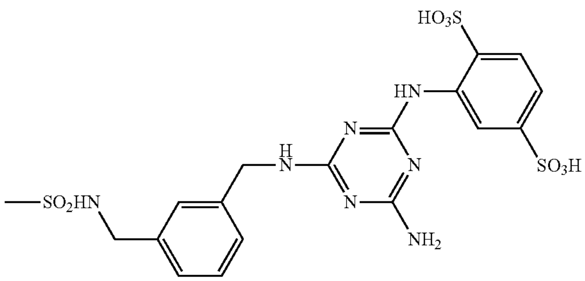 |
| n17 | Cu | 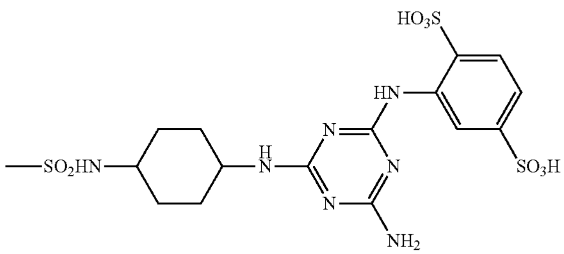 |
| n18 | Cu | 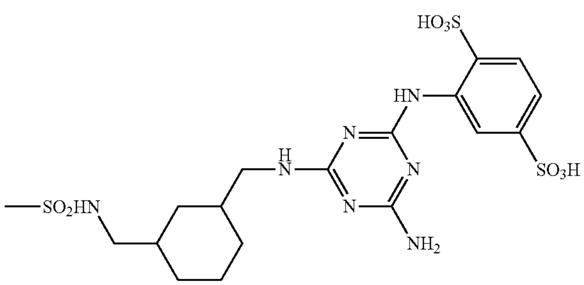 |
| n19 | Cu | 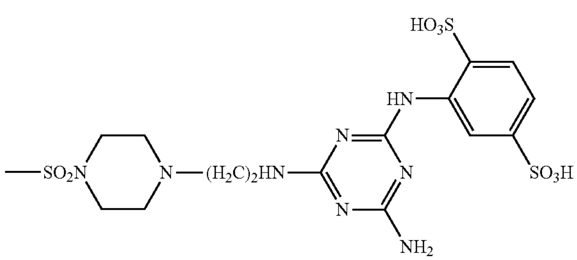 |
| n20 | Cu | 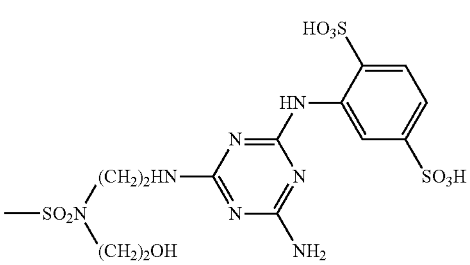 |

TABLE 85
| No. | M | 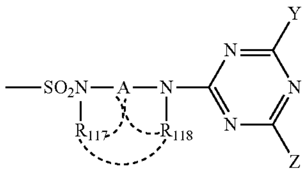 |
|---|---|---|
| n21 | Cu | 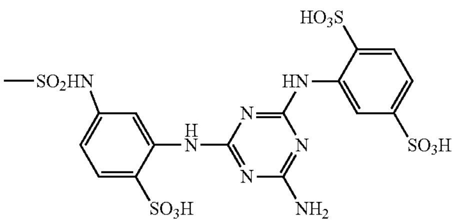 |
| n22 | Cu | 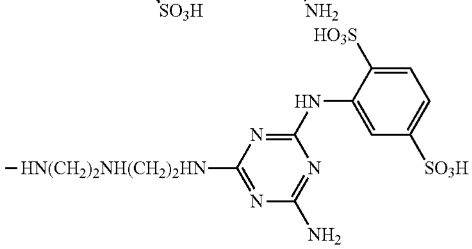 |
| n23 | Cu | 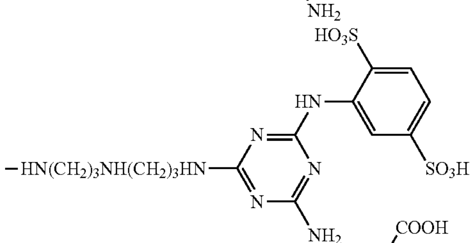 |
| n24 | Cu | 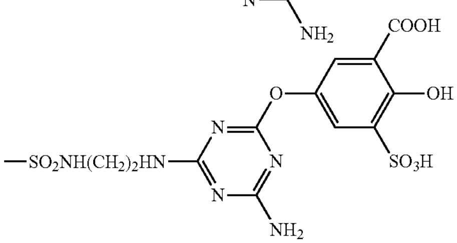 |
TABLE 85-continued
| No. | M | 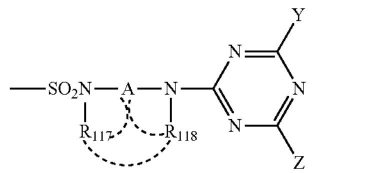 |
|---|---|---|
| n25 | Cu | 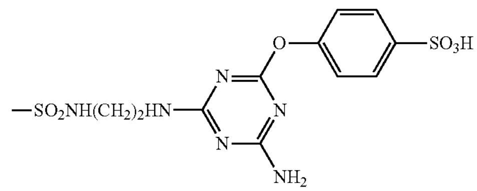 |
| n26 | Cu | 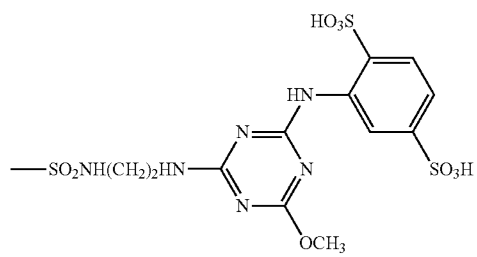 |
| n27 | Cu | 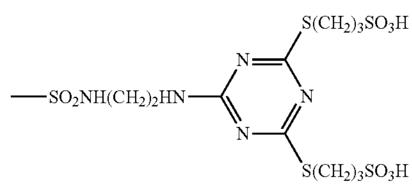 |
TABLE 86
| No. | M | 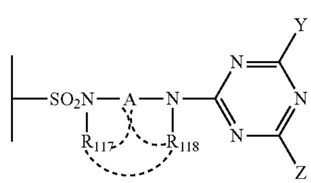 |
|---|---|---|
| n28 | Cu | 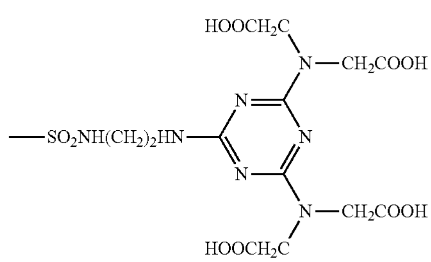 |

TABLE 86-continued
| No. | M | 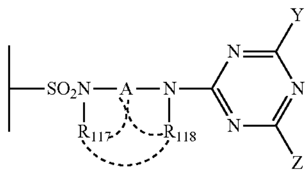 |
|---|---|---|
| n29 | Cu | 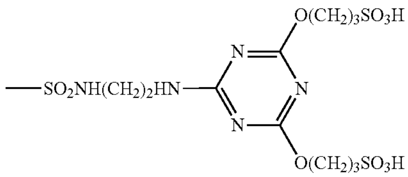 |
| n30 | Cu | 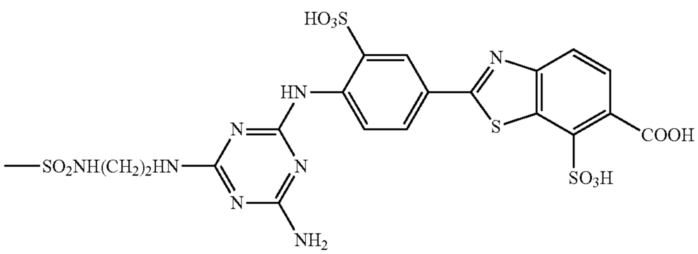 |
| n31 | Cu | 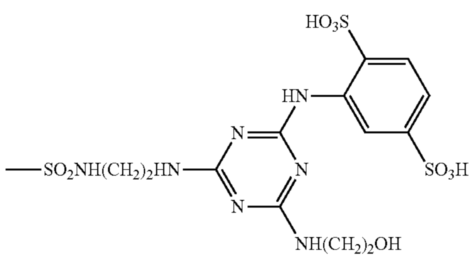 |
| n32 | Cu | 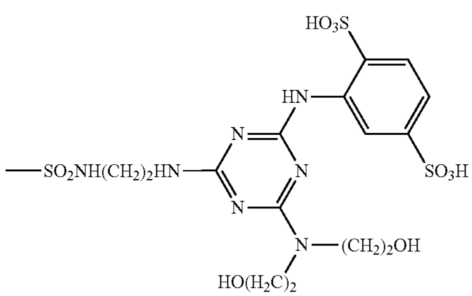 |
| n33 | Cu | 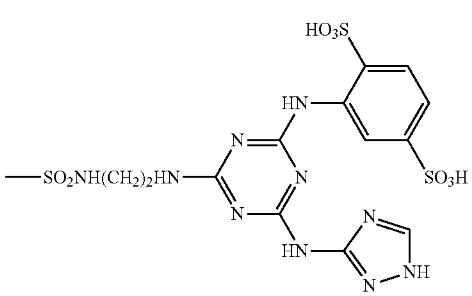 |

TABLE 87
| No. | M | 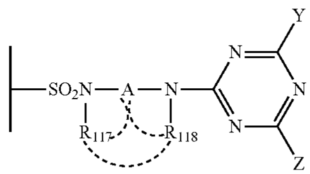 |
|---|---|---|
| n34 | Cu | 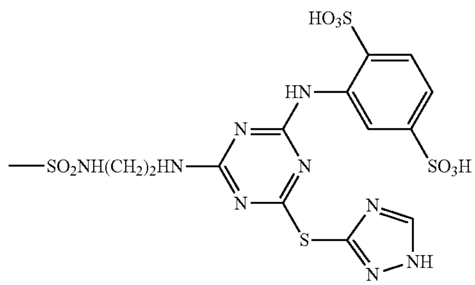 |
| n35 | Cu | 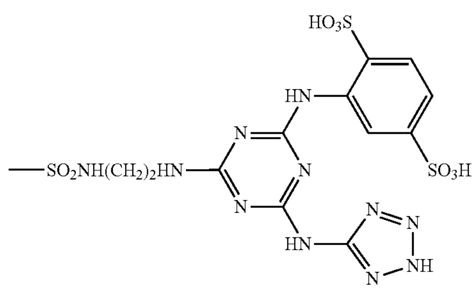 |
| n36 | Cu | 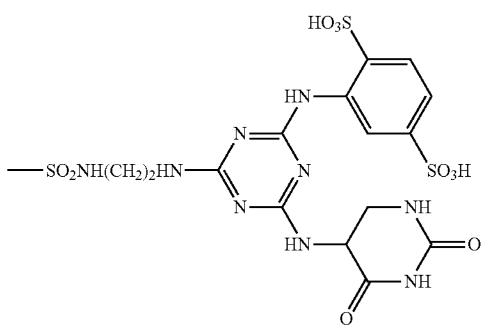 |
| n37 | Cu | 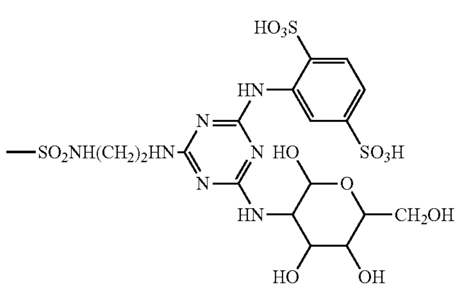 |
TABLE 87-continued
| No. | M | 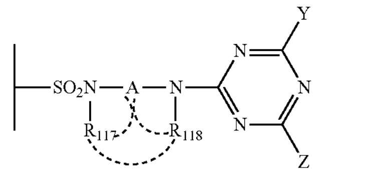 |
|---|---|---|
| n38 | Cu | 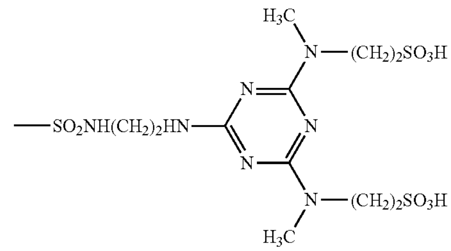 |
| n39 | Cu | 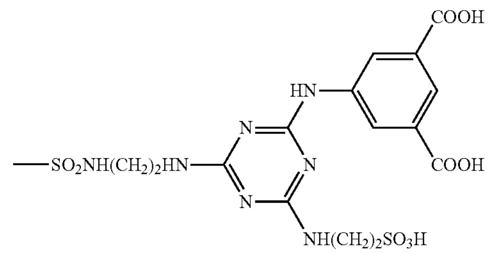 |
TABLE 88
| No. | M | 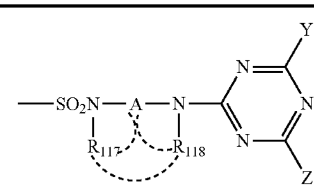 |
|---|---|---|
| n40 | Cu | 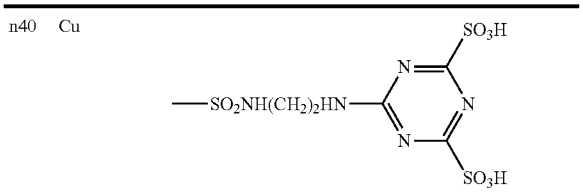 |
| n41 | Cu | 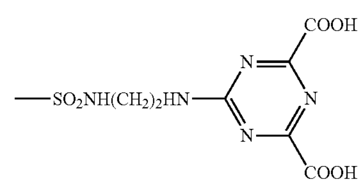 |
| n42 | Ni | 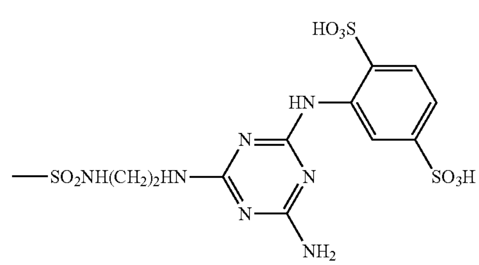 |

TABLE 88-continued

| No. | M | 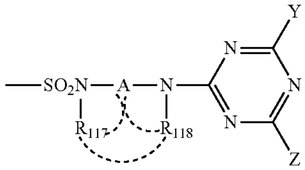 |
|---|---|---|
| n43 | Ni | 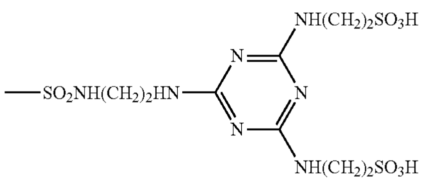 |
| n44 | Zn | 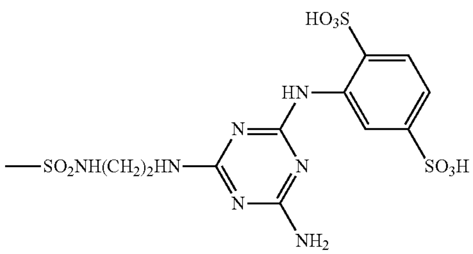 |
| n45 | Zn | 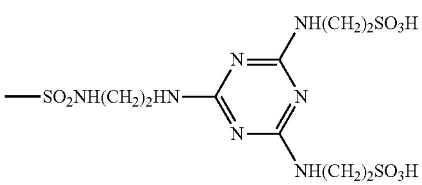 |
| n46 | AlOH | 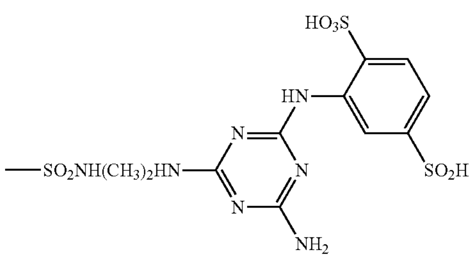 |
| n47 | AlOH | 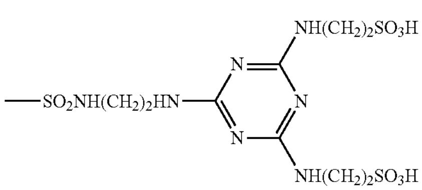 |

A method for producing the coloring matter represented by the formula (n1) will be described.

The coloring matter represented by the formula (n1) in a form of the regioisomer (iii) is obtained as follows, for example. Phthalocyanine (pigment) is subjected to chlorosulfonation, or a phthalocyanine compound having a sulfo group or a salt thereof is subjected to chlorination, and thereby giving phthalocyanine sulfonic acid chloride. As the phthalocyanine (pigment) or the phthalocyanine compound having a sulfo group, one in which a central metal thereof is a metal corresponding to M in the formula (n1) can be selected and used. In order to produce a compound having copper as M in the formula (n1), copper phthalocyanine (pigment) or a copper phthalocyanine compound having a sulfo group or a salt thereof (such as DirectBlue 86, DirectBlue 87, and the like) may be used, for example. The reaction is usually carried out in an organic solvent, sulfuric acid, fuming sulfuric acid, or chlorosulfonic acid. Non-limitative examples of the organic solvent include benzene, toluene, nitrobenzene, chlorobenzene, N,N-dimethylformamide, and N,N-dimethylacetamide. Non-limitative examples of a chlorosulfonating agent or a chlorinating agent include chlorosulfonic acid, thionyl chloride, sulfuryl chloride, phosphorus trichloride, phosphorus pentachloride, and phosphorus oxychloride. The resulting phthalocyanine sulfonic acid chloride has two to four chlorosulfone groups, and there can be multiple combinations of positions of substitution of the chlorosulfone groups.

Subsequently, a suitable phthalocyanine sulfonic acid chloride, a corresponding organic amine represented by the formula (n3), and an aminating agent are subjected to a reaction in a hydrous solvent, usually at pH8 to pH10, usually at 5 to 70° C., and usually for 1 to 20 hours to give a desired compound. Non-limitative examples of the aminating agent used in the reaction include an ammonium salt such as ammonium chloride and ammonium sulfate, urea, an aqueous ammonia solution, and ammonia gas.

Usually, the amount of the organic amine used is usually 1 or more times the theoretical mol value relative to 1 mol of the phthalocyanine compound, but is not limited to this range since the amount varies depending on the reactivity of the organic amine and reaction conditions.

The corresponding organic amine represented by the formula (n3) can be obtained by carrying out a method described in International Publication No. WO 2004/087815.

The coloring matter represented by the formula (n1) may contain, and the reaction product may be contaminated by, an impurity that is a dimer (Pc-L-Pc, for example) or a trimer of a phthalocyanine ring (Pc) formed via a divalent linking group (L). In this case, a plurality of Ls that are present may be the same as or different from each other. The divalent linking group represented by L is a sulfonyl group $—SO_2—$ or $—SO_2—NH—SO_2—$, for example, and may also be a group formed of a combination of these groups.

The coloring matter represented by the formula (n1) in a form of the regioisomer (i) is obtained by synthesizing a metal phthalocyanine sulfonic acid represented by the formula (n4). The coloring matter represented by the formula (n4) can be synthesized by carrying out a method described in International Publication No. WO 2004/087815.

In the case of the regioisomer (i), a 4-sulfophthalic acid derivative used as a raw material usually contains about 15 to 25% by mass of an impurity that has sulfonation on the 3-position, and an α-regioisomer derived from the impurity contaminates the phthalocyanine coloring matter as the end product. In order to further enhance the effects of the present invention (particularly for obtaining an ink with even higher ozone resistance), the raw material used preferably contains a lower content of the impurity that has sulfonation on the 3-position. As for the phthalocyanine coloring matter as the end product, the reaction product contains contaminators that are yielded by degradation of some chlorosulfone groups occurred during the reaction, however, it does not cause particular problems. The resulting coloring matter is represented by the formula (n1), and is thought to be predominantly composed of the β-regioisomer, in other words, contain at least not lower than 60%, preferably not lower than 70%, and further preferably not lower than 75% of the β-regioisomer.

[Component (B-o)]

A component (B-o), when added, can enhance the color gamut and improve color development properties and ozone-gas resistance. The compound can be obtained, for example, by a method described in International Publication No. WO 2012/081640.

A compound represented by the formula (o1) preferably has the maximum absorbance at a wavelength within the range from 400 nm to 600 nm.

In the formula (o1), $R^{101}$ is a hydrogen atom; a benzoyl group; a benzoyl group substituted with at least one group selected from the group consisting of a halogen atom, a (C1-C4) alkyl group, a (C1-C4) alkoxy group, a sulfo group, and a carboxy group; a (C1-C4) alkoxycarbonyl group; a (C6-C10) aryloxycarbonyl group; or a (C6-C10) aryl (C1-C4) alkoxycarbonyl group.

Examples of the benzoyl group substituted with at least one group selected from the group consisting of a halogen atom, a (C1-C4) alkyl group, a (C1-C4) alkoxy group, a sulfo group, and a carboxy group as or in $R^{101}$ in the formula (o1) include ones in which a carbon atom of the benzoyl group has a substituent attached thereto. The number of substitution is 1 to 3, preferably 1 or 2, and more preferably 1. Examples of a halogen atom, a (C1-C4) alkyl group, and a (C1-C4) alkoxy group as substituents are the same as the examples of the halogen atom, the (C1-C4) alkyl group, and the (C1-C4) alkoxy group as or in $R^1$, $R^2$, $R^5$, $R^6$, and $R^7$ described above, including specific examples, preferable examples, and more preferable examples thereof. Specific examples include ones substituted with a halogen atom, such as a fluorobenzoyl group, a chlorobenzoyl group, a bromobenzoyl group, and a iodobenzoyl group; ones substituted with a (C1-C4) alkyl group, such as a methylbenzoyl group, an ethylbenzoyl group, an n-propylbenzoyl group, an isopropylbenzoyl group, an n-butylbenzoyl group, and a tert-butylbenzoyl group; ones substituted with a (C1-C4) alkoxy group, such as a methoxybenzoyl group, an ethoxybenzoyl group, an n-propoxybenzoyl group, and an n-butoxybenzoyl group; a sulfobenzoyl group; and a carboxybenzoyl group. The ones substituted with a chlorine atom, a methoxy group, a sulfo group, or a carboxy group are preferable, and a sulfobenzoyl group are more preferable.

The (C1-C4) alkoxycarbonyl group as or in $R^{101}$ in the formula (o1) is, for example, one in which a carbonyl group thereof has a (C1-C4) alkoxy group as a substituent. Examples of the (C1-C4) alkoxy group as a substituent are the same as the examples of the (C1-C4) alkyl group as or in $R^1$, $R^2$, $R^5$, $R^6$, and $R^7$ described above, including specific examples, preferable examples, and more preferable examples thereof. Specific examples include a methoxycarbonyl group, an ethoxycarbonyl group, a propoxycarbonyl group, and a butoxycarbonyl group. A methoxycarbonyl group and an ethoxycarbonyl group are preferable, and an ethoxycarbonyl group is more preferable.

Examples of the (C6-C10) aryloxycarbonyl group as or in $R^{101}$ in the formula (o1) include a phenoxycarbonyl group and a naphthyloxycarbonyl group. A phenoxycarbonyl group is preferable.

Examples of the (C6-C10) aryl (C1-C4) alkoxycarbonyl group as or in $R^{101}$ in the formula (o1) include a phenyl (C1-C4) alkoxycarbonyl group and a naphthyl (C1-C4) alkoxycarbonyl group, with the former being preferable. The alkoxy moiety thereof is preferably linear. Specific examples include a phenyl (C1-C4) alkoxycarbonyl group such as a phenylmethoxycarbonyl group, a phenylethoxycarbonyl group, a phenyl-n-propoxycarbonyl group, and a phenyl-n-butoxycarbonyl group; a naphtho-1-yl-(C1-C4) alkoxycarbonyl group such as a naphtho-1-yl-methoxycarbonyl group, a naphtho-1-yl-ethoxycarbonyl group, a naphtho-1-yl-n-propoxycarbonyl group, and a naphtho-1-yl-n-butoxycarbonyl group; and a naphtho-2-yl-(C1-C4) alkoxycarbonyl group such as a naphtho-2-yl-methoxycarbonyl group, a naphtho-2-yl-ethoxycarbonyl group, a naphtho-2-yl-n-propoxycarbonyl group, and a naphtho-2-yl-n-butoxycarbonyl group. Among the specific examples, a phenylmethoxycarbonyl group is preferable.

In the formula (a1), $R^{102}$ is a hydrogen atom; or a (C1-C4) alkyl group.

Examples of the (C1-C4) alkyl group as or in $R^{102}$ in the formula (o1) are the same as the examples of the (C1-C4) alkyl group as or in $R^1$, $R^2$, $R^5$, $R^6$, and $R^7$ described above, including specific examples, preferable examples, and more preferable examples thereof.

In the formula (o1), $R^{103}$ is a hydrogen atom; or the group represented by the formula (o2).

In the formula (o1), $R^{104}$ is a hydrogen atom; a (C1-C4) alkyl group; a halogen atom; a (C1-C4) alkoxy group; or a group represented by the formulae (4) to (6).

Examples of the (C1-C4) alkyl group as or in $R^{104}$ in the formula (o1) are the same as the examples of the (C1-C4) alkyl group as or in $R^1$, $R^2$, $R^5$, $R^6$, and $R^7$ described above, including specific examples, preferable examples, and more preferable examples thereof.

Examples of the halogen atom as or in $R^{104}$ in the formula (o1) are the same as the examples of the halogen atom as or in $R^1$, $R^2$, $R^5$, $R^6$, and $R^7$ described above, including specific examples, preferable examples, and more preferable examples thereof.

Examples of the (C1-C4) alkoxy group as or in $R^{104}$ in the formula (o1) are the same as the examples of the (C1-C4) alkoxy group as or in $R^1$, $R^2$, $R^5$, $R^6$, and $R^7$ described above, including specific examples, preferable examples, and more preferable examples thereof.

In the formula (o1), m denotes 1 or 2, either of which is preferable.

In the formula (o1), 1 denotes an integer of 0 to 2, preferably 0 or 1.

In the formula (o2), W is a hydrogen atom; or a (C1-C12) alkyl group.

Examples of the (C1-C12) alkyl group as in W in the formula (o2) include ones that are unsubstituted and constitute a linear or branched chain, preferably a branched chain. Specific examples include linear groups such as a methyl group, an ethyl group, an n-propyl group, an n-butyl group, an n-hexyl group, an n-heptyl group, an n-octyl group, an n-nonyl group, an n-decyl group, an n-undecyl group, and an n-dodecyl group; and branched groups such as an isopropyl group, an isobutyl group, a sec-butyl group, a tert-butyl group, a tert-amyl group, and a 2,2,4,4-tetramethylpentyl group. Preferable and specific examples include a methyl group, an n-propyl group, a tert-butyl group, a tert-amyl group, and a 1,1,3,3-tetramethylbutyl group. A tert-amyl group and a 1,1,3,3-tetramethylbutyl group are more preferable.

In the formula (4), X and Y are independently a hydroxy group; an amino group; a halogen atom; a (C1-C4) alkylamino group; an alkylamino group substituted with at least one or more groups selected from the group consisting of a sulfo group, a carboxy group, and an amino group; a (C1-C4) alkoxy group; a (C1-C4) alkoxy group substituted with at least one group selected from the group consisting of a hydroxy group, a (C1-C4) alkoxy group, a sulfo group, and a carboxy group; an anilino group; an anilino group that is optionally substituted with at least one or more groups selected from the group consisting of a sulfo group, a carboxy group, a hydroxy group, a halogen atom, a (C1-C4) alkyl group, and a (C1-C4) alkoxy group; a phenoxy group; or a phenoxy group substituted with at least one or more groups selected from the group consisting of a sulfo group, a carboxy group, a hydroxy group, a halogen atom, a (C1-C4) alkyl group, and a (C1-C4) alkoxy group.

Examples of the halogen atom as or in X and Y in the formula (4) are the same as the examples of the halogen atom as or in $R^1$, $R^2$, $R^5$, $R^6$, and $R^7$ described above, including specific examples, preferable examples, and more preferable examples thereof.

The (C1-C4) alkylamino group as or in X and Y in the formula (4) is, for example, one in which an amino group thereof has a (C1-C4) alkyl group as a substituent. The number of substitution is 1 or 2 and is preferably 1. Examples of the (C1-C4) alkyl group as a substituent are the same as the examples of the (C1-C4) alkyl group as or in $R^1$, $R^2$, $R^5$, $R^6$, and $R^7$ described above, including specific examples, preferable examples, and more preferable examples thereof. Specific examples include a methylamino group, an ethylamino group, an n-propylamino group, an n-butylamino group, a dimethylamino group, a diethylamino group, a di(n-propyl)amino group, a di(n-butyl)amino group, a methylethylamino group, a methyl(n-propyl)amino group, a methyl(n-butyl)amino group, an ethyl(n-propyl) amino group, an ethyl(n-butyl)amino group, and an n-propyl (n-butyl)amino group. A methylamino group and a butylamino group are preferable.

Examples of the alkylamino group substituted with at least one or more groups selected from the group consisting of a sulfo group, a carboxy group, and an amino group as or in X and Y in the formula (4) include ones in which a carbon atom of the (C1-C4) alkylamino group has a substituent. The number of substitution is 1 to 3 and is preferably 1. Specific examples include a sulfomethylamino group, a 2-sulfoethylamino group, a 3-sulfo-n-propylamino group, a 4-sulfo-n-butylamino group, a carboxymethylamino group, a 2-carboxyethylamino group, a 3-carboxy-n-propylamino group, a 4-carboxy-n-butylamino group, an aminomethylamino group, a 2-aminoethylamino group, a 3-amino-n-propylamino group, and a 4-amino-n-butylamino group. The ones substituted with a sulfo group are preferable, and a sulfomethylamino group and a 2-sulfoethylamino group are preferable.

Examples of the (C1-C4) alkoxy group as or in X and Y in the formula (4) are the same as the examples of the (C1-C4) alkoxy group as or in $R^1$, $R^2$, $R^5$, $R^6$, and $R^7$ described above, including specific examples, preferable examples, and more preferable examples thereof.

Examples of the (C1-C4) alkoxy group substituted with at least one group selected from the group consisting of a hydroxy group, a (C1-C4) alkoxy group, a sulfo group, and a carboxy group as or in X and Y in the formula (4) are the same as the examples of the (C1-C4) alkoxy group substituted with at least one group selected from the group consisting of a hydroxy group, a (C1-C4) alkoxy group, a sulfo group, and a carboxy group as or in $R^1$, $R^2$, $R^5$, $R^6$, and $R^7$ described above, including specific examples, preferable examples, and more preferable examples thereof.

Examples of the phenoxy group substituted with at least one or more groups selected from the group consisting of a sulfo group, a carboxy group, a hydroxy group, a halogen atom, a (C1-C4) alkyl group, and a (C1-C4) alkoxy group as or in X and Y in the formula (4) include ones in which a carbon atom of the phenoxy group has a substituent. Examples of a halogen atom, a (C1-C4) alkyl group, and a (C1-C4) alkoxy group as substituents are the same as the examples of $R^1$, $R^2$, $R^5$, $R^6$, and $R^7$ described above, including specific examples, preferable examples, and more preferable examples thereof. Specific examples include a sulfophenoxy group, a carboxyphenoxy group, a hydroxyphenoxy group, a fluorophenoxy group, a chlorophenoxy group, a bromophenoxy group, an iodophenoxy group, a methylphenoxy group, an ethylphenoxy group, a propylphenoxy group, a bromophenoxy group, a methoxyphenoxy group, an ethoxyphenoxy group, a propoxyphenoxy group, and a butoxyphenoxy group. A sulfophenoxy group and a carboxyphenoxy group are preferable.

At least one of X and Y in the formula (4) is preferably a group containing a sulfo group or a carboxy group.

In the formula (5), o denotes an integer of 1 to 3, preferably 1 or 2.

In the formula (5), J is an alkylamino group; an alkylamino group substituted with at least one group selected from the group consisting of a sulfo group, a carboxy group, a (C1-C4) alkoxy group, a carbamoyl group, a cyano group, an anilino group, an amino group, a phenoxy group, a hydroxy group, a phenyl group, and a mercapto group; an anilino group; an anilino group substituted with at least one group selected from the group consisting of a sulfo group, a carboxy group, a (C1-C4) alkyl group, a (C1-C4) alkoxy group, a carbamoyl group, a cyano group, an anilino group, an amino group, a phenoxy group, a hydroxy group, a phenyl group, and a mercapto group; an alkylthio group; an alkylthio group substituted with at least one group selected from the group consisting of a sulfo group, a carboxy group, a (C1-C4) alkoxy group, a carbamoyl group, a cyano group, an anilino group, an amino group, a phenoxy group, a hydroxy group, a phenyl group, and a mercapto group; a phenylthio group; a phenylthio group substituted with at least one group selected from the group consisting of a sulfo group, a carboxy group, a (C1-C4) alkyl group, a (C1-C4) alkoxy group, a carbamoyl group, a cyano group, an anilino group, an amino group, a phenoxy group, a hydroxy group, a phenyl group, and a mercapto group; a phenoxy group; a phenoxy group substituted with at least one group selected from the group consisting of a sulfo group, a carboxy group, a (C1-C4) alkyl group, a (C1-C4) alkoxy group, a carbamoyl group, a cyano group, an anilino group, an amino group, a phenoxy group, a hydroxy group, a phenyl group, and a mercapto group; or a mono- or dialkylaminoalkylamino group.

Examples of the alkylamino group as or in J in the formula (5) include ones that are unsubstituted and constitute a linear chain, a branched chain, or a ring, preferably a linear chain. The carbon chain usually contains 1 to 12 carbon atoms, preferably 1 to 8 carbon atoms, and more preferably 1 to 6 carbon atoms. Specific examples include linear groups such as a methylamino group, an ethylamino group, an n-propylamino group, an n-butylamino group, an n-pentylamino group, an n-hexylamino group, an n-heptylamino group, an n-octylamino group, an n-nonylamino group, an n-decylamino group, an n-undecylamino group, and an n-dodecylamino group; branched groups such as an isopropylamino group, a tert-butylamino group, a 2-methylhexylamino group, and a tert-amylamino group; and cyclic groups such as a cyclohexylamino group and a cycloheptylamino group. A methylamino group, an n-butylamino group, and an n-octylamino group are preferable.

Examples of the alkylamino group substituted with at least one group selected from the group consisting of a sulfo group, a carboxy group, a (C1-C4) alkoxy group, a carbamoyl group, a cyano group, an anilino group, an amino group, a phenoxy group, a hydroxy group, a phenyl group, and a mercapto group as or in J in the formula (5) include ones in which a carbon atom of the alkylamino group has a substituent. The number of substitution is 1 to 3 and is preferably 1. Examples of the alkylamino group are the same as the examples of the alkylamino group described above, including specific examples and preferable examples thereof. Examples of the (C1-C4) alkoxy group as a substituent are the same as the examples of the (C1-C4) alkoxy group as or in $R^1$, $R^2$, $R^5$, $R^6$, and $R^7$ described above, including specific examples, preferable examples, and more preferable examples thereof. Specific examples include a sulfomethylamino group, a sulfoethylamino group, a sulfopropylamino group, a sulfobutylamino group, a sulfopentylamino group, a sulfohexylamino group, a sulfoheptylamino group, a sulfooctylamino group, a sulfononylamino group, a sulfodecylamino group, a sulfoundecylamino group, a sulfododecylamino group, a carboxymethylamino group, a carboxyethylamino group, a carboxypropylamino group, a carboxybutylamino group, a carboxypentylamino group, a carboxyhexylamino group, a carboxyheptylamino group, a carboxyoctylamino group, a carboxynonylamino group, a carboxydecylamino group, a carboxyundecylamino group, a carboxydodecylamino group, a methoxymethylamino group, a methoxyethylamino group, a methoxybutylamino group, a methoxydecylamino group, an ethoxyhexylamino group, an ethoxyundecylamino group, a propoxypropylamino group, a propoxydodecylamino group, a butoxyhexylamino group, a butoxynonylamino group, a carbamoylmethylamino group, a carbamoylethylamino group, a carbamoylbutylamino group, a carbamoylhexylamino group, a carbamoyldecylamino group, a cyanomethylamino group, a cyanobutylamino group, a cyanohexylamino group, a cyanododecylamino group, an anilinomethylamino group, an anilinobutylamino group, an anilinoundecylamino group, an aminoethylamino group, an aminobutylamino group, an aminohexylamino group, a phenoxymethylamino group, a phenoxyethylamino group, a phenoxybutylamino group, a phenoxydecylamino group, a phenylethylamino group, a phenylhexylamino group, a phenyldecylamino group, a mercaptomethylamino group, a mercaptopentylamino group, and a mercaptoundecylamino group. The ones substituted with a sulfo group or a carboxy group are preferable, and a sulfoethylamino group, a carboxymethylamino group, and a carboxyhexylamino group are more preferable.

Examples of the anilino group substituted with at least one group selected from the group consisting of a sulfo group, a carboxy group, a (C1-C4) alkyl group, a (C1-C4) alkoxy group, a carbamoyl group, a cyano group, an anilino group, an amino group, a phenoxy group, a hydroxy group, a phenyl group, and a mercapto group as or in J in the formula (5) include ones in which a carbon atom of the anilino group has a substituent attached thereto. The number of substitution is 1 to 3 and is preferably 1. Examples of a (C1-C4) alkyl group and a (C1-C4) alkoxy group as substituents are the same as the examples of the (C1-C4) alkyl group and the (C1-C4) alkoxy group as or in $R^1$, $R^2$, $R^5$, $R^6$, and $R^7$ described above, including specific examples, preferable examples, and more preferable examples thereof. Specific examples include a sulfoanilino group, a carboxyanilino group, a methylanilino group, an ethylanilino group, a propylanilino group, a butylanilino group, a methoxyanilino group, an ethoxyanilino group, a propoxyanilino group, a butoxyanilino group, a carbamoylanilino group, a cyanoanilino group, a phenylaminoanilino group, an aminoanilino group, a phenoxyanilino group, a hydroxyanilino group, a phenylanilino group, and a mercaptoanilino group. A sulfoanilino group and a carboxyanilino group are preferable.

Examples of the alkylthio group as or in J in the formula (5) include ones in which a carbon chain thereof constitutes a linear or branched chain, preferably a linear chain. The carbon chain usually contains 1 to 12 carbon atoms, preferably 1 to 8 carbon atoms, and more preferably 1 to 6 carbon atoms. Specific examples include linear groups such as a methylthio group, an ethylthio group, an n-propylthio group, an n-butylthio group, an n-hexylthio group, an n-heptylthio group, an n-octylthio group, an n-nonylthio group, an n-decylthio group, an n-undecylthio group, and an n-dodecylthio group; and branched groups such as an isopropylthio group, a tert-butylthio group, an isobutylthio group, a tert-amylthio group, a tert-octylthio group, and a 2-ethylhexylthio group. A butylthio group, a hexylthio group, and an octylthio group are preferable.

Examples of the alkylthio group substituted with at least one group selected from the group consisting of a sulfo group, a carboxy group, a (C1-C4) alkoxy group, a carbamoyl group, a cyano group, an anilino group, an amino group, a phenoxy group, a hydroxy group, a phenyl group, and a mercapto group as or in J in the formula (5) include ones in which a carbon atom of the alkylthio group has a substituent. The number of substitution is 1 to 3 and is preferably 1. Examples of the alkylthio group are the same as the examples of the alkylthio group described above, including specific examples and preferable examples thereof. Examples of a (C1-C4) alkoxy group as a substituent are the same as the examples of the (C1-C4) alkoxy group as or in $R^1$, $R^2$, $R^5$, $R^6$, and $R^7$ described above, including specific examples, preferable examples, and more preferable examples thereof. Specific examples include a sulfomethylthio group, a sulfoethylthio group, a sulfopropylthio group, a sulfobutylthio group, a sulfopentylthio group, a sulfohexylthio group, a sulfoheptylthio group, a sulfooctylthio group, a sulfononylthio group, a sulfodecylthio group, a sulfoundecylthio group, a sulfododecylthio group, a carboxymethylthio group, a carboxyethylthio group, a carboxypropylthio group, a carboxybutylthio group, a carboxypentylthio group, a carboxyhexylthio group, a carboxyheptylthio group, a carboxyoctylthio group, a carboxynonylthio group, a carboxydecylthio group, a carboxyundecylthio group, a carboxydodecylthio group, a methoxymethylthio group, a methoxyethylthio group, a methoxybutylthio group, a methoxydecylthio group, an ethoxyhexylthio group, an ethoxyundecylthio group, a propoxypropylthio group, a propoxydodecylthio group, a butoxyhexylthio group, a butoxynonylthio group, a carbamoylmethylthio group, a carbamoylethylthio group, a carbamoylbutylthio group, a carbamoylhexylthio group, a carbamoyldecylthio group, a cyanomethylthio group, a cyanobutylthio group, a cyanohexylthio group, a cyanododecylthio group, an anilinomethylthio group, an anilinobutylthio group, an anilinoundecylthio group, an aminoethylthio group, an aminobutylthio group, an aminohexylthio group, a phenoxymethylthio group, a phenoxyethylthio group, a phenoxybutylthio group, a phenoxydecylthio group, a phenylethylthio group, a phenylhexylthio group, a phenyldecylthio group, a mercaptomethylthio group, a mercaptopentylthio group, and a mercaptoundecylthio group. The ones substituted with a sulfo group or a carboxy group are preferable, and a sulfoethylthio group, a carboxymethylthio group, and a carboxyhexylthio group are more preferable.

Examples of the phenylthio group substituted with at least one group selected from the group consisting of a sulfo group, a carboxy group, a (C1-C4) alkyl group, a (C1-C4) alkoxy group, a carbamoyl group, a cyano group, an anilino group, an amino group, a phenoxy group, a hydroxy group, a phenyl group, and a mercapto group as or in J in the formula (5) include ones in which a carbon atom of the phenylthio group has a substituent. The number of substitution is 1 to 3 and is preferably 1. Examples of a (C1-C4) alkyl group and a (C1-C4) alkoxy group as substituents are the same as the examples of the (C1-C4) alkyl group and the (C1-C4) alkoxy group, respectively, as or in $R^1$, $R^2$, $R^5$, $R^6$, and $R^7$ described above, including specific examples, preferable examples, and more preferable examples thereof. Specific examples include a sulfophenylthio group, a carboxyphenylthio group, a methylphenylthio group, an ethylphenylthio group, a propylphenylthio group, a butylphenylthio group, a methoxyphenylthio group, an ethoxyphenylthio group, a propoxyphenylthio group, a butoxyphenylthio group, a carbamoylphenylthio group, a cyanophenylthio group, a phenylaminophenylthio group, an aminophenylthio group, a phenoxyphenylthio group, a hydroxyphenylthio group, a phenylphenylthio group, and a mercaptophenylthio group. A sulfophenylthio group and a carboxyphenylthio group are preferable.

Examples of the phenoxy group substituted with at least one group selected from the group consisting of a sulfo group, a carboxy group, a (C1-C4) alkyl group, a (C1-C4) alkoxy group, a carbamoyl group, a cyano group, an anilino group, an amino group, a phenoxy group, a hydroxy group, a phenyl group, and a mercapto group as or in J in the formula (5) include ones in which a carbon atom of the phenoxy group has a substituent attached thereto. The number of substitution is 1 to 3 and is preferably 1. Examples of a (C1-C4) alkyl group and a (C1-C4) alkoxy group as substituents are the same as the examples of the (C1-C4) alkyl group and the (C1-C4) alkoxy group, respectively, as or in $R^1$, $R^2$, $R^5$, $R^6$, and $R^7$ described above, including specific examples, preferable examples, and more preferable examples thereof. Specific examples include a sulfophenoxy group, a carboxyphenoxy group, a methylphenoxy group, an ethylphenoxy group, a propylphenoxy group, a butylphenoxy group, a methoxyphenoxy group, an ethoxyphenoxy group, a propoxyphenoxy group, a butoxyphenoxy group, a carbamoylphenoxy group, a cyanophenoxy group, a phenylaminophenoxy group, an aminophenoxy group, a phenoxyphenoxy group, a hydroxyphenoxy group, a phenylphenoxy group, and a mercaptophenoxy group. A sulfophenoxy group and a carboxyphenoxy group are preferable.

Examples of the mono- or dialkylaminoalkylamino group as or in J in the formula (5) include ones in which an alkyl moiety thereof usually contains 1 to 10 carbon atoms, preferably 1 to 6 carbon atoms, and more preferably 1 to 4 carbon atoms. Specific examples include an alkylaminoalkylamino group such as a 2-methylaminoethylamino group, a 3-methylaminopropylamino group, and a 3-ethylaminopropylamino group; and a 3-(N,N-diethylamino)propylamino group and a 2-(N,N-diethylamino)ethylamino group.

In the formula (6), G is a (C1-C12) alkyl group; a (C1-C12) alkyl group substituted with at least one group selected from the group consisting of an aryl group, a heterocyclic group, a sulfo group, a carboxy group, a (C1-C4) alkoxycarbonyl group, an acyl group, a carbamoyl group, a cyano group, a (C1-C4) alkoxy group, a phenyl (C1-C4) alkoxy group, a phenoxy group, a hydroxy group, and a nitro group; an aryl group; an aryl group substituted with at least one group selected from the group consisting of a halogen atom, a cyano group, a hydroxy group, a sulfo group, a (C1-C4) alkyl group, a carboxy group, a (C1-C4) alkoxycarbonyl group, a carbamoyl group, a (C1-C4) alkoxy group, a phenoxy group, and a nitro group; a heterocyclic group; or a heterocyclic group substituted with at least one group selected from the group consisting of a halogen atom, a cyano group, a hydroxy group, a sulfo group, a (C1-C4) alkyl group, a carboxy group, a (C1-C4) alkoxycarbonyl group, a carbamoyl group, a (C1-C4) alkoxy group, a phenoxy group, and a nitro group.

Examples of the (C1-C12) alkyl group as or in G in the formula (6) include ones that constitute a linear chain, a branched chain, or a ring, preferably a linear chain. The carbon chain preferably contains 1 to 8 carbon atoms and more preferably 1 to 6 carbon atoms. Specific examples include linear groups such as a methyl group, an ethyl group, an n-propyl group, an n-butyl group, an n-hexyl group, an n-heptyl group, an n-octyl group, an n-nonyl group, an n-decyl group, an n-undecyl group, and an n-dodecyl group; and branched groups such as an isopropyl group, a tert-butyl group, an isobutyl group, a tert-amyl group, a tert-octyl group, and a 2-ethylhexyl group. A methyl group, a hexyl group, and an octyl group are preferable.

Examples of the (C1-C12) alkyl group substituted with at least one group selected from the group consisting of an aryl group, a heterocyclic group, a sulfo group, a carboxy group, a (C1-C4) alkoxycarbonyl group, an acyl group, a carbamoyl group, a cyano group, a (C1-C4) alkoxy group, a phenyl (C1-C4) alkoxy group, a phenoxy group, a hydroxy group, and a nitro group as or in G in the formula (6) include ones in which a carbon atom of the (C1-C12) alkyl group has a substituent attached thereto. The position of substitution is not particularly limited, but is preferably a terminus of the alkyl group. The number of substitution is 1 to 3 and is preferably 1. The aryl group as a substituent is, for example, an aryl group containing 6 to 14 carbon atoms, such as a phenyl group, a naphthyl group, or an anthracenyl group, and is preferably a phenyl group or a naphthyl group. The heterocyclic ring as a substituent is usually a 6-membered aromatic heterocycle, for example, and is preferably a nitrogen-containing 6-membered aromatic heterocycle and more preferably a pyridine ring. The position attached to the alkyl group is the 2-position, the 3-position, or the 4-position of the pyridine ring, any of which is preferable. Examples of the (C1-C4) alkoxycarbonyl group as a substituent are the same as the examples of the (C1-C4) alkoxycarbonyl group as or in $R^{101}$ described above, including specific examples and preferable examples thereof. Examples of the (C1-C4) alkoxy group as a substituent are the same as the examples of the (C1-C4) alkoxy group as or in $R^1$, $R^2$, $R^5$, $R^6$, and $R^7$ described above, including specific examples, preferable examples, and more preferable examples thereof. Examples of the phenyl (C1-C4) alkoxy group as a substituent include ones in which a carbon atom of the (C1-C4) alkoxy group has a phenyl group attached thereto as a substituent. The position of substitution is not particularly limited, but is preferably a terminus of the alkoxy moiety. The number of substitution is 1 or 2 and is preferably 1. Specific examples include linear groups such as a phenylmethoxy group, a phenylethoxy group, a phenyl-n-propoxy group, and a phenyl-n-butoxy group; and branched groups such as a phenylisopropoxy group, a phenylisobutoxy group, a phenyl-sec-butoxy group, and a phenyl-tert-butoxy group. A phenylmethoxy group, a phenylethoxy group, a phenyl-n-propoxy group are preferable, for example, and a methoxy group is more preferable. Specific examples of the (C1-C12) alkyl group substituted with at least one group selected from the group consisting of an aryl group, a heterocyclic group, a sulfo group, a carboxy group, a (C1-C4) alkoxycarbonyl group, an acyl group, a carbamoyl group, a cyano group, a (C1-C4) alkoxy group, a phenyl (C1-C4) alkoxy group, a phenoxy group, a hydroxy group, and a nitro group include a 5-phenylpentyl group, a 6-phenylhexyl group, a 8-phenyloctyl group, a 10-phenyldecyl group, a 12-phenyldodecyl group, a 5-naphthylpentyl group, a 6-naphthylhexyl group, a 8-naphthyloctyl group, a 10-naphthyldecyl group, a 12-naphthyldodecyl group, a pyridylpentyl group, a pyridylhexyl group, a pyridyldecyl group, a pyridyldodecyl group, a sulfomethyl group, a sulfohexyl group, a sulfodecyl group, a carboxyethyl group, a carboxyoctyl group, a carboxydodecyl group, a methoxycarbonylpentyl group, a propoxycarbonyloctyl group, a butoxycarbonyldodecyl group, an acetylhexyl group, an acetyldecyl group, a benzoylpentyl group, a benzoylundecyl group, a carbamoylbutyl group, a carbamoyldecyl group, a cyanohexyl group, a cyanoundecyl group, a methoxyoctyl group, an ethoxypropyl group, a propoxydodecyl group, a phenylmethoxyhexyl group, a phenylbutoxyoctyl group, a phenylpropoxydodecyl group, a phenoxyhexyl group, a phenoxyoctyl group, a phenoxydodecyl group, a hydroxypentyl group, a hydroxyundecyl group, a nitrohexyl group, and a nitrodecyl group. The ones substituted with a sulfo group or a carboxy group are preferable.

The aryl group substituted with at least one group selected from the group consisting of a halogen atom, a cyano group, a hydroxy group, a sulfo group, a (C1-C4) alkyl group, a carboxy group, a (C1-C4) alkoxycarbonyl group, a carbamoyl group, a (C1-C4) alkoxy group, a phenoxy group, and a nitro group as or in G in the formula (6) is, for example, an aryl group containing 6 to 14 carbon atoms, such as a phenyl group, a naphthyl group, or an anthracenyl group, preferably a phenyl group or a naphthyl group, in which a carbon atom thereof has a substituent. Examples of a halogen atom, a (C1-C4) alkyl group, and a (C1-C4) alkoxy group as substituents are the same as the examples of the halogen atom, the (C1-C4) alkyl group, and the (C1-C4) alkoxy group, respectively, as or in $R^1$, $R^2$, $R^5$, $R^6$, and $R^7$ described above, including specific examples, preferable examples, and more preferable examples thereof. Examples of the (C1-C4) alkoxycarbonyl group as a substituent are the same as the examples of the (C1-C4) alkoxycarbonyl group as or in $R^{101}$ described above, including specific examples and preferable examples thereof. Specific examples of the aryl group substituted with at least one group selected from the group consisting of a halogen atom, a cyano group, a hydroxy group, a sulfo group, a (C1-C4) alkyl group, a carboxy group, a (C1-C4) alkoxycarbonyl group, a carbamoyl group, a (C1-C4) alkoxy group, a phenoxy group, and a nitro group include a fluorophenyl group, a fluoronaphthyl group, a fluoroanthracenyl group, a chlorophenyl group, a chloronaphthyl group, a bromophenyl group, a bromonaphthyl group, an iodophenyl group, an iodoanthracenyl group, a cyanophenyl group, a cyanonaphthyl group, a cyanoanthracenyl group, a hydroxyphenyl group, a hydroxynaphthyl group, a hydroxyanthracenyl group, a sulfophenyl group, a sulfonaphthyl group, a sulfoanthracenyl group, a methylphenyl group, a propylnaphthyl group, a butylanthracenyl group, a carboxyphenyl group, a carboxynaphthyl group, a carboxyanthracenyl group, a methoxycarbonylphenyl group, a propoxycarbonylphenyl group, an ethoxycarboxynaphthyl group, a carbamoylphenyl group, a carbamoylnaphthyl group, a carbamoylanthracenyl group, a methoxyphenyl group, an ethoxyphenyl group, a propoxyphenyl group, a methoxynaphthyl group, a butoxyanthracenyl group, a phenoxyphenyl group, a phenoxynaphthyl group, a phenoxyanthracenyl group, a nitrophenyl group, a nitronaphthyl group, and a nitroanthracenyl group. A sulfophenyl group and a carboxyphenyl group are preferable.

The heterocyclic group as or in G in the formula (6) is usually a 5- or 6-membered aromatic heterocycle, for example, and is preferably a nitrogen-containing 6-membered aromatic heterocycle and more preferably a pyridine ring. The position of substitution on the pyridine ring is the 2-position, the 3-position, or the 4-position, any of which is preferable. Specific examples include a 2-pyridyl group, a 3-pyridyl group, and a 4-pyridyl group.

As for the heterocyclic group substituted with at least one group selected from the group consisting of a halogen atom, a cyano group, a hydroxy group, a sulfo group, a (C1-C4) alkyl group, a carboxy group, a (C1-C4) alkoxycarbonyl group, a carbamoyl group, a (C1-C4) alkoxy group, a phenoxy group, and a nitro group as or in G in the formula (6), the heterocyclic group is usually a 5- or 6-membered aromatic heterocycle, for example, and is preferably a nitrogen-containing 6-membered aromatic heterocycle and more preferably a pyridine ring. The position of substitution on the pyridine ring is the 2-position, the 3-position, or the 4-position, any of which is preferable. Examples of a halogen atom, a (C1-C4) alkyl group, and a (C1-C4) alkoxy group as substituents are the same as the examples of the halogen atom, the (C1-C4) alkyl group, and the (C1-C4) alkoxy group, respectively, as or in $R^1$, $R^2$, $R^5$, $R^6$, and $R^7$ described above, including specific examples, preferable examples, and more preferable examples thereof. Examples of the (C1-C4) alkoxycarbonyl group as a substituent are the same as the examples of the (C1-C4) alkoxycarbonyl group as or in $R^{101}$ described above, including specific examples and preferable examples thereof. Specific examples of the heterocyclic group substituted with at least one group selected from the group consisting of a halogen atom, a cyano group, a hydroxy group, a sulfo group, a (C1-C4) alkyl group, a carboxy group, a (C1-C4) alkoxycarbonyl group, a carbamoyl group, a (C1-C4) alkoxy group, a phenoxy group, and a nitro group include a fluoropyridyl group, a chloropyridyl group, a bromopyridyl group, an iodopyridyl group, a cyanopyridyl group, a hydroxypyridyl group, a sulfopyridyl group, a methylpyridyl group, an ethylpyridyl group, a propylpyridyl group, a butylpyridyl group, a carboxypyridyl group, a methoxycarbonylpyridyl group, an ethoxycarbonylpyridyl group, a propoxycarbonylpyridyl group, a butoxycarbonylpyridyl group, a carbamoylpyridyl group, a methoxypyridyl group, an ethoxypyridyl group, a propoxypyridyl group, a butoxypyridyl group, a phenoxypyridyl group, and a nitropyridyl group. A sulfopyridyl group and a carboxypyridyl group are preferable.

In the formula (6), G is preferably a (C1-C12) alkyl group; a sulfo (C1-C12) alkyl group; a carboxy (C1-C12) alkyl group; a sulfophenyl group; or a carboxyphenyl group, more preferably a (C1-C12) alkyl group, and more preferably a (C1-C8) alkyl group.

A compound adopting a combination of the preferable ones as substituents in the formula (o1) is more preferable, and a compound adopting a combination of the more preferable ones is further preferable. The same applies to a combination of the further preferable ones.

Specific examples of the coloring matter represented by the formula (o1) are shown in Tables 89 and 88 below. However, the present invention is not limited thereto.

Among these, coloring matters shown under Compound Nos. o25, o27, o33, o49, o65, and o69 are particularly preferable.

TABLE 89
| Compound No. | Structural formula |
|---|---|
| o1 | 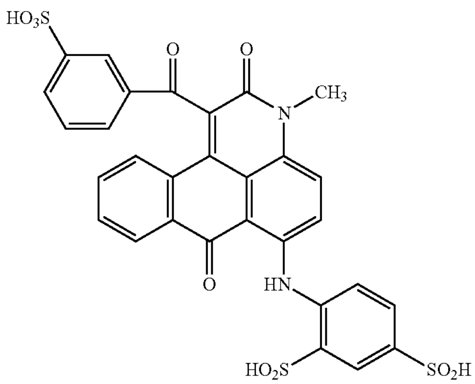 |
| o2 | 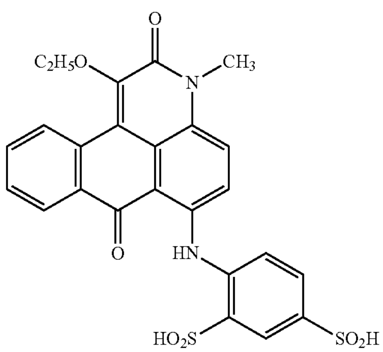 |
| o3 | 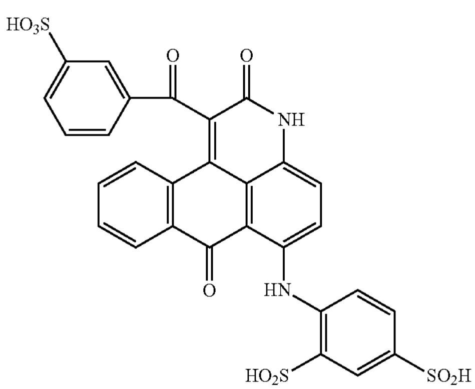 |
| o4 | 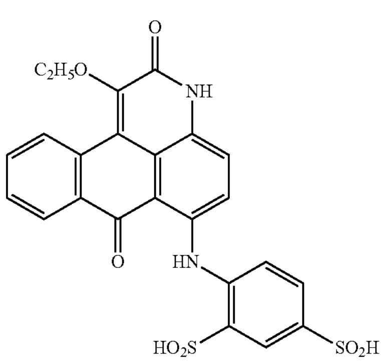 |
TABLE 89-continued
| Compound No. | Structural formula |
|---|---|
| o5 | 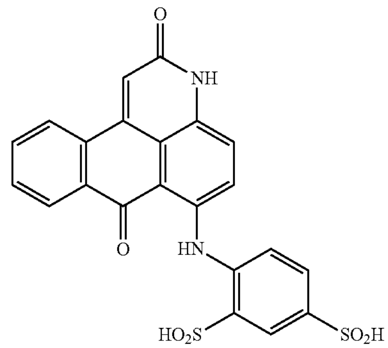 |
| o6 | 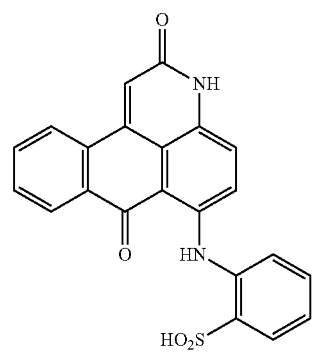 |
| o7 | 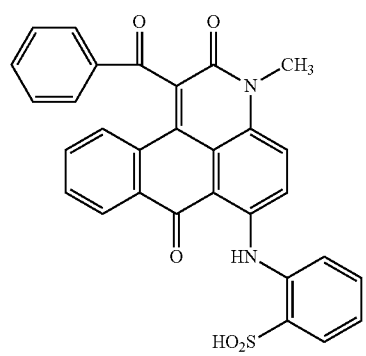 |
| o8 | 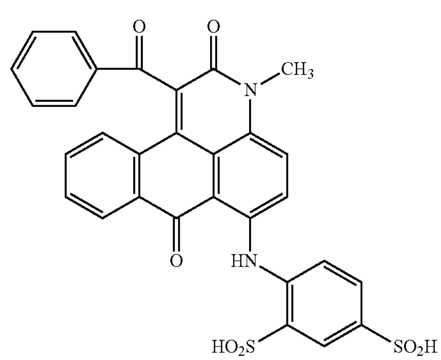 |

TABLE 90
| Compound No. | Structural formula |
|---|---|
| o9 | 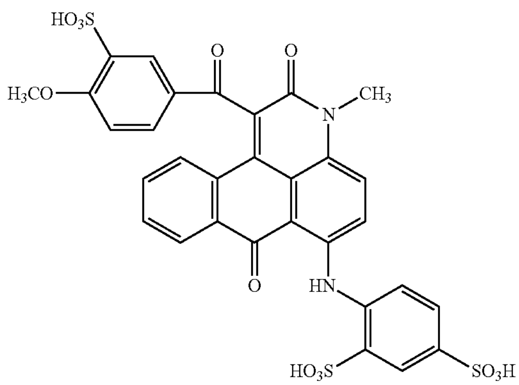 [SMILES: COc1ccc(C(=O)c2c3c4c(c(Nc5ccc(S(=O)(=O)O)cc5S(=O)(=O)O)ccc4n(C)c2=O)C(=O)c2ccccc2-3)cc1S(=O)(=O)O] |
| o10 | 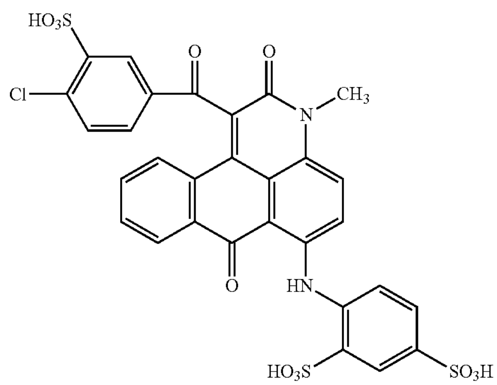 [SMILES: Cn1c(=O)c(C(=O)c2ccc(Cl)c(S(=O)(=O)O)c2)c2c3c(c(Nc4ccc(S(=O)(=O)O)cc4S(=O)(=O)O)ccc31)C(=O)c1ccccc1-2] |
| o11 | 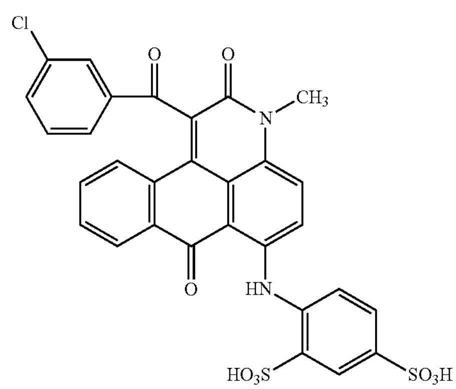 [SMILES: Cn1c(=O)c(C(=O)c2cccc(Cl)c2)c2c3c(c(Nc4ccc(S(=O)(=O)O)cc4S(=O)(=O)O)ccc31)C(=O)c1ccccc1-2] |
| o12 | 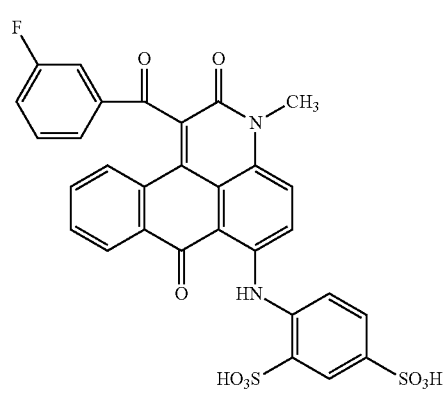 [SMILES: Cn1c(=O)c(C(=O)c2cccc(F)c2)c2c3c(c(Nc4ccc(S(=O)(=O)O)cc4S(=O)(=O)O)ccc31)C(=O)c1ccccc1-2] |

TABLE 90-continued
| Compound No. | Structural formula |
| --- | --- |
| o13 | 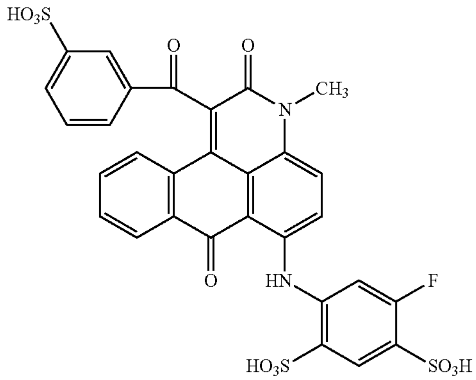 [SMILES: Cn1c(=O)c(C(=O)c2cccc(S(=O)(=O)O)c2)c2c3c(c(Nc4cc(F)c(S(=O)(=O)O)cc4S(=O)(=O)O)ccc31)C(=O)c1ccccc1-2] |
| o14 | 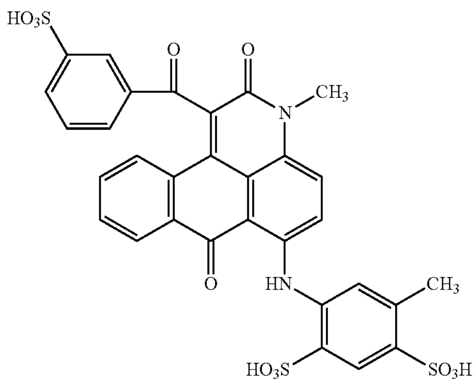 [SMILES: Cc1cc(Nc2ccc3c4c2C(=O)c2ccccc2-c4c(C(=O)c2cccc(S(=O)(=O)O)c2)c(=O)n3C)c(S(=O)(=O)O)cc1S(=O)(=O)O] |
| o15 | 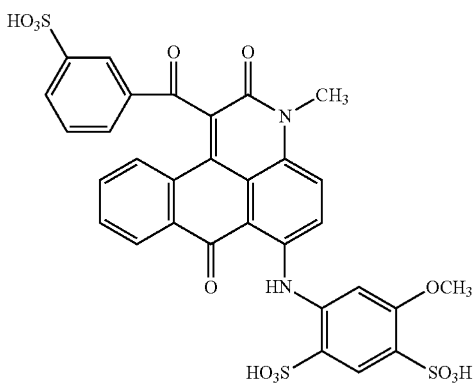 [SMILES: COc1cc(Nc2ccc3c4c2C(=O)c2ccccc2-c4c(C(=O)c2cccc(S(=O)(=O)O)c2)c(=O)n3C)c(S(=O)(=O)O)cc1S(=O)(=O)O] |
| o16 | 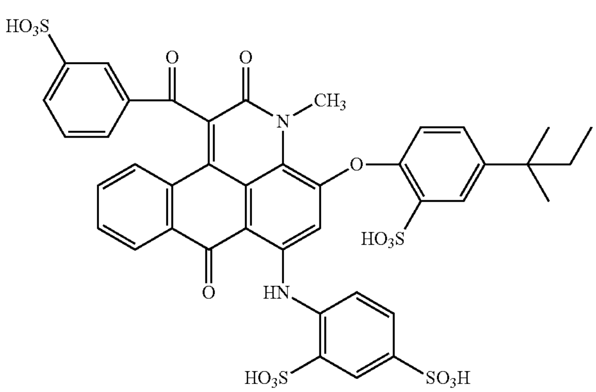 [SMILES: CCC(C)(C)c1ccc(Oc2cc(Nc3ccc(S(=O)(=O)O)cc3S(=O)(=O)O)c3c4c(c(C(=O)c5cccc(S(=O)(=O)O)c5)c(=O)n(C)c24)-c2ccccc2C3=O)c(S(=O)(=O)O)c1] |

TABLE 91
| Compound No. | Structural formula |
|---|---|
| o17 | 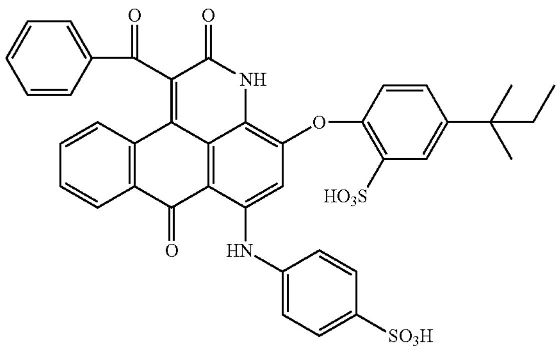 [SMILES: CCC(C)(C)c1ccc(Oc2cc(Nc3ccc(S(=O)(=O)O)cc3)c3c4c(c(C(=O)c5ccccc5)c(=O)[nH]c24)-c2ccccc2C3=O)c(S(=O)(=O)O)c1] |
| o18 | 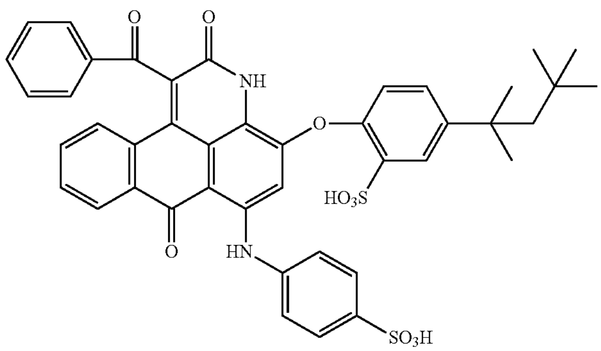 [SMILES: CC(C)(C)CC(C)(C)c1ccc(Oc2cc(Nc3ccc(S(=O)(=O)O)cc3)c3c4c(c(C(=O)c5ccccc5)c(=O)[nH]c24)-c2ccccc2C3=O)c(S(=O)(=O)O)c1] |
| o19 | 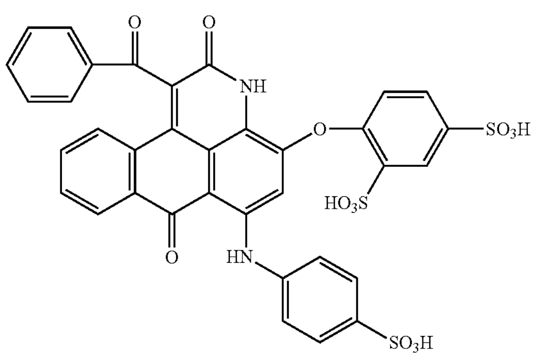 [SMILES: O=C(c1ccccc1)c1c2c3c(c(Nc4ccc(S(=O)(=O)O)cc4)cc(Oc4ccc(S(=O)(=O)O)cc4S(=O)(=O)O)c3[nH]c1=O)C(=O)c1ccccc1-2] |
| o20 | 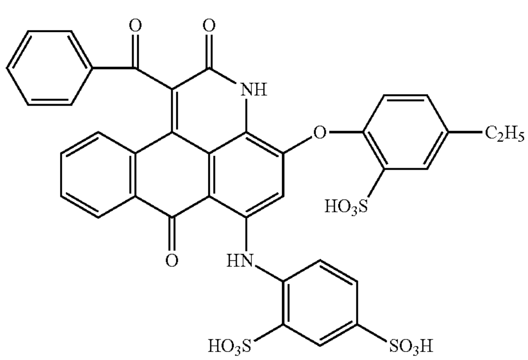 [SMILES: CCc1ccc(Oc2cc(Nc3ccc(S(=O)(=O)O)cc3S(=O)(=O)O)c3c4c(c(C(=O)c5ccccc5)c(=O)[nH]c24)-c2ccccc2C3=O)c(S(=O)(=O)O)c1] |

TABLE 91-continued
| Compound No. | Structural formula |
| --- | --- |
| o21 | 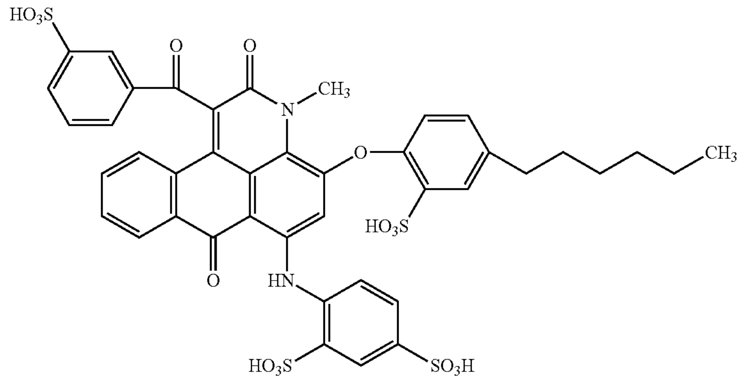 [SMILES: CCCCCCc1ccc(Oc2cc(Nc3ccc(S(=O)(=O)O)cc3S(=O)(=O)O)c3c4c(c(C(=O)c5cccc(S(=O)(=O)O)c5)c(=O)n(C)c24)-c2ccccc2C3=O)c(S(=O)(=O)O)c1] |
| o22 | 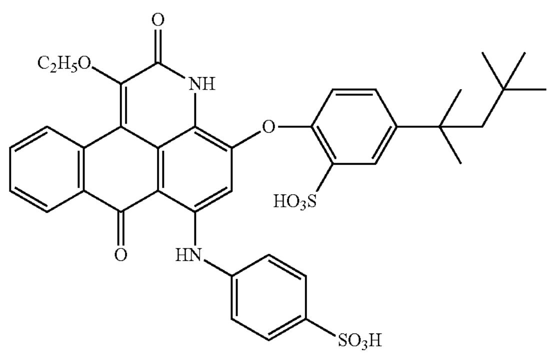 |
| o23 | 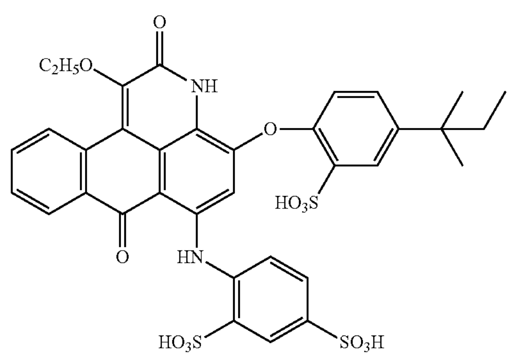 |
| o24 | 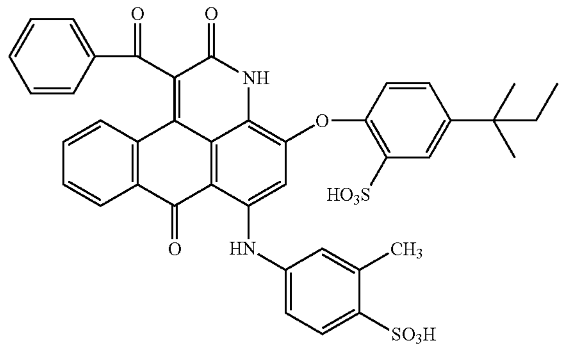 [SMILES: CCC(C)(C)c1ccc(Oc2cc(Nc3ccc(S(=O)(=O)O)c(C)c3)c3c4c(c(C(=O)c5ccccc5)c(=O)[nH]c24)-c2ccccc2C3=O)c(S(=O)(=O)O)c1] |

TABLE 92
| Compound No. | Structural formula |
| --- | --- |
| o25 | 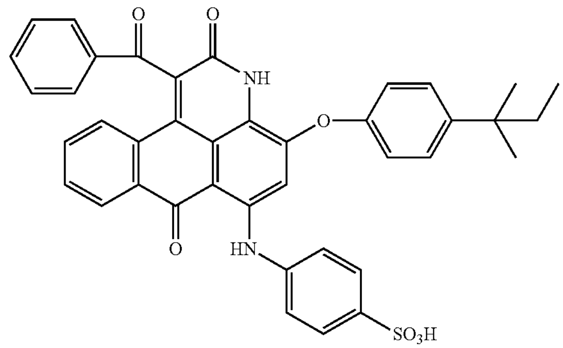 [SMILES: CCC(C)(C)c1ccc(Oc2cc(Nc3ccc(S(=O)(=O)O)cc3)c3c4c(c(C(=O)c5ccccc5)c(=O)[nH]c24)-c2ccccc2C3=O)cc1] |
| o26 | 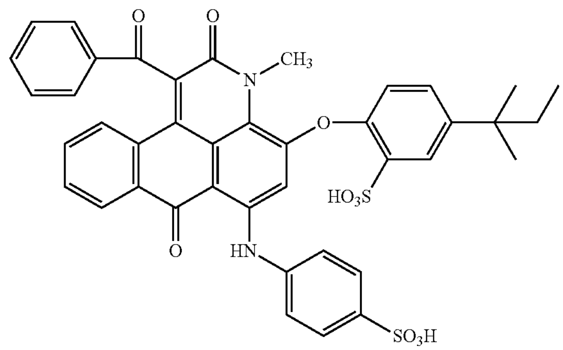 [SMILES: CCC(C)(C)c1ccc(Oc2cc(Nc3ccc(S(=O)(=O)O)cc3)c3c4c(c(C(=O)c5ccccc5)c(=O)n(C)c24)-c2ccccc2C3=O)c(S(=O)(=O)O)c1] |
| o27 | 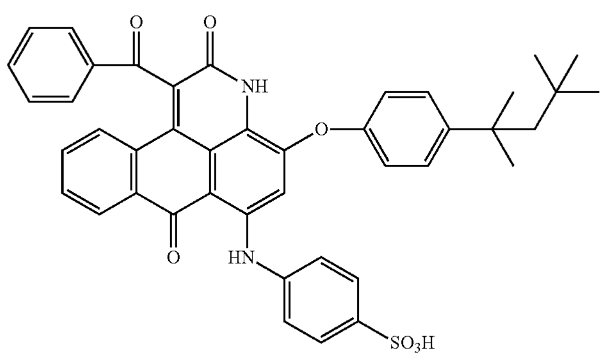 [SMILES: CC(C)(C)CC(C)(C)c1ccc(Oc2cc(Nc3ccc(S(=O)(=O)O)cc3)c3c4c(c(C(=O)c5ccccc5)c(=O)[nH]c24)-c2ccccc2C3=O)cc1] |
| o28 | 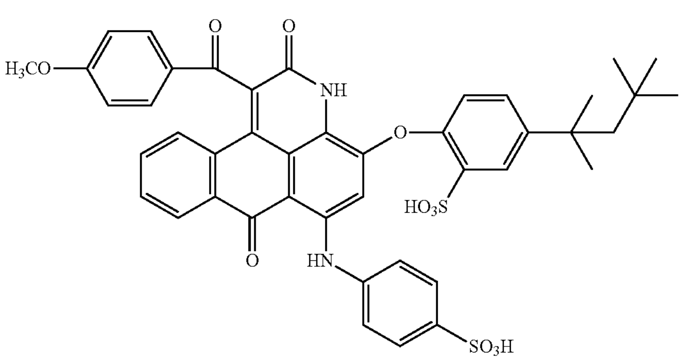 [SMILES: COc1ccc(C(=O)c2c3c4c(c(Nc5ccc(S(=O)(=O)O)cc5)cc(Oc5ccc(C(C)(C)CC(C)(C)C)cc5S(=O)(=O)O)c4[nH]c2=O)C(=O)c2ccccc2-3)cc1] |

TABLE 92-continued
| Compound No. | Structural formula |
| --- | --- |
| o29 | 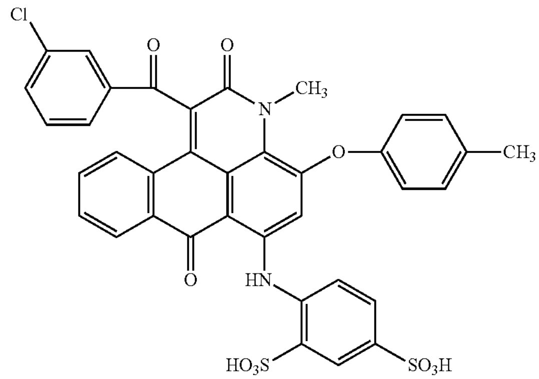 [SMILES: Cc1ccc(Oc2cc(Nc3ccc(S(=O)(=O)O)cc3S(=O)(=O)O)c3c4c(c(C(=O)c5cccc(Cl)c5)c(=O)n(C)c24)-c2ccccc2C3=O)cc1] |
| o30 | 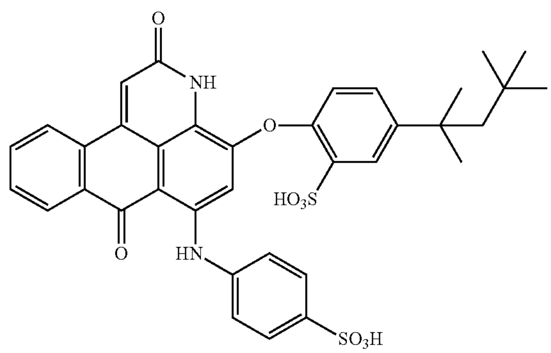 [SMILES: CC(C)(C)CC(C)(C)c1ccc(Oc2cc(Nc3ccc(S(=O)(=O)O)cc3)c3c4c(cc(=O)[nH]c24)-c2ccccc2C3=O)c(S(=O)(=O)O)c1] |
| o31 | 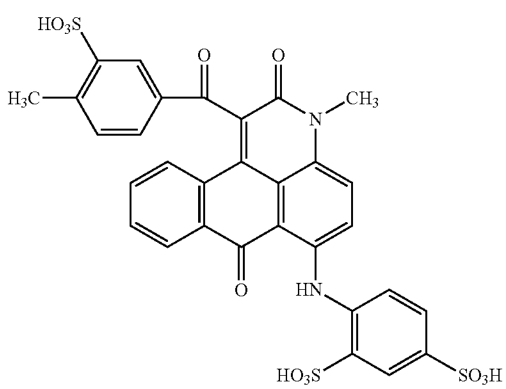 [SMILES: Cc1ccc(C(=O)c2c3c4c(c(Nc5ccc(S(=O)(=O)O)cc5S(=O)(=O)O)ccc4n(C)c2=O)C(=O)c2ccccc2-3)cc1S(=O)(=O)O] |
| o32 | 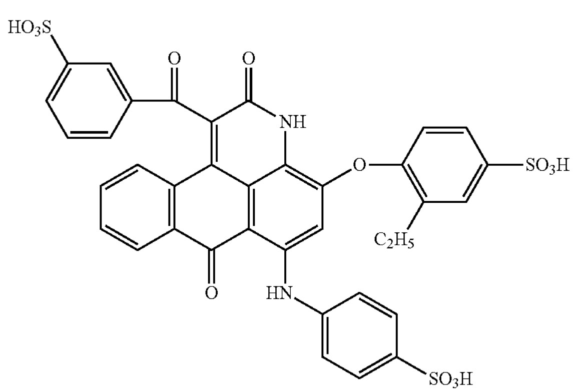 |

TABLE 93
| Compound No. | Structural formula |
| --- | --- |
| o33 | 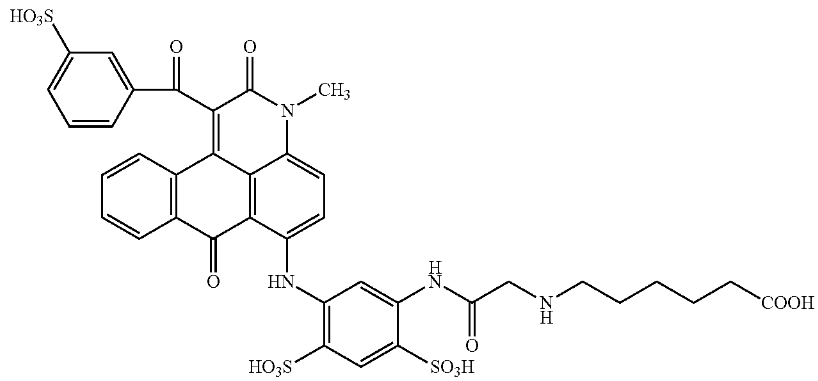 [SMILES: Cn1c(=O)c(C(=O)c2cccc(S(=O)(=O)O)c2)c2c3c(c(Nc4cc(NC(=O)CNCCCCCC(=O)O)c(S(=O)(=O)O)cc4S(=O)(=O)O)ccc31)C(=O)c1ccccc1-2] |
| o34 | 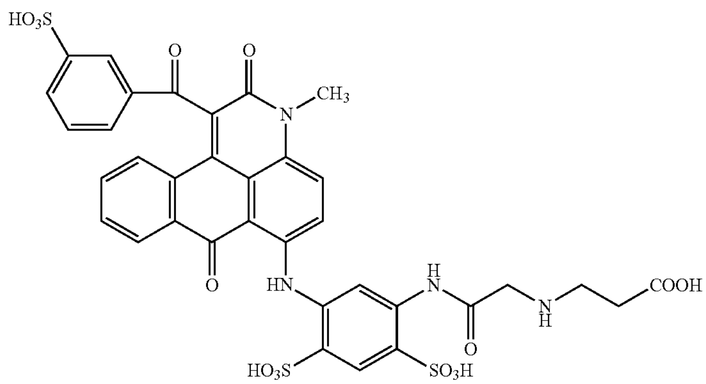 [SMILES: Cn1c(=O)c(C(=O)c2cccc(S(=O)(=O)O)c2)c2c3c(c(Nc4cc(NC(=O)CNCCC(=O)O)c(S(=O)(=O)O)cc4S(=O)(=O)O)ccc31)C(=O)c1ccccc1-2] |
| o35 | 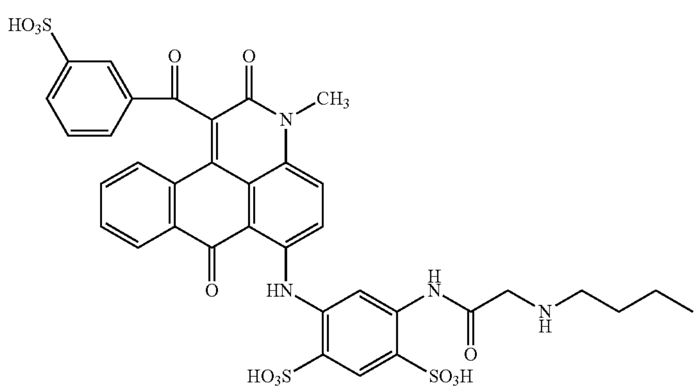 [SMILES: CCCCNCC(=O)Nc1cc(Nc2ccc3c4c2C(=O)c2ccccc2-c4c(C(=O)c2cccc(S(=O)(=O)O)c2)c(=O)n3C)c(S(=O)(=O)O)cc1S(=O)(=O)O] |
| o36 | 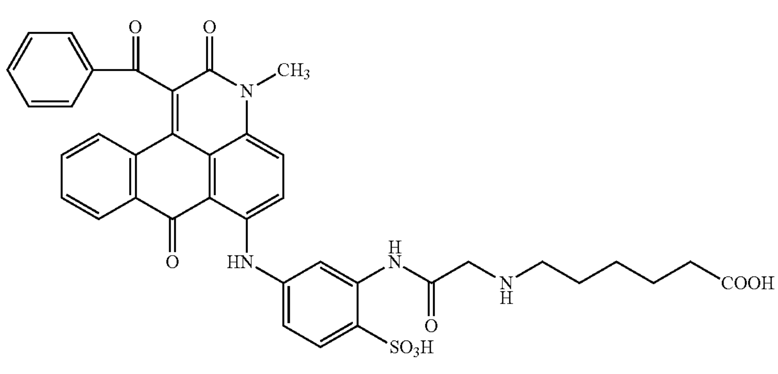 [SMILES: Cn1c(=O)c(C(=O)c2ccccc2)c2c3c(c(Nc4ccc(S(=O)(=O)O)c(NC(=O)CNCCCCCC(=O)O)c4)ccc31)C(=O)c1ccccc1-2] |

TABLE 93-continued
| Compound No. | Structural formula |
| --- | --- |
| o37 | 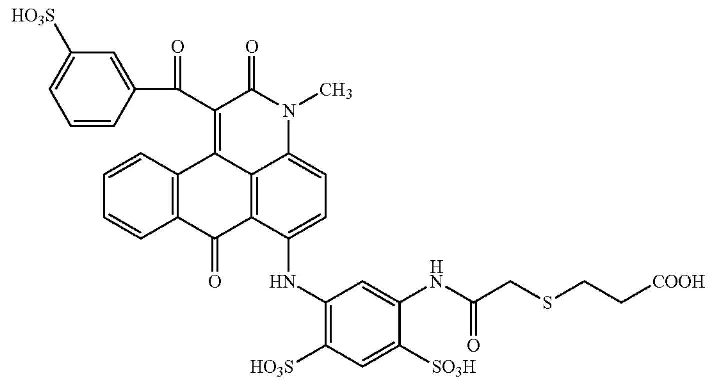 [SMILES: Cn1c(=O)c(C(=O)c2cccc(S(=O)(=O)O)c2)c2c3c(c(Nc4cc(NC(=O)CSCCC(=O)O)c(S(=O)(=O)O)cc4S(=O)(=O)O)ccc31)C(=O)c1ccccc1-2] |
| o38 | 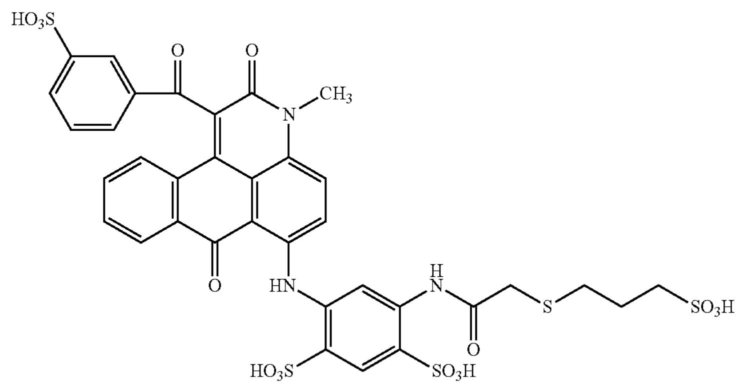 [SMILES: Cn1c(=O)c(C(=O)c2cccc(S(=O)(=O)O)c2)c2c3c(c(Nc4cc(NC(=O)CSCCCS(=O)(=O)O)c(S(=O)(=O)O)cc4S(=O)(=O)O)ccc31)C(=O)c1ccccc1-2] |
| o39 | 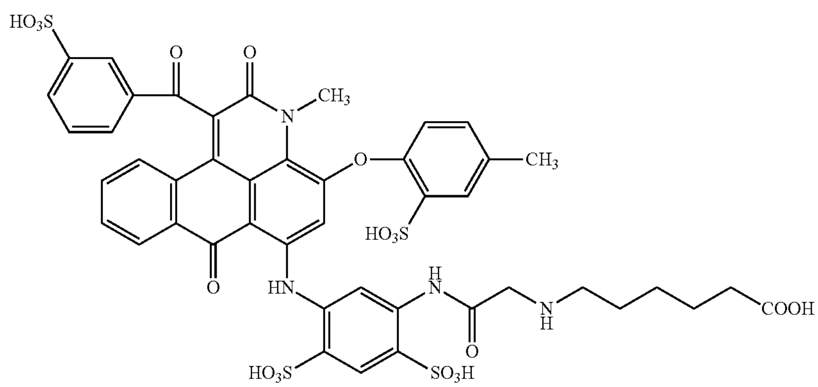 [SMILES: Cc1ccc(Oc2cc(Nc3cc(NC(=O)CNCCCCCC(=O)O)c(S(=O)(=O)O)cc3S(=O)(=O)O)c3c4c(c(C(=O)c5cccc(S(=O)(=O)O)c5)c(=O)n(C)c24)-c2ccccc2C3=O)c(S(=O)(=O)O)c1] |
| o40 | 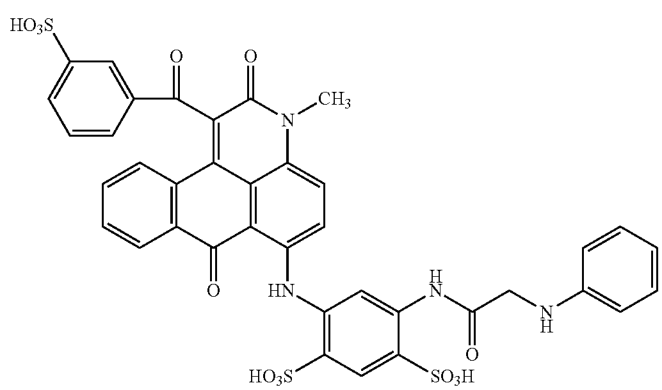 [SMILES: Cn1c(=O)c(C(=O)c2cccc(S(=O)(=O)O)c2)c2c3c(c(Nc4cc(NC(=O)CNc5ccccc5)c(S(=O)(=O)O)cc4S(=O)(=O)O)ccc31)C(=O)c1ccccc1-2] |

TABLE 94
| Compound No. | Structural formula |
|---|---|
| o41 | 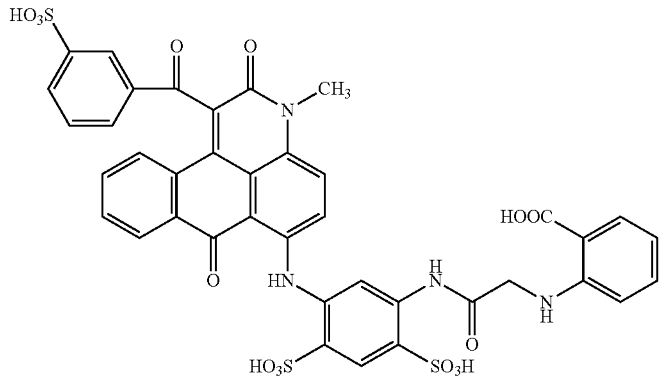 [SMILES: Cn1c(=O)c(C(=O)c2cccc(S(=O)(=O)O)c2)c2c3c(c(Nc4cc(NC(=O)CNc5ccccc5C(=O)O)c(S(=O)(=O)O)cc4S(=O)(=O)O)ccc31)C(=O)c1ccccc1-2] |
| o42 | 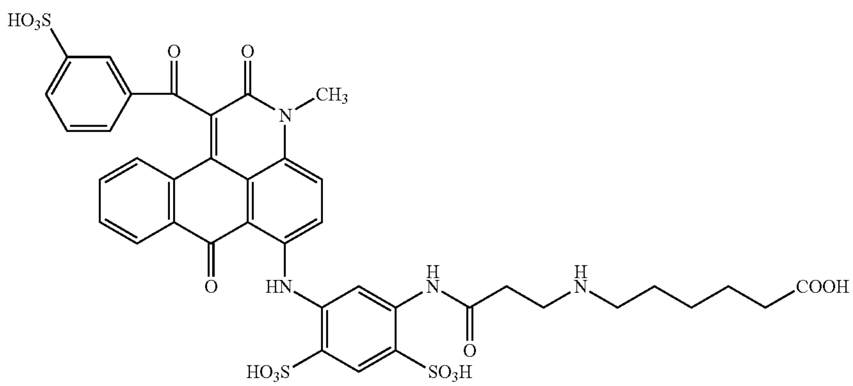 [SMILES: Cn1c(=O)c(C(=O)c2cccc(S(=O)(=O)O)c2)c2c3c(c(Nc4cc(NC(=O)CCNCCCCCC(=O)O)c(S(=O)(=O)O)cc4S(=O)(=O)O)ccc31)C(=O)c1ccccc1-2] |
| o43 | 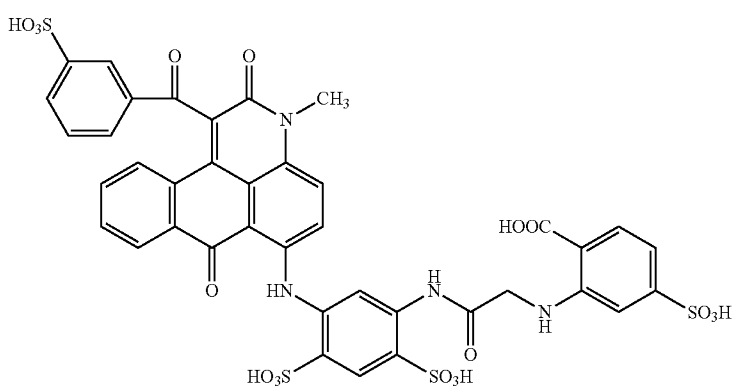 |
| o44 | 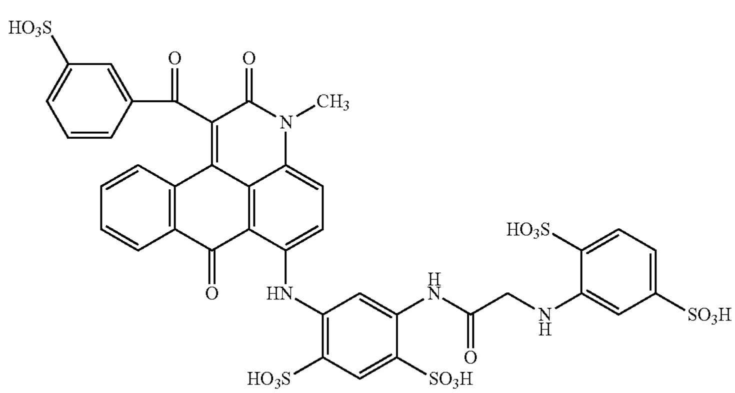 [SMILES: Cn1c(=O)c(C(=O)c2cccc(S(=O)(=O)O)c2)c2c3c(c(Nc4cc(NC(=O)CNc5cc(S(=O)(=O)O)ccc5S(=O)(=O)O)c(S(=O)(=O)O)cc4S(=O)(=O)O)ccc31)C(=O)c1ccccc1-2] |

TABLE 94-continued
| Compound No. | Structural formula |
| --- | --- |
| o45 | 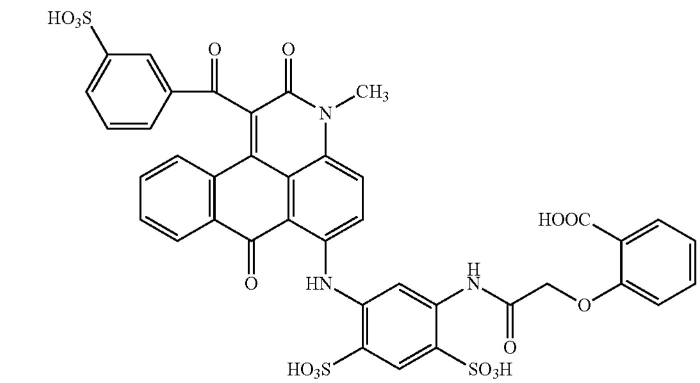 [SMILES: Cn1c(=O)c(C(=O)c2cccc(S(=O)(=O)O)c2)c2c3c(c(Nc4cc(NC(=O)COc5ccccc5C(=O)O)c(S(=O)(=O)O)cc4S(=O)(=O)O)ccc31)C(=O)c1ccccc1-2] |
| o46 | 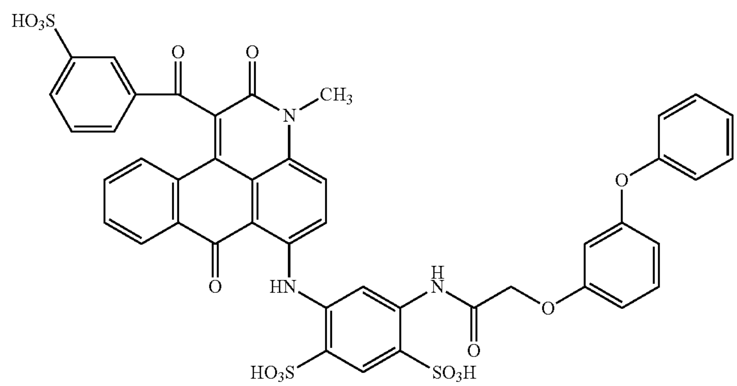 [SMILES: Cn1c(=O)c(C(=O)c2cccc(S(=O)(=O)O)c2)c2c3c(c(Nc4cc(NC(=O)COc5cccc(Oc6ccccc6)c5)c(S(=O)(=O)O)cc4S(=O)(=O)O)ccc31)C(=O)c1ccccc1-2] |
| o47 | 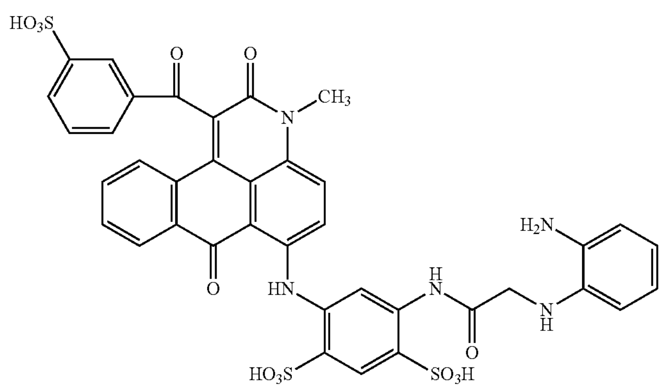 [SMILES: Cn1c(=O)c(C(=O)c2cccc(S(=O)(=O)O)c2)c2c3c(c(Nc4cc(NC(=O)CNc5ccccc5N)c(S(=O)(=O)O)cc4S(=O)(=O)O)ccc31)C(=O)c1ccccc1-2] |
| o48 | 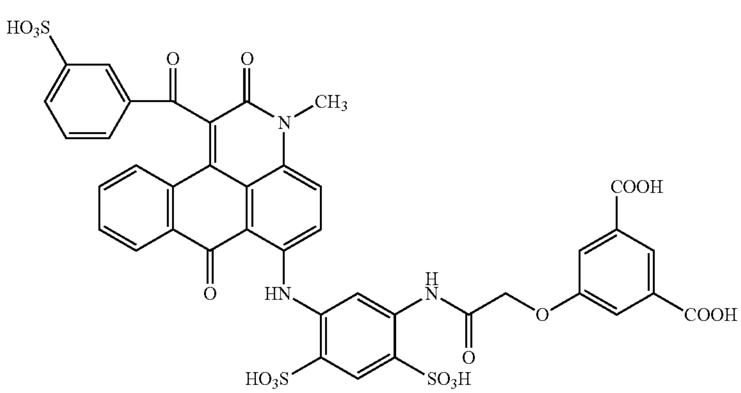 [SMILES: Cn1c(=O)c(C(=O)c2cccc(S(=O)(=O)O)c2)c2c3c(c(Nc4cc(NC(=O)COc5cc(C(=O)O)cc(C(=O)O)c5)c(S(=O)(=O)O)cc4S(=O)(=O)O)ccc31)C(=O)c1ccccc1-2] |

TABLE 95
| Compound No. | Structural formula |
|---|---|
| o49 | 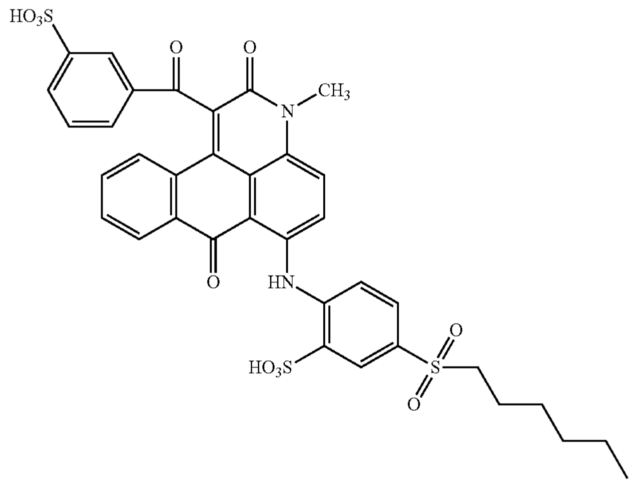 [SMILES: CCCCCCS(=O)(=O)c1ccc(Nc2ccc3c4c2C(=O)c2ccccc2-c4c(C(=O)c2cccc(S(=O)(=O)O)c2)c(=O)n3C)c(S(=O)(=O)O)c1] |
| o50 | 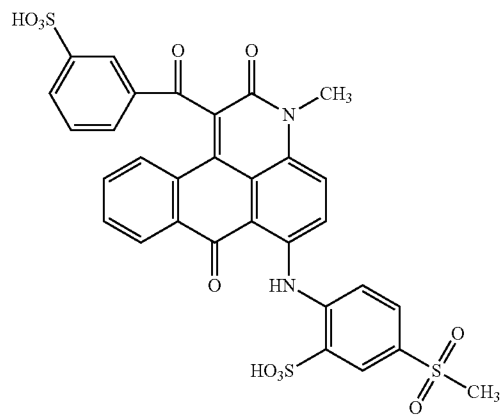 [SMILES: Cn1c(=O)c(C(=O)c2cccc(S(=O)(=O)O)c2)c2c3c(c(Nc4ccc(S(C)(=O)=O)cc4S(=O)(=O)O)ccc31)C(=O)c1ccccc1-2] |
| o51 | 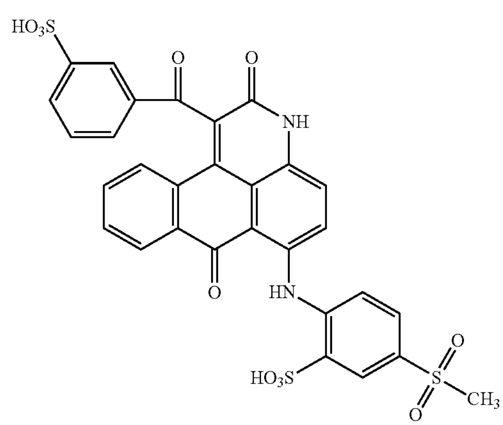 [SMILES: CS(=O)(=O)c1ccc(Nc2ccc3[nH]c(=O)c(C(=O)c4cccc(S(=O)(=O)O)c4)c4c3c2C(=O)c2ccccc2-4)c(S(=O)(=O)O)c1] |

TABLE 95-continued
| Compound No. | Structural formula |
|---|---|
| o52 | 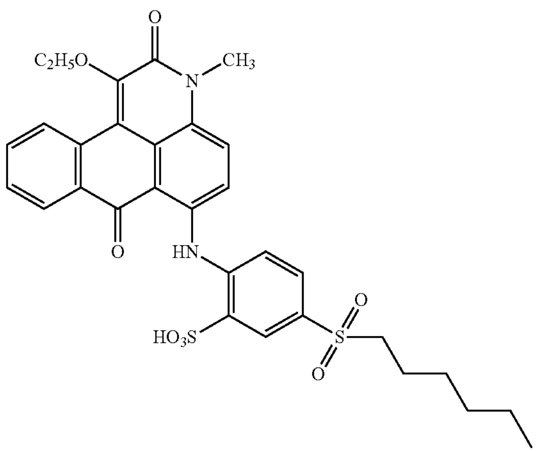 |
| o53 | 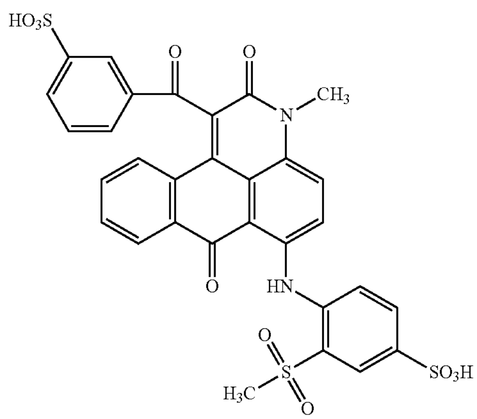 [SMILES: Cn1c(=O)c(C(=O)c2cccc(S(=O)(=O)O)c2)c2c3c(c(Nc4ccc(S(=O)(=O)O)cc4S(C)(=O)=O)ccc31)C(=O)c1ccccc1-2] |
| o54 | 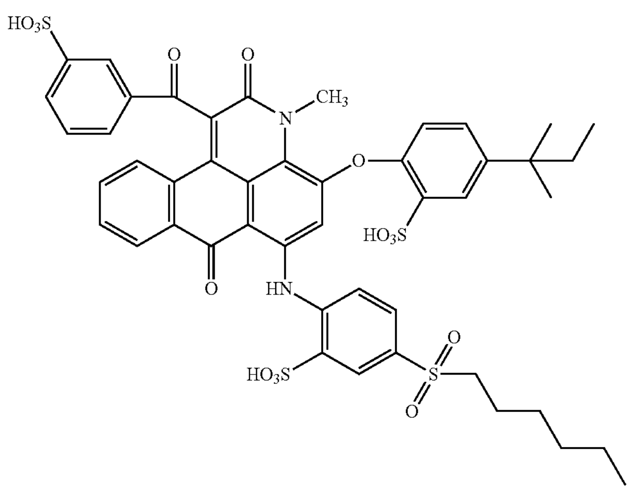 [SMILES: CCCCCCS(=O)(=O)c1ccc(Nc2cc(Oc3ccc(C(C)(C)CC)cc3S(=O)(=O)O)c3c4c2C(=O)c2ccccc2-c4c(C(=O)c2cccc(S(=O)(=O)O)c2)c(=O)n3C)c(S(=O)(=O)O)c1] |

TABLE 95-continued
| Compound No. | Structural formula |
|---|---|
| o55 | 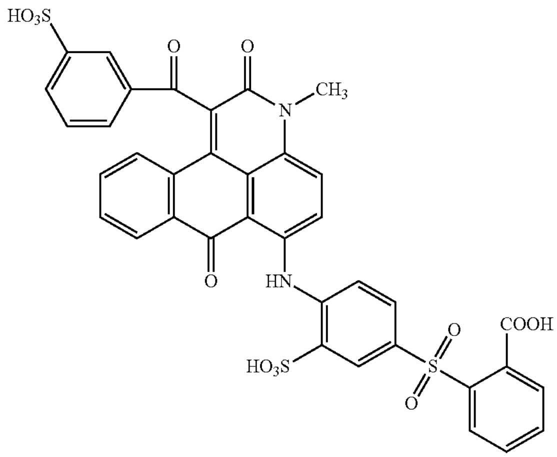 [SMILES: Cn1c(=O)c(C(=O)c2cccc(S(=O)(=O)O)c2)c2c3c(c(Nc4ccc(S(=O)(=O)c5ccccc5C(=O)O)cc4S(=O)(=O)O)ccc31)C(=O)c1ccccc1-2] |
| o56 | 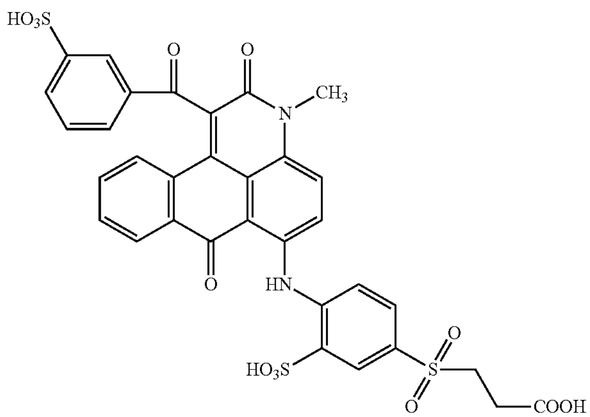 [SMILES: Cn1c(=O)c(C(=O)c2cccc(S(=O)(=O)O)c2)c2c3c(c(Nc4ccc(S(=O)(=O)CCC(=O)O)cc4S(=O)(=O)O)ccc31)C(=O)c1ccccc1-2] |
TABLE 96
| Compound No. | Structural formula |
|---|---|
| o57 | 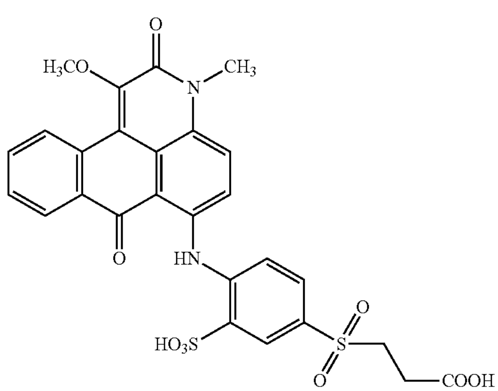 [SMILES: COc1c2c3c(c(Nc4ccc(S(=O)(=O)CCC(=O)O)cc4S(=O)(=O)O)ccc3n(C)c1=O)C(=O)c1ccccc1-2] |

TABLE 96-continued
| Compound No. | Structural formula |
| --- | --- |
| o58 | 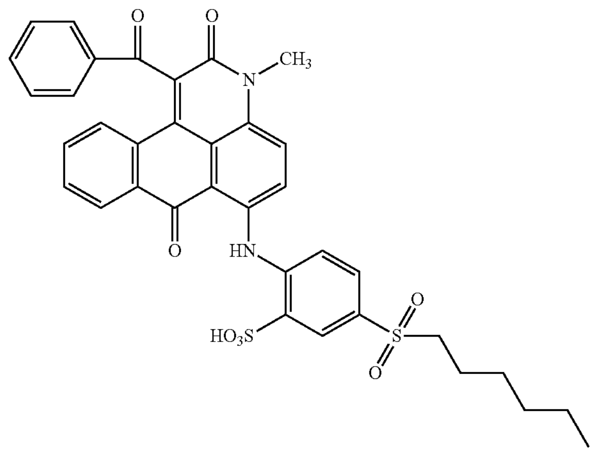 [SMILES: CCCCCCS(=O)(=O)c1ccc(Nc2ccc3c4c2C(=O)c2ccccc2-c4c(C(=O)c2ccccc2)c(=O)n3C)c(S(=O)(=O)O)c1] |
| o59 | 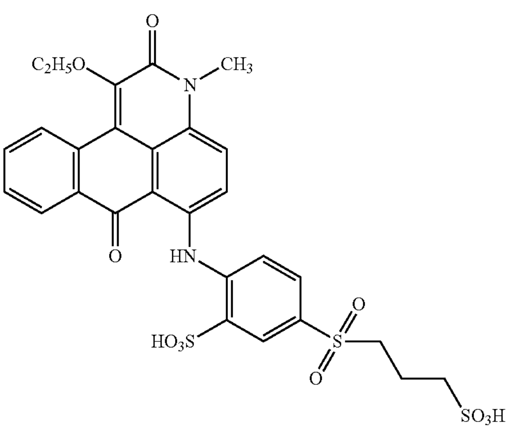 |
| o60 | 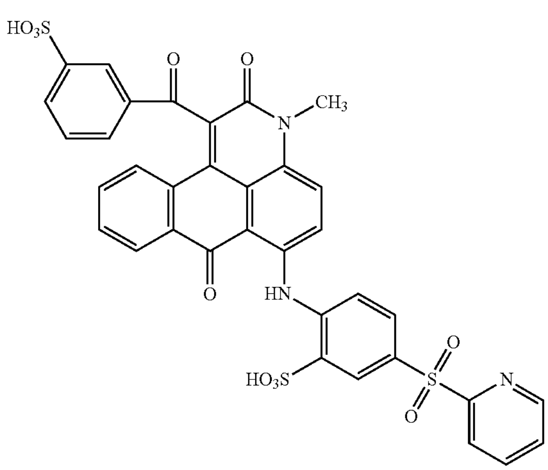 [SMILES: Cn1c(=O)c(C(=O)c2cccc(S(=O)(=O)O)c2)c2c3c(c(Nc4ccc(S(=O)(=O)c5ccccn5)cc4S(=O)(=O)O)ccc31)C(=O)c1ccccc1-2] |

TABLE 96-continued
| Compound No. | Structural formula |
| --- | --- |
| o61 | 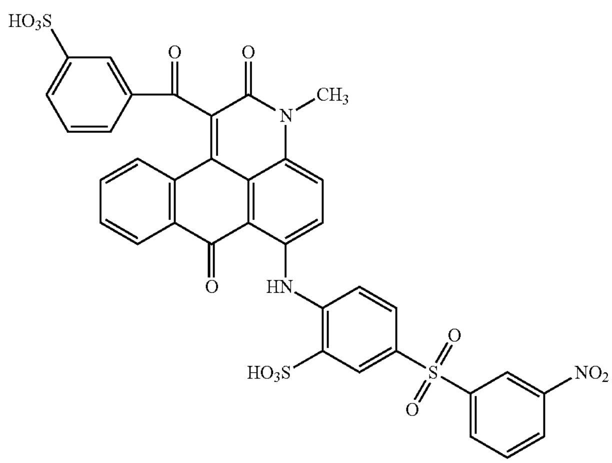 [SMILES: Cn1c(=O)c(C(=O)c2cccc(S(=O)(=O)O)c2)c2c3c(c(Nc4ccc(S(=O)(=O)c5cccc([N+](=O)[O-])c5)cc4S(=O)(=O)O)ccc31)C(=O)c1ccccc1-2] |
| o62 | 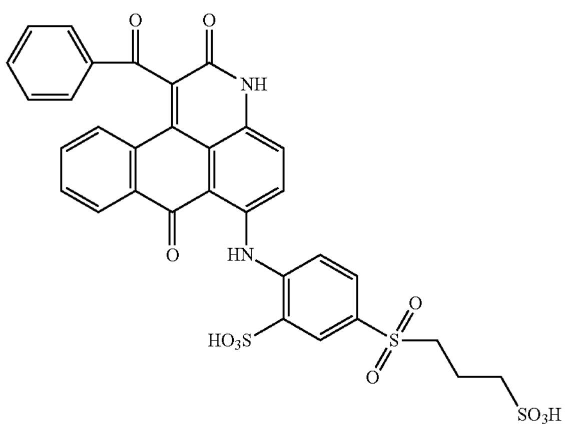 [SMILES: O=C(c1ccccc1)c1c2c3c(c(Nc4ccc(S(=O)(=O)CCCS(=O)(=O)O)cc4S(=O)(=O)O)ccc3[nH]c1=O)C(=O)c1ccccc1-2] |
| o63 | 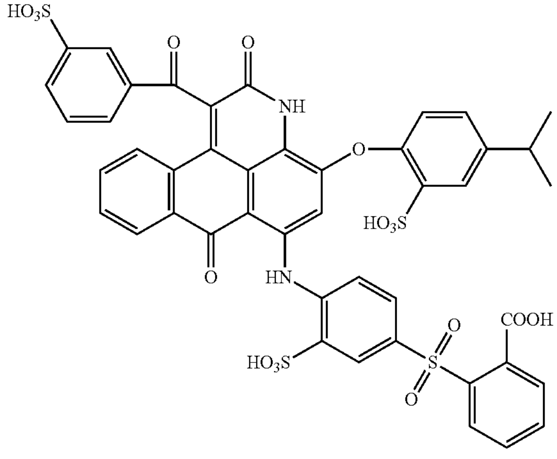 [SMILES: CC(C)c1ccc(Oc2cc(Nc3ccc(S(=O)(=O)c4ccccc4C(=O)O)cc3S(=O)(=O)O)c3c4c(c(C(=O)c5cccc(S(=O)(=O)O)c5)c(=O)[nH]c24)-c2ccccc2C3=O)c(S(=O)(=O)O)c1] |

TABLE 96-continued
| Compound No. | Structural formula |
|---|---|
| o64 | 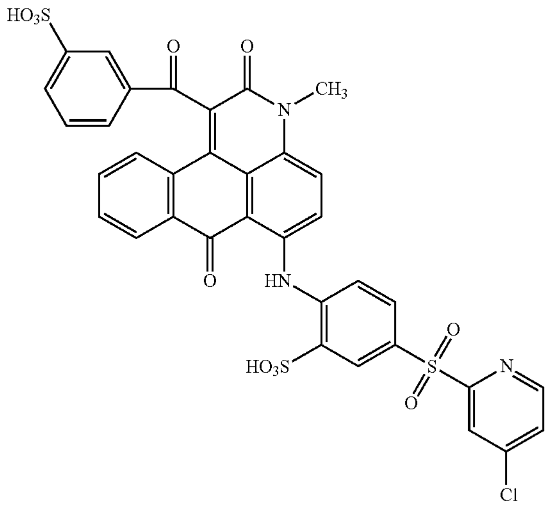 [SMILES: Cn1c(=O)c(C(=O)c2cccc(S(=O)(=O)O)c2)c2c3c(c(Nc4ccc(S(=O)(=O)c5cc(Cl)ccn5)cc4S(=O)(=O)O)ccc31)C(=O)c1ccccc1-2] |
TABLE 97
| Compound No. | Structural formula |
|---|---|
| o65 | 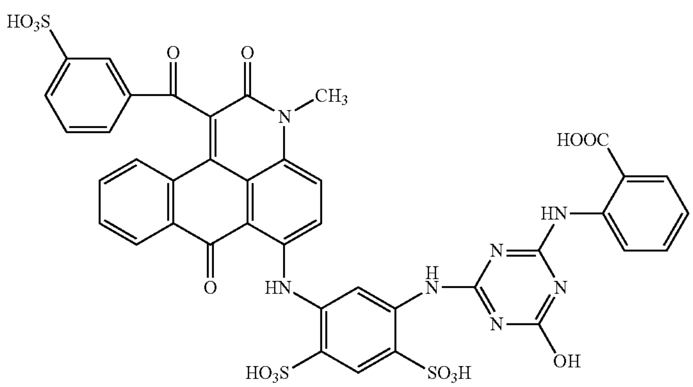 [SMILES: Cn1c(=O)c(C(=O)c2cccc(S(=O)(=O)O)c2)c2c3c(c(Nc4cc(Nc5nc(O)nc(Nc6ccccc6C(=O)O)n5)c(S(=O)(=O)O)cc4S(=O)(=O)O)ccc31)C(=O)c1ccccc1-2] |
| o66 | 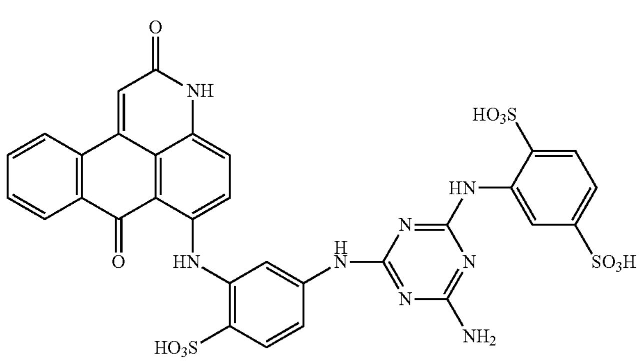 [SMILES: Nc1nc(Nc2ccc(S(=O)(=O)O)c(Nc3ccc4[nH]c(=O)cc5c4c3C(=O)c3ccccc3-5)c2)nc(Nc2cc(S(=O)(=O)O)ccc2S(=O)(=O)O)n1] |

TABLE 97-continued
| Compound No. | Structural formula |
|---|---|
| o67 | 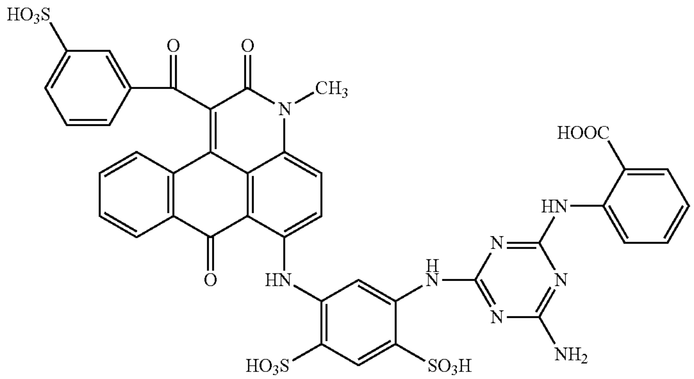 [SMILES: Cn1c(=O)c(C(=O)c2cccc(S(=O)(=O)O)c2)c2c3c(c(Nc4cc(Nc5nc(N)nc(Nc6ccccc6C(=O)O)n5)c(S(=O)(=O)O)cc4S(=O)(=O)O)ccc31)C(=O)c1ccccc1-2] |
| o68 | 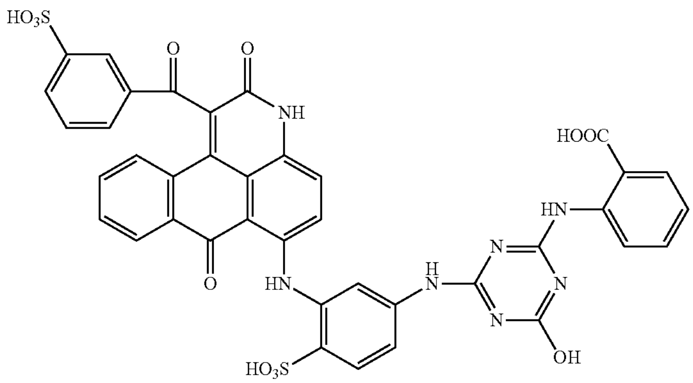 [SMILES: O=C(O)c1ccccc1Nc1nc(O)nc(Nc2ccc(S(=O)(=O)O)c(Nc3ccc4[nH]c(=O)c(C(=O)c5cccc(S(=O)(=O)O)c5)c5c4c3C(=O)c3ccccc3-5)c2)n1] |
| o69 | 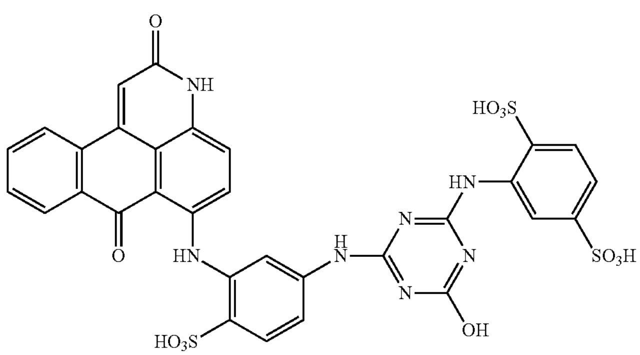 [SMILES: O=C1c2ccccc2-c2cc(=O)[nH]c3ccc(Nc4cc(Nc5nc(O)nc(Nc6cc(S(=O)(=O)O)ccc6S(=O)(=O)O)n5)ccc4S(=O)(=O)O)c1c23] |
| o70 | 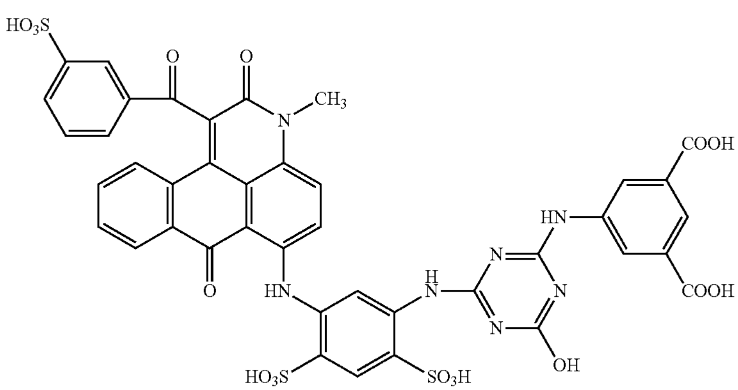 [SMILES: Cn1c(=O)c(C(=O)c2cccc(S(=O)(=O)O)c2)c2c3c(c(Nc4cc(Nc5nc(O)nc(Nc6cc(C(=O)O)cc(C(=O)O)c6)n5)c(S(=O)(=O)O)cc4S(=O)(=O)O)ccc31)C(=O)c1ccccc1-2] |

TABLE 97-continued
| Compound No. | Structural formula |
| --- | --- |
| o71 | 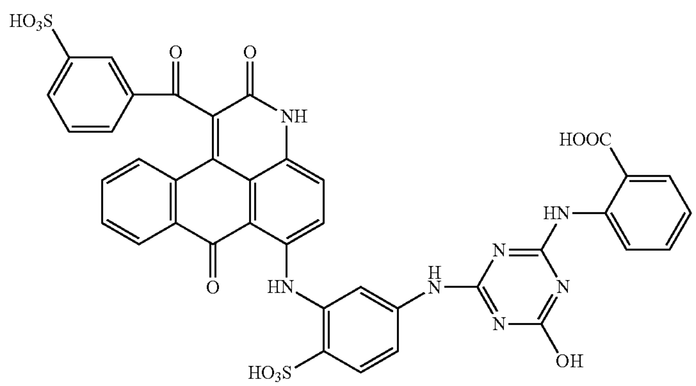 [SMILES: O=C(O)c1ccccc1Nc1nc(O)nc(Nc2ccc(S(=O)(=O)O)c(Nc3ccc4[nH]c(=O)c(C(=O)c5cccc(S(=O)(=O)O)c5)c5c4c3C(=O)c3ccccc3-5)c2)n1] |
| o72 | 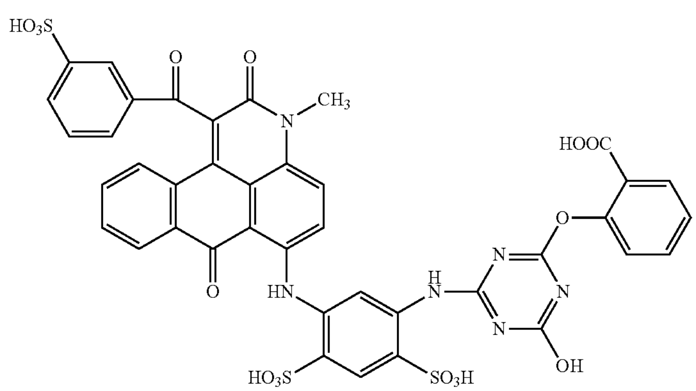 [SMILES: Cn1c(=O)c(C(=O)c2cccc(S(=O)(=O)O)c2)c2c3c(c(Nc4cc(Nc5nc(O)nc(Oc6ccccc6C(=O)O)n5)c(S(=O)(=O)O)cc4S(=O)(=O)O)ccc31)C(=O)c1ccccc1-2] |
TABLE 98
| Compound No. | Structural formula |
| --- | --- |
| o73 | 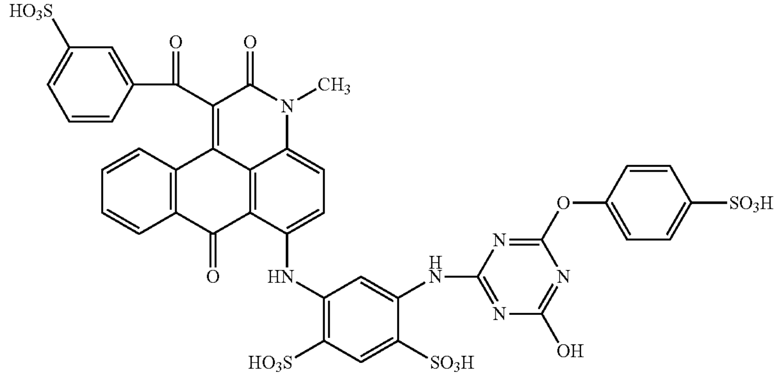 [SMILES: Cn1c(=O)c(C(=O)c2cccc(S(=O)(=O)O)c2)c2c3c(c(Nc4cc(Nc5nc(O)nc(Oc6ccc(S(=O)(=O)O)cc6)n5)c(S(=O)(=O)O)cc4S(=O)(=O)O)ccc31)C(=O)c1ccccc1-2] |

TABLE 98-continued
| Compound No. | Structural formula |
| --- | --- |
| o74 | 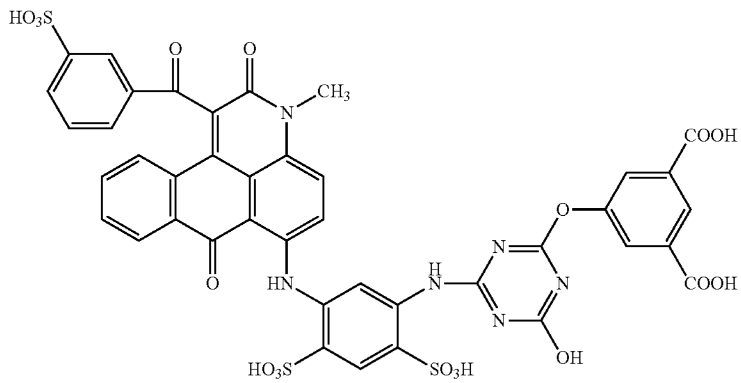 [SMILES: Cn1c(=O)c(C(=O)c2cccc(S(=O)(=O)O)c2)c2c3c(c(Nc4cc(Nc5nc(O)nc(Oc6cc(C(=O)O)cc(C(=O)O)c6)n5)c(S(=O)(=O)O)cc4S(=O)(=O)O)ccc31)C(=O)c1ccccc1-2] |
| o75 | 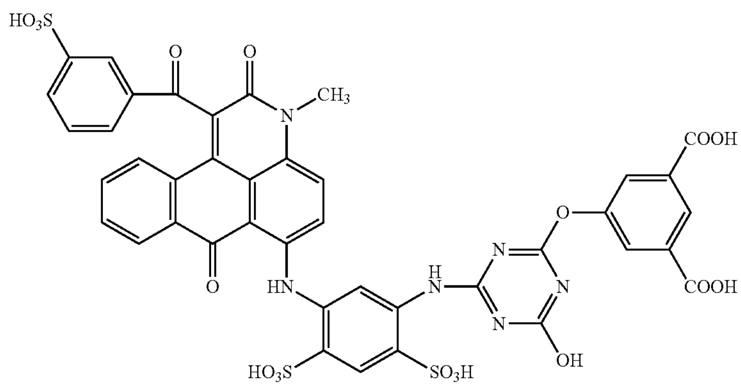 [SMILES: Cn1c(=O)c(C(=O)c2cccc(S(=O)(=O)O)c2)c2c3c(c(Nc4cc(Nc5nc(O)nc(Oc6cc(C(=O)O)cc(C(=O)O)c6)n5)c(S(=O)(=O)O)cc4S(=O)(=O)O)ccc31)C(=O)c1ccccc1-2] |
| o76 | 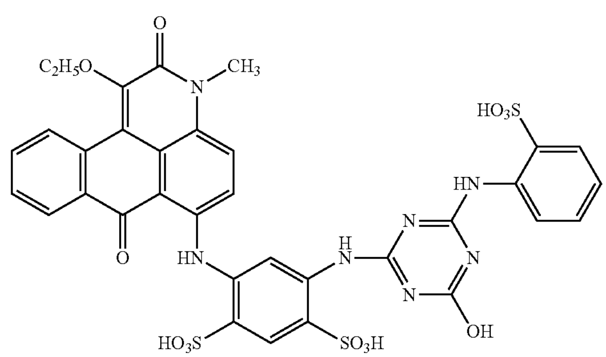 |
| o77 | 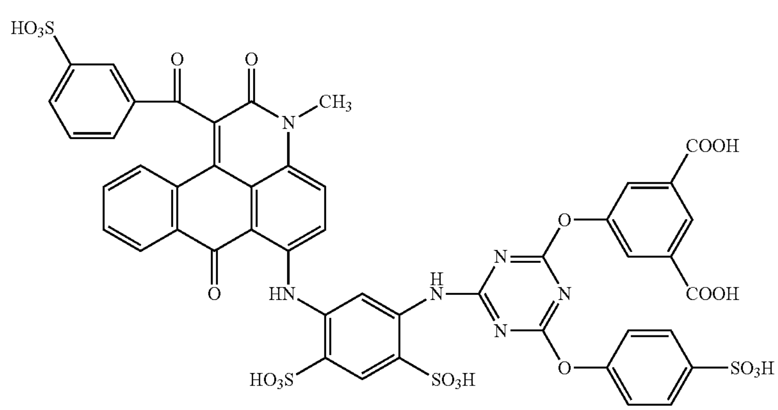 [SMILES: Cn1c(=O)c(C(=O)c2cccc(S(=O)(=O)O)c2)c2c3c(c(Nc4cc(Nc5nc(Oc6ccc(S(=O)(=O)O)cc6)nc(Oc6cc(C(=O)O)cc(C(=O)O)c6)n5)c(S(=O)(=O)O)cc4S(=O)(=O)O)ccc31)C(=O)c1ccccc1-2] |

TABLE 98-continued
| Compound No. | Structural formula |
| --- | --- |
| o78 | 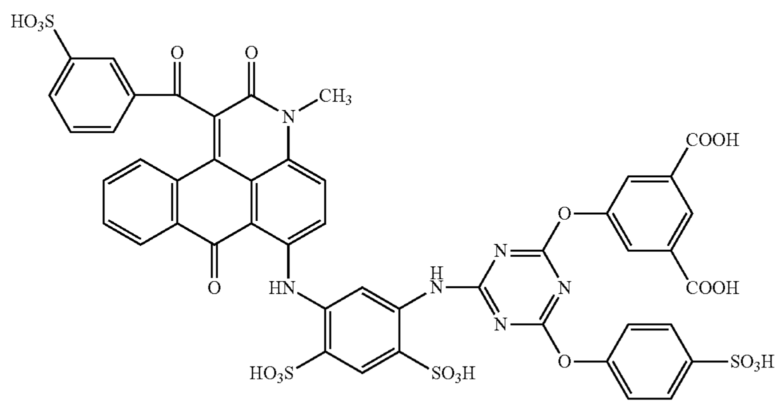 [SMILES: Cn1c(=O)c(C(=O)c2cccc(S(=O)(=O)O)c2)c2c3c(c(Nc4cc(Nc5nc(Oc6ccc(S(=O)(=O)O)cc6)nc(Oc6cc(C(=O)O)cc(C(=O)O)c6)n5)c(S(=O)(=O)O)cc4S(=O)(=O)O)ccc31)C(=O)c1ccccc1-2] |
| o79 | 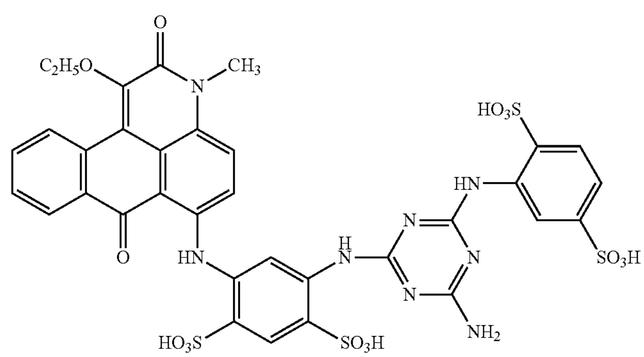 |
| o80 | 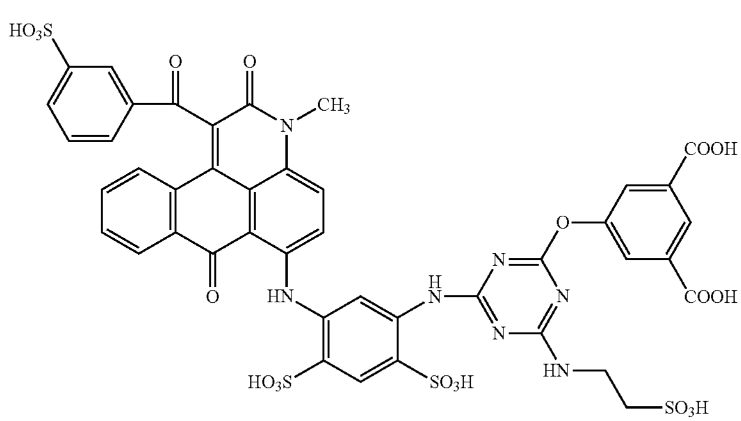 [SMILES: Cn1c(=O)c(C(=O)c2cccc(S(=O)(=O)O)c2)c2c3c(c(Nc4cc(Nc5nc(NCCS(=O)(=O)O)nc(Oc6cc(C(=O)O)cc(C(=O)O)c6)n5)c(S(=O)(=O)O)cc4S(=O)(=O)O)ccc31)C(=O)c1ccccc1-2] |

TABLE 99
| Compound No. | Structural formula |
| --- | --- |
| o81 | 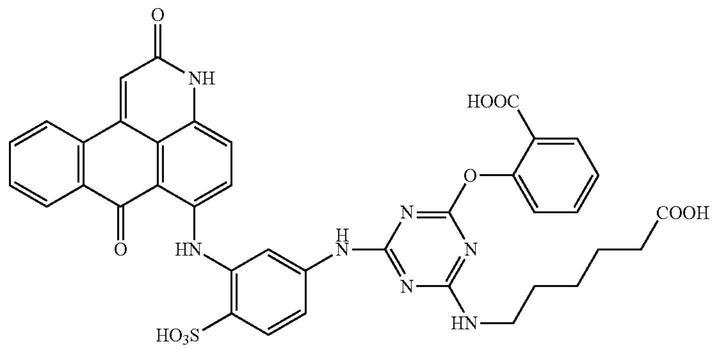 [SMILES: O=C(O)CCCCCNc1nc(Nc2ccc(S(=O)(=O)O)c(Nc3ccc4[nH]c(=O)cc5c4c3C(=O)c3ccccc3-5)c2)nc(Oc2ccccc2C(=O)O)n1] |
| o82 | 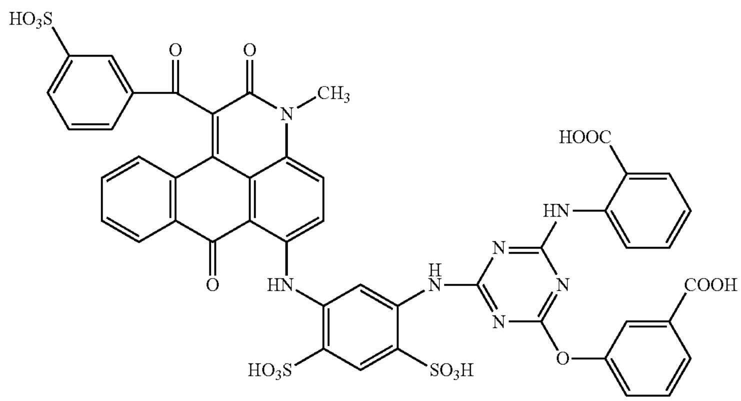 [SMILES: Cn1c(=O)c(C(=O)c2cccc(S(=O)(=O)O)c2)c2c3c(c(Nc4cc(Nc5nc(Nc6ccccc6C(=O)O)nc(Oc6cccc(C(=O)O)c6)n5)c(S(=O)(=O)O)cc4S(=O)(=O)O)ccc31)C(=O)c1ccccc1-2] |
| o83 | 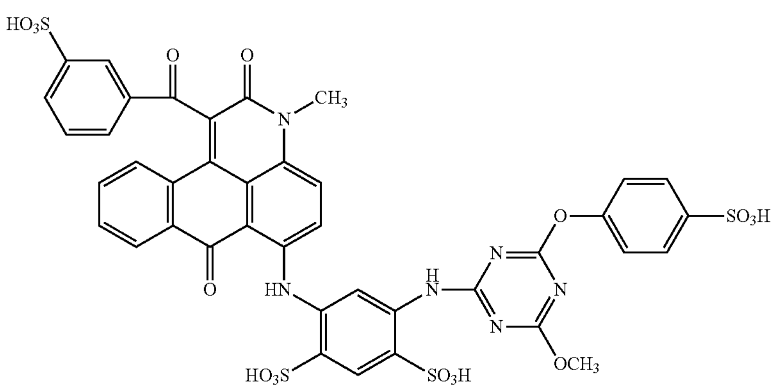 [SMILES: COc1nc(Nc2cc(Nc3ccc4c5c3C(=O)c3ccccc3-c5c(C(=O)c3cccc(S(=O)(=O)O)c3)c(=O)n4C)c(S(=O)(=O)O)cc2S(=O)(=O)O)nc(Oc2ccc(S(=O)(=O)O)cc2)n1] |
| o84 | 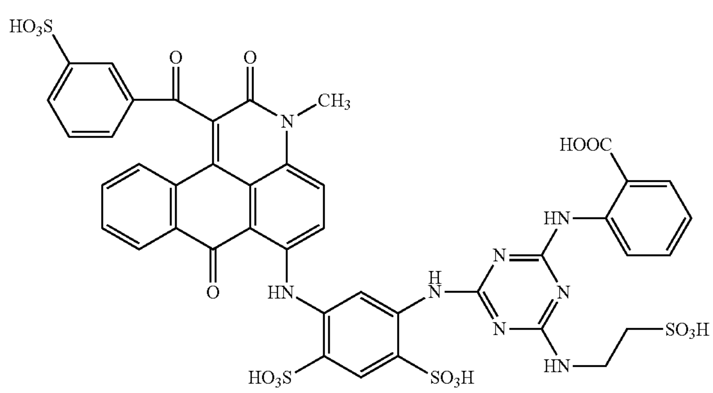 [SMILES: Cn1c(=O)c(C(=O)c2cccc(S(=O)(=O)O)c2)c2c3c(c(Nc4cc(Nc5nc(NCCS(=O)(=O)O)nc(Nc6ccccc6C(=O)O)n5)c(S(=O)(=O)O)cc4S(=O)(=O)O)ccc31)C(=O)c1ccccc1-2] |

TABLE 99-continued
| Compound No. | Structural formula |
| --- | --- |
| o85 | 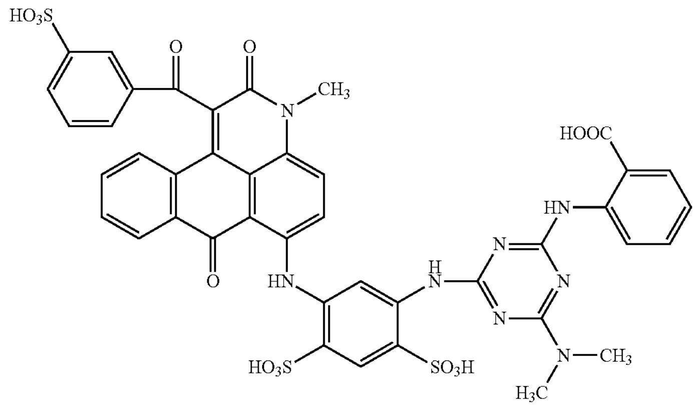 [SMILES: CN(C)c1nc(Nc2ccccc2C(=O)O)nc(Nc2cc(Nc3ccc4c5c3C(=O)c3ccccc3-c5c(C(=O)c3cccc(S(=O)(=O)O)c3)c(=O)n4C)c(S(=O)(=O)O)cc2S(=O)(=O)O)n1] |
| o86 | 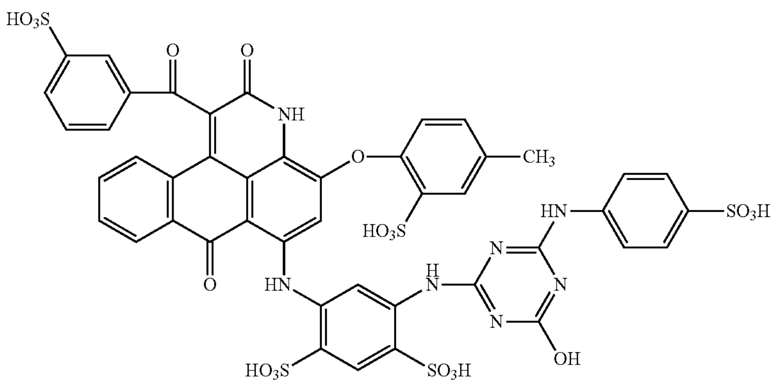 [SMILES: Cc1ccc(Oc2cc(Nc3cc(Nc4nc(O)nc(Nc5ccc(S(=O)(=O)O)cc5)n4)c(S(=O)(=O)O)cc3S(=O)(=O)O)c3c4c(c(C(=O)c5cccc(S(=O)(=O)O)c5)c(=O)[nH]c24)-c2ccccc2C3=O)c(S(=O)(=O)O)c1] |
| o87 | 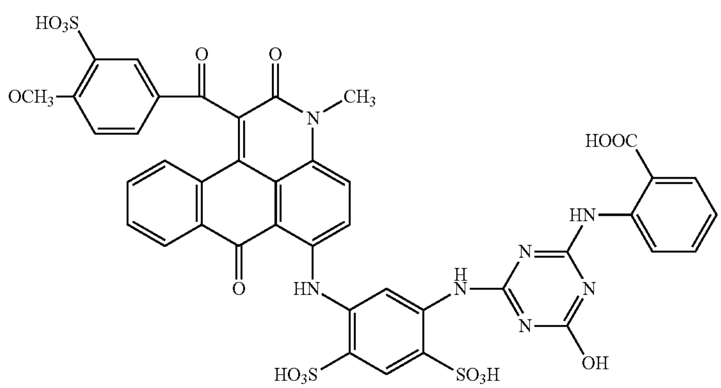 [SMILES: COc1ccc(C(=O)c2c3c4c(c(Nc5cc(Nc6nc(O)nc(Nc7ccccc7C(=O)O)n6)c(S(=O)(=O)O)cc5S(=O)(=O)O)ccc4n(C)c2=O)C(=O)c2ccccc2-3)cc1S(=O)(=O)O] |
| o88 | 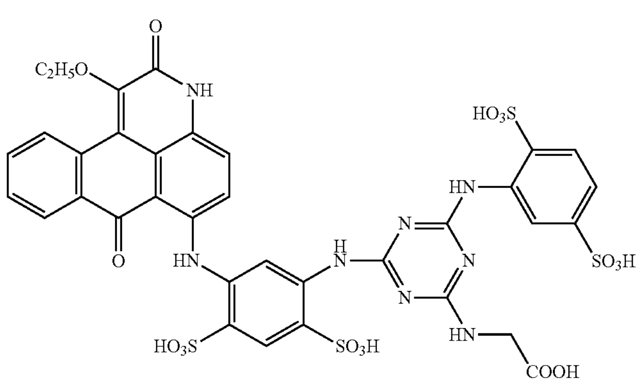 |

The ink composition of the present invention further contains at least one coloring matter that has the maximum absorbance at a wavelength within the range from 350 nm to 550 nm (λmax) as the component (C), and can achieve further improvement in color development properties, inhibition of hue variations caused by a medium, reduced chroma, and improved color rendering properties.

The maximum absorbance at a wavelength (λmax) is a value measured in an aqueous solution at pH7 to pH8.

The coloring-matter component (C) is preferably one or more kinds of the component (B-a), the component (B-b), and the component (B-q). This is because, in addition to improvement in color development properties and the like, ozone-gas resistance can also be improved.

[Component (B-p)]

A compound (B-p) can enhance the color gamut and improve color development properties and ozone-gas resistance. The compound can be obtained, for example, by a method described in International Publication No. WO 2008/066062. A compound represented by the formula (p1) preferably has the maximum absorbance at a wavelength within the range from 400 nm to 600 nm.

In the formula (p1), m denotes 1 or 2 and preferably denotes 2.

It should be noted that the two ms in the formula (p1) may be the same as or different from each other.

In the formula (p1), $R^{101}$ is a hydrogen atom; a benzoyl group; a benzoyl group substituted with at least one group selected from the group consisting of a halogen atom, a (C1-C4) alkyl group, a (C1-C4) alkoxy group, a sulfo group, and a carboxy group; a (C1-C4) alkoxycarbonyl group; a (C6-C10) aryloxycarbonyl group; or a (C6-C10) aryl (C1-C4) alkoxycarbonyl group.

It should be noted that the two $R^{101}$s in the formula (p1) may be the same as or different from each other.

The benzoyl group substituted with at least one group selected from the group consisting of a halogen atom, a (C1-C4) alkyl group, a (C1-C4) alkoxy group, a sulfo group, and a carboxy group as or in $R^{101}$ in the formula (p1) is, for example, one in which a carbon atom of the benzoyl group has a substituent attached thereto. The number of substitution is 1 to 3, preferably 1 or 2, and more preferably 1. Examples of a halogen atom, a (C1-C4) alkyl group, and a (C1-C4) alkoxy group as substituents are the same as the examples of the halogen atom, the (C1-C4) alkyl group, and the (C1-C4) alkoxy group as or in $R^1$, $R^2$, $R^5$, $R^6$, and $R^7$ described above, including specific examples, preferable examples, and more preferable examples thereof. Specific examples include ones substituted with a halogen atom, such as a fluorobenzoyl group, a chlorobenzoyl group, a bromobenzoyl group, and a iodobenzoyl group; ones substituted with a (C1-C4) alkyl group, such as a methylbenzoyl group, an ethylbenzoyl group, an n-propylbenzoyl group, an isopropylbenzoyl group, an n-butylbenzoyl group, and a tert-butylbenzoyl group; ones substituted with a (C1-C4) alkoxy group, such as a methoxybenzoyl group, an ethoxybenzoyl group, an n-propoxybenzoyl group, and an n-butoxybenzoyl group; a sulfobenzoyl group; and a carboxybenzoyl group. The ones substituted with a chlorine atom, a methoxy group, a sulfo group, or a carboxy group are preferable, and a sulfobenzoyl group is more preferable.

Examples of the (C1-C4) alkoxycarbonyl group as or in $R^{101}$ in the formula (p1) include ones in which a carbonyl group thereof has a (C1-C4) alkoxy group as a substituent. Examples of the (C1-C4) alkoxy group as a substituent are the same as the examples of the (C1-C4) alkoxy group as or in $R^1$, $R^2$, $R^5$, $R^6$, and $R^7$ described above, including specific examples, preferable examples, and more preferable examples thereof. Specific examples include a methoxycarbonyl group, an ethoxycarbonyl group, a propoxycarbonyl group, and a butoxycarbonyl group. A methoxycarbonyl group and an ethoxycarbonyl group are preferable, and an ethoxycarbonyl group is more preferable.

The (C6-C10) aryloxycarbonyl group as or in $R^{101}$ in the formula (p1) is a phenoxycarbonyl group or a naphthyloxycarbonyl group, for example, and is preferably a phenoxycarbonyl group.

The (C6-C10) aryl (C1-C4) alkoxycarbonyl group as or in $R^{101}$ in the formula (p1) is a phenyl (C1-C4) alkoxycarbonyl group or a naphthyl (C1-C4) alkoxycarbonyl group, for example, with the former being preferable. The alkoxy moiety thereof is preferably linear. Specific examples include a phenyl (C1-C4) alkoxycarbonyl group such as a phenylmethoxycarbonyl group, a phenylethoxycarbonyl group, a phenyl-n-propoxycarbonyl group, and a phenyl-n-butoxycarbonyl group; a naphtho-1-yl-(C1-C4) alkoxycarbonyl group such as a naphtho-1-yl-methoxycarbonyl group, a naphtho-1-yl-ethoxycarbonyl group, a naphtho-1-yl-n-propoxycarbonyl group, and a naphtho-1-yl-n-butoxycarbonyl group; and a naphtho-2-yl-(C1-C4) alkoxycarbonyl group such as a naphtho-2-yl-methoxycarbonyl group, a naphtho-2-yl-ethoxycarbonyl group, a naphtho-2-yl-n-propoxycarbonyl group, and naphtho-2-yl-n-butoxycarbonyl group. Among the specific examples, a phenylmethoxycarbonyl group is preferable.

In the formula (p1), $R^{102}$ is a hydrogen atom; or a (C1-C4) alkyl group. It should be noted that the two $R^{102}$s in the formula (p1) may be the same as or different from each other.

Examples of the (C1-C4) alkyl group as or in $R^{102}$ in the formula (p1) are the same as the examples of the (C1-C4) alkyl group as or in $R^1$, $R^2$, $R^5$, $R^6$, and $R^7$ described above, including specific examples, preferable examples, and more preferable examples thereof.

In the formula (p1), X is a divalent crosslinking group containing a nitrogen atom.

X is a diamino (C1-C6) alkylene group; a diamino phenylene group that is optionally substituted with a sulfo group; a bis(aminomethyl)phenylene group that is optionally substituted with a sulfo group; a diaminodicyclohexylmethylene group that is optionally substituted with a sulfo group; or a piperazine group.

Examples of the diamino (C1-C6) alkylene group as or in X in the formula (p1) include ones in which a carbon chain in the alkyl moiety constitutes a linear chain or a branched chain, preferably a linear chain. The positions to which amino groups as substituents are attached are not particularly limited, but are preferably both of the termini of the alkyl chain. Specific examples include a diaminomethylene group, a diaminoethylene group, a diaminopropylene group, a diaminobutylene group, a diaminopentylene group, and a diaminohexylene group. A diaminoethylene group and a diaminohexylene group are preferable, and a diaminoethylene group is more preferable.

In the formula (p1), Y is a halogen atom; a hydroxy group; an amino group; a mono- or dialkylamino group; a mono- or dialkylamino group substituted with a sulfo group or a carboxy group; an aralkylamino group; a cycloalkylamino group; a (C1-C4) alkoxy group; a phenoxy group; a phenoxy group substituted with at least one group selected from the group consisting of a sulfo group, a carboxy group, an acetylamino group, an amino group, and a hydroxy group; an anilino group; an anilino group substituted with a sulfo group and/or a carboxy group; a naphthylamino group; a naphthylamino group substituted with a sulfo group and/or a carboxy group; a naphthyloxy group; a naphthyloxy group substituted with a sulfo group and/or a carboxy group; a (C1-C4) alkylthio group; a (C1-C4) alkylthio group substituted with a sulfo group or a carboxy group; a phenylthio group; a phenylthio group substituted with at least one group selected from the group consisting of a sulfo group, a carboxy group, a (C1-C4) alkyl group, a (C1-C4) alkoxy group, a carbamoyl group, a cyano group, an anilino group, an amino group, a phenoxy group, a hydroxy group, a phenyl group, and a mercapto group; or a mono- or dialkylaminoalkylamino group.

It should be noted that the two Ys in the formula (p1) may be the same as or different from each other.

Examples of the halogen atom as or in Y in the formula (p1) are the same as the examples of the halogen atom as or in $R^1$, $R^2$, $R^5$, $R^6$, and $R^7$ described above, including specific examples, preferable examples, and more preferable examples thereof.

Examples of the mono- or dialkylamino group as or in Y in the formula (p1) include ones in which one or two alkyl groups as substituents are attached to an amino group thereof. Examples of the alkyl group include ones that constitute a linear chain, a branched chain, or a ring. Among these, a linear chain is preferable. The carbon chain contains 1 to 12 carbon atoms, preferably 1 to 8 carbon atoms, and more preferably 1 to 4 carbon atoms. Specific examples include a methylamino group, an ethylamino group, a propylamino group, a butylamino group, a hexylamino group, an octylamino group, a dodecylamino group, a dimethylamino group, a diethylamino group, a dihexylamino group, a didecylamino group, a methylethylamino group, and an ethylhexylamino group. A methylamino group, a butylamino group, and a dimethylamino group are preferable.

Examples of the mono- or dialkylamino group substituted with a sulfo group or a carboxy group as or in Y in the formula (p1) include ones in which a carbon atom of the mono- or dialkylamino group has a sulfo group or a carboxy group attached thereto as a substituent. The position of substitution is not particularly limited, but is preferably a terminus of the alkyl chain. The number of substitution is 1 to 4 and is preferably 1 or 2. Specific examples include a sulfomethylamino group, a sulfoethylamino group, a sulfopropylamino group, a sulfobutylamino group, a sulfohexylamino group, a sulfooctylamino group, a sulfododecylamino group, a disulfomethylamino group, a disulfoethylamino group, a disulfohexylamino group, a disulfodecylamino group, a sulfomethylethylamino group, an ethylsulfohexylamino group, a carboxymethylamino group, a carboxyethylamino group, a carboxypropylamino group, a carboxybutylamino group, a carboxyhexylamino group, a carboxyoctylamino group, a carboxydodecylamino group, a dicarboxymethylamino group, a dicarboxyethylamino group, a dicarboxyhexylamino group, a dicarboxydecylamino group, a carboxymethylethylamino group, and a carboxyethylhexylamino group. A sulfomethylamino group, a sulfoethylamino group, a carboxymethylamino group, and a carboxyhexylamino group are preferable.

Examples of the aralkylamino group as or in Y in the formula (p1) include ones in which an alkyl moiety thereof contains 1 to 6 carbon atoms and preferably contains 1 or 2 carbon atoms. Specific examples include a benzylamino group, a phenethylamino group, a phenylpropylamino group, and a phenylbutylamino group. A benzylamino group and a phenethylamino group are preferable.

Examples of the cycloalkylamino group as or in Y in the formula (p1) include ones in which an alkyl moiety thereof contains 4 to 12 carbon atoms and preferably contains 6 carbon atoms. Specific examples include a cyclopentylamino group, a cyclohexylamino group, a cycloheptylamino group, and a cyclooctylamino group. A cyclohexylamino group is preferable.

Examples of the (C1-C4) alkoxy group as or in Y in the formula (p1) are the same as the examples of the (C1-C4) alkoxy group as or in $R^1$, $R^2$, $R^5$, $R^6$, and $R^7$ described above, including specific examples, preferable examples, and more preferable examples thereof.

Examples of the phenoxy group substituted with at least one group selected from the group consisting of a sulfo group, a carboxy group, an acetylamino group, an amino group, and a hydroxy group as or in Y in the formula (p1) include ones in which a carbon atom of the phenoxy group has a substituent attached thereto. The number of substitution is 1 to 3 and is preferably 1 or 2. Specific examples include a sulfophenoxy group, a disulfophenoxy group, a carboxyphenoxy group, a dicarboxyphenoxy group, an acetylaminophenoxy group, a diacetylaminophenoxy group, an aminophenoxy group, a diaminophenoxy group, a hydroxyphenoxy group, and a dihydroxyphenoxy group. A sulfophenoxy group, a disulfophenoxy group, a carboxyphenoxy group, and a dicarboxyphenoxy group are preferable.

Examples of the anilino group substituted with a sulfo group and/or a carboxy group as or in Y in the formula (p1) include ones in which a carbon atom of the anilino group has a sulfo group and/or a carboxy group attached thereto as a substituent. The number of substitution is 1 to 3 and is preferably 1 or 2. Specific examples include a sulfoanilino group, a disulfoanilino group, a carboxyanilino group, a dicarboxyanilino group, and a sulfocarboxyanilino group, any of which is preferable.

Examples of the naphthylamino group substituted with a sulfo group and/or a carboxy group as or in Y in the formula (p1) include ones in which a carbon atom of the anilino group has a sulfo group and/or a carboxy group attached thereto as a substituent. The number of substitution is 1 to 3 and is preferably 1 or 2. Specific examples include a sulfonaphthylamino group, a disulfonaphthylamino group, a carboxynaphthylamino group, a dicarboxynaphthylamino group, and a sulfocarboxynaphthylamino group, any of which is preferable.

Examples of the naphthyloxy group substituted with a sulfo group and/or a carboxy group as or in Y in the formula (p1) include ones in which a carbon atom of the anilino group has a sulfo group and/or a carboxy group attached thereto as a substituent. The number of substitution is 1 to 3 and is preferably 1 or 2. Specific examples include a sulfonaphthyloxy group, a disulfonaphthyloxy group, a carboxynaphthyloxy group, a dicarboxynaphthyloxy group, and a sulfocarboxynaphthyloxy group. A carboxynaphthyloxy group is preferable.

Examples of the (C1-C4) alkylthio group as or in Y in the formula (p1) are the same as the examples of the (C1-C4) alkylthio group as or in $R^1$, $R^2$, $R^5$, $R^6$, and $R^7$ described above, including specific examples, preferable examples, and more preferable examples thereof.

Examples of the (C1-C4) alkylthio group substituted with a sulfo group or a carboxy group as or in Y in the formula (p1) include ones in which a carbon atom of the (C1-C4) alkylthio group has a sulfo group or a carboxy group attached thereto as a substituent. The position of substitution is not particularly limited, but is preferably a terminus of the alkyl moiety. The number of substitution is 1 or 2 and is preferably 1. Specific examples include a sulfomethylthio group, a sulfoethylthio group, a sulfopropylthio group, a sulfobutylthio group, a carboxymethylthio group, a carboxyethylthio group, a carboxypropylthio group, and a carboxybutylthio group. A sulfomethylthio group, a sulfopropylthio group, and a carboxyethylthio group are preferable.

Examples of the phenylthio group substituted with at least one group selected from the group consisting of a sulfo group, a carboxy group, a (C1-C4) alkyl group, a (C1-C4) alkoxy group, a carbamoyl group, a cyano group, an anilino group, an amino group, a phenoxy group, a hydroxy group, a phenyl group, and a mercapto group as or in Y in the formula (p1) include ones in which a carbon atom of the phenylthio group has a substituent. The number of substitution is 1 to 3 and is preferably 1. Examples of the (C1-C4) alkyl group and the (C1-C4) alkoxy group as substituents are the same as the examples of the (C1-C4) alkyl group and the (C1-C4) alkoxy group, respectively, as or in $R^1$, $R^2$, $R^5$, $R^6$, and $R^7$ described above, including specific examples, preferable examples, and more preferable examples thereof. Specific examples include a sulfophenylthio group, a carboxyphenylthio group, a methylphenylthio group, an ethylphenylthio group, a propylphenylthio group, a butylphenylthio group, a methoxyphenylthio group, an ethoxyphenylthio group, a propoxyphenylthio group, a butoxyphenylthio group, a carbamoylphenylthio group, a cyanophenylthio group, an anilinophenylthio group, an aminophenylthio group, a phenoxyphenylthio group, a hydroxyphenylthio group, a phenylphenylthio group, and a mercaptophenylthio group. A sulfophenylthio group and a carboxyphenylthio group are preferable.

Examples of the mono- or dialkylaminoalkylamino group as or in Y in the formula (p1) include ones in which a carbon atom of the alkylamino group has the mono- or dialkylamino group attached thereto as a substituent. The position of substitution is not particularly limited, but is preferably a terminus of the alkyl moiety. The number of substitution is 1 to 3 and is preferably 1. The carbon chain of the alkyl moiety of the alkylamino group contains 1 to 12 carbon atoms, preferably 1 to 6 carbon atoms, and more preferably 1 to 4 carbon atoms. Specific examples include a methylaminomethylamino group, a methylaminoethylamino group, a methylaminopropylamino group, a methylaminobutylamino group, an ethylaminomethylamino group, an ethylaminopropylamino group, a propylaminoethylamino group, a propylaminobutylamino group, a butylaminomethylamino group, a butylaminobutylamino group, a dimethylaminomethylamino group, and a diethylaminopropylamino group. An ethylaminoethylamino group, a dimethylaminoethylamino group, and a dimethylaminopropylamino group are preferable.

In the formula (p1), Y is preferably a hydroxy group, an amino group, a sulfophenoxy group, a dicarboxyphenyl group, or a carboxynaphthyloxy group, for example.

A compound adopting a combination of the preferable ones as substituents in the formula (p1) is more preferable, and a compound adopting a combination of the more preferable ones is further preferable. The same applies to a combination of the further preferable ones.

Specific examples of the coloring matter represented by the formula (p1) are shown in Tables 100 to 110 below. However, the present invention is not limited thereto.

Among these, coloring matters shown under Compound Nos. p2, p5, p9, and p34 are particularly preferable.

TABLE 100

| Compound No. | Structural formula |
| --- | --- |
| p1 | 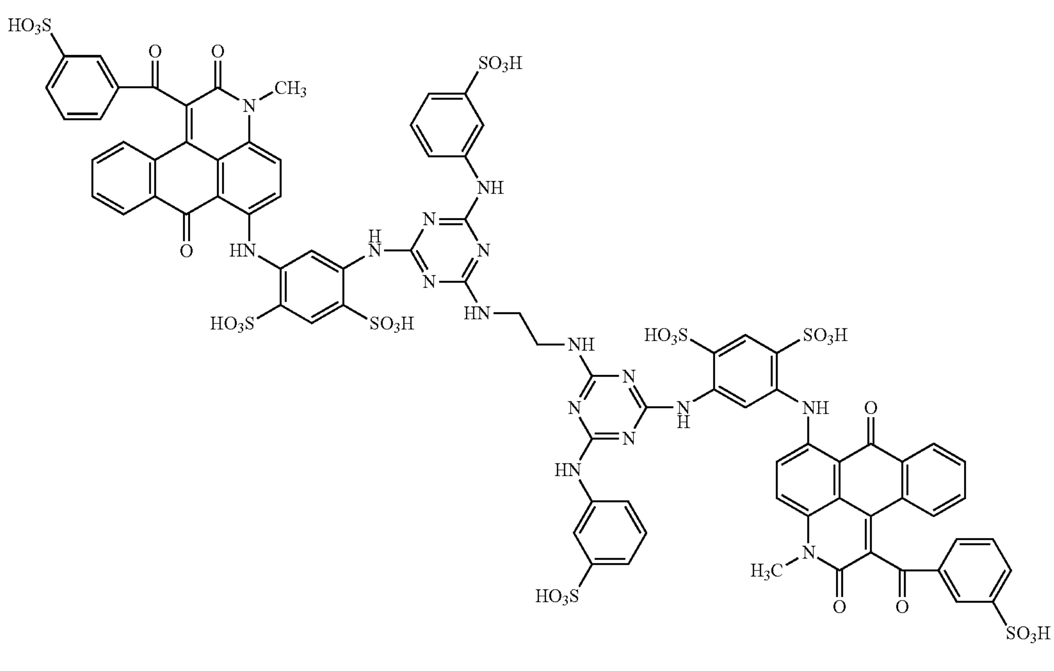 [SMILES: Cn1c(=O)c(C(=O)c2cccc(S(=O)(=O)O)c2)c2c3c(c(Nc4cc(Nc5nc(NCCNc6nc(Nc7cccc(S(=O)(=O)O)c7)nc(Nc7cc(Nc8ccc9c%10c8C(=O)c8ccccc8-c%10c(C(=O)c8cccc(S(=O)(=O)O)c8)c(=O)n9C)c(S(=O)(=O)O)cc7S(=O)(=O)O)n6)nc(Nc6cccc(S(=O)(=O)O)c6)n5)c(S(=O)(=O)O)cc4S(=O)(=O)O)ccc31)C(=O)c1ccccc1-2] |

TABLE 100-continued
| Compound No. | Structural formula |
|---|---|
| p2 | 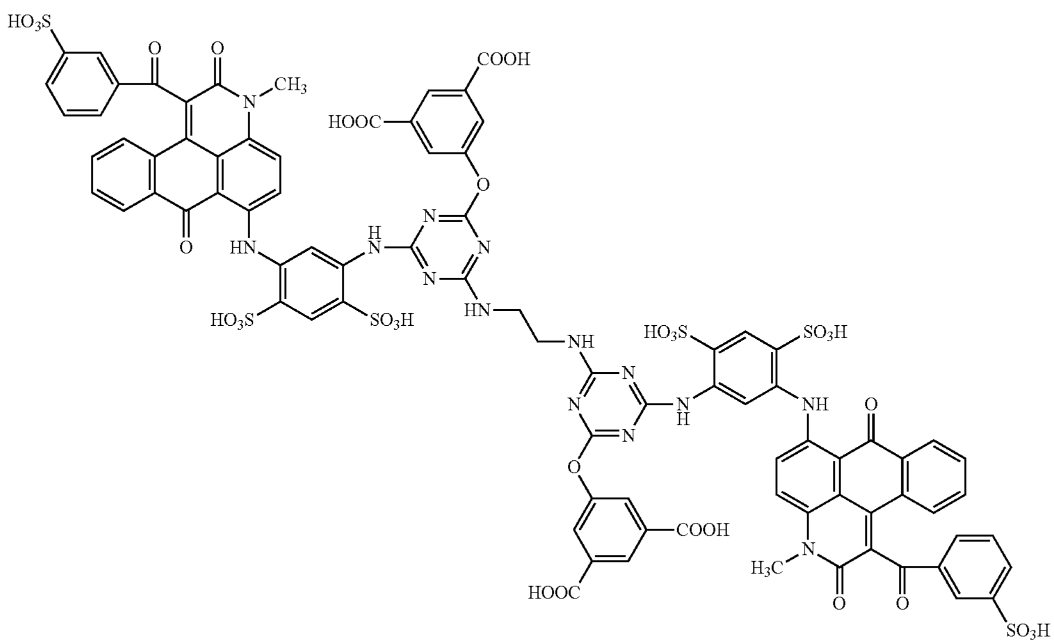 [SMILES: Cn1c(=O)c(C(=O)c2cccc(S(=O)(=O)O)c2)c2c3c(c(Nc4cc(Nc5nc(NCCNc6nc(Nc7cc(Nc8ccc9c%10c8C(=O)c8ccccc8-c%10c(C(=O)c8cccc(S(=O)(=O)O)c8)c(=O)n9C)c(S(=O)(=O)O)cc7S(=O)(=O)O)nc(Oc7cc(C(=O)O)cc(C(=O)O)c7)n6)nc(Oc6cc(C(=O)O)cc(C(=O)O)c6)n5)c(S(=O)(=O)O)cc4S(=O)(=O)O)ccc31)C(=O)c1ccccc1-2] |
| p3 | 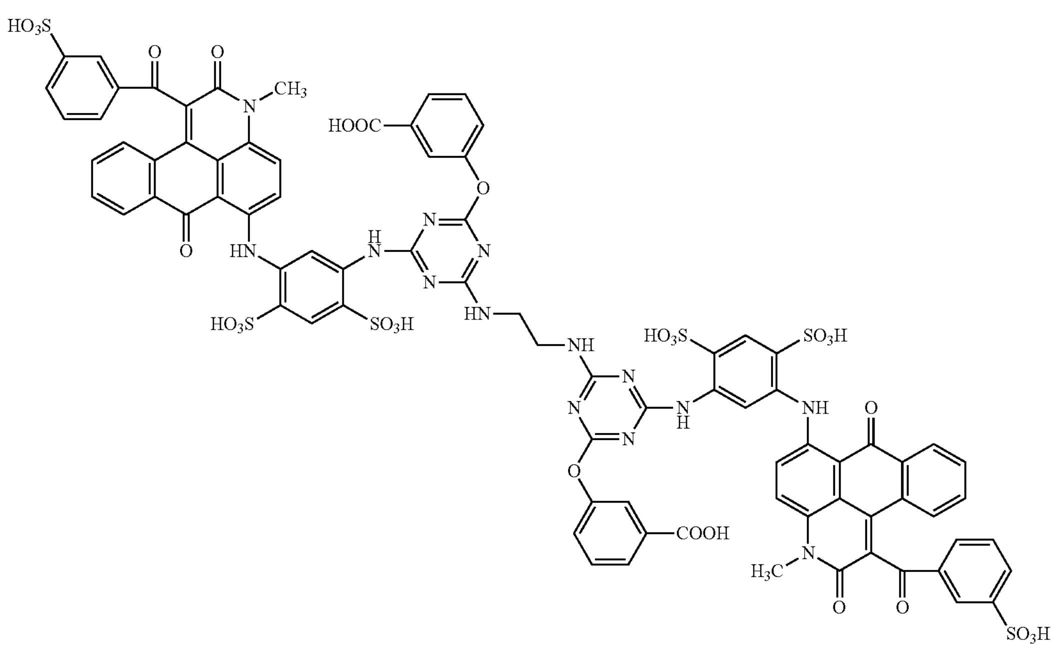 [SMILES: Cn1c(=O)c(C(=O)c2cccc(S(=O)(=O)O)c2)c2c3c(c(Nc4cc(Nc5nc(NCCNc6nc(Nc7cc(Nc8ccc9c%10c8C(=O)c8ccccc8-c%10c(C(=O)c8cccc(S(=O)(=O)O)c8)c(=O)n9C)c(S(=O)(=O)O)cc7S(=O)(=O)O)nc(Oc7cccc(C(=O)O)c7)n6)nc(Oc6cccc(C(=O)O)c6)n5)c(S(=O)(=O)O)cc4S(=O)(=O)O)ccc31)C(=O)c1ccccc1-2] |

TABLE 100-continued
| Compound No. | Structural formula |
| --- | --- |
| p4 | 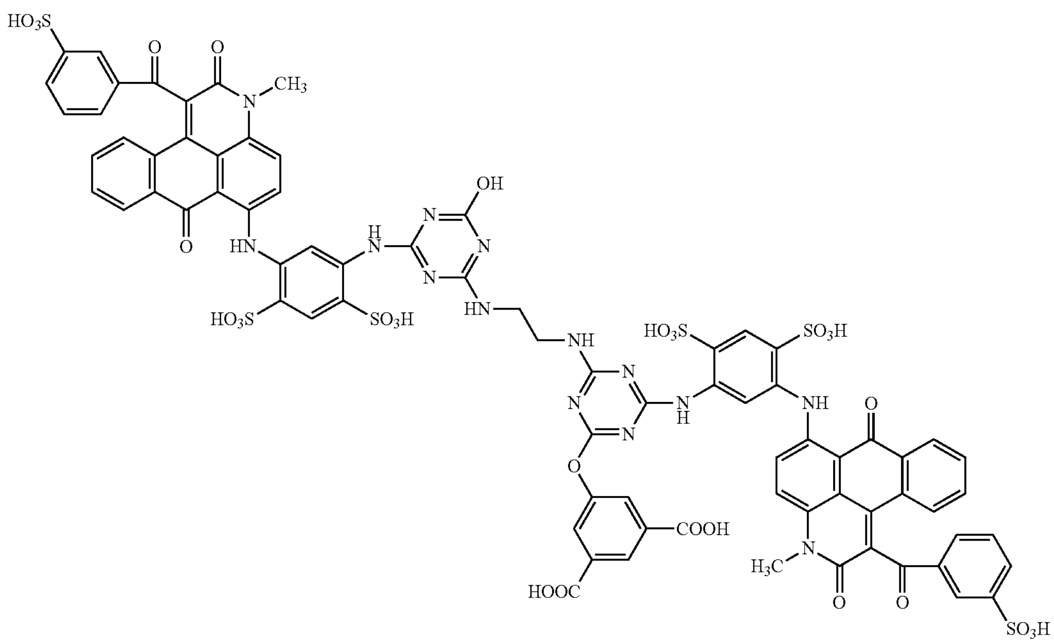 [SMILES: Cn1c(=O)c(C(=O)c2cccc(S(=O)(=O)O)c2)c2c3c(c(Nc4cc(Nc5nc(O)nc(NCCNc6nc(Nc7cc(Nc8ccc9c%10c8C(=O)c8ccccc8-c%10c(C(=O)c8cccc(S(=O)(=O)O)c8)c(=O)n9C)c(S(=O)(=O)O)cc7S(=O)(=O)O)nc(Oc7cc(C(=O)O)cc(C(=O)O)c7)n6)n5)c(S(=O)(=O)O)cc4S(=O)(=O)O)ccc31)C(=O)c1ccccc1-2]  |
TABLE 101
| Compound No. | Structural formula |
| --- | --- |
| p5 | 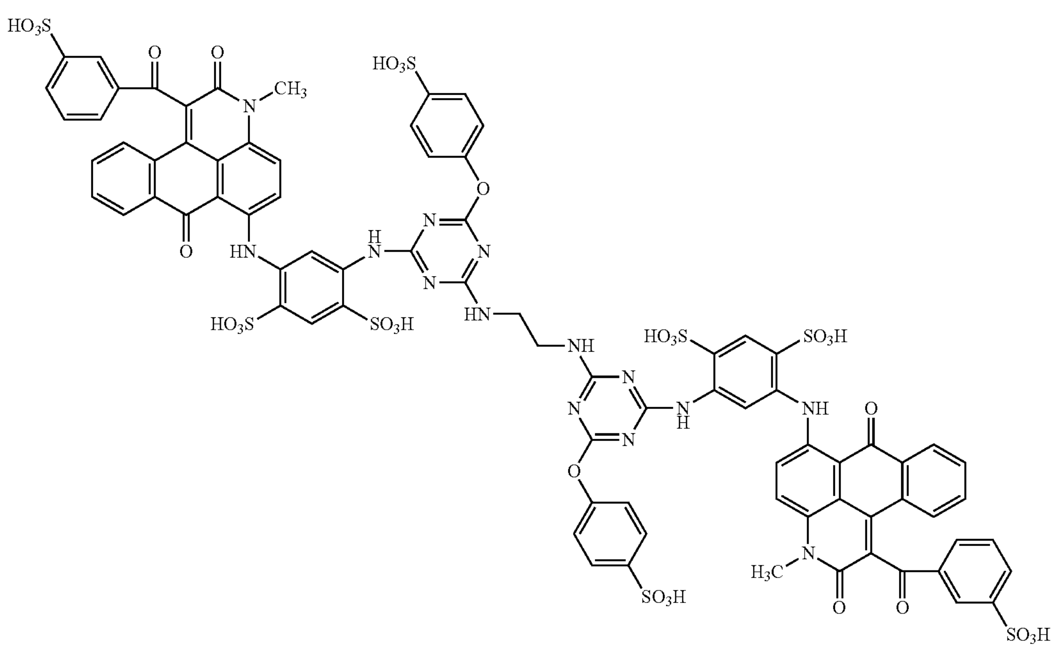 [SMILES: Cn1c(=O)c(C(=O)c2cccc(S(=O)(=O)O)c2)c2c3c(c(Nc4cc(Nc5nc(NCCNc6nc(Nc7cc(Nc8ccc9c%10c8C(=O)c8ccccc8-c%10c(C(=O)c8cccc(S(=O)(=O)O)c8)c(=O)n9C)c(S(=O)(=O)O)cc7S(=O)(=O)O)nc(Oc7ccc(S(=O)(=O)O)cc7)n6)nc(Oc6ccc(S(=O)(=O)O)cc6)n5)c(S(=O)(=O)O)cc4S(=O)(=O)O)ccc31)C(=O)c1ccccc1-2]  |

TABLE 101-continued
| Compound No. | Structural formula |
| --- | --- |
| p6 | 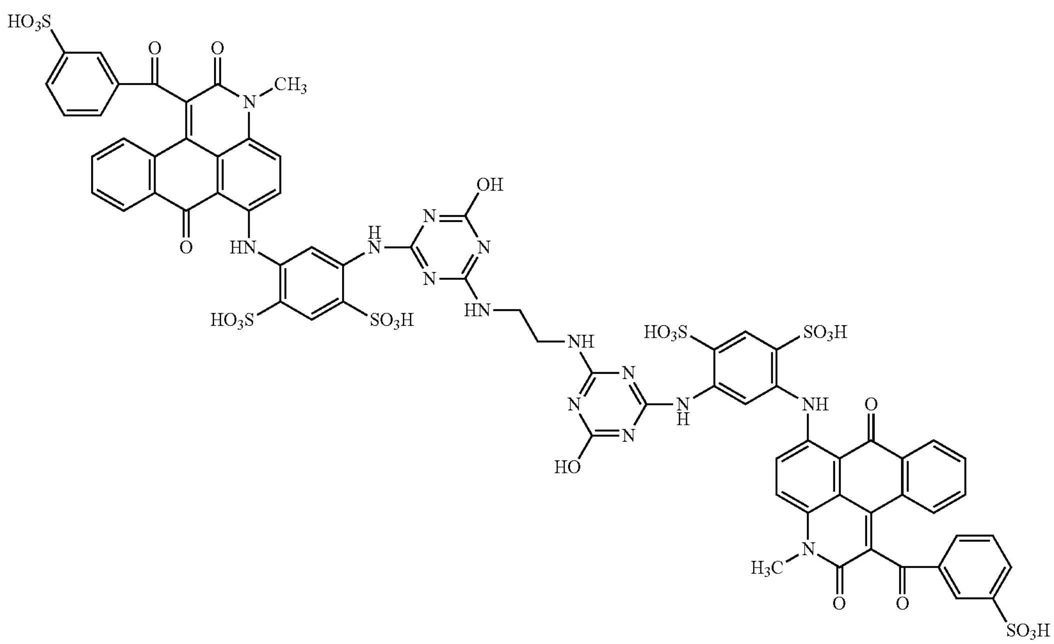 |
| p7 | 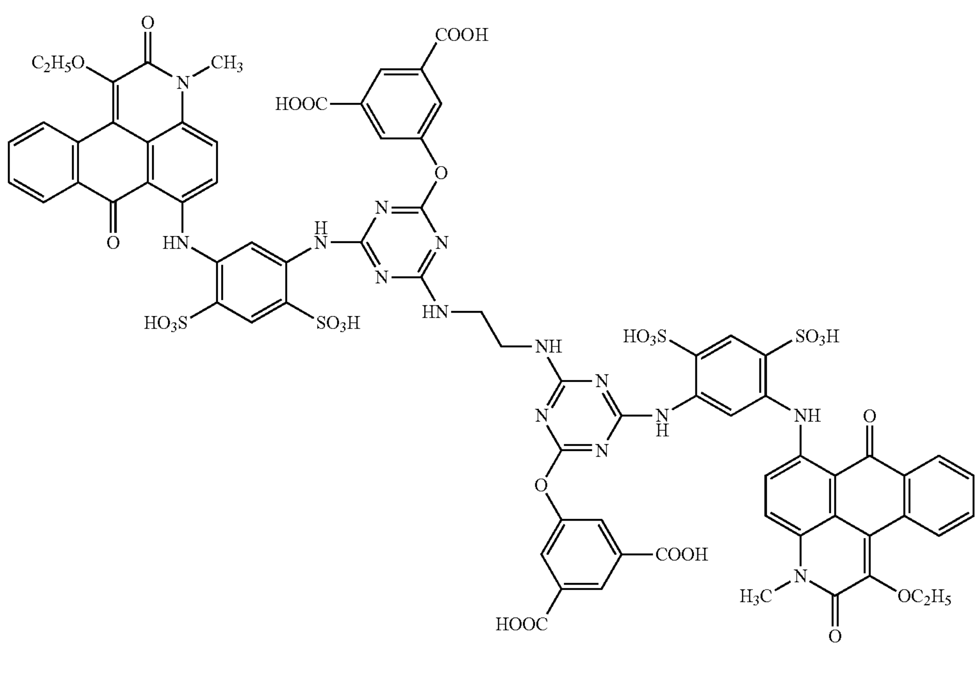 |

TABLE 101-continued
| Compound No. | Structural formula |
|---|---|
| p8 | 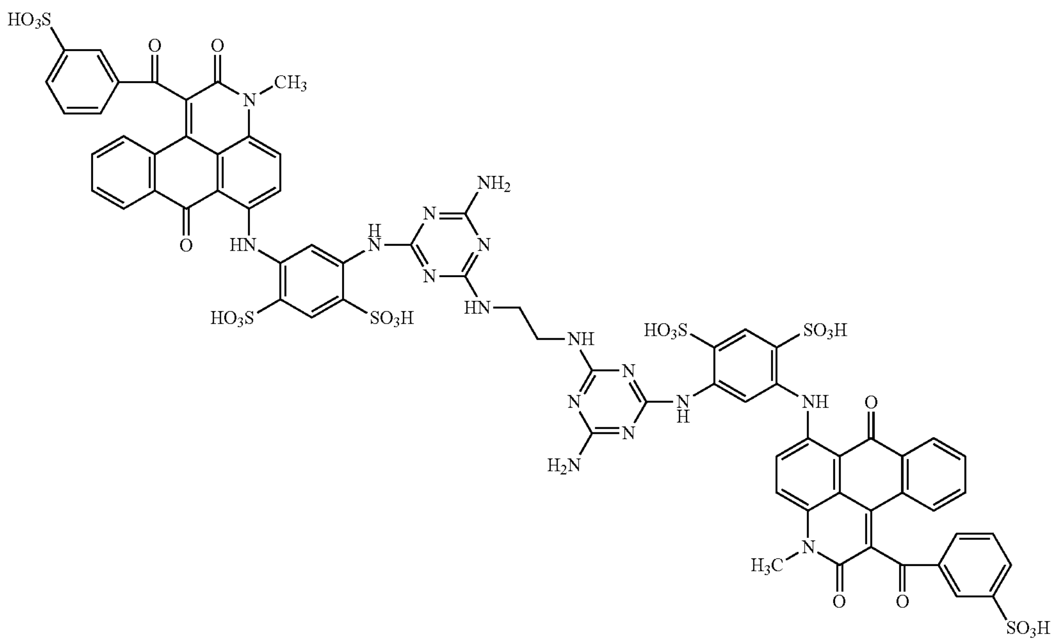 [SMILES: Cn1c(=O)c(C(=O)c2cccc(S(=O)(=O)O)c2)c2c3c(c(Nc4cc(Nc5nc(N)nc(NCCNc6nc(N)nc(Nc7cc(Nc8ccc9c%10c8C(=O)c8ccccc8-c%10c(C(=O)c8cccc(S(=O)(=O)O)c8)c(=O)n9C)c(S(=O)(=O)O)cc7S(=O)(=O)O)n6)n5)c(S(=O)(=O)O)cc4S(=O)(=O)O)ccc31)C(=O)c1ccccc1-2] |
TABLE 102
| Compound No. | Structural formula |
|---|---|
| p9 | 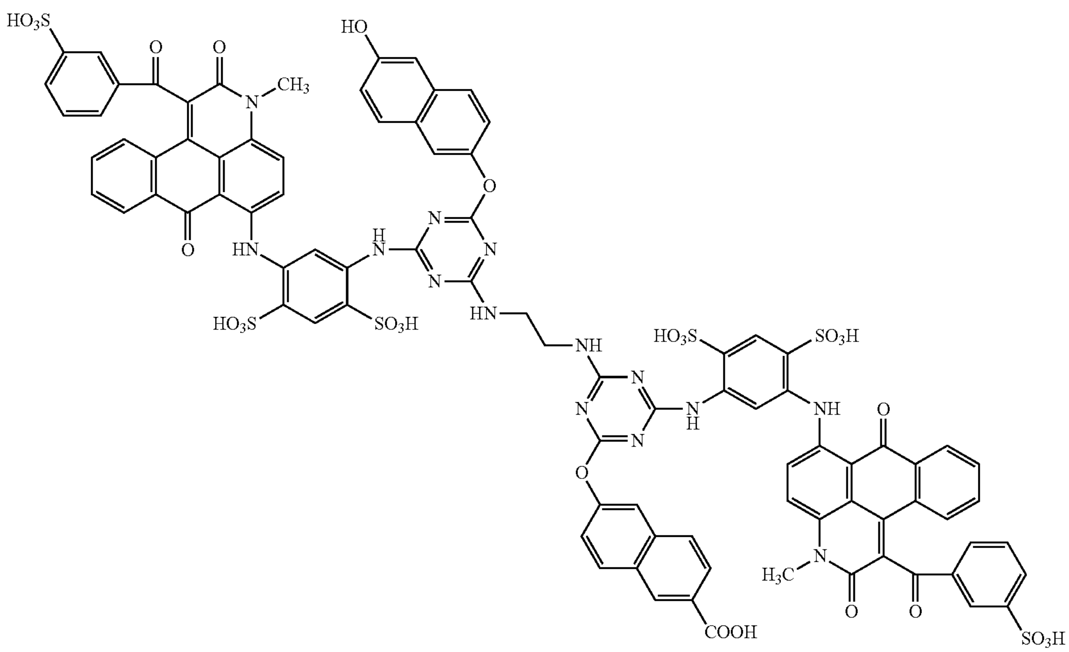 [SMILES: Cn1c(=O)c(C(=O)c2cccc(S(=O)(=O)O)c2)c2c3c(c(Nc4cc(Nc5nc(NCCNc6nc(Nc7cc(Nc8ccc9c%10c8C(=O)c8ccccc8-c%10c(C(=O)c8cccc(S(=O)(=O)O)c8)c(=O)n9C)c(S(=O)(=O)O)cc7S(=O)(=O)O)nc(Oc7ccc8cc(C(=O)O)ccc8c7)n6)nc(Oc6ccc7cc(O)ccc7c6)n5)c(S(=O)(=O)O)cc4S(=O)(=O)O)ccc31)C(=O)c1ccccc1-2] |

TABLE 102-continued
| Compound No. | Structural formula |
|---|---|
| p10 | 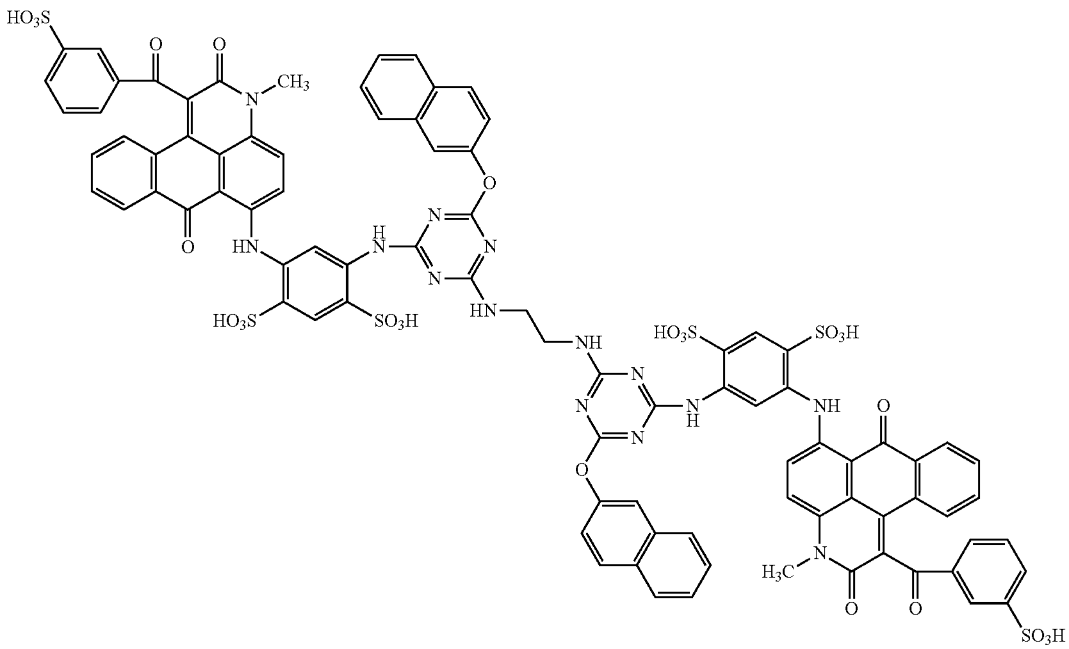 [SMILES: Cn1c(=O)c(C(=O)c2cccc(S(=O)(=O)O)c2)c2c3c(c(Nc4cc(Nc5nc(NCCNc6nc(Nc7cc(Nc8ccc9c%10c8C(=O)c8ccccc8-c%10c(C(=O)c8cccc(S(=O)(=O)O)c8)c(=O)n9C)c(S(=O)(=O)O)cc7S(=O)(=O)O)nc(Oc7ccc8ccccc8c7)n6)nc(Oc6ccc7ccccc7c6)n5)c(S(=O)(=O)O)cc4S(=O)(=O)O)ccc31)C(=O)c1ccccc1-2] |
| p11 | 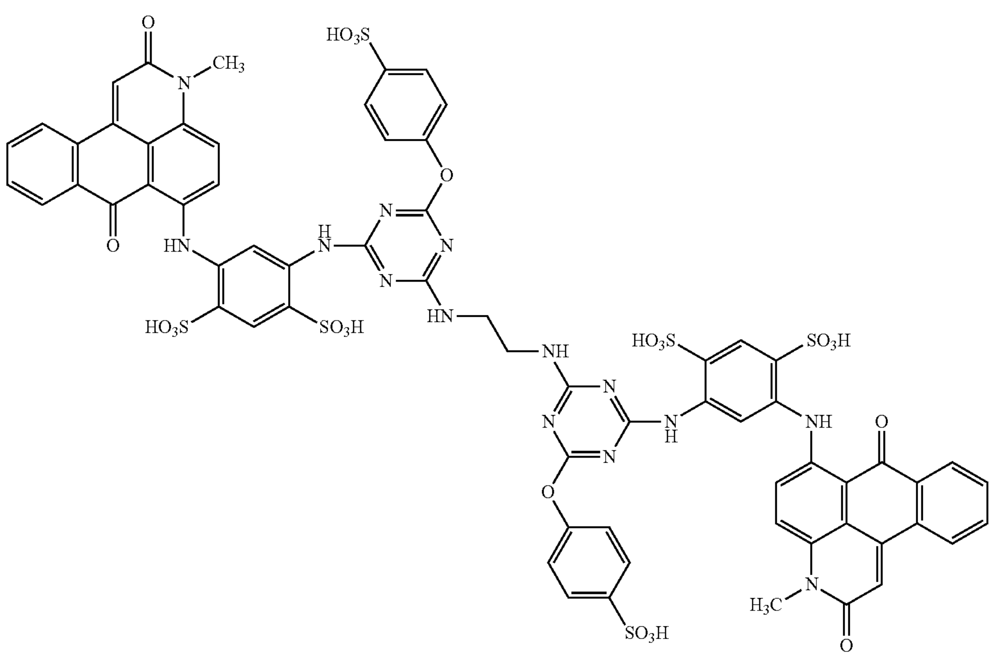 [SMILES: Cn1c(=O)cc2c3c(c(Nc4cc(Nc5nc(NCCNc6nc(Nc7cc(Nc8ccc9c%10c(cc(=O)n9C)-c9ccccc9C(=O)c8%10)c(S(=O)(=O)O)cc7S(=O)(=O)O)nc(Oc7ccc(S(=O)(=O)O)cc7)n6)nc(Oc6ccc(S(=O)(=O)O)cc6)n5)c(S(=O)(=O)O)cc4S(=O)(=O)O)ccc31)C(=O)c1ccccc1-2] |

TABLE 102-continued
| Compound No. | Structural formula |
|---|---|
| p12 | 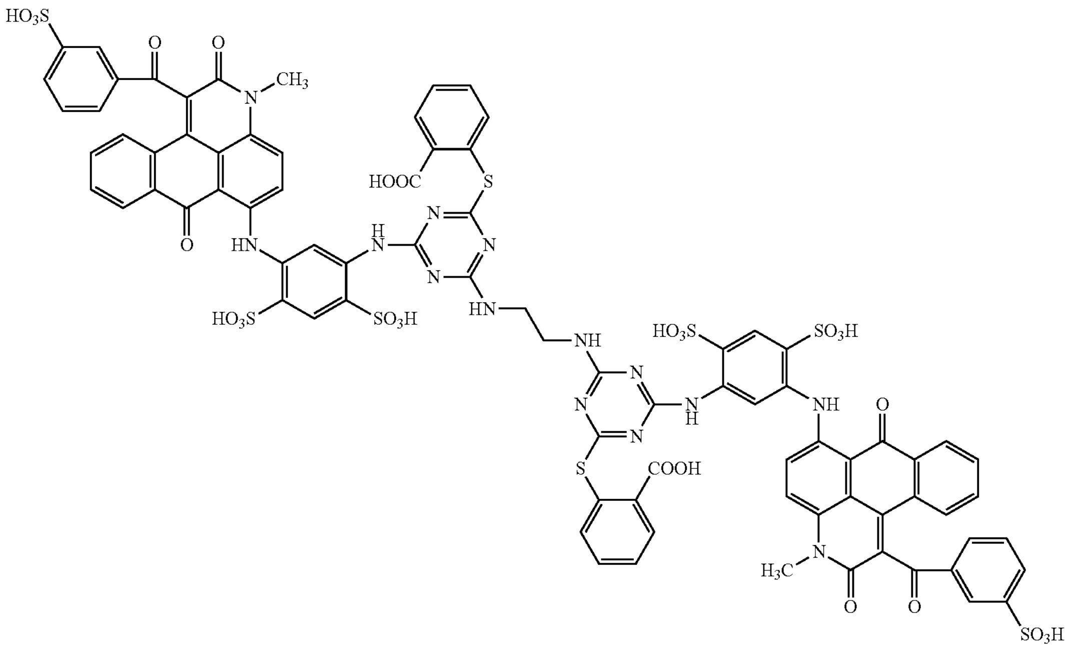 [SMILES: Cn1c(=O)c(C(=O)c2cccc(S(=O)(=O)O)c2)c2c3c(c(Nc4cc(Nc5nc(NCCNc6nc(Nc7cc(Nc8ccc9c%10c8C(=O)c8ccccc8-c%10c(C(=O)c8cccc(S(=O)(=O)O)c8)c(=O)n9C)c(S(=O)(=O)O)cc7S(=O)(=O)O)nc(Sc7ccccc7C(=O)O)n6)nc(Sc6ccccc6C(=O)O)n5)c(S(=O)(=O)O)cc4S(=O)(=O)O)ccc31)C(=O)c1ccccc1-2] |
TABLE 103
| Compound No. | Structural formula |
|---|---|
| p13 | 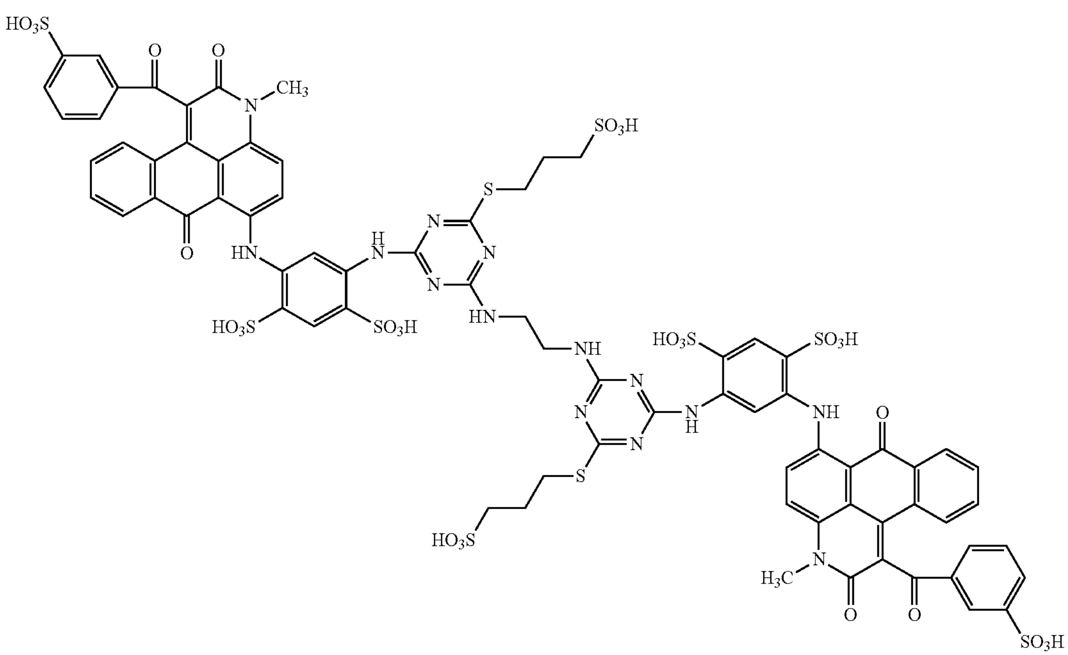 [SMILES: Cn1c(=O)c(C(=O)c2cccc(S(=O)(=O)O)c2)c2c3c(c(Nc4cc(Nc5nc(NCCNc6nc(Nc7cc(Nc8ccc9c%10c8C(=O)c8ccccc8-c%10c(C(=O)c8cccc(S(=O)(=O)O)c8)c(=O)n9C)c(S(=O)(=O)O)cc7S(=O)(=O)O)nc(SCCCS(=O)(=O)O)n6)nc(SCCCS(=O)(=O)O)n5)c(S(=O)(=O)O)cc4S(=O)(=O)O)ccc31)C(=O)c1ccccc1-2] |

TABLE 103-continued
| Compound No. | Structural formula |
| --- | --- |
| p14 | 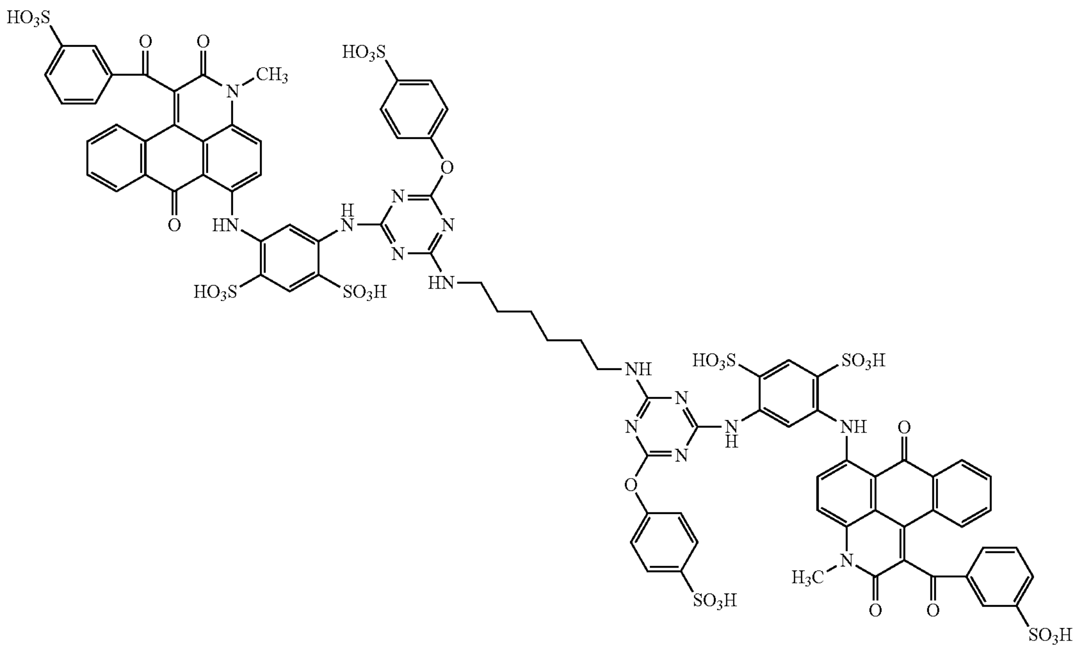 [SMILES: Cn1c(=O)c(C(=O)c2cccc(S(=O)(=O)O)c2)c2c3c(c(Nc4cc(Nc5nc(NCCCCCCNc6nc(Nc7cc(Nc8ccc9c%10c8C(=O)c8ccccc8-c%10c(C(=O)c8cccc(S(=O)(=O)O)c8)c(=O)n9C)c(S(=O)(=O)O)cc7S(=O)(=O)O)nc(Oc7ccc(S(=O)(=O)O)cc7)n6)nc(Oc6ccc(S(=O)(=O)O)cc6)n5)c(S(=O)(=O)O)cc4S(=O)(=O)O)ccc31)C(=O)c1ccccc1-2] |
| p15 | 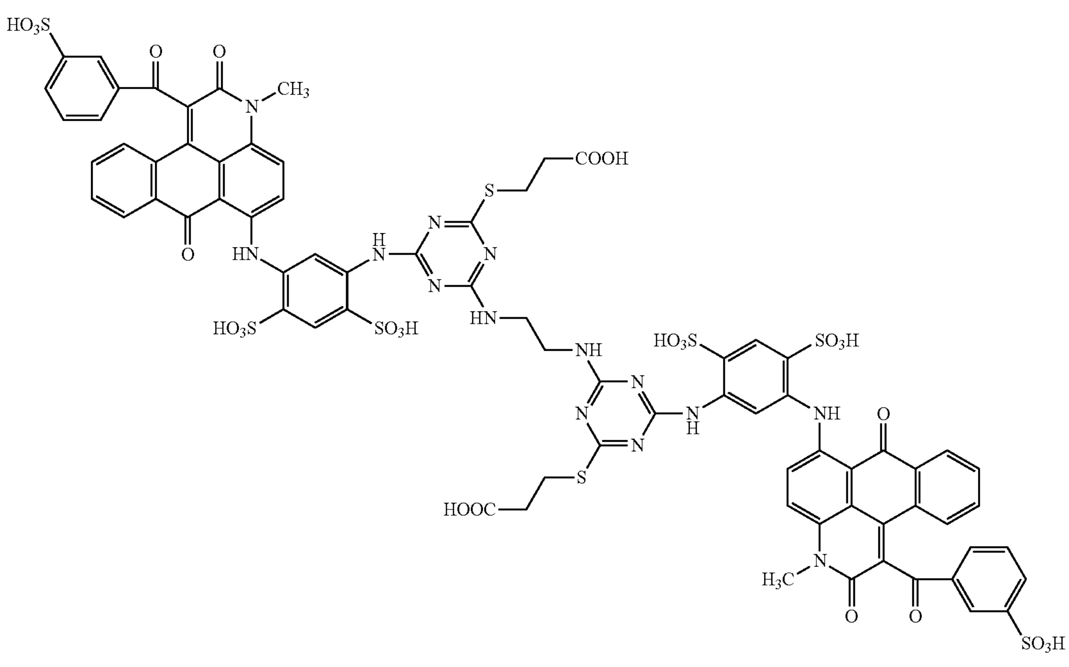 [SMILES: Cn1c(=O)c(C(=O)c2cccc(S(=O)(=O)O)c2)c2c3c(c(Nc4cc(Nc5nc(NCCNc6nc(Nc7cc(Nc8ccc9c%10c8C(=O)c8ccccc8-c%10c(C(=O)c8cccc(S(=O)(=O)O)c8)c(=O)n9C)c(S(=O)(=O)O)cc7S(=O)(=O)O)nc(SCCC(=O)O)n6)nc(SCCC(=O)O)n5)c(S(=O)(=O)O)cc4S(=O)(=O)O)ccc31)C(=O)c1ccccc1-2] |

TABLE 103-continued
| Compound No. | Structural formula |
| --- | --- |
| p16 | 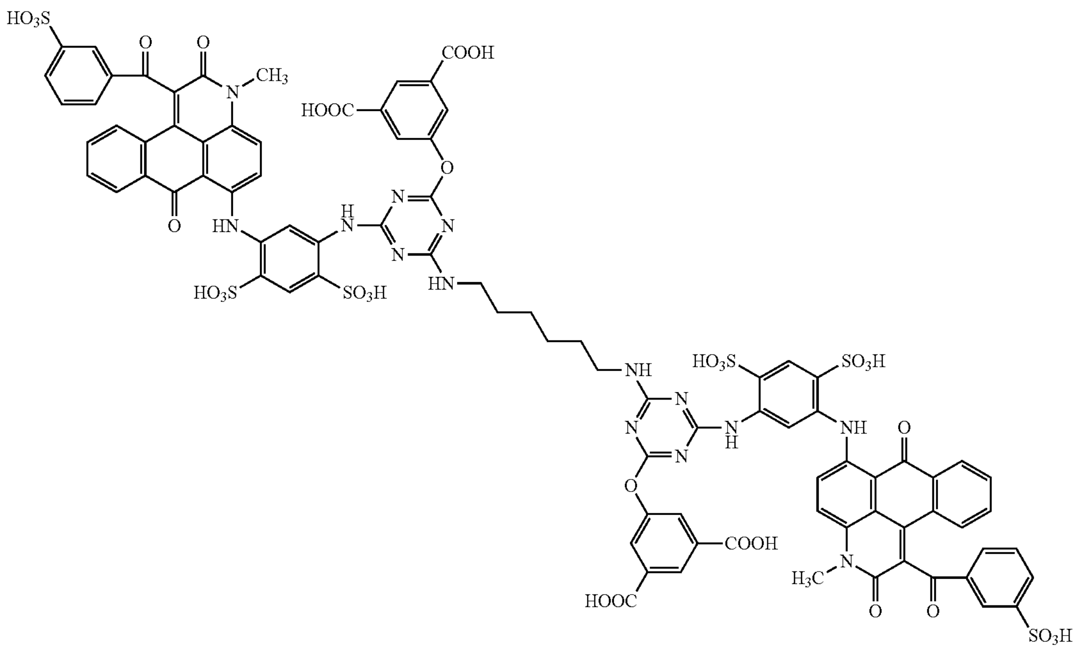 [SMILES: Cn1c(=O)c(C(=O)c2cccc(S(=O)(=O)O)c2)c2c3c(c(Nc4cc(Nc5nc(NCCCCCCNc6nc(Nc7cc(Nc8ccc9c%10c8C(=O)c8ccccc8-c%10c(C(=O)c8cccc(S(=O)(=O)O)c8)c(=O)n9C)c(S(=O)(=O)O)cc7S(=O)(=O)O)nc(Oc7cc(C(=O)O)cc(C(=O)O)c7)n6)nc(Oc6cc(C(=O)O)cc(C(=O)O)c6)n5)c(S(=O)(=O)O)cc4S(=O)(=O)O)ccc31)C(=O)c1ccccc1-2] |
TABLE 104
| Compound No. | Structural formula |
| --- | --- |
| p17 | 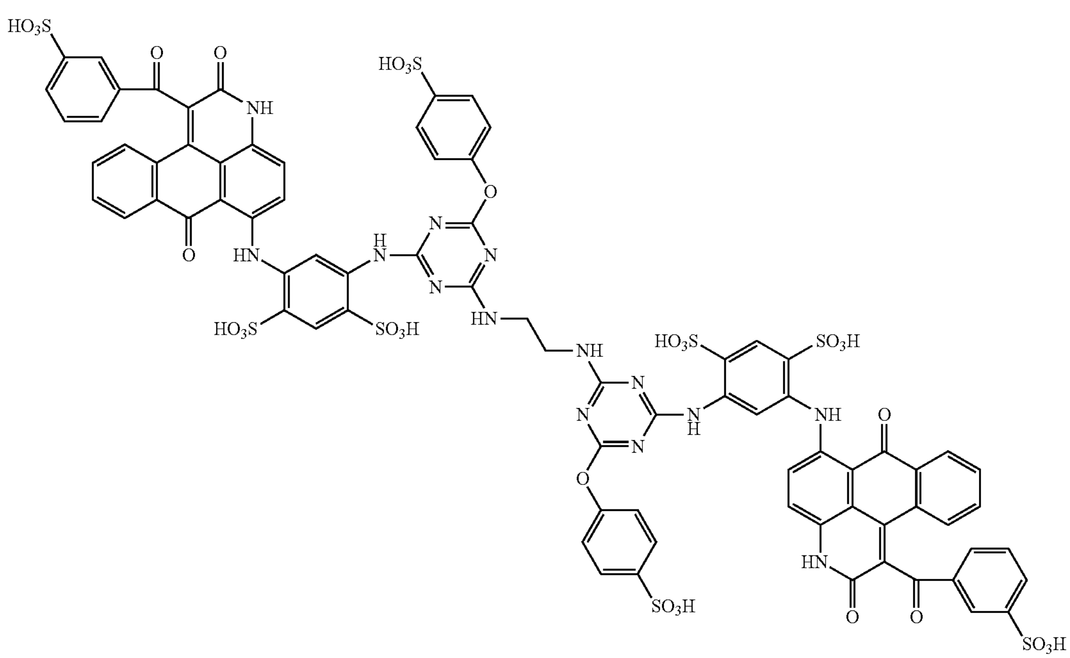 [SMILES: O=C(c1cccc(S(=O)(=O)O)c1)c1c2c3c(c(Nc4cc(Nc5nc(NCCNc6nc(Nc7cc(Nc8ccc9[nH]c(=O)c(C(=O)c%10cccc(S(=O)(=O)O)c%10)c%10c9c8C(=O)c8ccccc8-%10)c(S(=O)(=O)O)cc7S(=O)(=O)O)nc(Oc7ccc(S(=O)(=O)O)cc7)n6)nc(Oc6ccc(S(=O)(=O)O)cc6)n5)c(S(=O)(=O)O)cc4S(=O)(=O)O)ccc3[nH]c1=O)C(=O)c1ccccc1-2] |

TABLE 104-continued
| Compound No. | Structural formula |
|---|---|
| p18 | 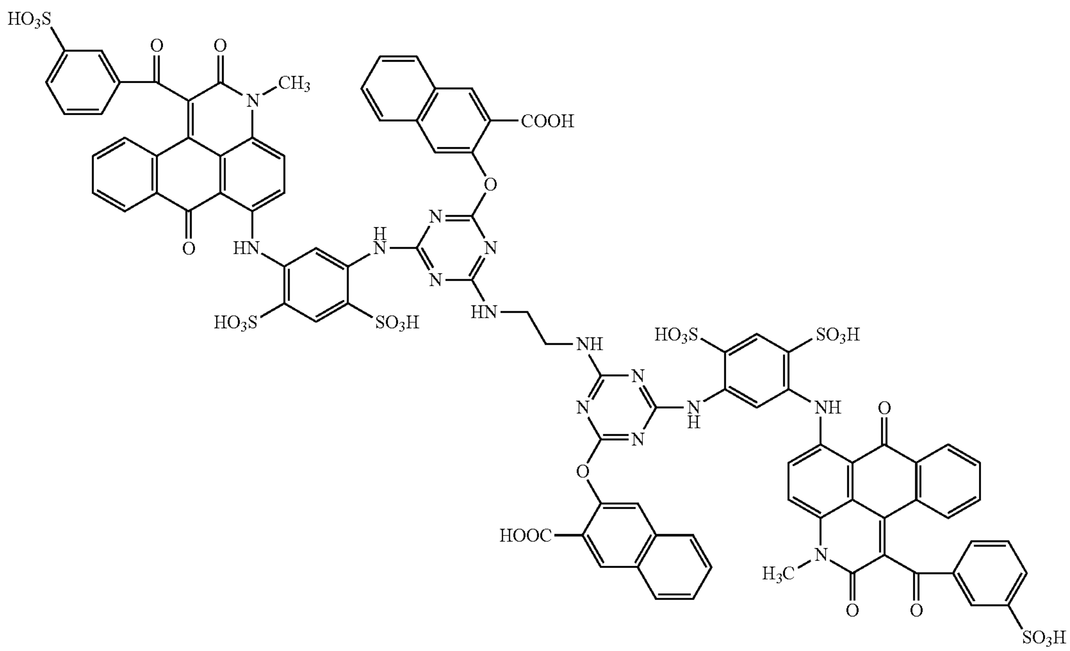 [SMILES: Cn1c(=O)c(C(=O)c2cccc(S(=O)(=O)O)c2)c2c3c(c(Nc4cc(Nc5nc(NCCNc6nc(Nc7cc(Nc8ccc9c%10c8C(=O)c8ccccc8-c%10c(C(=O)c8cccc(S(=O)(=O)O)c8)c(=O)n9C)c(S(=O)(=O)O)cc7S(=O)(=O)O)nc(Oc7cc8ccccc8cc7C(=O)O)n6)nc(Oc6cc7ccccc7cc6C(=O)O)n5)c(S(=O)(=O)O)cc4S(=O)(=O)O)ccc31)C(=O)c1ccccc1-2] |
| p19 | 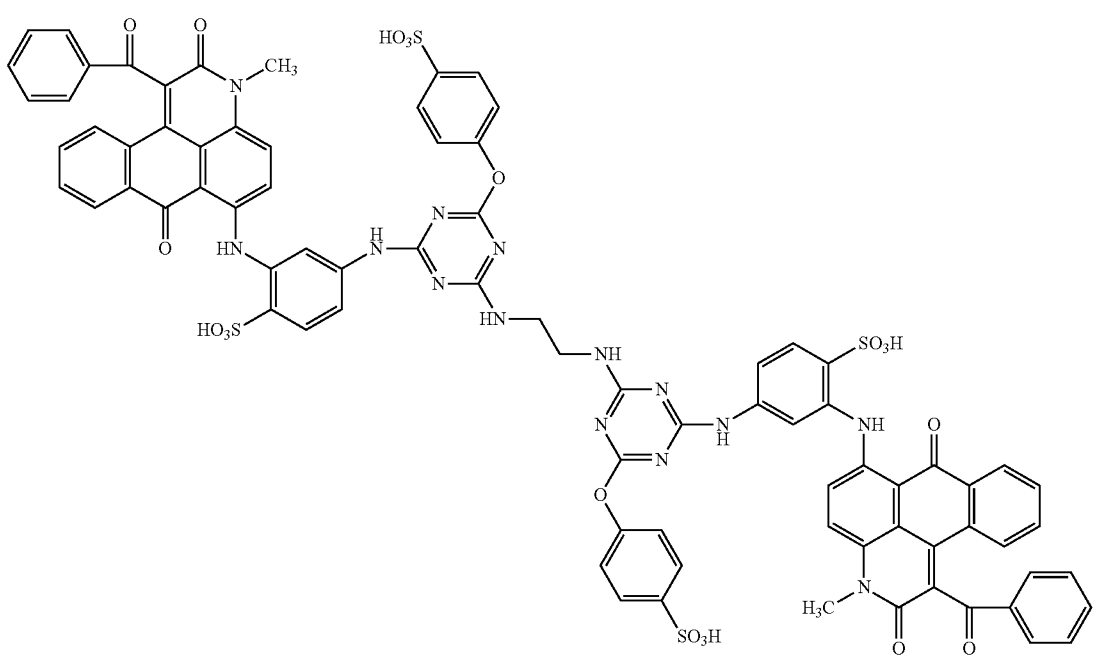 [SMILES: Cn1c(=O)c(C(=O)c2ccccc2)c2c3c(c(Nc4cc(Nc5nc(NCCNc6nc(Nc7ccc(S(=O)(=O)O)c(Nc8ccc9c%10c8C(=O)c8ccccc8-c%10c(C(=O)c8ccccc8)c(=O)n9C)c7)nc(Oc7ccc(S(=O)(=O)O)cc7)n6)nc(Oc6ccc(S(=O)(=O)O)cc6)n5)ccc4S(=O)(=O)O)ccc31)C(=O)c1ccccc1-2] |

TABLE 104-continued
| Compound No. | Structural formula |
|---|---|
| p20 | 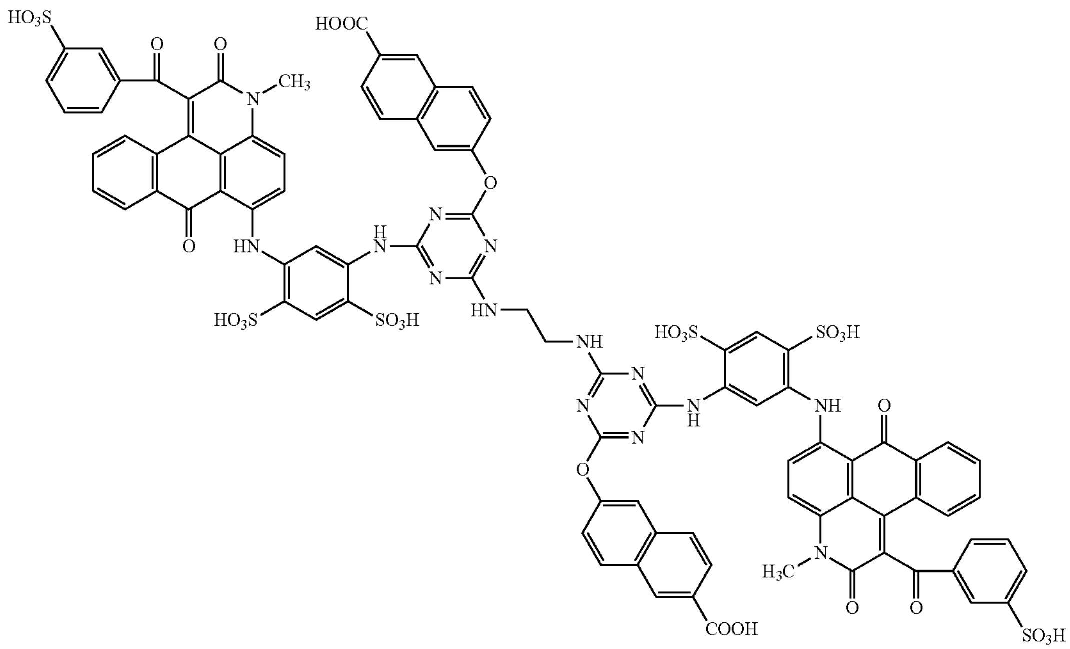 |
TABLE 105
| Compound No. | Structural formula |
|---|---|
| p21 | 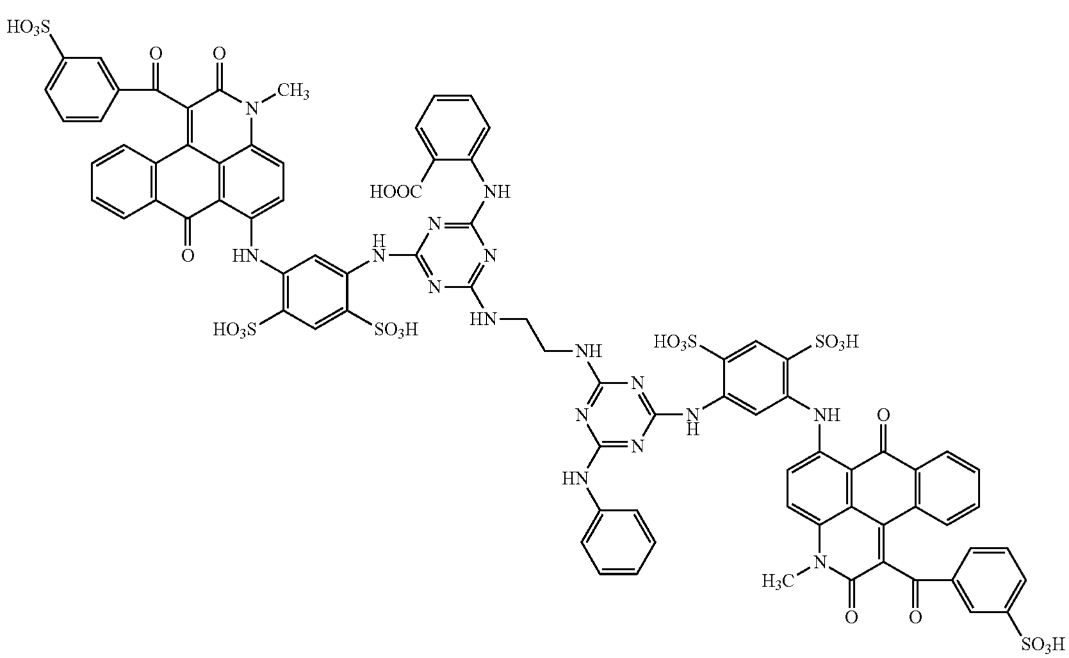 [SMILES: Cn1c(=O)c(C(=O)c2cccc(S(=O)(=O)O)c2)c2c3c(c(Nc4cc(Nc5nc(NCCNc6nc(Nc7ccccc7C(=O)O)nc(Nc7cc(Nc8ccc9c%10c8C(=O)c8ccccc8-c%10c(C(=O)c8cccc(S(=O)(=O)O)c8)c(=O)n9C)c(S(=O)(=O)O)cc7S(=O)(=O)O)n6)nc(Nc6ccccc6)n5)c(S(=O)(=O)O)cc4S(=O)(=O)O)ccc31)C(=O)c1ccccc1-2] |

TABLE 105-continued
| Compound No. | Structural formula |
|---|---|
| p22 | 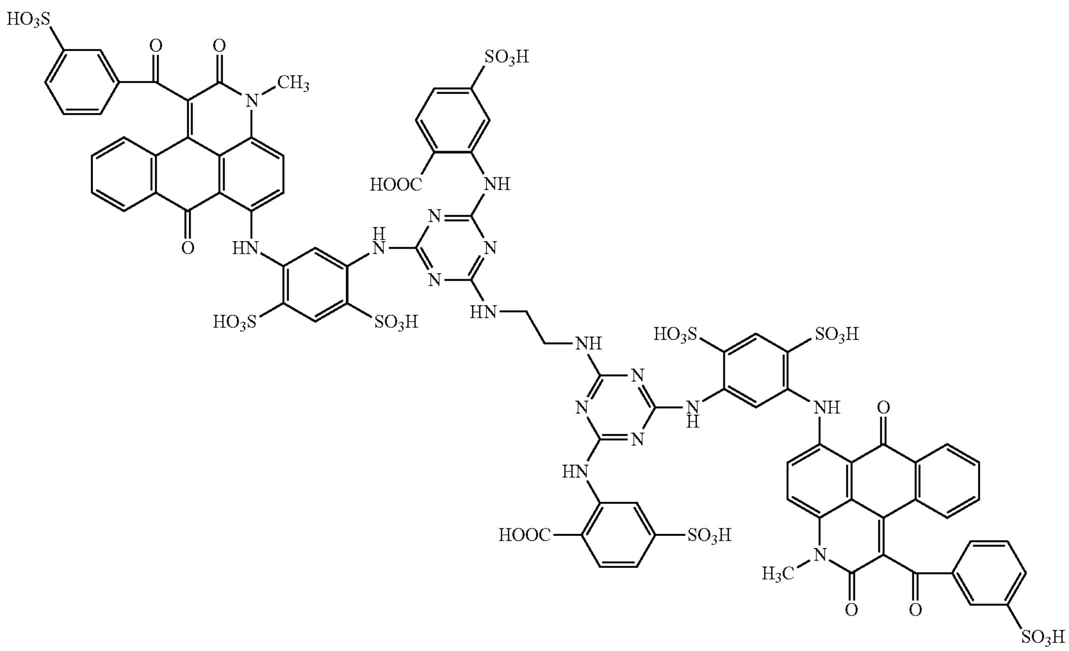 [SMILES: Cn1c(=O)c(C(=O)c2cccc(S(=O)(=O)O)c2)c2c3c(c(Nc4cc(Nc5nc(NCCNc6nc(Nc7cc(S(=O)(=O)O)ccc7C(=O)O)nc(Nc7cc(Nc8ccc9c%10c8C(=O)c8ccccc8-c%10c(C(=O)c8cccc(S(=O)(=O)O)c8)c(=O)n9C)c(S(=O)(=O)O)cc7S(=O)(=O)O)n6)nc(Nc6cc(S(=O)(=O)O)ccc6C(=O)O)n5)c(S(=O)(=O)O)cc4S(=O)(=O)O)ccc31)C(=O)c1ccccc1-2] |
| p23 | 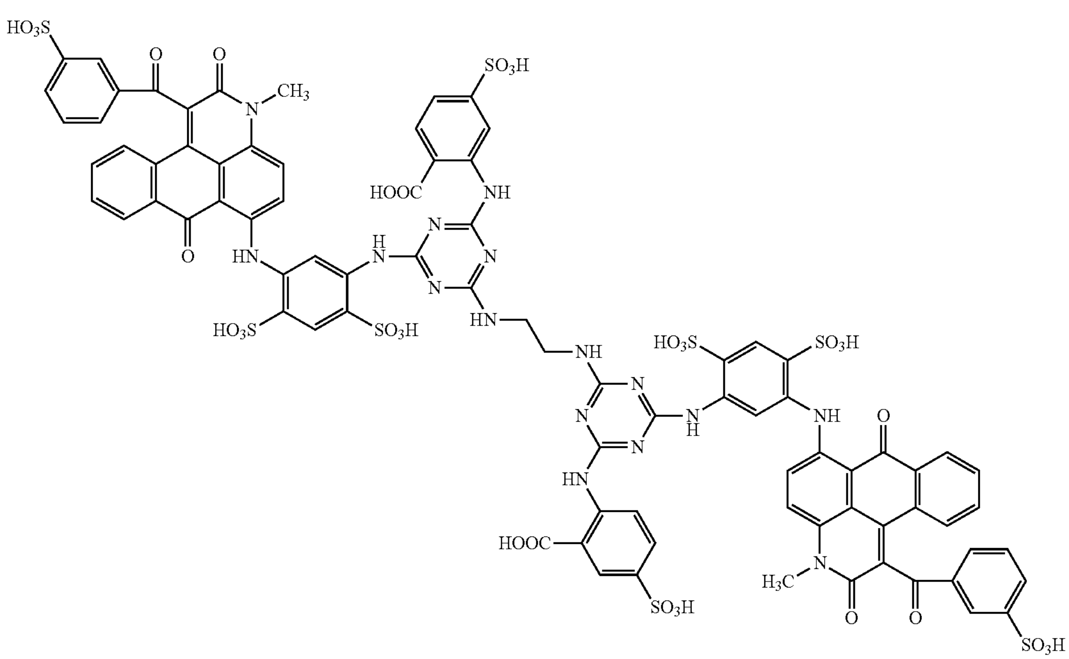 [SMILES: Cn1c(=O)c(C(=O)c2cccc(S(=O)(=O)O)c2)c2c3c(c(Nc4cc(Nc5nc(NCCNc6nc(Nc7ccc(S(=O)(=O)O)cc7C(=O)O)nc(Nc7cc(Nc8ccc9c%10c8C(=O)c8ccccc8-c%10c(C(=O)c8cccc(S(=O)(=O)O)c8)c(=O)n9C)c(S(=O)(=O)O)cc7S(=O)(=O)O)n6)nc(Nc6cc(S(=O)(=O)O)ccc6C(=O)O)n5)c(S(=O)(=O)O)cc4S(=O)(=O)O)ccc31)C(=O)c1ccccc1-2] |

TABLE 105-continued
| Compound No. | Structural formula |
|---|---|
| p24 | 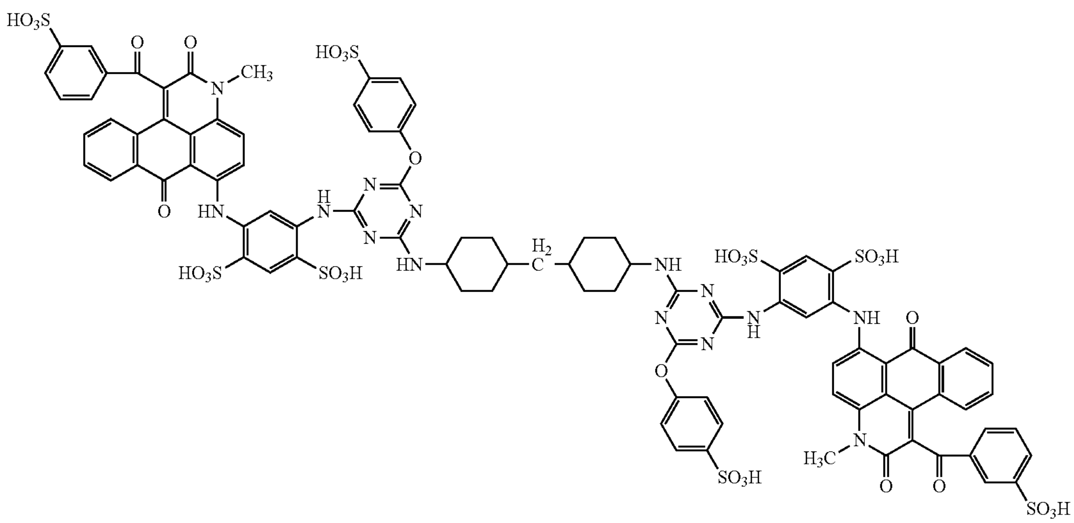 [SMILES: Cn1c(=O)c(C(=O)c2cccc(S(=O)(=O)O)c2)c2c3c(c(Nc4cc(Nc5nc(NC6CCC(CC7CCC(Nc8nc(Nc9cc(Nc%10ccc%11c%12c%10C(=O)c%10ccccc%10-c%12c(C(=O)c%10cccc(S(=O)(=O)O)c%10)c(=O)n%11C)c(S(=O)(=O)O)cc9S(=O)(=O)O)nc(Oc9ccc(S(=O)(=O)O)cc9)n8)CC7)CC6)nc(Oc6ccc(S(=O)(=O)O)cc6)n5)c(S(=O)(=O)O)cc4S(=O)(=O)O)ccc31)C(=O)c1ccccc1-2] |
TABLE 106
| Compound No. | Structural formula |
|---|---|
| p25 | 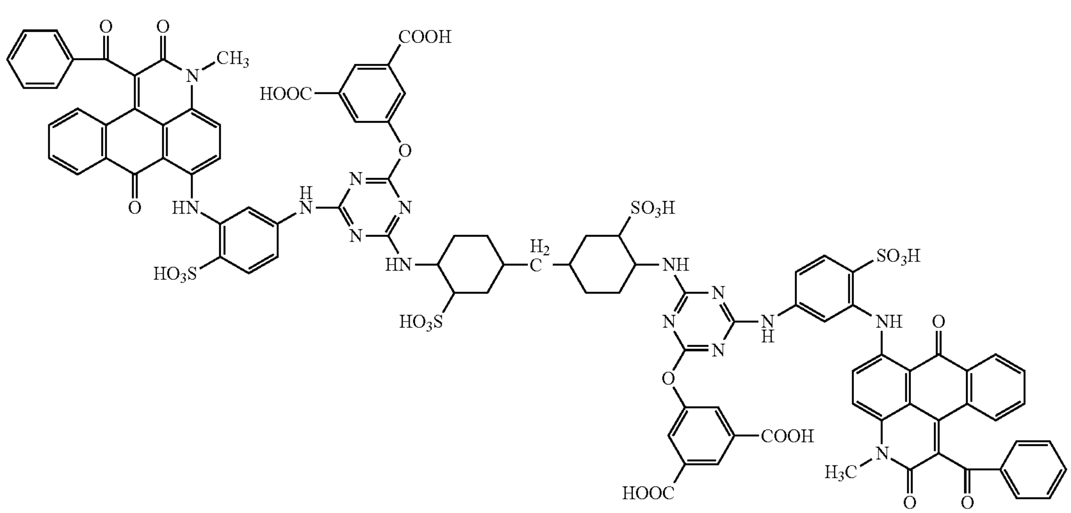 [SMILES: Cn1c(=O)c(C(=O)c2ccccc2)c2c3c(c(Nc4cc(Nc5nc(NC6CCC(CC7CCC(Nc8nc(Nc9ccc(S(=O)(=O)O)c(Nc%10ccc%11c%12c%10C(=O)c%10ccccc%10-c%12c(C(=O)c%10ccccc%10)c(=O)n%11C)c9)nc(Oc9cc(C(=O)O)cc(C(=O)O)c9)n8)C(S(=O)(=O)O)C7)CC6S(=O)(=O)O)nc(Oc6cc(C(=O)O)cc(C(=O)O)c6)n5)ccc4S(=O)(=O)O)ccc31)C(=O)c1ccccc1-2] |

TABLE 106-continued
| Compound No. | Structural formula |
|---|---|
| p26 | 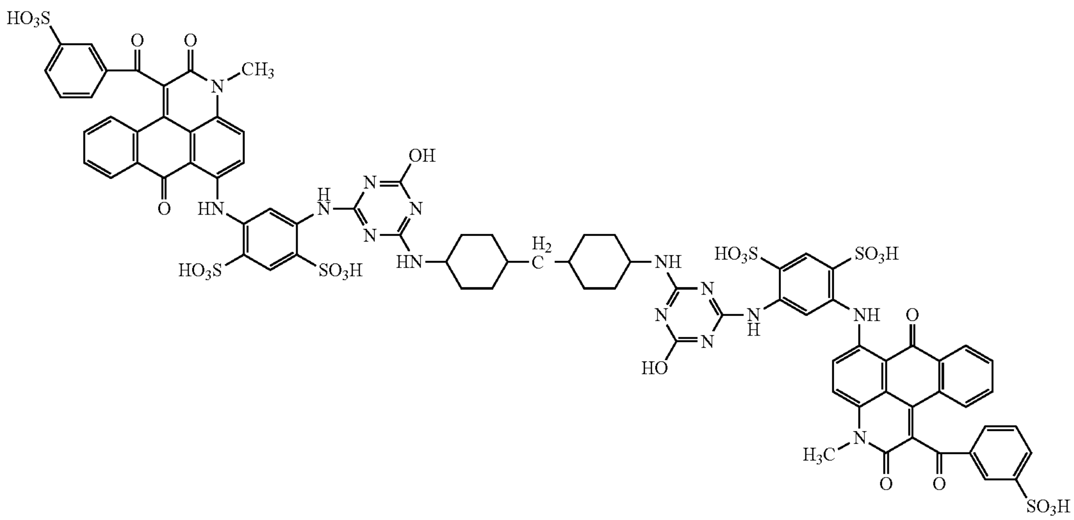 [SMILES: Cn1c(=O)c(C(=O)c2cccc(S(=O)(=O)O)c2)c2c3c(c(Nc4cc(Nc5nc(O)nc(NC6CCC(CC7CCC(Nc8nc(O)nc(Nc9cc(Nc%10ccc%11c%12c%10C(=O)c%10ccccc%10-c%12c(C(=O)c%10cccc(S(=O)(=O)O)c%10)c(=O)n%11C)c(S(=O)(=O)O)cc9S(=O)(=O)O)n8)CC7)CC6)n5)c(S(=O)(=O)O)cc4S(=O)(=O)O)ccc31)C(=O)c1ccccc1-2] |
| p27 | 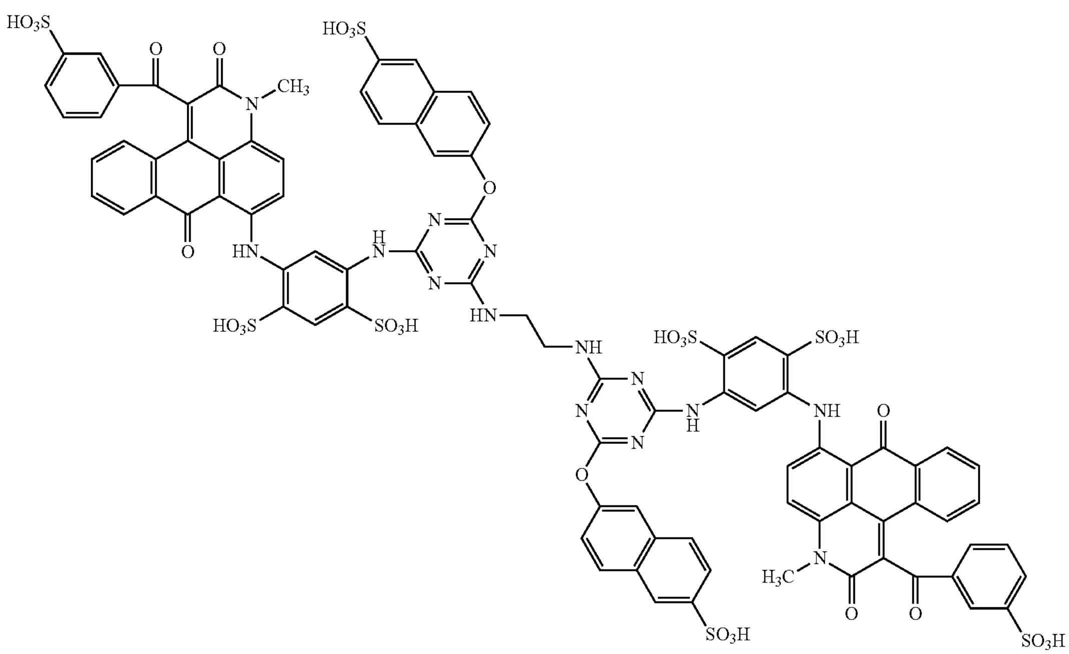 [SMILES: Cn1c(=O)c(C(=O)c2cccc(S(=O)(=O)O)c2)c2c3c(c(Nc4cc(Nc5nc(NCCNc6nc(Nc7cc(Nc8ccc9c%10c8C(=O)c8ccccc8-c%10c(C(=O)c8cccc(S(=O)(=O)O)c8)c(=O)n9C)c(S(=O)(=O)O)cc7S(=O)(=O)O)nc(Oc7ccc8cc(S(=O)(=O)O)ccc8c7)n6)nc(Oc6ccc7cc(S(=O)(=O)O)ccc7c6)n5)c(S(=O)(=O)O)cc4S(=O)(=O)O)ccc31)C(=O)c1ccccc1-2] |

TABLE 106-continued
| Compound No. | Structural formula |
|---|---|
| p28 | 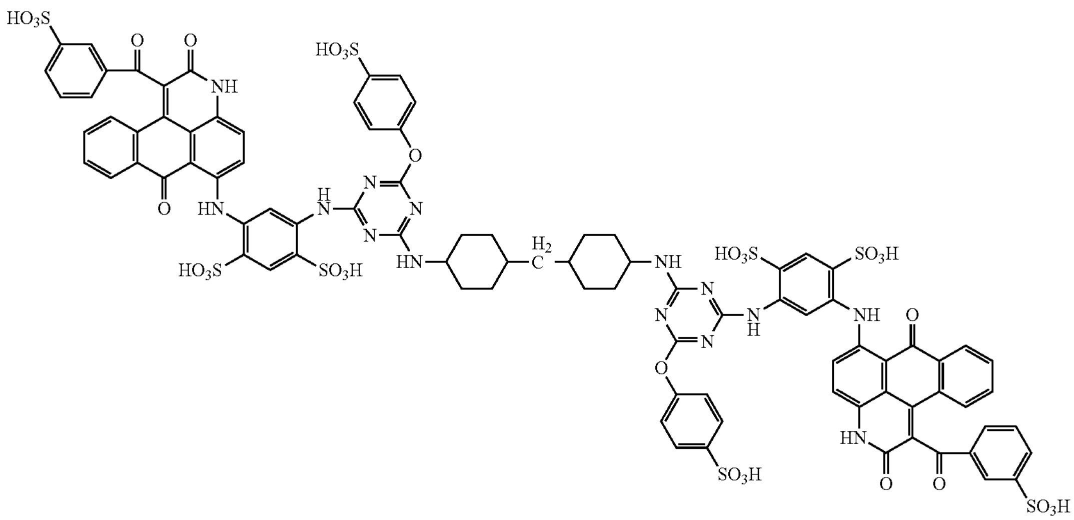 [SMILES: O=C(c1cccc(S(=O)(=O)O)c1)c1c2c3c(c(Nc4cc(Nc5nc(NC6CCC(CC7CCC(Nc8nc(Nc9cc(Nc%10ccc%11[nH]c(=O)c(C(=O)c%12cccc(S(=O)(=O)O)c%12)c%12c%11c%10C(=O)c%10ccccc%10-%12)c(S(=O)(=O)O)cc9S(=O)(=O)O)nc(Oc9ccc(S(=O)(=O)O)cc9)n8)CC7)CC6)nc(Oc6ccc(S(=O)(=O)O)cc6)n5)c(S(=O)(=O)O)cc4S(=O)(=O)O)ccc3[nH]c1=O)C(=O)c1ccccc1-2] |
TABLE 107
| Compound No. | Structural formula |
|---|---|
| p29 | 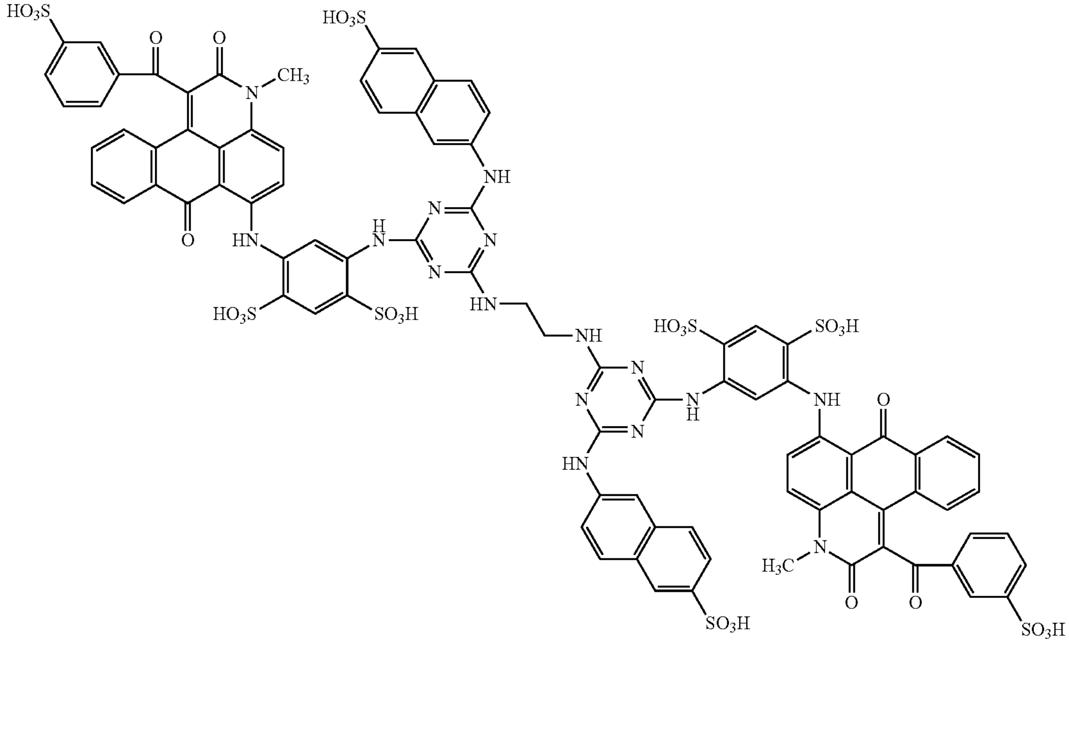 [SMILES: Cn1c(=O)c(C(=O)c2cccc(S(=O)(=O)O)c2)c2c3c(c(Nc4cc(Nc5nc(NCCNc6nc(Nc7ccc8cc(S(=O)(=O)O)ccc8c7)nc(Nc7cc(Nc8ccc9c%10c8C(=O)c8ccccc8-c%10c(C(=O)c8cccc(S(=O)(=O)O)c8)c(=O)n9C)c(S(=O)(=O)O)cc7S(=O)(=O)O)n6)nc(Nc6ccc7cc(S(=O)(=O)O)ccc7c6)n5)c(S(=O)(=O)O)cc4S(=O)(=O)O)ccc31)C(=O)c1ccccc1-2] |

TABLE 107-continued
| Compound No. | Structural formula |
|---|---|
| p30 | 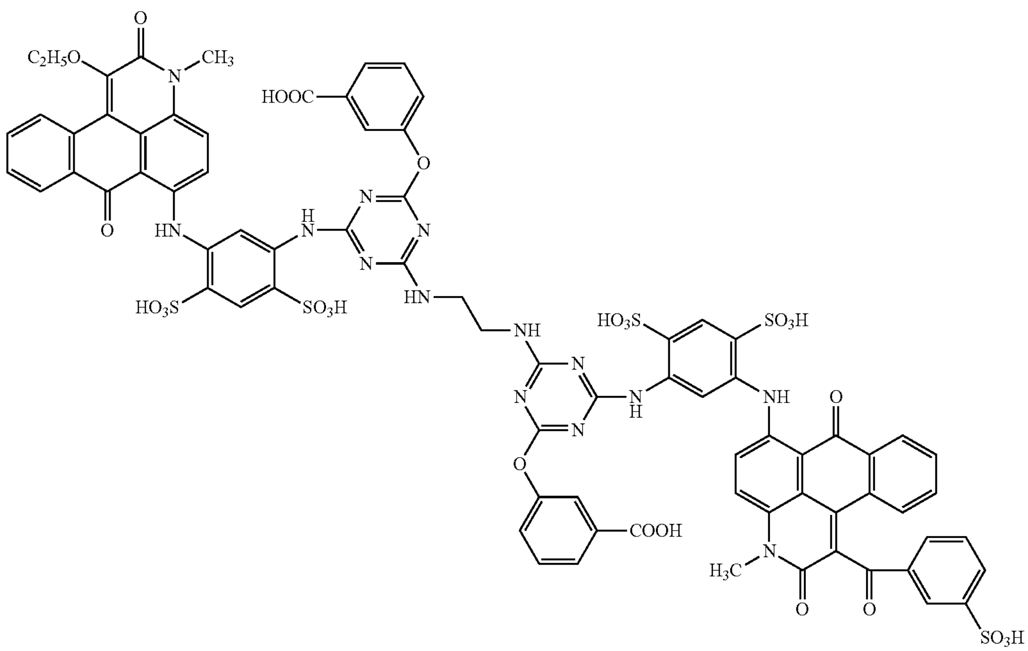 |
| p31 | 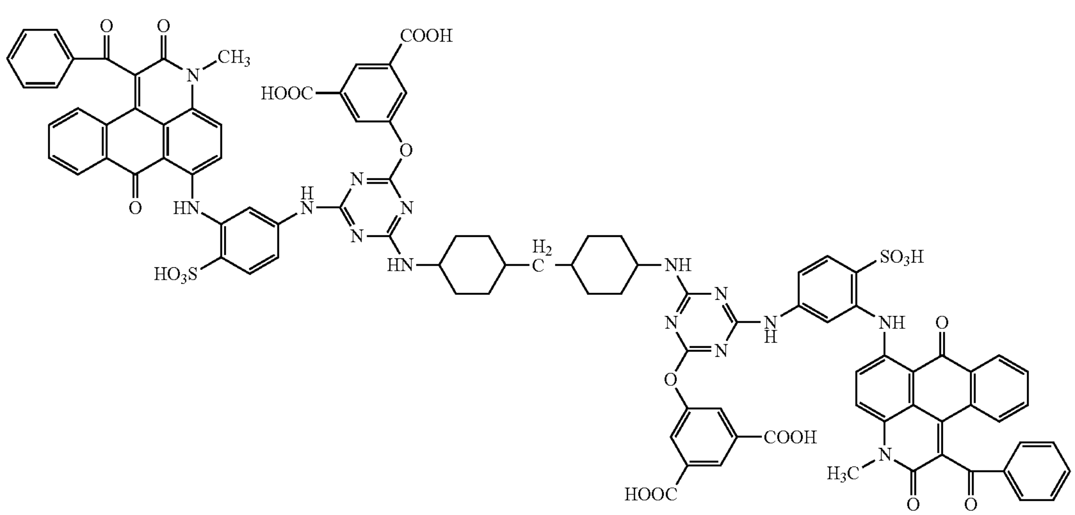 [SMILES: Cn1c(=O)c(C(=O)c2ccccc2)c2c3c(c(Nc4cc(Nc5nc(NC6CCC(CC7CCC(Nc8nc(Nc9ccc(S(=O)(=O)O)c(Nc%10ccc%11c%12c%10C(=O)c%10ccccc%10-c%12c(C(=O)c%10ccccc%10)c(=O)n%11C)c9)nc(Oc9cc(C(=O)O)cc(C(=O)O)c9)n8)CC7)CC6)nc(Oc6cc(C(=O)O)cc(C(=O)O)c6)n5)ccc4S(=O)(=O)O)ccc31)C(=O)c1ccccc1-2] |

TABLE 107-continued
| Compound No. | Structural formula |
|---|---|
| p32 | 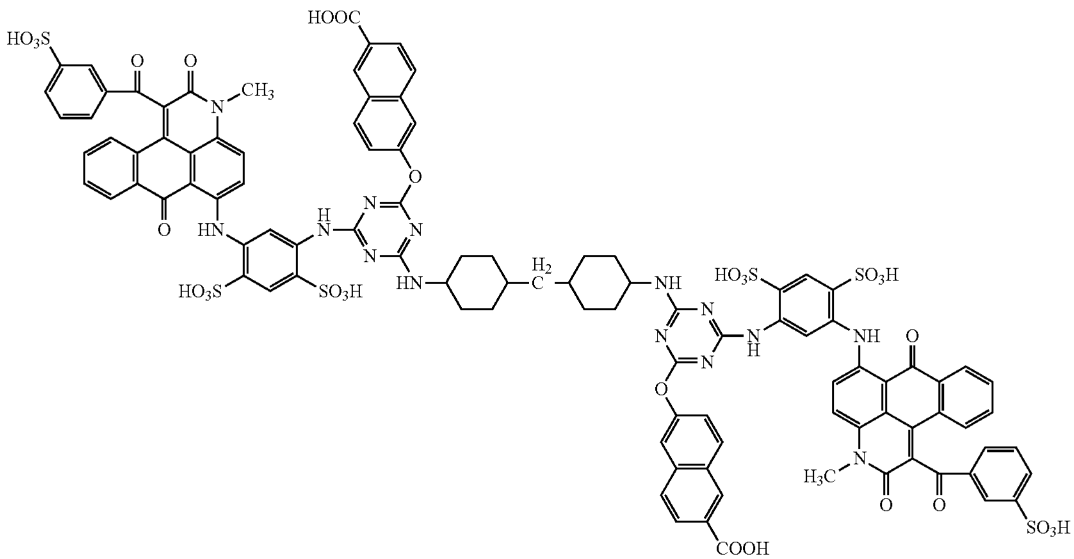 [SMILES: Cn1c(=O)c(C(=O)c2cccc(S(=O)(=O)O)c2)c2c3c(c(Nc4cc(Nc5nc(NC6CCC(CC7CCC(Nc8nc(Nc9cc(Nc%10ccc%11c%12c%10C(=O)c%10ccccc%10-c%12c(C(=O)c%10cccc(S(=O)(=O)O)c%10)c(=O)n%11C)c(S(=O)(=O)O)cc9S(=O)(=O)O)nc(Oc9ccc%10cc(C(=O)O)ccc%10c9)n8)CC7)CC6)nc(Oc6ccc7cc(C(=O)O)ccc7c6)n5)c(S(=O)(=O)O)cc4S(=O)(=O)O)ccc31)C(=O)c1ccccc1-2] |
TABLE 108
| Compound No. | Structural formula |
|---|---|
| p33 | 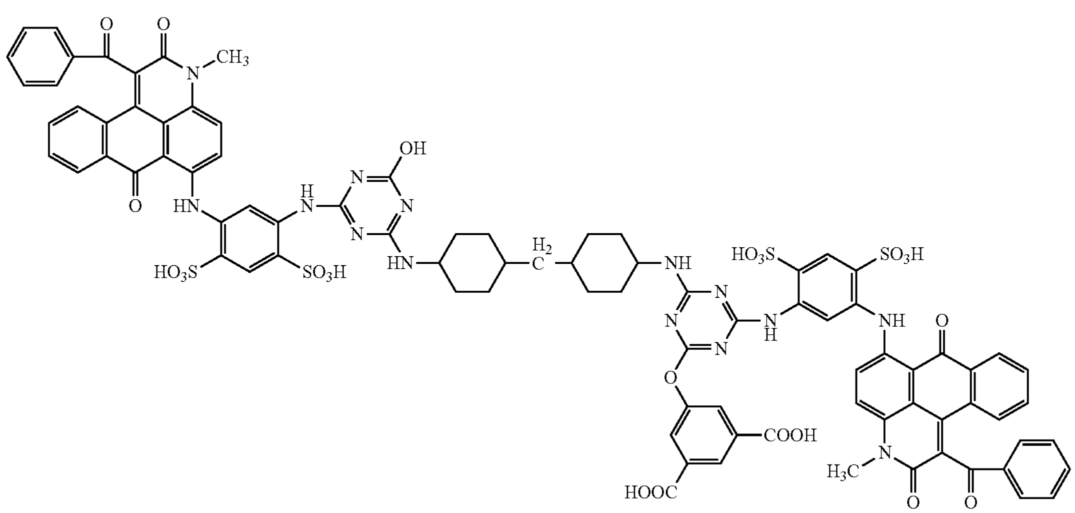 [SMILES: Cn1c(=O)c(C(=O)c2ccccc2)c2c3c(c(Nc4cc(Nc5nc(O)nc(NC6CCC(CC7CCC(Nc8nc(Nc9cc(Nc%10ccc%11c%12c%10C(=O)c%10ccccc%10-c%12c(C(=O)c%10ccccc%10)c(=O)n%11C)c(S(=O)(=O)O)cc9S(=O)(=O)O)nc(Oc9cc(C(=O)O)cc(C(=O)O)c9)n8)CC7)CC6)n5)c(S(=O)(=O)O)cc4S(=O)(=O)O)ccc31)C(=O)c1ccccc1-2] |

TABLE 108-continued
| Compound No. | Structural formula |
|---|---|
| p34 | 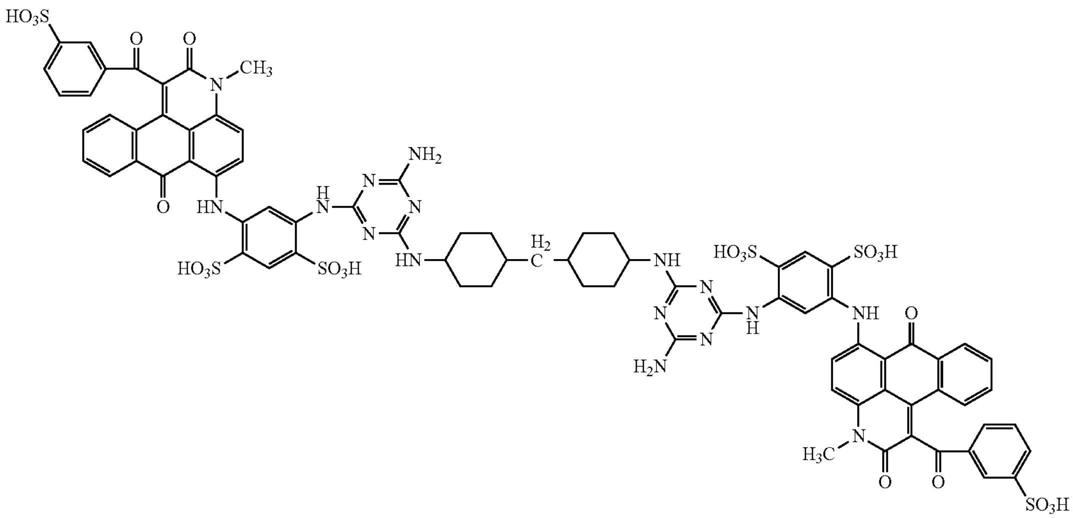 [SMILES: Cn1c(=O)c(C(=O)c2cccc(S(=O)(=O)O)c2)c2c3c(c(Nc4cc(Nc5nc(N)nc(NC6CCC(CC7CCC(Nc8nc(N)nc(Nc9cc(Nc%10ccc%11c%12c%10C(=O)c%10ccccc%10-c%12c(C(=O)c%10cccc(S(=O)(=O)O)c%10)c(=O)n%11C)c(S(=O)(=O)O)cc9S(=O)(=O)O)n8)CC7)CC6)n5)c(S(=O)(=O)O)cc4S(=O)(=O)O)ccc31)C(=O)c1ccccc1-2] |
| p35 | 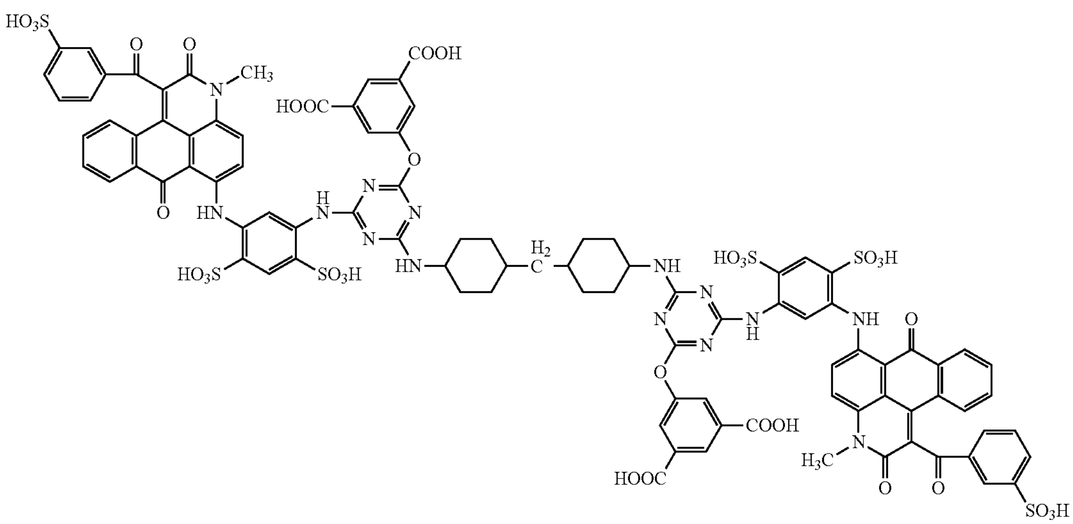 [SMILES: Cn1c(=O)c(C(=O)c2cccc(S(=O)(=O)O)c2)c2c3c(c(Nc4cc(Nc5nc(NC6CCC(CC7CCC(Nc8nc(Nc9cc(Nc%10ccc%11c%12c%10C(=O)c%10ccccc%10-c%12c(C(=O)c%10cccc(S(=O)(=O)O)c%10)c(=O)n%11C)c(S(=O)(=O)O)cc9S(=O)(=O)O)nc(Oc9cc(C(=O)O)cc(C(=O)O)c9)n8)CC7)CC6)nc(Oc6cc(C(=O)O)cc(C(=O)O)c6)n5)c(S(=O)(=O)O)cc4S(=O)(=O)O)ccc31)C(=O)c1ccccc1-2] |
| p36 | 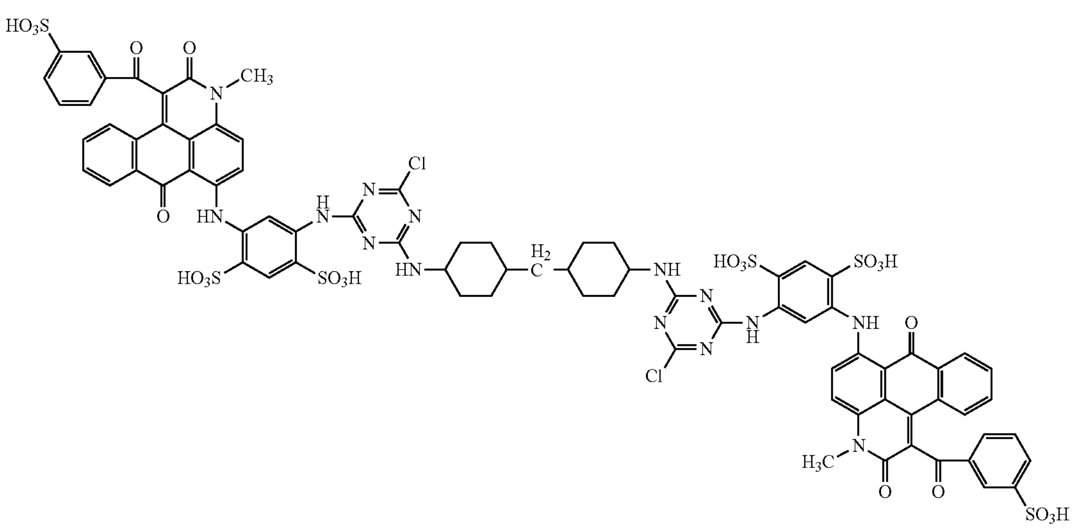 |

TABLE 109
| Compound No. | Structural formula |
|---|---|
| p37 | 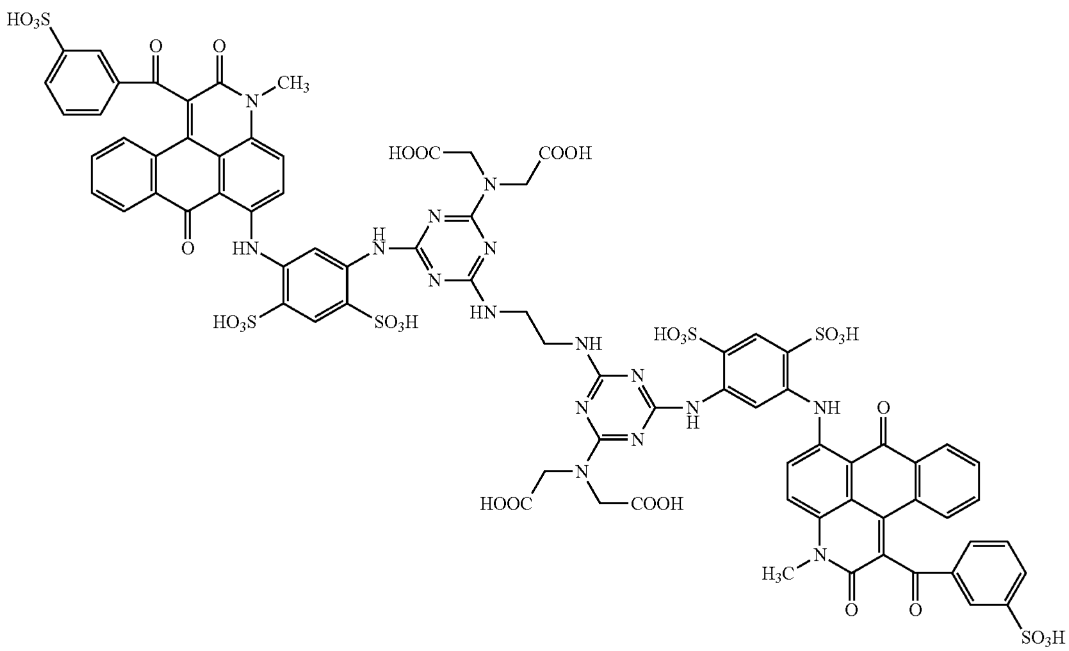 [SMILES: Cn1c(=O)c(C(=O)c2cccc(S(=O)(=O)O)c2)c2c3c(c(Nc4cc(Nc5nc(NCCNc6nc(Nc7cc(Nc8ccc9c%10c8C(=O)c8ccccc8-c%10c(C(=O)c8cccc(S(=O)(=O)O)c8)c(=O)n9C)c(S(=O)(=O)O)cc7S(=O)(=O)O)nc(N(CC(=O)O)CC(=O)O)n6)nc(N(CC(=O)O)CC(=O)O)n5)c(S(=O)(=O)O)cc4S(=O)(=O)O)ccc31)C(=O)c1ccccc1-2] |
| p38 | 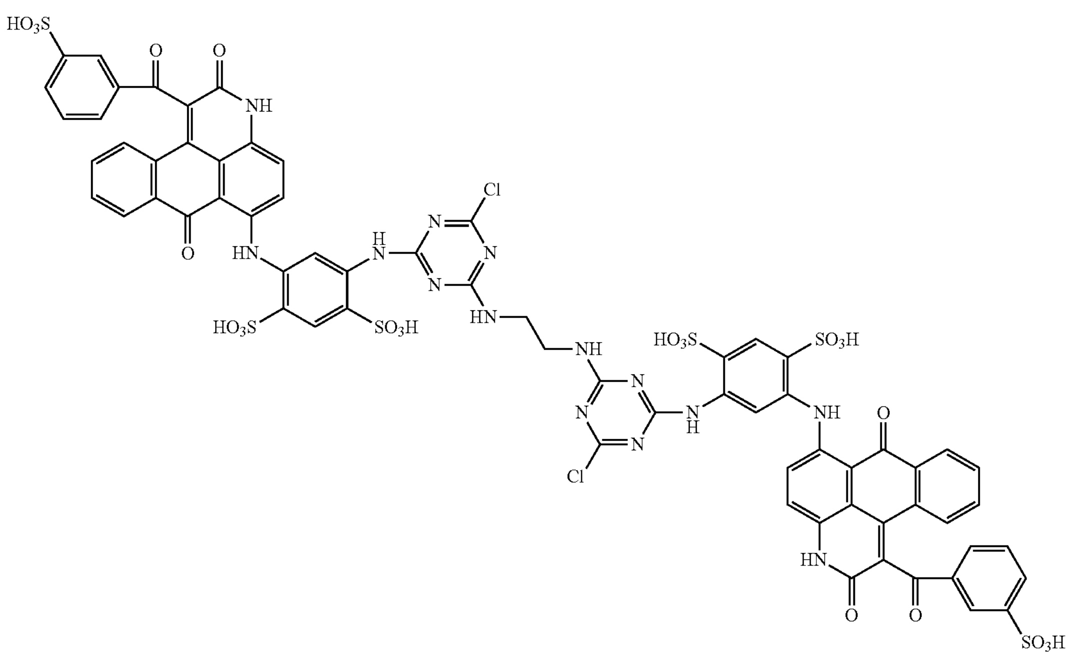 [SMILES: O=C(c1cccc(S(=O)(=O)O)c1)c1c2c3c(c(Nc4cc(Nc5nc(Cl)nc(NCCNc6nc(Cl)nc(Nc7cc(Nc8ccc9[nH]c(=O)c(C(=O)c%10cccc(S(=O)(=O)O)c%10)c%10c9c8C(=O)c8ccccc8-%10)c(S(=O)(=O)O)cc7S(=O)(=O)O)n6)n5)c(S(=O)(=O)O)cc4S(=O)(=O)O)ccc3[nH]c1=O)C(=O)c1ccccc1-2] |

TABLE 109-continued
| Compound No. | Structural formula |
| --- | --- |
| p39 | 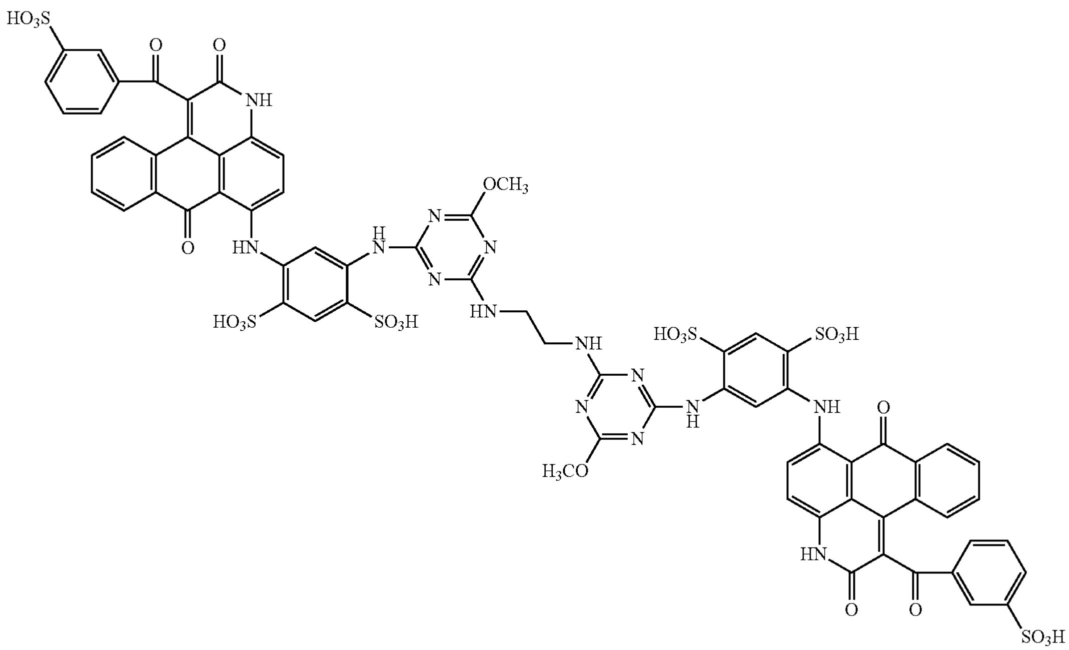 [SMILES: COc1nc(NCCNc2nc(Nc3cc(Nc4ccc5[nH]c(=O)c(C(=O)c6cccc(S(=O)(=O)O)c6)c6c5c4C(=O)c4ccccc4-6)c(S(=O)(=O)O)cc3S(=O)(=O)O)nc(OC)n2)nc(Nc2cc(Nc3ccc4[nH]c(=O)c(C(=O)c5cccc(S(=O)(=O)O)c5)c5c4c3C(=O)c3ccccc3-5)c(S(=O)(=O)O)cc2S(=O)(=O)O)n1] |
| p40 | 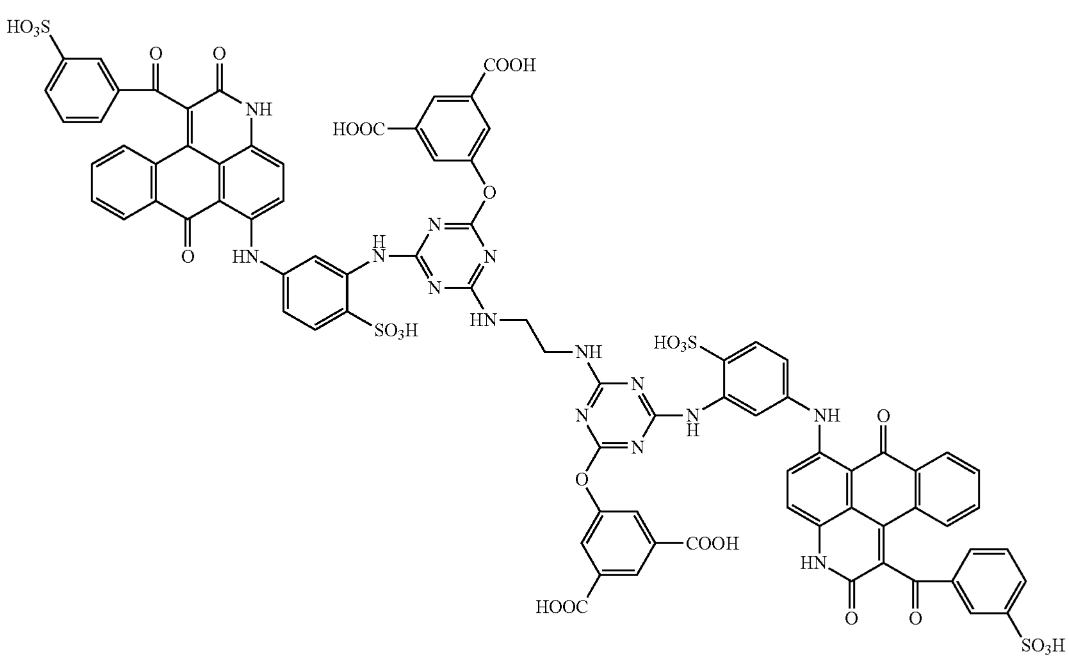 [SMILES: O=C(O)c1cc(Oc2nc(NCCNc3nc(Nc4cc(Nc5ccc6[nH]c(=O)c(C(=O)c7cccc(S(=O)(=O)O)c7)c7c6c5C(=O)c5ccccc5-7)ccc4S(=O)(=O)O)nc(Oc4cc(C(=O)O)cc(C(=O)O)c4)n3)nc(Nc3cc(Nc4ccc5[nH]c(=O)c(C(=O)c6cccc(S(=O)(=O)O)c6)c6c5c4C(=O)c4ccccc4-6)ccc3S(=O)(=O)O)n2)cc(C(=O)O)c1] |

TABLE 110
| Compound No. | Structural formula |
|---|---|
| p41 | 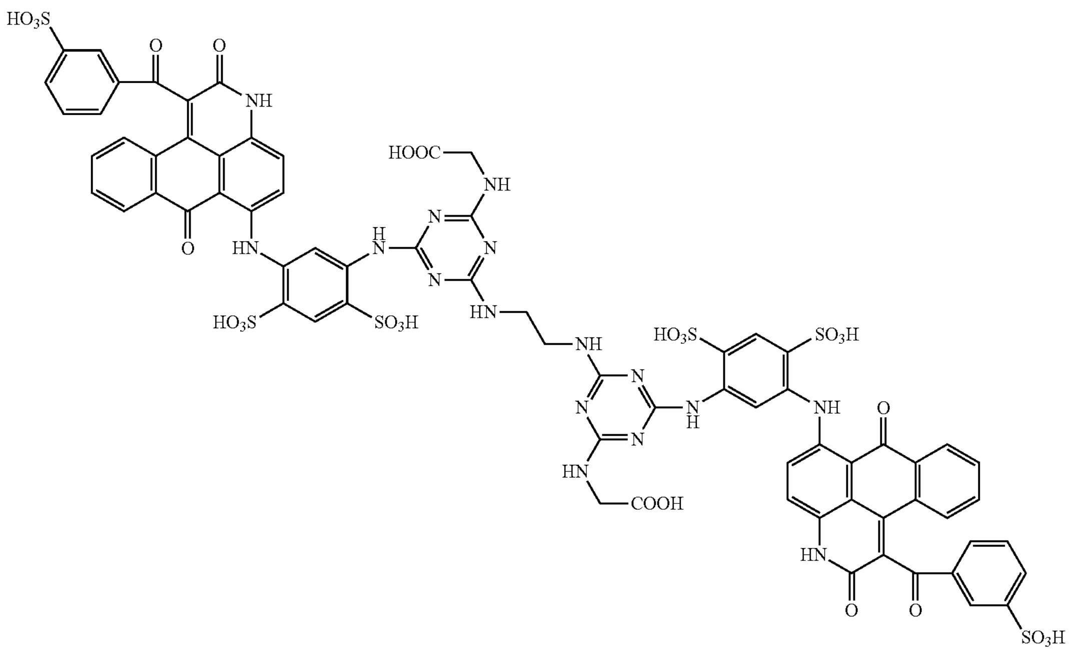 [SMILES: O=C(O)CNc1nc(NCCNc2nc(NCC(=O)O)nc(Nc3cc(Nc4ccc5[nH]c(=O)c(C(=O)c6cccc(S(=O)(=O)O)c6)c6c5c4C(=O)c4ccccc4-6)c(S(=O)(=O)O)cc3S(=O)(=O)O)n2)nc(Nc2cc(Nc3ccc4[nH]c(=O)c(C(=O)c5cccc(S(=O)(=O)O)c5)c5c4c3C(=O)c3ccccc3-5)c(S(=O)(=O)O)cc2S(=O)(=O)O)n1] |
| p42 | 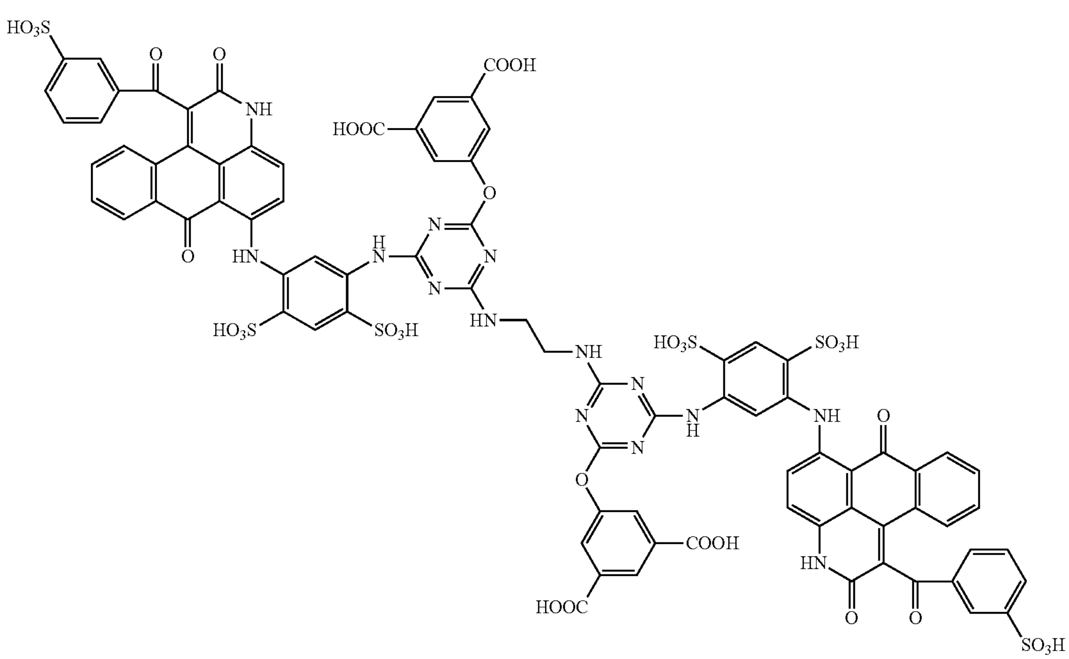 [SMILES: O=C(O)c1cc(Oc2nc(NCCNc3nc(Nc4cc(Nc5ccc6[nH]c(=O)c(C(=O)c7cccc(S(=O)(=O)O)c7)c7c6c5C(=O)c5ccccc5-7)c(S(=O)(=O)O)cc4S(=O)(=O)O)nc(Oc4cc(C(=O)O)cc(C(=O)O)c4)n3)nc(Nc3cc(Nc4ccc5[nH]c(=O)c(C(=O)c6cccc(S(=O)(=O)O)c6)c6c5c4C(=O)c4ccccc4-6)c(S(=O)(=O)O)cc3S(=O)(=O)O)n2)cc(C(=O)O)c1] |

TABLE 110-continued

| Compound No. | Structural formula |
|---|---|
| p43 | 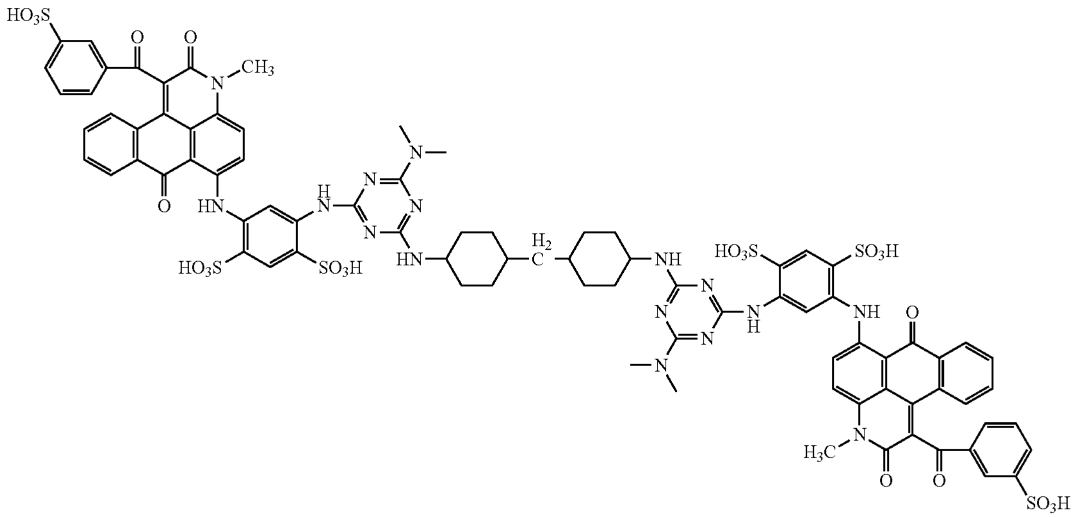 [SMILES: CN(C)c1nc(Nc2cc(Nc3ccc4c5c3C(=O)c3ccccc3-c5c(C(=O)c3cccc(S(=O)(=O)O)c3)c(=O)n4C)c(S(=O)(=O)O)cc2S(=O)(=O)O)nc(NC2CCC(CC3CCC(Nc4nc(Nc5cc(Nc6ccc7c8c6C(=O)c6ccccc6-c8c(C(=O)c6cccc(S(=O)(=O)O)c6)c(=O)n7C)c(S(=O)(=O)O)cc5S(=O)(=O)O)nc(N(C)C)n4)CC3)CC2)n1] |
| p44 | 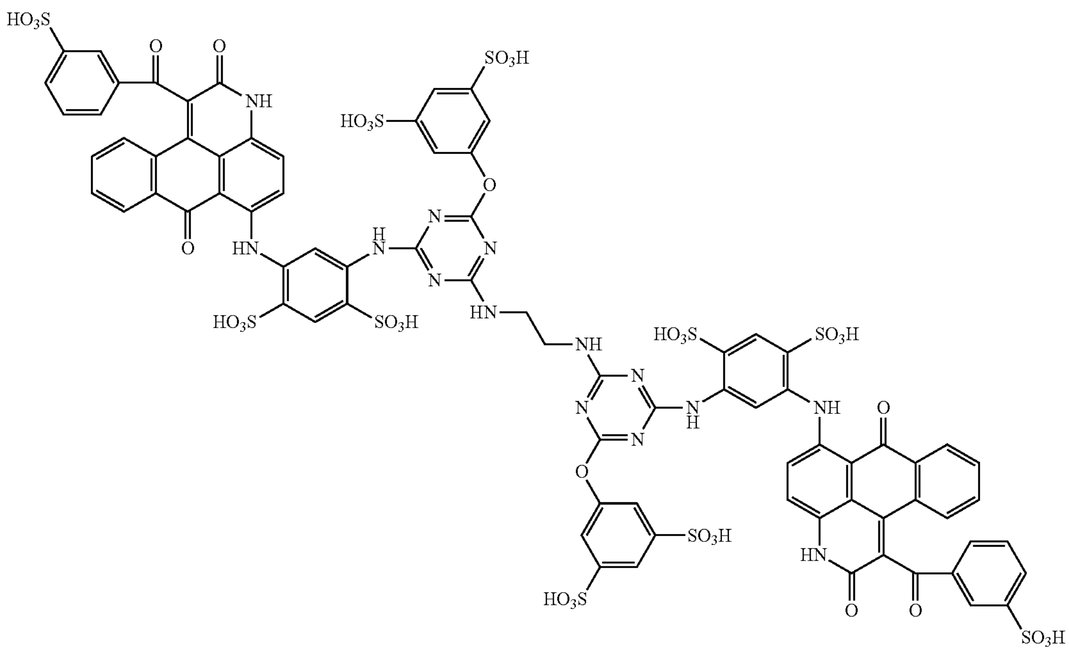 [SMILES: O=C(c1cccc(S(=O)(=O)O)c1)c1c2c3c(c(Nc4cc(Nc5nc(NCCNc6nc(Nc7cc(Nc8ccc9[nH]c(=O)c(C(=O)c%10cccc(S(=O)(=O)O)c%10)c%10c9c8C(=O)c8ccccc8-%10)c(S(=O)(=O)O)cc7S(=O)(=O)O)nc(Oc7cc(S(=O)(=O)O)cc(S(=O)(=O)O)c7)n6)nc(Oc6cc(S(=O)(=O)O)cc(S(=O)(=O)O)c6)n5)c(S(=O)(=O)O)cc4S(=O)(=O)O)ccc3[nH]c1=O)C(=O)c1ccccc1-2] |

[Component (B-q)]

As for a component (B-q), Z in the formula (q1) denotes an integer of 1 to 3, preferably 1 or 2, and more preferably 1.

[Component (B-r), Component (B-s), and Component (B-t)]

Components (B-r), (B-s), and (B-t) can improve both of color development properties and moisture resistance. These coloring matters can be obtained by a method, for example, of purchasing commercially available products.

[Component (A) and Component (B)]

The components (A) and (B) used can also be salts thereof. Examples of the salts of the compounds shown as the component (A) and the component (B) include salts formed together with an inorganic cation or an organic cation. Specific examples of salts with an organic cation include alkali metal salts such as a lithium salt, a sodium salt, and a potassium salt; and an ammonium salt ($NH_4^+$). The organic cation is, but is not limited to, a quaternary ammonium represented by the formula (2), for example.

(2)

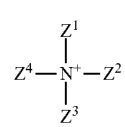

In the formula (2), $Z^1$ to $Z^4$ are independently a hydrogen atom, a (C1-C4) alkyl group, a hydroxy (C1-C4) alkyl group, or hydroxy (C1-C4) alkoxy (C1-C4) alkyl group. At least one of $Z^1$ to $Z^4$ is a group that is not a hydrogen atom.

Examples of the (C1-C4) alkyl group as or in $Z^1$ to $Z^4$ include a methyl group, an ethyl group, and the like. Similarly, examples of the hydroxy (C1-C4) alkyl group include a hydroxymethyl group, a hydroxyethyl group, a 3-hydroxypropyl group, a 2-hydroxypropyl group, a 4-hydroxybutyl group, a 3-hydroxybutyl group, a 2-hydroxybutyl group, and the like. Similarly, examples of the hydroxy (C1-C4) alkoxy (C1-C4) alkyl group include a hydroxyethoxymethyl group, a 2-hydroxyethoxyethyl group, a 3-(hydroxyethoxy)propyl group, a 3-(hydroxyethoxy)butyl group, a 2-(hydroxyethoxy)butyl group, and the like.

Among the salts described above, preferable examples include alkali metal salts such as a sodium salt, a potassium salt, and a lithium salt; and organic quaternary ammonium salts such as a monoethanolamine salt, a diethanolamine salt, a triethanolamine salt, a monoisopropanolamine salt, a diisopropanolamine salt, and a triisopropanolamine salt; and an ammonium salt. Among these, a lithium salt, a sodium salt, and an ammonium salt are more preferable.

As is clear to those skilled in the art, a salt or a free acid of the compound shown as the component (A) or the component (B) can be easily obtained by a method described below or the like.

For example, by carrying out a method of adding a water-soluble organic solvent such as acetone or a (C1-C4) alcohol, for example, to a reaction mixture after the completion of a final step in a reaction for the synthesis of the compound of the formula (1), or to an aqueous solution containing a salt of the compound of the formula (1), a method of adding sodium chloride for salting-out, or another method, and then separating the solid precipitate by filtration, a salt of the compound of the formula (1) formed with sodium or the like can be obtained as a wet cake.

By dissolving the resulting sodium salt as a wet cake in water, adding thereto an acid such as hydrochloric acid for pH adjustment as needed, and then separating the solid precipitate by filtration, a free acid of the compound of the formula (1) or a mixture of a free acid and a sodium salt of the compound of the formula (1) in which part of the compound of the formula (1) forms its sodium salt can be obtained.

By dissolving the resulting sodium salt as a wet cake or a dry solid in water, adding thereto an ammonium salt such as ammonium chloride, adding an acid such as hydrochloric acid for pH adjustment as needed, for example, to pH1 to pH3, and then separating the solid precipitate by filtration, an ammonium salt of the compound of the formula (1) can be obtained. By regulating the amount of ammonium chloride added or/and by adjusting pH as needed, a mixture of an ammonium salt of the compound of the formula (1) and a sodium salt of the compound of the formula (1) or a mixture of a free acid and an ammonium salt of the compound of the formula (1) can be obtained, for example.

In addition, as described below, by adding a mineral acid (hydrochloric acid or sulfuric acid, for example) to the reaction mixture after the completion of the reaction, a solid of a free acid can be directly obtained. In this case, by adding a free acid of the compound of the formula (1) as a wet cake to water, stirring, and adding thereto potassium hydroxide; lithium hydroxide; an aqueous ammonia solution; a hydroxide of an organic quaternary ammonium of the formula (2), or the like, for example, for salt formation, a potassium salt, a lithium salt, an ammonium salt, a quaternary ammonium salt, or the like corresponding to the compound added can be obtained. By controlling the number of moles of a hydroxide or the like added relative to the number of moles of a free acid, a mixed salt of a lithium salt and a sodium salt, for example, or furthermore a mixed salt of a lithium salt, a sodium salt, and an ammonium salt can also be prepared. A salt of the compound of the formula (1) sometimes has varied physical characteristics such as solubility or varied ink performance for use as an ink, depending on the kind of the salt thereof. Therefore, the kind of the salt to form is preferably selected depending on desired ink performance and the like.

By addition of a mineral acid such as hydrochloric acid after the completion of the reaction, the compound represented by the formula (1) can be isolated as a solid free acid, and then, for example, by washing the resulting solid free acid with water or an aqueous acid such as aqueous hydrochloric acid, an inorganic salt contained as an impurity (an inorganic impurity) such as sodium chloride and sodium sulfate can be removed. By treating the free acid of the compound of the present invention thus obtained as a wet cake or a dry solid with a desired inorganic base or a desired organic base in water, as described above, a solution of the corresponding salt of the compound can be obtained. Examples of the inorganic base include alkali metal hydroxides such as lithium hydroxide, sodium hydroxide, and potassium hydroxide; alkali metal carbonic acid salt such as lithium carbonate, sodium carbonate, and potassium carbonate; and ammonium hydroxide (an aqueous ammonia solution), and the like. Examples of the organic base include organic amines such as the quaternary ammonium represented by the formula (2) and alkanolamines such as diethanolamine and triethanolamine, but these examples are not limitative.

The method of producing a salt of the compound of the formula (1) can also be applied as a method of producing a compound shown as the component (B).

The ink composition of the present invention contains the azo compound of the formula (1) in an amount of usually 0.5 to 15% by mass and preferably 1 to 6% by mass, relative to the total amount of the ink composition. Considering the high solubility of the compound of the formula (1), and by selecting the coloring-matter component (B) to be used in combination, the ink composition of the present invention can have a higher concentration. Based on this, in order to obtain an ink composition having even more excellent color development properties, the amount of the azo compound of the formula (1) is more preferably not lower than 3% by mass.

The ink composition of the present invention can further or jointly contain a different coloring-matter component (B) described above, as the component (C) or as the component (C) and a component (D), where appropriate, to achieve a higher concentration.

The content of the component (A) is preferably not lower than 40% by mass relative to the total amount of the coloring matter of the present invention.

[Other Components]

For the purpose of controlling a subtle tone of the color of black, for example, the ink composition of the present invention may also contain, in addition to the azo compound of the present invention, another toning coloring matter or the like, as needed. Even in such a case, the total mass of the coloring matter contained in the ink composition of the present invention may stay within the range described above relative to the total mass of the ink composition.

Examples of the toning coloring matter include other coloring matters having various hues, such as yellow coloring matters (for example, C. I. Direct Yellow 34, C. I. Direct Yellow 58, C. I. Direct Yellow 86, C. I. Direct Yellow 132, and C. I. Direct Yellow 161, and the like), orange coloring matters (for example, C. I. Direct Orange 17, C. I. Direct Orange 26, C. I. Direct Orange 29, C. I. Direct Orange 39, and C. I. Direct Orange 49, and the like), brown coloring matters, scarlet coloring matters (for example, C. I. Direct Red 89, and the like), red coloring matters (for example, C. I. Direct Red 62, C. I. Direct Red 75, C. I. Direct Red 79, C. I. Direct Red 80, C. I. Direct Red 84, C. I. Direct Red 225, and C. I. Direct Red 226, and the like), magenta coloring matters (for example, C. I. Direct Red 227, and the like), violet coloring matters, blue coloring matters, navy coloring matters, cyan coloring matters (for example, C. I. Direct Blue 199 and C. I. Acid Blue 249, and the like), green coloring matters (for example, Acid Green 1), and black coloring matters (for example, C. I. Acid Black 2).

The ink composition of the present invention is prepared using water as a medium, and may contain a water-soluble organic solvent (an organic solvent miscible with water) (component (S)), provided that the effects of the present invention are not impaired. The water-soluble organic solvent can be expected to have effect of, for example, dissolving dyes, preventing the composition from drying (maintaining the wet state), adjusting the viscosity of the composition, promoting penetration of a coloring matter into a record-receiving material, adjusting the surface tension of the composition, and defoaming of the composition.

Therefore, the water-soluble organic solvent is preferably contained in the ink composition of the present invention. The water-soluble organic solvent (component (S)) used for preparing the aqueous ink composition is not particularly limited, and can be, for example, a (C1-C4) alkanol such as methanol, ethanol, propanol, isopropanol, butanol, isobutanol, secondary butanol, or tertiary butanol, a carboxylic amide such as N,N-dimethylformamide or N,N-dimethylacetamide, a lactam such as 2-pyrrolidone or N-methylpyrrolidin-2-one, a cyclic urea such as 1,3-dimethylimidazolidin-2-one or 1,3-dimethylhexahydropyrimid-2-one, a ketone or a ketoalcohol such as acetone, methyl ethyl ketone, or 2-methyl-2-hydroxypentan-4-one, a cyclic ether such as tetrahydrofuran or a dioxane, a monomer, an oligomer, a poly(alkylene glycol), or a thioglycol each of which has a (C2-C6) alkylene unit, such as ethylene glycol, 1,2-propylene glycol, 1,3-propylene glycol, 1,2-butylene glycol, 1,4-butylene glycol, pentamethylene glycol, 1,6-hexylene glycol, 1,2-hexylene glycol, diethylene glycol, triethylene glycol, tetraethylene glycol, dipropylene glycol, polyethylene glycol, polypropylene glycol, thiodiglycol, or dithiodiglycol, a polyol (a triol) such as glycerol or hexane-1,2,6-triol, a (C1-C4) alkyl ether of a polyhydric alcohol, such as ethylene glycol monomethyl ether, ethylene glycol monoethyl ether, diethylene glycol monomethyl ether, diethylene glycol monoethyl ether, diethylene glycol monobutyl ether (butyl carbitol), triethylene glycol monomethyl ether, or triethylene glycol monoethyl ether, γ-butyrolactone, or dimethyl sulfoxide.

The water-soluble organic solvent is preferably one, two or more water-soluble organic solvents selected from the group consisting of 2-pyrrolidone, a glycerol-based solvent, and a glycol-based solvent.

In the glycerol-based solvent, three of the carbon atoms of the aliphatic hydrocarbon group or the ether group have respective hydroxy groups as substituents attached thereto. The glycerol-based solvent is a polyol (a triol) such as glycerol, hexane-1,2,6-triol, or the like, among the examples above.

In the glycol-based solvent, two of the carbon atoms of the aliphatic hydrocarbon group or the ether group have respective hydroxy groups as substituents attached thereto. The glycol-based solvent is a monomer, an oligomer, a poly(alkylene glycol), or a thioglycol each of which has a (C2-C6) alkylene unit, such as ethylene glycol, 1,2-propylene glycol, 1,3-propylene glycol, 1,2-butylene glycol, 1,4-butylene glycol, pentamethylene glycol, 1,6-hexylene glycol, 1,2-hexylene glycol, diethylene glycol, triethylene glycol, tetraethylene glycol, dipropylene glycol, polyethylene glycol, polypropylene glycol, thiodiglycol, or dithiodiglycol, a polyol (a triol) such as glycerol or hexane-1,2,6-triol, a (C1-C4) alkyl ether of a polyhydric alcohol, such as ethylene glycol monomethyl ether, ethylene glycol monoethyl ether, diethylene glycol monomethyl ether, diethylene glycol monoethyl ether, diethylene glycol monobutyl ether (butyl carbitol), triethylene glycol monomethyl ether, or triethylene glycol monoethyl ether, or the like, among the examples above.

Among these, 2-pyrrolidone, glycerol, ethylene glycol, pentamethylene glycol, and 1,2-hexylene glycol are more preferable.

These organic solvents may be used alone or in combination of two or more.

It should be noted that the water-soluble organic solvent includes a substance that is solid at normal temperature, such as trimethylolpropane. Nevertheless, such a substance is soluble in water even as solid, and an aqueous solution containing such a substance has characteristics similar to these of a water-soluble organic solvent. Therefore, such a substance can be expected to have the same effects. Based on this, for convenience, such a solid substance is also regarded as a water-soluble organic solvent in the present specification, provided that the same effects can be expected.

The content of the water-soluble solvent is preferably 0 to 50% by mass and is further preferably 25 to 50% by mass, relative to the total amount of the aqueous ink composition of the present invention.

For the purpose of improving storage stability and the like of the ink composition, the ink composition of the present invention may further contain an ink-adjusting agent. Examples of the ink-adjusting agent include a preservative/fungicide agent, a pH adjusting agent, a chelating reagent, an anticorrosive agent, a water-soluble ultraviolet absorber, a water-soluble polymer compound, a dye-dissolving agent, an antioxidant, a surfactant, and a defoaming agent.

Examples of the fungicide agent include sodium dehydroacetate, sodium benzoate, sodium pyridinethione-1-oxide, p-hydroxybenzoic acid ethyl ester, 1,2-benzisothiazolin-3-one, and salts thereof. The content of such an agent is preferably 0.02 to 1.00% by mass in the coloring composition.

Examples of the preservative include compounds such as organic sulfur compounds, organic nitrogen sulfur compounds, organic halogen compounds, haloallylsulfone compounds, iodopropargyl compounds, N-haloalkylthio compounds, nitrile compounds, pyridine compounds, 8-oxyquinoline compounds, benzothiazole compounds, isothiazoline compounds, dithiol compounds, pyridine oxide compounds, nitropropane compounds, organotin compounds, phenol compounds, quaternary ammonium salt compounds, triazine compounds, thiazine compounds, anilide compounds, adamantane compounds, dithiocarbamate compounds, brominated indanone compounds, benzylbromo acetate compounds, and inorganic salt compounds. Examples of the organic halogen compounds include sodium pentachlorophenol, and examples of the pyridine oxide compounds include sodium 2-pyridinethiol-1-oxide. Examples of the inorganic salt compounds include sodium acetate anhydride, and examples of the isothiazoline compounds include 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, and 2-methyl-4-isothiazolin-3-one calcium chloride. Examples of other preservative/fungicide agents include sodium sorbate and sodium benzoate.

As the pH adjusting agent, any substance can be used provided that it can control the pH of the ink to the range from 5 to 11 without adversely affecting the ink to be prepared. Examples thereof include alkanolamines such as diethanolamine, triethanolamine, and N-methyldiethanolamine, alkali metal hydroxides such as lithium hydroxide, sodium hydroxide, and potassium hydroxide, ammonium hydroxide (ammonia), alkali metal carbonic acid salts such as lithium carbonate, sodium carbonate, sodium hydrogen carbonate, and potassium carbonate, and inorganic bases such as potassium acetate, sodium silicate, and disodium phosphate.

Examples of the chelating reagent include sodium ethylenediaminetetraacetate, sodium nitrilotriacetate, sodium hydroxyethylethylenediaminetriacetate, sodium diethylenetriaminepentaacetate, and sodium uracil diacetate.

Examples of the anticorrosive agent include acid sulfite, sodium thiosulfate, ammonium thioglycolate, diisopropylammonium nitrite, pentaerythritol tetranitrate, and dicyclohexylammonium nitrite.

Examples of the water-soluble ultraviolet absorber include sulfonated benzophenone compounds, sulfonated benzotriazole compounds, sulfonated salicylic acid compounds, sulfonated cinnamic acid compounds, and sulfonated triazine compounds.

Examples of the water-soluble polymer compound include polyvinyl alcohol, cellulose derivatives, polyamines, and polyimines.

Examples of the dye-dissolving agent include ε-caprolactam, ethylene carbonate, and urea. Particularly, in a preferable embodiment of the present invention, urea is contained.

As the antioxidant, various organic anti-fading agents and various metal-complex-based anti-fading agents can be used. Examples of the organic anti-fading agents include hydroquinones, alkoxyphenols, dialkoxyphenols, phenols, anilines, amines, indans, chromans, alkoxy anilines, and heterocycles.

Examples of the surfactant include known surfactants such as anion surfactants, cation surfactants, and nonionic surfactants. Examples of the anionic surfactants include alkylsulfonic acid salts, alkylcarboxylic acid salts, α-olefin sulfonic acid salts, polyoxyethylene alkyl ether acetic acid salts, N-acylamino acid and salts thereof, N-acylmethyl taurates, alkyl sulfate polyoxyalkyl ether sulfates, alkyl sulfate polyoxyethylene alkyl ether phosphates, rosinate soap, castor oil sulfuric acid ester salts, lauryl alcohol sulfuric acid ester salts, alkylphenol phosphoric acid esters, alkyl phosphoric acid esters, alkyl allyl sulfone hydrochloric acids, diethyl sulfosuccinic acid salts, diethylhexylsulfosuccinic acids, and dioctyl sulfosuccinic acid salts. Examples of the cationic surfactants include 2-vinylpyridine derivatives and poly 4-vinylpyridine derivatives. Examples of the amphoteric surfactants include lauryl dimethylaminoacetic acid betaine, 2-alkyl-N-carboxymethyl-N-hydroxyethyl imidazolinium betaine, cocamide propyl dimethylaminoacetic acid betaine, polyoctyl polyaminoethyl glycine, and other imidazoline derivatives. Examples of the nonionic surfactants include ether surfactants such as polyoxyethylene nonylphenyl ethers, polyoxyethylene octylphenyl ethers, polyoxyethylene dodecylphenyl ethers, polyoxyethylene oleyl ethers, polyoxyethylene lauryl ethers, polyoxyethylene alkyl ethers, and polyoxyallylkylalkyl ethers, ester surfactants such as polyoxyethylene oleic acid, polyoxyethylene oleic acid esters, polyoxyethylene distearic acid esters, sorbitan laurate, sorbitan monostearate, sorbitan monooleate, sorbitan sesquioleate, polyoxyethylene monooleate, and polyoxyethylene stearate, and acetylene glycol surfactants such as 2,4,7,9-tetramethyl-5-decyne-4,7-diol, 3,6-dimethyl-4-octyne-3,6-diol, and 3,5-dimethyl-1-hexyn-3-ol (Surfynol® 104, 105, 82, 420, 440, and 465, and Olfine® STG manufactured by Nissin Chemical Co., Ltd., for example). Among these, Surfynol® 420, 440, and 465 are preferably used, and Surfynol® 440 is particularly preferably used. It should be noted that superscript "®" refers to registered trademark in the present specification.

Examples of the defoaming agent include highly-oxidated oil compounds, a glycerol fatty acid ester compounds, fluorine compounds, and silicone compounds.

These agents for ink preparation are used alone or as a mixture. It should be noted that the surface tension of the ink composition of the present invention is usually 25 to 70 mN/m and preferably 25 to 60 mN/m and the viscosity of the ink composition of the present invention is adjusted to preferably not higher than 30 mPa·s and more preferably not higher than 20 mPa·s.

In producing the aqueous ink composition of the present invention, the order of dissolving agents such as additives is not particularly limited. The water used in preparation of the ink composition is preferably water that contains little impurity, such as ion-exchanged water or distilled water. After preparation of the ink composition, a membrane filter or the like may be used to perform micro-filtration to remove foreign matter from the ink composition, where appropriate. Micro-filtration is particularly preferable when the ink composition of the present invention is to be used as an ink for ink-jet recording. The pore size of a filter used for micro-filtration is usually 1 to 0.1 μm and is preferably 0.8 to 0.1 μm.

An ink composition containing the compound of the present invention is suitable for use in stamp printing, copying, marking, writing, drawing, stamping, or recording (printing), in particular ink-jet recording. In addition, the ink composition of the present invention is less likely to cause solid precipitation when the area near the recording-head nozzle of the ink-jet printer is dry. Therefore, the recording head is less likely to be blocked as well.

Next, the inkjet-recording method of the present invention will be described. The inkjet-recording method of the present invention is characterized by including performing recording by using the aqueous ink composition of the present invention as an ink for ink-jet printing. The inkjet-recording method of the present invention uses the aqueous ink composition of the present invention to perform recording on an image-receiving material. The ink nozzle and the like used is not particularly limited and can be selected as needed according to the purpose. A known method, for example, a charge control scheme using electrostatic force to discharge an ink, a drop-on-demand scheme (a pressure pulse scheme) using oscillating pressure of a piezo element, an acoustic ink-jet printing scheme of converting an electric signal into an acoustic beam, applying it to an ink, and using radiation pressure to discharge the ink, and a thermal ink-jet printing (bubble jet (registered trademark)) scheme of heating an ink to generate air bubbles and using the pressure generated, can be used. It should be noted that the ink-jet recording scheme includes a scheme of ejecting an ink having a low concentration, sometimes called a photo ink, at a small volume but in a large number, a scheme of using a plurality of inks having substantially the same hue but in different concentrations so as to improve the image quality, and a scheme of using a colorless transparent ink.

The colored material of the present invention is colored by using the aqueous ink composition of the present invention, and is more preferably colored by means of an ink-jet printer using the aqueous ink composition of the present invention. Examples of articles that can be colored include a communication sheet such as paper and a film, a fiber, cloth (cellulose, nylon, and wool, for example), leather, and a color-filter base material. The communication sheet is preferably a surface-treated one and specifically a base material such as paper, synthetic paper, and a film having an ink-receiving layer provided thereonto. The ink-receiving layer is provided, for example, by impregnating or coating the base material with a cationic polymer or by coating the surface of the base material with a white porous inorganic substance such as porous silica, alumina sol, and special ceramic that can absorb a coloring matter in an ink, together with a hydrophilic polymer such as polyvinyl alcohol and polyvinylpyrrolidone. The base material having the ink-receiving layer provided thereonto is usually called paper (film) exclusively for ink-jet printing or glossy paper (film), for example. Examples of typical commercially available products include Pictorico (manufactured by ASAHI GLASS CO., LTD.), Professional Photo Paper, Super Photo Paper, Mat Photo Paper, Glossy Gold, and Platinum Grade (all manufactured by Canon Inc.), Photo Paper (Glossy), Photo Mat Paper, and Photo Paper Crispia (Highly Glossy) (all manufactured by Seiko Epson Corporation), Premium Plus Photo Paper, Premium Glossy Film, Photo Paper, and Advanced Photo Paper (all manufactured by HP Japan Inc.), Photolike QP (manufactured by Konica Corporation), and Kassai Photographic Paper Pro (manufactured by Fujifilm Corporation). It should be noted that plain paper, woodfree paper, and coated paper can also be used as a matter of course.

It is known that a printed image recorded on, among these, a record-receiving material that is coated with a white porous inorganic substance on the surface is particularly susceptible to discoloration or color fading due to ozone gas. The aqueous ink composition of the present invention is excellent in ozone-gas resistance as well and is therefore effective in recording on the record-receiving material.

Recording on a record-receiving material by using the inkjet-recording method of the present invention can be performed, for example, by inserting a vessel containing the ink composition at a predetermined position within an ink-jet printer and performing recording on the record-receiving material by an ordinary method. The inkjet-recording method of the present invention uses the black ink composition of the present invention with a known, publicly-used magenta ink composition, a known, publicly-used cyan ink composition, a known, publicly-used yellow ink composition, and, where appropriate, a known, publicly-used green ink composition, a known, publicly-used blue (or violet) ink composition, and a known, publicly-used red (or orange) ink composition. For use, each of the ink compositions of different colors is injected into a respective vessel, which is inserted at a predetermined position within the ink-jet printer in the same manner as for the vessel containing the aqueous ink composition for ink-jet recording of the present invention. Examples of the ink-jet printer include a piezo printer using mechanical oscillation and a bubble jet (registered trademark) printer using bubbles generated by heat.

The aqueous ink composition of the present invention provide, on a record-receiving material such as plain paper and a communication sheet having an ink-receiving layer, a recorded image that has an ideal black hue that is very vivid and has high print density as well as low chroma. Therefore, the aqueous ink composition of the present invention can also faithfully reproduce a photograph-like full-color image on paper.

In addition, the aqueous ink composition of the present invention is extremely excellent in storage stability without causing solid precipitate, changes in physical properties, or changes in hue after long-term storage, for example. The aqueous ink composition of the present invention is used in ink-jet recording and in writing instruments. When used as an ink for ink-jet printing, in particular, the aqueous ink composition of the present invention is extremely less likely to cause solid precipitation when the ink composition in the area near the nozzle dries, and therefore does not block the injector (recording head). In addition, when used with a continuous-mode ink-jet printer where the ink is recirculated at relatively long intervals or when used intermittently with an on-demand ink-jet printer, the aqueous ink composition of the present invention does not change its physical characteristics.

Besides, a printed image recorded using the aqueous ink composition of the present invention on a communication sheet having an ink-receiving layer is excellent in various fastness such as moisture resistance, water resistance, ozone-gas resistance, resistance to scuffing, and light resistance and particularly in moisture resistance, and is therefore excellent in long-term storage stability of a photograph-like printed image. The aqueous ink composition of the present invention is also excellent in color development properties such as chroma, brightness, and print density on plain paper, color rendering properties, and particularly in sensor detectability and color development properties in the near-infrared region, compared to a conventional ink.

Therefore, the aqueous ink composition of the present invention is extremely useful in applications in various inks for recording, particularly in applications in inks for ink-jet recording.

EXAMPLES

The present invention will be described in detail by examples. The scope of the present invention, however, is not limited by these examples.

In the description, "part(s)" and "%" refer to mass values unless otherwise indicated.

In the following formulae, acidic functional groups such as a sulfo group and a carboxy group are expressed as their free acid forms.

It should be noted that the azo compounds of the present invention synthesized in the following examples have solubility of not lower than 100 g/liter in water.

Example A and Comparative Example A

Example A1

The compound of a formula (3) below as the component (A) and the compound of a formula (a2) below as the component (B) were used. The components were mixed according to the composition ratio shown in Table 111 below, stirred for about 1 hour to dissolve the solid content, and then filtrated through a 0.45-μm membrane filter (trade name, cellulose acetate filter paper, manufactured by Advantec) to give a black ink composition for testing. The compound of the formula (3) is the compound (21) in International Publication No. WO 2006/051850 and the compound of the formula (a2) is the compound (11) in International Publication No. WO 2006/001274, each of which was obtained by carrying out a method described in each document.

(3)

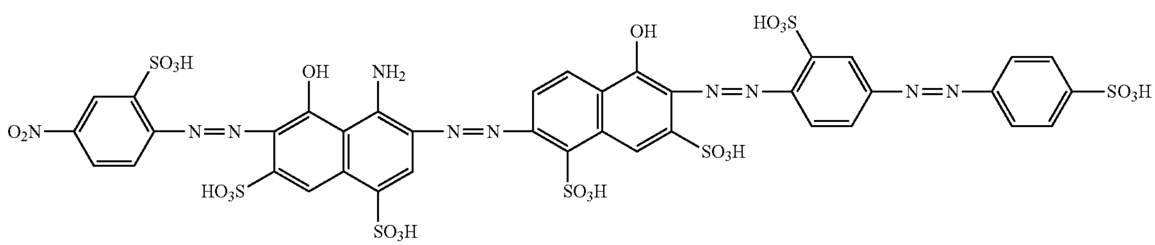

(a2)

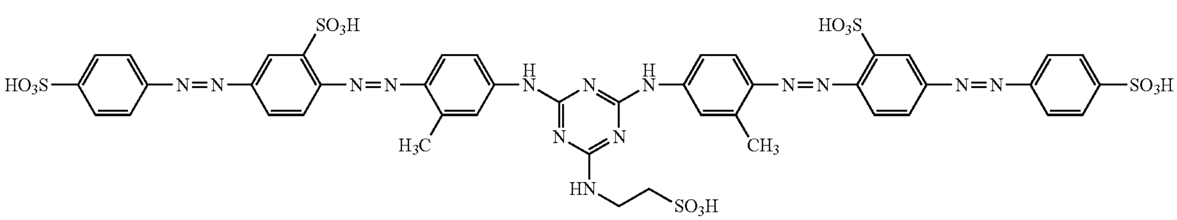

TABLE 111

| | Parts | | | |
|---|---|---|---|---|
| Component | Example A1 | Comparative Example A1 | Comparative Example A2 | Comparative Example A3 |
| Compound (3) | 3.0 | 3.0 | 3.0 | — |
| Compound (4) | — | — | — | 3.0 |
| Compound (a2) | 1.5 | — | — | 1.5 |
| C.I. Acid Yellow 23 | — | — | 1.5 | — |
| Glycerol | 5.0 | 5.0 | 5.0 | 5.0 |
| Urea | 5.0 | 5.0 | 5.0 | 5.0 |
| N-Methyl-2-pyrrolidone | 4.0 | 4.0 | 4.0 | 4.0 |
| Isopropyl alcohol | 3.0 | 3.0 | 3.0 | 3.0 |
| Butyl carbitol | 2.0 | 2.0 | 2.0 | 2.0 |

TABLE 111-continued

| | Parts | | | |
|---|---|---|---|---|
| Component | Example A1 | Comparative Example A1 | Comparative Example A2 | Comparative Example A3 |
| Surfactant | 0.1 | 0.1 | 0.1 | 0.1 |
| Sodium hydroxide + ion-exchanged water | 76.4 | 77.9 | 76.4 | 76.4 |
| Total | 100.0 | 100.0 | 100.0 | 100.0 |

Comparative Example A1

As a black ink composition for comparison, an ink for comparison was prepared in the same manner as in Example A1 except that no coloring matter of the formula (a2) was used and the amount of sodium hydroxide+ion-exchanged water was increased. The following various tests performed on the ink constitute Comparative Example A1.

Comparative Example A2

As a black ink composition for comparison, an ink of a comparative example was prepared in the same manner as in Example A1 except that C. I. Acid Yellow 23 was used instead of the component (B). The following various tests performed on the ink constitute Comparative Example A2. It should be noted that C. I. Acid Yellow 23 used was a commercially available product.

Comparative Example A3

As a black ink composition for comparison, an ink of a comparative example was prepared in the same manner as in Example A1 except that the compound represented by a formula (4) below was used instead of the component (A). The following various tests performed on the ink constitute Comparative Example A3.

(4)

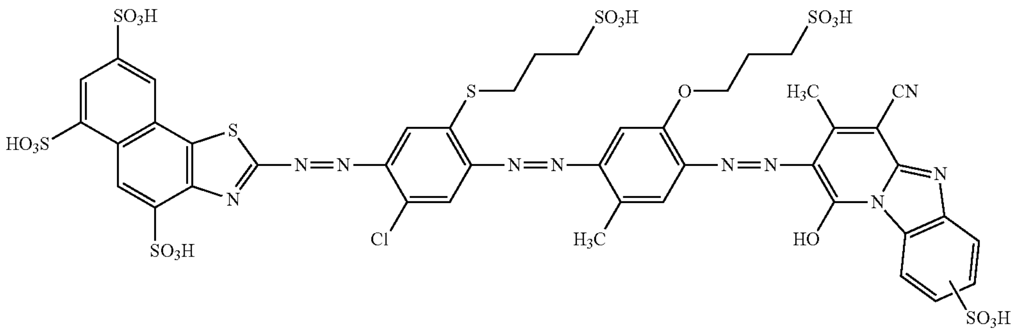

[(B) Ink-Jet Recording]

Using the ink composition obtained in each of Example A1 and Comparative Examples A1 to A3, ink-jet recording was performed on the following printing paper using an ink-jet printer (trade name, EPSON, PX-105).

Glossy paper 1: manufactured by EPSON, trade name Crispia

Upon printing, an image pattern was produced such that the tone of reflecting density could be yielded with the gradations in the 10 steps of 100%, 90%, 80%, 70%, 60%, 50%, 40%, 30%, 20%, and 10%, and then a recorded matter with the gradations from deep black to light black was obtained for use as a test piece for hue evaluation, followed by evaluation tests performed as described below. Then, a lattice image pattern with reflecting density of 100% and 0% was produced, and then a recorded matter with a black-and-white lattice was obtained for use as a test piece for moisture resistance evaluation, followed by evaluation tests performed as described below. Each printing was performed on a gray scale, and therefore recording liquids other than a black recording liquid, in other words, yellow, cyan, and magenta recording liquids, were not concurrently used.

[(C) Evaluation]

The recorded image obtained by using the aqueous ink composition of the present invention was tested for changes in recorded-image density with a colorimeter (trade name: SpectroEye, manufactured by GRETAG-MACBETH). Colorimetry was carried out under the conditions of D65 light source, DIN NB density standard, and 2° observer angle.

[Evaluation of Color Development Properties]

After printing, the recorded image obtained by using the ink of each of Example A and Comparative Examples A1 to A3 was air dried for 24 hours, and was then subjected to colorimetry with the colorimeter to obtain a Dk value at 100%, followed by evaluation according to the following criteria. Evaluation indicates that a test piece having a reading of a great numerical value has great color development properties and is excellent.

The results are shown in Table 112 below.

TABLE 112

| | Example A1 | Comparative Example A1 | Comparative Example A2 | Comparative Example A3 |
|---|---|---|---|---|
| Glossy paper 1 | 2.5 | 2.4 | 2.4 | 2.0 |

[Evaluation of Moisture Resistance]

After printing, the recorded image obtained by using the ink of each of Example A1 and Comparative Examples A1 to A3 was air dried for 24 hours. Then, the test pieces were placed and left in Humidic Chamber IG400 manufactured by Yamato Scientific Co., Ltd. under the conditions at 30° C. and 90% RH for 168 hours. After the completion of the test, visual observation of the test piece was carried out for evaluation performed according to the following criteria. Evaluation indicates that a test piece having little bleeding has great moisture resistance and is excellent.

The results are shown in Table 113 below.

TABLE 113

| | Example A1 | Comparative Example A1 | Comparative Example A2 | Comparative Example A3 |
|---|---|---|---|---|
| Glossy paper 1 | Good | Fair | Poor | Fair |

Good: no bleeding observed

Fair: slight bleeding observed around the colored lattice

Poor: obvious bleeding observed

The results in Tables 112 and 113 showed that Example A1 was superior in color development properties and moisture resistance to Comparative Examples A1 to A3.

Example B and Comparative Example B

Example B1

The compound of a formula (3) below as (A) and the compound of a formula (b4) below as (B) were used. The components were mixed according to the composition ratio shown in Table 114 below, stirred for about 1 hour to dissolve the solid content, and then filtrated through a 0.45-μm membrane filter (trade name, cellulose acetate filter paper, manufactured by Advantec) to give a black ink composition for testing. The compound of the formula (3) is the compound (21) in International Publication No. WO 2006/051850 and the compound of the formula (b4) is the compound (31) in International Publication No. WO 2011/043184, each of which was obtained by carrying out a method described in each document.

(3)

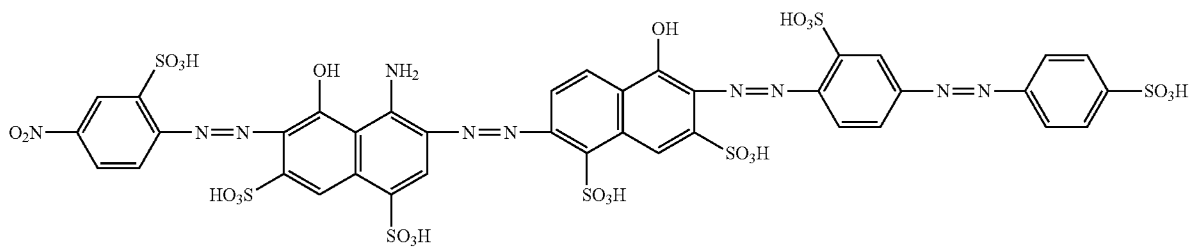

(b4)

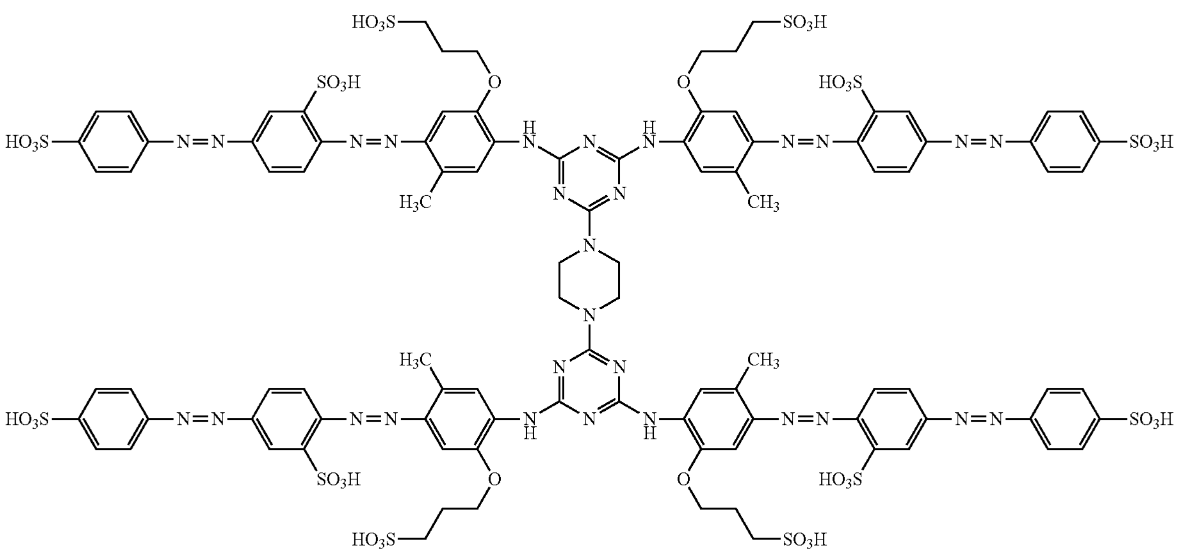

TABLE 114

| | Parts | | | |
|---|---|---|---|---|
| Component | Example B1 | Comparative Example B1 | Comparative Example B2 | Comparative Example B3 |
| Compound (3) | 3.0 | 3.0 | 3.0 | — |
| Compound (b5) | — | — | — | 3.0 |
| Compound (b4) | 1.5 | — | — | 1.5 |
| C.I. Acid yellow 23 | — | — | 1.5 | — |
| Glycerol | 5.0 | 5.0 | 5.0 | 5.0 |
| Urea | 5.0 | 5.0 | 5.0 | 5.0 |
| N-Methyl-2-pyrrolidone | 4.0 | 4.0 | 4.0 | 4.0 |
| Isopropyl alcohol | 3.0 | 3.0 | 3.0 | 3.0 |
| Butyl carbitol | 2.0 | 2.0 | 2.0 | 2.0 |
| Surfactant | 0.1 | 0.1 | 0.1 | 0.1 |
| Sodium hydroxide + ion-exchanged water | 76.4 | 77.9 | 76.4 | 76.4 |
| Total | 100.0 | 100.0 | 100.0 | 100.0 |

Comparative Example B1

As a black ink composition for comparison, an ink for comparison was prepared in the same manner as in Example B1 except that no coloring matter of the formula (b4) was used and the amount of sodium hydroxide+ion-exchanged water was increased. The following various tests performed on the ink constitute Comparative Example B1.

Comparative Example B2

As a black ink composition for comparison, an ink of a comparative example was prepared in the same manner as in Example B1 except that C. I. Acid Yellow 23 was used instead of the component (B). The following various tests performed on the ink constitute Comparative Example B2. It should be noted that C. I. Acid Yellow 23 used was a commercially available product.

Comparative Example B3

As a black ink composition for comparison, an ink of a comparative example was prepared in the same manner as in Example B1 except that the compound represented by a formula (5) below was used instead of the component (A). The following various tests performed on the ink constitute Comparative Example B3. The compound of the formula (5) is the compound (41) in Japanese Patent Application Publication No. 2009-84346, obtained by carrying out a method described in the document.

(j6)

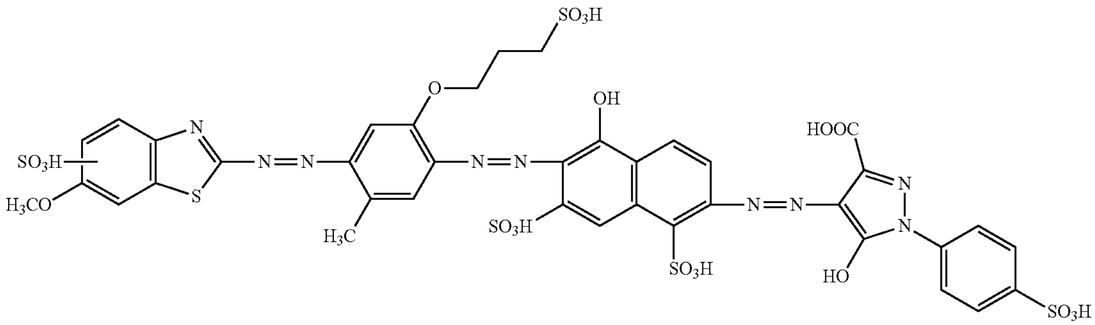

[(B) Ink-Jet Recording]

Using the ink composition obtained in each of Example B1 and Comparative Examples B1 to B3, ink-jet recording was performed on the following printing paper using an ink-jet printer (trade name, EPSON, PX-105).

Glossy paper 1: manufactured by EPSON, trade name Crispia

Upon printing, an image pattern was produced such that the tone of reflecting density could be yielded with the gradations in the 10 steps of 100%, 90%, 80%, 70%, 60%, 50%, 40%, 30%, 20%, and 10%, and then a recorded matter with the gradations from deep black to light black was obtained for use as a test piece for hue evaluation, followed by evaluation tests performed as described below. Then, a lattice image pattern with reflecting density of 100% and 0% was produced, and then a recorded matter with a black-and-white lattice was obtained for use as a test piece for moisture resistance evaluation, followed by evaluation tests performed as described below. Each printing was performed on a gray scale, and therefore recording liquids other than a black recording liquid, in other words, yellow, cyan, and magenta recording liquids, were not concurrently used.

[(C) Evaluation]

The recorded image obtained by using the aqueous ink composition of the present invention was tested for changes in recorded-image density with a colorimeter (trade name: SpectroEye, manufactured by GRETAG-MACBETH). Colorimetry was carried out under the conditions of D65 light source, DIN NB density standard, and 2° observer angle.

[Evaluation of Light Resistance]

After printing, the recorded image obtained by using the ink of each of Example B1 and Comparative Examples B1 to B3 was air dried for 24 hours. Then, the test pieces were placed and left in Xenon Weather Meter XL75 (trade name, manufactured by Suga Test Instruments Co., Ltd.) under the conditions at illuminance of 100 klux, humidity of 60% RH, and a temperature of 24° C. for 168 hours. After the completion of the test, colorimetry was performed with the colorimeter, and then a color difference (ΔE) was determined by $((L^*\text{after test}-L^*\text{before test})^2+(a^*\text{after test}-a^*\text{before test})^2+(b^*\text{after test}-b^*\text{before test})^2)^{1/2}$, followed by evaluation according to the following criteria. Evaluation indicates that a test piece having a reading of a small value has little change in color due to color fading and is excellent.

The results are shown in Table 115 below.

TABLE 115

| | Example B1 | Comparative Example B1 | Comparative Example B3 | Comparative Example B3 |
|---|---|---|---|---|
| Glossy paper 1 | Good | Poor | Poor | Poor |

Good: ΔE ≤ 9
Fair: 9 < ΔE ≤ 11
Poor: 11 < ΔE

[Evaluation of Moisture Resistance]

After printing, the recorded image obtained by using the ink of each of Example B1 and Comparative Examples B1 to B3 was air dried for 24 hours. Then, the test pieces were placed and left in Humidic Chamber IG400 manufactured by Yamato Scientific Co., Ltd. under the conditions at 30° C. and 90% RH for 168 hours. After the completion of the test, visual observation of the test piece was carried out for evaluation performed according to the following criteria. Evaluation indicates that a test piece having little bleeding has great moisture resistance and is excellent.

The results are shown in Table 116 below.

TABLE 116

| | Example B1 | Comparative Example B1 | Comparative Example B3 | Comparative Example B3 |
|---|---|---|---|---|
| Glossy paper 1 | Good | Fair | Poor | Poor |

Good: no bleeding observed
Fair: slight bleeding observed around the colored lattice
Poor: obvious bleeding observed The results in Tables 115 and 116 showed that Example B1 was superior in light resistance and moisture resistance to Comparative Examples B1 to B3.

Example C and Comparative Example C

Example C1

The compound of a formula (3) below as the component (A) and the compound of a formula (c3) below as the component (B) were used. The components were mixed according to the composition ratio shown in Table 117 below, stirred for about 1 hour to dissolve the solid content, and then filtrated through a 0.45-μm membrane filter (trade name, cellulose acetate filter paper, manufactured by Advantec) to give a black ink composition for testing. The compound of the formula (3) is the compound (21) in International Publication No. WO 2006/051850 and the compound of the formula (c3) is the compound (5) in International Publication No. WO 2011/122426, each of which was obtained by carrying out a method described in each document.

(3)

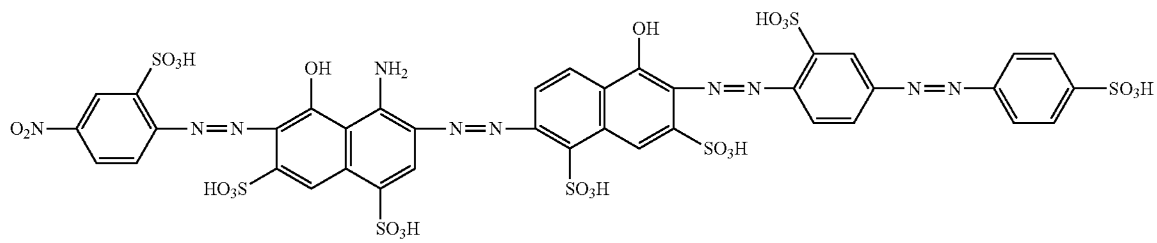

(c3)

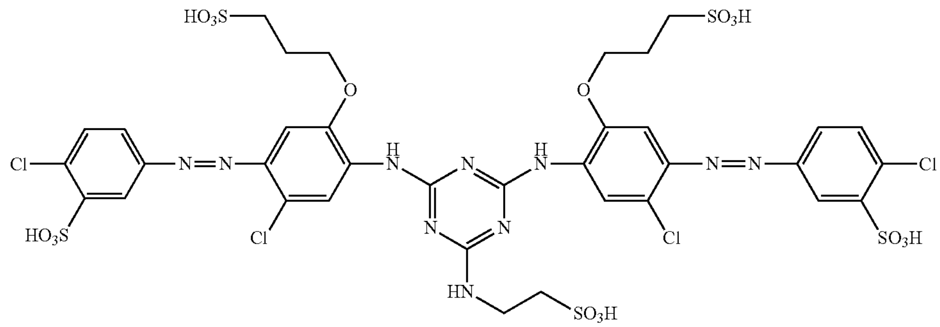

TABLE 117

| | Parts | | |
|---|---|---|---|
| Component | Example C1 | Comparative Example C1 | Comparative Example C2 |
| Compound (3) | 3.0 | 3.0 | 3.0 |
| Compound (c3) | 1.5 | — | — |
| C.I. Acid Yellow 23 | — | — | 1.5 |
| Glycerol | 5.0 | 5.0 | 5.0 |
| Urea | 5.0 | 5.0 | 5.0 |
| N-Methyl-2-pyrrolidone | 4.0 | 4.0 | 4.0 |
| Isopropyl alcohol | 3.0 | 3.0 | 3.0 |
| Butyl carbitol | 2.0 | 2.0 | 2.0 |
| Surfactant | 0.1 | 0.1 | 0.1 |
| Sodium hydroxide + ion-exchanged water | 76.4 | 77.9 | 76.4 |
| Total | 100.0 | 100.0 | 100.0 |

Comparative Example C1

As a black ink composition for comparison, an ink for comparison was prepared in the same manner as in Example C1 except that no coloring matter of the formula (c3) was used and the amount of sodium hydroxide+ion-exchanged water was increased. The following various tests performed on the ink constitute Comparative Example C1.

Comparative Example C2

As a black ink composition for comparison, an ink of a comparative example was prepared in the same manner as in Example C1 except that C. I. Acid Yellow 23 was used instead of (B). The following various tests performed on the ink constitute Comparative Example C2. It should be noted that C. I. Acid Yellow 23 used was a commercially available product.

[(B) Ink-Jet Recording]

Using the ink composition obtained in each of Example C1 and Comparative Examples C1 and C2, ink-jet recording was performed on the following printing paper using an ink-jet printer (trade name, EPSON, PX-105).

Glossy paper 1: manufactured by EPSON, trade name Crispia

Upon printing, an image pattern was produced such that the tone of reflecting density could be yielded with the gradations in the 10 steps of 100%, 90%, 80%, 70%, 60%, 50%, 40%, 30%, 20%, and 10%, and then a recorded matter with the gradations from deep black to light black was obtained for use as a test piece for hue evaluation, followed by evaluation tests performed as described below. Then, a lattice image pattern with reflecting density of 100% and 0% was produced, and then a recorded matter with a black-and-white lattice was obtained for use as a test piece for moisture resistance evaluation, followed by evaluation tests performed as described below. Each printing was performed on a gray scale, and therefore recording liquids other than a black recording liquid, in other words, yellow, cyan, and magenta recording liquids, were not concurrently used.

[(C) Evaluation]

The recorded image obtained by using the aqueous ink composition of the present invention was tested for changes in recorded-image density with a colorimeter (trade name: SpectroEye, manufactured by GRETAG-MACBETH). Colorimetry was carried out under the conditions of D65 light source, DIN NB density standard, and 2° observer angle.

[Evaluation of Ozone-Gas Resistance]

After printing, the recorded image obtained by using the ink of each of Example C1 and Comparative Examples C1 and C2 was air dried for 24 hours. Then, the test pieces were placed and left in Ozone Weather Meter (trade name, manufactured by Suga Test Instruments Co., Ltd.) under the conditions at an ozone concentration of 10 ppm, humidity of 50% RH, and a temperature of 23° C. for 24 hours.

After the completion of the test, colorimetry was performed with the colorimeter, and then a color difference (ΔE) was determined by $((L^*\text{after test}-L^*\text{before test})^2+(a^*\text{after test}-a^*\text{before test})^2+(b^*\text{after test}-b^*\text{before test})^2)^{1/2}$, followed by evaluation according to the following criteria. Evaluation indicates that a test piece having a reading of a small value has little change in color due to color fading and is excellent.

The results are shown in Table 118 below.

TABLE 118

| | Example C1 | Comparative Example C1 | Comparative Example C2 |
|---|---|---|---|
| Glossy paper 1 | Good | Poor | Good |

Good: ΔE ≤ 9
Fair: 9 < ΔE ≤ 11
Poor: 11 < ΔE

Example D and Comparative Example D

Example D1

The compound of a formula (3) below as the component (A) and the compound of the formula (d1) as the component (B) were used. The components were mixed according to the composition ratio shown in Table 120 below, stirred for about 1 hour to dissolve the solid content, and then filtrated through a 0.45-μm membrane filter (trade name, cellulose acetate filter paper, manufactured by Advantec) to give a black ink composition for testing. The compound of the formula (3) is the compound (21) in International Publication No. WO 2006/051850 and the compound of the formula (d1) is the compound (12) in International Publication No. WO 2005/033211, each of which was obtained by carrying out a method described in each document.

(3)

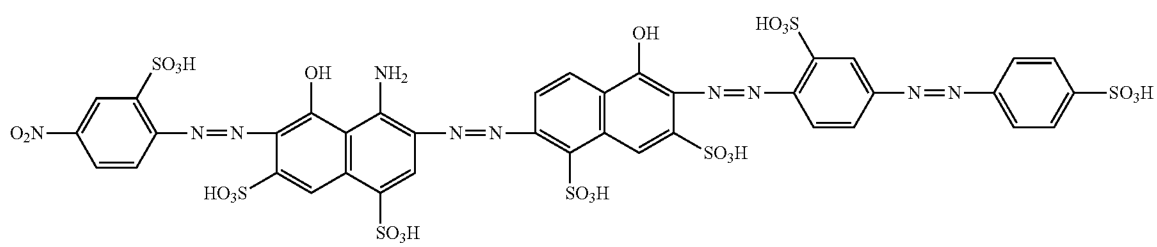

[Evaluation of Moisture Resistance]

After printing, the recorded image obtained by using the ink of each of Example C1 and Comparative Examples C1 and C2 was air dried for 24 hours. Then, the test pieces were placed and left in Humidic Chamber IG400 manufactured by Yamato Scientific Co., Ltd. under the conditions at 30° C. and 90% RH for 168 hours. After the completion of the test, visual observation of the test piece was carried out for evaluation performed according to the following criteria. Evaluation indicates that a test piece having little bleeding has great moisture resistance and is excellent.

The results are shown in Table 119 below.

TABLE 119

| | Example C1 | Comparative Example C1 | Comparative Example C2 |
|---|---|---|---|
| Glossy paper 1 | Good | Fair | Poor |

Good: no bleeding observed
Fair: slight bleeding observed around the colored lattice
Poor: obvious bleeding observed The results in Tables 118 and 119 showed that Example C1 was excellent in both ozone-gas resistance and moisture resistance. On the other hand, Comparative Example C1 was inferior to Example C1 in both evaluations. Comparative Example C2 was excellent in ozone-gas resistance, while it was poor in moisture resistance. These results showed the superiority of Example C1 that was excellent in both ozone-gas resistance and moisture resistance.

TABLE 120

| | Parts | | |
|---|---|---|---|
| Component | Example D1 | Comparative Example D1 | Comparative Example D2 |
| Compound (3) | 3.0 | 3.0 | 3.0 |
| Compound (d1) | 1.5 | — | — |
| C.I. Acid Yellow 23 | — | — | 1.5 |
| Glycerol | 5.0 | 5.0 | 5.0 |
| Urea | 5.0 | 5.0 | 5.0 |
| N-Methyl-2-pyrrolidone | 4.0 | 4.0 | 4.0 |
| Isopropyl alcohol | 3.0 | 3.0 | 3.0 |
| Butyl carbitol | 2.0 | 2.0 | 2.0 |
| Surfactant | 0.1 | 0.1 | 0.1 |
| Sodium hydroxide + ion-exchanged water | 76.4 | 77.9 | 76.4 |
| Total | 100.0 | 100.0 | 100.0 |

Comparative Example D1

As a black ink composition for comparison, an ink for comparison was prepared in the same manner as in Example D1 except that no coloring matter of the formula (2) was used and the amount of sodium hydroxide+ion-exchanged water was increased. The following various tests performed on the ink constitute Comparative Example D1.

Comparative Example D2

As a black ink composition for comparison, an ink of a comparative example was prepared in the same manner as in Example D1 except that C. I. Acid Yellow 23 was used instead of the component (B). The following various tests performed on the ink constitute Comparative Example D2. It should be noted that C. I. Acid Yellow 23 used was a commercially available product.

[(B) Ink-Jet Recording]

Using the ink composition obtained in each of Example D1 and Comparative Examples D1 and D2, ink-jet recording was performed on the following printing paper using an ink-jet printer (trade name, EPSON, PX-105).

Glossy paper 1: manufactured by Canon, trade name GL-101 Glossy Gold

Upon printing, an image pattern was produced such that the tone of reflecting density could be yielded with the gradations in the 10 steps of 100%, 90%, 80%, 70%, 60%, 50%, 40%, 30%, 20%, and 10%, and then a recorded matter with the gradations from deep black to light black was obtained for use as a test piece for hue evaluation, followed by evaluation tests performed as described below. Then, a lattice image pattern with reflecting density of 100% and 0% was produced, and then a recorded matter with a black-and-white lattice was obtained for use as a test piece for moisture resistance evaluation, followed by evaluation tests performed as described below. Each printing was performed on a gray scale, and therefore recording liquids other than a black recording liquid, in other words, yellow, cyan, and magenta recording liquids, were not concurrently used.

[(C) Evaluation]

The recorded image obtained by using the aqueous ink composition of the present invention was tested for changes in recorded-image density with a colorimeter (trade name: SpectroEye, manufactured by GRETAG-MACBETH). Colorimetry was carried out under the conditions of D65 light source, DIN NB density standard, and 2° observer angle.

[Evaluation of Ozone Resistance]

After printing, the recorded image obtained by using the ink of each of Example D1 and Comparative Examples D1 and D2 was air dried for 24 hours. Then, the test pieces were placed and left in Ozone Weather Meter (trade name, manufactured by Suga Test Instruments Co., Ltd.) under the conditions at an ozone concentration of 10 ppm, humidity of 50% RH, and a temperature of 23° C. for 24 hours.

After the completion of the test, colorimetry was performed with the colorimeter, and then a color difference (ΔE) was determined by $((L^*\text{after test}-L^*\text{before test})^2+(a^*\text{after test}-a^*\text{before test})^2+(b^*\text{after test}-b^*\text{before test})^2)^{1/2}$, followed by evaluation according to the following criteria. Evaluation indicates that a test piece having a reading of a small value has little change in color due to color fading and is excellent.

The results are shown in Table 121 below.

TABLE 121

| | Example D1 | Comparative Example D1 | Comparative Example D2 |
|---|---|---|---|
| Glossy paper 1 | Good | Poor | Good |

Good: ΔE ≤ 10
Fair: 10 < ΔE ≤ 11
Poor: 11 < ΔE

[Evaluation of Moisture Resistance]

After printing, the recorded image obtained by using the ink of each of Example D1 and Comparative Examples D1 and D2 was air dried for 24 hours. Then, the test pieces were placed and left in Humidic Chamber IG400 manufactured by Yamato Scientific Co., Ltd. under the conditions at 30° C. and 90% RH for 168 hours. After the completion of the test, visual observation of the test piece was carried out for evaluation performed according to the following criteria. Evaluation indicates that a test piece having little bleeding has great moisture resistance and is excellent.

The results are shown in Table 122 below.

TABLE 122

| | Example D1 | Comparative Example D1 | Comparative Example D2 |
|---|---|---|---|
| Glossy paper 1 | Good | Fair | Poor |

Good: no bleeding observed
Fair: slight bleeding observed around the colored lattice
Poor: obvious bleeding observed The results in Tables 121 and 122 showed that Example D1 was excellent in both ozone-gas resistance and moisture resistance. On the other hand, Comparative Example D1 was inferior to Example D1 in both evaluations. Comparative Example D2 was excellent in ozone-gas resistance, while it was poor in moisture resistance. These results showed the superiority of Example D1 that was excellent in both ozone-gas resistance and moisture resistance.

Example E and Comparative Example E

Example E1

The compound of a formula (3) below as the component (A) and the compound of a formula (e2) below as the component (B) were used. The components were mixed according to the composition ratio shown in Table 123 below, stirred for about 1 hour to dissolve the solid content, and then filtrated through a 0.45-μm membrane filter (trade name, cellulose acetate filter paper, manufactured by Advantec) to give a black ink composition for testing. The compound of the formula (3) is the compound (21) in International Publication No. WO 2006/051850 and the compound of the formula (e2) is the compound (4) in Japanese Patent Application Publication No. 2003-321627, each of which was obtained by carrying out a method described in each document.

(3)

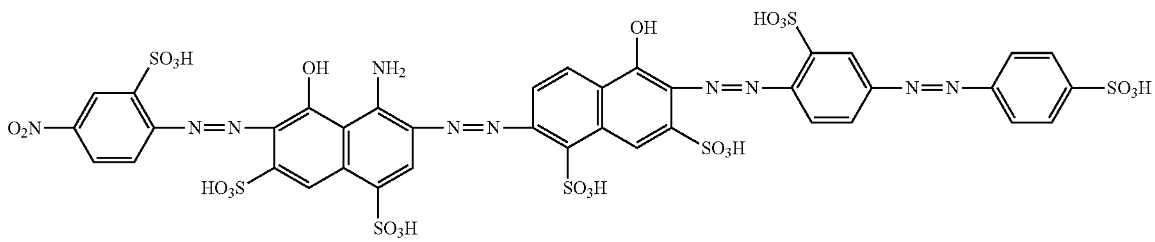

(e2)

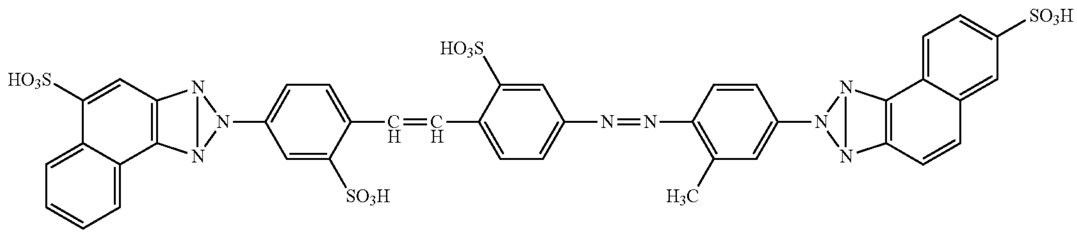

TABLE 123

| | Parts | | |
|---|---|---|---|
| Component | Example E1 | Comparative Example E1 | Comparataive Example E2 |
| Compound (3) | 3.0 | 3.0 | 3.0 |
| Compound (e2) | 1.5 | — | — |
| C.I. Acid Yellow 23 | — | — | 1.5 |
| Glycerol | 5.0 | 5.0 | 5.0 |
| Urea | 5.0 | 5.0 | 5.0 |
| N-Methyl-2-pyrrolidone | 4.0 | 4.0 | 4.0 |
| Isopropyl alcohol | 3.0 | 3.0 | 3.0 |
| Butyl carbitol | 2.0 | 2.0 | 2.0 |
| Surfactant | 0.1 | 0.1 | 0.1 |
| Sodium hydroxide + ion-exchanged water | 76.4 | 77.9 | 76.4 |
| Total | 100.0 | 100.0 | 100.0 |

Comparative Example E1

As a black ink composition for comparison, an ink for comparison was prepared in the same manner as in Example E1 except that no coloring matter of the formula (e2) was used and the amount of sodium hydroxide+ion-exchanged water was increased. The following various tests performed on the ink constitute Comparative Example E1.

Comparative Example E2

As a black ink composition for comparison, an ink of a comparative example was prepared in the same manner as in Example E1 except that C. I. Acid Yellow 23 was used instead of the component (B). The following various tests performed on the ink constitute Comparative Example E2. It should be noted that C. I. Acid Yellow 23 used was a commercially available product.

[(B) Ink-Jet Recording]

Using the ink composition obtained in each of Example E1 and Comparative Examples E1 and E2, ink-jet recording was performed on the following printing paper using an ink-jet printer (trade name, EPSON, PX-105).

Glossy paper 1: manufactured by Canon, trade name GL-101 Glossy Gold

Upon printing, an image pattern was produced such that the tone of reflecting density could be yielded with the gradations in the 10 steps of 100%, 90%, 80%, 70%, 60%, 50%, 40%, 30%, 20%, and 10%, and then a recorded matter with the gradations from deep black to light black was obtained for use as a test piece for hue evaluation, followed by evaluation tests performed as described below. Then, a lattice image pattern with reflecting density of 100% and 0% was produced, and then a recorded matter with a black-and-white lattice was obtained for use as a test piece for moisture resistance evaluation, followed by evaluation tests performed as described below. Each printing was performed on a gray scale, and therefore recording liquids other than a black recording liquid, in other words, yellow, cyan, and magenta recording liquids, were not concurrently used.

[(C) Evaluation]

The recorded image obtained by using the aqueous ink composition of the present invention was tested for changes in recorded-image density with a colorimeter (trade name: SpectroEye, manufactured by GRETAG-MACBETH). Colorimetry was carried out under the conditions of D65 light source, DIN NB density standard, and 2° observer angle.

[Evaluation of Ozone Resistance]

After printing, the recorded image obtained by using the ink of each of Example E1 and Comparative Examples E1 and E2 was air dried for 24 hours. Then, the test pieces were placed and left in Ozone Weather Meter (trade name, manufactured by Suga Test Instruments Co., Ltd.) under the conditions at an ozone concentration of 10 ppm, humidity of 50% RH, and a temperature of 23° C. for 24 hours.

After the completion of the test, colorimetry was performed with the colorimeter, and then a color difference (ΔE) was determined by $((L^*\text{after test}-L^*\text{before test})^2+(a^*\text{after test}-a^*\text{before test})^2+(b^*\text{after test}-b^*\text{before test})^2)^{1/2}$, followed by evaluation according to the following criteria. Evaluation indicates that a test piece having a reading of a small value has little change in color due to color fading and is excellent.

The results are shown in Table 124 below.

TABLE 124

| | Example E1 | Comparative Example E1 | Comparative Example E2 |
|---|---|---|---|
| Glossy paper 1 | Good | Poor | Fair |

Good: ΔE ≤ 9
Fair: 9 < ΔE ≤ 11
Poor: 11 < ΔE

[Evaluation of Moisture Resistance]

After printing, the recorded image obtained by using the ink of each of Example E1 and Comparative Examples E1 and E2 was air dried for 24 hours. Then, the test pieces were placed and left in Humidic Chamber IG400 manufactured by Example F and Comparative Example F Example F1

The compound of a formula (3) below as the component (A) and the compound of a formula (f3) below as the component (B) were used. The components were mixed according to the composition ratio shown in Table 126 below, stirred for about 1 hour to dissolve the solid content, and then filtrated through a 0.45-μm membrane filter (trade name, cellulose acetate filter paper, manufactured by Advantec) to give a black ink composition for testing. The compound of the formula (3) is the compound (21) in International Publication No. WO 2006/051850 publication, obtained by carrying out a method described in the document. The compound of the formula (f3) was obtained by synthesis according to a method described in Japanese Patent Application Publication No. H09-217018.

(3)

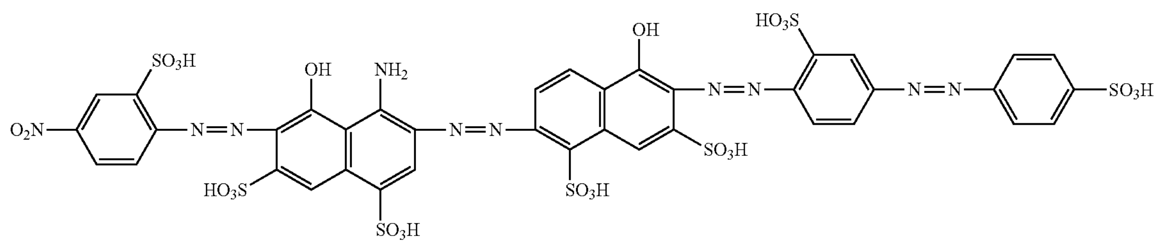

(f3)

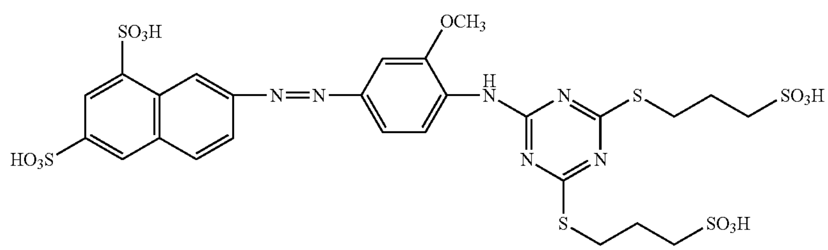

Yamato Scientific Co., Ltd. under the conditions at 30° C. and 90% RH for 168 hours. After the completion of the test, visual observation of the test piece was carried out for evaluation performed according to the following criteria. Evaluation indicates that a test piece having little bleeding has great moisture resistance and is excellent.

The results are shown in Table 125 below.

TABLE 125

| | Example E1 | Comparative Example E1 | Comparative Example E2 |
|---|---|---|---|
| Glossy paper 1 | Good | Fair | Poor |

Good: no bleeding observed

Fair: slight bleeding observed around the colored lattice

Poor: obvious bleeding observed

The results in Tables 124 and 125 showed that Example E1 was superior to Comparative Examples E1 and E2 in ozone resistance and moisture resistance.

TABLE 126

| | Parts | | | |
|---|---|---|---|---|
| Component | Example F1 | Example F2 | Comparative Example F1 | Comparative Example F2 |
| Compound (3) | 3.5 | 3.5 | 3.5 | 3.5 |
| Compound (f3) | 1.0 | — | — | — |
| Compound (f4) | — | 1.0 | — | — |
| C.I. Acid Yellow 23 | — | — | — | 1.0 |
| Glycerol | 5.0 | 5.0 | 5.0 | 5.0 |
| Urea | 5.0 | 5.0 | 5.0 | 5.0 |
| N-Methyl-2-pyrrolidone | 4.0 | 4.0 | 4.0 | 4.0 |
| Isopropyl alcohol | 3.0 | 3.0 | 3.0 | 3.0 |
| Butyl carbitol | 2.0 | 2.0 | 2.0 | 2.0 |
| Surfactant | 0.1 | 0.1 | 0.1 | 0.1 |
| Sodium hydroxide + ion-exchanged water | 76.4 | 76.4 | 77.4 | 76.4 |
| Total | 100.0 | 100.0 | 100.0 | 100.0 |

Example F2

As a black ink composition for comparison, a black ink composition for testing was prepared in the same manner as in Example F1 except that, as (B), the compound represented by a formula (f4) below was used instead of the compound represented by the formula (f3). The compound of the formula (f4) is the compound (100) in Japanese Patent Application Publication No. H09-217018, obtained by carrying out a method described in the document.

formed as described below. Each printing was performed on a gray scale, and therefore recording liquids other than a black recording liquid, in other words, yellow, cyan, and magenta recording liquids, were not concurrently used.

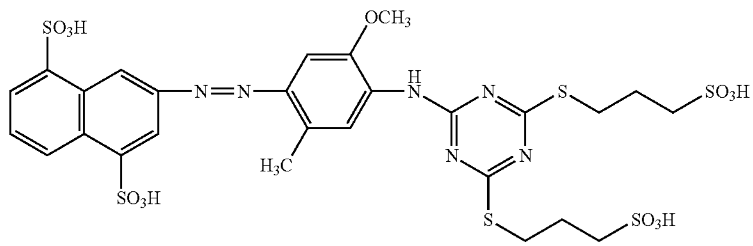

(f4)

Comparative Example F1

As a black ink composition for comparison, an ink for comparison was prepared in the same manner as in Example F1 except that no coloring matter of the formula (f3) was used and the amount of sodium hydroxide+ion-exchanged water was increased. The following various tests performed on the ink constitute Comparative Example F1.

Comparative Example F2

As a black ink composition for comparison, an ink of a comparative example was prepared in the same manner as in Example F1 except that C. I. Acid Yellow 23 was used instead of the component (B). The following various tests performed on the ink constitute Comparative Example F2. It should be noted that C. I. Acid Yellow 23 used was a commercially available product.

[(B) Ink-Jet Recording]

Using the ink composition obtained in each of Examples F1 and F2 and Comparative Examples F1 and F2, ink-jet recording was performed on the following printing paper using an ink-jet printer (trade name, EPSON, PX-105).

Glossy paper 1: manufactured by EPSON, trade name Crispia

Glossy paper 2: manufactured by Brother Industries, Ltd., trade name Photograph Glossy Paper BP71G Upon printing, an image pattern was produced such that the tone of reflecting density could be yielded with the gradations in the 10 steps of 100%, 90%, 80%, 70%, 60%, 50%, 40%, 30%, 20%, and 10%, and then a recorded matter with the gradations from deep black to light black was obtained for use as a test piece for hue evaluation, followed by evaluation tests performed as described below. Then, a lattice image pattern with reflecting density of 100% and 0% was produced, and then a recorded matter with a black-and-white lattice was obtained for use as a test piece for moisture resistance evaluation, followed by evaluation tests performed as described below.

[(C) Evaluation]

The recorded image obtained by using the aqueous ink composition of the present invention was tested for changes in recorded-image density with a colorimeter (trade name: SpectroEye, manufactured by GRETAG-MACBETH). Colorimetry was carried out under the conditions of D65 light source, DIN NB density standard, and 2° observer angle.

[Evaluation of Ozone-Gas Resistance]

After printing, the recorded image obtained by using the ink of each of Examples F1 and F2 and Comparative Examples F1 and F2 was air dried for 24 hours. Then, the test pieces were placed and left in Ozone Weather Meter (trade name, manufactured by Suga Test Instruments Co., Ltd.) under the conditions at an ozone concentration of 10 ppm, humidity of 50% RH, and a temperature of 23° C. for 24 hours.

After the completion of the test, colorimetry was performed with the colorimeter, and then a color difference ($\Delta E$) was determined by $((L^*\text{after test}-L^*\text{before test})^2+(a^*\text{after test}-a^*\text{before test})^2+(b^*\text{after test}-b^*\text{before test})^2)^{1/2}$, followed by evaluation according to the following criteria. Evaluation indicates that a test piece having a reading of a small value has little change in color due to color fading and is excellent. The results are shown in Table 127 below.

TABLE 127

| | Example F1 | Example F2 | Comparative Example F1 | Comparative Example F2 |
|---|---|---|---|---|
| Glossy paper 1 | Good | Good | Poor | Fair |
| Glossy paper 2 | Good | Good | Poor | Good |

Good: $\Delta E \leq 9$
Fair: $9 < \Delta E \leq 10$
Poor: $10 < \Delta E$

[Evaluation of Moisture Resistance]

After printing, the recorded image obtained by using the ink of each of Examples F1 and F2 and Comparative Examples F1 and F2 was air dried for 24 hours. Then, the test pieces were placed and left in Humidic Chamber IG400 manufactured by Yamato Scientific Co., Ltd. under the conditions at 30° C. and 90% RH for 168 hours. After the completion of the test, visual observation of the test piece was carried out for evaluation performed according to the following criteria. Evaluation indicates that a test piece having little bleeding has great moisture resistance and is excellent.

The results are shown in Table 128 below.

TABLE 128

| | Example F1 | Example F2 | Comparative Example F1 | Comparative Example F2 |
|---|---|---|---|---|
| Glossy paper 1 | Good | Good | Good | Poor |
| Glossy paper 2 | Good | Good | Good | Poor |

Good: no bleeding observed
Fair: slight bleeding observed around the colored lattice
Poor: obvious bleeding observed The results in Tables 127 and 128 showed that Examples F1 and F2 were excellent in both ozone-gas resistance and moisture resistance. On the other hand, Comparative Example F1 was excellent in moisture resistance, while it was inferior in ozone resistance to Examples F1 and F2. Comparative Example F2 was excellent in ozone-gas resistance, while it was poor in moisture resistance. These results showed the superiority of Examples F1 and F2 that were excellent in both ozone-gas resistance and moisture resistance.

Example GH and Comparative Example GH

Synthesis Example GH1

To 675.0 parts of water, 115.0 parts of the compound of a formula (q2) below, 98.0 parts of the compound of a formula (q3) below, 61.0 parts of a 48% aqueous sodium hydroxide solution, and 11.0 parts of ethylene glycol were added. The resultant was stirred at 98° C. for 10 hours to complete a condensation reaction. To the resulting reaction mixture, 280.0 parts of water was added, and the fluid temperature was adjusted to 85 to 88° C. Thereto, 12.0 parts of glucose was added, followed by stirring for 2 hours to complete a reduction reaction. Subsequently, hydrochloric acid was used to adjust the pH to pH9.0 to pH9.5, and then sodium chloride was used for salting-out, followed by filtration. The resulting cake as a whole was dissolved in 2000 parts of water, and then 2000.0 parts of methanol was added for crystallization. The resulting crystal was filtrated and separated, and thereby achieving desalting. The resulting crystal was dried to obtain 192.0 parts of a compound represented by a formula (q4). The compound had the maximum absorbance in water at a wavelength (λmax) of 413 nm.

(q2)

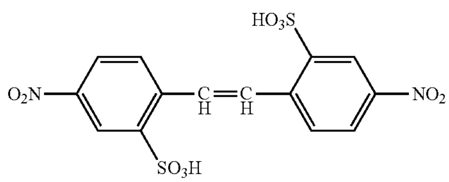

(q3)

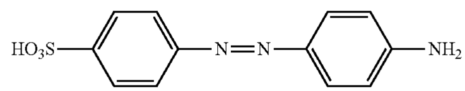

(q4)

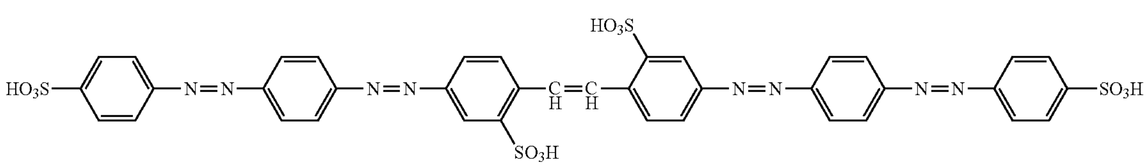

Example G1

The compound of a formula (3) below as the component (A), the compound of a formula (g3) below as the component (B), and the compounds of the formula (q4) and a formula (a2) below as the component (C) were used. The components were mixed according to the composition ratio shown in Table 129 below, stirred for about 1 hour to dissolve the solid content, and then filtrated through a 0.45-μm membrane filter (trade name, cellulose acetate filter paper, manufactured by Advantec) to give a black ink composition for testing. The compound of the formula (3) is the compound (21) in International Publication No. WO 2006/051850 publication, obtained by carrying out a method described in the document. The compound of the formula (g3) is the compound (38) in Japanese Patent Application Publication No. 2004-285351, obtained by carrying out a method described in the document. The compound of the formula (a2) is the compound (11) in International Publication No. WO 2006/001274, obtained by carrying out a method described in the document.

It should be noted that, in Table 129, SF-465 refers to Surfynol® 465 (manufactured by Air Products and Chemicals, Inc.).

(3)

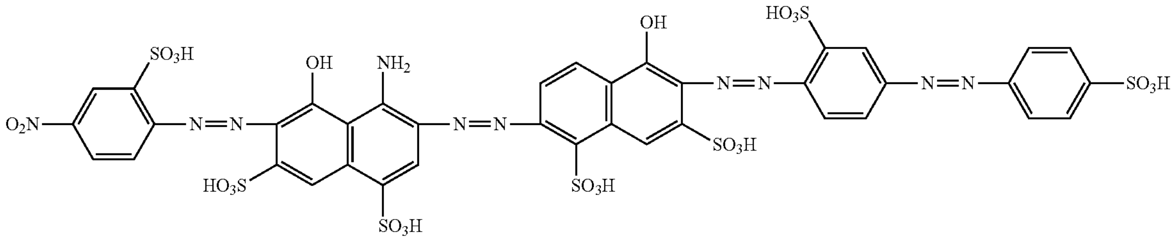

(g3)

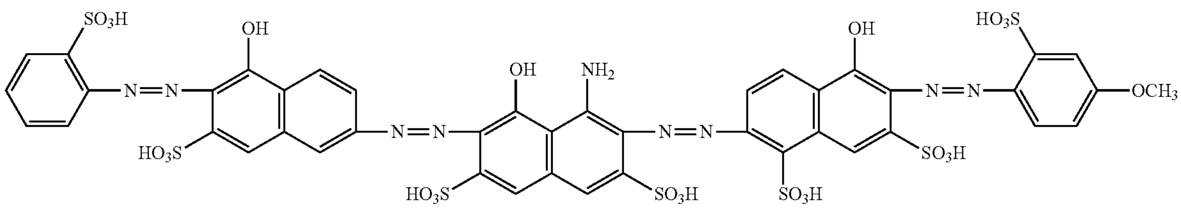

(a2)

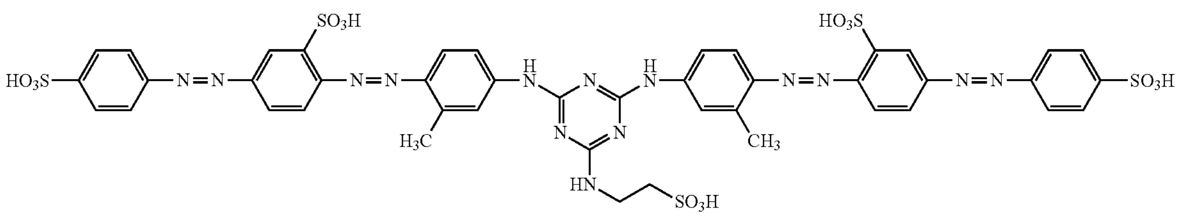

TABLE 129

| | Parts | | | | |
|---|---|---|---|---|---|
| | Example G1 | Example H2 | Comparative Example GH1 | Comparative Example GH2 | Comparative Example GH3 |
| Compound (3) | 2.00 | 2.00 | — | — | 3.50 |
| Compound (g3) | 1.50 | — | 1.50 | — | — |
| Compound (h2) | — | 1.50 | — | 1.50 | — |
| Compound (a2) | 0.75 | 0.75 | 0.75 | 0.75 | 0.75 |
| Compound (q4) | 0.50 | 0.50 | 0.50 | 0.50 | 0.50 |
| C.I. Food Black 2 | — | — | 2.00 | 2.00 | — |
| Glycerol | 10.00 | 10.00 | 10.00 | 10.00 | 10.00 |
| Triethylene glycol | 5.00 | 5.00 | 5.00 | 5.00 | 5.00 |
| 1,5-Pentanediol | 4.33 | 4.33 | 4.33 | 4.33 | 4.33 |
| Propylene glycol | 5.00 | 5.00 | 5.00 | 5.00 | 5.00 |
| Ethylene urea | 2.50 | 2.50 | 2.50 | 2.50 | 2.50 |
| SF-465 | 1.00 | 1.00 | 1.00 | 1.00 | 1.00 |
| 90% Triethanolamine | 0.05 | 0.05 | 0.05 | 0.05 | 0.05 |
| Proxel GXL (S) | 0.05 | 0.05 | 0.05 | 0.05 | 0.05 |
| Sodium hydroxide + ion-exhanged water | 67.32 | 67.32 | 67.32 | 67.32 | 67.32 |

Example H2

A black ink composition for testing was prepared in the same manner as in Example G1 except that, as the component (B), the compound represented by a formula (h2) below was used instead of the compound represented by the formula (g3). The compound of the formula (h2) is the compound (29) in Japanese Patent Application Publication No. 2005-036222, obtained by carrying out a method described in the document.

(h2)

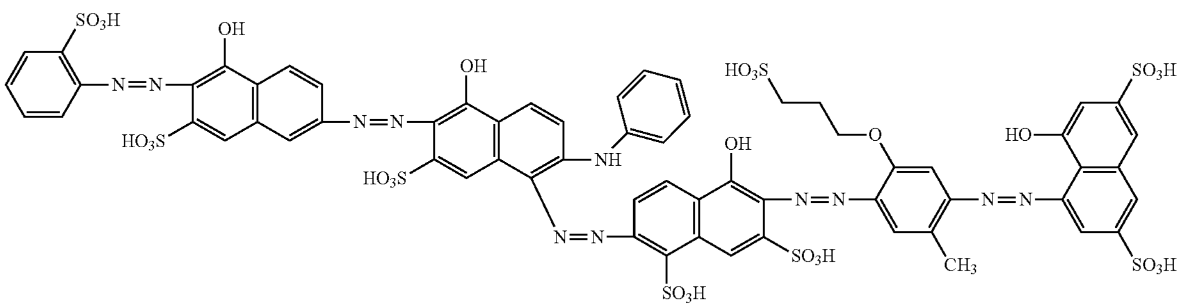

Comparative Example GH1

As a black ink composition for comparison, an ink of a comparative example was prepared in the same manner as in Example G1 except that C. I. Food Black 2 was used instead of the component (A). The following various tests performed on the ink constitute Comparative Example GH1. It should be noted that C. I. Food Black 2 used was a commercially available product.

Comparative Example GH2

As a black ink composition for comparison, an ink of a comparative example was prepared in the same manner as in Example H2 except that C. I. Food Black 2 was used instead of the component (A). The following various tests performed on the ink constitute Comparative Example GH2.

Comparative Example GH3

As a black ink composition for comparison, an ink for comparison was prepared in the same manner as in Example G1 except that no coloring matter of the formula (g3) was used and the amount of the coloring matter of the formula (3) was increased. The following various tests performed on the ink constitute Comparative Example GH3.

[(B) Ink-Jet Recording]

Using the ink composition obtained in each of Examples G1 and H2 and Comparative Examples GH1 to GH3, ink-jet recording was performed on the following printing paper using an ink-jet printer (trade name, EPSON, PX-105).

Glossy paper 1: manufactured by HP (Hewlett-Packard), trade name Advanced Photo Paper (Glossy)

Glossy paper 2: manufactured by Fujifilm Corporation, trade name Kassai Photographic Paper Pro Upon printing, an image pattern was produced such that the tone of reflecting density could be yielded with the gradations in the 10 steps of 100%, 90%, 80%, 70%, 60%, 50%, 40%, 30%, 20%, and 10%, and then a recorded matter with the gradations from deep black to light black was obtained for use as a test piece for hue evaluation, followed by evaluation tests performed as described below. Then, a lattice image pattern with reflecting density of 100% and 0% was produced, and then a recorded matter with a black-and-white lattice was obtained for use as a test piece for moisture resistance evaluation, followed by evaluation tests performed as described below. Each printing was performed on a gray scale, and therefore recording liquids other than a black recording liquid, in other words, yellow, cyan, and magenta recording liquids, were not concurrently used.

[(C) Evaluation]

The recorded image obtained by using the aqueous ink composition of the present invention was tested for changes in recorded-image density with a colorimeter (trade name: SpectroEye, manufactured by GRETAG-MACBETH). Colorimetry was carried out under the conditions of D65 light source, DIN NB density standard, and 2° observer angle.

[Evaluation of Light Resistance]

As for the recorded image obtained by using the ink of Examples G1 and H2 and Comparative Examples GH1 to GH3, the test piece was placed and left in Xenon Weather Meter XL75 (trade name, manufactured by Suga Test Instruments Co., Ltd.) under the conditions at illuminance of 100 klux, humidity of 60% RH, and a temperature of 24° C. for 168 hours.

After the completion of the test, colorimetry was performed with the colorimeter, and then a ratio of the residual coloring matter was determined by (reflecting density Dk after test/reflecting density Dk before test)×100(%), followed by evaluation according to the following criteria. Evaluation indicates that a test piece having a high residual ratio has little color fading due to light and is excellent. The results are shown in Table 130 below.

TABLE 130

| | Example G1 | Example H2 | Comparative Example GH1 | Comparative Example GH2 | Comparative Example GH3 |
|---|---|---|---|---|---|
| Glossy paper 1 | Good | Good | Poor | Poor | Poor |
| Glossy paper 2 | Good | Good | Poor | Poor | Poor |

Good: residual ratio of not lower than 71%
Fair: residual ratio of not lower than 69% and lower than 71%
Poor: residual ratio of lower than 69%

The results in Table 130 showed that Examples G1 and H2 were excellent in light resistance. On the other hand, Comparative Examples GH1 to GH3 were inferior to Examples G1 and H2. These results showed the superiority of Examples 1 and 2 that were excellent in light resistance.

Example I and Comparative Example I

Synthesis Example I1

To 675.0 parts of water, 115.0 parts of the compound of a formula (q2) below, 98.0 parts of the compound of a formula (q3) below, 61.0 parts of a 48% aqueous sodium hydroxide solution, and 11.0 parts of ethylene glycol were added. The resultant was stirred at 98° C. for 10 hours to complete a condensation reaction. To the resulting reaction mixture, 280.0 parts of water was added, and the fluid temperature was adjusted to 85 to 88° C. Thereto, 12.0 parts of glucose was added, followed by stirring for 2 hours to complete a reduction reaction. Subsequently, hydrochloric acid was used to adjust the pH to pH9.0 to pH9.5, and then sodium chloride was used for salting-out, followed by filtration. The resulting cake as a whole was dissolved in 2000 parts of water, and then 2000.0 parts of methanol was added for crystallization. The resulting crystal was filtrated and separated, and thereby achieving desalting. The resulting crystal was dried to obtain 192.0 parts of a compound of the formula (q4). The compound had the maximum absorbance in water at a wavelength (λmax) of 413 nm.

(q2)

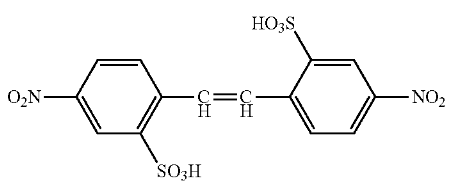

(q3)

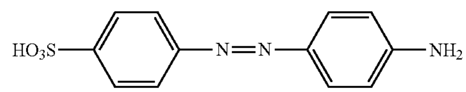

(q4)

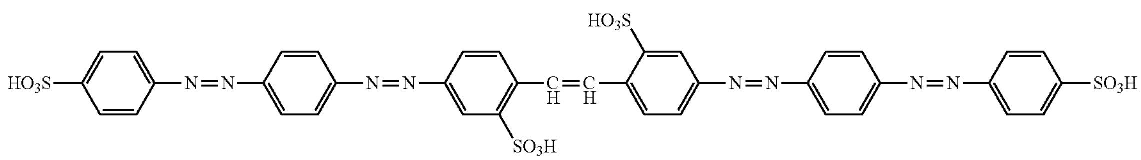

Example I1

The compound of a formula (3) below as the component (A), the compound of a formula (i5) below as the component (B), and the compounds of a formula (a2) below and the formula (q4) as the component (C) were used. The components were mixed according to the composition ratio shown in Table 131 below, stirred for about 1 hour to dissolve the solid content, and then filtrated through a 0.45-μm membrane filter (trade name, cellulose acetate filter paper, manufactured by Advantec) to give a black ink composition for testing. The compound of the formula (3) is the compound (21) in International Publication No. WO 2006/051850 publication, obtained by carrying out a method described in the document. The compound of the formula (i5) is the compound (36) in International Publication No. WO 2007-077931, obtained by carrying out a method described in the document. The compound of the formula (a2) is the compound (11) in International Publication No. WO 2006/001274, obtained by carrying out a method described in the document.

It should be noted that, in Table 131, SF-465 refers to Surfynol® 465 (manufactured by Air Products and Chemicals, Inc.).

(3)

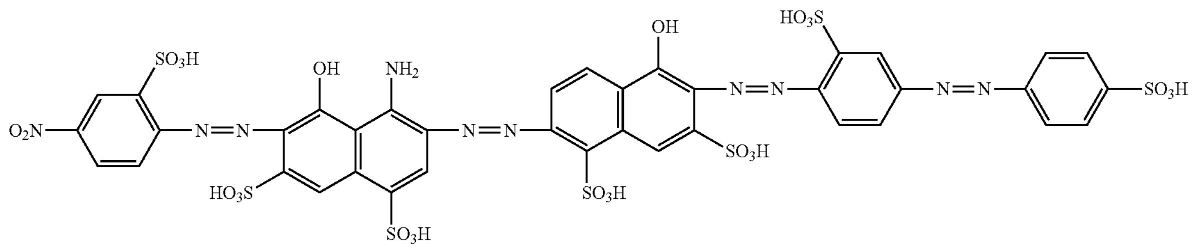

(i5)

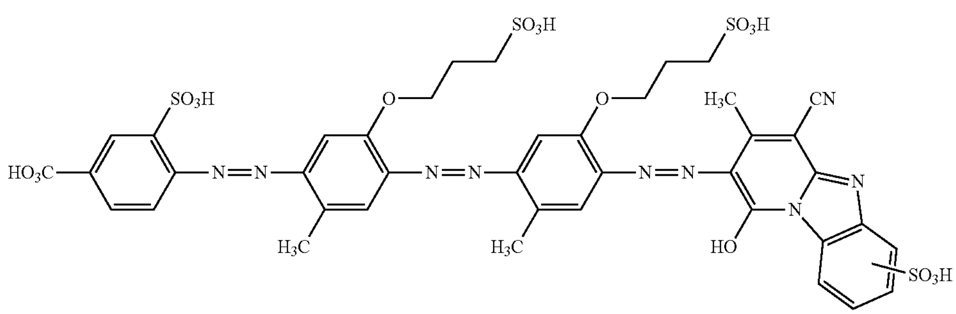

-continued (a2)

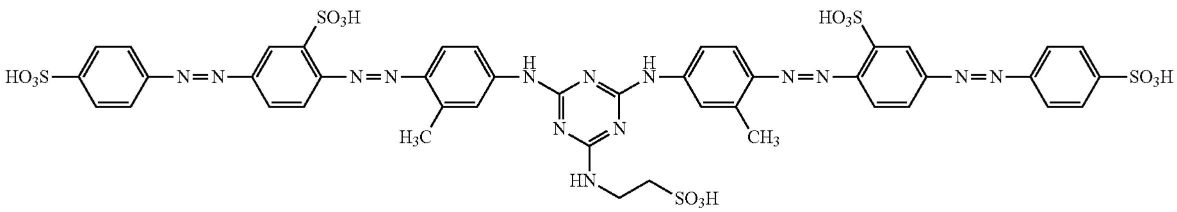

TABLE 131

| | Parts | | |
|---|---|---|---|
| | Example I1 | Comparative Example I1 | Comparative Example I2 |
| Compound (3) | 2.00 | — | 3.50 |
| Compound (i5) | 1.50 | 1.50 | — |
| Compound (a2) | 0.75 | 0.75 | 0.75 |
| Compound (q4) | 0.50 | 0.50 | 0.50 |
| C.I. Food Black 2 | — | 2.00 | — |
| Glycerol | 10.00 | 10.00 | 10.00 |
| Triethylene glycol | 5.00 | 5.00 | 5.00 |
| 1,5-Pentanediol | 4.33 | 4.33 | 4.33 |
| Propylene glycol | 5.00 | 5.00 | 5.00 |
| Ethylene urea | 2.50 | 2.50 | 2.50 |
| SF-465 | 1.00 | 1.00 | 1.00 |
| 90% Triethanolamine | 0.05 | 0.05 | 0.05 |
| Proxel GXL (S) | 0.05 | 0.05 | 0.05 |
| Sodium hydroxide + ion-exhanged water | 67.32 | 67.32 | 67.32 |
| Total | 100.0 | 100.0 | 100.0 |

Comparative Example I1

As a black ink composition for comparison, an ink of a comparative example was prepared in the same manner as in Example I1 except that C. I. Food Black 2 was used instead of the component (A). The following various tests performed on the ink constitute Comparative Example I1. It should be noted that C. I. Food Black 2 used was a commercially available product.

Comparative Example I2

As a black ink composition for comparison, an ink for comparison was prepared in the same manner as in Example I1 except that no coloring matter of the formula (i5) was used and the amount of the coloring matter of the formula (3) was increased. The following various tests performed on the ink constitute Comparative Example I2.

[(B) Ink-Jet Recording]

Using the ink composition obtained in each of Example I1 and Comparative Examples I1 and I2, ink-jet recording was performed on the following printing paper using an ink-jet printer (commercial product, EPSON, PX-105).

Glossy paper 1: manufactured by HP (Hewlett-Packard), trade name Advanced Photo Paper (Glossy)

Glossy paper 2: manufactured by Fujifilm Corporation, trade name Kassai Photographic Paper Pro Glossy paper 3: manufactured by Canon Inc., trade name Photo Paper Glossy Pro [Platinum Grade]

Upon printing, an image pattern was produced such that the tone of reflecting density could be yielded with the gradations in the 10 steps of 100%, 90%, 80%, 70%, 60%, 50%, 40%, 30%, 20%, and 10%, and then a recorded matter with the gradations from deep black to light black was obtained for use as a test piece for hue evaluation, followed by evaluation tests performed as described below. Then, a lattice image pattern with reflecting density of 100% and 0% was produced, and then a recorded matter with a black-and-white lattice was obtained for use as a test piece for moisture resistance evaluation, followed by evaluation tests performed as described below. Each printing was performed on a gray scale, and therefore recording liquids other than a black recording liquid, in other words, yellow, cyan, and magenta recording liquids, were not concurrently used.

[(C) Evaluation]

The recorded image obtained by using the aqueous ink composition of the present invention was tested for changes in recorded-image density with a colorimeter (trade name: SpectroEye, manufactured by GRETAG-MACBETH). Colorimetry was carried out under the conditions of D65 light source, DIN NB density standard, and 2° observer angle.

[Evaluation of Ozone Resistance]

After printing, the recorded image obtained by using the ink of each of Example I1 and Comparative Examples I1 and I2 was air dried for 24 hours. Then, the test pieces were placed and left in Ozone Weather Meter (trade name, manufactured by Suga Test Instruments Co., Ltd.) under the conditions at an ozone concentration of 40 ppm, humidity of 60% RH, and a temperature of 24° C. for 24 hours.

After the completion of the test, colorimetry was performed with the colorimeter, and then a ratio of the residual coloring matter was determined by (reflecting density Dk after test/reflecting density Dk before test)×100(%), followed by evaluation according to the following criteria. Evaluation indicates that a test piece having a high residual ratio has little color fading due to ozone and is excellent. The results are shown in Table 132 below.

TABLE 132

| | Example I1 | Example I2 | Comparative Example I1 |
|---|---|---|---|
| Glossy paper 1 | Good | Poor | Poor |
| Glossy paper 2 | Good | Poor | Poor |
| Glossy paper 3 | Good | Poor | Poor |

Good: residual ratio of not lower than 77%
Fair: residual ratio of not lower than 74% and lower than 77%
Poor: residual ratio of lower than 73%

The results in Table 132 showed that Example I1 was excellent in ozone resistance. On the other hand, both of Comparative Examples I1 and I2 were inferior to Example I1. These results showed the superiority of Example I1 that was excellent in ozone resistance.

Example J and Comparative Example J

Example J1

The compound of a formula (3) below as the component (A), the compound of a formula (j6) below as the component (B), and the compound of a formula (b4) below as the component (C) were used. The components were mixed according to the composition ratio shown in Table 133 below, stirred for about 1 hour to dissolve the solid content, and then filtrated through a 0.45-μm membrane filter (trade name, cellulose acetate filter paper, manufactured by Advantec) to give a black ink composition for testing. The compound of the formula (3) is the compound (21) in International Publication No. WO 2006/051850 publication, obtained by carrying out a method described in the document. The compound of the formula (j6) is the compound (22) in Japanese Patent Application Publication No. 2009-084346, obtained by carrying out a method described in the document. The compound of the formula (b4) is the compound (31) in International Publication No. WO 2012/002317, obtained by carrying out a method described in the document.

It should be noted that, in Table 133, SF-465 refers to Surfynol® 465 (manufactured by Air Products and Chemicals, Inc.).

(3)

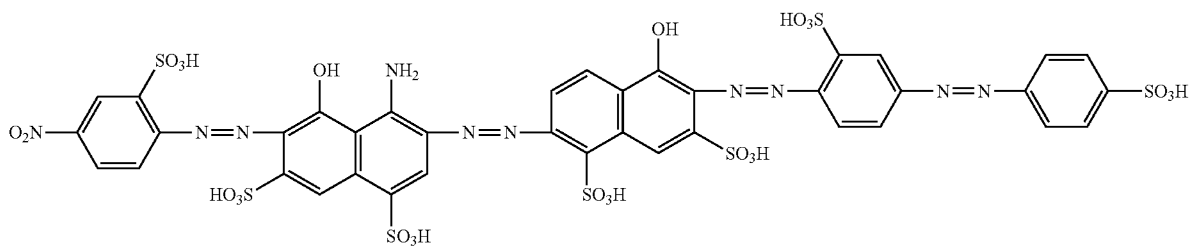

(j6)

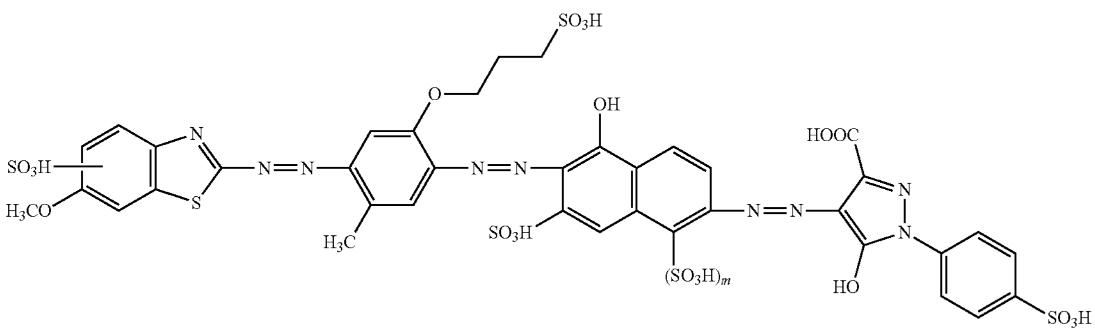

(b4)

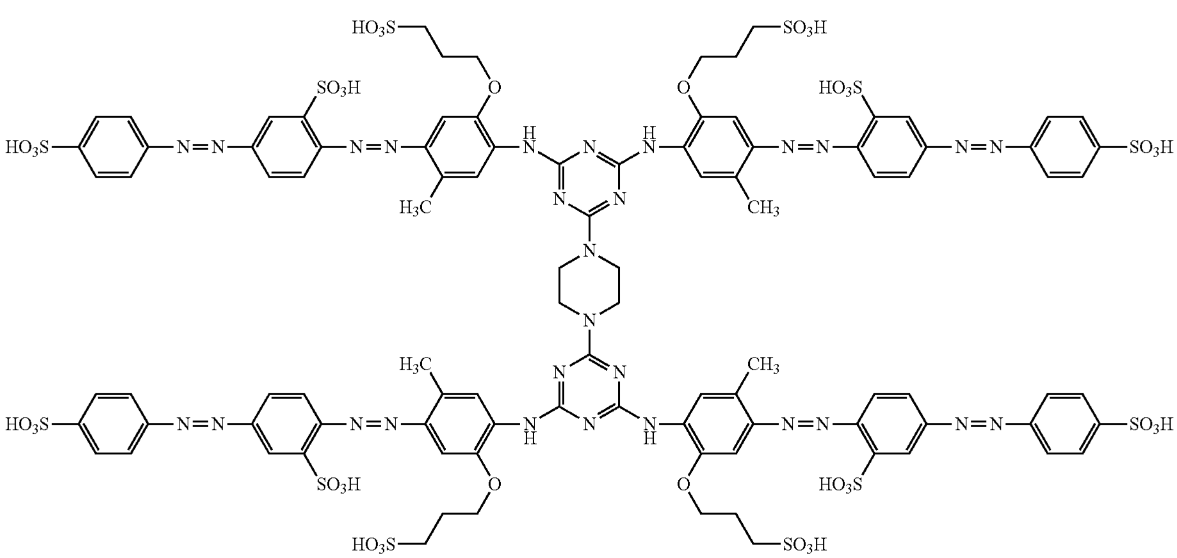

TABLE 133

| | Parts | | | |
|---|---|---|---|---|
| | Example J1 | Comparative Example J1 | Comparative Example J2 | Comparative Example J3 |
| Compound (3) | 1.75 | — | — | 3.50 |
| Compound (j6) | 1.75 | 1.75 | 3.50 | — |
| Compound (b4) | 1.00 | 1.00 | 1.00 | 1.00 |
| C.I. Food Black 2 | — | 1.75 | — | — |
| Glycerol | 10.00 | 10.00 | 10.00 | 10.00 |
| Triethylene glycol monobutyl ether | 5.00 | 5.00 | 5.00 | 5.00 |
| 1,3-Butanediol | 5.00 | 5.00 | 5.00 | 5.00 |
| Trimethylolpropane | 5.00 | 5.00 | 5.00 | 5.00 |
| Urea | 2.50 | 2.50 | 2.50 | 2.50 |
| SF-465 | 1.00 | 1.00 | 1.00 | 1.00 |
| 90% Triethanolamine | 0.05 | 0.05 | 0.05 | 0.05 |
| Proxel XL2 (S) | 0.05 | 0.05 | 0.05 | 0.05 |
| Sodium hydroxide + ion-exhanged water | 66.90 | 66.90 | 66.90 | 66.90 |
| Total | 100.00 | 100.00 | 100.00 | 100.00 |

Comparative Example J1

As a black ink composition for comparison, an ink of a comparative example was prepared in the same manner as in Example J1 except that C. I. Food Black 2 was used instead of the component (A). The following various tests performed on the ink constitute Comparative Example J1. It should be noted that C. I. Food Black 2 used was a commercially available product.

Comparative Example J2

As a black ink composition for comparison, an ink for comparison was prepared in the same manner as in Example J1 except that no coloring matter of the formula (3) was used and the amount of the coloring matter of the formula (j6) was increased. The following various tests performed on the ink constitute Comparative Example J2.

Comparative Example J3

As a black ink composition for comparison, an ink for comparison was prepared in the same manner as in Example J1 except that no coloring matter of the formula (j6) was used and the amount of the coloring matter of the formula (3) was increased. The following various tests performed on the ink constitute Comparative Example J3.

[(B) Ink-Jet Recording]

Using the ink composition obtained in each of Example J1 and Comparative Examples J1 to J3, ink-jet recording was performed on the following printing paper using an ink-jet printer (trade name, EPSON, PX-105).

Glossy paper 1: manufactured by Seiko Epson Corporation, trade name Photo Paper Crispia (Highly Glossy)

Glossy paper 2: manufactured by Brother Industries, Ltd., trade name Photograph Glossy Paper BP71G Upon printing, an image pattern was produced such that the tone of reflecting density could be yielded with the gradations in the 10 steps of 100%, 90%, 80%, 70%, 60%, 50%, 40%, 30%, 20%, and 10%, and then a recorded matter with the gradations from deep black to light black was obtained for use as a test piece for hue evaluation, followed by evaluation tests performed as described below. Then, a lattice image pattern with reflecting density of 100% and 0% was produced, and then a recorded matter with a black-and-white lattice was obtained for use as a test piece for moisture resistance evaluation, followed by evaluation tests performed as described below. Each printing was performed on a gray scale, and therefore recording liquids other than a black recording liquid, in other words, yellow, cyan, and magenta recording liquids, were not concurrently used.

[(C) Evaluation]

The recorded image obtained by using the aqueous ink composition of the present invention was tested for changes in recorded-image density with a colorimeter (trade name: SpectroEye, manufactured by GRETAG-MACBETH). Colorimetry was carried out under the conditions of D65 light source, DIN NB density standard, and 2° observer angle.

[Evaluation of Color Development Properties]

After printing, the recorded image obtained by using the ink of each of Example J1, and Comparative Examples J1 to J3 was air dried for 24 hours, and was then subjected to colorimetry with the colorimeter to obtain a Dk value at 100%, followed by evaluation according to the following criteria. Evaluation indicates that a test piece having a reading of a great numerical value has great color development properties and is excellent.

The results are shown in Table 134 below.

TABLE 134

| | Example J1 | Comparative Example J1 | Comparative Example J2 | Comparative Example J3 |
|---|---|---|---|---|
| Glossy paper 1 | Good | Poor | Poor | Good |
| Glossy paper 2 | Good | Poor | Poor | Good |

Good: Dk value of not smaller than 2.3
Fair: Dk value of not smaller than 2.2 and smaller than 2.3
Poor: Dk value of smaller than 2.2

[Evaluation of Ozone Resistance]

After printing, the recorded image obtained by using the ink of each of Example J1 and Comparative Examples J1 to J3 was air dried for 24 hours. Then, the test pieces were placed and left in Ozone Weather Meter (trade name, manufactured by Suga Test Instruments Co., Ltd.) under the conditions at an ozone concentration of 40 ppm, humidity of 60% RH, and a temperature of 24° C. for 24 hours.

After the completion of the test, colorimetry was performed with the colorimeter, and then a ratio of the residual coloring matter was determined by (reflecting density Dk after test/reflecting density Dk before test)×100(%), followed by evaluation according to the following criteria. Evaluation indicates that a test piece having a high residual ratio has little color fading due to ozone and is excellent. The results are shown in Table 135 below.

TABLE 135

| | Example J1 | Comparative Example J1 | Comparative Example J2 | Comparative Example J3 |
|---|---|---|---|---|
| Glossy paper 1 | Good | Poor | Good | Poor |
| Glossy paper 2 | Good | Poor | Good | Poor |

Good: residual ratio of not lower than 81%
Fair: residual ratio of not lower than 78% and lower than 81%
Poor: residual ratio of lower than 78%

The results in Table 134 showed that Example J1 and Comparative Example J3 were excellent in color development properties. On the other hand, both of Comparative Examples J1 and J2 were inferior to Example J1. The results in Table 135 showed that Example J1 and Comparative Example J2 were excellent in ozone resistance. On the other hand, both of Comparative Examples J1 and J3 were inferior to Example J1. These results showed the superiority of Example J1 that was excellent in both color development properties and ozone resistance.

It should be noted that Comparative Example J1 was poor in color development properties and ozone resistance even though it contained the compound of the formula (3). This can also show synergy generated between the compounds of the formula (3) and the formula (j6) in the present invention.

Example K and Comparative Example K

Example K1

The compound represented by a formula (3) below as the component (A), the compound of a formula (k3) below as the component (B), and the compound of a formula (b4) below as the component (C) were used. The components were mixed according to the composition ratio shown in Table 136 below, stirred for about 1 hour to dissolve the solid content, and then filtrated through a 0.45-μm membrane filter (trade name, cellulose acetate filter paper, manufactured by Advantec) to give a black ink composition for testing. The compound of the formula (3) is the compound (21) in International Publication No. WO 2006/051850 publication, obtained by carrying out a method described in the document. The compound of the formula (k3) is the compound (35) in International Publication No. WO 2005/097912 publication, obtained by carrying out a method described in the document. The compound of the formula (b4) is the compound (31) in International Publication No. WO 2012/002317, obtained by carrying out a method described in the document.

It should be noted that, in Table 136, SF-465 refers to Surfynol® 465 (manufactured by Air Products and Chemicals, Inc.).

(3)

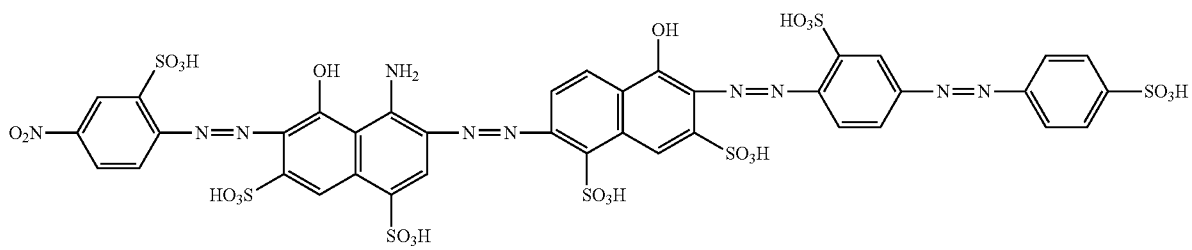

(k3)

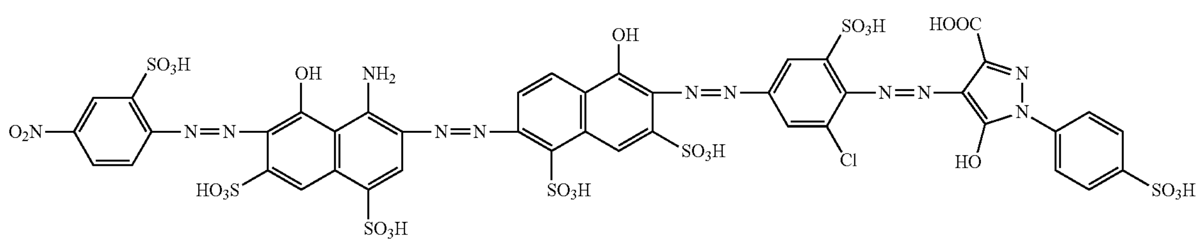

(b4)

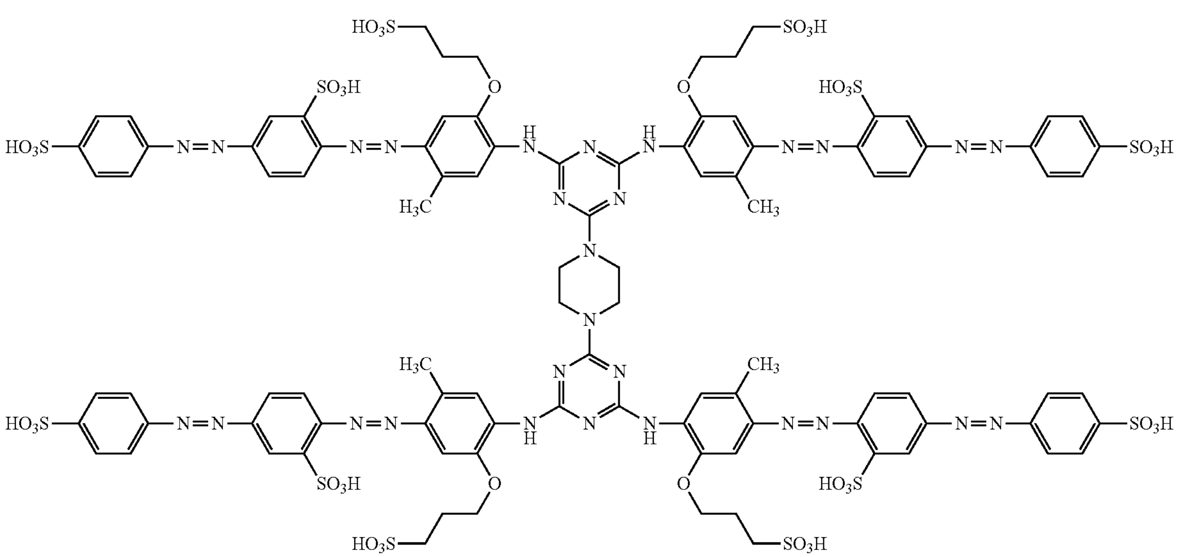

TABLE 136

| | Parts | | | | | |
|---|---|---|---|---|---|---|
| | Example K1 | Example K2 | Comparative Example K1 | Comparative Example K2 | Comparative Example K3 | Comparative Example K4 |
| Compound (3) | 1.75 | 1.25 | — | 3.50 | — | — |
| Compound (k3) | 1.75 | 1.25 | 1.75 | — | 3.50 | 1.75 |
| Compound (b4) | 1.00 | 0.75 | 1.00 | 1.00 | 1.00 | 1.00 |
| Compound (j6) | — | 1.25 | — | — | — | 1.75 |
| C.I. Food Black 2 | — | — | 1.75 | — | — | — |
| Glycerol | 10.00 | 10.00 | 10.00 | 10.00 | 10.00 | 10.00 |
| Triethylene glycol monobutyl ether | 5.00 | 5.00 | 5.00 | 5.00 | 5.00 | 5.00 |
| 1,3-Butanediol | 5.00 | 5.00 | 5.00 | 4.33 | 5.00 | 5.00 |
| Trimethylolpropane | 5.00 | 5.00 | 5.00 | 5.00 | 5.00 | 5.00 |
| Urea | 2.50 | 2.50 | 2.50 | 2.50 | 2.50 | 2.50 |
| SF-465 | 1.00 | 1.00 | 1.00 | 1.00 | 1.00 | 1.00 |
| 90% Triethanolamine | 0.05 | 0.05 | 0.05 | 0.05 | 0.05 | 0.05 |
| Proxel XL2 (S) | 0.05 | 0.05 | 0.05 | 0.05 | 0.05 | 0.05 |
| Sodium hydroxide + ion-exchanged water | 66.90 | 66.90 | 66.90 | 66.90 | 66.90 | 66.90 |
| Total | 100.00 | 100.00 | 100.00 | 100.00 | 100.00 | 100.00 |

Example K2

An ink of a comparative example was prepared in the same manner as in Example K1 except that the compound represented by a formula (j6) below was used as the component (C) and the components were mixed according to the composition ratio shown in Table 136. The following various tests performed on the ink constitute Example K2. The compound of the formula (j6) is the compound (22) in Japanese Patent Application Publication No. 2009-084346, obtained by carrying out a method described in the document.

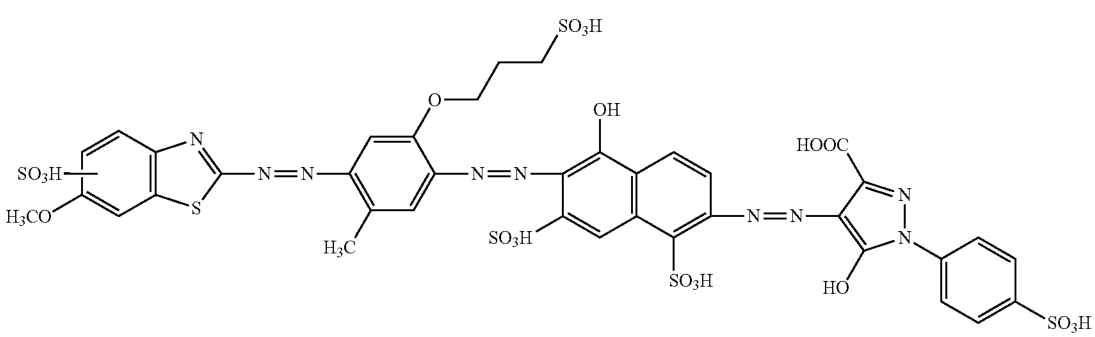

(j6)

Comparative Example K1

As a black ink composition for comparison, an ink of a comparative example was prepared in the same manner as in Example K1 except that no coloring matter of the formula (3) was used and instead C. I. Food Black 2 was added. The following various tests performed on the ink constitute Comparative Example K1. It should be noted that C. I. Food Black 2 used was a commercially available product.

Comparative Example K2

As a black ink composition for comparison, an ink for comparison was prepared in the same manner as in Example K1 except that no coloring matter of the formula (k3) was used and the amount of the coloring matter of the formula (3) was increased. The following various tests performed on the ink constitute Comparative Example K2.

Comparative Example K3

As a black ink composition for comparison, an ink for comparison was prepared in the same manner as in Example K1 except that no coloring matter of the formula (3) was used and the amount of the coloring matter of the formula (k3) was increased. The following various tests performed on the ink constitute Comparative Example K3.

Comparative Example K4

As a black ink composition for comparison, an ink for comparison was prepared in the same manner as in Example K1 except that no coloring matter of the formula (3) was used and the amount of the coloring matter of the formula (j6) was increased. The following various tests performed on the ink constitute Comparative Example K4.

[(B) Ink-Jet Recording]

Using the ink composition obtained in each of Examples K1 and K2 and Comparative Examples K1 to K4, ink-jet recording was performed on the following printing paper using an ink-jet printer (trade name, EPSON, PX-105).

Glossy paper 1: manufactured by Brother Industries, Ltd., trade name Photograph Glossy Paper BP71G Upon printing, an image pattern was produced such that the tone of reflecting density could be yielded with the gradations in the 10 steps of 100%, 90%, 80%, 70%, 60%, 50%, 40%, 30%, 20%, and 10%, and then a recorded matter with the gradations from deep black to light black was obtained for use as a test piece for hue evaluation, followed by evaluation tests performed as described below. Then, a lattice image pattern with reflecting density of 100% and 0% was produced, and then a recorded matter with a black-and-white lattice was obtained for use as a test piece for moisture resistance evaluation, followed by evaluation tests performed as described below. Each printing was performed on a gray scale, and therefore recording liquids other than a black recording liquid, in other words, yellow, cyan, and magenta recording liquids, were not concurrently used.

[(C) Evaluation]

The recorded image obtained by using the aqueous ink composition of the present invention was tested for changes in recorded-image density with a colorimeter (trade name: SpectroEye, manufactured by GRETAG-MACBETH). Colorimetry was carried out under the conditions of D65 light source, DIN NB density standard, and 2° observer angle.

[Evaluation of Color Development Properties]

After printing, the recorded image obtained by using the ink of each of Examples K1 and K2 and Comparative Examples K1 to K4 was air dried for 24 hours, and was then subjected to colorimetry with the colorimeter to obtain a Dk value at 100%, followed by evaluation according to the following criteria. Evaluation indicates that a test piece having a reading of a great numerical value has great color development properties and is excellent. The results are shown in Table 137 below.

TABLE 137

| | Example K1 | Example K2 | Comparative Example K1 | Comparative Example K2 | Comparative Example K3 | Comparative Example K4 |
|---|---|---|---|---|---|---|
| Glossy paper 1 | Good | Excellent | Good | Good | Poor | Good |

Excellent: Dk value of not smaller than 2.33
Good: Dk value of not smaller than 2.28 and smaller than 2.32
Fair: Dk value of not smaller than 2.20 and smaller than 2.28
Poor: Dk value of smaller than 2.20

[Evaluation of Light Resistance]

After printing, the recorded image obtained by using the ink of each of Examples K1 and K2 and Comparative Examples K1 to K4 was air dried for 24 hours. Then, the test pieces were placed and left in Xenon Weather Meter XL75 (trade name, manufactured by Suga Test Instruments Co., Ltd.) under the conditions at illuminance of 100 klux, humidity of 60% RH, and a temperature of 24° C. for 168 hours. After the completion of the test, colorimetry was performed with the colorimeter, and then a ratio of the residual coloring matter was determined by (reflecting density Dk after test/reflecting density Dk before test)×100(%), followed by evaluation according to the following criteria. Evaluation indicates that a test piece having a high residual ratio has little color fading due to light and is excellent. The results are shown in Table 138 below.

TABLE 138

| | Example K1 | Example K2 | Comparative Example K1 | Comparative Example K2 | Comparative Example K3 | Comparative Example K4 |
|---|---|---|---|---|---|---|
| Glossy paper 1 | Good | Good | Poor | Poor | Poor | Poor |

Good: residual ratio of not lower than 81%
Fair: residual ratio of not lower than 79% and lower than 81%
Poor: residual ratio of lower than 79%

The results in Table 137 showed that Example K2 was greatly excellent in color development properties. Example K1 and Comparative Examples K1, K2, and K3 were excellent in color development properties. On the other hand, Comparative Example K3 was inferior to Example K1. The results in Table 138 showed that Example K1 and Example K2 were excellent in light resistance. On the other hand, Comparative Examples K1 to K4 were inferior to Example K1. These results showed the superiority of Examples K1 and K2 that were excellent in both color development properties and light resistance and, in particular, Example K2 that was excellent in light resistance.

Example L and Comparative Example L

Example L1

The compound of a formula (3) below as the component (A), the compound of a formula (15) below as the component (B), and the compounds of formulae (a2) and (q4) below as the component (C) were used. The components were mixed according to the composition ratio shown in Table 139 below, stirred for about 1 hour to dissolve the solid content, and then filtrated through a 0.45-μm membrane filter (trade name, cellulose acetate filter paper, manufactured by Advantec) to give a black ink composition for testing. The compound of the formula (3) is the compound (21) in International Publication No. WO 2006/051850 publication, obtained by carrying out a method described in the document. The compound of the formula (15) is the compound (28) in International Publication No. WO 2012/081640 publication, obtained by carrying out a method described in the document. The compound of the formula (a2) is the compound (11) in International Publication No. WO 2006/001274, obtained by carrying out a method described in the document.

It should be noted that, in Table 139, SF-465 refers to Surfynol® 465 (manufactured by Air Products and Chemicals, Inc.).

(3)

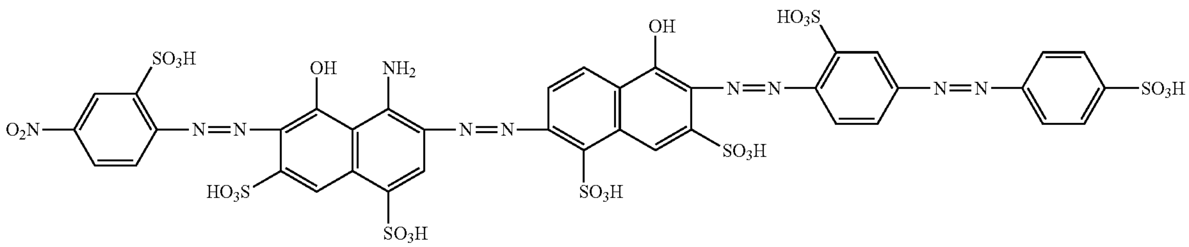

(15)

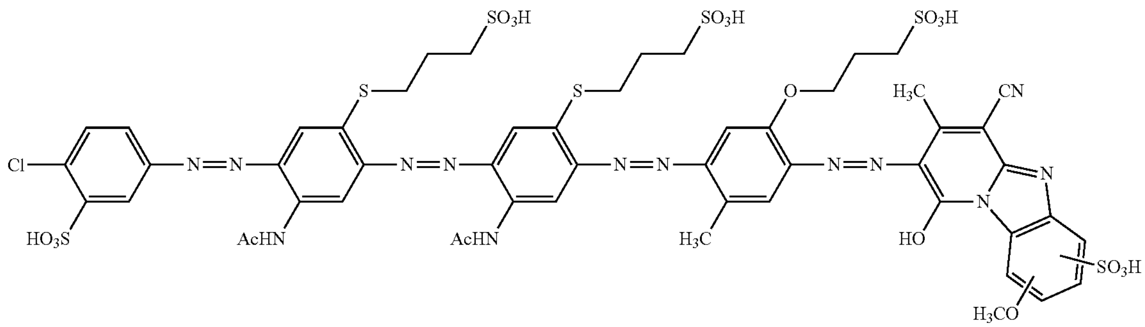

(a2)

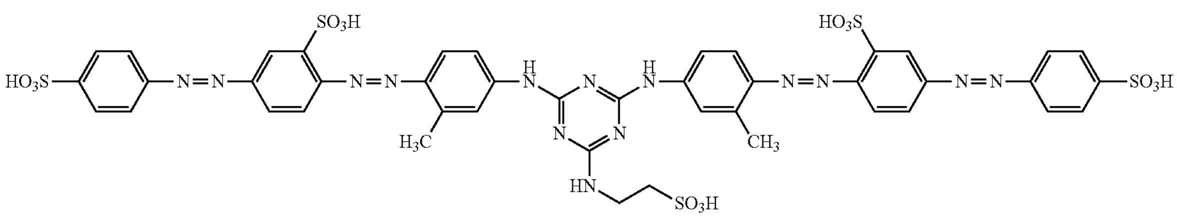

(q4)

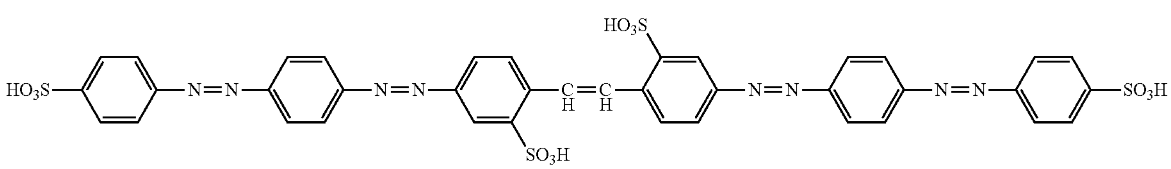

TABLE 139

| | Parts | | | |
|---|---|---|---|---|
| | Example L1 | Comparative Example L1 | Comparative Example L2 | Comparative Example L3 |
| Compound (3) | 2.00 | — | — | 3.50 |
| Compound (15) | 1.50 | 1.50 | 3.50 | — |
| Compound (a2) | 0.75 | 0.75 | 0.75 | 0.75 |
| Compound (q4) | 0.50 | 0.50 | 0.50 | 0.50 |
| C.I. Food Black 2 | — | 2.00 | — | — |
| Glycerol | 10.00 | 10.00 | 10.00 | 10.00 |
| Diethylene glycol | 5.00 | 5.00 | 5.00 | 5.00 |
| 2-Pyrrolidone | 5.00 | 5.00 | 5.00 | 5.00 |
| 1,2-Hexanediol | 5.00 | 5.00 | 5.00 | 5.00 |
| Urea | 2.50 | 2.50 | 2.50 | 2.50 |
| SF-465 | 1.00 | 1.00 | 1.00 | 1.00 |
| 80% TEA | 0.05 | 0.05 | 0.05 | 0.05 |
| Proxel GXL (S) | 0.05 | 0.05 | 0.05 | 0.05 |
| Sodium hydroxide + ion-exhanged water | 66.65 | 66.65 | 66.65 | 66.65 |
| Total | 100.0 | 100.0 | 100.0 | 100.0 |

Comparative Example L1

As a black ink composition for comparison, an ink of a comparative example was prepared in the same manner as in Example L1 except that C. I. Food Black 2 was used instead of the component (A). The following various tests performed on the ink constitute Comparative Example L1. It should be noted that C. I. Food Black 2 used was a commercially available product.

Comparative Example L2

As a black ink composition for comparison, an ink for comparison was prepared in the same manner as in Example L1 except that no coloring matter of the formula (3) was used and the amount of the coloring matter of the formula (15) was increased. The following various tests performed on the ink constitute Comparative Example L2.

Comparative Example L3

As a black ink composition for comparison, an ink for comparison was prepared in the same manner as in Example L1 except that no coloring matter of the formula (15) was used and the amount of the coloring matter of the formula (3) was increased. The following various tests performed on the ink constitute Comparative Example L3.

[(B) Ink-Jet Recording]

Using the ink composition obtained in each of Example L1 and Comparative Examples L1 to L3, ink-jet recording was performed on the following printing paper using an ink-jet printer (trade name, EPSON, PX-105).

Glossy paper 1: manufactured by Seiko Epson Corporation, trade name Photo Paper Crispia (Highly Glossy)

Glossy paper 2: manufactured by Brother Industries, Ltd., trade name Photograph Glossy Paper BP71G Upon printing, an image pattern was produced such that the tone of reflecting density could be yielded with the gradations in the 10 steps of 100%, 90%, 80%, 70%, 60%, 50%, 40%, 30%, 20%, and 10%, and then a recorded matter with the gradations from deep black to light black was obtained for use as a test piece for hue evaluation, followed by evaluation tests performed as described below. Then, a lattice image pattern with reflecting density of 100% and 0% was produced, and then a recorded matter with a black-and-white lattice was obtained for use as a test piece for moisture resistance evaluation, followed by evaluation tests performed as described below. Each printing was performed on a gray scale, and therefore recording liquids other than a black recording liquid, in other words, yellow, cyan, and magenta recording liquids, were not concurrently used.

[(C) Evaluation]

The recorded image obtained by using the aqueous ink composition of the present invention was tested for changes in recorded-image density with a colorimeter (trade name: SpectroEye, manufactured by GRETAG-MACBETH). Colorimetry was carried out under the conditions of D65 light source, DIN NB density standard, and 2° observer angle.

[Evaluation of Color Development Properties]

After printing, the recorded image obtained by using the ink of each of Example L1 and Comparative Examples L1 to L3 was air dried for 24 hours, and was then subjected to colorimetry with the colorimeter to obtain a Dk value at 100%, followed by evaluation according to the following criteria. Evaluation indicates that a test piece having a reading of a great numerical value has great color development properties and is excellent. The results are shown in Table 140 below.

TABLE 140

| | Example L1 | Comparative Example L1 | Comparative Example L2 | Comparative Example L3 |
|---|---|---|---|---|
| Glossy paper 1 | Excellent | Fair | Poor | Excellent |
| Glossy paper 2 | Excellent | Poor | Poor | Good |

Excellent: Dk value of not smaller than 2.35
Good: Dk value of not smaller than 2.25 and smaller than 2.35
Fair: Dk value of not smaller than 2.15 and smaller than 2.25
Poor: Dk value of smaller than 2.15

[Evaluation of Ozone-Gas Resistance]

After printing, the recorded image obtained by using the ink of each of Example L1 and Comparative Examples L1 to L3 was air dried for 24 hours. Then, the test pieces were placed and left in Ozone Weather Meter (trade name, manufactured by Suga Test Instruments Co., Ltd.) under the conditions at an ozone concentration of 40 ppm, humidity of 60% RH, and a temperature of 24° C. for 24 hours.

After the completion of the test, colorimetry was performed with the colorimeter, and then a ratio of the residual coloring matter was determined by (reflecting density Dk after test/reflecting density Dk before test)×100(%), followed by evaluation according to the following criteria. Evaluation indicates that a test piece having a high residual ratio has little color fading due to ozone and is excellent. The results are shown in Table 141 below.

TABLE 141

| | Example L1 | Comparative Example L1 | Comparative Example L2 | Comparative Example L3 |
|---|---|---|---|---|
| Glossy paper 1 | Good | Poor | Good | Poor |
| Glossy paper 2 | Good | Poor | Good | Poor |

Good: residual ratio of not lower than 81%
Fair: residual ratio of not lower than 77% and lower than 81%
Poor: residual ratio of lower than 77%

The results in Table 140 showed that Example L1 was greatly excellent in color development properties. Comparative Example L3 was inferior to Example L1 but excellent in color development properties. On the other hand, both of Comparative Examples L1 and L2 were greatly inferior to Example L1. The results in Table 141 showed that Example L1 and Comparative Example L2 were excellent in ozone-gas resistance. On the other hand, both of Comparative Examples L1 and L3 were inferior to Example L1. These results showed the superiority of Example L1 that was excellent in both color development properties and ozone-gas resistance.

Example M and Comparative Example M

Synthesis Example M1

To 675.0 parts of water, 115.0 parts of the compound of a formula (q2) below, 98.0 parts of the compound of a formula (q3) below, 61.0 parts of a 48% aqueous sodium hydroxide solution, and 11.0 parts of ethylene glycol were added. The resultant was stirred at 98° C. for 10 hours to complete a condensation reaction. To the resulting reaction mixture, 280.0 parts of water was added, and the fluid temperature was adjusted to 85 to 88° C. Thereto, 12.0 parts of glucose was added, followed by stirring for 2 hours to complete a reduction reaction. Subsequently, hydrochloric acid was used to adjust the pH to pH9.0 to pH9.5, and then sodium chloride was used for salting-out, followed by filtration. The resulting cake as a whole was dissolved in 2000 parts of water, and then 2000.0 parts of methanol was added for crystallization. The resulting crystal was filtrated and separated, and thereby achieving desalting. The resulting crystal was dried to obtain 192.0 parts of a compound represented by a formula (q4).

The compound had the maximum absorbance in water at a wavelength (λmax) of 413 nm.

(q2)

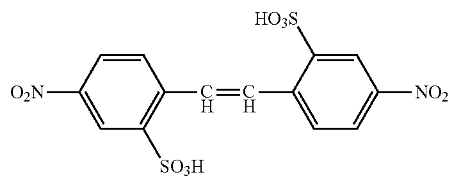

(q3)

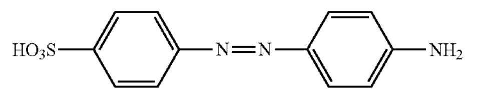

(q4)

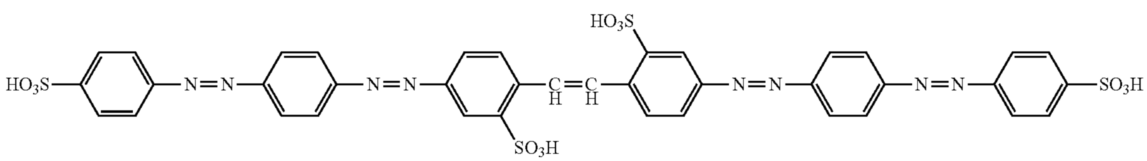

Example M1

The compound of a formula (3) below as the component (A), the compound of a formula (m7) below as the component (B) (one of A to D was pyridine, b=2.4, c=0.6), and formulae (a2) and (q4) below as the component (C) were used. The components were mixed according to the composition ratio shown in Table 142 below, stirred for about 1 hour to dissolve the solid content, and then filtrated through a 0.45-μm membrane filter (trade name, cellulose acetate filter paper, manufactured by Advantec) to give a black ink composition for testing. The compound of the formula (3) is the compound (21) in International Publication No. WO 2006/051850, obtained by carrying out a method described in the document. The compound of the formula (m7) was obtained by synthesis according to a method described in International Publication No. WO 2007/091631. The compound of the formula (a2) was obtained by synthesis according to a method described in International Publication No. WO 2006/001274.

(3)

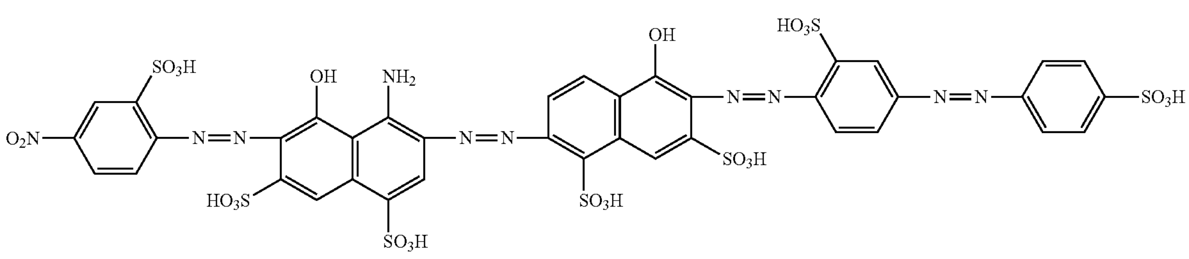

(m7)

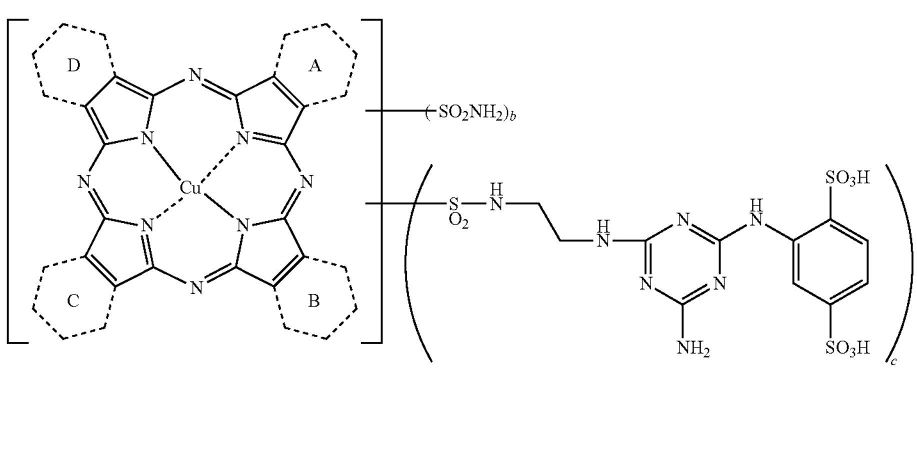

-continued (a2)

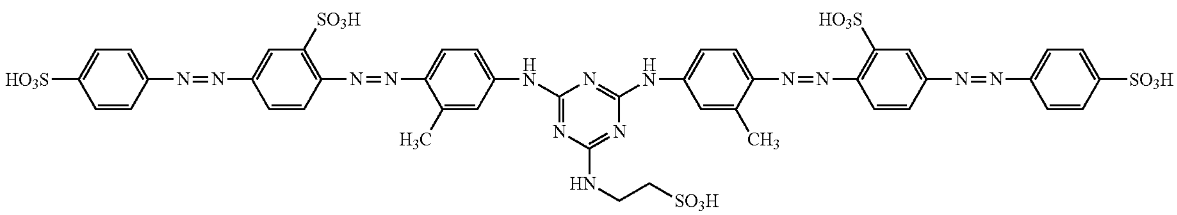

(q4)

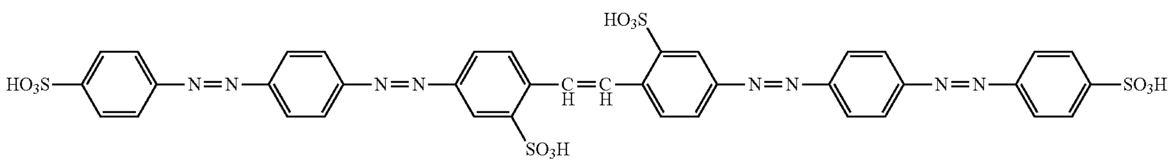

TABLE 142

| Component | Parts | | | | | | | |
|---|---|---|---|---|---|---|---|---|
| | Example 1 | Example 2 | Example 3 | Example 4 | Example 5 | Comparative Example 1 | Comparative Example 2 | Comparative Example 3 |
| Compound (3) | 3.00 | 3.00 | 3.00 | 3.00 | 3.00 | 3.75 | 3.75 | 3.00 |
| Compound (a2) | 0.15 | 0.15 | 0.15 | 0.15 | | 0.15 | | 0.15 |
| Compound (b4) | | | | | 0.15 | | 0.15 | |
| Compound (q4) | 0.10 | 0.10 | 0.10 | 0.10 | 0.10 | 0.10 | 0.10 | 0.10 |
| C.I. Food Black 2 | | | | | | | | |
| Direct Blue 87 | | | | | | | | 0.75 |
| Compound (m7) | 0.75 | | | | | | | |
| Compound (m8) | | 0.75 | | | | | | |
| Compound (m9) | | | 0.75 | | | | | |
| Compound (m10) | | | | 0.75 | | | | |
| Compound (m11) | | | | | 0.75 | | | |
| Glycerol | 10.00 | 10.00 | 10.00 | 10.00 | 10.00 | 10.00 | 10.00 | 10.00 |
| 3-Methyl-1,3-butanediol | 5.00 | 5.00 | 5.00 | 5.00 | 5.00 | 5.00 | 5.00 | 5.00 |
| 2-(2-Methoxyethoxy)ethanol | 5.00 | 5.00 | 5.00 | 5.00 | 5.00 | 5.00 | 5.00 | 5.00 |
| SF-440 | 0.10 | 0.10 | 0.10 | 0.10 | 0.10 | 0.10 | 0.10 | 0.10 |
| 90% TEA | 0.05 | 0.05 | 0.05 | 0.05 | 0.05 | 0.05 | 0.05 | 0.05 |
| Proxel GXL (S) | 0.05 | 0.05 | 0.05 | 0.05 | 0.05 | 0.05 | 0.05 | 0.05 |
| Water | 75.80 | 75.80 | 75.80 | 75.80 | 75.80 | 75.80 | 75.80 | 75.80 |

| Component | Parts | | | | | |
|---|---|---|---|---|---|---|
| | Comparative Example 4 | Comparative Example 5 | Comparative Example 6 | Comparative Example 7 | Comparative Example 8 | Comparative Example 9 |
| Compound (3) | 3.00 | | | | | |
| Compound (a2) | | 0.15 | 0.15 | 0.15 | 0.15 | |
| Compound (b4) | 0.15 | | | | | 0.15 |
| Compound (q4) | 0.10 | 0.10 | 0.10 | 0.10 | 0.10 | 0.10 |
| C.I. Food Black 2 | | 3.00 | 3.00 | 3.00 | 3.00 | 3.00 |
| Direct Blue 87 | 0.75 | | | | | |
| Compound (m7) | | 0.75 | | | | |
| Compound (m8) | | | 0.75 | | | |
| Compound (m9) | | | | 0.75 | | |
| Compound (m10) | | | | | 0.75 | |
| Compound (m11) | | | | | | 0.75 |
| Glycerol | 10.00 | 10.00 | 10.00 | 10.00 | 10.00 | 10.00 |
| 3-Methyl-1,3-butanediol | 5.00 | 5.00 | 5.00 | 5.00 | 5.00 | 5.00 |
| 2-(2-Methoxyethoxy)ethanol | 5.00 | 5.00 | 5.00 | 5.00 | 5.00 | 5.00 |
| SF-440 | 0.10 | 0.10 | 0.10 | 0.10 | 0.10 | 0.10 |
| 90% TEA | 0.05 | 0.05 | 0.05 | 0.05 | 0.05 | 0.05 |
| Proxel GXL (S) | 0.05 | 0.05 | 0.05 | 0.05 | 0.05 | 0.05 |
| Water | 75.80 | 75.80 | 75.80 | 75.80 | 75.80 | 75.80 |

Example M2

A black ink composition for testing was prepared in the same manner as in Example M1 except that, as the component (B), the compound represented by a formula (m8) below (one of A to D was pyridine) was used instead of the compound represented by the formula (m7). The compound of the formula (m8) is the compound of Example 1 in International Publication No. WO 2012-050061, obtained by carrying out a method described in the document.

Example M4

A black ink composition for testing was prepared in the same manner as in Example M1 except that, as the component (B), the compound represented by a formula (m10) below (1.5 of A to D was pyridine) was used instead of the compound represented by the formula (m7). The compound of the formula (m10) is a compound described in International Publication No. WO 2007/116933, obtained by carrying out a method described in the document.

(m8)

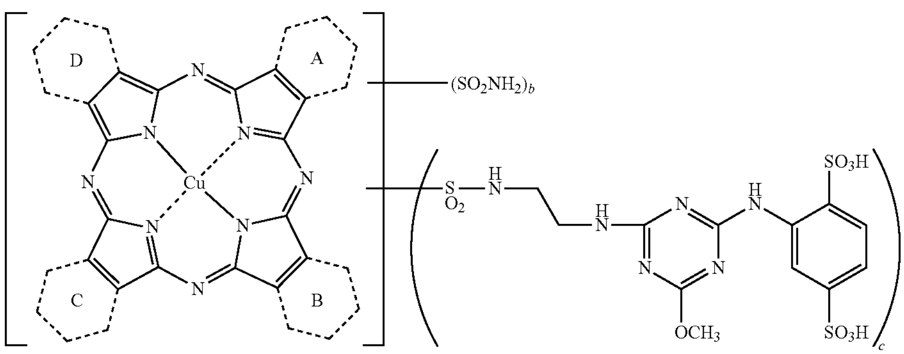

Example M3

A black ink composition for testing was prepared in the same manner as in Example M1 except that, as the component (B), the compound represented by a formula (m9) below (1.5 of A to D was pyridine) was used instead of the compound represented by the formula (m7). The compound of the formula (m9) is a compound described in International Publication No. WO 2008/111635, obtained by carrying out a method described in the document.

(m9)

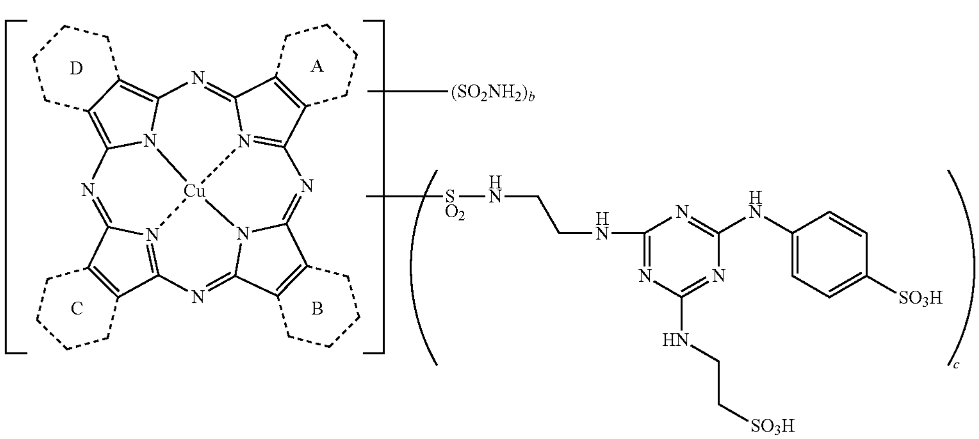

(m10)

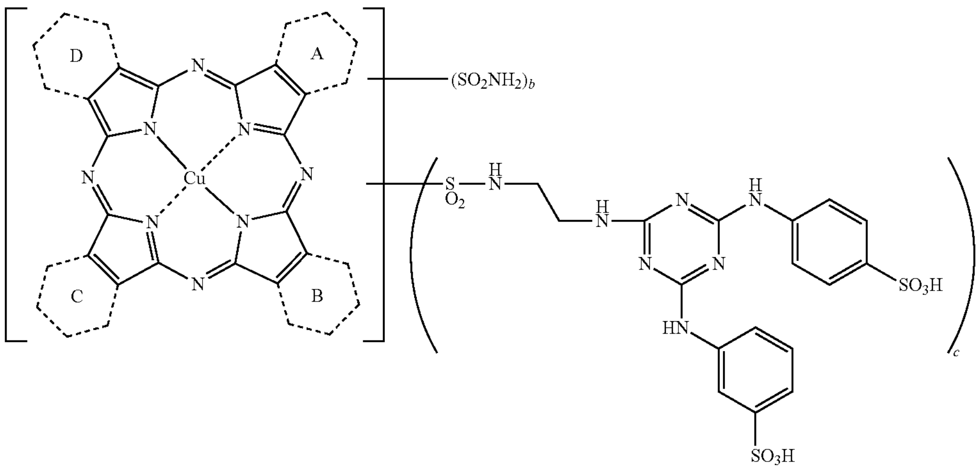

Example M5

A black ink composition for testing was prepared in the same manner as in Example M1 except that the compound represented by a formula (m11) below (1.2 of A to D pyridine) was used as the component (B) instead of the compound represented by the formula (m7) and a formula (b4) below was used as the component (C). The compound of the formula (m11) is a compound described in International Publication No. WO 2010/143619 publication, obtained by carrying out a method described in the document. The compound of the formula (b4) is a compound described in International Publication No. WO 2012/002317, obtained by carrying out a method described in the document.

(m11)

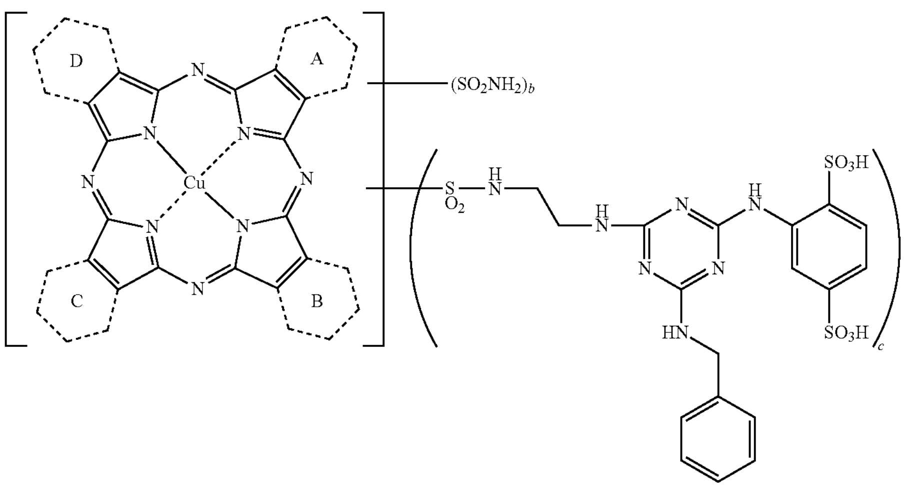

(b4)

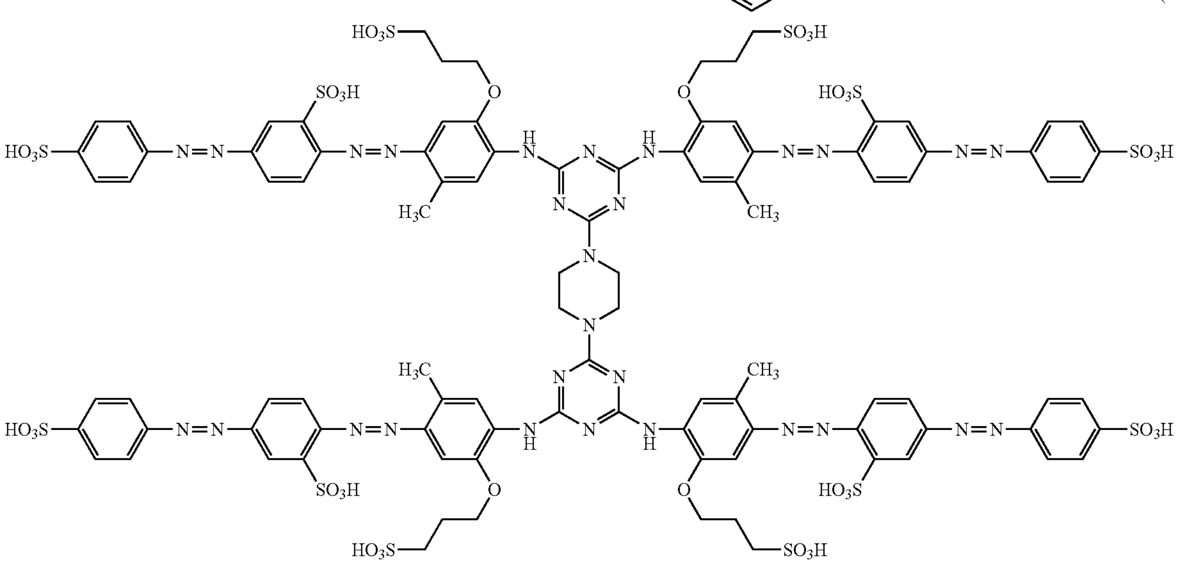

Comparative Example M1

As a black ink composition for comparison, an ink for comparison was prepared in the same manner as in Example M1 except that 3.75% of the coloring matter of the formula (3) was used and no coloring matter as the component (B) was added. The following various tests performed on the ink constitute Comparative Example M1.

Comparative Example M2

As a black ink composition for comparison, an ink for comparison was prepared in the same manner as in Example M5 except that 3.75% of the coloring matter of the formula (3) was used and no coloring matter as the component (B) was added. The following various tests performed on the ink constitute Comparative Example M2.

Comparative Example M3

As a black ink composition for comparison, an ink for comparison was prepared in the same manner as in Example M1 except that except that 3.00% of the coloring matter of the formula (3) was used and 0.75% of C. I. Direct Blue 87 was added instead of the coloring matter as the component (B). The following various tests performed on the ink constitute Comparative Example M3.

Comparative Example M4

As a black ink composition for comparison, an ink for comparison was prepared in the same manner as in Example M5 except that except that 3.00% of the coloring matter of the formula (3) was used and 0.75% of C. I. Direct Blue 87 was added instead of the coloring matter as the component (B). The following various tests performed on the ink constitute Comparative Example M4.

Comparative Example M5

As a black ink composition for comparison, an ink for comparison was prepared in the same manner as in Example M1 except that 3.00% of C. I. Food Black 2 was used instead of the component (A). The following various tests performed on the ink constitute Comparative Example M5.

Comparative Example M6

As a black ink composition for comparison, an ink for comparison was prepared in the same manner as in Example M2 except that 3.00% of C. I. Food Black 2 was used instead of the component (A). The following various tests performed on the ink constitute Comparative Example M6.

Comparative Example M7

As a black ink composition for comparison, an ink for comparison was prepared in the same manner as in Example M3 except that 3.00% of C. I. Food Black 2 was used instead of the component (A). The following various tests performed on the ink constitute Comparative Example M7.

Comparative Example M8

As a black ink composition for comparison, an ink for comparison was prepared in the same manner as in Example M4 except that 3.00% of C. I. Food Black 2 was used instead of the component (A). The following various tests performed on the ink constitute Comparative Example M8.

Comparative Example M9

As a black ink composition for comparison, an ink for comparison was prepared in the same manner as in Example M5 except that 3.00% of C. I. Food Black 2 was used instead of the component (A). The following various tests performed on the ink constitute Comparative Example M9.

[(B) Ink-Jet Recording]

Using the ink composition obtained in each of Examples M1 to M5 and Comparative Examples M1 to M9, ink-jet recording was performed on the following printing paper using an ink-jet printer (trade name, EPSON, PX-105).

Glossy paper: manufactured by Canon, trade name Canon Photo Paper Glossy Gold GL-101A450

Upon printing, an image pattern was produced such that the tone of reflecting density could be yielded with the gradations in the 10 steps of 100%, 90%, 80%, 70%, 60%, 50%, 40%, 30%, 20%, and 10%, and then a recorded matter with the gradations from deep black to light black was obtained for use as a test piece for hue evaluation, followed by evaluation tests performed as described below. Then, a lattice image pattern with reflecting density of 100% and 0% was produced, and then a recorded matter with a black-and-white lattice was obtained for use as a test piece for moisture resistance evaluation, followed by evaluation tests performed as described below. Each printing was performed on a gray scale, and therefore recording liquids other than a black recording liquid, in other words, yellow, cyan, and magenta recording liquids, were not concurrently used.

[(C) Evaluation]

The recorded image obtained by using the aqueous ink composition of the present invention was tested for changes in recorded-image density with a colorimeter (trade name: SpectroEye, manufactured by GRETAG-MACBETH). Colorimetry was carried out under the conditions of D65 light source, DIN NB density standard, and 2° observer angle.

[Evaluation of Ozone-Gas Resistance]

After printing, the recorded image obtained by using the ink of each of Examples M1 to M5 and Comparative Examples M1 to M9 was air dried for 24 hours. Then, the test pieces were placed and left in Ozone Weather Meter (trade name, manufactured by Suga Test Instruments Co., Ltd.) under the conditions at an ozone concentration of 10 ppm, humidity of 50% RH, and a temperature of 23° C. for 24 hours.

After the completion of the test, colorimetry was performed with the colorimeter, and then a color difference (ΔE) was determined by $((L^*\text{after test}-L^*\text{before test})^2+(a^*\text{after test}-a^*\text{before test})^2+(b^*\text{after test}-b^*\text{before test})^2)^{1/2}$, followed by evaluation according to the following criteria. Evaluation indicates that a test piece having a reading of a small value has little change in color due to color fading and is excellent.

The results are shown in Table 143 below.

TABLE 143

| Component | Example M1 | Example M2 | Example M3 | Example M4 | Example M5 |
|---|---|---|---|---|---|
| ΔE | Good | Good | Good | Good | Good |

| Component | Comparative Example M1 | Comparative Example M2 | Comparative Example M3 | Comparative Example M4 | Comparative Example M5 | Comparative Example M6 | Comparative Example M7 | Comparative Example M8 | Comparative Example M9 |
|---|---|---|---|---|---|---|---|---|---|
| ΔE | Poor | Fair | Poor | Poor | Poor | Poor | Poor | Poor | Poor |

Good: ΔE <15.0
Fair: 15.0 ≤ ΔE < 16.0
Poor: 16.0 ≤ ΔE

[Evaluation of Light Resistance]

After printing, the recorded image obtained by using the ink of each of Examples M1 to M5 and Comparative Examples M1 to M9 was air dried for 24 hours. Then, the test pieces were placed and left in Xenon Weather Meter XL75 (trade name, manufactured by Suga Test Instruments Co., Ltd.) under the conditions at illuminance of 100 klux, humidity of 60% RH, and a temperature of 24° C. for 168 hours.

After the completion of the test, colorimetry was performed with the colorimeter, and then a color difference (ΔE) was determined by $((L^*\text{after test}-L^*\text{before test})^2+(a^*\text{after test}-a^*\text{before test})^2+(b^*\text{after test}-b^*\text{before test})^2)^{1/2}$, followed by evaluation according to the following criteria. Evaluation indicates that a test piece having a reading of a small value has little change in color due to color fading and is excellent. The results are shown in Table 144 below.

TABLE 144

| Component | Example M1 | Example M2 | Example M3 | Example M4 | Example M5 |
|---|---|---|---|---|---|
| ΔE | Good | Good | Good | Good | Good |

| Component | Comparative Example M1 | Comparative Example M2 | Comparative Example M3 | Comparative Example M4 | Comparative Example M5 | Comparative Example M6 | Comparative Example M7 | Comparative Example M8 | Comparative Example M9 |
|---|---|---|---|---|---|---|---|---|---|
| ΔE | Poor | Poor | Poor | Poor | Fair | Good | Poor | Poor | Good |

Good: ΔE <39.5
Fair: 39.5 ≤ ΔE < 40.5
Poor: 40.5 ≤ ΔE

[Evaluation of Color Development Properties]

After printing, the recorded image obtained by using the ink of each of Examples M1 to M5 and Comparative Examples M1 to M9 was air dried for 24 hours. After drying, colorimetry was performed with the colorimeter, followed by evaluation according to the following criteria. Evaluation indicates that a test piece having a high Dk value has great color development properties and is excellent.

The results are shown in Table 145 below.

TABLE 145

| Component | Example M1 | Example M2 | Example M3 | Example M4 | Example M5 |
|---|---|---|---|---|---|
| Dk | Good | Good | Good | Good | Good |

| Component | Comparative Example M1 | Comparative Example M2 | Comparative Example M3 | Comparative Example M4 | Comparative Example M5 | Comparative Example M6 | Comparative Example M7 | Comparative Example M8 | Comparative Example M9 |
|---|---|---|---|---|---|---|---|---|---|
| Dk | Good | Good | Good | Good | Poor | Poor | Poor | Poor | Poor |

Good: Dk ≥2.25
Fair: 2.10 ≤ Dk < 2.25
Poor: Dk <2.10

The results in Tables 143 to 145 showed that Examples M1 to M5 were excellent in ozone-gas resistance, light resistance, and color development properties. On the other hand, Comparative Examples M1 to M4 were excellent in color development properties but inferior in ozone-gas resistance and light resistance to Examples M1 to M4. Comparative Examples M5 to M9 were poor in ozone-gas resistance and color development properties, with Comparative Examples M6 and M9 being excellent in light resistance. These results showed the superiority of Examples M1 to M5 that were excellent in ozone-gas resistance, light resistance, and color development properties.

Example N and Comparative Example N

Synthesis Example N1

To 675.0 parts of water, 115.0 parts of the compound of a formula (q2) below, 98.0 parts of the compound of a formula (q3) below, 61.0 parts of a 48% aqueous sodium hydroxide solution, and 11.0 parts of ethylene glycol were added. The resultant was stirred at 98° C. for 10 hours to complete a condensation reaction. To the resulting reaction mixture, 280.0 parts of water was added, and the fluid temperature was adjusted to 85 to 88° C. Thereto, 12.0 parts of glucose was added, followed by stirring for 2 hours to complete a reduction reaction. Subsequently, hydrochloric acid was used to adjust the pH to pH9.0 to pH9.5, and then sodium chloride was used for salting-out, followed by filtration. The resulting cake as a whole was dissolved in 2000 parts of water, and then 2000.0 parts of methanol was added for crystallization. The resulting crystal was filtrated and separated, and thereby achieving desalting. The resulting crystal was dried to obtain 192.0 parts of a compound represented by a formula (q4) below. The compound had the maximum absorbance in water at a wavelength (λmax) of 413 nm.

(q2)
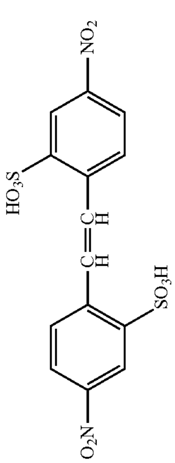
(q3)
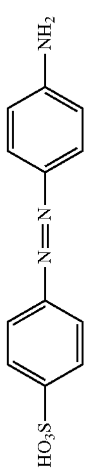
(q4)
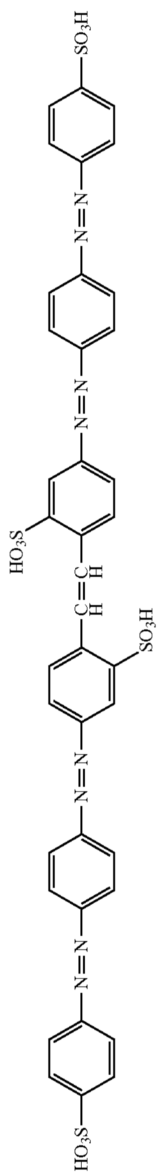

Example N1

The compound of a formula (3) below as the component (A), the compound of a formula (n7) below as the component (B) (m=1.7 to 3.2, n=0.5 to 2.0, and the rest were sulfo groups), and the formula (q4) and a formula (a2) below as the component (C) were used. The components were mixed according to the composition ratio shown in Table 146 below, stirred for about 1 hour to dissolve the solid content, and then filtrated through a 0.45-μm membrane filter (trade name, cellulose acetate filter paper, manufactured by Advantec) to give a black ink composition for testing. The compound of the formula (3) is the compound (21) in International Publication No. WO 2006/051850 publication, obtained by carrying out a method described in the document. The compound of the formula (n7) was obtained by synthesis according to a method described in Example 1 in International Publication No. WO 2004/087815 publication. The compound of the formula (a2) was obtained by synthesis according to a method described in International Publication No. WO 2006/001274.

(3)

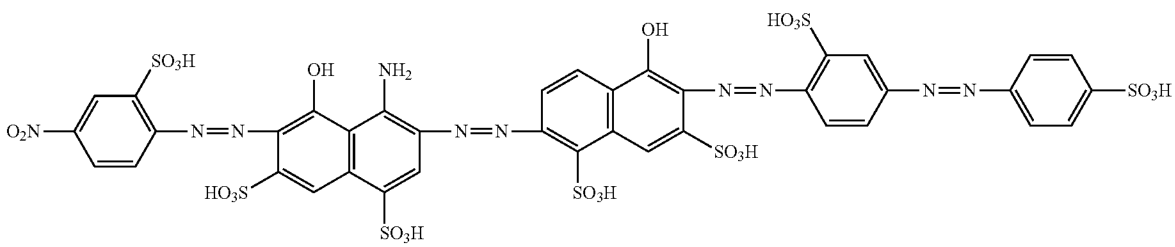

(n7)

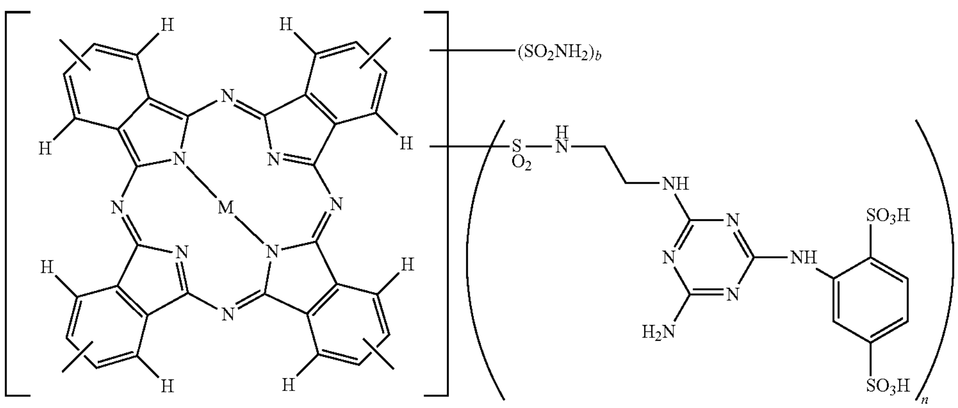

(a2)

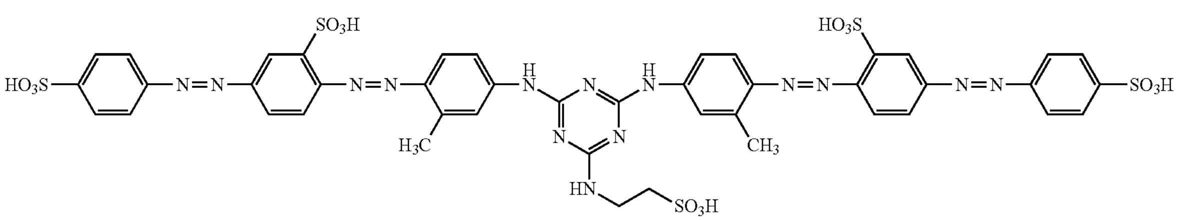

TABLE 146

| Component | Parts | | | | | | | |
|---|---|---|---|---|---|---|---|---|
| | Example 1 | Example 2 | Example 3 | Comparative Example 1 | Comparative Example 2 | Comparative Example 3 | Comparative Example 4 | Comparative Example 5 |
| Compound (3) | 3.00 | 3.00 | 3.00 | 3.75 | 3.00 | | | |
| Compund (a2) | 0.15 | 0.15 | 0.15 | 0.15 | 0.15 | 0.15 | 0.15 | 0.15 |
| Compound (q4) | 0.10 | 0.10 | 0.10 | 0.10 | 0.10 | 0.10 | 0.10 | 0.10 |
| C.I. food Black 2 | | | | | | 3.00 | 3.00 | 3.00 |
| Direct Blue 87 | | | | | 0.75 | | | |
| Compound (n7) | 0.75 | | | | | 0.75 | | |
| Compound (n8) | | 0.75 | | | | | 0.75 | |
| Compound (n9) | | | 0.75 | | | | | 0.75 |
| Glycerol | 10.00 | 10.00 | 10.00 | 10.00 | 10.00 | 10.00 | 10.00 | 10.00 |
| 3-Methyl-1,3-butanediol | 5.00 | 5.00 | 5.00 | 5.00 | 5.00 | 5.00 | 5.00 | 5.00 |
| 2-(2-Methoxyethoxy)ethanol | 5.00 | 5.00 | 5.00 | 5.00 | 5.00 | 5.00 | 5.00 | 5.00 |

TABLE 146-continued

| Component | Parts | | | | | | | |
|---|---|---|---|---|---|---|---|---|
| | Example 1 | Example 2 | Example 3 | Comparative Example 1 | Comparative Example 2 | Comparative Example 3 | Comparative Example 4 | Comparative Example 5 |
| SF-440 | 0.10 | 0.10 | 0.10 | 0.10 | 0.10 | 0.10 | 0.10 | 0.10 |
| 90% TEA | 0.05 | 0.05 | 0.05 | 0.05 | 0.05 | 0.05 | 0.05 | 0.05 |
| Proxel GXL (S) | 0.05 | 0.05 | 0.05 | 0.05 | 0.05 | 0.05 | 0.05 | 0.05 |
| Water | 75.80 | 75.80 | 75.80 | 75.80 | 75.80 | 75.80 | 75.80 | 75.80 |

Example N2

A black ink composition for testing was prepared in the same manner as in Example N1 except that, as the component (B), the compound represented by a formula (n8) below (m=2, n=2) was used instead of the compound represented by the formula (n7). The compound of the formula (n8) is a compound described in Example 1 in Japanese Patent No. 4420267, obtained by carrying out a method described in the document.

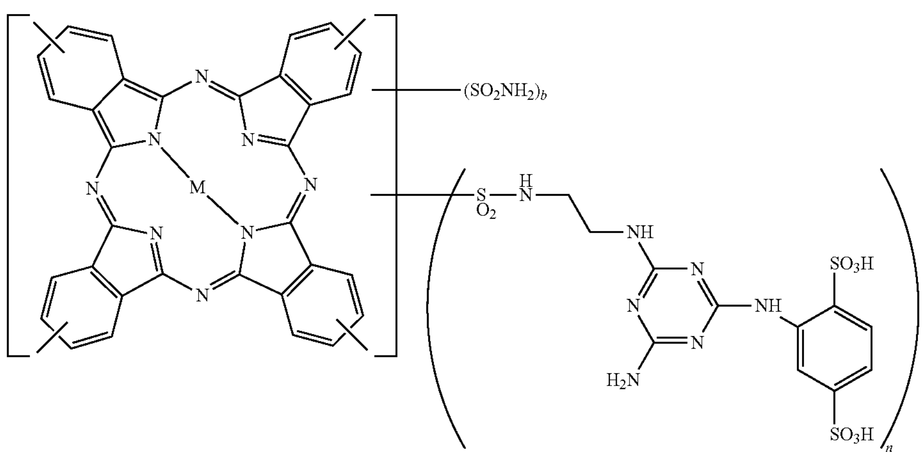

(n8)

Example N3

A black ink composition for testing was prepared in the same manner as in Example N1 except that, as the component (B), a compound obtained by synthesis according to a method described in Example 3 in International Publication No. WO 2004/087815 publication was used instead of the compound of the formula (n7). A compound according to a method described in Example 3 in the reference was used as a compound (n9) (m=0.8 to 3.0, n=0.7 to 2.9, and the rest were sulfo groups).

Comparative Example N1

As a black ink composition for comparison, an ink for comparison was prepared in the same manner as in Example N1 except that 3.75% of the coloring matter of the formula (3) was used and no coloring matter as the component (B) was added. The following various tests performed on the ink constitute Comparative Example N1.

Comparative Example N2

As a black ink composition for comparison, an ink for comparison was prepared in the same manner as in Example N1 except that C. I. Direct Blue 87 was used instead of the coloring matter as the component (B). The following various tests performed on the ink constitute Comparative Example N2.

Comparative Example N3

As a black ink composition for comparison, an ink for comparison was prepared in the same manner as in Example N1 except that C. I. Food Black 2 was used instead of the component (A). The following various tests performed on the ink constitute Comparative Example N3.

Comparative Example N4

As a black ink composition for comparison, an ink for comparison was prepared in the same manner as in Example N2 except that C. I. Food Black 2 was used instead of the component (A). The following various tests performed on the ink constitute Comparative Example N4.

Comparative Example N5

As a black ink composition for comparison, an ink for comparison was prepared in the same manner as in Example N3 except that C. I. Food Black 2 was used instead of the component (A). The following various tests performed on the ink constitute Comparative Example N5.

[(A) Ink-Jet Recording]

Using the ink composition obtained in each of Examples N1 to N3 and Comparative Examples N1 to N5, ink-jet recording was performed on the following printing paper using an ink-jet printer (trade name, EPSON, PX-105).

Glossy paper: manufactured by Canon, trade name Canon Photo Paper Glossy Gold GL-101A450

Upon printing, an image pattern was produced such that the tone of reflecting density could be yielded with the gradations in the 10 steps of 100%, 90%, 80%, 70%, 60%, 50%, 40%, 30%, 20%, and 10%, and then a recorded matter with the gradations from deep black to light black was obtained for use as a test piece for hue evaluation, followed by evaluation tests performed as described below. Then, a lattice image pattern with reflecting density of 100% and 0% was produced, and then a recorded matter with a black-and-white lattice was obtained for use as a test piece for moisture resistance evaluation, followed by evaluation tests performed as described below. Each printing was performed on a gray scale, and therefore recording liquids other than a black recording liquid, in other words, yellow, cyan, and magenta recording liquids, were not concurrently used.

[(C) Evaluation]

The recorded image obtained by using the aqueous ink composition of the present invention was tested for changes in recorded-image density with a colorimeter (trade name: SpectroEye, manufactured by GRETAG-MACBETH). Colorimetry was carried out under the conditions of D65 light source, DIN NB density standard, and 2° observer angle.

[Evaluation of Ozone-Gas Resistance]

After printing, the recorded image obtained by using the ink of each of Examples N1 to N3 and Comparative Examples N1 to N5 was air dried for 24 hours. Then, the test pieces were placed and left in Ozone Weather Meter (trade name, manufactured by Suga Test Instruments Co., Ltd.) under the conditions at an ozone concentration of 10 ppm, humidity of 50% RH, and a temperature of 23° C. for 24 hours.

After the completion of the test, colorimetry was performed with the colorimeter, and then a color difference (ΔE) was determined by $((L^*\text{after test}-L^*\text{before test})^2+(a^*\text{after test}-a^*\text{before test})^2+(b^*\text{after test}-b^*\text{before test})^2)^{1/2}$, followed by evaluation according to the following criteria. Evaluation indicates that a test piece having a reading of a small value has little change in color due to color fading and is excellent.

The results are shown in Table 147 below.

TABLE 147

| Component | Example N1 | Example N2 | Example N3 | Comparative Example N1 | Comparative Example N2 | Comparative Example N3 | Comparative Example N4 | Comparative Example N5 |
|---|---|---|---|---|---|---|---|---|
| ΔE | Good | Good | Good | Fair | Poor | Poor | Poor | Poor |

Good: ΔE <16.0
Fair: 16.0 ≤ ΔE < 20.0
Poor: 20.0 ≤ ΔE

[Evaluation of Light Resistance]

After printing, the recorded image obtained by using the ink of each of Examples N1 to N3 and Comparative Examples N1 to N5 was air dried for 24 hours. Then, the test pieces were placed and left in Xenon Weather Meter XL75 (trade name, manufactured by Suga Test Instruments Co., Ltd.) under the conditions at illuminance of 100 klux, humidity of 60% RH, and a temperature of 24° C. for 168 hours.

After the completion of the test, colorimetry was performed with the colorimeter, and then a color difference (ΔE) was determined by $((L^*\text{after test}-L^*\text{before test})^2+(a^*\text{after test}-a^*\text{before test})^2+(b^*\text{after test}-b^*\text{before test})^2)^{1/2}$, followed by evaluation according to the following criteria. Evaluation indicates that a test piece having a reading of a small value has little change in color due to color fading and is excellent.

The results are shown in Table 148 below.

TABLE 148

| Component | Example N1 | Example N2 | Example N3 | Comparative Example N1 | Comparative Example N2 | Comparative Example N3 | Comparative Example N4 | Comparative Example N5 |
|---|---|---|---|---|---|---|---|---|
| ΔE | Good | Good | Good | Poor | Poor | Poor | Poor | Poor |

Good: ΔE <18.0
Fair: 18.0 ≤ ΔE < 20.0
Poor: 20.0 ≤ ΔE

[Evaluation of Color Development Properties]

After printing, the recorded image obtained by using the ink of each of Examples N1 to N5 and Comparative Examples N1 to N9 was air dried for 24 hours. After drying, colorimetry was performed with the colorimeter, followed by evaluation according to the following criteria. Evaluation indicates that a test piece having a high Dk value has great color development properties and is excellent.

The results are shown in Table 149 below.

TABLE 149

| Component | Example N1 | Example N2 | Example N3 | Comparative Example N1 | Comparative Example N2 | Comparative Example N3 | Comparative Example N4 | Comparative Example N5 |
|---|---|---|---|---|---|---|---|---|
| Dk | Good | Good | Good | Good | Good | Poor | Poor | Poor |

Good: Dk ≥2.25
Fair: 2.10 ≤ Dk < 2.25
Poor: Dk <2.10

The results in Tables 147 to 149 showed that Examples N1 to N3 were excellent in ozone-gas resistance, light resistance, and color development properties. On the other hand, Comparative Examples N1 and N2 were excellent in color development properties but inferior to Examples N1 to N3 in ozone-gas resistance and light resistance. Comparative Examples N3 to N5 were poor in both of ozone-gas resistance and color development properties. These results showed the superiority of Examples N1 to N3 that were excellent in ozone-gas resistance, light resistance, and color development properties.

Example and Comparative Example O

Example O1

The compound of a formula (3) below as the component (A), the compound of a formula (o6) below as the component (B), and the compound of a formula (a2) below as the component (C) were used. The components were mixed according to the composition ratio shown in Table 150 below, stirred for about 1 hour to dissolve the solid content, and then filtrated through a 0.45-μm membrane filter (trade name, cellulose acetate filter paper, manufactured by Advantec) to give a black ink composition for testing. The compound of the formula (3) is the compound (21) in International Publication No. WO 2006/051850 publication, obtained by carrying out a method described in the document. The compound of the formula (o6) is the compound (3) in Japanese Patent Application Publication No. H10-306221, obtained by carrying out a method described in the document. The compound of the formula (a2) is the compound (11) in International Publication No. WO 2006/001274, obtained by carrying out a method described in the document.

It should be noted that, in Table 150, SF-465 refers to Surfynol® 465 (manufactured by Air Products and Chemicals, Inc.).

(3)

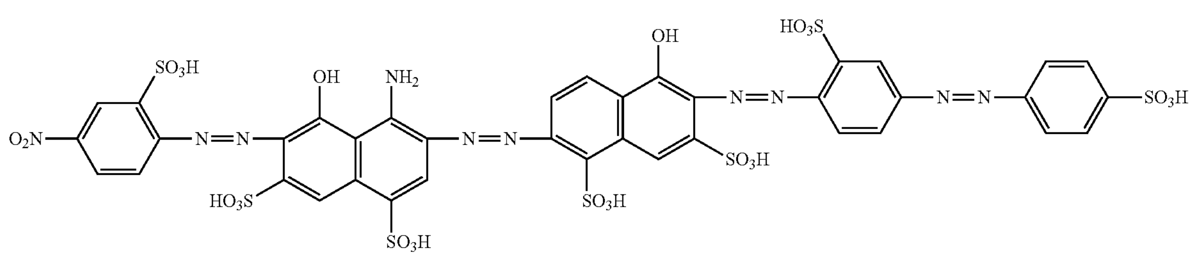

(o6)

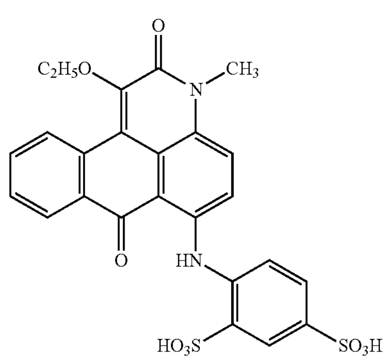

-continued (a2)

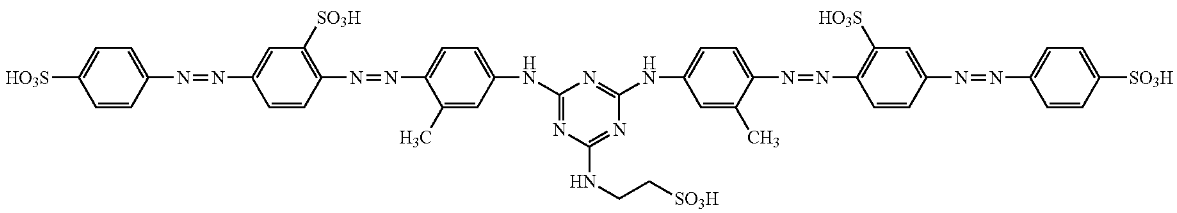

TABLE 150

| | Parts | | | | | | | | | | | | | |
|---|---|---|---|---|---|---|---|---|---|---|---|---|---|---|
| | Example | | | | | | Comparative Examples | | | | | | | |
| | O1 | O2 | O3 | O4 | O5 | O6 | O1 | O2 | O3 | O4 | O5 | O6 | O7 | O8 |
| Compound (3) | 3.00 | 3.00 | 3.00 | 3.00 | 3.00 | 3.00 | 3.00 | 3.00 | — | — | — | — | — | — |
| Compound (o6) | 0.75 | — | — | — | — | — | — | — | 0.75 | — | — | — | — | — |
| Compound (a2) | 0.15 | 0.15 | 0.15 | 0.15 | 0.15 | 0.15 | 0.15 | 0.15 | 0.15 | 0.15 | 0.15 | 0.15 | 0.15 | 0.15 |
| Compound (o7) | — | 0.75 | — | — | — | — | — | — | — | 0.75 | — | — | — | — |
| Compound (o8) | — | — | 0.75 | — | — | — | — | — | — | — | 0.75 | — | — | — |
| Compound (o9) | — | — | — | 0.75 | — | — | — | — | — | — | — | 0.75 | — | — |
| Compound (o10) | — | — | — | — | 0.75 | — | — | — | — | — | — | — | 0.75 | — |
| Compound (o11) | — | — | — | — | — | 0.75 | — | — | — | — | — | — | — | 0.75 |
| C.I. Acid Red 1 | — | — | — | — | — | — | 0.75 | — | — | — | — | — | — | — |
| C.I. Acid Red 27 | — | — | — | — | — | — | — | 0.75 | — | — | — | — | — | — |
| C.I. Food Black 2 | — | — | — | — | — | — | — | — | 3.00 | 3.00 | 3.00 | 3.00 | 3.00 | 3.00 |
| Diglycerin | 10.00 | 10.00 | 10.00 | 10.00 | 10.00 | 10.00 | 10.00 | 10.00 | 10.00 | 10.00 | 10.00 | 10.00 | 10.00 | 10.00 |
| Triethylene glycol monomethyl ether | 5.00 | 5.00 | 5.00 | 5.00 | 5.00 | 5.00 | 5.00 | 5.00 | 5.00 | 5.00 | 5.00 | 5.00 | 5.00 | 5.00 |
| 1,2,6-Hexanetriol | 5.00 | 5.00 | 5.00 | 5.00 | 5.00 | 5.00 | 5.00 | 5.00 | 5.00 | 5.00 | 5.00 | 5.00 | 5.00 | 5.00 |
| SF-420 | 0.15 | 0.15 | 0.15 | 0.15 | 0.15 | 0.15 | 0.15 | 0.15 | 0.15 | 0.15 | 0.15 | 0.15 | 0.15 | 0.15 |
| 90% TEA | 0.05 | 0.05 | 0.05 | 0.05 | 0.05 | 0.05 | 0.05 | 0.05 | 0.05 | 0.05 | 0.05 | 0.05 | 0.05 | 0.05 |
| Proxel XL (s) | 0.05 | 0.05 | 0.05 | 0.05 | 0.05 | 0.05 | 0.05 | 0.05 | 0.05 | 0.05 | 0.05 | 0.05 | 0.05 | 0.05 |
| Sodium hydroxide + ion-exchanged water | 75.85 | 75.85 | 75.85 | 75.85 | 75.85 | 75.85 | 75.85 | 75.85 | 75.85 | 75.85 | 75.85 | 75.85 | 75.85 | 75.85 |
| Total | 100.00 | 100.00 | 100.00 | 100.00 | 100.00 | 100.00 | 100.00 | 100.00 | 100.00 | 100.00 | 100.00 | 100.00 | 100.00 | 100.00 |

Example O2

As an example, an ink was prepared in the same manner as in Example O1 except that no coloring matter of the formula (o6) was used and the coloring matter of a formula (o7) below was used. The following various tests performed on the ink constitute Example O2. The compound of the formula (o7) is the compound (13) in International Publication No. WO 2004/104108 publication, obtained by carrying out a method described in the document.

(o7)

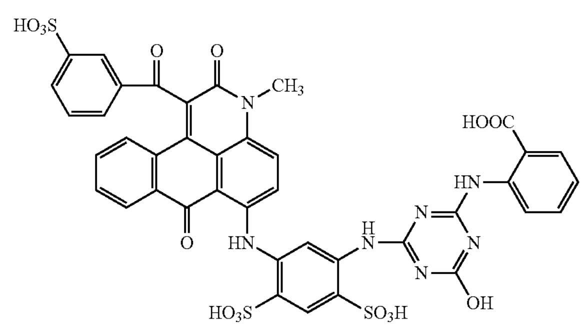

Example O3

As an example, an ink was prepared in the same manner as in Example O1 except that no coloring matter of the formula (o6) was used and the coloring matter of a formula (o8) below was used. The following various tests performed on the ink constitute Example O3. The compound of the formula (o8) is the compound (1) in Japanese Patent No. 5328354 publication, obtained by carrying out a method described in the document.

(o8)

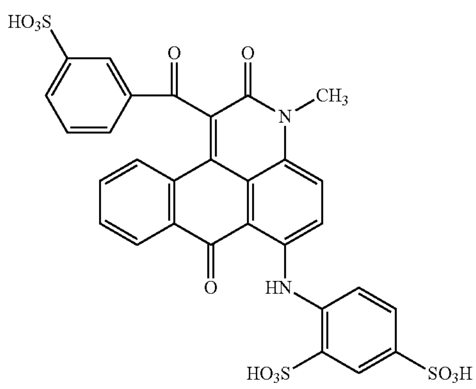

(o9)

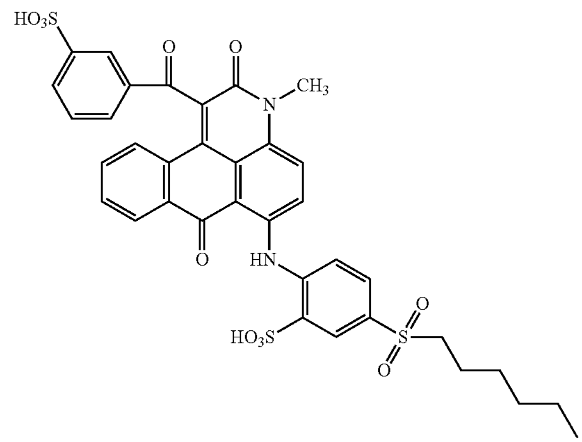

Example O5

As an example, an ink was prepared in the same manner as in Example O1 except that no coloring matter of the formula (o6) was used and the coloring matter of a formula (o10) below was used. The following various tests performed on the ink constitute Example O5. The compound of the formula (o10) is the compound (16) in International Publication No. WO 2009/060654 publication, obtained by carrying out a method described in the document.

(o10)

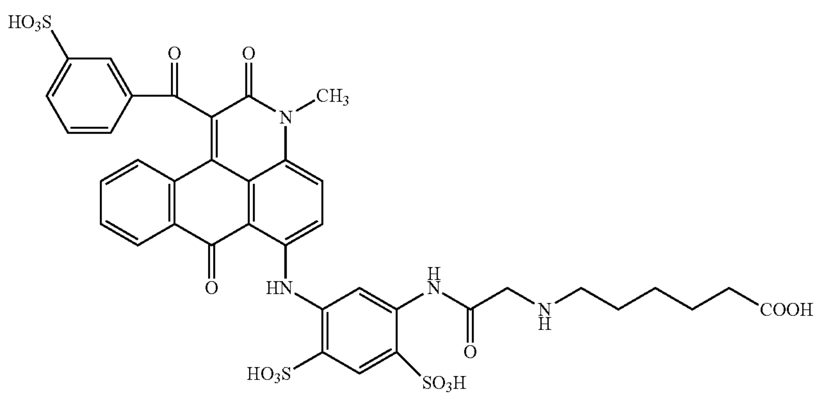

Example O4

As an example, an ink was prepared in the same manner as in Example O1 except that no coloring matter of the formula (o6) was used and the coloring matter of a formula (o9) below was used. The following various tests performed on the ink constitute Example O4. The compound of the formula (o9) is the compound (7) in Japanese Patent No. 5337716 publication, obtained by carrying out a method described in the document.

Example O6

As an example, an ink was prepared in the same manner as in Example O1 except that no coloring matter of the formula (o6) was used and the coloring matter of a formula (oil) below was used. The following various tests performed on the ink constitute Example O6. The compound of the formula (oil) is the compound (1) in Japanese Patent Application Publication No. 2001-139836, obtained by carrying out a method described in the document.

(o11)

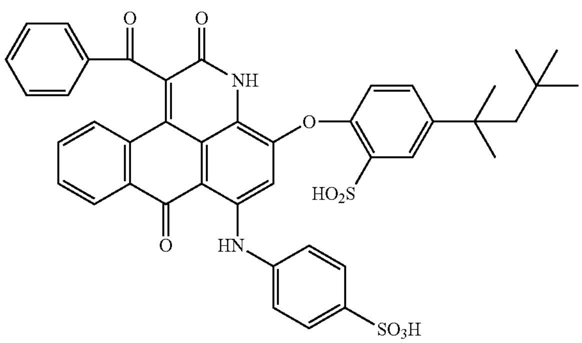

Comparative Example O1

As a black ink composition for comparison, an ink of a comparative example was prepared in the same manner as in Example O1 except that C. I. Acid Red 1 was used instead of the component (B). The following various tests performed on the ink constitute Comparative Example O1. It should be noted that C. I. Acid Red 1 used was a commercially available product.

Comparative Example O2

As a black ink composition for comparison, an ink of a comparative example was prepared in the same manner as in Example O1 except that C. I. Acid Red 27 was used instead of the component (B). The following various tests performed on the ink constitute Comparative Example O1. It should be noted that C. I. Acid Red 27 used was a commercially available product.

Comparative Example O3

As a black ink composition for comparison, an ink of a comparative example was prepared in the same manner as in Example O1 except that C. I. Food Black 2 was used instead of the component (A). The following various tests performed on the ink constitute Comparative Example O3. It should be noted that C. I. Food Black 2 used was a commercially available product.

Comparative Example O4

As a black ink composition for comparison, an ink of a comparative example was prepared in the same manner as in Example O2 except that C. I. Food Black 2 was used instead of the component (A). The following various tests performed on the ink constitute Comparative Example O4.

Comparative Example O5

As a black ink composition for comparison, an ink of a comparative example was prepared in the same manner as in Example O3 except that C. I. Food Black 2 was used instead of the component (A). The following various tests performed on the ink constitute Comparative Example O5.

Comparative Example O6

As a black ink composition for comparison, an ink of a comparative example was prepared in the same manner as in Example O4 except that C. I. Food Black 2 was used instead of the component (A). The following various tests performed on the ink constitute Comparative Example O6.

Comparative Example O7

As a black ink composition for comparison, an ink of a comparative example was prepared in the same manner as in Example O5 except that C. I. Food Black 2 was used instead of the component (A). The following various tests performed on the ink constitute Comparative Example O7.

Comparative Example O8

As a black ink composition for comparison, an ink of a comparative example was prepared in the same manner as in Example O6 except that C. I. Food Black 2 was used instead of the component (A). The following various tests performed on the ink constitute Comparative Example O8.

[(B) Ink-Jet Recording]

Using the ink composition obtained in each of Examples O1 to O6 and Comparative Examples O1 to O8, ink-jet recording was performed on the following printing paper using an ink-jet printer (trade name, EPSON, PX-105).

Glossy paper 1: manufactured by Canon Inc., trade name Photo Paper Glossy Pro [Platinum Grade]

Upon printing, an image pattern was produced such that the tone of reflecting density could be yielded with the gradations in the 10 steps of 100%, 90%, 80%, 70%, 60%, 50%, 40%, 30%, 20%, and 10%, and then a recorded matter with the gradations from deep black to light black was obtained for use as a test piece for hue evaluation, followed by evaluation tests performed as described below. Then, a lattice image pattern with reflecting density of 100% and 0% was produced, and then a recorded matter with a black-and-white lattice was obtained for use as a test piece for moisture resistance evaluation, followed by evaluation tests performed as described below. Each printing was performed on a gray scale, and therefore recording liquids other than a black recording liquid, in other words, yellow, cyan, and magenta recording liquids, were not concurrently used.

[(C) Evaluation]

The recorded image obtained by using the aqueous ink composition of the present invention was tested for changes in recorded-image density with a colorimeter (trade name: SpectroEye, manufactured by GRETAG-MACBETH). Colorimetry was carried out under the conditions of D65 light source, DIN NB density standard, and 2° observer angle.

[Evaluation of Color Development Properties]

After printing, the recorded image obtained by using the ink of each of Examples O1 to O6 and Comparative Examples O1 to O8 was air dried for 24 hours, and was then subjected to colorimetry with the colorimeter to obtain a Dk value at 100%, followed by evaluation according to the following criteria. Evaluation indicates that a test piece having a reading of a great numerical value has great color development properties and is excellent.

The results are shown in Table 151 below.

TABLE 151

| | Example | | | | | |
|---|---|---|---|---|---|---|
| | O1 | O2 | O3 | O4 | O5 | O6 |
| Glossy paper 1 | Good | Good | Good | Good | Good | Good |

| | Comparative Example | | | | | | | |
|---|---|---|---|---|---|---|---|---|
| | O1 | O2 | O3 | O4 | O5 | O6 | O7 | O8 |
| Glossy paper 1 | Good | Good | Poor | Poor | Poor | Poor | Poor | Poor |

Good: Dk value of not smaller than 2.25
Fair: Dk value of not smaller than 1.90 and smaller than 2.25
Poor: Dk value of smaller than 1.90

[Evaluation of Ozone-Gas Resistance]

After printing, the recorded image obtained by using the ink of each of Examples O1 to O6 and Comparative Examples O1 to O8 was air dried for 24 hours. Then, the test pieces were placed and left in Ozone Weather Meter (trade name, manufactured by Suga Test Instruments Co., Ltd.) under the conditions at an ozone concentration of 40 ppm, humidity of 60% RH, and a temperature of 24° C. for 24 hours.

After the completion of the test, colorimetry was performed with the colorimeter, and then a ratio of the residual coloring matter was determined by (reflecting density Dk after test/reflecting density Dk before test)×100(%), followed by evaluation according to the following criteria. Evaluation indicates that a test piece having a high residual ratio has little color fading due to ozone and is excellent. The results are shown in Table 152 below.

TABLE 152

| | Example | | | | | |
|---|---|---|---|---|---|---|
| | O1 | O2 | O3 | O4 | O5 | O6 |
| Glossy paper 1 | Good | Good | Good | Good | Good | Good |

| | Comparative Example | | | | | | | |
|---|---|---|---|---|---|---|---|---|
| | O1 | O2 | O3 | O4 | O5 | O6 | O7 | O8 |
| Glossy paper 1 | Poor | Poor | Poor | Poor | Poor | Poor | Poor | Poor |

Good: residual ratio of not lower than 73%
Fair: residual ratio of not lower than 70% and lower than 73%
Poor: residual ratio of lower than 70%

The results in Table 151 showed that Examples O1 to O6 and Comparative Examples O1 and O2 were excellent in color development properties. On the other hand, Comparative Examples O3 to O8 were greatly inferior to Examples O1 to O6. The results in Table 152 showed that Examples O1 to O6 were excellent in ozone-gas resistance. On the other hand, Comparative Examples O1 to O8 were inferior to Examples O1 to O6. These results showed the superiority of the examples that were excellent in both color development properties and ozone-gas resistance.

Example P and Comparative Example P

Example P1

The compound of a formula (3) below as the component (A), the compound of a formula (p2) below as the component (B), and the compound of a formula (a2) below as the component (C) were used. The components were mixed according to the composition ratio shown in Table 153 below, stirred for about 1 hour to dissolve the solid content, and then filtrated through a 0.45-μm membrane filter (trade name, cellulose acetate filter paper, manufactured by Advantec) to give a black ink composition for testing. The compound of the formula (3) is the compound (21) in International Publication No. WO 2006/051850 publication, obtained by carrying out a method described in the document. The compound of the formula (p2) is the compound (2) in International Publication No. WO 2008/066062 publication, obtained by carrying out a method described in the document. The compound of the formula (a2) is the compound (11) in International Publication No. WO 2006/001274, obtained by carrying out a method described in the document.

It should be noted that, in Table 153, SF-465 refers to Surfynol® 465 (manufactured by Air Products and Chemicals, Inc.).

(3)

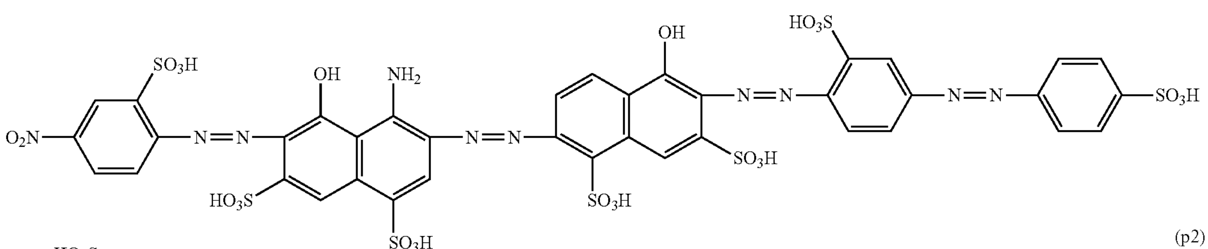

(p2)

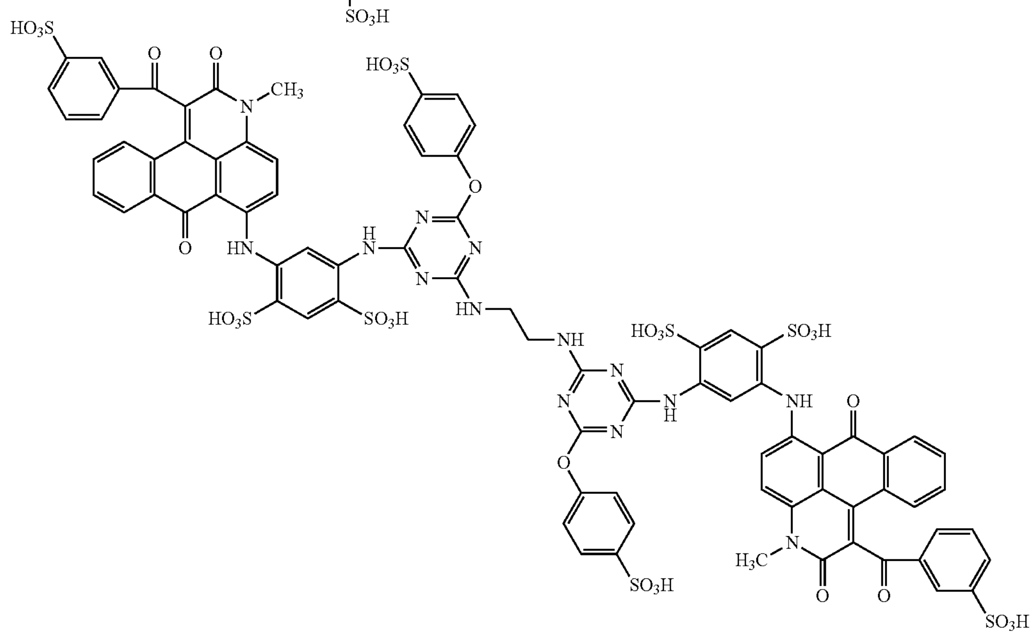

-continued (a2)

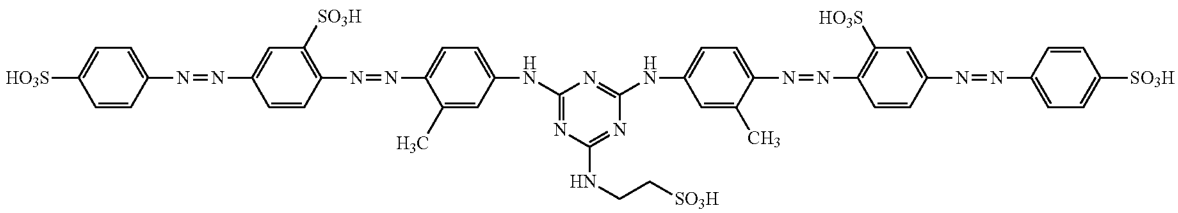

TABLE 153

| | Parts | | | | | | | | | | | |
|---|---|---|---|---|---|---|---|---|---|---|---|---|
| | Example | | | | Comparative Example | | | | | | | |
| | P1 | P2 | P3 | P4 | P1 | P2 | P3 | P4 | P5 | P6 | P7 | P8 |
| Compound (3) | 3.00 | 3.00 | 3.00 | 3.00 | 3.00 | 3.00 | 3.00 | 3.00 | — | — | — | — |
| Compound (p2) | 0.75 | — | — | — | — | — | — | — | 0.75 | — | — | — |
| Compound (a2) | 0.15 | 0.15 | — | — | 0.15 | 0.15 | — | — | 0.15 | 0.15 | — | — |
| Compound (p3) | — | 0.75 | — | — | — | — | — | — | — | 0.75 | — | — |
| Compound (p4) | — | — | 0.75 | — | — | — | — | — | — | — | 0.75 | — |
| Compound (b4) | — | — | 0.15 | 0.15 | — | — | 0.15 | 0.15 | — | — | 0.15 | 0.15 |
| Compound (p5) | — | — | — | 0.75 | — | — | — | — | — | — | — | 0.75 |
| C.I. Acid Red 1 | — | — | — | — | 0.75 | — | 0.75 | — | — | — | — | — |
| C.I. Acid Red 27 | — | — | — | — | — | 0.75 | — | 0.75 | — | — | — | — |
| C.I. Food Black 2 | — | — | — | — | — | — | — | — | 3.00 | 3.00 | 3.00 | 3.00 |
| Diglycerin | 10.00 | 10.00 | 10.00 | 10.00 | 10.00 | 10.00 | 10.00 | 10.00 | 10.00 | 10.00 | 10.00 | 10.00 |
| Triethylene glycol monomethyl ether | 5.00 | 5.00 | 5.00 | 5.00 | 5.00 | 5.00 | 5.00 | 5.00 | 5.00 | 5.00 | 5.00 | 5.00 |
| 1,2,6-Hexanetriol | 5.00 | 5.00 | 5.00 | 5.00 | 5.00 | 5.00 | 5.00 | 5.00 | 5.00 | 5.00 | 5.00 | 5.00 |
| SF-420 | 0.15 | 0.15 | 0.15 | 0.15 | 0.15 | 0.15 | 0.15 | 0.15 | 0.15 | 0.15 | 0.15 | 0.15 |
| 90% TEA | 0.05 | 0.05 | 0.05 | 0.05 | 0.05 | 0.05 | 0.05 | 0.05 | 0.05 | 0.05 | 0.05 | 0.05 |
| Proxel XL (s) | 0.05 | 0.05 | 0.05 | 0.05 | 0.05 | 0.05 | 0.05 | 0.05 | 0.05 | 0.05 | 0.05 | 0.05 |
| Sodium hydroxide + ion-exchanged water | 75.85 | 75.85 | 75.85 | 75.85 | 75.85 | 75.85 | 75.85 | 75.85 | 75.85 | 75.85 | 75.85 | 75.85 |
| Total | 100.00 | 100.00 | 100.00 | 100.00 | 100.00 | 100.00 | 100.00 | 100.00 | 100.00 | 100.00 | 100.00 | 100.00 |

Example P2

As a black ink composition of an example, an ink was prepared in the same manner as in Example P1 except that the coloring matter represented by a formula (p3) below was used instead of the coloring matter represented by the formula (p2). The following various tests performed on the ink constitute Example P2. The compound of the formula (p3) is the compound (10) in Japanese Patent Application Publication No. 2010-006969, obtained by carrying out a method described in the document.

(p3)

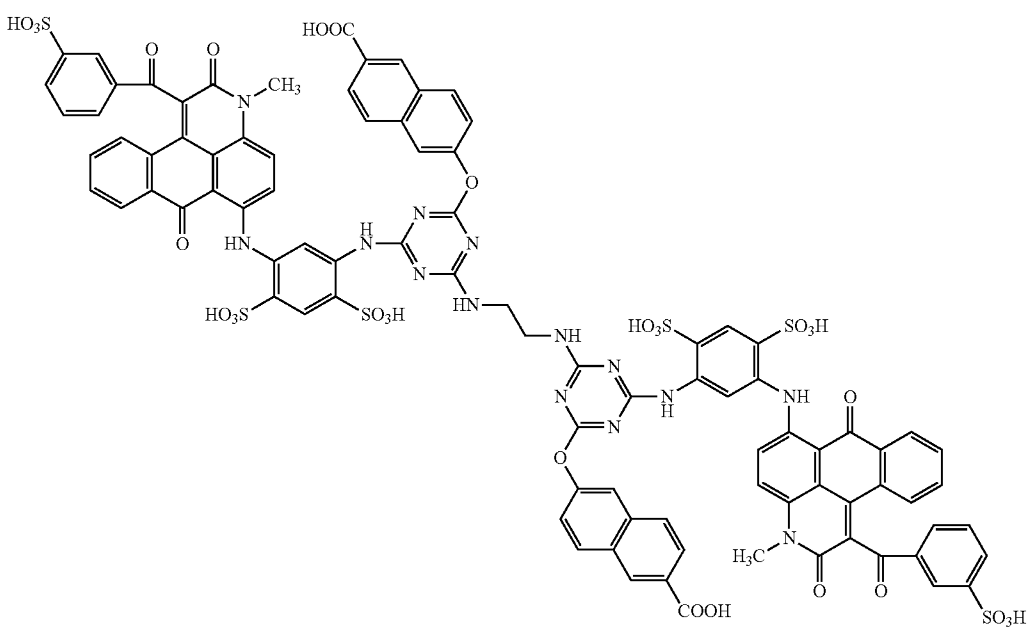

Example P3

As a black ink composition of an example, an ink was prepared in the same manner as in Example P1 except that the coloring matter of a formula (p4) below was used instead of the coloring matter represented by the formula (p2) and the coloring matter of a formula (b4) below was used instead of the coloring matter represented by the formula (a2). The following various tests performed on the ink constitute Example P3. The compound of the formula (p4) is the compound (16) in Japanese Patent Application Publication No. 2003-192930, obtained by carrying out a method described in the document. The compound of the formula (b4) is the compound (31) in International Publication No. WO 2012/002317 publication, obtained by carrying out a method described in the document.

(p4)

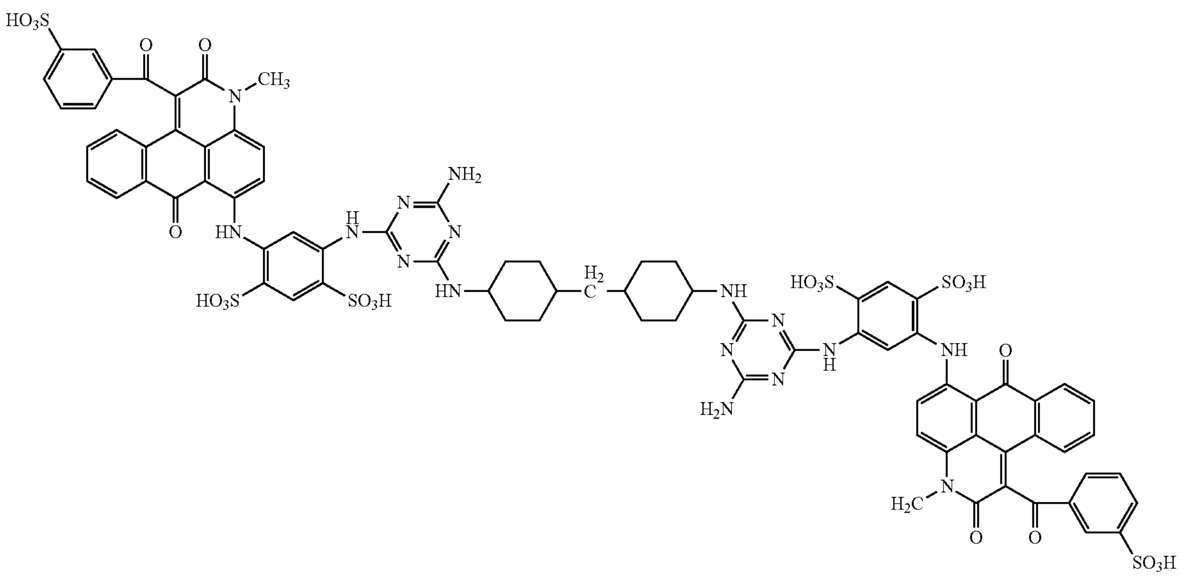

(b4)

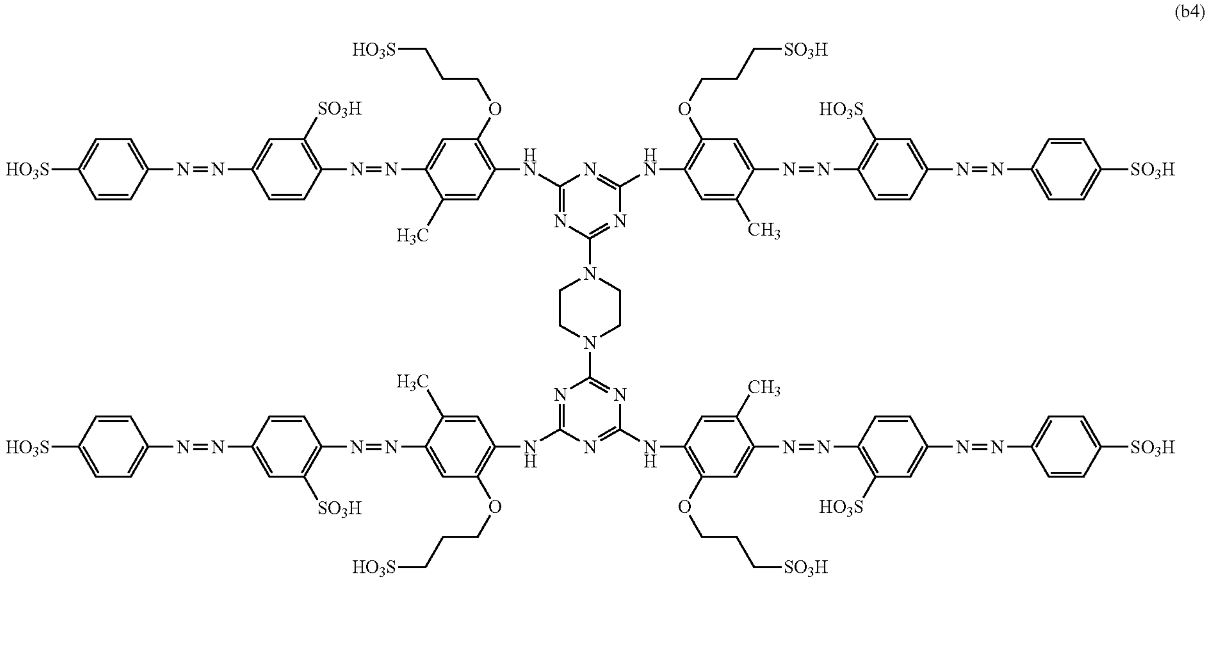

Example P4

As a black ink composition of an example, an ink was prepared in the same manner as in Example P3 except that the coloring matter of a formula (p5) below was used instead of the coloring matter represented by the formula (p4). The following various tests performed on the ink constitute Example P4. The compound of the formula (p5) is the compound (5) in International Publication No. WO 2006-075706, obtained by carrying out a method described in the document.

Comparative Example P4

As a black ink composition for comparison, an ink of a comparative example was prepared in the same manner as in Example P3 except that C. I. Acid Red 27 was used instead of the component (B). The following various tests performed on the ink constitute Comparative Example P4. It should be noted that C. I. Acid Red 27 used was a commercially available product.

(p5)

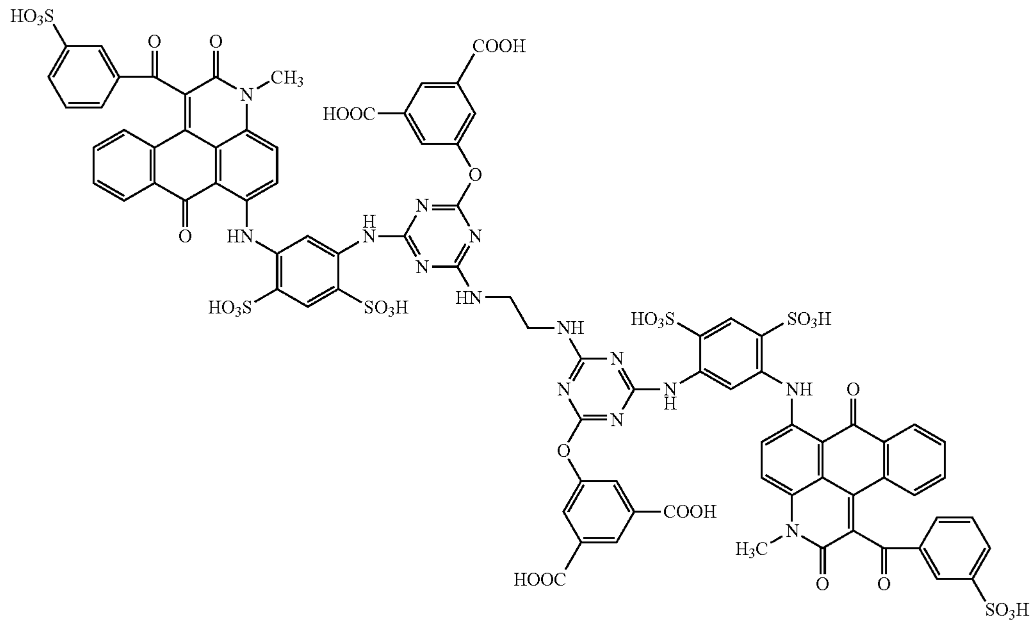

Comparative Example P1

As a black ink composition for comparison, an ink of a comparative example was prepared in the same manner as in Example P1 except that C. I. Acid Red 1 was used instead of the component (B). The following various tests performed on the ink constitute Comparative Example P1. It should be noted that C. I. Acid Red 1 used was a commercially available product.

Comparative Example P2

As a black ink composition for comparison, an ink of a comparative example was prepared in the same manner as in Example P1 except that C. I. Acid Red 27 was used instead of the component (B). The following various tests performed on the ink constitute Comparative Example P2. It should be noted that C. I. Acid Red 27 used was a commercially available product.

Comparative Example P3

As a black ink composition for comparison, an ink of a comparative example was prepared in the same manner as in Example P3 except that C. I. Acid Red 1 was used instead of the component (B). The following various tests performed on the ink constitute Comparative Example P3. It should be noted that C. I. Acid Red 1 used was a commercially available product.

Comparative Example P5

As a black ink composition for comparison, an ink of a comparative example was prepared in the same manner as in Example P1 except that C. I. Food Black 2 was used instead of the component (A). The following various tests performed on the ink constitute Comparative Example P5.

Comparative Example P6

As a black ink composition for comparison, an ink of a comparative example was prepared in the same manner as in Example P2 except that C. I. Food Black 2 was used instead of the component (A). The following various tests performed on the ink constitute Comparative Example P6.

Comparative Example P7

As a black ink composition for comparison, an ink of a comparative example was prepared in the same manner as in Example P3 except that C. I. Food Black 2 was used instead of the component (A). The following various tests performed on the ink constitute Comparative Example P7.

Comparative Example P8

As a black ink composition for comparison, an ink of a comparative example was prepared in the same manner as in Example P4 except that C. I. Food Black 2 was used instead of the component (A). The following various tests performed on the ink constitute Comparative Example P8.

[(B) Ink-Jet Recording]

Using the ink composition obtained in each of Examples P1 to P4 and Comparative Examples P1 to P8, ink-jet recording was performed on the following printing paper using an ink-jet printer (trade name, EPSON, PX-105).

Glossy paper 1: manufactured by Seiko Epson Corporation, trade name Photo Paper Crispia (Highly Glossy)

Glossy paper 2: manufactured by Brother Industries, Ltd., trade name Photograph Glossy Paper BP71G Upon printing, an image pattern was produced such that the tone of reflecting density could be yielded with the gradations in the 10 steps of 100%, 90%, 80%, 70%, 60%, 50%, 40%, 30%, 20%, and 10%, and then a recorded matter with the gradations from deep black to light black was obtained for use as a test piece for hue evaluation, followed by evaluation tests performed as described below. Then, a lattice image pattern with reflecting density of 100% and 0% was produced, and then a recorded matter with a black-and-white lattice was obtained for use as a test piece for moisture resistance evaluation, followed by evaluation tests performed as described below. Each printing was performed on a gray scale, and therefore recording liquids other than a black recording liquid, in other words, yellow, cyan, and magenta recording liquids, were not concurrently used.

[(C) Evaluation]

The recorded image obtained by using the aqueous ink composition of the present invention was tested for changes in recorded-image density with a colorimeter (trade name: SpectroEye, manufactured by GRETAG-MACBETH). Colorimetry was carried out under the conditions of D65 light source, DIN NB density standard, and 2° observer angle.

[Evaluation of Color Development Properties]

After printing, the recorded image obtained by using the ink of each of Examples P1 to P4 and Comparative Examples P1 to P8 was air dried for 24 hours, and was then subjected to colorimetry with the colorimeter to obtain a Dk value at 100%, followed by evaluation according to the following criteria. Evaluation indicates that a test piece having a reading of a great numerical value has great color development properties and is excellent.

The results are shown in Table 154 below.

TABLE 154

| | Example P1 | Example P2 | Example P3 | Example P4 |
|---|---|---|---|---|
| Glossy paper 1 | Good | Good | Good | Good |

| | Comparative Example P1 | P2 | P3 | P4 | P5 | P6 | P7 | P8 |
|---|---|---|---|---|---|---|---|---|
| Glossy paper 1 | Good | Good | Good | Good | Poor | Poor | Poor | Poor |

Good: Dk value of not smaller than 2.28
Fair: Dk value of not smaller than 1.78 and smaller than 2.28
Poor: Dk value of smaller than 1.78

[Evaluation of Ozone-Gas Resistance]

After printing, the recorded image obtained by using the ink of each of Examples P1 to P4 and Comparative Examples P1 to P8 was air dried for 24 hours. Then, the test pieces were placed and left in Ozone Weather Meter (trade name, manufactured by Suga Test Instruments Co., Ltd.) under the conditions at an ozone concentration of 40 ppm, humidity of 60% RH, and a temperature of 24° C. for 24 hours.

After the completion of the test, colorimetry was performed with the colorimeter, and then a ratio of the residual coloring matter was determined by (reflecting density Dk after test/reflecting density Dk before test)×100(%), followed by evaluation according to the following criteria. Evaluation indicates that a test piece having a high residual ratio has little color fading due to ozone and is excellent. The results are shown in Table 155 below.

TABLE 155

| | Example P1 | Example P2 | Example P3 | Example P4 |
|---|---|---|---|---|
| Glossy paper 1 | Good | Good | Good | Good |

| | Comparative Example P1 | P2 | P3 | P4 | P5 | P6 | P7 | P8 |
|---|---|---|---|---|---|---|---|---|
| Glossy paper 1 | Good | Good | Good | Good | Poor | Poor | Poor | Poor |

Good: residual ratio of not lower than 78%
Fair: residual ratio of not lower than 75% and lower than 78%
Poor: residual ratio of lower than 75%

The results in Table 154 showed that Examples P1 to P4 and Comparative Examples P1 to P4 were excellent in color development properties. On the other hand, Comparative Examples P5 to P8 were inferior to Examples P1 to P4. The results in Table 155 showed that Examples P1 to P4 were excellent in ozone-gas resistance. On the other hand, Comparative Examples P1 to P8 were inferior to Examples P1 to P4. These results showed the superiority of Examples P1 to P4 that were excellent in both color development properties and ozone-gas resistance.

Example R and Comparative Example R

Example R1

The compound of a formula (3) below as the component (A) and C. I. Direct Yellow 86 as the component (B) were used. The components were mixed according to the composition ratio shown in Table 156 below, stirred for about 1 hour to dissolve the solid content, and then filtrated through a 0.45-μm membrane filter (trade name, cellulose acetate filter paper, manufactured by Advantec) to give a black ink composition for testing. The compound of the formula (3) is the compound (21) in International Publication No. WO 2006/051850, obtained by carrying out a method described in the document. C. I. Direct Yellow 86, C. I. Direct Yellow 132, and C. I. Direct Yellow 142 were obtained by purchasing commercially available products.

(3)

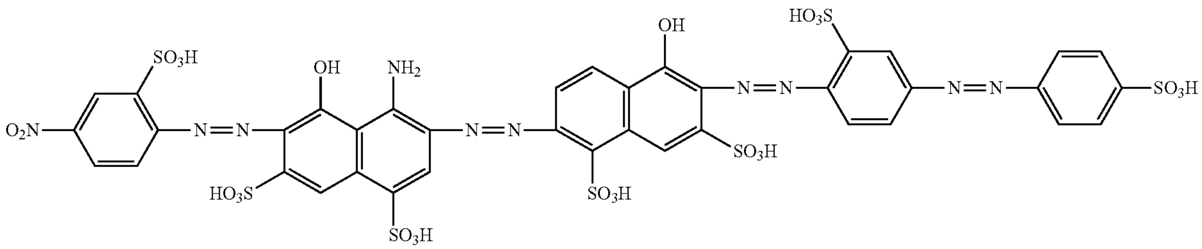

TABLE 156

| Component | Parts | | | | |
|---|---|---|---|---|---|
| | Example R1 | Example R2 | Example R3 | Comparative Example R1 | Comparative Example R2 |
| Compound (3) | 3.0 | 3.0 | 3.0 | 3.0 | 3.0 |
| C.I. Direct Yellow 86 | 1.5 | — | 1.5 | — | — |
| C.I. Direct Yellow 132 | — | 1.5 | — | — | — |
| C.I. Direct Yellow 142 | — | — | — | — | — |
| C.I. Acid Yellow 23 | — | — | — | — | 1.5 |
| Glycerol | 5.0 | 5.0 | 5.0 | 5.0 | 5.0 |
| Urea | 5.0 | 5.0 | 5.0 | 5.0 | 5.0 |
| N-Methyl-2-pyrrolidone | 4.0 | 4.0 | 4.0 | 4.0 | 4.0 |
| Isopropyl alcohol | 3.0 | 3.0 | 3.0 | 3.0 | 3.0 |
| Butyl carbitol | 2.0 | 2.0 | 2.0 | 2.0 | 2.0 |
| Surfactant | 0.1 | 0.1 | 0.1 | 0.1 | 0.1 |
| Sodium hydroxide + ion-exhanged water | 76.4 | 76.4 | 76.4 | 77.9 | 76.4 |
| Total | 100.0 | 100.0 | 100.0 | 100.0 | 100.0 |

Example R2

An ink composition was prepared in the same manner as in Example R1 except that C. I. Direct Yellow 132 was used instead of C. I. Direct Yellow 86.

Example R3

An ink composition was prepared in the same manner as in Example R1 except that C. I. Direct Yellow 142 was used instead of C. I. Direct Yellow 86.

Comparative Example R1

As a black ink composition for comparison, an ink for comparison was prepared in the same manner as in Example R1 except that no coloring matter as the component (B) was used and the amount of sodium hydroxide+ion-exchanged water was increased. The following various tests performed on the ink constitute Comparative Example R1.

Comparative Example R2

As a black ink composition for comparison, an ink of a comparative example was prepared in the same manner as in Example R1 except that C. I. Acid Yellow 23 was used instead of the component (B). The following various tests performed on the ink constitute Comparative Example R2. It should be noted that C. I. Acid Yellow 23 used was a commercially available product.

[(B) Ink-Jet Recording]

Using the ink composition obtained in each of Examples R1 to R3 and Comparative Example R1 and R2, ink-jet recording was performed on the following printing paper using an ink-jet printer (trade name, EPSON, PX-105).

Glossy paper 1: manufactured by EPSON, trade name Crispia

Upon printing, an image pattern was produced such that the tone of reflecting density could be yielded with the gradations in the 10 steps of 100%, 90%, 80%, 70%, 60%, 50%, 40%, 30%, 20%, and 10%, and then a recorded matter with the gradations from deep black to light black was obtained for use as a test piece for hue evaluation, followed by evaluation tests performed as described below. Then, a lattice image pattern with reflecting density of 100% and 0% was produced, and then a recorded matter with a black-and-white lattice was obtained for use as a test piece for moisture resistance evaluation, followed by evaluation tests performed as described below. Each printing was performed on a gray scale, and therefore recording liquids other than a black recording liquid, in other words, yellow, cyan, and magenta recording liquids, were not concurrently used.

[(C) Evaluation]

The recorded image obtained by using the aqueous ink composition of the present invention was tested for changes in recorded-image density with a colorimeter (trade name: SpectroEye, manufactured by GRETAG-MACBETH). Colorimetry was carried out under the conditions of D65 light source, DIN NB density standard, and 2° observer angle.

[Evaluation of Ozone Resistance]

After printing, the recorded image obtained by using the ink of each of Examples R1 to R3 and Comparative Examples R1 and $R^2$ was air dried for 24 hours. Then, the test pieces were placed and left in Ozone Weather Meter (trade name, manufactured by Suga Test Instruments Co., Ltd.) under the conditions at an ozone concentration of 10 ppm, humidity of 50% RH, and a temperature of 23° C. for 24 hours.

After the completion of the test, colorimetry was performed with the colorimeter, and then a color difference (ΔE) was determined by $((L^*\text{after test}-L^*\text{before test})^2+(a^*\text{after test}-a^*\text{before test})^2+(b^*\text{after test}-b^*\text{before test})^2)^{1/2}$, followed by evaluation according to the following criteria. Evaluation indicates that a test piece having a reading of a small value has little change in color due to color fading and is excellent.

The results are shown in Table 157 below.

TABLE 157

| | Example R1 | Example R2 | Example R3 | Comparative Example R1 | Comparative Example R2 |
|---|---|---|---|---|---|
| Glossy paper 1 | Good | Good | Good | Poor | Fair |

Good: ΔE ≤ 9
Fair: 9 < ΔE ≤ 11
Poor: 11 < ΔE

[Evaluation of Moisture Resistance]

After printing, the recorded image obtained by using the ink of each of Examples R1 to R3 and Comparative Examples R1 and R2 was air dried for 24 hours. Then, the test pieces were placed and left in Humidic Chamber IG400 manufactured by Yamato Scientific Co., Ltd. under the conditions at 30° C. and 90% RH for 168 hours. After the completion of the test, visual observation of the test piece was carried out for evaluation performed according to the following criteria. Evaluation indicates that a test piece having little bleeding has great moisture resistance and is excellent.

The results are shown in Table 158 below.

TABLE 158

| | Example R1 | Example R2 | Example R3 | Comparative Example R1 | Comparative Example R2 |
|---|---|---|---|---|---|
| Glossy paper 1 | Good | Good | Good | Fair | Poor |

Good: no bleeding observed
Fair: slight bleeding observed around the colored lattice
Poor: obvious bleeding observed The results in Tables 157 and 158 showed that Examples R1 to R3 were excellent in both ozone resistance and moisture resistance. On the other hand, Comparative Examples R1 and R2 were inferior to Examples R1 to R3 in either evaluation. These results showed the superiority of Examples R1 to R3 that were excellent in both ozone resistance and moisture resistance.

INDUSTRIAL APPLICABILITY

The azo compound of the present invention or a salt thereof as well as an ink composition containing the same provide very high print density, low chroma, and a high-quality black hue, and are excellent in moisture resistance, light resistance, and ozone-gas resistance, and are therefore suitably used in black inks for a wide range of recording such as for writing instruments and particularly for ink-jet recording.

The invention claimed is:

1. An ink composition comprising a coloring matter represented by the following formula (3) and a coloring matter represented by the following formula (b4):

(3)

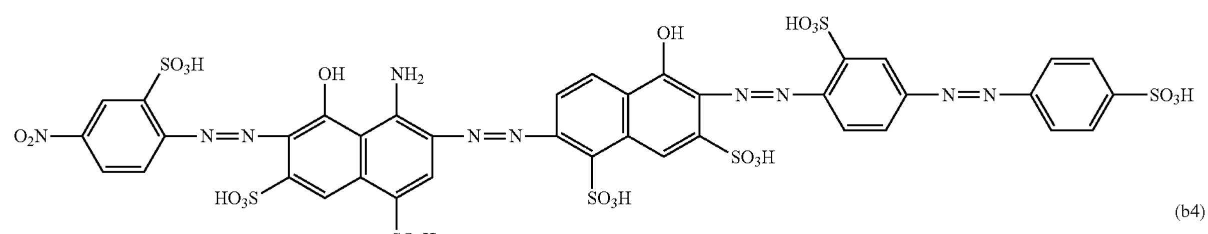

(b4)

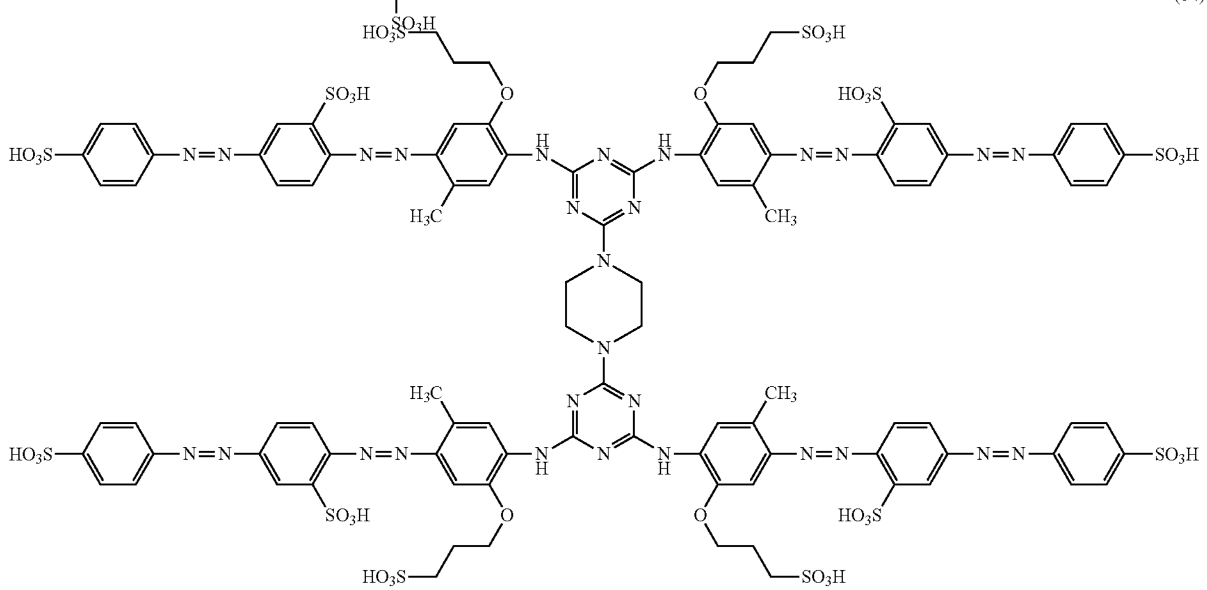

wherein the coloring matter represented by formula (3) is from 40% to ⅔ by mass of the total amount of the coloring matters in the ink composition.

2. The ink composition according to claim 1, further comprising (S), which is a water-soluble organic solvent.

3. The ink composition according to claim 2, wherein the component (S) comprises at least one water-soluble organic solvents selected from the group consisting of 2-pyrrolidone, a glycerol-based solvent, and a glycol-based solvent.

4. An inkjet-recording method, comprising using the ink composition according to claim 1 as ink and performing recording by discharging, in response to a recording signal, a droplet of the ink and making the droplet deposited to a record-receiving material.

5. The inkjet-recording method according to claim 4, wherein the record-receiving material is a communication sheet.

6. The inkjet-recording method according to claim 5, wherein the communication sheet is plain paper or a sheet having an ink-receiving layer containing a white porous inorganic substance.

7. A colored material colored by the inkjet-recording method according to claim 4.

8. An ink-jet printer, comprising a vessel containing the ink composition according to claim 1.

* * * * *